United States Patent
Kato et al.

(10) Patent No.: US 11,769,871 B2
(45) Date of Patent: Sep. 26, 2023

(54) LITHIUM SECONDARY BATTERIES AND NONAQUEOUS ELECTROLYTE FOR USE IN THE SAME

(71) Applicants: Mitsubishi Chemical Corporation, Chiyoda-ku (JP); MU IONIC SOLUTIONS CORPORATION, Chiyoda-ku (JP)

(72) Inventors: Ryoichi Kato, Inashiki-gun (JP); Minoru Kotato, Inashiki-gun (JP)

(73) Assignees: Mitsubishi Chemical Corporation, Chiyoda-ku (JP); MU IONIC SOLUTIONS CORPORATION, Chiyoda-ku (JP)

( * ) Notice: Subject to any disclaimer, the term of this patent is extended or adjusted under 35 U.S.C. 154(b) by 281 days.

(21) Appl. No.: 17/017,862

(22) Filed: Sep. 11, 2020

(65) Prior Publication Data

US 2021/0066707 A1     Mar. 4, 2021

Related U.S. Application Data

(63) Continuation of application No. 16/394,100, filed on Apr. 25, 2019, now abandoned, which is a
(Continued)

(30) Foreign Application Priority Data

Oct. 20, 2005  (JP) ................................ 2005-305300
Oct. 20, 2005  (JP) ................................ 2005-305368
(Continued)

(51) Int. Cl.
*H01M 50/46*     (2021.01)
*H01M 50/121*    (2021.01)
(Continued)

(52) U.S. Cl.
CPC ............. *H01M 4/131* (2013.01); *B60L 50/64* (2019.02); *H01M 4/0428* (2013.01);
(Continued)

(58) Field of Classification Search
CPC ........... H01M 10/052; H01M 10/0525; H01M 10/0569; H01M 2300/0025;
(Continued)

(56) References Cited

U.S. PATENT DOCUMENTS

| 5,595,842 A | 1/1997 | Nakane et al. |
| 5,827,621 A | 10/1998 | Morishita |

(Continued)

FOREIGN PATENT DOCUMENTS

| CN | 1195206 A | 10/1998 |
| CN | 1228624 A | 9/1999 |

(Continued)

OTHER PUBLICATIONS

JP 2006-066095 A (Year: 2006).*
(Continued)

*Primary Examiner* — Ula C Ruddock
(74) *Attorney, Agent, or Firm* — Oblon, McClelland, Maier & Neustadt, L.L.P.

(57) ABSTRACT

A lithium secondary battery comprising: a positive electrode and a negative electrode which each has a specific composition and specific properties; and a nonaqueous electrolyte which contains a cyclic siloxane compound represented by general formula (1), fluorosilane compound represented by general formula (2), compound represented by general formula (3), compound having an S—F bond in the molecule, nitric acid salt, nitrous acid salt, monofluorophosphoric acid salt, difluorophosphoric acid salt, acetic acid salt, or propionic acid salt in an amount of 10 ppm or more of the whole
(Continued)

SEM PHOTOGRAPH

EPMA EXAMINATION
Si DISTRIBUTION nonaqueous electrolyte. This lithium secondary battery has a high capacity, long life, and high output.

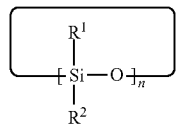

(1)

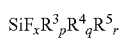

(2)

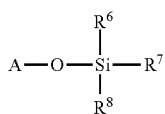

(3)

[In general formula (1), $R^1$ and $R^2$ are an organic group having 1-12 carbon atoms and n is an integer of 3-10. In general formula (2), $R^3$ to $R^5$ are an organic group having 1-12 carbon atoms; x is an integer of 1-3; and p, q, and r each are an integer of 0-3, provided that $1 \leq p+q+r \leq 3$. In general formula (3), $R^6$ to $R^8$ are an organic group having 1-12 carbon atoms and symbol A is a group constituted of H, C, N, O, F, S, Si, and/or P.]

23 Claims, 1 Drawing Sheet

Related U.S. Application Data continuation of application No. 15/291,314, filed on Oct. 12, 2016, now abandoned, which is a continuation of application No. 14/660,517, filed on Mar. 17, 2015, now abandoned, which is a continuation of application No. 13/614,215, filed on Sep. 13, 2012, now Pat. No. 9,029,022, which is a continuation of application No. 12/090,655, filed as application No. PCT/JP2006/320882 on Oct. 19, 2006, now Pat. No. 9,112,236.

(30) Foreign Application Priority Data

| Date | | Number |
|---|---|---|
| Oct. 28, 2005 | (JP) | 2005-314043 |
| Oct. 28, 2005 | (JP) | 2005-314260 |
| Nov. 16, 2005 | (JP) | 2005-331255 |
| Nov. 16, 2005 | (JP) | 2005-331362 |
| Nov. 16, 2005 | (JP) | 2005-331391 |
| Nov. 16, 2005 | (JP) | 2005-331477 |
| Nov. 16, 2005 | (JP) | 2005-331513 |
| Nov. 16, 2005 | (JP) | 2005-331585 |
| Nov. 16, 2005 | (JP) | 2005-332173 |
| Nov. 25, 2005 | (JP) | 2005-339794 |
| Nov. 29, 2005 | (JP) | 2005-343629 |
| Nov. 29, 2005 | (JP) | 2005-344732 |
| Dec. 2, 2005 | (JP) | 2005-349052 |
| Dec. 7, 2005 | (JP) | 2005-353005 |
| Dec. 13, 2005 | (JP) | 2005-359061 |
| Dec. 21, 2005 | (JP) | 2005-367747 |
| Dec. 22, 2005 | (JP) | 2005-369824 |
| Dec. 22, 2005 | (JP) | 2005-370024 |
| Dec. 28, 2005 | (JP) | 2005-377366 |
| Jan. 13, 2006 | (JP) | 2006-005622 |
| Jan. 23, 2006 | (JP) | 2006-013664 |
| Jan. 27, 2006 | (JP) | 2006-019863 |
| Jan. 27, 2006 | (JP) | 2006-019879 |

(51) Int. Cl.

| | |
|---|---|
| H01M 50/119 | (2021.01) |
| H01M 10/052 | (2010.01) |
| H01M 10/0525 | (2010.01) |
| H01M 4/131 | (2010.01) |
| H01M 4/587 | (2010.01) |
| H01M 4/133 | (2010.01) |
| H01M 10/0567 | (2010.01) |
| H01M 10/0568 | (2010.01) |
| H01M 10/0569 | (2010.01) |
| B60L 50/64 | (2019.01) |
| H01M 50/124 | (2021.01) |
| H01M 10/613 | (2014.01) |
| H01M 10/625 | (2014.01) |
| H01M 4/505 | (2010.01) |
| H01M 4/583 | (2010.01) |
| H01M 4/04 | (2006.01) |
| H01M 4/1391 | (2010.01) |
| H01M 4/1393 | (2010.01) |
| H01M 4/485 | (2010.01) |
| H01M 4/525 | (2010.01) |
| H01M 4/134 | (2010.01) |
| H01M 4/36 | (2006.01) |
| H01M 4/02 | (2006.01) |
| H01M 10/0587 | (2010.01) |

(52) U.S. Cl.

CPC ......... *H01M 4/0471* (2013.01); *H01M 4/133* (2013.01); *H01M 4/1391* (2013.01); *H01M 4/1393* (2013.01); *H01M 4/485* (2013.01); *H01M 4/505* (2013.01); *H01M 4/525* (2013.01); *H01M 4/583* (2013.01); *H01M 4/587* (2013.01); *H01M 10/052* (2013.01); *H01M 10/0525* (2013.01); *H01M 10/0567* (2013.01); *H01M 10/0568* (2013.01); *H01M 10/0569* (2013.01); *H01M 10/613* (2015.04); *H01M 10/625* (2015.04); *H01M 50/119* (2021.01); *H01M 50/121* (2021.01); *H01M 50/124* (2021.01); *H01M 50/46* (2021.01); *H01M 4/134* (2013.01); *H01M 4/364* (2013.01); *H01M 10/0587* (2013.01); *H01M 2004/021* (2013.01); *H01M 2004/027* (2013.01); *H01M 2220/20* (2013.01); *H01M 2300/004* (2013.01); *H01M 2300/0025* (2013.01); *H01M 2300/0034* (2013.01); *Y02E 60/10* (2013.01); *Y02T 10/70* (2013.01)

(58) Field of Classification Search

CPC .... H01M 2300/0034; H01M 2300/004; Y02E 60/10; Y02T 10/70

See application file for complete search history.

(56) References Cited

U.S. PATENT DOCUMENTS

| | | | |
|---|---|---|---|
| 5,958,622 | A | 9/1999 | Kojima et al. |
| 6,013,390 | A | 1/2000 | Kimiya et al. |
| 6,033,809 | A | 3/2000 | Hamamoto et al. |
| 6,045,945 | A | 4/2000 | Hamamoto et al. |
| 6,060,184 | A | 5/2000 | Gan et al. |
| 6,071,643 | A | 6/2000 | Chino |
| 6,153,338 | A | 11/2000 | Gan et al. |
| 6,274,278 | B1 | 8/2001 | Pistoia |
| 6,372,384 | B1 | 4/2002 | Fujimoto et al. |
| 6,383,688 | B1 | 5/2002 | Inagaki |
| 6,403,266 | B1 | 6/2002 | Kim et al. |

(56) References Cited

U.S. PATENT DOCUMENTS

| | | |
|---|---|---|
| 6,413,678 B1 | 7/2002 | Hamamoto et al. |
| 6,521,382 B1 | 2/2003 | Song et al. |
| 6,544,682 B1 | 4/2003 | Takami |
| 6,569,557 B1 | 5/2003 | Kitoh et al. |
| 6,589,694 B1 | 7/2003 | Gosho |
| 6,599,333 B1 | 7/2003 | Kim et al. |
| 7,598,003 B1* | 10/2009 | Yoon .......... H01M 10/0568 |
| | | 429/231.95 |
| 7,824,803 B2 | 11/2010 | Suhara et al. |
| 2001/0010877 A1 | 8/2001 | Arai |
| 2001/0041290 A1 | 11/2001 | Morigaki |
| 2002/0012850 A1 | 1/2002 | Schmidt et al. |
| 2002/0039677 A1 | 4/2002 | Iwamoto et al. |
| 2002/0168576 A1 | 11/2002 | Hamamoto et al. |
| 2002/0172866 A1 | 11/2002 | Yamahira et al. |
| 2002/0197534 A1 | 12/2002 | Fukuda |
| 2002/0197537 A1 | 12/2002 | Kim et al. |
| 2003/0124434 A1 | 7/2003 | Gan et al. |
| 2003/0165739 A1 | 9/2003 | Kizu et al. |
| 2003/0170550 A1 | 9/2003 | Ugawa et al. |
| 2003/0215714 A1 | 11/2003 | Barker et al. |
| 2003/0215716 A1 | 11/2003 | Suzuki et al. |
| 2004/0007688 A1* | 1/2004 | Awano .......... H01M 10/0525 |
| | | 252/62.2 |
| 2004/0023115 A1 | 2/2004 | Kato et al. |
| 2004/0043289 A1 | 3/2004 | Shimamura et al. |
| 2004/0106047 A1 | 6/2004 | Mie |
| 2004/0121236 A1 | 6/2004 | Shen et al. |
| 2004/0157114 A1 | 8/2004 | Arakawa |
| 2004/0191161 A1 | 9/2004 | Wang et al. |
| 2004/0197667 A1 | 10/2004 | Noh et al. |
| 2004/0214090 A1 | 10/2004 | West et al. |
| 2004/0223906 A1 | 11/2004 | Wang et al. |
| 2004/0229128 A1 | 11/2004 | Noh et al. |
| 2004/0234850 A1 | 11/2004 | Wataral |
| 2004/0258986 A1 | 12/2004 | Shen et al. |
| 2005/0037263 A1 | 2/2005 | Wang et al. |
| 2005/0048360 A1 | 3/2005 | Wang et al. |
| 2005/0053545 A1 | 3/2005 | Liu et al. |
| 2005/0084750 A1 | 4/2005 | Wang et al. |
| 2005/0089758 A1 | 4/2005 | Kim et al. |
| 2005/0110460 A1 | 5/2005 | Arai |
| 2005/0118512 A1 | 6/2005 | Onuki et al. |
| 2005/0130042 A1 | 6/2005 | Liu et al. |
| 2005/0164094 A1 | 7/2005 | Kotato et al. |
| 2005/0170253 A1 | 8/2005 | Yoon et al. |
| 2005/0191553 A1 | 9/2005 | Fujihara et al. |
| 2005/0221188 A1 | 10/2005 | Takami et al. |
| 2005/0233212 A1 | 10/2005 | Kaun |
| 2006/0134521 A1 | 6/2006 | Shima |
| 2006/0222945 A1 | 10/2006 | Bowden et al. |
| 2006/0263690 A1 | 11/2006 | Suhara et al. |
| 2007/0092428 A1 | 4/2007 | Sotowa et al. |
| 2007/0111101 A1 | 5/2007 | Ohkubo |
| 2007/0224514 A1 | 9/2007 | Kotato et al. |
| 2007/0238025 A1 | 10/2007 | Onuki et al. |
| 2009/0017383 A1 | 1/2009 | Suhara et al. |
| 2009/0155695 A1 | 6/2009 | Noh et al. |
| 2010/0015514 A1 | 1/2010 | Miyagi et al. |
| 2010/0021823 A1 | 1/2010 | Onuki et al. |
| 2010/0227226 A1 | 9/2010 | Onuki et al. |
| 2010/0294985 A1 | 11/2010 | Suhara et al. |
| 2011/0070485 A1 | 3/2011 | Kotato et al. |
| 2011/0159380 A1 | 6/2011 | Onuki et al. |
| 2011/0229771 A1 | 9/2011 | Onuki et al. |
| 2011/0300453 A1 | 12/2011 | Kotato et al. |
| 2012/0052399 A1 | 3/2012 | Takami et al. |
| 2012/0244426 A1 | 9/2012 | Kotato et al. |
| 2013/0022861 A1 | 1/2013 | Miyagi et al. |
| 2013/0095379 A1 | 4/2013 | Kotato |
| 2013/0129595 A1 | 5/2013 | Schulz et al. |
| 2013/0196225 A1 | 8/2013 | Kotato et al. |
| 2015/0243936 A1 | 8/2015 | Miyagi et al. |

FOREIGN PATENT DOCUMENTS

| | | |
|---|---|---|
| CN | 1272698 A | 11/2000 |
| CN | 2405363 Y | 11/2000 |
| CN | 1325147 A | 12/2001 |
| CN | 1333580 A | 1/2002 |
| CN | 1385919 A | 12/2002 |
| CN | 1387685 A | 12/2002 |
| CN | 1389938 A | 1/2003 |
| CN | 1438074 A | 8/2003 |
| CN | 1501539 A | 6/2004 |
| CN | 1507668 A | 6/2004 |
| CN | 1532986 A | 9/2004 |
| CN | 1540793 A | 10/2004 |
| CN | 2665947 Y | 12/2004 |
| CN | 1581543 A | 2/2005 |
| CN | 1653641 A | 8/2005 |
| CN | 1667865 A | 9/2005 |
| CN | 1685542 A | 10/2005 |
| EP | 0 762 527 A1 | 3/1997 |
| EP | 0 887 875 A1 | 12/1998 |
| EP | 1 744 394 A1 | 1/2007 |
| JP | 60-41774 A | 3/1985 |
| JP | 01-160814 A | 6/1989 |
| JP | 02-086074 A | 3/1990 |
| JP | 02-267873 A | 11/1990 |
| JP | 3-8270 A | 1/1991 |
| JP | 3 190959 | 8/1991 |
| JP | 04-237949 A | 8/1992 |
| JP | 05-101846 A | 4/1993 |
| JP | 6-119939 A | 4/1994 |
| JP | 8-50923 | 2/1996 |
| JP | 9-180758 A | 7/1997 |
| JP | 9-245830 A | 9/1997 |
| JP | 09-320602 A | 12/1997 |
| JP | 10-027625 | 1/1998 |
| JP | 10-144345 A | 5/1998 |
| JP | 10-144352 A | 5/1998 |
| JP | 10-154528 A | 6/1998 |
| JP | 10261415 A | 9/1998 |
| JP | 10-270076 | 10/1998 |
| JP | 10-334915 A | 12/1998 |
| JP | 11-67270 | 3/1999 |
| JP | 11-73989 | 3/1999 |
| JP | 11067270 A | 3/1999 |
| JP | 11-185806 | 7/1999 |
| JP | 11-307123 | 11/1999 |
| JP | 2000-3724 A | 1/2000 |
| JP | 2000-040523 A | 2/2000 |
| JP | 2000-90932 | 3/2000 |
| JP | 3087956 B2 | 7/2000 |
| JP | 2000-277116 A | 10/2000 |
| JP | 2000-299126 A | 10/2000 |
| JP | 2001-52682 A | 2/2001 |
| JP | 2001-52736 | 2/2001 |
| JP | 2001-57237 A | 2/2001 |
| JP | 2001-126764 | 5/2001 |
| JP | 2001-143760 A | 5/2001 |
| JP | 2001-160417 A | 6/2001 |
| JP | 2001-185141 A | 7/2001 |
| JP | 2001-210377 A | 8/2001 |
| JP | 2001-229924 A | 8/2001 |
| JP | 2002-008658 A | 1/2002 |
| JP | 2002-33127 A | 1/2002 |
| JP | 2002-83629 | 3/2002 |
| JP | 2002-117898 A | 4/2002 |
| JP | 2002-305035 | 10/2002 |
| JP | 2002-359001 A | 12/2002 |
| JP | 2003-068358 A | 3/2003 |
| JP | 2003-187863 A | 7/2003 |
| JP | 2003-208896 A | 7/2003 |
| JP | 2003-229128 A | 8/2003 |
| JP | 2003-229172 A | 8/2003 |
| JP | 2003-284251 | 10/2003 |
| JP | 2003-338317 A | 11/2003 |
| JP | 3475488 B2 | 12/2003 |
| JP | 2004-022379 A | 1/2004 |
| JP | 2004-31079 | 1/2004 |
| JP | 2004-031079 A | 1/2004 |

(56) References Cited

FOREIGN PATENT DOCUMENTS

| | | | | |
|---|---|---|---|---|
| JP | 2004031079 | A | 1/2004 | |
| JP | 2004-47131 | A | 2/2004 | |
| JP | 2004-63114 | A | 2/2004 | |
| JP | 2004 71458 | | 3/2004 | |
| JP | 2004-087196 | A | 3/2004 | |
| JP | 2004-087459 | A | 3/2004 | |
| JP | 2004-095188 | A | 3/2004 | |
| JP | 2004-095471 | A | 3/2004 | |
| JP | 2004-95471 | A | 3/2004 | |
| JP | 2004071458 | A | 3/2004 | |
| JP | 2004071458 | A * | 3/2004 | |
| JP | 2004-127556 | A | 4/2004 | |
| JP | 2004-127913 | A | 4/2004 | |
| JP | 2004-134232 | A | 4/2004 | |
| JP | 2004-139963 | A | 5/2004 | |
| JP | 2004-165151 | A | 6/2004 | |
| JP | 2004-171981 | A | 6/2004 | |
| JP | 2004-200122 | A | 7/2004 | |
| JP | 2004-247059 | | 9/2004 | |
| JP | 2004-303437 | A | 10/2004 | |
| JP | 2004-327211 | A | 11/2004 | |
| JP | 2004-342449 | A | 12/2004 | |
| JP | 2004-342585 | A | 12/2004 | |
| JP | 2004342607 | A * | 12/2004 | ........ H01M 10/0568 |
| JP | 2005-32701 | A | 2/2005 | |
| JP | 2005-071678 | A | 3/2005 | |
| JP | 2005-71749 | | 3/2005 | |
| JP | 2005-93595 | A | 4/2005 | |
| JP | 2005-097010 | A | 4/2005 | |
| JP | 2005-108440 | A | 4/2005 | |
| JP | 2005-123091 | A | 5/2005 | |
| JP | 2005 123180 | | 5/2005 | |
| JP | 2005-129533 | A | 5/2005 | |
| JP | 2005-135906 | | 5/2005 | |
| JP | 2005-158718 | A | 6/2005 | |
| JP | 2005-200276 | A | 7/2005 | |
| JP | 2005-209591 | A | 8/2005 | |
| JP | 2005-219994 | | 8/2005 | |
| JP | 2005-228730 | A | 8/2005 | |
| JP | 2005-243504 | | 9/2005 | |
| JP | 2005-251456 | A | 9/2005 | |
| JP | 2005-306619 | | 11/2005 | |
| JP | 2005-310477 | A | 11/2005 | |
| JP | 2005-317512 | A | 11/2005 | |
| JP | 2006 66095 | | 3/2006 | |
| JP | 2006066095 | A * | 3/2006 | |
| JP | 2006 137741 | | 6/2006 | |
| JP | 2007-149656 | | 6/2007 | |
| JP | 2010-60511 | A | 3/2010 | |
| JP | 2013-534205 | A | 9/2013 | |
| JP | 2014-15343 | A | 1/2014 | |
| JP | 2014-82220 | A | 5/2014 | |
| KR | 10-0370387 | B1 | 1/2003 | |
| WO | WO 99/08334 | A1 | 2/1999 | |
| WO | WO 99/18621 | A1 | 4/1999 | |
| WO | WO 99/34471 | A1 | 7/1999 | |
| WO | WO 01/33657 | A1 | 5/2001 | |
| WO | WO 03/075371 | A2 | 9/2003 | |
| WO | WO 2004/021477 | A1 | 3/2004 | |
| WO | WO 2005/031899 | A1 | 4/2005 | |

OTHER PUBLICATIONS

JP 2004-071458 A English machine translation (Year: 2004).*
JP 2004-342607 A English machine translation (Year: 2004).*
Combined Chinese Office Action and Search Report dated Jul. 23, 2020 in Chinese Patent Application No. 201710119547.7 (with English translation), citing documents AO and AP therein, 19 pages.
Japanese Office Action dated Aug. 4, 2020 in Japanese Patent Application No. 2019-085070 (with English translation), 8 pages.
Notice of Reasons for Refusal dated Nov. 9, 2021 in Japanese Patent Application No. 2020-200709 (with English machine translation), citing documents AA and AO therein, 8 pages.
Notification of Reason for Refusal dated Nov. 10, 2021 in Korean Patent Application No. 10-2021-7027605 (with English machine translation), 10 pages.
Office Action dated Mar. 22, 2022 in corresponding Japanese Patent Application No. 2020-200709 (with English Translation), citing documents AA, AO, AP therein, 8 pages.
Extended European Search Report dated Feb. 6, 2020 in European Patent Application No. 19169646.7, citing documents AA-AB and AO-AP therein, 15 pages.
Office Action dated Nov. 11, 2019 in Chinese Patent Application No. 201510689192.6 (with English translation).
Combined Chinese Office Action and Search Report dated Nov. 4, 2019 in Chinese Patent Application No. 201710119547.7 (with unedited computer generated English translation), 19 pages.
European Office Action dated Sep. 19, 2019 in European Patent Application No. 06 832 384.9, 3 pages.
Partial European Search Report dated Sep. 20, 2019 in European Patent Application No. 19169646.7, 15 pages.
Chinese Office Action dated May 5, 2019 in Patent Application No. 201510689192.6, 16 pages (with English translation).
Office Action dated Jul. 27, 2017 in European Patent Application No. 06 832 384.9.
Extended European Search Report dated Jul. 20, 2017 in Patent Application No. 17161189.0.
Office Action dated Jul. 12, 2017 in Chinese Patent Application No. 201410514981.1 (with unedited computer generated English translation).
Office Action dated Jul. 6, 2017 in Japanese Patent Application No. 2016-247639 (with English language translation).
"Safety Data Sheet of Ethylene Carbonate," Kishida Chemical Co., Ltd. , 2015,20 Pages (with English language translation).
"Safety Data Sheet of Ethylene Methyl Carbonate," Kishida Chemical Co., Ltd., 2015, 23 Pages (with English language translation).
"Safety Data Sheet of γ-butyrolactone," Showa Chemical Industry Co., Ltd., 2014, 33 Pages (with English language translation).
Japanese Office Action dated Jan. 23, 2018 in Patent Application No. 2016-247639 (with English translation), citing documents AO and AP therein, 6 pages.
Third Party Observations issued Mar. 29, 2018 in corresponding European Patent Application No. 17161189.0 citing document AO therein, 6 pages.
Office Action dated Apr. 17, 2018 in corresponding Chinese Patent Application No. 201410514981.1 (with English Translation), 6 pages.
Office Action dated Jun. 15, 2018 in European Patent Application No. 12 190 565.7.
The Third Office Action dated Aug. 15, 2018 in connection with Chinese Patent Application No. 201510689192.6 with English translation.
Office Action dated Aug. 23, 2016 in Japanese Patent Application No. 2015-242843 (with unedited computer generated English translation).
Combined Office Action and Search Report dated Jul. 20, 2016 in Chinese Patent Application No. 201510151471.7 (with partial unedited computer generated English translation and English translation of Categories of Cited Documents).
Combined Office Action an Search Report dated Aug. 18, 2016 in Chinese Patent Application No. 201410514981.1 (with partial unedited computer generated English translation and English translation of Categories of Cited Documents).
Office Action dated Sep. 8, 2016 in Korean Patent Application No. 10-2016-7020502 (with unedited computer generated English translation).
Doron Aurbach, et al., "Design of Electrolyte Solutions for Li and Li-ion Batteries: A Review", Eiectrochimica Acta, Elsevier, 2004, pp. 1-8.
Office Action dated Apr. 4, 2017 in Korean Patent Application No. 10-2016-7020502 (with unedited computer generated English translation).
Combined Office Action and Search Report dated Mar. 28, 2017 in Chinese Patent Application No. 201510504217.0 (with partial unedited computer generated English translation and English translation of categories of cited documents).

(56) References Cited

OTHER PUBLICATIONS

Combined Office Action and Search Report dated May 3, 2017 in Chinese Patent Application No. 201510689192.6 (with unedited computer generated English translation and English translation of category of cited documents).
Office Action dated Jun. 2, 2017 in Chinese Patent Application No. 201510151471.7 (with unedited computer generated English translation).
Chinese Office Action dated Dec. 15, 2017 in Chinese Patent Application No. 201510689192.6, citing documents AO through AR therein, 14 pages.
Korean Office Action dated Jan. 24, 2018 in Korean Patent Application No. 10-2015-7005747 (with English translation).
Korean Office Action dated Jan. 24, 2018 in Korean Patent Application No. 10-2016-7020502 (with English translation).
Notification of Reasons for Refusal dated Aug. 28, 2018 in connection with Japanese Patent Application No. 2016-247639 with English translation.
Notice of Final Rejection dated Sep. 20, 2018 in connection with Korean Patent Application No. 10-2016-7020502 with English translation.
Office Action dated Dec. 3, 2018 in Japanese Patent Application No. 2018-055458 (with English translation).
Japanese Office Action dated Jan. 22, 2019 in Japanese Patent Application No. 2018-055458 (with unedited computer generated English translation), citing documents AO and AP therein, 6 pages.
Japanese Office Action dated Feb. 6, 2019 in Japanese Patent Application No. 2016-247639 (with unedited computer generated English translation), citing document AQ therein, 6 pages.
Korean Office Action dated Mar. 5, 2019 in Korean Patent Application No. 10-2018-7035813 (with unedited computer generated English translation), 11 pages.
Office Action dated Nov. 12, 2013 in Japanese Patent Application No. 2006-291064 (with English language translation).
Office Action dated Nov. 12, 2013 in Japanese Patent Application No. 2006-291254 (with English language translation).
Office Action dated Nov. 26, 2013 in Japanese Patent Application No. 2006-304462 (with English language translation).
Office Action dated Nov. 26, 2013 in Japanese Patent Application No. 2006-308005 (with English language translation).
Office Action dated Nov. 26, 2013 in Japanese Patent Application No. 2006-308035 (with English language translation).
Office Action dated Oct. 28, 2013 in Japanese Patent Application No. 2006-314167 (with English language translation).
Office Action dated Oct. 28, 2013 in Japanese Patent Application No. 2006-325072 (with English language translation).
Office Action dated Nov. 26, 2013 in Japanese Patent Application No. 2006-327844 (with English language translation).
Office Action dated Oct. 28, 2013 in Japanese Patent Application No. 2006-342249 (with English language translation).
Office Action dated Oct. 28, 2013 in Japanese Patent Application No. 2007-005190 (with English language translation).
Office Action dated Oct. 28, 2013 in Japanese Patent Application No. 2007-016473 (with English language translation).
Office Action dated Jul. 9, 2013 in Japanese Patent Application No. 2011-097100 (with English language translation).
Office Action dated Aug. 20, 2013 in Chinese Patent Application No. 201010242620.8 (with English language translation).
Partial Supplementary European Search Report dated Mar. 3, 2016 in EP Patent Application No. 06832384.9.
Office Acton dated May 12, 2015 in connection with Korean Patent Application No. 10-2015-7005747 filed Mar. 4, 2015, with English translation.
Office Action (Notification of Reexamination) dated Feb. 13, 2015 in Chinese Patent Application No. 201010242620.8 with English translation.
Korean Office Action dated Mar. 30, 2015 in Korean Patent Application No. 10-2013-7031260, with English translation.
Boris Markovsky, et al., "On the Influence of Additives in Electrolyte Solutions on the Electrochemical Behavior of Carbon/LiC$_o$O$_2$ Cells at Elevated Temperatures," Journal of Power Sources, vol. 136, No. 2, XP00460010, attached Oct. 1, 2004, pp. 296-302.
Office Action dated Jul. 27, 2012 in Chinese Patent Application No. 201010242620.8 (with English translation).
Office Action dated Jan. 31, 2013 in Chinese Application No. 201010242620.8 (With English Translation).
Japanese Office Action dated Jan. 29, 2013 in Patent Application No. 2006-291064 (with English translation).
Office Action dated Mar. 21, 2013 in Korean Patent Application No. 2008-7009343 with Englishl language translation.
Office Action dated Feb. 29, 2012, in Chinese Application No. 201010242620.8 (with English-language translation).
JP 2004/071458 A, Suzuki et al. (English machine translation).
JP 10-261415 A, Sugano (English translation of Abstract).
JP 2004-031079 A1 English Machine Translation.
Japanese Offer of Publication (Third Party Observation) issued Aug. 29, 2012, in Japan Patent Application No. 2006-291064 (with English translation).
Japanese Offer of Publication issued Sep. 12, 2012, in Japan Patent Application No. 2006-304462 (with English translation).
Japanese Offer of Publication issued Sep. 10, 2012, in Japan Patent Application No. 2006-308005 (with English translation).
Japanese Trial Decision issued May 22, 2012, in Japan Patent Application No. 2009-284167 (with English translation).
Japanese Offer of Publication (Third Party Observation) issued Aug. 22, 2012, in Japan Patent Application No. 2006-291254 (with English translation).
R. C. Thompson, et al., "Preparation and Infrared Spectra of Alkali Metal Difluorophosphates", Inorganic Nuclear Chemistry Letters, vol. 5, No. 7, 1969, pp. 581-585.
Office Action dated Apr. 30, 2013 in Japanese Application No. 2011-097100 (With English Translation).
Combined Chinese Office Action and Search Report dated Jul. 18, 2013 in Patent Application No. 201110254405.4 with English Translatioin and English Translation of Category of Cited Documents.
Office Action dated Sep. 25, 2013 in Korean Patent Application No. 2013-7016062 (with English language translation).
Chinese Office Action dated May 9, 2014 in Patent Application No. 201210427884.X with English Translation.
Office Action dated Sep. 4, 2014 in Chinese Patent Application No. 201110254405.4 (with English language translation).
Office Action dated Nov. 27, 2012 in Japanese Patent Application No. 2006-304462 (with English translation).
Office Action dated Nov. 27, 2012 in Japanese Patent Application No. 2006-308005 (with English translation).
Office Action dated Nov. 27, 2012 in Japanese Patent Application No. 2006-308035 (with English translation).
Office Action dated Nov. 27, 2012 in Japanese Patent Application No. 2006-327844 (with English translation).
Chinese Office Action dated Mar. 5, 2014 in Patent Application No. 201110254405.4 with English Translation.
Japanese Office Action dated Feb. 18, 2014 in Patent Application No. 2013-092857 with English Translation.
Korean Office Action dated Feb. 24, 2014 in Patent Application No. 10-2013-7031260 with English Translation.
Office Action dated Mar. 31, 2014 in Korean Patent Application No. 10-2013-7016062 (with English language translation).
Japanese Office Action dated Jan. 20, 2015 in JP Patent Application No. 2014-023030 with English translation.
JP 11-067270 A English.
Machine English translation of JP 2004-031079 A.
Machine English translation of JP2004-171981 A.
Office Action dated Jul. 30, 2014 in Japanese Patent Application No. 2013-012967 (with English language translation).
Office Action dated Aug. 1, 2014 in Japanese Patent Application No. 2013-092857 (with English language translation).
Office Action dated Aug. 18, 2014 in Japanese Patent Application No. 2006-309854 (with English language translation).
Office Action dated Aug. 18, 2014 in Japanese Patent Application No. 2006-309858 (with English language translation).
Office Action dated Aug. 18, 2014 in Japanese Patent Application No. 2006-314167 (with English language translation).

(56) References Cited

OTHER PUBLICATIONS

Office Action dated Aug. 18, 2014 in Japanese Patent Application No. 2006-325072 (with English language translation).
Office Action dated Aug. 18, 2014 in Japanese Patent Application No. 2006-342249 (with English language translation).
Office Action dated Aug. 18, 2014 in Japanese Patent Application No. 2007-005190 (with English language translation).
Office Action dated Aug. 18, 2014 in Japanese Patent Application No. 2007-016473 (with English language translation).
Office Action dated Sep. 10, 2014 in Japanese Patent Application No. 2006-327844 (with English language translation).
Office Action dated Sep. 12, 2014 in Japanese Patent Application No. 2006-308005 (with English language translation).
Office Action dated Sep. 30, 2014 in Korean Patent Application No. 2013-7031260 (with English language translation).
Office Action dated Nov. 20, 2014 in Korean Patent Application No. 2013-7016062 (with English language translation).
Reason of Information Submission issued Jul. 10, 2014 in Japanese Patent Application No. 2006-308005 (with English language translation).
Written Opposition to the Grant of Patent issued May 16, 2001 of Japanese Opposition No. 2001-71473 (Japanese Patent No. 3111447).
Written Opinion of an Opposition to the Grant of Patent dated Feb. 12, 2002 of Japanese Opposition No. 2001-71473 (Japanese Patent No. 3111447).
Decision on Opposition issued Jun. 7, 2002 of Japanese Opposition No. 2001-71473 (Japanese Patent No. 3111447).
"Battery Technology" Osaka National Research Institute, vol. 8, 1996, pp. 108-117 (with English Abstract).
C. Clifford Addison, et al., "Chemistry in Fuming Nitric Acids-I NMR Spectroscopic Study of $PF_5$, $HPO_2F_2$ and $P_4O_{10}$ in the Solvent System 44 wt.% $N_2O_4$ in 100% $HNO_3$" Polyhedron, vol. 2, No. 7, 1983, pp. 651-656.
Koord. Khim. R381A, 1989,pp. 1504-1509 (with partial English language translation).
E. Markevich, et al., Reasons for capacity fading of $LiCoPO_4$ cathodes in $LiPF_6$ containing electrolyte solutions Electrochemistry Communications, vol. 15, 2012, pp. 22-25.
JP 11067270 A machine English translation.
Combined Office Action and Search Report dated Oct. 22, 2015 in Chinese Patent Application No. 201110254405.4 (with English language translation).
Partial European Search Report dated Mar. 2, 2016 in EP Patent Application No. 12190565.7.
Korean Office Action dated Mar. 28, 2016 in Korean Patent Application No. 10-2015-7005747 (with English translation).
Information Offer Form issued Sep. 24, 2012 in Japanese Patent Application No. 2011-97100 (with English-language translation).
Office Action dated Feb. 14, 2012 in Japanese Patent Application No. 2006-291064 (with English-language translation).
Office Action dated Oct. 30, 2012 in Japanese Patent Application No. 2006-291064 (with English-language translation).
Office Action dated Feb. 14, 2012 in Japanese Patent Application No. 2006-291254 (with English-language translation).
Office Action dated Oct. 30, 2012 in Japanese Patent Application No. 2006-291254 (with English-language translation).
Office Action dated Feb. 2, 2010 in Japanese Patent Application No. 2006-304134 (with English-language translation).
Office Action dated Jan. 25, 2011 in Japanese Patent Application No. 2006-304134 (with English-language translation).
Office Action dated Sep. 17, 2015 in Japanese Patent Application No. 2014-023030 (with English language translation).
Trial Decision dated Sep. 18, 2015 in Korean Patent Application No. 10-2013-7016062 (with English language translation).
Information Offer Form issued Aug. 17, 2015 in Japanese Patent Application 2014-023030 (with English language translation).
Communication pursuant to Rule 114(2) EPC dated Sep. 1, 2015 in European Patent Application No. 12190565.7.
Japanese Office Action dated Mar. 16, 2021 in Japanese Patent Application No. 2020-003336 (with unedited computer generated English translation), 8 pages.
Extended European Search Report dated Apr. 29, 2021 in European Patent Application No. 20212382.4, 7 pages.
Chinese Office Action dated Mar. 1, 2021 in Chinese Patent Application No. 201710119547.7 (with English translation), 13 pages.
Combined Chinese Office Action and Search Report dated Sep. 3, 2021 in Chinese Patent Application No. 201910201995.0 (with unedited computer generated English translation), citing documents AS and AT therein, 22 pages.
Combined Chinese Office Action and Search Report dated Aug. 23, 2021 in Chinese Patent Application No. 201910202173.4 (with unedited computer generated English translation), citing documents AQ and AR therein, 23 pages.
Japanese Office Action dated Sep. 7, 2021 in Japanese Patent Application No. 2020-003336 (with unedited computer generated English translation), citing documents AU and AV therein, 12 pages.
Korean Office Action 10-2022-7039314 dated Jul. 5, 2023 in corresponding Korean Application with English Machine Translation.

\* cited by examiner

SEM PHOTOGRAPH

EPMA EXAMINATION
Si DISTRIBUTION

EPMA EXAMINATION
C DISTRIBUTION

LITHIUM SECONDARY BATTERIES AND NONAQUEOUS ELECTROLYTE FOR USE IN THE SAME

CROSS REFERENCE TO RELATED APPLICATIONS

This application is a continuation of U.S. patent application Ser. No. 16/394,100 filed Apr. 25, 2019, which is a continuation of U.S. patent application Ser. No. 15/291,314, filed Oct. 12, 2016, which is a continuation of U.S. patent application Ser. No. 14/660,517, filed Mar. 17, 2015, which is a continuation of U.S. application Ser. No. 13/614,215, filed Sep. 13, 2012, which is a continuation application of U.S. patent application Ser. No. 12/090,655, filed Jun. 5, 2009, which is the U.S. National Stage of International Patent Application No. PCT/JP06/320882, filed Oct. 19, 2006, the disclosures of which are incorporated herein by reference in their entireties. This application claims priority to each of the following Japanese patent application, listed with their filing dates, the disclosures of which are incorporated herein by reference in their entireties.

| | | |
|---|---|---|
| 2005-305368 | Japan | Oct. 20, 2005 |
| 2005-305300 | Japan | Oct. 20, 2005 |
| 2005-314043 | Japan | Oct. 28, 2005 |
| 2005-314260 | Japan | Oct. 28, 2005 |
| 2005-331255 | Japan | Nov. 16, 2005 |
| 2005-331362 | Japan | Nov. 16, 2005 |
| 2005-331391 | Japan | Nov. 16, 2005 |
| 2005-331477 | Japan | Nov. 16, 2005 |
| 2005-331513 | Japan | Nov. 16, 2005 |
| 2005-331585 | Japan | Nov. 16, 2005 |
| 2005-332173 | Japan | Nov. 16, 2005 |
| 2005-339794 | Japan | Nov. 25, 2005 |
| 2005-344732 | Japan | Nov. 29, 2005 |
| 2005-343629 | Japan | Nov. 29, 2005 |
| 2005-349052 | Japan | Dec. 2, 2005 |
| 2005-353005 | Japan | Dec. 7, 2005 |
| 2005-359061 | Japan | Dec. 13, 2005 |
| 2005-367747 | Japan | Dec. 21, 2005 |
| 2005-369824 | Japan | Dec. 22, 2005 |
| 2005-370024 | Japan | Dec. 22, 2005 |
| 2005-377366 | Japan | Dec. 28, 2005 |
| 2006-005622 | Japan | Jan. 13, 2006 |
| 2006-013664 | Japan | Jan. 23, 2006 |
| 2006-019863 | Japan | Jan. 27, 2006 |
| 2006-019879 | Japan | Jan. 27, 2006 |

TECHNICAL FIELD

The present invention relates to lithium secondary batteries and a nonaqueous electrolyte for use therein. More particularly, the invention relates to: lithium secondary batteries which comprise a nonaqueous electrolyte for lithium secondary batteries which contains a specific ingredient and a positive electrode and a negative electrode each having a specific composition and specific properties and capable of occluding/releasing lithium, and which are excellent especially in low-temperature discharge characteristics and have a high capacity, long life, and high output; and the nonaqueous electrolyte for use in these batteries.

BACKGROUND ART

With the recent trend toward size reduction in electronic appliances, secondary batteries are increasingly required to have a higher capacity. Attention is hence focused on lithium secondary batteries, which have a higher energy density than nickel-cadmium batteries and nickel-hydrogen batteries.

Lithium secondary batteries are used in various applications because they are high-capacity secondary batteries. In these applications, however, the lithium secondary batteries are mainly used as batteries of relatively small sizes as in, e.g., portable telephones. In the future, the batteries are expected to be used in a wider range of applications as large batteries for motor vehicles, etc. Although output is especially required of large batteries, mere enlargement of conventional small batteries results in insufficient performances. Various improvements in battery materials for an output improvement have been proposed (see, for example, patent documents 1 to 25 and non-patent document 1). However, a sufficient output has not been obtained so far, and a further improvement is desired.

Patent Document 1: JP-A-2005-071749
Patent Document 2: JP-A-2005-123180
Patent Document 3: JP-A-2001-206722
Patent Document 4: JP-A-2003-267732
Patent Document 5: JP-A-2001-015108
Patent Document 6: WO 2003/34518
Patent Document 7: JP-A-11-067270
Patent Document 8: JP-A-61-168512
Patent Document 9: JP-A-6-275263
Patent Document 10: JP-A-2000-340232
Patent Document 11: JP-A-2005-235397
Patent Document 12: JP-A-11-031509
Patent Document 13: JP-A-3-055770
Patent Document 14: JP-A-2004-071458
Patent Document 15: JP-A-2004-087459
Patent Document 16: JP-A-10-270074
Patent Document 17: JP-A-2002-075440
Patent Document 18: JP-A-10-270075
Patent Document 19: JP-A-8-045545
Patent Document 20: JP-A-2001-006729
Patent Document 21: JP-A-10-050342
Patent Document 22: JP-A-9-106835
Patent Document 23: JP-A-2000-058116
Patent Document 24: JP-A-2001-015158
Patent Document 25: JP-A-2005-306619
Non-Patent Document 1: *J. Electrochem. Soc.*, 145, L1 (1998)

DISCLOSURE OF THE INVENTION

Problems that the Invention is to Solve

The invention has been achieved in view of such background-art techniques. An object of the invention is to provide lithium secondary batteries which, even when fabricated so as to have a larger size, have a high capacity, long life, and high output.

Means for Solving the Problems

The present inventors made intensive investigations in view of the problems described above. As a result, they have found that a lithium secondary battery having a high capacity, long life, and high output is obtained by using a positive electrode and a negative electrode each having a specific composition and specific properties and further using a nonaqueous electrolyte containing a compound selected from a specific group. The invention has been thus completed.

The invention provides a lithium secondary battery at least comprising: an electrode group comprising a positive electrode, a negative electrode, and a microporous separator interposed between the electrodes; and a nonaqueous electrolyte comprising a nonaqueous solvent and a lithium salt contained therein, the electrode group and the nonaqueous electrolyte being held in a battery case, the positive electrode and the negative electrode each comprising a current collector and, formed thereon, an active-material layer containing an active material capable of occluding/releasing a lithium ion, wherein the nonaqueous electrolyte is a nonaqueous electrolyte which contains at least one compound selected from the group consisting of cyclic siloxane compounds represented by the following general formula (1):

[Ka-1]

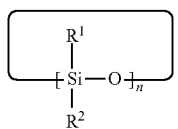
(1)

[wherein $R^1$ and $R^2$ may be the same or different and represent an organic group which has 1-12 carbon atoms and n represents an integer of 3-10],
fluorosilane compounds represented by the following general formula (2):

[Ka-2]

$$SiF_xR^3_pR^4_qR^5_r \qquad (2)$$

[wherein $R^3$ to $R^5$ may be the same or different and represent an organic group which has 1-12 carbon atoms; x represents an integer of 1-3; and p, q, and r each represents an integer of 0-3, provided that $1 \leq p+q+r \leq 3$],
compounds represented by the following general formula (3):

[Ka-3]

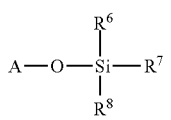
(3)

[wherein $R^6$ to $R^8$ may be the same or different and represent an organic group which has 1-12 carbon atoms and symbol A represents a group constituted of H, C, N, O, F, S, Si, and/or P],
compounds having an S—F bond in the molecule, nitric acid salts, nitrous acid salts, monofluorophosphoric acid salts, difluorophosphoric acid salts, acetic acid salts, and propionic acid salts in an amount of 10 ppm or more of the whole nonaqueous electrolyte, and
the positive electrode is any positive electrode selected from the group consisting of the following positive electrode [1] to positive electrode [5]:

positive electrode [1]: a positive electrode containing a positive-electrode active material containing manganese;

positive electrode [2]: a positive electrode containing a positive-electrode active material having a composition represented by the following composition formula (4):

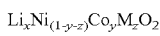
composition formula (4)

[wherein M represents at least one element selected from the group consisting of Mn, Al, Fe, Ti, Mg, Cr, Ga, Cu, Zn, and Nb; x represents a number satisfying $0<x \leq 1.2$; y represents a number satisfying $0.05 \leq y \leq 0.5$; and z represents a number satisfying $0.01 \leq z \leq 0.5$];

positive electrode [3]: a positive electrode containing a positive-electrode active material selected from the group consisting of the following (a) to (d):
(a) a positive-electrode active material having a BET specific surface area of from 0.4 $m^2/g$ to 2 $m^2/g$,
(b) a positive-electrode active material having an average primary-particle diameter of from 0.1 μm to 2 μm,
(c) a positive-electrode active material having a median diameter $d_{50}$ of from 1 μm to 20 μm,
(d) a positive-electrode active material having a tap density of from 1.3 $g/cm^3$ to 2.7 $g/cm^3$;

positive electrode [4]: a positive electrode satisfying any requirement selected from the group consisting of the following (e) to (f):
(e) is a positive electrode produced by forming a positive-electrode active-material layer comprising a positive-electrode active material, a conductive material, and a binder on a current collector, wherein the content of the conductive material in the positive-electrode active-material layer is in the range of from 6% by mass to 20% by mass,
(f) is a positive electrode produced by forming a positive-electrode active-material layer comprising a positive-electrode active material and a binder on a current collector, wherein the positive-electrode active-material layer has a density in the range of from 1.7 $g/cm^3$ to 3.5 $g/cm^3$,
(g) is a positive electrode produced by forming a positive-electrode active-material layer comprising a positive-electrode active material and a binder on a current collector, wherein the ratio of the thickness of the positive-electrode active-material layer to the thickness of the current collector, i.e., the value of (thickness of the active-material layer on one side just before impregnation with the nonaqueous electrolyte)/(thickness of the current collector), is in the range of from 1.6 to 20; and positive electrode [5]: a positive electrode containing two or more positive-electrode active materials differing in composition.

The invention further provides a lithium secondary battery at least comprising: an electrode group comprising a positive electrode, a negative electrode, and a microporous separator interposed between the electrodes; and a nonaqueous electrolyte comprising a nonaqueous solvent and a lithium salt contained therein, the electrode group and the nonaqueous electrolyte being held in a battery case, and the positive electrode and the negative electrode each comprising a current collector and, formed thereon, an active-material layer containing an active material capable of occluding/releasing a lithium ion, wherein the nonaqueous electrolyte is a nonaqueous electrolyte which contains at least one compound selected from the group consisting of cyclic siloxane compounds represented by general formula (1) given above, fluorosilane compounds represented by general formula (2) given above, compounds represented by general formula (3) given above, compounds having an S—F bond in the molecule, nitric acid salts, nitrous acid salts, monofluorophosphoric acid salts, difluorophosphoric acid salts, acetic acid salts, and propionic acid salts in an amount of 10 ppm or more of the whole nonaqueous electrolyte, and the negative electrode is any negative electrode selected from the group consisting of the following negative electrode [1] to negative electrode [10]:

negative electrode [1]: a negative electrode containing as a negative-electrode active material two or more carbonaceous substances differing in crystallinity;

negative electrode [2]: a negative electrode containing as a negative-electrode active material an amorphous carbonaceous substance which, when examined by wide-angle X-ray diffractometry, has an interplanar spacing (d002) for the (002) planes of 0.337 nm or larger and a crystallite size (Lc) of 80 nm or smaller and which, in an examination by argon ion laser Raman spectroscopy, has a Raman R value of 0.2 or higher defined as the ratio of the peak intensity at 1,360 cm$^{-1}$ to the peak intensity at 1,580 cm$^{-1}$;

negative electrode [3]: a negative electrode containing as a negative-electrode active material a titanium-containing metal oxide capable of occluding and releasing lithium;

negative electrode [4]: a negative electrode containing as a negative-electrode active material a carbonaceous substance having a roundness of 0.85 or higher and a surface functional-group amount O/C value of from 0 to 0.01;

negative electrode [5]: a negative electrode containing as a negative-electrode active material an orientation-differing-carbon composite comprising two or more carbonaceous substances differing in orientation;

negative electrode [6]: a negative electrode containing, as a negative-electrode active material, graphitic carbon particles which have a roundness of 0.85 or higher and an interplanar spacing (d002) for the (002) planes of smaller than 0.337 nm as determined by wide-angle X-ray diffractometry and which, in an examination by argon ion laser Raman spectroscopy, have a Raman R value of from 0.12 to 0.8 defined as the ratio of the peak intensity at 1,360 cm$^{-1}$ to the peak intensity at 1,580 cm$^{-1}$;

negative electrode [7]: a negative electrode containing as a negative-electrode active material a multielement-containing negative-electrode active material (C) which contains at least one of a lithium-occluding metal (A) selected from the group consisting of Al, Pb, Zn, Sn, Bi, In, Mg, Ga, Cd, Ag, Si, B, Au, Pt, Pd, and Sb and/or a lithium-occluding alloy (B) and further contains C and/or N as element Z;

negative electrode [8]: a negative electrode containing as a negative-electrode active material two or more negative-electrode active materials differing in property;

negative electrode [9]: a negative electrode containing a negative-electrode active material which has a tap density of 0.1 g/cm$^3$ or higher and has a pore volume, in terms of the volume of particle pores corresponding to the diameter range of from 0.01 μm to 1 μm as determined by mercury porosimetry, of 0.01 mL/g or larger; and negative electrode [10]: a negative electrode which, when charged to 60% of a nominal capacity, has a reaction resistance in a negative-electrode opposing cell of 500Ω or lower.

The invention furthermore provides a lithium secondary battery at least comprising: an electrode group comprising a positive electrode, a negative electrode, and a microporous separator interposed between the electrodes; and a nonaqueous electrolyte comprising a nonaqueous solvent and a lithium salt contained therein, the electrode group and the nonaqueous electrolyte being held in a battery case, and the positive electrode and the negative electrode each comprising a current collector and, formed thereon, an active-material layer containing an active material capable of occluding/releasing a lithium ion, wherein the nonaqueous electrolyte is a nonaqueous electrolyte which contains at least one compound selected from the group consisting of cyclic siloxane compounds represented by general formula (1) given above, fluorosilane compounds represented by general formula (2) given above, compounds represented by general formula (3) given above, compounds having an S—F bond in the molecule, nitric acid salts, nitrous acid salts, monofluorophosphoric acid salts, difluorophosphoric acid salts, acetic acid salts, and propionic acid salts in an amount of 10 ppm or more of the whole nonaqueous electrolyte, and the nonaqueous electrolyte satisfies any requirement selected from the group consisting of the following electrolyte [1] to electrolyte [9]:

electrolyte [1]: the nonaqueous solvent as a component of the electrolyte is a mixed solvent at least containing ethylene carbonate and the proportion of the ethylene carbonate to the whole nonaqueous solvent is from 1% by volume to 25% by volume;

electrolyte [2]: the nonaqueous solvent as a component of the electrolyte contains at least one asymmetric chain carbonate and the proportion of the asymmetric chain carbonate to the whole nonaqueous solvent is from 5% by volume to 90% by volume;

electrolyte [3]: the nonaqueous solvent as a component of the electrolyte contains at least one chain carboxylic acid ester;

electrolyte [4]: the nonaqueous solvent as a component of the electrolyte contains at least one solvent having a flash point of 70° C. or higher in an amount of 60% by volume or larger based on the whole nonaqueous solvent;

electrolyte [5]: the lithium salt as a component of the electrolyte comprise LiN($C_nF_{2n+1}SO_2$)$_2$ (wherein n is an integer of 1-4) and/or lithium bis(oxalato)borate;

electrolyte [6]: the lithium salt as a component of the electrolyte comprise a fluorine-containing lithium salt and the nonaqueous electrolyte contains hydrogen fluoride (HF) in an amount of from 10 ppm to 300 ppm of the whole electrolyte;

electrolyte [7]: the electrolyte contains vinylene carbonate and the content of the vinylene carbonate is in the range of from 0.001% by mass to 3% by mass based on the whole electrolyte;

electrolyte [8]: the electrolyte further contains at least one compound selected from the group consisting of compounds represented by general formula (4), heterocyclic compounds containing nitrogen and/or sulfur, cyclic carboxylic acid esters, and fluorine-containing cyclic carbonates in an amount of from 0.001% by mass to 5% by mass based on the whole nonaqueous electrolyte:

[Ka-4]

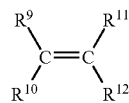

(4)

[wherein $R^9$ to $R^{12}$ may be the same or different and each represent a group constituted of one or more elements selected from the group consisting of H, C, N, O, F, S, and P]; and electrolyte [9]: the electrolyte further contains an overcharge inhibitor.

The secondary batteries described above each especially preferably are one which has any property selected from the group consisting of the following (1) to (3):
  (1) the overall electrode area of the positive electrode is at least 20 times the surface area of the case of the secondary battery;
  (2) the secondary battery has a direct-current resistance component of 20 milliohms (mΩ) or less; and
  (3) the battery elements held in each battery case of the secondary battery have an electric capacity of 3 ampere-hours (Ah) or higher.

The invention still further provides a lithium secondary battery at least comprising: an electrode group comprising a positive electrode, a negative electrode, and a microporous separator interposed between the electrodes; and a nonaqueous electrolyte comprising a nonaqueous solvent and a lithium salt contained therein, the electrode group and the nonaqueous electrolyte being held in a battery case, and the positive electrode and the negative electrode each comprising a current collector and, formed thereon, an active-material layer containing an active material capable of occluding/releasing a lithium ion, wherein the nonaqueous electrolyte is a nonaqueous electrolyte which contains at least one compound selected from the group consisting of cyclic siloxane compounds represented by general formula (1) given above, fluorosilane compounds represented by general formula (2) given above, compounds represented by general formula (3) given above, compounds having an S—F bond in the molecule, nitric acid salts, nitrous acid salts, monofluorophosphoric acid salts, difluorophosphoric acid salts, acetic acid salts, and propionic acid salts in an amount of 10 ppm or more of the whole nonaqueous electrolyte, wherein the secondary battery has any property selected from the group consisting of the following structure [1] to structure [6]:
    structure [1]: the overall electrode area of the positive electrode is at least 20 times the surface area of the case of the secondary battery;
    structure [2]: the secondary battery has a direct-current resistance component of 20 milliohms (mΩ) or less;
    structure [3]: the battery elements held in each battery case of the secondary battery have an electric capacity of 3 ampere-hours (Ah) or higher;
    structure [4]: the current collectors of the positive electrode and negative electrode of the secondary battery each are made of a metallic material, and the metallic material of each current collector has been bonded to a conductor for outwardly discharging current by any of spot welding, high-frequency welding, and ultrasonic welding;
    structure [5]: the case of the secondary battery is made of aluminum or an aluminum alloy; and
    structure [6]: the battery case of the secondary battery is made of a casing material in which at least part of the battery inner side comprises a sheet formed from a thermoplastic resin and with which the electrode group can be enclosed by placing the electrode group in the casing material and heat sealing layers of the thermoplastic resin to each other.

The invention still further provides a nonaqueous electrolyte for secondary battery which at least comprises a nonaqueous solvent and a lithium salt, wherein the nonaqueous electrolyte contains at least one compound selected from the group consisting of cyclic siloxane compounds represented by general formula (1) given above, fluorosilane compounds represented by general formula (2) given above, compounds represented by general formula (3) given above, compounds having an S—F bond in the molecule, nitric acid salts, nitrous acid salts, monofluorophosphoric acid salts, difluorophosphoric acid salts, acetic acid salts, and propionic acid salts in an amount of 10 ppm or more of the whole nonaqueous electrolyte, and the nonaqueous electrolyte satisfies any requirement selected from the group consisting of the following electrolyte [1] to electrolyte [9]:
    electrolyte [1]: the nonaqueous solvent as a component of the electrolyte is a mixed solvent at least containing ethylene carbonate and the proportion of the ethylene carbonate to the whole nonaqueous solvent is from 1% by volume to 25% by volume;
    electrolyte [2]: the nonaqueous solvent as a component of the electrolyte contains at least one asymmetric chain carbonate and the proportion of the asymmetric chain carbonate to the whole nonaqueous solvent is from 5% by volume to 90% by volume;
    electrolyte [3]: the nonaqueous solvent as a component of the electrolyte contains at least one chain carboxylic acid ester;
    electrolyte [4]: the nonaqueous solvent as a component of the electrolyte contains at least one solvent having a flash point of 70° C. or higher in an amount of 60% by volume or larger based on the whole nonaqueous solvent;
    electrolyte [5]: the lithium salt as a component of the electrolyte comprise $LiN(C_nF_{2n+1}SO_2)_2$ (wherein n is an integer of 1-4) and/or lithium bis(oxalato)borate;
    electrolyte [6]: the lithium salt as a component of the electrolyte comprise a fluorine-containing lithium salt and the nonaqueous electrolyte contains hydrogen fluoride (HF) in an amount of from 10 ppm to 300 ppm of the whole electrolyte;
    electrolyte [7]: the electrolyte contains vinylene carbonate and the content of the vinylene carbonate is in the range of from 0.001% by mass to 3% by mass based on the whole electrolyte;
    electrolyte [8]: the electrolyte further contains at least one compound selected from the group consisting of compounds represented by general formula (4) given above, heterocyclic compounds containing nitrogen and/or sulfur, cyclic carboxylic acid esters, and fluorine-containing cyclic carbonates in an amount of from 0.001% by mass to 5% by mass based on the whole nonaqueous electrolyte; and electrolyte [9]: the electrolyte further contains an overcharge inhibitor.

Advantages of the Invention

According to the invention, lithium secondary batteries especially having excellent low-temperature discharge characteristics can be provided. The embodiments of the invention which will be described later produce, for example, the following effects.
Positive Electrode [1]:
  According to the invention, a lithium secondary battery especially suitable for use as a large battery in, e.g., applications such as motor vehicles can be provided because a long life and a high output are obtained with less expensive materials.

Positive Electrode [2]:

According to the invention, a lithium secondary battery having a high capacity, long life, and high output can be provided, and a lithium secondary battery especially suitable for use as a large battery in, e.g., applications such as motor vehicles can be provided.

Positive Electrode [3]:

According to the invention, a lithium secondary battery having a long life and a high output is obtained and, hence, a lithium secondary battery especially suitable for use as a large battery in, e.g., applications such as motor vehicles can be provided.

Positive Electrode [4]:

According to the invention, a lithium secondary battery having a high output is obtained and, hence, a lithium secondary battery especially suitable for use as a large battery in, e.g., applications such as motor vehicles can be provided.

Positive Electrode [5]:

According to the invention, a lithium secondary battery which has a high capacity, long life, and high output and is inhibited from decreasing in battery capacity or output with repetitions of charge/discharge (has excellent suitability for repetitions of charge/discharge (cycle characteristics)) is obtained. Consequently, a lithium secondary battery especially suitable for use as a large battery in, e.g., applications such as motor vehicles can be provided.

Negative Electrode [1]:

According to the invention, a lithium secondary battery can be provided which can realize high-output characteristics from an initial to a final stage in a cycle while retaining improved suitability for cycling and which, even after having deteriorated through charge/discharge cycling, retains high-output characteristics. This battery is suitable especially for use as a large battery.

Negative Electrode [2]:

According to the invention, a lithium secondary battery having satisfactory suitability for short-time high-current-density charge/discharge can be provided.

Negative Electrode [3]:

According to the invention, a lithium secondary battery having a low output resistance and enabling the effective utilization of energy can be provided.

Negative Electrode [4]:

According to the invention, a lithium secondary battery improved in high-temperature storability at a low state of charge can be provided.

Negative Electrode [5]:

According to the invention, a lithium secondary battery can be provided which can retain satisfactory suitability for long-term repetitions of charge/discharge at a low state of charge.

Negative Electrode [6]:

According to the invention, a lithium secondary battery showing a quick output recovery from a low-output state at low temperatures can be provided.

Negative Electrode [7]:

According to the invention, a lithium secondary battery can be provided which, even when fabricated so as to have a larger size, has a high capacity and is satisfactorily chargeable.

Negative Electrode [8]:

According to the invention, a lithium secondary battery having both satisfactory cycle characteristics and a satisfactory low-temperature output can be provided.

Negative Electrodes [9] and [10]:

According to the invention, a lithium secondary battery can be provided which, even when fabricated so as to have a larger size, has a high capacity retention through cycling and can attain a satisfactory battery life, and which can attain a high output even after a charge/discharge cycle test. This battery has both of these properties.

Electrolytic Solution [1]:

According to the invention, the low-temperature characteristics of a nonaqueous-electrolyte secondary battery can be greatly improved. More specifically, the low-temperature characteristics can be improved without impairing cycle characteristics and storability.

Electrolytic Solution [2]:

According to the invention, a nonaqueous electrolyte for secondary battery greatly improved in both cycle characteristics and low-temperature characteristics and a secondary battery which employs this nonaqueous electrolyte and is excellent in these performances can be provided.

Electrolytic Solution [3]:

According to the invention, a nonaqueous electrolyte for secondary battery greatly improved in low-temperature output characteristics and a secondary battery having such performances can be provided.

Electrolytic Solution [4]:

According to the invention, a nonaqueous electrolyte for secondary battery can be provided which has an electrolyte composition less apt to pose problems associated with the incorporation of a large amount of a low-viscosity solvent, such as the problem that salt precipitation, a decrease in flash point, and an increase in internal pressure at high temperatures are apt to occur due to solvent vaporization, and which, despite this, enables high low-temperature characteristics and high output characteristics to be retained. A secondary battery having such performances can also be provided.

Electrolytic Solution [5]:

According to the invention, a nonaqueous electrolyte for secondary battery which greatly improves output characteristics and brings about excellent high-temperature storability and excellent cycle characteristics and a secondary battery having such performances can be provided.

Electrolytic Solution [6]:

According to the invention, a nonaqueous electrolyte for secondary battery excellent in high-temperature storability and cycle characteristics and greatly improved in output characteristics can be provided.

Electrolytic Solution [7]:

According to the invention, a secondary battery greatly improved in both cycle characteristics and low-temperature characteristics can be provided.

Electrolytic Solution [8]:

According to the invention, a nonaqueous electrolyte for secondary battery greatly improved in low-temperature discharge characteristics and excellent in high-temperature storability and cycle characteristics and a secondary battery having such performances can be provide.

Electrolytic Solution [9]:

According to the invention, a secondary battery satisfying both of high rate characteristics and safety in overcharge can be provided.

Structures [1] to [5]:

According to the invention, a lithium secondary battery which has a high capacity, long life, and high output and is highly safe in overcharge is obtained. Consequently, a lithium secondary battery especially suitable for use as a large battery in applications such as, e.g., motor vehicles can be provided.

Structure [6]

According to the invention, a lithium secondary battery which has a high capacity, long life, and high output, is reduced in gas evolution, and is highly safe in overcharge is obtained. Consequently, a lithium secondary battery especially suitable for use as a large battery in applications such as, e.g., motor vehicles can be provided.

BEST MODE FOR CARRYING OUT THE INVENTION

Figure 1A:
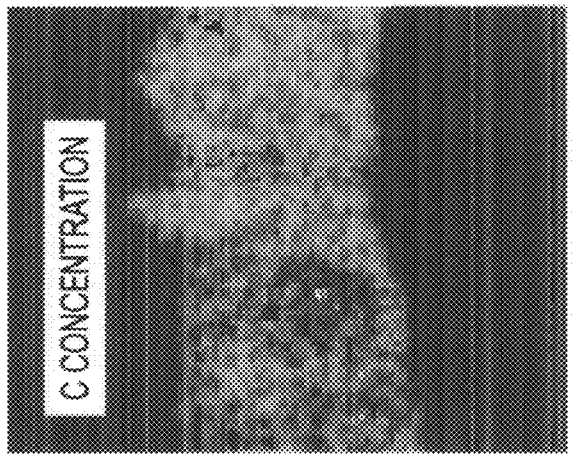
FIG. 1(A) shows a SEM of the thin film negative electrode produced in Negative Electrode Production 1.

Embodiments of the invention will be explained below in detail. The following explanations on constituent elements are for embodiments (typical embodiments) of the invention, and should not be construed as limiting the invention unless they depart from the spirit of the invention.

The lithium secondary batteries of the invention each are a lithium secondary battery which comprises an electrode group constituted at least of a positive electrode, a negative electrode, and a microporous separator interposed between the electrodes and a nonaqueous electrolyte comprising a nonaqueous solvent and one or more lithium salts contained therein, the electrode group and the nonaqueous electrolyte being held in a battery case, and in which the positive electrode and the negative electrode each comprise a current collector and, formed thereon, an active-material layer containing an active material capable of occluding/releasing lithium ions, the nonaqueous electrolyte is a nonaqueous electrolyte which contains at least one compound selected from the group consisting of cyclic siloxane compounds represented by general formula (1) given above, fluorosilane compounds represented by general formula (2) given above, compounds represented by general formula (3) given above, compounds having an S—F bond in the molecule, nitric acid salts, nitrous acid salts, monofluorophosphoric acid salts, difluorophosphoric acid salts, acetic acid salts, and propionic acid salts (hereinafter, these compounds are often abbreviated to "specific compounds") in an amount of 10 ppm or more of the whole nonaqueous electrolyte, and the positive electrode, negative electrode, electrolyte, or battery constitution satisfies a specific requirement.

The lithium secondary batteries of the invention will be explained below in detail.
<Positive Electrode>

The positive electrode for use in the lithium secondary batteries of the invention is explained below.

The positive electrode for use in the invention is not particularly limited as long as it has an active-material layer containing an active material capable of occluding and releasing lithium ions. However, it preferably is any positive electrode selected from the group consisting of the following positive electrode [1] to positive electrode [5]: positive electrode [1]: a positive electrode containing a positive-electrode active material containing manganese; positive electrode [2]: a positive electrode containing a positive-electrode active material having a composition represented by the following composition formula (4):

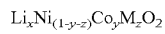
$$Li_xNi_{(1-y-z)}Co_yM_zO_2 \qquad \text{composition formula (4)}$$

[wherein M represents at least one element selected from the group consisting of Mn, Al, Fe, Ti, Mg, Cr, Ga, Cu, Zn, and Nb; x represents a number satisfying $0<x\le1.2$; y represents a number satisfying $0.05\le y\le0.5$; and z represents a number satisfying $0.01\le z\le0.5$];

positive electrode [3]: a positive electrode containing a positive-electrode active material selected from the group consisting of the following (a) to (d):
  (a) a positive-electrode active material having a BET specific surface area of from 0.4 m²/g to 2 m²/g,
  (b) a positive-electrode active material having an average primary-particle diameter of from 0.1 μm to 2 μm,
  (c) a positive-electrode active material having a median diameter $d_{50}$ of from 1 μm to 20 μm,
  (d) a positive-electrode active material having a tap density of from 1.3 g/cm³ to 2.7 g/cm³;

positive electrode [4]: a positive electrode satisfying any requirement selected from the group consisting of the following (e) to (f):
  (e) it is a positive electrode produced by forming a positive-electrode active-material layer comprising a positive-electrode active material, a conductive material, and a binder on a current collector, wherein the content of the conductive material in the positive-electrode active-material layer is in the range of from 6% by mass to 20% by mass,
  (f) it is a positive electrode produced by forming a positive-electrode active-material layer comprising a positive-electrode active material and a binder on a current collector, wherein the positive-electrode active-material layer has a density in the range of from 1.7 g/cm³ to 3.5 g/cm³,
  (g) it is a positive electrode produced by forming a positive-electrode active-material layer comprising a positive-electrode active material and a binder on a current collector, wherein the ratio of the thickness of the positive-electrode active-material layer to the thickness of the current collector, i.e., the value of (thickness of the active-material layer on one side just before impregnation with the nonaqueous electrolyte)/(thickness of the current collector), is in the range of from 1.6 to 20; and positive electrode [5]: a positive electrode containing two or more positive-electrode active materials differing in composition.

Positive electrodes which are usually employed in the lithium secondary batteries of the invention will be first explained below.
[Positive-Electrode Active Material]

The positive-electrode active material for general use in the positive electrodes will be described below.
[[Composition]]

The positive-electrode active material is not particularly limited as long as it is capable of electrochemically occluding/releasing lithium ions. It preferably is a substance containing lithium and at least one transition metal. Examples thereof include lithium-transition metal composite oxides and lithium-containing transition metal/phosphoric acid compounds.

The transition metal in the lithium-transition metal composite oxides preferably is V, Ti, Cr, Mn, Fe, Co, Ni, Cu, or the like. Specific examples of the composite oxides include lithium-cobalt composite oxides such as $LiCoO_2$, lithium-nickel composite oxides such as $LiNiO_2$, lithium-manganese composite oxides such as $LiMnO_2$, $LiMn_2O_4$, and $Li_2MnO_3$, and ones formed by partly replacing the transition metal atom(s) as a main component of these lithium-transition metal composite oxides by one or more other metals, e.g., Al, Ti, V, Cr, Mn, Fe, Co, Li, Ni, Cu, Zn, Mg, Ga, Zr, Si, etc. Examples of such compounds formed by replacement include $LiNi_{0.5}Mn_{0.5}O_2$, $LiNi_{0.85}Co_{0.10}Al_{0.05}O_2$, $LiNi_{0.33}Co_{0.33}Mn_{0.33}O_2$, $LiMn_{1.8}Al_{0.2}O_4$, and $LiMn_{1.5}Ni_{0.5}O_4$.

The transition metal in the lithium-containing transition metal/phosphoric acid compounds preferably is V, Ti, Cr, Mn, Fe, Co, Ni, Cu, or the like. Specific examples of the compounds include iron phosphate compounds such as $LiFePO_4$, $Li_3Fe_2(PO_4)_3$, and $LiFeP_2O_7$, cobalt phosphate compounds such as $LiCoPO_4$, and ones formed by partly replacing the transition metal atom(s) as a main component of these lithium-transition metal/phosphoric acid compounds by one or more other metals, e.g., Al, Ti, V, Cr, Mn, Fe, Co, Li, Ni, Cu, Zn, Mg, Ga, Zr, Nb, Si, etc.

[[Surface Coating]]

It is preferred to use a material comprising any of those positive-electrode active materials and, adherent to the surface thereof, a substance having a composition different from that of the core positive-electrode active material. Examples of the substance to be adhered to the surface (hereinafter abbreviated to "surface-adherent substance") include oxides such as aluminum oxide, silicon oxide, titanium oxide, zirconium oxide, magnesium oxide, calcium oxide, boron oxide, antimony oxide, and bismuth oxide, sulfates such as lithium sulfate, sodium sulfate, potassium sulfate, magnesium sulfate, calcium sulfate, and aluminum sulfate, and carbonates such as lithium carbonate, calcium carbonate, and magnesium carbonate.

Those surface-adherent substances each can be adhered to the surface of a positive-electrode active material, for example, by: a method in which the substance is dissolved or suspended in a solvent and this solution or suspension is infiltrated into a positive-electrode active material and dried; a method in which a precursor for the surface-adherent substance is dissolved or suspended in a solvent and this solution or suspension is infiltrated into a positive-electrode active material and then heated or otherwise treated to react the precursor; or a method in which the substance is added to a precursor for a positive-electrode active material and heat-treated together with the precursor.

The amount of the surface-adherent substance to be used may be as follows. The lower limit thereof is preferably 0.1 ppm or larger, more preferably 1 ppm or larger, even more preferably 10 ppm or larger, in terms of mass ppm of the positive-electrode active material. The upper limit thereof is preferably 20% or smaller, more preferably 10% or smaller, even more preferably 5% or smaller, in terms of % by mass based on the positive-electrode active material. The surface-adherent substance serves to inhibit the nonaqueous electrolyte from undergoing an oxidation reaction on the surface of the positive-electrode active material, whereby the battery life can be improved. However, in case where the amount of the substance adhered is too small, that effect is not sufficiently produced. On the other hand, too large amounts thereof may result in an increase in resistance because the surface-adherent substance inhibits the occlusion/release of lithium ions.

[[Shape]]

The particle shape of the positive-electrode active material to be used in the invention may be any of massive, polyhedral, spherical, ellipsoidal, platy, acicular, columnar, and other shapes such as those in common use. Preferred of these is one in which the primary particles have aggregated to form secondary particles and these secondary particles have a spherical or ellipsoidal shape. In electrochemical elements, the active material in each electrode usually expands/contracts with the charge/discharge of the element and, hence, deterioration is apt to occur, such as active-material breakage and conduction path breakage, due to the stress caused by the expansion/contraction. Because of this, a positive-electrode active material in which the primary particles have aggregated to form secondary particles is preferable to an active material composed of primary particles only since the particles in the former active material relieve the stress caused by expansion/contraction to prevent deterioration. Furthermore, particles of a spherical or ellipsoidal shape are preferable to particles showing axial orientation, e.g., platy ones, because the former particles are less apt to orient during electrode molding and hence this electrode is reduced in expansion/contraction during charge/discharge, and because these particles are apt to be evenly mixed with a conductive material in electrode production.

[[Tap Density]]

The tap density of the positive-electrode active material is generally 1.3 $g/cm^3$ or higher, preferably 1.5 $g/cm^3$ or higher, more preferably 1.6 $g/cm^3$ or higher, most preferably 1.7 $g/cm^3$ or higher. When the tap density of the positive-electrode active material is lower than the lower limit, there are cases where it is necessary to use a larger amount of a dispersion medium and larger amounts of a conductive material and a binder in forming a positive-electrode active-material layer and this results in a limited loading of the positive-electrode active material in the positive-electrode active-material layer and a limited battery capacity. By employing a composite oxide powder having a high tap density, a positive-electrode active-material layer having a high density can be formed. The higher the tap density, the more the positive-electrode active material is generally preferred. Although there is no particular upper limit thereon, too high tap densities may result in cases where the diffusion of lithium ions in the positive-electrode active-material layer through the nonaqueous electrolyte as a medium becomes a rate-determining stage and this is apt to reduce load characteristics. Consequently, the tap density of the positive-electrode active material is generally 2.9 $g/cm^3$ or lower, preferably 2.7 $g/cm^3$ or lower, more preferably 2.5 $g/cm^3$ or lower.

In the invention, the tap density of a sample is determined by dropping the sample through a sieve having an opening size of 300 μm into a 20-$cm^3$ tapping cell to fill the capacity of the cell with the sample, subsequently conducting tapping operations 1,000 times over a stroke length of 10 mm using a powder densimeter (e.g., Tap Denser, manufactured by Seishin Enterprise Co., Ltd.), and determining a density from the resultant volume of the sample and the weight thereof. This density is defined as the tap density.

[[Median Diameter $d_{50}$]]

The median diameter $d_{50}$ (secondary-particle diameter in the case where the primary particles have aggregated to form secondary particles) of the particles of the positive-electrode active material is generally 0.1 μm or larger, preferably 0.5 μm or larger, more preferably 1 μm or larger, most preferably 3 μm or larger. The upper limit thereof is generally 20 μm or smaller, preferably 18 μm or smaller, more preferably 16 μm or smaller, most preferably 15 μm or smaller. When the median diameter thereof is smaller than the lower limit, there are cases where a product having a high tap density cannot be obtained. When the median diameter thereof exceeds the upper limit, lithium diffusion in the individual particles requires a longer time and this results in a decrease in battery performance. In addition, there are cases where such positive-electrode active-material particles, when used in producing a positive electrode for batteries, i.e., when the active material and other ingredients including a conductive material and a binder are slurried with a solvent and this slurry is applied in a thin-film form, pose a problem, for example, that streak lines generate. It is possible to further improve loading in positive-electrode production by mixing two or more positive-electrode active materials differing in median diameter $d_{50}$.

Median diameter $d_{50}$ in the invention is determined with a known laser diffraction/scattering type particle size distribution analyzer. In the case where LA-920, manufactured by HORIBA, Ltd., is used as a particle size distribution analyzer, a 0.1% by mass aqueous solution of sodium hexametaphosphate is used as a dispersion medium for the examination and a five-minute ultrasonic dispersing treatment is conducted before the particles are examined at a measuring refractive index set at 1.24.

[[Average Primary-Particle Diameter]]

In the case where the primary particles have aggregated to form secondary particles, the average primary-particle diameter of this positive-electrode active material is generally 0.01 μm or larger, preferably 0.05 μm or larger, more preferably 0.08 μm or larger, most preferably 0.1 μm or larger, and is generally 3 μm or smaller, preferably 2 μm or smaller, more preferably 1 μm or smaller, most preferably 0.6 μm or smaller. In case where the average primary-particle diameter thereof exceeds the upper limit, spherical secondary particles are difficult to form and this adversely influences powder loading or results in a considerably reduced specific surface area. There may hence be a high possibility that battery performances such as output characteristics might decrease. Conversely, when the average primary-particle diameter thereof is smaller than the lower limit, crystal growth is usually insufficient and, hence, there are cases where this positive-electrode active material poses a problem, for example, that charge/discharge reversibility is poor.

Primary-particle diameter is determined through an examination with a scanning electron microscope (SEM). Specifically, arbitrarily selected 50 primary-particle images in a photograph having a magnification of 10,000 diameters each are examined for the length of the longest segment of a horizontal line which extends across the primary-particle image from one side to the other side of the boundary. These measured lengths are averaged, whereby the average value can be determined.

[[BET Specific Surface Area]]

The BET specific surface area of the positive-electrode active material to be used in the lithium secondary batteries of the invention is generally 0.2 m$^2$/g or larger, preferably 0.3 m$^2$/g or larger, more preferably 0.4 m$^2$/g or larger. The upper limit thereof is generally 4.0 m$^2$/g or smaller, preferably 2.5 m$^2$/g or smaller, more preferably 1.5 m$^2$/g or smaller. In case where the BET specific surface area thereof is smaller than the lower limit of that range, battery performances are apt to decrease. In case where the BET specific surface area thereof exceeds the upper limit, a high tap density is difficult to obtain and this may pose a problem concerning applicability in forming a positive-electrode active material.

BET specific surface area is measured with a surface area meter (e.g., a fully automatic surface area measuring apparatus manufactured by Ohukura Riken Co., Ltd.). The specific surface area is defined as a value obtained by preliminarily drying a sample at 150° C. for 30 minutes in a nitrogen stream and then measuring the specific surface area thereof by the gas-flowing nitrogen adsorption BET one-point method using a nitrogen/helium mixture gas precisely regulated so as to have a nitrogen pressure of 0.3 relative to atmosphere pressure.

[[Production Processes]]

For producing the positive-electrode active material, processes in general use for producing inorganic compounds may be employed. Especially for producing spherical or ellipsoidal active materials, various techniques are usable. Examples thereof include: a method which comprises dissolving or pulverizing/dispersing a transition metal source, e.g., a transition metal nitrate or transition metal sulfate, optionally together with a source of other element(s) in a solvent, e.g., water, regulating the pH of the solution or dispersion with stirring to produce a spherical precursor, recovering and optionally drying the precursor, subsequently adding thereto an Li source, e.g., LiOH, Li$_2$CO$_3$, or LiNO$_3$, and heat-treating the mixture at a high temperature to obtain the active material; a method which comprises dissolving or pulverizing/dispersing a transition metal source, e.g., a transition metal nitrate, transition metal sulfate, transition metal hydroxide, or transition metal oxide, optionally together with a source of other element(s) in a solvent, e.g., water, drying and forming the solution or dispersion with a spray dryer or the like to obtain a spherical or ellipsoidal precursor, adding thereto an Li source, e.g., LiOH, Li$_2$CO$_3$, or LiNO$_3$, and heat-treating the mixture at a high temperature to obtain the active material; and a method which comprises dissolving or pulverizing/dispersing a transition metal source, e.g., a transition metal nitrate, transition metal sulfate, transition metal hydroxide, or transition metal oxide, together with an Li source, e.g., LiOH, Li$_2$CO$_3$, or LiNO$_3$, and optionally with a source of other element(s) in a solvent, e.g., water, drying and forming the solution or dispersion with a spray dryer or the like to obtain a spherical or ellipsoidal precursor, and heat-treating the precursor at a high temperature to obtain the active material.

[Constitution of Positive Electrode]

The constitution of the positive electrode to be used in the invention will be described below.

[[Electrode Structure and Production Process]]

The positive electrode to be used in the lithium secondary batteries of the invention is produced by forming a positive-electrode active-material layer comprising a positive-electrode active material and a binder on a current collector. The production of the positive electrode with a positive-electrode active material can be conducted in an ordinary manner. Namely, a positive-electrode active material and a binder are mixed together by a dry process optionally together with a conductive material, thickener, etc. and this mixture is formed into a sheet and press-bonded to a positive-electrode current collector. Alternatively, those materials are dissolved or dispersed in a liquid medium to obtain a slurry and this slurry is applied to a positive-electrode current collector and dried. Thus, a positive-electrode active-material layer is formed on the current collector, whereby the positive electrode can be obtained.

The content of the positive-electrode active material in the positive-electrode active-material layer in the invention is generally 10% by mass or higher, preferably 30% by mass or higher, especially preferably 50% by mass or higher. The upper limit thereof is generally 99.9% by mass or lower, preferably 99% by mass or lower. When the content of the positive-electrode active-material particles in the positive-electrode active-material layer is too low, there are cases where an insufficient electrical capacity results. Conversely, when the content thereof is too high, there are cases where the positive electrode has an insufficient strength. One positive-electrode active material may be used alone, or any desired combination of two or more positive-electrode active materials differing in composition or powder properties may be used in any desired proportion.

[[Compaction]]

It is preferred that the positive-electrode active-material layer obtained by coating fluid application and drying should be compacted with a handpress, roller press, or the like in order to heighten the loading density of the positive-electrode active material. The lower limit of the density of the positive-electrode active-material layer is preferably 1 g/cm$^3$ or higher, more preferably 1.5 g/cm$^3$ or higher, even more preferably 2 g/cm$^3$ or higher. The upper limit thereof is preferably 4 g/cm$^3$ or lower, more preferably 3.5 g/cm$^3$ or lower, even more preferably 3 g/cm$^3$ or lower. When the density thereof exceeds the upper limit of that range, the infiltration of a nonaqueous electrolyte into around the current collector/active material interface becomes insufficient and there are cases where charge/discharge characteristics especially at a high current density decrease. When the density thereof is lower than the lower limit, there are cases where electrical conductivity among the active-material particles decreases to increase battery resistance.

[[Conductive Material]]

As the conductive material, a known conductive material can be used at will. Examples thereof include metallic materials such as copper and nickel; graphites such as natural graphites and artificial graphites; carbon blacks such as acetylene black; and carbon materials such as amorphous carbon, e.g., needle coke. One of these materials may be used alone, or any desired combination of two or more thereof in any desired proportion may be used.

The conductive material may be used so that it is incorporated in the positive-electrode active-material layer in an amount of generally 0.01% by mass or larger, preferably 0.1% by mass or larger, more preferably 1% by mass or larger, and that the upper limit of the content thereof is generally 50% by mass or lower, preferably 30% by mass or lower, more preferably 15% by mass or lower. When the content thereof is lower than the lower limit of that range, there are cases where electrical conductivity becomes insufficient. Conversely, when the content thereof exceeds the upper limit of that range, there are cases where battery capacity decreases.

[[Binder]]

The binder to be used for producing the positive-electrode active-material layer is not particularly limited. In the case where the layer is to be formed through coating fluid application, any binder may be used as long as it is a material which is soluble or dispersible in the liquid medium for use in electrode production. Examples thereof include resinous polymers such as polyethylene, polypropylene, poly(ethylene terephthalate), poly(methyl methacrylate), aromatic polyamides, cellulose, and nitrocellulose; rubbery polymers such as SBR (styrene/butadiene rubbers), NBR (acrylonitrile/butadiene rubbers), fluororubbers, isoprene rubbers, butadiene rubbers, and ethylene/propylene rubbers; thermoplastic elastomeric polymers such as styrene/butadiene/styrene block copolymers or products of hydrogenation thereof, EPDM (ethylene/propylene/diene terpolymers), styrene/ethylene/butadiene/ethylenecopolymers, and styrene/isoprene/styrene block copolymers or products of hydrogenation thereof; flexible resinous polymers such as syndiotactic 1,2-polybutadiene, poly(vinyl acetate), ethylene/vinyl acetate copolymers, and propylene/α-olefin copolymers; fluorochemical polymers such as poly(vinylidene fluoride) (PVdF), polytetrafluoroethylene, fluorinated poly(vinylidene fluoride), and polytetrafluoroethylene/ethylene copolymers; and polymer compositions having the property of conducting alkali metal ions (especially lithium ions). One of these substances may be used alone, or any desired combination of two or more thereof in any desired proportion may be used.

The proportion of the binder in the positive-electrode active-material layer is generally 0.1% by mass or higher, preferably 1% by mass or higher, more preferably 3% by mass or higher. The upper limit thereof is generally 80% by mass or lower, preferably 60% by mass or lower, more preferably 40% by mass or lower, most preferably 10% by mass or lower. When the proportion of the binder is too low, there are cases where the positive-electrode active material cannot be sufficiently held and the positive electrode has an insufficient mechanical strength to impair battery performances such as cycle characteristics. On the other hand, too high proportions thereof may lead to a decrease in battery capacity or conductivity.

[[Liquid Medium]]

The kind of the liquid medium to be used for forming a slurry is not particularly limited as long as it is a solvent in which the positive-electrode active material, conductive material, and binder and a thickener, which is used according to need, can be dissolved or dispersed. Either an aqueous solvent or an organic solvent may be used.

Examples of the aqueous medium include water and mixed solvents comprising an alcohol and water. Examples of the organic medium include aliphatic hydrocarbons such as hexane; aromatic hydrocarbons such as benzene, toluene, xylene, and methylnaphthalene; heterocyclic compounds such as quinoline and pyridine; ketones such as acetone, methyl ethyl ketone, and cyclohexanone; esters such as methyl acetate and methyl acrylate; amines such as diethylenetriamine and N,N-dimethylaminopropylamine; ethers such as diethyl ether, propylene oxide, and tetrahydrofuran (THF); amides such as N-methylpyrrolidone (NMP), dimethylformamide, and dimethylacetamide; and aprotic polar solvents such as hexamethylphosphoramide and dimethyl sulfoxide.

Especially when an aqueous medium is used, it is preferred to use a thickener and a latex of, e.g., a styrene/butadiene rubber (SBR) to prepare a slurry. A thickener is used generally for the purpose of regulating the slurry viscosity. The thickener is not particularly limited. Examples thereof include carboxymethyl cellulose, methyl cellulose, hydroxymethyl cellulose, ethyl cellulose, poly(vinyl alcohol), oxidized starch, phosphorylated starch, casein, and salts of these. One of these thickeners may be used alone, or any desired combination of two or more thereof in any desired proportion may be used. In the case where such a thickener is further added, the proportion of the thickener to the active material is generally 0.1% by mass or higher, preferably 0.5% by mass or higher, more preferably 0.6% by mass or higher. The upper limit thereof is generally 5% by mass or lower, preferably 3% by mass or lower, more preferably 2% by mass or lower. When the proportion thereof is lower than the lower limit of that range, there are cases where applicability decreases considerably. Proportions thereof exceeding the upper limit result in a reduced proportion of the active material in the positive-electrode active-material layer, and this may pose a problem that battery capacity decreases and a problem that resistance among the particles of the positive-electrode active material increases.

[[Current Collector]]

The material of the positive-electrode current collector is not particularly limited, and a known one can be used at will. Examples thereof include metallic materials such as aluminum, stainless steel, nickel-plated materials, titanium, and tantalum; and carbon materials such as carbon cloths and carbon papers. Of these, metallic materials are preferred. Especially preferred is aluminum.

In the case of a metallic material, examples of the shape of the current collector include metal foils, metal cylinders, metal coils, metal plates, thin metal films, expanded metals, punching metals, and metal foams. In the case of a carbon material, examples of the collector shape include carbon plates, thin carbon films, and carbon cylinders. Of these, a thin metal film is preferred. The thin film may be in a suitable mesh form. Although the thin film may have any desired thickness, the thickness thereof is generally 1 μm or larger, preferably 3 μm or larger, more preferably 5 μm or larger, and is generally 1 mm or smaller, preferably 100 μm or smaller, more preferably 50 μm or smaller. When the thin film is thinner than the lower limit of that range, there are cases where this film is deficient in strength required of a current collector. Conversely, when the thin film is thicker than the upper limit of that range, there are cases where this film has impaired handleability.

The thickness ratio between the current collector and the positive-electrode active-material layer is not particularly limited. However, the value of (thickness of the active-material layer on one side just before impregnation with the nonaqueous electrolyte)/(thickness of the current collector) is preferably 150 or smaller, more preferably 20 or smaller, most preferably 10 or smaller. The lower limit thereof is preferably 0.1 or larger, more preferably 0.4 or larger, most preferably 1 or larger. When that ratio exceeds the upper limit of that range, there are cases where this current collector heats up due to Joule's heat during high-current-density charge/discharge. When that ratio decreases beyond the lower limit of that range, the proportion by volume of the current collector to the positive-electrode active material increases and this may reduce the capacity of the battery.

[[Electrode Area]]

When the nonaqueous electrolyte of the invention is used, it is preferred that the area of the positive-electrode active-material layer relative to the outer surface area of the battery case should be large from the standpoint of attaining a high output and enhanced high-temperature stability. Specifically, the overall electrode area of the positive electrode is preferably at least 15 times, more preferably at least 40 times, the surface area of the case of the secondary battery. When the battery has a bottomed polygonal shape, the term "outer surface area of the case" means a total area calculated from the length, width, and thickness dimensions of that case part packed with power-generating elements which excludes the terminal projections. When the battery has a bottomed cylindrical shape, that term means a geometric surface area obtained through the approximation to a cylinder of that case part packed with power-generating elements which excludes the terminal projections. The term "overall electrode area of the positive electrode" means the geometric surface area of the positive-electrode mix layer facing the mix layer containing a negative-electrode active material. In a structure in which a positive-electrode mix layer has been formed on each side of a current collector foil, that term means the sum of the areas separately calculated respectively for both sides.

[[Discharge Capacity]]

When the nonaqueous electrolyte for secondary battery of the invention is used, it is preferred that the battery elements held in each battery case of the secondary battery should have an electric capacity (electric capacity measured when the battery in a fully charged state is discharged to a discharged state) of 3 ampere-hours (Ah) or higher. This is because such electric capacity is highly effective in improving low-temperature discharge characteristics.

For attaining that, a positive-electrode plate is designed to have a discharge capacity as measured in discharge from a fully charged state of preferably from 3 ampere-hours (Ah) to less than 20 Ah, more preferably from 4 Ah to less than 10 Ah. When the discharge capacity thereof is lower than 3 Ah, there are cases where high-current discharge results in a large decrease in voltage due to electrode reaction resistance and hence in a poor power efficiency. When the discharge capacity thereof is 20 Ah or higher, electrode reaction resistance is low and a satisfactory power efficiency is obtained. In this case, however, the battery has a wide temperature distribution during pulse charge/discharge due to internal heat generation and has poor durability in repetitions of charge/discharge. In addition, the efficiency of heat dissipation in the case of abrupt heat generation in an abnormality, such as overcharge or internal short-circuiting, is also poor. There are hence cases where the probability that the poor heat dissipation efficiency leads to a phenomenon in which the internal pressure increases and the gas release valve works (valve working) or a phenomenon in which the battery contents are vigorously ejected outside (rupture) increases.

[[Thickness of Positive-Electrode Plate]]

The thickness of the positive-electrode plate is not particularly limited. However, from the standpoints of high capacity and high output, the thickness of the mix layer, excluding the thickness of the core metal foil, on one side of the current collector is such that the lower limit thereof is preferably 10 μm or larger, more preferably 20 μm or larger, and the upper limit thereof is preferably 200 μm or smaller, more preferably 100 μm or smaller.

<Positive Electrode [1]>

Positive electrode [1], i.e., "a positive electrode containing a positive-electrode active material containing manganese", for use in a lithium secondary battery of the invention will be explained below.

[Positive Electrode [1]: Positive-Electrode Active Material]

The positive-electrode active material for use in positive electrode [1] is described below.

[[Composition]]

The positive-electrode active material is a substance which contains one or more transition metals and is capable of electrochemically occluding/releasing lithium ions. One containing manganese as at least part of the transition metals is used in this invention. It is preferred that lithium should be further contained. More preferred is a composite oxide containing lithium and manganese.

The manganese-containing positive-electrode active material is not particularly limited. However, it preferably is one having a composition represented by the following composition formula (5):

$$Li_xMn_{(1-y)}M^1{}_yO_2 \qquad \text{composition formula (5)}$$

[wherein $M^1$ represents at least one element selected from the group consisting of Ni, Co, Al, Fe, Ti, Mg, Cr, Ga, Cu, Zn, and Nb; x represents a number satisfying 0<x≤1.2; and y represents a number satisfying 0.05≤y≤0.8].

In composition formula (5), $M^1$ especially preferably is Ni, Co, or Fe; x especially preferably satisfies 0.2≤x≤1.15; and y especially preferably satisfies 0.1≤y≤0.7. Examples of the positive-electrode active material having a composition represented by composition formula (5) include $LiMn_{0.5}Ni_{0.5}O_2$.

Especially preferred is one in which $M^1$ is Ni and which has a composition represented by the following composition formula (6):

$$Li_xMn_{(1-y-z)}Ni_yM^2_zO_2 \quad\quad \text{composition formula (6)}$$

[wherein $M^2$ represents at least one element selected from the group consisting of Co, Al, Fe, Ti, Mg, Cr, Ga, Cu, Zn, and Nb; x represents a number satisfying 0<x≤1.2; y represents a number satisfying 0.05≤y≤0.8; and z represents a number satisfying 0.01≤z≤0.5].

In composition formula (6), $M^2$ especially preferably is Co, Al, Fe, or Mg; x especially preferably satisfies 0.2≤x≤1.15; y especially preferably satisfies 0.1≤y≤0.7; z especially preferably satisfies 0.1≤z≤0.7; and y+z especially preferably satisfies 0.2≤y+z≤0.7. Examples of the positive-electrode active material having a composition represented by composition formula (6) include $LiMn_{0.33}Ni_{0.33}Co_{0.33}O_2$.

Also preferred as the manganese-containing positive-electrode active material is one having a composition represented by the following composition formula (7):

$$Li_xMn_{(2-y)}M^3_yO_4 \quad\quad \text{composition formula (7)}$$

[wherein $M^3$ represents at least one element selected from the group consisting of Ni, Co, Al, Fe, Ti, Mg, Cr, Ga, Cu, Zn, and Nb; x represents a number satisfying 0<x≤1.2; and y represents a number satisfying 0.05≤y≤0.8].

In composition formula (7), $M^3$ especially preferably is Ni, Co, Al, or Mg; x especially preferably satisfies 0.05≤x≤1.15; and y especially preferably satisfies 0.1≤y≤0.7. Examples of the positive-electrode active material having a composition represented by composition formula (7) include $LiMn_{1.8}Al_{0.2}O_4$ and $LiMn_{1.5}Ni_{0.5}O_4$.

[[Surface Coating]]

It is preferred to use an active material which comprises the manganese-containing positive-electrode active material and, adherent to the surface thereof, a substance having a composition different from that of the positive-electrode active material. The kind of the surface-adherent substance, method of adhesion, amount of the substance to be adherends, etc. are the same as those described above.

[[Shape]]

The shape of the particles of this positive-electrode active material is the same as described above.

[[Tap Density]]

The tap density of this positive-electrode active material is the same as described above.

[[Median Diameter $d_{50}$]]

The median diameter $d_{50}$ (secondary-particle diameter in the case where the primary particles have aggregated to form secondary particles) of the particles of this positive-electrode active material is the same as described above.

[[Average Primary-Particle Diameter]]

In the case where the primary particles have aggregated to form secondary particles, the average primary-particle diameter of this positive-electrode active material is the same as described above.

[[BET Specific Surface Area]]

The BET specific surface area of this positive-electrode active material is the same as described above.

[[Production Processes]]

For producing this positive-electrode active material, processes in general use for producing inorganic compounds may be employed. Especially for producing the active material which is spherical or ellipsoidal, various techniques are usable. Examples thereof include: a method which comprises dissolving or pulverizing/dispersing a manganese source, e.g., manganese nitrate or manganese sulfate, optionally together with a source of other element(s) in a solvent, e.g., water, regulating the pH of the solution or dispersion with stirring to produce a spherical precursor, recovering and optionally drying the precursor, subsequently adding thereto an Li source, e.g., LiOH, $Li_2CO_3$, or $LiNO_3$, and heat-treating the mixture at a high temperature to obtain the active material; a method which comprises dissolving or pulverizing/dispersing a manganese source, e.g., manganese nitrate, manganese sulfate, manganese oxide, or manganese oxyhydroxide, optionally together with a source of other element(s) in a solvent, e.g., water, drying and forming the solution or dispersion with a spray dryer or the like to obtain a spherical or ellipsoidal precursor, adding thereto an Li source, e.g., LiOH, $Li_2CO_3$, or $LiNO_3$, and heat-treating the mixture at a high temperature to obtain the active material; and a method which comprises dissolving or pulverizing/dispersing a manganese source, e.g., manganese nitrate, manganese sulfate, manganese oxide, or manganese oxyhydroxide, together with an Li source, e.g., LiOH, $Li_2CO_3$, or $LiNO_3$, and optionally with a source of other element(s) in a solvent, e.g., water, drying and forming the solution or dispersion with a spray dryer or the like to obtain a spherical or ellipsoidal precursor, and heat-treating the precursor at a high temperature to obtain the active material.

In the invention, the manganese-containing positive-electrode active material may be used alone as the only positive-electrode active material, or a combination of the manganese-containing positive-electrode active material with any desired one or more positive-electrode active materials differing in composition or powder properties from the manganese-containing positive-electrode active material may be used in any desired proportion. In this case, preferred examples of the combination include: a combination of the manganese-containing positive-electrode active material with $LiNiO_2$ or an active material formed by replacing part of the Ni by another transition metal; and a combination of the manganese-containing positive-electrode active material with $LiCoO_2$ or an active material formed by replacing part of the Co by another transition metal. Especially preferred examples of the combination include: a combination of the positive-electrode active material represented by any of composition formulae (5) to (7) with $LiNiO_2$ or an active material formed by replacing part of the Ni by another transition metal; and a combination of the positive-electrode active material represented by any of composition formulae (5) to (7) with $LiCoO_2$ or an active material formed by replacing part of the Co by another transition metal. The content of the manganese-containing positive-electrode active material, in particular the positive-electrode active material represented by any of composition formulae (5) to (7), is preferably 30% by mass or higher, more preferably 50% by mass or higher, based on all positive-electrode active materials. When the positive-electrode active material represented by any of composition formulae (5) to (7) is used in too small a proportion, there are cases where the cost of the positive electrode is not reduced.

[Positive Electrode [1]: Constitution of Positive Electrode]

The constitution of the positive electrode to be used as positive electrode [1] is described below.

The electrode structure, process for electrode production, compaction of a positive-electrode active-material layer, conductive material, binder for use in producing a positive-electrode active-material layer, liquid medium for slurry formation, current collector, electrode area, discharge capacity, thickness of the positive-electrode plate, etc. in positive electrode [1] are the same as described above.

<Positive Electrode [2]>

Positive electrode [2], i.e., "a positive electrode containing a positive-electrode active material having a specific composition represented by composition formula (4)", for use in a lithium secondary battery of the invention will be explained below.

[Positive Electrode [2]: Positive-Electrode Active Material]

The positive-electrode active material for use in positive electrode [2] is described below.

[[Composition]]

As the positive-electrode active material is used a substance which contains one or more transition metals and is capable of electrochemically occluding/releasing lithium ions and which has a composition represented by the following composition formula (4) (hereinafter abbreviated to "this positive-electrode active material"):

$$Li_xNi_{(1-y-z)}Co_yM_zO_2 \qquad \text{composition formula (4)}$$

[wherein M represents at least one element selected from the group consisting of Mn, Al, Fe, Ti, Mg, Cr, Ga, Cu, Zn, and Nb; x represents a number satisfying $0<x\leq1.2$; y represents a number satisfying $0.05\leq y\leq0.5$; and z represents a number satisfying $0.01\leq z\leq0.5$].

In composition formula (4), M preferably is Mn, Al, or Mg, and x preferably satisfies $0.2\leq x\leq1.15$. Symbol y preferably satisfies $0.08\leq y\leq0.4$ and especially preferably satisfies $0.1\leq y\leq0.3$. Furthermore, z preferably satisfies $0.02\leq z\leq0.4$ and especially preferably satisfies $0.03\leq z<0.3$.

[[Surface Coating]]

It is preferred to use an active material which comprises this positive-electrode active material and, adherent to the surface thereof, a substance having a composition different from that of the positive-electrode active material. The kind of the surface-adherent substance, method of adhesion, amount of the substance to be adherend, etc. are the same as those described above.

[[Shape]]

The shape of the particles of this positive-electrode active material is the same as described above.

[[Tap Density]]

The tap density of this positive-electrode active material is the same as described above.

[[Median Diameter $d_{50}$]]

The median diameter $d_{50}$ (secondary-particle diameter in the case where the primary particles have aggregated to form secondary particles) of the particles of this positive-electrode active material is the same as described above.

[[Average Primary-Particle Diameter]]

In the case where the primary particles have aggregated to form secondary particles, the average primary-particle diameter of this positive-electrode active material is the same as described above.

[[BET Specific Surface Area]]

The BET specific surface area of this positive-electrode active material is the same as described above.

[[Production Processes]]

For producing this positive-electrode active material, processes in general use for producing inorganic compounds may be employed. Especially for producing the active material which is spherical or ellipsoidal, various techniques are usable. Examples thereof include: a method which comprises dissolving or pulverizing/dispersing a nickel source, e.g., nickel nitrate or nickel sulfate, a cobalt source, e.g., cobalt nitrate or cobalt sulfate, and a source of M in composition formula (4) in a solvent, e.g., water, regulating the pH of the solution or dispersion with stirring to produce a spherical precursor, recovering and optionally drying the precursor, subsequently adding thereto an Li source, e.g., LiOH, $Li_2CO_3$, or $LiNO_3$, and heat-treating the mixture at a high temperature to obtain the active material; a method which comprises dissolving or pulverizing/dispersing a nickel source, e.g., nickel nitrate, nickel sulfate, nickel oxide, nickel hydroxide, or nickel oxyhydroxide, a cobalt source, e.g., cobalt nitrate, cobalt sulfate, cobalt oxide, cobalt hydroxide, or cobalt oxyhydroxide, and a source of M in composition formula (4) in a solvent, e.g., water, drying and forming the solution or dispersion with a spray dryer or the like to obtain a spherical or ellipsoidal precursor, adding thereto an Li source, e.g., LiOH, $Li_2CO_3$, or $LiNO_3$, and heat-treating the mixture at a high temperature to obtain the active material; and a method which comprises dissolving or pulverizing/dispersing a nickel source, e.g., nickel nitrate, nickel sulfate, nickel oxide, nickel hydroxide, or nickel oxyhydroxide, a cobalt source, e.g., cobalt nitrate, cobalt sulfate, cobalt oxide, cobalt hydroxide, or cobalt oxyhydroxide, a source of M in composition formula (4), and an Li source, e.g., LiOH, $Li_2CO_3$, or $LiNO_3$ in a solvent, e.g., water, drying and forming the solution or dispersion with a spray dryer or the like to obtain a spherical or ellipsoidal precursor, and heat-treating the precursor at a high temperature to obtain the active material.

For producing the positive electrode in this invention, this positive-electrode active material (the positive-electrode active material represented by composition formula (4) and/or the positive-electrode active material represented by composition formula (4) covered with the surface-adherent substance) may be used alone, or a combination of this positive-electrode active material with any desired one or more positive-electrode active materials differing in composition from that positive-electrode active material may be used in any desired proportion. In this case, preferred examples of the combination include: a combination of this positive-electrode active material with $LiMn_2O_4$ or an active material formed by replacing part of the Mn by another transition metal, etc.; and a combination of this positive-electrode active material with $LiCoO_2$ or an active material formed by replacing part of the Co with another transition metal, etc.

Here, the content of this positive-electrode active material is preferably 30% by mass or higher, more preferably 50% by mass or higher, based on all positive-electrode active materials. When this positive-electrode active material is used in too small a proportion, there are cases where the battery capacity decreases. Incidentally, "this positive-electrode active material" and "positive-electrode active materials other than this positive-electrode active material" are inclusively referred to as "positive-electrode active materials".

[Positive Electrode [2]: Constitution of Positive Electrode]

The constitution of the positive electrode to be used as positive electrode [2] is described below.

The electrode structure, process for electrode production, compaction of a positive-electrode active-material layer, conductive material, binder for use in producing a positive-electrode active-material layer, liquid medium for slurry formation, current collector, electrode area, discharge capacity, thickness of the positive-electrode plate, etc. in positive electrode [2] are the same as described above.

<Positive Electrode [3]>

An explanation will be given below on positive electrode [3] for use in a lithium secondary battery of the invention, i.e., "a positive electrode containing a positive-electrode active material selected from the group consisting of the following (a) to (d):

(a) a positive-electrode active material having a BET specific surface area of from 0.4 $m^2/g$ to 2 $m^2/g$,
(b) a positive-electrode active material having an average primary-particle diameter of from 0.1 μm to 2 μm,
(c) a positive-electrode active material having a median diameter $d_{50}$ of from 1 μm to 20 μm,
(d) a positive-electrode active material having a tap density of from 1.3 $g/cm^3$ to 2.7 $g/cm^3$".

[Positive Electrode [3]: Positive-Electrode Active Material]

The positive-electrode active material for use in positive electrode [3] is described below.

[[Composition]]

The positive-electrode active material is not particularly limited as long as it is a substance capable of electrochemically occluding/releasing lithium ions. It preferably is a substance containing lithium and at least one transition metal. Examples thereof include lithium-transition metal composite oxides and lithium-containing transition metal/phosphoric acid compounds. Specifically, such a compound having the same composition as described above may be used.

[[Surface Coating]]

It is also preferred that the positive-electrode active material should comprise a core positive-electrode active material and, adherent to the surface thereof, a substance having a composition different from that of the core positive-electrode active material. The kind of the surface-adherent substance, method of adhesion, amount of the substance to be adhered, etc. are the same as those described above.

[[Shape]]

The shape of the particles of this positive-electrode active material is the same as described above.

[[BET Specific Surface Area]]

The BET specific surface area of this positive-electrode active material is preferably 0.4 $m^2/g$ or larger, more preferably 0.5 $m^2/g$ or larger, even more preferably 0.6 $m^2/g$ or larger. The upper limit thereof is preferably 2 $m^2/g$ or smaller, more preferably 1.8 $m^2/g$ or smaller, even more preferably 1.5 $m^2/g$ or smaller. In case where the BET specific surface area thereof is smaller than the lower limit of that range, battery performances are apt to decrease. In case where the BET specific surface area thereof exceeds the upper limit, a high tap density is difficult to obtain and this may pose a problem concerning applicability in forming a positive-electrode active material.

BET specific surface area is measured with a surface area meter (e.g., a fully automatic surface area measuring apparatus manufactured by Ohukura Riken Co., Ltd.). The specific surface area is defined as a value obtained by preliminarily drying a sample at 150° C. for 30 minutes in a nitrogen stream and then measuring the specific surface area thereof by the gas-flowing nitrogen adsorption BET one-point method using a nitrogen/helium mixture gas precisely regulated so as to have a nitrogen pressure of 0.3 relative to atmosphere pressure.

[[Average Primary-Particle Diameter]]

In the case where the primary particles have aggregated to form secondary particles, the average primary-particle diameter of this positive-electrode active material is preferably 0.1 μm or larger, more preferably 0.2 μm or larger, even more preferably 0.3 μm or larger, most preferably 0.4 μm or larger. The upper limit thereof is preferably 2 μm or smaller, more preferably 1.6 μm or smaller, even more preferably 1.3 μm or smaller, most preferably 1 μm or smaller. In case where the average primary-particle diameter thereof exceeds the upper limit, spherical secondary particles are difficult to form and this adversely influences powder loading or results in a considerably reduced specific surface area. There may hence be a high possibility that battery performances such as output characteristics might decrease. Conversely, when the average primary-particle diameter thereof is smaller than the lower limit, crystal growth is usually insufficient and, hence, there are cases where this positive-electrode active material poses a problem, for example, that charge/discharge reversibility is poor.

Primary-particle diameter is determined through an examination with a scanning electron microscope (SEM). Specifically, arbitrarily selected 50 primary-particle images in a photograph having a magnification of 10,000 diameters each are examined for the length of the longest segment of a horizontal line which extends across the primary-particle image from one side to the other side of the boundary. These measured lengths are averaged, whereby the average value can be determined.

[[Median Diameter $d_{50}$]]

The median diameter $d_{50}$ (secondary-particle diameter in the case where the primary particles have aggregated to form secondary particles) of the particles of the positive-electrode active material is preferably 1 μm or larger, more preferably 1.2 μm or larger, even more preferably 1.5 μm or larger, most preferably 2 μm or larger. The upper limit thereof is preferably 20 μm or smaller, more preferably 18 μm or smaller, even more preferably 16 μm or smaller, most preferably 15 μm or smaller. When the median diameter thereof is smaller than the lower limit, there are cases where a product having a high tap density cannot be obtained. When the median diameter thereof exceeds the upper limit, lithium diffusion in the individual particles requires a longer time and this results in a decrease in battery performance. In addition, there are cases where such positive-electrode active-material particles, when used in producing a positive electrode for batteries, i.e., when the active material and other ingredients including a conductive material and a binder are slurried with a solvent and this slurry is applied in a thin-film form, pose a problem, for example, that streak lines generate. The positive-electrode active material for use in this invention preferably is a mixture of two or more positive-electrode active materials differing in median diameter, because this mixture of positive-electrode active materials is effective in further improving loading in positive-electrode production.

Median diameter $d_{50}$ in the invention is determined with a known laser diffraction/scattering type particle size distribution analyzer. In the case where LA-920, manufactured by HORIBA, Ltd., is used as a particle size distribution analyzer, a 0.1% by mass aqueous solution of sodium hexametaphosphate is used as a dispersion medium for the examination and a five-minute ultrasonic dispersing treatment is conducted before the particles are examined at a measuring refractive index set at 1.24.

[[Tap Density]]

The tap density of this positive-electrode active material is preferably 1.3 $g/cm^3$ or higher, more preferably 1.5 $g/cm^3$ or higher, even more preferably 1.6 $g/cm^3$ or higher, most preferably 1.7 g/cm³ or higher. When the tap density of the positive-electrode active material is lower than the lower limit, there are cases where it is necessary to use a larger amount of a dispersion medium and larger amounts of a conductive material and a binder in forming a positive-electrode active-material layer and this results in a limited loading of the positive-electrode active material in the positive-electrode active-material layer and a limited battery capacity. By employing a composite oxide powder having a high tap density, a positive-electrode active-material layer having a high density can be formed. The higher the tap density, the more the positive-electrode active material is generally preferred. Although there is no particular upper limit thereon, too high tap densities may result in cases where the diffusion of lithium ions in the positive-electrode active-material layer through the electrolyte as a medium becomes a rate-determining stage and this is apt to reduce load characteristics. Consequently, the upper limit of the tap density thereof is preferably 2.7 g/cm³ or lower, more preferably 2.5 g/cm³ or lower.

In the invention, the tap density of a sample is determined by dropping the sample through a sieve having an opening size of 300 μm into a 20-cm³ tapping cell to fill the capacity of the cell with the sample, subsequently conducting tapping operations 1,000 times over a stroke length of 10 mm using a powder densimeter (e.g., Tap Denser, manufactured by Seishin Enterprise Co., Ltd.), and determining the resultant bulk density. This bulk density is defined as the tap density.

From the standpoints of long life and high output, this positive-electrode active material for use in a lithium secondary battery of the invention especially preferably is one which simultaneously satisfies two or more of the properties described above, i.e., BET specific surface area, average primary-particle diameter, median diameter $d_{50}$, and tap density.

[[Production Processes]]

Processes usable for producing this positive-electrode active material are the same as described above.

This positive-electrode active material for use in a lithium secondary battery of the invention may be a single positive-electrode active material alone, or any desired combination of two or more positive-electrode active materials differing in composition or powder properties may be used in any desired proportion as that positive-electrode active material. Furthermore, from the standpoint of life improvement, this positive electrode in the invention preferably contains a positive-electrode active material having any one of the properties described above (this positive-electrode active material) and a positive-electrode active material differing in composition from that positive-electrode active material.

[Positive Electrode [3]: Constitution of Positive Electrode]

The constitution of the positive electrode to be used as positive electrode [3] is described below.

The electrode structure, process for electrode production, compaction of a positive-electrode active-material layer, conductive material, binder for use in producing a positive-electrode active-material layer, liquid medium for slurry formation, current collector, electrode area, discharge capacity, thickness of the positive-electrode plate, etc. in positive electrode [3] are the same as described above.

<Positive Electrode [4]>

An explanation will be given below on positive electrode [4] for use in a lithium secondary battery of the invention, i.e., "a positive electrode satisfying any requirement selected from the group consisting of the following (e) to (f):

(e) it is a positive electrode produced by forming a positive-electrode active-material layer comprising a positive-electrode active material, a conductive material, and a binder on a current collector, wherein the content of the conductive material in the positive-electrode active-material layer is in the range of from 6% by mass to 20% by mass (embodiment 1), (f) it is a positive electrode produced by forming a positive-electrode active-material layer comprising a positive-electrode active material and a binder on a current collector, wherein the positive-electrode active-material layer has a density in the range of from 1.7 g/cm³ to 3.5 g/cm³ (embodiment 2), (g) it is a positive electrode produced by forming a positive-electrode active-material layer comprising a positive-electrode active material and a binder on a current collector, wherein the ratio of the thickness of the positive-electrode active-material layer to the thickness of the current collector, i.e., the value of (thickness of the active-material layer on one side just before impregnation with the nonaqueous electrolyte)/(thickness of the current collector), is in the range of from 1.6 to 20 (embodiment 3)".

[Positive Electrode [4]: Positive-Electrode Active Material]

The positive-electrode active material for use in positive electrode [4] is described below.

This positive-electrode active material is not particularly limited as long as it is a substance capable of electrochemically occluding/releasing lithium ions. It preferably is a substance containing lithium and at least one transition metal. Examples thereof include lithium-transition metal composite oxides and lithium-containing transition metal/phosphoric acid compounds. Specifically, such a compound having the same composition as described above may be used.

The surface coating, shape, tap density, median diameter $d_{50}$, average primary-particle diameter, and BET specific surface area of this positive-electrode active material, processes for producing the active material, etc. are the same as described above.

[Positive Electrode [4]: Constitution of Positive Electrode]

The constitution of the positive electrode to be used as positive electrode [4] is described below.

[[Electrode Structure and Production Process]]

Positive electrode [4] in a lithium secondary battery of the invention is produced by forming a positive-electrode active-material layer comprising a positive-electrode active material and a binder on a current collector. The production of this positive electrode with a positive-electrode active material can be conducted in an ordinary manner. Namely, at least a positive-electrode active material and a binder are mixed together by a dry process optionally together with a conductive material (essential ingredient in embodiment 1) and optionally further with a thickener, etc. and this mixture is formed into a sheet and press-bonded to a positive-electrode current collector. Alternatively, those materials are dissolved or dispersed in a liquid medium to obtain a slurry and this slurry is applied to a positive-electrode current collector and dried. Thus, a positive-electrode active-material layer is formed on the current collector, whereby the positive electrode can be obtained.

The content of the positive-electrode active material in the positive-electrode active-material layer is preferably 80% by mass or higher, more preferably 82% by mass or higher, especially preferably 84% by mass or higher. The upper limit thereof is preferably 95% by mass or lower, more preferably 93% by mass or lower. When the content of the positive-electrode active material in the positive-electrode active-material layer is too low, there are cases where an insufficient electric capacity results. Conversely, when the content thereof is too high, there are cases where the positive electrode has an insufficient strength.

[[Conductive Material]]

As the conductive material, a known conductive material can be used at will. Examples thereof include the same conductive materials as shown above.

In this positive electrode for use in a lithium secondary battery of the invention, the content of the conductive material in the positive-electrode active-material layer in embodiment 1 should be 6% by mass or higher and is preferably 7% by mass or higher, especially preferably 8% by mass or higher, more preferably 9% by mass or higher. In embodiment 2 and embodiment 3, there are no particular limitations thereon. However, the content of the conductive material in embodiments 2 and 3 is preferably 6% by mass or higher, especially preferably 7% by mass or higher, more preferably 8% by mass or higher. When the content of the conductive material in the positive-electrode active-material layer is too low, there are cases where this positive-electrode active-material layer has insufficient electrical conductivity and a high output cannot be obtained.

The upper limit of the content of the conductive material in the positive-electrode active-material layer is as follows. In embodiment 1, the content thereof should be 20% by mass or lower and is preferably 18% by mass or lower, especially preferably 15% by mass or lower. In embodiment 2 and embodiment 3, the upper limit thereof is not particularly limited. However, the content of the conductive material in embodiments 2 and 3 is preferably 20% by mass or lower, especially preferably 18% by mass or lower, more preferably 15% by mass or lower. When the content thereof is too high, there are cases where battery capacity decreases and a high output cannot be obtained.

[[Binder]]

The binder to be used for producing the positive-electrode active-material layer is not particularly limited. In the case where the layer is to be formed through coating fluid application, any binder may be used as long as it is a material which is soluble or dispersible in the liquid medium for use in electrode production. Examples thereof include the same binders as shown above.

The proportion of the binder in the positive-electrode active-material layer is generally 0.1% by mass or higher, preferably 1% by mass or higher, especially preferably 3% by mass or higher. The upper limit thereof is generally 80% by mass or lower, preferably 60% by mass or lower, especially preferably 40% by mass or lower, more preferably 10% by mass or lower. When the proportion of the binder is too low, there are cases where the positive-electrode active material cannot be sufficiently held and the positive electrode has an insufficient mechanical strength to impair battery performances such as cycle characteristics. On the other hand, too high proportions thereof may lead to a decrease in battery capacity or conductivity.

[[Liquid Medium for Slurry Formation]]

The kind of the liquid medium to be used for forming a slurry is not particularly limited as long as it is a solvent in which the positive-electrode active material, conductive material, and binder and a thickener, which is used according to need, can be dissolved or dispersed. Either an aqueous solvent or an organic solvent may be used. Examples thereof include the same liquid media as shown above. The kind and addition amount of the thickener also are the same as described above.

[[Compaction]]

It is preferred that the positive-electrode active-material layer obtained by coating fluid application and drying should be compacted with a handpress, roller press, or the like in order to heighten the loading density of the positive-electrode active material. The density of the positive-electrode active-material layer is as follows. In embodiment 2, the lower limit thereof should be 1.7 $g/cm^3$ or higher and is preferably 2.0 $g/cm^3$ or higher, especially preferably 2.2 $g/cm^3$ or higher. In embodiment 1 and embodiment 3, there are no particular limitations. However, the lower limit thereof in embodiments 1 and 3 is preferably 1.7 $g/cm^3$ or higher, especially preferably 2.0 $g/cm^3$ or higher, more preferably 2.2 $g/cm^3$ or higher. When the density of the layer is lower than the lower limit, there are cases where conductivity among the active-material particles decreases to increase battery resistance and a high output cannot be obtained.

The upper limit of the density of the positive-electrode active-material layer, in embodiment 2, should be 3.5 $g/cm^3$ or lower and is preferably 3.0 $g/cm^3$ or lower, especially preferably 2.8 $g/cm^3$ or lower. In embodiment 1 and embodiment 3, the upper limit thereof is not particularly limited. However, the upper limit thereof in embodiments 1 and 3 is preferably 3.5 $g/cm^3$ or lower, especially preferably 3.0 $g/cm^3$ or lower, more preferably 2.8 $g/cm^3$ or lower. When the density of the positive-electrode active-material layer exceeds the upper limit of that range, the infiltration of a nonaqueous electrolyte into around the current collector/active material interface decreases and there are cases where charge/discharge characteristics especially at a high current density decrease and a high output cannot be obtained.

[[Current Collector]]

The material of the positive-electrode current collector is not particularly limited and is the same as described above. The shape of the current collector and the thickness of the thin film thereof also are the same as described above.

With respect to the ratio of the thickness of the positive-electrode active-material layer to that of the current collector, the value of (thickness of the active-material layer on one side just before impregnation with the nonaqueous electrolyte)/(thickness of the current collector) in embodiment 3 should be 20 or smaller and is preferably 15 or smaller, especially preferably 10 or smaller. In embodiment 1 and embodiment 2, that value is preferably 20 or smaller, especially preferably 15 or smaller, more preferably 10 or smaller, although there are no particular limitations thereon. When that ratio exceeds the upper limit of that range, there are cases where the current collector heats up due to Joule's heat during high-current-density charge/discharge to damage the positive electrode.

The lower limit of the value of (thickness of the active-material layer on one side just before impregnation with the nonaqueous electrolyte)/(thickness of the current collector) in embodiment 1 should be 1.6 or larger and is preferably 1.8 or larger, especially preferably 2 or larger. In embodiment 1 and embodiment 2, the lower limit thereof is preferably 1.6 or larger, especially preferably 1.8 or larger, more preferably 2 or larger, although there are no particular limitations thereon. When that ratio decreases beyond the lower limit, the proportion by volume of the current collector to the positive-electrode active material increases and there are hence cases where battery capacity decreases and a high output cannot be obtained.

When the preferred ranges of "the content of the conductive material in the positive-electrode active-material layer", "the density of the positive-electrode active-material layer", and "the ratio of the thickness of the positive-electrode active-material layer to that of the current collector, i.e., the value of (thickness of the active-material layer on one side just before impregnation with the nonaqueous electrolyte)/(thickness of the current collector)" are combined, then a more preferred high-output lithium secondary battery is obtained.

[[Electrode Area]]

When the nonaqueous electrolyte of the invention is used, it is preferred that the area of the positive-electrode active-material layer relative to the outer surface area of the battery case should be large from the standpoint of attaining a high output and enhanced high-temperature stability. The electrode area is the same as described above.

[[Discharge Capacity]]

When the nonaqueous electrolyte for secondary battery of the invention is used, it is preferred that the battery elements held in each battery case of the secondary battery should have an electric capacity (electric capacity measured when the battery in a fully charged state is discharged to a discharged state) of 3 ampere-hours (Ah) or higher. This is because such electric capacity is highly effective in improving output characteristics.

The design of a positive-electrode plate, etc. for attaining that electric capacity are the same as described above.

[[Thickness of Positive-Electrode Plate]]

The thickness of the positive-electrode plate is not particularly limited, and is the same as described above.

<Positive Electrode [5]>

Positive electrode [5] for use in a lithium secondary battery of the invention will be explained below. [Positive Electrode [5]: Positive-Electrode Active Materials]

The positive-electrode active materials for use in positive electrode [5] are described below.

[[Composition]]

The positive-electrode active materials are not particularly limited as long as these are substances capable of electrochemically occluding/releasing lithium ions. They preferably are substances containing lithium and at least one transition metal. Examples thereof include lithium-transition metal composite oxides and lithium-containing transition metal/phosphoric acid compounds.

The transition metal in the lithium-transition metal composite oxides preferably is V, Ti, Cr, Mn, Fe, Co, Ni, Cu, or the like. Specific examples of the composite oxides include lithium-cobalt composite oxides such as $LiCoO_2$, lithium-nickel composite oxides such as $LiNiO_2$, lithium-manganese composite oxides such as $LiMnO_2$, $LiMn_2O_4$, and $Li_2MnO_3$, and ones formed by partly replacing the transition metal atom(s) as a main component of these lithium-transition metal composite oxides by one or more other metals, e.g., Al, Ti, V, Cr, Mn, Fe, Co, Li, Ni, Cu, Zn, Mg, Ga, Zr, Si, etc.

The lithium-cobalt composite oxides are not particularly limited. However, one having a composition represented by the following composition formula (8) is preferred.

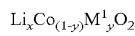      composition formula (8)

$Li_xCo_{(1-y)}M^1_yO_2$

[In composition formula (8), $M^1$ represents at least one element selected from the group consisting of Ni, Mn, Al, Fe, Ti, Mg, Cr, Ga, Cu, Zn, and Nb; x represents a number satisfying $0<x\leq1.2$; and y represents a number satisfying]

In composition formula (8), $M^1$ especially preferably is Ni, Mn, Al, or Fe; x especially preferably satisfies $0.2\leq x\leq1.15$; and y especially preferably satisfies $0.1\leq y\leq0.5$.

The lithium-nickel composite oxides are not particularly limited. However, one having a composition represented by the following composition formula (9) is preferred.

$Li_xNi_{(1-y)}M^2_yO_2$      composition formula (9)

[In composition formula (9), $M^2$ represents at least one element selected from the group consisting of Co, Mn, Al, Fe, Ti, Mg, Cr, Ga, Cu, Zn, and Nb; x represents a number satisfying $0<x\leq1.2$; and y represents a number satisfying $0.05\leq y\leq0.8$.]

In composition formula (9), $M^2$ especially preferably is Co, Mn, Al, or Fe; x especially preferably satisfies $0.2\leq x\leq1.15$; and y especially preferably satisfies $0.1\leq y\leq0.5$.

The lithium-manganese composite oxides are not particularly limited. However, one having a composition represented by the following composition formula (10) is preferred.

$Li_xMn_{(1-y)}M^3_yO_2$      composition formula (10)

[In composition formula (10), $M^3$ represents at least one element selected from the group consisting of Ni, Co, Al, Fe, Ti, Mg, Cr, Ga, Cu, Zn, and Nb; x represents a number satisfying $0<x\leq1.2$; and y represents a number satisfying $0.05\leq y\leq0.8$.]

In composition formula (10), $M^3$ especially preferably is Ni, Co, or Fe; x especially preferably satisfies $0.2\leq x\leq1.15$; and y especially preferably satisfies $0.1\leq y\leq0.7$.

Another preferred example of the lithium-manganese composite oxides is one having a composition represented by the following composition formula (11).

$Li_xMn_{(2-y)}M^4_yO_4$      composition formula (11)

[In composition formula (11), $M^4$ represents at least one element selected from the group consisting of Ni, Co, Al, Fe, Ti, Mg, Cr, Ga, Cu, Zn, and Nb; x represents a number satisfying $0<x\leq1.2$; and y represents a number satisfying $0.05\leq y\leq0.8$.]

In composition formula (11), $M^4$ especially preferably is Ni, Co, Al, or Mg; x especially preferably satisfies $0.05\leq x\leq1.15$; and y especially preferably satisfies $0.1\leq y\leq0.7$.

Still another preferred example of the lithium-manganese composite oxides is one having a composition represented by the following composition formula (12).

$Li_xMn_{(1-y)}M^5_yO_3$      composition formula (12)

[In composition formula (12), $M^5$ represents at least one element selected from the group consisting of Ni, Co, Al, Fe, Ti, Mg, Cr, Ga, Cu, Zn, and Nb; x represents a number satisfying $0<x\leq2.4$; and y represents a number satisfying $0.05\leq y\leq0.8$.]

In composition formula (12), $M^5$ especially preferably is Ni, Co, Al, or Mg; x especially preferably satisfies $0.1\leq x\leq2.3$; and y especially preferably satisfies $0.1\leq y\leq0.5$.

The transition metal in the lithium-containing transition metal/phosphoric acid compounds preferably is V, Ti, Cr, Mn, Fe, Co, Ni, Cu, or the like. Specific examples of the compounds include iron phosphate compounds such as $LiFePO_4$, $Li_3Fe_2(PO_4)_3$, and $LiFeP_2O_7$, cobalt phosphate compounds such as $LiCoPO_4$, and ones formed by partly replacing the transition metal atom(s) as a main component of these lithium-transition metal/phosphoric acid compounds by one or more other metals, e.g., Al, Ti, V, Cr, Mn, Fe, Co, Li, Ni, Cu, Zn, Mg, Ga, Zr, Nb, Si, etc.

The iron phosphate compounds are not particularly limited. However, one having a composition represented by the following composition formula (13) is preferred.

$Li_xFe_{(1-y)}M^6_yPO_4$      composition formula (13)

[In composition formula (13), $M^6$ represents at least one element selected from the group consisting of Ni, Co, Mn, Al, Ti, Mg, Cr, Ga, Cu, Zn, and Nb; x represents a number satisfying 0<x≤1.2; and y represents a number satisfying 0.05≤y≤0.8.]

In composition formula (13), $M^6$ especially preferably is Ni, Co, Mn, or Al; x especially preferably satisfies 0.2≤x≤1.15; and y especially preferably satisfies 0.1≤y≤0.5.

It is preferred in this invention that any desired combination of two or more positive-electrode active materials differing in composition selected from the positive-electrode active materials described above should be used in any desired proportion. Those positive-electrode active materials differ from each other in merit performance and, hence, it is preferred to combine necessary performances according to the intended use of the battery. It is generally thought that a combination results in arithmetic-mean performances. With respect to life, however, there are cases where effects of the positive-electrode active material having a longer life are more produced unexpectedly. By using a positive-electrode active material attaining a relatively satisfactory life in combination with a positive-electrode active material which is relatively poor in life but is satisfactory in other performances, the lithium secondary battery of the invention having a high output, high capacity, and long life could be achieved.

Examples of such preferred combinations include:
a positive-electrode active material represented by composition formula (8) and a positive-electrode active material represented by composition formula (10);
a positive-electrode active material represented by composition formula (8) and a positive-electrode active material represented by composition formula (11);
a positive-electrode active material represented by composition formula (8) and a positive-electrode active material represented by composition formula (12);
a positive-electrode active material represented by composition formula (8) and a positive-electrode active material represented by composition formula (13);
a positive-electrode active material represented by composition formula (9) and a positive-electrode active material represented by composition formula (10);
a positive-electrode active material represented by composition formula (9) and a positive-electrode active material represented by composition formula (11);
a positive-electrode active material represented by composition formula (9) and a positive-electrode active material represented by composition formula (12);
a positive-electrode active material represented by composition formula (9) and a positive-electrode active material represented by composition formula (13);
a positive-electrode active material represented by composition formula (10) and a positive-electrode active material represented by composition formula (11);
a positive-electrode active material represented by composition formula (10) and a positive-electrode active material represented by composition formula (12); and
a positive-electrode active material represented by composition formula (10) and a positive-electrode active material represented by composition formula (13).

Especially preferred are:
a positive-electrode active material represented by composition formula (9) and a positive-electrode active material represented by composition formula (11); and
a positive-electrode active material represented by composition formula (10) and a positive-electrode active material represented by composition formula (11).

The proportion in each combination is not particularly limited. However, it is preferably from 10:90 to 90:10, more preferably from 20:80 to 80:20.

Although two or more positive-electrode active materials differing in composition are contained in the positive electrode for use in the lithium secondary battery of this invention, it is preferred that at least one of these positive-electrode active materials should be one whose BET specific surface area, average primary-particle diameter, median diameter $d_{50}$, and/or tap density (hereinafter abbreviated to "following properties") is within the following specific range. The two or more positive-electrode active materials differing in composition may include a positive-electrode active material in which any property is not within the range shown below. It is, however, preferred that all of the two or more positive-electrode active materials should be ones in each of which any property is within the range shown below. The proportion of "all positive-electrode active materials in each of which any of the following properties is within the specific range shown below" to "all positive-electrode active materials contained in the positive electrode" depends on that property and is not particularly limited. However, that proportion is preferably 30% by mass or higher, more preferably 50% by mass or higher. Especially preferably, the former positive-electrode active materials account for the whole of the latter. It is preferred that each of the two or more positive-electrode active materials contained in the positive electrode should be one in which any one or more of the following properties are within the specific range (s) shown below. However, more preferably any two or more of, especially preferably any three or more of, most preferably all of the following properties of each positive-electrode active material are within the specific ranges shown below.

[[BET Specific Surface Area]]

The BET specific surface area of at least one of the positive-electrode active materials is preferably 0.4 $m^2/g$ or larger, more preferably 0.5 $m^2/g$ or larger, even more preferably 0.6 $m^2/g$ or larger. The upper limit thereof is 2 $m^2/g$ or smaller, preferably 1.8 $m^2/g$ or smaller, more preferably 1.5 $m^2/g$ or smaller. In case where the BET specific surface area thereof is smaller than the lower limit of that range, battery performances are apt to decrease. In case where the BET specific surface area thereof exceeds the upper limit, a high tap density is difficult to obtain and this may pose a problem concerning applicability in forming a positive-electrode active material.

BET specific surface area is measured with a surface area meter (e.g., a fully automatic surface area measuring apparatus manufactured by Ohukura Riken Co., Ltd.). The specific surface area is defined as a value obtained by preliminarily drying a sample at 150° C. for 30 minutes in a nitrogen stream and then measuring the specific surface area thereof by the gas-flowing nitrogen adsorption BET one-point method using a nitrogen/helium mixture gas precisely regulated so as to have a nitrogen pressure of 0.3 relative to atmosphere pressure.

[[Average Primary-Particle Diameter]]

The average primary-particle diameter of at least one of the positive-electrode active materials is preferably 0.1 μm or larger, more preferably 0.2 μm or larger, even more preferably 0.3 μm or larger, most preferably 0.4 μm or larger. The upper limit thereof is preferably 2 μm or smaller, more preferably 1.6 μm or smaller, even more preferably 1.3 μm or smaller, most preferably 1 μm or smaller. In case where the average primary-particle diameter thereof exceeds the upper limit, spherical secondary particles are difficult to form and this adversely influences powder loading or results in a considerably reduced specific surface area. There may hence be a high possibility that battery performances such as output characteristics might decrease. Conversely, when the average primary-particle diameter thereof is smaller than the lower limit, crystal growth is usually insufficient and, hence, there are cases where this positive-electrode active material poses a problem, for example, that charge/discharge reversibility is poor.

Primary-particle diameter is determined through an examination with a scanning electron microscope (SEM). Specifically, arbitrarily selected 50 primary-particle images in a photograph having a magnification of 10,000 diameters each are examined for the length of the longest segment of a horizontal line which extends across the primary-particle image from one side to the other side of the boundary. These measured lengths are averaged, whereby the average value can be determined. There are cases where the primary particles have aggregated to form secondary particles. In such cases, however, the measurement is made only on primary particles.

[[Median Diameter $d_{50}$]]

The median diameter $d_{50}$ (secondary-particle diameter in the case where the primary particles have aggregated to form secondary particles) of the particles of at least one of the positive-electrode active materials is preferably 1 μm or larger, more preferably 1.2 μm or larger, even more preferably 1.5 μm or larger, most preferably 2 μm or larger. The upper limit thereof is preferably 20 μm or smaller, more preferably 18 μm or smaller, even more preferably 16 μm or smaller, most preferably 15 μm or smaller. When the median diameter thereof is smaller than the lower limit, there are cases where a product having a high tap density cannot be obtained. When the median diameter thereof exceeds the upper limit, lithium diffusion in the individual particles requires a longer time and this results in a decrease in battery performance. In addition, there are cases where such positive-electrode active-material particles, when used in producing a positive electrode for batteries, i.e., when the active material and other ingredients including a conductive material and a binder are slurried with a solvent and this slurry is applied in a thin-film form, pose a problem, for example, that streak lines generate. It is possible to further improve loading in positive-electrode production by mixing two or more positive-electrode active materials differing in median diameter $d_{50}$.

Median diameter $d_{50}$ in the invention is determined with a known laser diffraction/scattering type particle size distribution analyzer. In the case where LA-920, manufactured by HORIBA, Ltd., is used as a particle size distribution analyzer, a 0.1% by mass aqueous solution of sodium hexametaphosphate is used as a dispersion medium for the examination and a five-minute ultrasonic dispersing treatment is conducted before the particles are examined at a measuring refractive index set at 1.24.

[[[Tap Density]]]

The tap density of at least one of the positive-electrode active materials is preferably 1.3 g/cm$^3$ or higher, more preferably 1.5 g/cm$^3$ or higher, even more preferably 1.6 g/cm$^3$ or higher, most preferably 1.7 g/cm$^3$ or higher. When the tap density of the positive-electrode active material is lower than the lower limit, there are cases where it is necessary to use a larger amount of a dispersion medium and larger amounts of a conductive material and a binder in forming a positive-electrode active-material layer and this results in a limited loading of the positive-electrode active material in the positive-electrode active-material layer and a limited battery capacity. By employing a composite oxide powder having a high tap density, a positive-electrode active-material layer having a high density can be formed. The higher the tap density, the more the positive-electrode active material is generally preferred. Although there is no particular upper limit thereon, too high tap densities may result in cases where the diffusion of lithium ions in the positive-electrode active-material layer through the non-aqueous electrolyte as a medium becomes a rate-determining stage and this is apt to reduce load characteristics. Consequently, the upper limit of the tap density thereof is preferably 2.7 g/cm$^3$ or lower, more preferably 2.5 g/cm$^3$ or lower.

In the invention, the tap density of a sample is determined by dropping the sample through a sieve having an opening size of 300 μm into a 20-cm$^3$ tapping cell to fill the capacity of the cell with the sample, subsequently conducting tapping operations 1,000 times over a stroke length of 10 mm using a powder densimeter (e.g., Tap Denser, manufactured by Seishin Enterprise Co., Ltd.), and determining the resultant bulk density. This bulk density is defined as the tap density.

[[Surface Coating]]

It is preferred that at least one of the positive-electrode active materials should be one which has, adherent to the surface thereof, a substance having a composition different from that of the main positive-electrode active material or core positive-electrode active material (hereinafter, the substance adherent to the surface is abbreviated to "surface-adherent substance"). The kind of the surface-adherent substance, method of adhesion, amount of the substance to be adhered, etc. are the same as those described above.

[[Shape]]

The shape of the particles of at least one of the positive-electrode active materials is the same as any of those of positive-electrode active-material particles heretofore in use.

[[Production Processes]]

For producing the positive-electrode active materials, the same general processes for producing inorganic compounds as described above may be used.

[Positive Electrode [5]: Constitution of Positive Electrode]

The constitution of positive electrode [5] for use in this invention is described below.

The electrode structure, process for electrode production, compaction of a positive-electrode active-material layer, conductive material, binder for use in producing a positive-electrode active-material layer, liquid medium for slurry formation, current collector, electrode area, discharge capacity, thickness of the positive-electrode plate, etc. in this invention are the same as described above. In producing the positive electrode, the two or more positive-electrode active materials may be mixed beforehand or may be mixed by simultaneously adding these during positive-electrode production.

<Negative Electrode>

The negative electrode for use in the lithium secondary batteries of the invention is not particularly limited as long as it comprises a current collector and formed thereon an active-material layer containing an active material capable of occluding/releasing lithium ions. However, the negative electrode preferably is any negative electrode selected from the group consisting of the following negative electrode [1] to negative electrode [10]:

negative electrode [1]: a negative electrode containing as a negative-electrode active material two or more carbonaceous substances differing in crystallinity;

negative electrode [2]: a negative electrode containing as a negative-electrode active material at least one amorphous carbonaceous substance which, when examined by wide-angle X-ray diffractometry, has an interplanar spacing (d002) for the (002) planes of 0.337 nm or larger and a crystallite size (Lc) of 80 nm or smaller and which, in an examination by argon ion laser Raman spectroscopy, has a Raman R value defined as the ratio of the peak intensity at 1,360 $cm^{-1}$ to the peak intensity at 1,580 $cm^{-1}$ of 0.2 or higher;

negative electrode [3]: a negative electrode containing as a negative-electrode active material a titanium-containing metal oxide capable of occluding and releasing lithium;

negative electrode [4]: a negative electrode containing as a negative-electrode active material a carbonaceous substance having a roundness of 0.85 or higher and a surface functional-group amount O/C value of from 0 to 0.01;

negative electrode [5]: a negative electrode containing as a negative-electrode active material an orientation-differing-carbon composite comprising two or more carbonaceous substances differing in orientation;

negative electrode [6]: a negative electrode containing, as a negative-electrode active material, graphitic carbon particles which have a roundness of 0.85 or higher and an interplanar spacing (d002) for the (002) planes as determined by wide-angle X-ray diffractometry of smaller than 0.337 nm and which, in an examination by argon ion laser Raman spectroscopy, have a Raman R value defined as the ratio of the peak intensity at 1,360 $cm^{-1}$ to the peak intensity at 1,580 $cm^{-1}$ of from 0.12 to 0.8;

negative electrode [7]: a negative electrode containing as a negative-electrode active material a multielement-containing negative-electrode active material (C) which contains at least one of a lithium-occluding metal (A) selected from the group consisting of Al, Pb, Zn, Sn, Bi, In, Mg, Ga, Cd, Ag, Si, B, Au, Pt, Pd, and Sb and/or a lithium-occluding alloy (B) and further contains C and/or N as element Z;

negative electrode [8]: a negative electrode containing as a negative-electrode active material two or more negative-electrode active materials differing in property;

negative electrode [9]: a negative electrode containing a negative-electrode active material which has a tap density of 0.1 $g/cm^3$ or higher and has a pore volume, in terms of the volume of particle pores corresponding to the diameter range of from 0.01 μm to 1 μm as determined by mercury porosimetry, of 0.01 mL/g or larger; and negative electrode [10]: a negative electrode which, when charged to 60% of a nominal capacity, has a reaction resistance in a negative-electrode opposing cell of 500Ω or lower.

Negative electrodes which are usually employed in the lithium secondary batteries of the invention will be first explained below.

[Negative-Electrode Active Material]

The negative-electrode active material for general use in the negative electrodes will be explained below.

[[Composition]]

The negative-electrode active material is not particularly limited as long as it is capable of electrochemically occluding/releasing lithium ions. Examples thereof include a carbonaceous material, a metal oxide such as tin oxide or silicon oxide, a metal composite oxide, elemental lithium, a lithium alloy such as a lithium-aluminum alloy, and a metal capable of alloying with lithium, such as Sn or Si. One of these may be used alone, or any desired two or more thereof may be used in combination in any desired proportion. From the standpoint of safety, it is preferred to use a carbonaceous material or a lithium composite oxide among those.

The metal composite oxide is not particularly limited as long as it is capable of occluding/releasing lithium. However, from the standpoint of high-current-density charge/discharge characteristics, it is preferred that the composite oxide should contain titanium and/or lithium as a component.

The carbonaceous material preferably is one selected from:

(1) natural graphites;

(2) artificial carbonaceous substances and artificial graphitic substances; and carbon materials obtained by subjecting carbonaceous substances [e.g., natural graphites, coal coke, petroleum coke, coal pitch, petroleum pitch, carbonaceous substances obtained by oxidizing these pitches, needle coke, pitch coke, carbon materials obtained by partly graphitizing these cokes, products of the pyrolysis of organic substances, such as furnace black, acetylene black, and pitch-derived carbon fibers, organic substances capable of carbonization (e.g., coal tar pitches ranging from soft pitch to hard pitch, coal-derived heavy oil such as dry distillation/liquefaction oil, straight-run heavy oil such as topping residues and vacuum distillation residues, heavy oils resulting from petroleum cracking, such as ethylene tar as a by-product of the thermal cracking of crude oil, naphtha, etc., aromatic hydrocarbons such as acenaphthylene, decacyclene, anthracene, and phenanthrene, nitrogen-ring compounds such as phenazine and acridine, sulfur-ring compounds such as thiophene and bithiophene, polyphenylenes such as biphenyl and terphenyl, poly(vinylchloride), poly(vinylalcohol), poly (vinylbutyral), substances obtained by insolubilizing these compounds, nitrogen-containing organic polymers such as polyacrylonitrile and polypyrrole, sulfur-containing organic polymers such as polythiophene, organic polymers such as polystyrene, natural polymers such as polysaccharides represented by cellulose, lignin, mannan, poly(galacturonic acid), chitosan, and saccharose, thermoplastic resins such as poly(phenylene sulfide) and poly(phenylene oxide), and thermosetting resins such as furfuryl alcohol resins, phenol-formaldehyde resins, and imide resins) and products of the carbonization thereof, or solutions obtained by dissolving any of such organic substances capable of carbonization in a low-molecular organic solvent, e.g., benzene, toluene, xylene, quinoline, or n-hexane, and products of the carbonization of these solutions] to a heat treatment at a temperature in the range of from 400° C. to 3,200° C. one or more times;

(3) carbon materials constituting a negative-electrode active-material layer which comprise at least two carbonaceous substances differing in crystallinity and/or have an interface where at least two carbonaceous substances differing in crystallinity are in contact with each other; and (4) carbon materials constituting a negative-electrode active-material layer which comprise at least two carbonaceous substances differing in orientation and/or have an interface where at least two carbonaceous substances differing in orientation are in contact with each other. This is because this carbonaceous material brings about a satisfactory balance between initial irreversible capacity and high-current-density charge/discharge characteristics.

[Constitution of Negative Electrode, Properties, and Method of Preparation]

With respect to the properties of the carbonaceous material, negative electrode containing the carbonaceous material, method of electrode formation, current collector, and lithium secondary battery, it is desirable that any one of the following (1) to (19) should be satisfied or two or more thereof be simultaneously satisfied.

(1) X-Ray Parameter

The carbonaceous material preferably has a value of d (interplanar spacing) for the lattice planes (002), as determined by X-ray diffractometry in accordance with the method of the Japan Society for Promotion of Scientific Research, of 0.335 nm or larger. It is desirable that the upper limit of the value of d should be generally 0.36 nm or smaller, preferably 0.35 nm or smaller, more preferably 0.345 nm or smaller. The crystallite size (Lc) of the carbonaceous material, as determined by X-ray diffractometry in accordance with the method of the Japan Society for Promotion of Scientific Research, is preferably 1 nm or larger, more preferably 1.5 nm or larger.

(2) Ash Content

The ash content of the carbonaceous material may be 1% by mass or lower and is especially 0.5% by mass or lower, in particular 0.1% by mass or lower, based on the whole carbonaceous material. The lower limit of the ash content thereof is preferably at least 1 ppm by mass of the whole carbonaceous material. When the ash content thereof exceeds the upper limit of that range, there are cases where battery performance deterioration caused by reaction with the nonaqueous electrolyte during charge/discharge becomes not negligible. When the ash content thereof is lower than the lower limit of that range, there are cases where the production of this carbonaceous material necessitates much time and energy and an apparatus for pollution prevention, resulting in an increase in cost.

(3) Volume-Average Particle Diameter

With respect to the volume-average particle diameter of the carbonaceous material, the volume-average particle diameter (median diameter) thereof as determined by the laser diffraction/scattering method is generally 1 μm or larger, preferably 3 μm or larger, more preferably 5 μm or larger, even more preferably 7 μm or larger. The upper limit thereof is generally 100 μm or smaller, preferably 50 μm or smaller, more preferably 40 μm or smaller, even more preferably 30 μm or smaller, especially preferably 25 μm or smaller. When the volume-average particle diameter thereof is smaller than the lower limit of that range, there are cases where irreversible capacity increases, leading to a loss in initial battery capacity. When the volume-average particle diameter thereof exceeds the upper limit of that range, there are cases where such a carbonaceous material is undesirable from the standpoint of battery production because an uneven coating surface is apt to result when an electrode is produced through coating fluid application.

Volume-average particle diameter in the invention is defined as the median diameter determined by dispersing the carbon powder in a 0.2% by mass aqueous solution (about 10 mL) of poly(oxyethylene (20)) sorbitan monolaurate as a surfactant and examining the dispersion with a laser diffraction/scattering type particle size distribution analyzer (e.g., LA-700, manufactured by HORIBA, Ltd.).

(4) Raman R Value, Raman Half-Value Width

The R value of the carbonaceous material as determined by the argon ion laser Raman spectroscopy is generally 0.01 or higher, preferably 0.03 or higher, more preferably 0.1 or higher. The upper limit thereof may be 1.5 or lower and is preferably 1.2 or lower, more preferably 1.0 or lower, even more preferably 0.5 or lower. When the R value thereof is lower than the lower limit of that range, the surface of such particles has too high crystallinity and there are cases where the number of intercalation sites into which lithium comes with charge/discharge decreases. Namely, there are cases where suitability for charge decreases. In addition, when a coating fluid containing such a carbonaceous material is applied to a current collector and the resultant coating is pressed to heighten the density of the negative electrode, then the crystals are apt to orient in directions parallel to the electrode plate and this may lead to a decrease in load characteristics. On the other hand, when the R value thereof exceeds the upper limit of that range, the surface of such particles has reduced crystallinity and enhanced reactivity with the nonaqueous electrolyte and this may lead to a decrease in efficiency and enhanced gas evolution.

The Raman half-value width around 1,580 $cm^{-1}$ of the carbonaceous material is not particularly limited. However, the half-value width thereof is generally 10 $cm^{-1}$ or larger, preferably 15 $cm^{-1}$ or larger. The upper limit thereof is generally 100 $cm^{-1}$ or smaller, preferably 80 $cm^{-1}$ or smaller, more preferably 60 $cm^{-1}$ or smaller, even more preferably 40 $cm^{-1}$ or smaller. When the Raman half-value width thereof is smaller than the lower limit of that range, the surface of such particles has too high crystallinity and there are cases where the number of intercalation sites into which lithium comes with charge/discharge decreases. Namely, there are cases where suitability for charge decreases. In addition, when a coating fluid containing such a carbonaceous material is applied to a current collector and the resultant coating is pressed to heighten the density of the negative electrode, then the crystals are apt to orient in directions parallel to the electrode plate and this may lead to a decrease in load characteristics. On the other hand, when the Raman half-value width thereof exceeds the upper limit of that range, the surface of such particles has reduced crystallinity and enhanced reactivity with the nonaqueous electrolyte and this may lead to a decrease in efficiency and enhanced gas evolution.

The examination for a Raman spectrum is made with a Raman spectrometer (e.g., a Raman spectrometer manufactured by Japan Spectroscopic Co., Ltd.). In the examination, a sample is charged into a measuring cell by causing the sample to fall naturally into the cell and the surface of the sample in the cell is irradiated with argon ion laser light while rotating the cell in a plane perpendicular to the laser light. The Raman spectrum obtained is examined for the intensity $I_A$ of a peak $P_A$ around 1,580 $cm^{-1}$ and the intensity $I_B$ of a peak $P_B$ around 1,360 $cm^{-1}$. The ratio between these intensities R ($R=I_B/I_A$) is calculated and this ratio is defined as the Raman R value of the carbonaceous material. Furthermore, the half-value width of the peak $P_A$ around 1,580 $cm^{-1}$ in the Raman spectrum obtained is measured, and this value is defined as the Raman half-value width of the carbonaceous material.

Conditions for this Raman spectroscopy are as follows.
Wavelength of argon ion laser: 514.5 nm
Laser power on sample: 15-25 mW
Resolution: 10-20 $cm^{-1}$ Examination range: 1,100 cm$^{-1}$ to 1,730 cm$^{-1}$ Analysis for R value and half-value width: background processing Smoothing: simple average; convolution, 5 points (5) BET Specific Surface Area The specific surface area of the carbonaceous material for use in the invention, as determined by the BET method, is generally 0.1 m$^2$/g or larger, preferably 0.7 m$^2$/g or larger, more preferably 1.0 m$^2$/g or larger, even more preferably 1.5 m$^2$/g or larger. The upper limit thereof is generally 100 m$^2$/g or smaller, preferably 25 m$^2$/g or smaller, more preferably 15 m$^2$/g or smaller, even more preferably 10 m$^2$/g or smaller. When the specific surface area thereof is smaller than the lower limit of that range, there are cases where use of this carbonaceous material as a negative-electrode material is apt to result in poor lithium acceptance during charge and in lithium deposition on the electrode surface. On the other hand, when the specific surface area thereof exceeds the upper limit of that range, there are cases where use of this carbonaceous material as a negative-electrode material is apt to result in enhanced reactivity with the nonaqueous electrolyte and enhanced gas evolution and a preferred battery is difficult to obtain.

The specific surface area as determined by the BET method is a value measured with a surface area meter (e.g., a fully automatic surface area measuring apparatus manufactured by Ohukura Riken Co., Ltd.) by preliminarily drying a sample at 350° C. for 15 minutes in a nitrogen stream and then measuring the specific surface area thereof by the gas-flowing nitrogen adsorption BET one-point method using a nitrogen/helium mixture gas precisely regulated so as to have a nitrogen pressure of 0.3 relative to atmosphere pressure.

(6) Pore Diameter Distribution

With respect to the pore diameter distribution of the carbonaceous material for use in the invention, the amount of interstices corresponding to a pore diameter of from 0.01 μm to 1 μm which include pores in the particles, particle surface irregularities formed by steps, and contact surfaces among the particles, as determined by mercury porosiometry (mercury intrusion method), may be 0.01 mL/g or larger and is preferably 0.05 mL/g or larger, more preferably 0.1 mL/g or larger. The upper limit thereof may be 0.6 mL/g or smaller and is preferably 0.4 mL/g or smaller, more preferably 0.3 mL/g or smaller. When the amount of interstices therein is larger than the upper limit of that range, there are cases where a large amount of a binder is necessary in electrode plate formation. When the amount thereof is smaller than the lower limit, there are cases where high-current-density charge/discharge characteristics decrease and the effect of diminishing electrode expansion/contraction during charge/discharge is not obtained.

The total volume of pores corresponding to the pore diameter range of from 0.01 μm to 100 μm is preferably 0.1 mL/g or larger, more preferably 0.25 mL/g or larger, even more preferably 0.4 mL/g or larger. The upper limit thereof may be 10 mL/g or smaller and is preferably 5 mL/g or smaller, more preferably 2 mL/g or smaller. When the total volume thereof exceeds the upper limit of that range, there are cases where a large amount of a binder is necessary in electrode plate formation. When the total volume thereof is smaller than the lower limit, there are cases where the dispersing effect of a thickener or binder in electrode plate formation is not obtained.

The average pore diameter of the carbonaceous material is preferably 0.05 μm or larger, more preferably 0.1 μm or larger, even more preferably 0.5 μm or larger. The upper limit thereof may be 50 μm or smaller and is preferably 20 μm or smaller, more preferably 10 μm or smaller. When the average pore diameter thereof exceeds the upper limit of that range, there are cases where a large amount of a binder is necessary. When the average pore diameter thereof is smaller than the lower limit, there are cases where high-current-density charge/discharge characteristics decrease.

As an apparatus for the mercury porosimetry is used a mercury porosimeter (Autopore 9520, manufactured by Micromeritics Corp.). About 0.2 g of a sample is placed in a powder cell and this cell is closed. The sample in the cell is pretreated by degassing it at room temperature under vacuum (50 μmHg or lower) for 10 minutes. Subsequently, the pressure in the cell is reduced to 4 psia (about 28 kPa) and mercury is introduced thereinto. The internal pressure is stepwise elevated from 4 psia (about 28 kPa) to 40,000 psia (about 280 MPa) and then lowered to 25 psia (about 170 kPa). The number of steps in the pressure elevation is 80 or larger. In each step, the amount of mercury intruded is measured after an equilibrium time of 10 seconds. A pore diameter distribution is calculated from the mercury intrusion curve thus obtained, using the Washburn equation. Incidentally, the surface tension (γ) and contact angle (ψ) of mercury are taken as 485 dyne/cm and 140°, respectively. The average pore diameter used is the pore diameter corresponding to a cumulative pore volume of 50%.

(7) Roundness

Roundness is used as an index to the degree of sphericity of the carbonaceous material. The roundness of the particles having a particle diameter in the range of 3-40 μm is preferably 0.1 or higher, especially preferably 0.5 or higher, more preferably 0.8 or higher, even more preferably 0.85 or higher, most preferably 0.9 or higher. High roundness values are preferred because they are effective in improving high-current-density charge/discharge characteristics.

Roundness is defined by the following equation. When a particle has a roundness of 1, this particle theoretically is a true sphere.

Roundness=(length of periphery of equivalent circle having the same area as projected particle shape)/(actual length of periphery of projected particle shape)

The value of roundness is determined, for example, with a flow type particle image analyzer (e.g., FPIA, manufactured by Sysmex Industrial Corp.) by dispersing about 0.2 g of a sample in a 0.2% by mass aqueous solution (about 50 mL) of poly(oxyethylene(20)) sorbitan monolaurate as a surfactant, propagating an ultrasonic wave of 28 kHz to the dispersion for 1 minute at an output of 60 W, and then examining particles having a particle diameter in the range of 3-40 μm with the analyzer having a detection range set at 0.6-400 μm.

Methods for improving roundness are not particularly limited. However, a carbonaceous material in which the particles have been rounded by a rounding treatment (mechanical energy treatment) is preferred because it gives an electrode in which the interstices among particles are uniform in shape. Examples of the rounding treatment include: a method in which a shear force or compressive force is applied to thereby mechanically make the shape of the particles close to sphere; and a method of mechanical/physical treatment in which fine particles are aggregated into particles by means of the bonding force of a binder or of the fine particles themselves.

(8) True Density

The true density of the carbonaceous material is generally 1.4 g/cm$^3$ or higher, preferably 1.6 g/cm$^3$ or higher, more preferably 1.8 g/cm³ or higher, even more preferably 2.0 g/cm³ or higher. The upper limit thereof may be 2.26 g/cm³ or lower. This upper limit is a theoretical value for graphites. When the true density of the carbonaceous material is lower than the lower limit of that range, there are cases where this carbon has too low crystallinity, resulting in an increase in initial irreversible capacity. In the invention, true density is defined as one determined by the liquid-phase displacement method (pycnometer method) using butanol.

(9) Tap Density

The tap density of the carbonaceous material desirably is generally 0.1 g/cm³ or higher, preferably 0.5 g/cm³ or higher, more preferably 0.7 g/cm³ or higher, especially preferably 1.0 g/cm³ or higher. The upper limit thereof is preferably 2 g/cm³ or lower, more preferably 1.8 g/cm³ or lower, especially preferably 1.6 g/cm³ or lower. When the tap density thereof is lower than the lower limit of that range, there are cases where this carbonaceous material, when used in a negative electrode, is less apt to have a high loading density and cannot give a battery having a high capacity. On the other hand, when the tap density thereof exceeds the upper limit of that range, the amount of interparticle interstices in the electrode is too small and it is difficult to secure electrical conductivity among the particles. There are hence cases where preferred battery performances are difficult to obtain. Tap density is determined by the same method as described above with regard to the positive electrode and is defined as described therein.

(10) Orientation Ratio

The orientation ratio of the carbonaceous material is generally 0.005 or higher, preferably 0.01 or higher, more preferably 0.015 or higher. The upper limit thereof is theoretically 0.67 or lower. When the orientation ratio thereof is lower than the lower limit of that range, there are cases where high-density charge/discharge characteristics decrease.

Orientation ratio is determined by X-ray diffractometry after a sample is molded by compaction. A molding obtained by packing 0.47 g of a sample into a molding machine having a diameter of 17 mm and compacting the sample at 600 kgf/cm² is set with clay on a sample holder for examination so as to be flush with the holder. This sample molding is examined for X-ray diffraction. From the intensities of the resultant (110) diffraction peak and (004) diffraction peak for the carbon, the ratio represented by (110) diffraction peak intensity/(004) diffraction peak intensity is calculated. This ratio is defined as the orientation ratio of the active material.

Conditions for this X-ray diffractometry are as follows. Incidentally, "2θ" represents diffraction angle.

Target: Cu(Kα line) graphite monochromator
Slit:
  Divergence slit=0.5 degrees
  Receiving slit=0.15 mm
  Scattering slit=0.5 degrees
Examination range and step angle/measuring time:
  (110) plane: 75°≤2θ≤80° 1°/60 sec
  (004) plane: 52°≤2θ≤57° 1°/60 sec

(11) Aspect Ratio (Powder)

The aspect ratio is theoretically 1 or higher. The upper limit thereof may be 10 or lower and is preferably 8 or lower, more preferably 5 or lower. When the aspect ratio exceeds the upper limit, there are cases where this carbonaceous material causes streak lines in electrode plate formation and an even coating surface cannot be obtained, resulting in a decrease in high-current-density charge/discharge characteristics.

The aspect ratio of a carbonaceous-material particle is represented by A/B, wherein A is the length of the longest axis of the particle in a three-dimensional examination and B is the length of the shortest axis perpendicular to that axis. The examination of carbon particles is made with a scanning electron microscope capable of enlargement examination. Fifty are arbitrarily selected from graphite particles fixed to an edge face of a metal sheet having a thickness of 50 μm or smaller, and each particle is examined for A and B while rotating or inclining the stage to which the sample is fixed. The average of the A/B values is determined.

(12) Minor-Material Mixing

"Minor-material mixing" means that the negative electrode and/or the negative-electrode active material contains two or more carbonaceous materials differing in property. The term "property" herein means one or more properties selected from X-ray diffraction parameter, median diameter, aspect ratio, BET specific surface area, orientation ratio, Raman R value, tap density, true density, pore distribution, roundness, and ash content.

Especially preferred embodiments include: one in which the volume-based particle size distribution is not symmetrical about the median diameter; one in which two or more carbonaceous materials differing in Raman R value are contained; and one in which carbonaceous materials differing in X-ray parameter are contained.

One example of the effects thereof is that the incorporation of a carbonaceous material, such as a graphite, e.g., a natural graphite or artificial graphite, or an amorphous carbon, e.g., a carbon black such as acetylene black or needle coke, as a conductive material serves to reduce electrical resistance. One of these carbonaceous materials may be used alone, or any desired two or more thereof may be used in combination in any desired proportion. In the case where such a carbonaceous material is added as a conductive material, the amount thereof may be 0.1% by mass or larger and is preferably 0.5% by mass or larger, more preferably 0.6% by mass or larger. The upper limit thereof may be 45% by mass or smaller and is preferably 40% by mass. Amounts thereof smaller than the lower limit of that range may result in difficulties in obtaining the effect of improving conductivity. Amounts thereof exceeding the upper limit may lead to an increase in initial irreversible capacity.

(13) Electrode Production

Electrode production may be conducted by an ordinary method. For example, a binder and a solvent are added to a negative-electrode active material optionally together with a thickener, conductive material, filler, etc. to obtain a slurry and this slurry is applied to a current collector and dried. Thereafter, the coated current collector is pressed, whereby an electrode can be formed. The thickness of the negative-electrode active-material layer per one side in the stage just before the step of injecting a nonaqueous electrolyte in battery fabrication is generally 15 μm or larger, preferably 20 μm or larger, more preferably 30 μm or larger. The upper limit thereof may be 150 μm or smaller and is preferably 120 μm or smaller, more preferably 100 μm or smaller. When the thickness thereof is larger than the upper limit of that range, a nonaqueous electrolyte is less apt to infiltrate into around the interface of the current collector and, hence, there are cases where high-current-density charge/discharge characteristics decrease. When the thickness thereof is smaller than the lower limit of that range, the proportion by volume of the current collector to the negative-electrode active material increases and there are cases where battery capacity decreases. The negative-electrode active material may be roller pressed to obtain a sheet electrode. It is also possible to subject the negative-electrode active material to compression molding to obtain a pellet electrode.

(14) Current Collector

As the current collector, a known one can be used at will. Examples of the current collector for the negative electrode include metallic materials such as copper, nickel, stainless steel, and nickel-plated steel. Copper is especially preferred of these from the standpoints of processability and cost. In the case where the current collector is a metallic material, examples of the shape of the current collector include metal foils, metal cylinders, metal coils, metal plates, thin metal films, expanded metals, punching metals, and metal foams. Preferred of these are thin metal films. More preferred are copper foils. Even more preferred are a rolled copper foil, which is produced by the rolling process, and an electrolytic copper foil, which is produced by the electrolytic process. Either of these can be used as a current collector. In the case of a copper foil having a thickness smaller than 25 µm, use can be made of a copper alloy (e.g., phosphor bronze, titanium-copper, Corson alloy, or Cu—Cr—Zr alloy) having a higher strength than pure copper. Furthermore, an aluminum foil can be advantageously used because it has a low specific gravity and, hence, use of the foil as a current collector can reduce the weight of the battery.

The current collector comprising a copper foil produced by the rolling process is less apt to crack even when the negative electrode is rolled tightly or rolled at an acute angle, because the copper crystals are oriented in the rolling direction. This current collector can be advantageously used in small cylindrical batteries. The electrolytic copper foil is obtained by immersing a metallic drum in a nonaqueous electrolyte containing copper ions dissolved therein, causing current to flow through the system while rotating the drum to thereby deposit copper on the drum surface, and peeling the copper deposit from the drum. Copper may be deposited on a surface of the rolled copper foil by the electrolytic process. One or each side of such a copper foil may have undergone a surface-roughening treatment or a surface treatment (e.g., a chromate treatment in a thickness of from several nanometers to about 1 µm or a priming treatment with titanium).

The current collector base is desired to further have the following properties.

(1) Average Surface Roughness (Ra)

The average surface roughness (Ra) of that side of the current collector base on which a thin active-material film is to be formed, as determined by the method provided for in JIS B 0601-1994, is not particularly limited. However, the average surface roughness thereof is generally 0.05 µm or higher, preferably 0.1 µm or higher, especially preferably 0.15 µm or higher. The upper limit thereof is generally 1.5 µm or lower, preferably 1.3 µm or lower, especially preferably 1.0 µm or lower. By regulating the average surface roughness (Ra) of the current collector base so as to be in the range of from the lower limit to upper limit, satisfactory charge/discharge cycle characteristics can be expected. By regulating the average surface roughness thereof to a value not lower than the lower limit, the area of the interface between the base and a thin active-material film is increased and adhesion to the thin active-material film is improved. The upper limit of the average surface roughness (Ra) thereof is not particularly limited. However, it is preferably 1.5 µm or lower because a foil having a practical thickness for batteries and having an average surface roughness (Ra) exceeding 1.5 µm is generally difficult to procure.

(2) Tensile Strength

The tensile strength of the current collector base is not particularly limited. However, it is generally 100 N/mm$^2$ or higher, preferably 250 N/mm$^2$ or higher, more preferably 400 N/mm$^2$ or higher, especially preferably 500 N/mm$^2$ or higher. Tensile strength is a quotient obtained by dividing the maximum tensile force required before test piece breakage by the sectional area of the test piece. In the invention, the tensile strength is determined through a measurement conducted with the same apparatus and by the same method as for elongation. A current collector base having a high tensile strength can be inhibited from cracking with the expansion/contraction of the thin active-material film which occur upon charge/discharge. With this current collector base, satisfactory cycle characteristics can be obtained.

(3) 0.2% Proof Stress

The 0.2% proof stress of the current collector base is not particularly limited. However, it is generally 30 N/mm$^2$ or higher, preferably 150 N/mm$^2$ or higher, especially preferably 300 N/mm$^2$ or higher. The term 0.2% proof stress means the degree of load necessary for imparting a plastic (permanent) deformation of 0.2%. Namely, it means that application of that degree of load and subsequent removal thereof result in a 0.2% deformation. In the invention, the 0.2% proof stress is determined through a measurement conducted with the same apparatus and by the same method as for elongation. A current collector base having a high 0.2% proof stress can be inhibited from plastically deforming with the expansion/contraction of the thin active-material film which occur upon charge/discharge. With this current collector base, satisfactory cycle characteristics can be obtained.

The thin metal film may have any desired thickness. However, the thickness thereof is generally 1 µm or larger, preferably 3 µm or larger, more preferably 5 µm or larger. The upper limit thereof is generally 1 mm or smaller, preferably 100 µm or smaller, more preferably 30 µm or smaller. In case where the thin metal film is thinner than 1 µm, this film has a reduced strength and there are hence cases where coating is difficult. When the thin metal film is thicker than 100 µm, there are cases where this film deforms an electrode shape, e.g., a rolled form. The thin metal film may be in a mesh form.

(15) Thickness Ratio between Current Collector and Active-Material Layer

The thickness ratio between the current collector and the active-material layer is not particularly limited. However, the value of (thickness of the active-material layer on one side just before impregnation with the nonaqueous electrolyte)/(thickness of the current collector) is preferably 150 or smaller, especially preferably 20 or smaller, more preferably 10 or smaller. The lower limit thereof is preferably 0.1 or larger, especially preferably 0.4 or larger, more preferably 1 or larger. When that ratio exceeds the upper limit of that range, there are cases where this current collector heats up due to Joule's heat during high-current-density charge/discharge. When that ratio decreases beyond the lower limit of that range, the proportion by volume of the current collector to the negative-electrode active material increases and this may reduce the capacity of the battery.

(16) Electrode Density

When the negative-electrode active material is used to form an electrode, the electrode structure is not particularly limited. However, the density of the active material present on the current collector is preferably 1.0 g/cm$^3$ or higher, more preferably 1.2 g/cm$^3$ or higher, even more preferably 1.3 g/cm$^3$ or higher. The upper limit thereof is generally 2.0 g/cm$^3$ or lower, preferably 1.9 g/cm$^3$ or lower, more preferably 1.8 g/cm³ or lower, even more preferably 1.7 g/cm³ or lower. When the density thereof exceeds the upper limit of that range, there are cases where the active-material particles are broken and this increases the initial irreversible capacity and reduces the infiltration of a nonaqueous electrolyte into around the current collector/active material interface. As a result, high-current-density charge/discharge characteristics may decrease. When the density thereof is lower than the lower limit, there are cases where electrical conductivity among the active-material particles decreases and this increases battery resistance, resulting in a reduced capacity per unit volume.

(17) Binder

The binder for binding the active material is not particularly limited as long as it is stable to the nonaqueous electrolyte and the solvent to be used for electrode production. Examples thereof include resinous polymers such as polyethylene, polypropylene, poly(ethylene terephthalate), poly(methyl methacrylate), aromatic polyamides, cellulose, and nitrocellulose; rubbery polymers such as SBR (styrene/butadiene rubbers), isoprene rubbers, butadiene rubbers, fluororubbers, NBR (acrylonitrile/butadiene rubbers), and ethylene/propylene rubbers; styrene/butadiene/styrene block copolymers or products of hydrogenation thereof; thermoplastic elastomeric polymers such as EPDM (ethylene/propylene/diene terpolymers), styrene/ethylene/butadiene/styrene copolymers, and styrene/isoprene/styrene block copolymers or products of hydrogenation thereof; flexible resinous polymers such as syndiotactic 1,2-polybutadiene, poly(vinyl acetate), ethylene/vinyl acetate copolymers, and propylene/α-olefin copolymers; fluorochemical polymers such as poly(vinylidene fluoride), polytetrafluoroethylene, fluorinated poly(vinylidene fluoride), and polytetrafluoroethylene/ethylene copolymers; and polymer compositions having the property of conducting alkali metal ions (especially lithium ions). One of these may be used alone, or any desired combination of two or more thereof in any desired proportion may be used.

The kind of the solvent to be used for forming a slurry is not particularly limited as long as it is a solvent in which the active material and binder and the thickener and conductive material which are optionally used according to need can be dissolved or dispersed. Either an aqueous solvent or an organic solvent may be used. Examples of the aqueous solvent include water and alcohols. Examples of the organic solvent include N-methylpyrrolidone (NMP), dimethylformamide, dimethylacetamide, methyl ethyl ketone, cyclohexanone, methyl acetate, methyl acrylate, diethyltriamine, N,N-dimethylaminopropylamine, propylene oxide, tetrahydrofuran (THF), toluene, acetone, diethyl ether, dimethylacetamide, hexamethylphosphoramide, dimethyl sulfoxide, benzene, xylene, quinoline, pyridine, methylnaphthalene, and hexane. Especially when an aqueous solvent is used, it is preferred to add a dispersant or the like in combination with the thickener described above and prepare a slurry using a latex of, e.g., SBR. One of such ingredients may be used alone, or any desired combination of two or more thereof in any desired proportion may be used.

The proportion of the binder to the active material is preferably 0.1% by mass or higher, especially preferably 0.5% by mass or higher, more preferably 0.6% by mass or higher. The upper limit thereof is generally 20% by mass or lower, preferably 15% by mass or lower, more preferably 10% by mass or lower, even more preferably 8% by mass or lower. In case where the binder amount exceeds the upper limit of that range, the proportion of the binder which does not contribute to battery capacity increases and this may lead to a decrease in battery capacity. When the binder amount is small than the lower limit, there are cases where the negative electrode has a reduced strength. Especially when the binder comprises a rubbery polymer represented by SBR as the main component, the proportion of this binder to the active material is generally 0.1% by mass or higher, preferably 0.5% by mass or higher, more preferably 0.6% by mass or higher. The upper limit thereof is generally 5% by mass or lower, preferably 3% by mass or lower, more preferably 2% by mass or lower. In the case where the binder comprises a fluorochemical polymer represented by poly(vinylidene fluoride) as the main component, the proportion of this binder to the active material is generally 1% by mass or higher, preferably 2% by mass or higher, more preferably 3% by mass or higher. The upper limit thereof is generally 15% by mass or lower, preferably 10% by mass or lower, more preferably 8% by mass or lower.

A thickener is used generally for the purpose of regulating the slurry viscosity. The thickener is not particularly limited. Examples thereof include carboxymethyl cellulose, methyl cellulose, hydroxymethyl cellulose, ethyl cellulose, poly (vinyl alcohol), oxidized starch, phosphorylated starch, casein, and salts of these. One of these thickeners may be used alone, or any desired combination of two or more thereof in any desired proportion may be used. In the case where such a thickener is further added, the proportion of the thickener to the active material is generally 0.1% by mass or higher, preferably 0.5% by mass or higher, more preferably 0.6% by mass or higher. The upper limit thereof is generally 5% by mass or lower, preferably 3% by mass or lower, more preferably 2% by mass or lower. When the proportion thereof is lower than the lower limit of that range, there are cases where applicability decreases considerably. Proportions thereof exceeding the upper limit result in a reduced proportion of the active material in the negative-electrode active-material layer, and this may pose a problem that battery capacity decreases and a problem that resistance among the particles of the negative-electrode active material increases.

(18) Orientation Ratio in Electrode Plate

The orientation ratio in the electrode plate is preferably 0.001 or higher, more preferably 0.005 or higher, especially preferably 0.01 or higher. The upper limit thereof is up to 0.67, which is a theoretical value. When the orientation ratio therein is lower than the lower limit of that range, there are cases where high-density charge/discharge characteristics decrease.

An examination for determining the orientation ratio in the electrode plate is as follows. The negative electrode which has been pressed to a target density is examined by X-ray diffractometry to determine the orientation ratio of the active material in this electrode. Although specific techniques therefor are not particularly limited, a standard method is as follows. The peaks attributable to the (110) diffraction and (004) diffraction of the carbon obtained by X-ray diffractometry are subjected to peak separation by fitting with asymmetric Pearson VII as a profile function. Thus, the integrated intensities of the (110) diffraction and (004) diffraction peaks are calculated. From the integrated intensities obtained, the ratio represented by (integrated intensity of (110) diffraction)/(integrated intensity of (004) diffraction) is calculated. The active-material orientation ratio for the electrode thus calculated is defined as the orientation ratio in the electrode plate.

Conditions for this X-ray diffractometry are as follows. Incidentally, "2θ" represents diffraction angle.
Target: Cu(Kα line) graphite monochromator
Slit:
  Divergence slit=1 degree
  Receiving slit=0.1 mm
  Scattering slit=1 degree
Examination range and step angle/measuring time:
  (110) plane: 76.5°≤2θ≤78.5° 0.01°/3 sec
  (004) plane: 53.5°≤2θ≤56.0° 0.01°/3 sec
Sample preparation:
  The electrode is fixed to a glass plate with a double-faced pressure-sensitive adhesive tape having a thickness of 0.1 mm.

(19) Impedance

At the time when the battery in a discharged state has been charged to 60% of its nominal capacity, the resistance of the negative electrode is preferably 100Ω or lower, more preferably 50Ω or lower, especially preferably 20Ω or lower and/or the double-layer capacity of the negative electrode is preferably $1\times10^{-6}$ F or higher, more preferably $1\times10^{-5}$ F, especially preferably $1\times10^{-4}$ F. This range is preferred because satisfactory output characteristics are obtained.

The resistance and double-layer capacity of the negative electrode are determined by the following procedure. The lithium secondary battery to be examined is one which, when charged at a current at which the nominal capacity can be charged over 5 hours, subsequently kept for 20 minutes in the state of being neither charged nor discharged, and then discharged at a current at which the nominal capacity can be discharged over 1 hour, has a capacity of at least 80% of the nominal capacity. This lithium secondary battery in a discharged state is charged to 60% of the nominal capacity at a current at which the nominal capacity can be charged over 5 hours. Immediately thereafter, the lithium secondary battery is transferred to a gloved box filled with an argon atmosphere. In this gloved box, the lithium secondary battery is rapidly disassembled and taken out while preventing the negative electrode from suffering discharge or short-circuiting. In the case where this negative electrode is a double-sided electrode, the electrode active material on one side is stripped off without marring the electrode active material on the other side. Two disks of 12.5 mmφ are punched out of this negative electrode, and are superposed through a separator so that the active-material sides rightly face each other. Sixty microliters of the nonaqueous electrolyte which has been used in the battery is dropped onto the separator and between the two negative electrodes, and the negative electrodes and separator are brought into tight contact with each other. While keeping this assemblage isolated from the surrounding air, the current collectors of the respective negative electrodes are electrically connected to each other and the assemblage is examined by the alternating-current impedance method. In the examination, the complex impedance is measured at a temperature of 25° C. in a frequency region of $10^{-2}$-$10^3$ Hz to determine a Cole-Cole plot. The circular arc for the negative-electrode resistance component in the plot is approximated to a semicircle to determine the surface resistance (R) and the double-layer capacity (Cdl).

(20) Area and Thickness of Negative-Electrode Plate

The area of the negative-electrode plate is not particularly limited. However, the negative-electrode plate is designed to be slightly larger than the positive-electrode plate facing it so that the positive-electrode plate does not protrude outward from the negative-electrode plate. From the standpoints of cycle life in repetitions of charge/discharge and inhibition of deterioration caused by high-temperature storage, it is preferred to regulate the area of the negative electrode so as to be as close as possible to the area of the positive electrode. This is because such negative-electrode area heightens the proportion of electrodes which function more evenly and effectively and thereby improves properties. Especially when the battery is to be used at a high current, this electrode area design is important.

The thickness of the negative-electrode plate is designed so as to be suitable for the positive-electrode plate to be used, and is not particularly limited. However, the thickness of the mix layer, excluding the thickness of the core metal foil, is generally 15 μm or larger, preferably 20 μm or larger, more preferably 30 μm or larger. The upper limit thereof is generally 150 μm or smaller, preferably 120 μm or smaller, more preferably 100 μm or smaller.

<Negative Electrode [1]>

Negative electrode [1], i.e., "a negative electrode containing as a negative-electrode active material two or more carbonaceous substances differing in crystallinity", for use in a lithium secondary battery of the invention will be explained below.

[Negative Electrode [1]: Negative-Electrode Active Material]

The negative-electrode active material for use in negative electrode [1] is described below.

[[Constitution]]

The negative-electrode active material for use in negative electrode [1] in a lithium secondary battery of the invention is characterized by comprising two or more carbonaceous substances differing in crystallinity. The term "comprising two or more carbonaceous substances differing in crystallinity" herein means that carbonaceous substances differing in crystallinity coexist in the negative electrode. The state in which these carbonaceous substances coexist is not limited. Namely, particles of one carbonaceous substance and particles of another may be present as a mixture of these, or the carbonaceous substances may be contained in one secondary particle. Furthermore, a mixture of both is possible. The negative-electrode active material preferably is one which comprises a composite carbonaceous material comprising two or more carbonaceous substances differing in crystallinity. Also preferred is one which comprises the composite carbonaceous material and, as a minor ingredient, one or more carbonaceous substances (carbonaceous materials) differing in property from the carbonaceous substances constituting the composite carbonaceous material.

The term "contained in one secondary particle" means, for example, the state in which the carbonaceous substances differing in crystallinity are restrained by bonding, the state in which the substances are physically restrained, or the state in which the substances retain a shape by means of electrostatic restraint. The term "physically restrained" herein means a state such as that in which one of the carbonaceous substances differing in crystallinity is surrounded by the other or the state in which one is caught by the other. The term "electrostatic restraint" means the state in which one of the carbonaceous substances differing in crystallinity is adherent to the other by means of electrostatic energy. Furthermore, the term "the state in which the substances are restrained by bonding" means chemical bonding by hydrogen bonds, covalent bonds, ionic bonds, etc.

Of those, the state in which the surface of a core carbonaceous substance at least partly has an interface where a coating layer differing in crystallinity is bonded to the core carbonaceous substance is advantageous because resistance in lithium movement between the carbonaceous substances differing in crystallinity is low. The coating layer is not limited as to whether it is one formed by the bonding of an externally supplied material and/or of a product of alteration thereof or one formed by the alteration of a surface-part material of a carbonaceous substance. The term "coating" herein means that the interface between the coating layer and the surface of the carbonaceous substance at least partly has chemical bonds and the coating layer is (1) in the state of covering the whole surface, (2) in the state of locally covering the carbonaceous particles, (3) in the state of selectively covering part of the surface, or (4) in the state of being present in ultrafine regions including chemical bonds. At the interface, crystallinity may change continuously or discontinuously.

It is preferred that the composite carbonaceous material should be one which includes a particulate carbonaceous substance and has an interface where the particulate carbonaceous substance is covered with and/or bonded to a carbonaceous substance differing in crystallinity from the particulate carbonaceous substance, the interface changing in crystallinity discontinuously and/or continuously. There are no limitations on which of the "particulate carbonaceous substance" and the "carbonaceous substance differing in crystallinity from the particulate carbonaceous substance" has higher crystallinity. However, from the standpoint of producing the effects of the invention, it is preferred that the particulate carbonaceous substance should have higher crystallinity.

A difference in crystallinity herein is judged based on a difference in interplanar spacing (d002) for the (002) planes, difference in Lc, or difference in La, each determined by wide-angle X-ray diffractometry. From the standpoint of producing the effects of the invention, the difference in crystallinity is preferably 0.0002 nm or larger in terms of (d002), or 1 nm or larger in terms of La, or 1 nm or larger in terms of Lc. The difference in (d002), among those ranges, is preferably 0.0005 nm or larger, more preferably 0.001 nm or larger, even more preferably 0.003 nm or larger. The upper limit thereof is generally 0.03 nm or smaller, preferably 0.02 nm or smaller. When the difference therein is smaller than the lower limit of that range, there are cases where the effect of the difference in crystallinity becomes low. On the other hand, in case where the difference therein exceeds the upper limit of that range, the part having lower crystallinity tends to be too low in crystallinity and there is a possibility that the reduced crystallinity might increase irreversible capacity. The difference in La or Lc, among those ranges, is preferably 2 nm or larger, more preferably 5 nm or larger, even more preferably 10 nm or larger. In graphites, values larger than 100 nm cannot be specified because definition is generally impossible. When the difference in La or Lc is smaller than the lower limit of that range, there are cases where the effect of the difference in crystallinity becomes low.

As stated above, the composite carbonaceous material may comprise a particulate carbonaceous substance and a carbonaceous substance which differs in crystallinity from the particulate carbonaceous substance and which covers and/or is bonded to the particulate carbonaceous substance. In this material, either of the "particulate carbonaceous substance" and the "carbonaceous substance differing in crystallinity from the particulate carbonaceous substance" may be a graphitic carbonaceous substance and the other may be a lowly crystalline carbonaceous substance. It is preferred that the "particulate carbonaceous substance" should be a graphitic carbonaceous substance and the "carbonaceous substance differing in crystallinity from the particulate carbonaceous substance" be a lowly crystalline carbonaceous substance.

[[[Particulate Carbonaceous Substance]]]

The particulate carbonaceous substance preferably is a graphitic carbonaceous substance comprising a natural graphite and/or an artificial graphite or is one comprising at least one member selected from the group consisting of the following (a), (b), and (c), which have slightly lower crystallinity than those graphites:

(a) a product of organic-substance pyrolysis selected from the group consisting of coal coke, petroleum coke, furnace black, acetylene black, and pitch-derived carbon fibers;

(b) a product of the carbonization of the gas of an organic substance; and (c) a carbonaceous substance obtained by partly or wholly graphitizing (a) or (b).

[[[[Graphitic Carbonaceous Substance]]]]

The particulate carbonaceous substance preferably is a graphitic carbonaceous substance comprising a natural graphite and/or an artificial graphite. The term graphitic carbonaceous substance means any of various carbonaceous substances which have such high crystallinity that the interplanar spacing (d002) for the (002) planes thereof as determined by wide-angle X-ray diffractometry is smaller than 0.340 nm.

Preferred examples of the graphitic carbonaceous substance include powders selected from natural graphites, artificial graphites, products obtained by the mechanical pulverization or re-heat treatment of these graphites, products of the re-heat treatment of an expanded graphite, and highly purified products obtained from those graphites. Preferred examples of the artificial graphites are ones obtained by graphitizing one or more organic substances selected from coal tar pitch, coal-derived heavy oil, topping residues, petroleum-derived heavy oil, aromatic hydrocarbons, nitrogen-containing cyclic compounds, sulfur-containing cyclic compounds, polyphenylenes, poly(vinyl chloride), poly(vinyl alcohol), polyacrylonitrile, poly(vinyl butyral), natural polymers, poly(phenylene sulfide), poly(phenylene oxide), furfuryl alcohol resins, phenol-formaldehyde resins, imide resins, and the like at a heat-treating temperature of generally about from 2,500° C. to 3,200° C. and powdering the graphitized substances by an appropriate pulverizer.

(Properties of Graphitic Carbonaceous Substance)

It is desirable that the graphitic carbonaceous substance should satisfy any one of the following properties (1) to (11) or simultaneously satisfy two or more thereof.

(1) X-Ray Parameter

The graphitic carbonaceous substance preferably has a value of d (interplanar spacing) for the lattice planes (002), as determined by X-ray diffractometry in accordance with the method of the Japan Society for Promotion of Scientific Research, of 0.335 nm or larger. The lower limit of the value of d is smaller than 0.340 nm according to the definition, and is preferably 0.337 nm or smaller. When the value of d is too large, there are cases where crystallinity decreases to increase initial irreversible capacity. On the other hand, 0.335 is a theoretical value for graphites. Furthermore, the crystallite size (Lc) of this carbon material, as determined by X-ray diffractometry in accordance with the method of the Japan Society for Promotion of Scientific Research, is generally 30 nm or larger, preferably 50 nm or larger, more preferably 100 nm or larger. In case where the Lc thereof is smaller than the lower limit of that range, there is a possibility that crystallinity might decrease to increase initial irreversible capacity.

(2) Ash Content

The ash content of the graphitic carbonaceous substance is preferably 1% by mass or lower, especially 0.5% by mass or lower, in particular 0.1% by mass or lower, based on the whole graphitic carbonaceous substance. The lower limit of the ash content thereof is preferably at least 1 ppm by mass of the whole carbonaceous substance. When the ash content thereof exceeds the upper limit of that range, there are cases where battery performance deterioration caused by reaction with the electrolyte during charge/discharge becomes not negligible. When the ash content thereof is lower than the lower limit of that range, there are cases where the production of this carbonaceous material necessitates much time and energy and an apparatus for pollution prevention, resulting in an increase in cost.

(3) Volume-Average Particle Diameter

With respect to the volume-average particle diameter of the graphitic carbonaceous substance, the volume-average particle diameter (median diameter) thereof as determined by the laser diffraction/scattering method is generally 1 µm or larger, preferably 3 µm or larger, more preferably 5 µm or larger, even more preferably 7 µm or larger. The upper limit thereof is generally 100 µm or smaller, preferably 50 µm or smaller, more preferably 40 µm or smaller, even more preferably 30 µm or smaller, especially preferably 25 µm or smaller. When the volume-average particle diameter thereof is smaller than the lower limit of that range, there are cases where irreversible capacity increases, leading to a loss in initial battery capacity. When the volume-average particle diameter thereof exceeds the upper limit of that range, there are cases where such a carbonaceous substance is undesirable from the standpoint of battery production because an uneven coating surface is apt to result when an electrode plate is produced.

Volume-average particle diameter in the invention is defined as the median diameter determined by dispersing the carbon powder in a 0.2% by mass aqueous solution (about 1 mL) of poly(oxyethylene (20)) sorbitan monolaurate as a surfactant and examining the dispersion with a laser diffraction type particle size distribution analyzer (e.g., LA-700, manufactured by HORIBA, Ltd.).

(4) Raman R Value, Raman Half-Value Width

The R value of the graphitic carbonaceous substance as determined by the argon ion laser Raman spectroscopy is generally 0.01 or higher, preferably 0.03 or higher, more preferably 0.10 or higher. The upper limit thereof is generally 0.60 or lower, preferably 0.40 or lower. When the R value thereof is lower than the lower limit of that range, the surface of such particles has too high crystallinity and there are cases where the number of intercalation sites into which lithium comes with charge/discharge decreases. Namely, there are cases where suitability for charge decreases. On the other hand, when the R value thereof exceeds the upper limit of that range, the surface of such particles has reduced crystallinity and enhanced reactivity with the electrolyte and this may lead to a decrease in efficiency and enhanced gas evolution.

The Raman half-value width around 1,580 cm$^{-1}$ of the graphitic carbonaceous substance is not particularly limited. However, the half-value width thereof is generally 10 cm$^{-1}$ or larger, preferably 15 cm$^{-1}$ or larger. The upper limit thereof is generally 60 cm$^{-1}$ or smaller, preferably 45 cm$^{-1}$ or smaller, more preferably 40 cm$^{-1}$ or smaller. When the Raman half-value width thereof is smaller than the lower limit of that range, the surface of such particles has too high crystallinity and there are cases where the number of intercalation sites into which lithium comes with charge/discharge decreases. Namely, there are cases where suitability for charge decreases. On the other hand, when the Raman half-value width thereof exceeds the upper limit of that range, the surface of such particles has reduced crystallinity and enhanced reactivity with the electrolyte and this may lead to a decrease in efficiency and enhanced gas evolution.

The examination for a Raman spectrum is made with a Raman spectrometer (e.g., a Raman spectrometer manufactured by Japan Spectroscopic Co., Ltd.). In the examination, a sample is charged into a measuring cell by causing the sample to fall naturally into the cell and the surface of the sample in the cell is irradiated with argon ion laser light while rotating the cell in a plane perpendicular to the laser light. The Raman spectrum obtained is examined for the intensity $I_A$ of a peak $P_A$ around 1,580 cm$^{-1}$ and the intensity $I_B$ of a peak $P_B$ around 1,360 cm$^{-1}$. The ratio between these intensities R ($R=I_B/I_A$) is calculated and this ratio is defined as the Raman R value of the carbon material. Furthermore, the half-value width of the peak $P_A$ around 1,580 cm$^{-1}$ in the Raman spectrum obtained is measured, and this value is defined as the Raman half-value width of the carbon material.

Conditions for this Raman spectroscopy are as follows.
Wavelength of argon ion laser: 514.5 nm
Laser power on sample: 15-25 mW
Resolution: 10-20 cm$^{-1}$
Examination range: 1,100-1,730 cm$^{-1}$
Analysis for R value and half-value width: background processing
Smoothing: simple average; convolution, 5 points (5) BET Specific Surface Area The specific surface area of the graphitic carbonaceous substance, as determined by the BET method, is generally 0.1 m$^2$/g or larger, preferably 0.7 m$^2$/g or larger, more preferably 1 m$^2$/g or larger, even more preferably 1.5 m$^2$/g or larger. The upper limit thereof is generally 100 m$^2$/g or smaller, preferably 25 m$^2$/g or smaller, more preferably 15 m$^2$/g or smaller, even more preferably 10 m$^2$/g or smaller. When the specific surface area thereof is smaller than the lower limit of that range, there are cases where use of this graphitic carbonaceous substance as a negative-electrode material is apt to result in poor lithium acceptance during charge and in lithium deposition on the electrode surface. On the other hand, when the specific surface area thereof exceeds the upper limit of that range, there are cases where use of this graphitic carbonaceous substance as a negative-electrode material is apt to result in enhanced reactivity with the electrolyte and enhanced gas evolution and a preferred battery is difficult to obtain.

BET specific surface area is defined as a value measured with a surface area meter (e.g., a fully automatic surface area measuring apparatus manufactured by Ohukura Riken Co., Ltd.) by preliminarily drying a sample at 350° C. for 15 minutes in a nitrogen stream and then measuring the specific surface area thereof by the gas-flowing nitrogen adsorption BET one-point method using a nitrogen/helium mixture gas precisely regulated so as to have a nitrogen pressure of 0.3 relative to atmosphere pressure.

(6) Pore Distribution

In the graphitic carbonaceous substance, the amount of interstices corresponding to a pore diameter of from 0.01 µm to 1 µm which include pores in the particles and particle surface irregularities formed by steps, as determined by mercury porosimetry (mercury intrusion method), is generally 0.01 mL/g or larger, preferably 0.05 mL/g or larger, more preferably 0.1 mL/g or larger. The upper limit thereof is generally 0.6 mL/g or smaller, preferably 0.4 mL/g or smaller, more preferably 0.3 mL/g or smaller. When the amount of interstices therein is larger than the upper limit of that range, there are cases where a large amount of a binder is necessary in electrode plate formation. On the other hand, when the amount thereof is smaller than the lower limit of that range, there are cases where high-current-density charge/discharge characteristics decrease and the effect of diminishing electrode expansion/contraction during charge/discharge is not obtained.

The total pore volume is preferably 0.1 mL/g or larger, more preferably 0.25 mL/g or larger. The upper limit thereof is generally 10 mL/g or smaller, preferably 5 mL/g or smaller, more preferably 2 mL/g or smaller. When the total pore volume exceeds the upper limit of that range, there are cases where a large amount of a binder is necessary in electrode plate formation. When the total pore volume is smaller than the lower limit, there are cases where the dispersing effect of a thickener or binder in electrode plate formation is not obtained.

The average pore diameter of the graphitic carbonaceous substance is preferably 0.05 μm or larger, more preferably 0.1 μm or larger, even more preferably 0.5 μm or larger. The upper limit thereof is generally 50 μm or smaller, preferably 20 μm or smaller, more preferably 10 μm or smaller. When the average pore diameter thereof exceeds the upper limit of that range, there are cases where a large amount of a binder is necessary. On the other hand, when the average pore diameter thereof is smaller than the lower limit of that range, there are cases where high-current-density charge/discharge characteristics decrease.

As an apparatus for the mercury porosimetry is used a mercury porosimeter (Autopore 9520, manufactured by Micromeritics Corp.). About 0.2 g of a sample (negative-electrode material) is weighed out and placed in a powder cell and this cell is closed. The sample in the cell is pretreated by degassing it at room temperature under vacuum (50 μmHg or lower) for 10 minutes. Subsequently, the pressure in the cell is reduced to 4 psia (about 28 kPa) and mercury is introduced thereinto. The internal pressure is stepwise elevated from 4 psia (about 28 kPa) to 40,000 psia (about 280 MPa) and then lowered to 25 psia (about 170 kPa). The number of steps in the pressure elevation is 80 or larger. In each step, the amount of mercury intruded is measured after an equilibrium time of 10 seconds. A pore distribution is calculated from the mercury intrusion curve thus obtained, using the Washburn equation. For the calculation, the surface tension ($\gamma$) and contact angle ($\psi$) of mercury are taken as 485 dyne/cm and 140°, respectively. The average pore diameter used is the pore diameter corresponding to a cumulative pore volume of 50%.

(7) Roundness

With respect to the degree of sphericity of the graphitic carbonaceous substance, the roundness of the particles having a particle diameter in the range of 3-40 μm is preferably 0.1 or higher, especially preferably 0.5 or higher, more preferably 0.8 or higher, even more preferably 0.85 or higher, most preferably 0.9 or higher. High roundness values are preferred because they are effective in improving high-current-density charge/discharge characteristics. Roundness is defined by the following equation. When a particle has a roundness of 1, this particle theoretically is a true sphere.

Roundness=(length of periphery of equivalent circle having the same area as projected particle shape)/(actual length of periphery of projected particle shape)

The value of roundness is determined, for example, with a flow type particle image analyzer (e.g., FPIA, manufactured by Sysmex Industrial Corp.) by dispersing about 0.2 g of a sample in a 0.2% by mass aqueous solution (about 50 mL) of poly(oxyethylene (20)) sorbitan monolaurate as a surfactant, propagating an ultrasonic wave of 28 kHz to the dispersion for 1 minute at an output of 60 W, and then examining particles having a particle diameter in the range of 3-40 μm with the analyzer having a detection range set at 0.6-400 μm.

Methods for improving roundness are not particularly limited. However, a graphitic carbonaceous substance in which the particles have been rounded by a rounding treatment is preferred because it gives an electrode in which the interstices among particles are uniform in shape. Examples of the rounding treatment include: a method in which a shear force or compressive force is applied to thereby mechanically make the shape of the particles close to sphere; and a method of mechanical/physical treatment in which fine particles are aggregated into particles by means of the bonding force of a binder or of the fine particles themselves.

(8) True Density

The true density of the graphitic carbonaceous substance is generally 2 g/cm$^3$ or higher, preferably 2.1 g/cm$^3$ or higher, more preferably 2.2 g/cm$^3$ or higher, even more preferably 2.22 g/cm$^3$ or higher. The upper limit thereof may be 2.26 g/cm$^3$ or lower. This upper limit is a theoretical value for graphites. When the true density of the graphitic carbonaceous substance is lower than the lower limit of that range, there are cases where this carbon has too low crystallinity, resulting in an increase in initial irreversible capacity. In the invention, true density is defined as one determined by the liquid-phase displacement method (pycnometer method) using butanol.

(9) Tap Density

The tap density of the graphitic carbonaceous substance desirably is generally 0.1 g/cm$^3$ or higher, preferably 0.5 g/cm$^3$ or higher, more preferably 0.7 g/cm$^3$ or higher, especially preferably 0.9 g/cm$^3$ or higher. The upper limit thereof is preferably 2 g/cm$^3$ or lower, more preferably 1.8 g/cm$^3$ or lower, especially preferably 1.6 g/cm$^3$ or lower. When the tap density thereof is lower than the lower limit of that range, there are cases where this graphitic carbonaceous substance, when used in a negative electrode, is less apt to have a high loading density and cannot give a battery having a high capacity. On the other hand, when the tap density thereof exceeds the upper limit of that range, the amount of inter-particle interstices in the electrode is too small and it is difficult to secure electrical conductivity among the particles. There are hence cases where preferred battery performances are difficult to obtain.

In the invention, the tap density of a sample is determined by dropping the sample through a sieve having an opening size of 300 μm into a 20-cm$^3$ tapping cell to fill the cell with the sample up to the brim, subsequently conducting tapping operations 1,000 times over a stroke length of 10 mm using a powder densimeter (e.g., Tap Denser, manufactured by Seishin Enterprise Co., Ltd.), and determining the resultant bulk density. This bulk density is defined as the tap density.

(10) Orientation Ratio (Powder)

The orientation ratio of the graphitic carbonaceous substance is generally 0.005 or higher, preferably 0.01 or higher, more preferably 0.015 or higher. The upper limit thereof is theoretically 0.67 or lower. When the orientation ratio thereof is lower than the lower limit of that range, there are cases where high-density charge/discharge characteristics decrease.

Orientation ratio is determined by X-ray diffractometry. The peaks attributable to the (110) diffraction and (004) diffraction of the carbon obtained by X-ray diffractometry are subjected to peak separation by fitting with asymmetric Pearson VII as a profile function. Thus, the integrated intensities of the (110) diffraction and (004) diffraction peaks are calculated. From the integrated intensities obtained, the ratio represented by (integrated intensity of (110) diffraction)/(integrated intensity of (004) diffraction) is calculated. This ratio is defined as the active-material orientation ratio.

Conditions for this X-ray diffractometry are as follows. Incidentally, "2θ" represents diffraction angle.

Target: Cu(Kα line) graphite monochromator
Slit:
   Divergence slit=1 degree
   Receiving slit=0.1 mm
   Scattering slit=1 degree
Examination range and step angle/measuring time:
   (110) plane: 76.5°≤2θ≤78.5° 0.01°/3 sec
   (004) plane: 53.5°≤2θ≤56.0° 0.01°/3 sec

(11) Aspect Ratio (Powder)

The aspect ratio of the graphitic carbonaceous substance is theoretically 1 or higher. The upper limit thereof is generally 10 or lower, preferably 8 or lower, more preferably 5 or lower. When the aspect ratio thereof exceeds the upper limit, there are cases where this graphitic carbonaceous substance causes streak lines in electrode plate formation and an even coating surface cannot be obtained, resulting in a decrease in high-current-density charge/discharge characteristics.

The aspect ratio of a carbon material particle is represented by A/B, wherein A is the length of the longest axis of the particle in a three-dimensional examination and B is the length of the shortest axis perpendicular to that axis. The examination of carbon particles is made with a scanning electron microscope capable of enlargement examination. Fifty are arbitrarily selected from graphite particles fixed to an edge face of a metal having a thickness of 50 μm or smaller, and each particle is examined for A and B while rotating or inclining the stage to which the sample is fixed. The average of the A/B values is determined.

[[[[Lowly Crystalline Carbonaceous Substance]]]]

The term lowly crystalline carbonaceous substance means a carbonaceous substance which has such low crystallinity that the interplanar spacing (d002) for the (002) planes as determined by wide-angle X-ray diffractometry is 0.340 nm or larger.

(Composition of Lowly Crystalline Carbonaceous Substance)

The "carbonaceous substance differing in crystallinity from the particulate carbonaceous substance" preferably is a carbonaceous substance having lower crystallinity than the particulate carbonaceous substance. It preferably is a product of the carbonization of the following (d) or (e) (d) an organic substance capable of carbonization which is selected from the group consisting of coal-derived heavy oil, straight-run heavy oil, petroleum-derived cracked heavy oil, aromatic hydrocarbons, nitrogen-ring compounds, sulfur-ring compounds, polyphenylenes, organic synthetic polymers, natural polymers, thermoplastic resins, and thermosetting resins; and (e) a solution obtained by dissolving any of these organic substances capable of carbonization in a low-molecular organic solvent.

The coal-derived heavy oil preferably is any of coal tar pitches ranging from soft pitch to hard pitch, dry distillation/liquefaction oil, and the like. The straight-run heavy oil preferably is any of topping residues, vacuum distillation residues, and the like. The petroleum-derived cracked heavy oil preferably is, for example, ethylene tar as a by-product of the thermal cracking of crude oil, naphtha, etc. The aromatic hydrocarbons preferably are acenaphthylene, decacyclene, anthracene, phenanthrene, and the like. The nitrogen-ring compounds preferably are phenazine, acridine, and the like. The sulfur-ring compounds preferably are thiophene, bithiophene, and the like. The polyphenylenes preferably are biphenyl, terphenyl, and the like. The organic synthetic polymers preferably are poly(vinyl chloride), poly(vinyl alcohol), poly(vinyl butyral), substances obtained by insolubilizing these compounds, polyacrylonitrile, polypyrrole, polythiophene, polystyrene, and the like. The natural polymers preferably are, for example, polysaccharides such as cellulose, lignin, mannan, poly(galacturonic acid), chitosan, saccharose, and the like. The thermoplastic resins preferably are poly(phenylene sulfide), poly(phenylene oxide), and the like. The thermosetting resins preferably are furfuryl alcohol resins, phenol-formaldehyde resins, imide resins, and the like.

Although the "carbonaceous substance differing in crystallinity from the particulate carbonaceous substance" preferably is a product of the carbonization of the "organic substance capable of carbonization" described above, it also preferably is a product of the carbonization of a solution obtained by dissolving the "organic substance capable of carbonization" in a low-molecular organic solvent such as benzene, toluene, xylene, quinoline, or n-hexane. It is furthermore preferred that the "carbonaceous substance differing in crystallinity from the particulate carbonaceous substance" should be a product of the carbonization of coal coke or petroleum coke.

It is especially preferred that the (d) or (e) should be liquid. Namely, to cause carbonization to proceed in a liquid phase is preferred from the standpoint of forming an interface between the lowly crystalline carbonaceous substance and a graphitic carbonaceous substance part.

(Properties of Lowly Crystalline Carbonaceous Substance)

It is desirable that the lowly crystalline carbonaceous substance should satisfy any one of the following properties (1) to (5) or simultaneously satisfy two or more thereof. Furthermore, one lowly crystalline carbonaceous substance having such properties may be used alone, or any two or more such carbonaceous substances may be used in combination in any desired proportion.

(1) X-Ray Parameter

With respect to the lowly crystalline carbonaceous substance part, the value of d (interplanar spacing) for the lattice planes (002), as determined by X-ray diffractometry in accordance with the method of the Japan Society for Promotion of Scientific Research, is 0.340 nm or larger according to the definition. However, the value of d thereof is preferably 0.340 nm or larger, especially preferably 0.341 nm or larger. The upper limit thereof is preferably 0.380 nm or smaller, especially preferably 0.355 nm or smaller, more preferably 0.350 nm or smaller. When the value of d is too large, there are cases where the surface of this carbonaceous substance has considerably low crystallinity to increase irreversible capacity. When the value of d is too small, there are cases where the effect of improving suitability for charge which is obtained by disposing a lowly crystalline carbonaceous substance on the surface is lessened to reduce the effects of the invention. Furthermore, the crystallite size (Lc) of this carbon material, as determined by X-ray diffractometry in accordance with the method of the Japan Society for Promotion of Scientific Research, is generally 1 nm or larger, preferably 1.5 nm or larger. In case where the Lc thereof is smaller than the lower limit of that range, there are cases where crystallinity decreases to increase initial irreversible capacity.

(2) Ash Content

The ash content of the lowly crystalline carbonaceous substance part may be 1% by mass or lower and is especially 0.5% by mass or lower, in particular 0.1% by mass or lower, based on the whole composite carbonaceous material. The lower limit of the ash content thereof is preferably at least 1 ppm by mass of the whole carbonaceous material. When the ash content thereof exceeds the upper limit of that range, there are cases where battery performance deterioration caused by reaction with the electrolyte during charge/discharge becomes not negligible. When the ash content thereof is lower than the lower limit of that range, there are cases where the production of this carbonaceous substance necessitates much time and energy and an apparatus for pollution prevention, resulting in an increase in cost.

(4) Raman R Value, Raman Half-Value Width

The R value of the lowly crystalline carbonaceous substance part as determined by the argon ion laser Raman spectroscopy is generally 0.5 or higher, preferably 0.7 or higher, more preferably 0.9 or higher. The upper limit thereof is generally 1.5 or lower, preferably 1.2 or lower. When the R value thereof is lower than the lower limit of that range, the surface of such particles has too high crystallinity and there are cases where the number of intercalation sites into which lithium comes with charge/discharge decreases. Namely, there are cases where suitability for charge decreases. In addition, when a coating fluid containing such a composite carbonaceous material is applied to a current collector and the resultant coating is pressed to heighten the density of the negative electrode, then the crystals are apt to orient in directions parallel to the electrode plate and this may lead to a decrease in load characteristics. On the other hand, when the R value thereof exceeds the upper limit of that range, the surface of such particles has reduced crystallinity and enhanced reactivity with the electrolyte and this may lead to a decrease in efficiency and enhanced gas evolution.

The Raman half-value width around 1,580 $cm^{-1}$ of the lowly crystalline carbonaceous substance part is not particularly limited. However, the half-value width thereof is generally 40 $cm^{-1}$ or larger, preferably 50 $cm^{-1}$ or larger. The upper limit thereof is generally 100 $cm^{-1}$ or smaller, preferably 90 $cm^{-1}$ or smaller, more preferably 80 $cm^{-1}$ or smaller. When the Raman half-value width thereof is smaller than the lower limit of that range, the surface of such particles has too high crystallinity and there are cases where the number of intercalation sites into which lithium comes with charge/discharge decreases. Namely, there are cases where suitability for charge decreases. In addition, when a coating fluid containing such a composite carbonaceous material is applied to a current collector and the resultant coating is pressed to heighten the density of the negative electrode, then the crystals are apt to orient in directions parallel to the electrode plate and this may lead to a decrease in load characteristics. On the other hand, when the Raman half-value width thereof exceeds the upper limit of that range, the surface of such particles has reduced crystallinity and enhanced reactivity with the electrolyte and this may lead to a decrease in efficiency and enhanced gas evolution.

(4) True Density

The true density of the lowly crystalline carbonaceous substance part is generally 1.4 $g/cm^3$ or higher, preferably 1.5 $g/cm^3$ or higher, more preferably 1.6 $g/cm^3$ or higher, even more preferably 1.7 $g/cm^3$ or higher. The upper limit thereof is generally 2.1 $g/cm^3$ or lower, preferably 2 $g/cm^3$ or lower. In case where the true density thereof exceeds the upper limit of that range, there is a possibility that suitability for charge might be impaired. When the true density thereof is lower than the lower limit of that range, there are cases where this carbon has too low crystallinity, resulting in an increase in initial irreversible capacity.

(5) Orientation Ratio

The orientation ratio of the lowly crystalline carbonaceous substance part is generally 0.005 or higher, preferably 0.01 or higher, more preferably 0.015 or higher. The upper limit thereof is theoretically 0.67 or lower.

Orientation ratios thereof lower than the lower limit of that range are undesirable because high-density charge/discharge characteristics decrease. Orientation ratio is determined by X-ray diffractometry. The peaks attributable to the (110) diffraction and (004) diffraction of the carbon obtained by X-ray diffractometry are subjected to peak separation by fitting with asymmetric Pearson VII as a profile function. Thus, the integrated intensities of the (110) diffraction and (004) diffraction peaks are calculated. From the integrated intensities obtained, the ratio represented by (integrated intensity of (110) diffraction)/(integrated intensity of (004) diffraction) is calculated. This ratio is defined as the electrode active-material orientation ratio.

[[[Composite Carbonaceous Material]]]

The composite carbonaceous material for use in negative electrode [1] in a lithium secondary battery of the invention preferably comprises a "particulate carbonaceous substance" and a "carbonaceous substance differing in crystallinity from the particulate carbonaceous substance" as stated above. In this case, either of these substances may be a graphitic carbonaceous substance and the other may be a lowly crystalline carbonaceous substance. Preferably, the "particulate carbonaceous substance" is a graphitic carbonaceous substance and the "carbonaceous substance differing in crystallinity from the particulate carbonaceous substance" is a lowly crystalline carbonaceous substance.

In the composite carbonaceous material, the proportion of the graphitic carbonaceous substance to the lowly crystalline carbonaceous substance by mass is preferably 50/50 or higher, more preferably 80/20 or higher, especially preferably 90/10 or higher, and is preferably 99.9/0.1 or lower, more preferably 99/1 or lower, especially preferably 98/2 or lower. When the proportion thereof exceeds the upper limit of that range, there are cases where the possession of the two kinds of crystalline carbonaceous substances does not produce its effect. In case where the proportion thereof is lower than the lower limit of that range, initial irreversible capacity tends to increase and this may pose a problem concerning battery design. It is preferred that the graphitic carbonaceous substance should account for 50% by mass or more of the whole composite carbonaceous material.

(Properties of Composite Carbonaceous Material)

It is desirable that the composite carbonaceous material should satisfy any one of the following properties (1) to (11) or simultaneously satisfy two or more thereof. Furthermore, one composite carbonaceous material having such properties may be used alone, or any two or more such composite carbonaceous materials may be used in combination in any desired proportion.

(1) X-Ray Parameter

The composite carbonaceous material preferably has a value of d (interplanar spacing) for the lattice planes (002), as determined by X-ray diffractometry in accordance with the method of the Japan Society for Promotion of Scientific Research, of 0.335 nm or larger. The value of d desirably is generally 0.350 nm or smaller, preferably 0.345 nm or smaller, more preferably 0.340 nm or smaller. Furthermore, the crystallite size (Lc) of this carbon material, as determined by X-ray diffractometry in accordance with the method of the Japan Society for Promotion of Scientific Research, is generally 1.5 nm or larger, preferably 3.0 nm or larger. In case where the Lc thereof is smaller than the lower limit of that range, there is a possibility that crystallinity might decrease to increase initial irreversible capacity.

(2) Ash Content

The ash content of the composite carbonaceous material is generally 1% by mass or lower, especially 0.5% by mass or lower, in particular 0.1% by mass or lower, based on the whole composite carbonaceous material. The lower limit of the ash content thereof is preferably at least 1 ppm by mass of the whole composite carbonaceous material. When the ash content thereof exceeds the upper limit of that range, there are cases where battery performance deterioration caused by reaction with the electrolyte during charge/discharge becomes not negligible. When the ash content thereof is lower than the lower limit of that range, there are cases where the production of this composite carbonaceous material necessitates much time and energy and an apparatus for pollution prevention, resulting in an increase in cost.

(3) Volume-Average Particle Diameter

With respect to the volume-average particle diameter of the composite carbonaceous material, the volume-average particle diameter (median diameter) thereof as determined by the laser diffraction/scattering method is generally 1 μm or larger, preferably 3 μm or larger, more preferably 5 μm or larger, even more preferably 7 μm or larger. The upper limit thereof is generally 100 μm or smaller, preferably 50 μm or smaller, more preferably 40 μm or smaller, even more preferably 30 μm or smaller, especially preferably 25 μm or smaller. When the volume-average particle diameter thereof is smaller than the lower limit of that range, there are cases where irreversible capacity increases, leading to a loss in initial battery capacity. When the volume-average particle diameter thereof exceeds the upper limit of that range, there are cases where such a composite carbonaceous material is undesirable from the standpoint of battery production because an uneven coating surface is apt to result when an electrode plate is produced.

(4) Raman R Value, Raman Half-Value Width

The R value of the composite carbonaceous material as determined by the argon ion laser Raman spectroscopy is generally 0.03 or higher, preferably 0.10 or higher, more preferably 0.15 or higher. The upper limit thereof may be 0.60 or lower and is preferably 0.50 or lower. When the R value thereof is lower than the lower limit of that range, the surface of such particles has too high crystallinity and there are cases where the number of intercalation sites into which lithium comes with charge/discharge decreases. Namely, there are cases where suitability for charge decreases. In addition, when a coating fluid containing such a composite carbonaceous material is applied to a current collector and the resultant coating is pressed to heighten the density of the negative electrode, then the crystals are apt to orient in directions parallel to the electrode plate and this may lead to a decrease in load characteristics. On the other hand, when the R value thereof exceeds the upper limit of that range, the surface of such particles has reduced crystallinity and enhanced reactivity with the electrolyte and this may lead to a decrease in efficiency and enhanced gas evolution.

The Raman half-value width around 1,580 $cm^{-1}$ of the composite carbonaceous material is not particularly limited. However, the half-value width thereof is generally 15 $cm^{-1}$ or larger, preferably 20 $cm^{-1}$ or larger. The upper limit thereof is generally 70 $cm^{-1}$ or smaller, preferably 60 $cm^{-1}$ or smaller, more preferably 50 $cm^{-1}$ or smaller. When the Raman half-value width thereof is smaller than the lower limit of that range, the surface of such particles has too high crystallinity and there are cases where the number of intercalation sites into which lithium comes with charge/discharge decreases. Namely, there are cases where suitability for charge decreases. In addition, when a coating fluid containing such a composite carbonaceous material is applied to a current collector and the resultant coating is pressed to heighten the density of the negative electrode, then the crystals are apt to orient in directions parallel to the electrode plate and this may lead to a decrease in load characteristics. On the other hand, when the Raman half-value width thereof exceeds the upper limit of that range, the surface of such particles has reduced crystallinity and enhanced reactivity with the electrolyte and this may lead to a decrease in efficiency and enhanced gas evolution.

(5) BET Specific Surface Area

The specific surface area of the composite carbonaceous material, as determined by the BET method, is generally 0.1 $m^2/g$ or larger, preferably 0.7 $m^2/g$ or larger, more preferably 1 $m^2/g$ or larger, even more preferably 1.5 $m^2/g$ or larger. The upper limit thereof is generally 100 $m^2/g$ or smaller, preferably 25 $m^2/g$ or smaller, more preferably 15 $m^2/g$ or smaller, even more preferably 10 $m^2/g$ or smaller. When the specific surface area thereof is smaller than the lower limit of that range, there are cases where use of this composite carbonaceous material as a negative-electrode material is apt to result in poor lithium acceptance during charge and in lithium deposition on the electrode surface. On the other hand, when the specific surface area thereof exceeds the upper limit of that range, there are cases where use of this composite carbonaceous material as a negative-electrode material is apt to result in enhanced reactivity with the electrolyte and enhanced gas evolution and a preferred battery is difficult to obtain.

(6) Pore Distribution

In the composite carbonaceous material, the amount of interstices corresponding to a pore diameter of from 0.01 μm to 1 μm which include pores in the particles and particle surface irregularities formed by steps, as determined by mercury porosimetry (mercury intrusion method), is generally 0.01 mL/g or larger, preferably 0.05 mL/g or larger, more preferably 0.1 mL/g or larger. The upper limit thereof is generally 0.6 mL/g or smaller, preferably 0.4 mL/g or smaller, more preferably 0.3 mL/g or smaller. When the amount of interstices therein is larger than the upper limit of that range, there are cases where a large amount of a binder is necessary in electrode plate formation. When the amount thereof is smaller than the lower limit, there are cases where high-current-density charge/discharge characteristics decrease and the effect of diminishing electrode expansion/contraction during charge/discharge is not obtained.

The total pore volume is preferably 0.1 mL/g or larger, more preferably 0.25 mL/g or larger. The upper limit thereof is generally 10 mL/g or smaller, preferably 5 mL/g or smaller, more preferably 2 mL/g or smaller. When the total pore volume exceeds the upper limit of that range, there are cases where a large amount of a binder is necessary in electrode plate formation. When the total pore volume is smaller than the lower limit, there are cases where the dispersing effect of a thickener or binder in electrode plate formation is not obtained.

The average pore diameter of the composite carbonaceous material is preferably 0.05 µm or larger, more preferably 0.1 µm or larger, even more preferably 0.5 µm or larger. The upper limit thereof is generally 80 µm or smaller, preferably 50 µm or smaller, more preferably 20 µm or smaller. When the average pore diameter thereof exceeds the upper limit of that range, there are cases where a large amount of a binder is necessary. When the average pore diameter thereof is smaller than the lower limit, there are cases where high-current-density charge/discharge characteristics decrease.

(7) Roundness

With respect to the degree of sphericity of the composite carbonaceous material, the roundness of the particles having a particle diameter in the range of 3-40 µm is preferably 0.85 or higher, more preferably 0.87 or higher, even more preferably 0.9 or higher. High roundness values are preferred because they are effective in improving high-current-density charge/discharge characteristics.

(8) True Density

The true density of the composite carbonaceous material is generally 1.9 g/cm$^3$ or higher, preferably 2 g/cm$^3$ or higher, more preferably 2.1 g/cm$^3$ or higher, even more preferably 2.2 g/cm$^3$ or higher. The upper limit thereof may be 2.26 g/cm$^3$ or lower. This upper limit is a theoretical value for graphites. When the true density of the composite carbonaceous material is lower than the lower limit of that range, there are cases where this carbon has too low crystallinity, resulting in an increase in initial irreversible capacity.

(9) Tap Density

The tap density of the composite carbonaceous material desirably is generally 0.1 g/cm$^3$ or higher, preferably 0.5 g/cm$^3$ or higher, more preferably 0.7 g/cm$^3$ or higher, especially preferably 1 g/cm$^3$ or higher. The tap density thereof is preferably 2 g/cm$^3$ or lower, more preferably 1.8 g/cm$^3$ or lower, especially preferably 1.6 g/cm$^3$ or lower. When the tap density thereof is lower than the lower limit of that range, there are cases where this composite carbonaceous material, when used in a negative electrode, is less apt to have a high loading density and cannot give a battery having a high capacity. On the other hand, when the tap density thereof exceeds the upper limit of that range, the amount of inter-particle interstices in the electrode is too small and it is difficult to secure electrical conductivity among the particles. There are hence cases where preferred battery performances are difficult to obtain. Tap density is determined by the same method as described above and is defined as described therein.

(10) Orientation Ratio (Powder)

The orientation ratio of the composite carbonaceous material is generally 0.005 or higher, preferably 0.01 or higher, more preferably 0.015 or higher. The upper limit thereof is theoretically 0.67 or lower. When the orientation ratio thereof is lower than the lower limit of that range, there are cases where high-density charge/discharge characteristics decrease.

(11) Aspect Ratio (Powder)

The aspect ratio of the composite carbonaceous material is theoretically 1 or higher. The upper limit thereof may be 10 or lower and is preferably 8 or lower, more preferably 5 or lower. When the aspect ratio thereof exceeds the upper limit, there are cases where this composite carbonaceous material causes streak lines in electrode plate formation and an even coating surface cannot be obtained, resulting in a decrease in high-current-density charge/discharge characteristics.

(Processes for Producing Composite Carbonaceous Material)

Processes for producing the composite carbonaceous material are not particularly limited. Examples thereof include the following methods.

Methods usable for combining a graphitic carbonaceous substance with a lowly crystalline carbonaceous substance include: a method in which a carbon precursor for obtaining a lowly crystalline carbonaceous substance is used as it is and a mixture of the carbon precursor and a powder of a graphitic carbonaceous substance is heat-treated to obtain the composite powder; a method which comprises partly carbonizing the carbon precursor to produce a powder of a lowly crystalline carbonaceous substance beforehand, mixing this powder with a powder of a graphitic carbonaceous substance, and heat-treating the mixture to combine the two substances; and a method which comprises producing the powder of a lowly crystalline carbonaceous substance beforehand, mixing a powder of a graphitic carbonaceous substance, the powder of a lowly crystalline carbonaceous substance, and a carbon precursor, and heat-treating the mixture to combine these substances. In the latter two methods, in which a powder of a lowly crystalline carbonaceous substance is prepared beforehand, it is preferred that the particles of the lowly crystalline carbonaceous substance to be used should have an average particle diameter not larger than one-tenth the average particle diameter of the particles of the graphitic carbonaceous substance. Also usable is a method in which the lowly crystalline carbonaceous substance produced beforehand is mixed with a graphitic carbonaceous substance while applying mechanical energy thereto by, e.g., pulverization to thereby impart thereto a structure in which one is surrounded by the other or a structure in which one is electrostatically adherent to the other.

In a preferred process, a mixture of particles of a graphitic carbonaceous substance and a carbon precursor is heated to obtain an intermediate, or a mixture of particles of a graphitic carbonaceous substance and particles of a lowly crystalline carbonaceous substance is mixed with a carbon precursor and this mixture is heated to obtain an intermediate. Thereafter, the intermediate is carbonized/heat-treated and pulverized to finally obtain a composite carbonaceous material comprising the particles of a graphitic carbonaceous substance and a lowly crystalline carbonaceous substance combined therewith.

This process for obtaining a composite carbonaceous material is divided into the following four steps.

First step: Either particles of a graphitic carbonaceous substance or a mixture of particles of a graphitic carbonaceous substance and particles of a lowly crystalline carbonaceous substance is mixed with a carbon precursor for particles of a lowly crystalline carbonaceous substance and optionally with a solvent by means of any of various commercial mixers, kneaders, etc. to obtain a mixture.

Second step: The mixture is heated to obtain an intermediate from which the solvent and any volatile ingredient generating from the carbon precursor have been removed. According to need, this heating may be conducted while stirring the mixture. Even when a volatile ingredient remains, this poses no problem because it will be removed in the subsequent step, i.e., the third step.

Third step: The mixture or intermediate is heated to a temperature of from 400° C. to 3,200° C. in an inert gas atmosphere such as nitrogen gas, carbon dioxide gas, or argon gas to obtain a graphite/lowly crystalline carbonaceous substance composite.

Fourth step: The composite is subjected to powder processing such as pulverization, disaggregation, classification, etc. according to need.

Of those steps, the second step and the fourth step can be omitted in some cases, and the fourth step may be conducted before the third step. However, in the case where the fourth step was conducted before the third step, powder processing such as pulverization, disaggregation, classification, etc. is conducted again according to need to obtain a composite carbonaceous material.

With respect to conditions for the heat treatment in the third step, heat hysteresis temperature conditions are important. The lower limit of the temperature is generally 400° C. or higher, preferably 900° C. or higher, although it changes slightly depending on the kind of the carbon precursor and the heat hysteresis thereof. On the other hand, with respect to upper-limit temperature, the mixture or intermediate can be heated basically to a temperature at which the carbon precursor does not come to have a structural order higher than the crystal structure of the graphitic carbonaceous substance particles as cores. Consequently, the upper-limit temperature in the heat treatment is generally 3,200° C. or lower, preferably 2,000° C. or lower, more preferably 1,500° C. or lower. Heating rate, cooling rate, heat treatment period, and the like, among conditions of such heat treatment, can be determined at will according to purposes. It is also possible to conduct a heat treatment in a relatively low-temperature region and then heat the work to a given temperature. The reactor to be used in the steps may be of the batch type or continuous type, and one reactor or two or more reactors may be used.

[[Minor-Material Mixing]]

Besides the composite carbonaceous material, one or more carbonaceous substances (carbonaceous materials) differing in carbonaceous-substance property from the composite carbonaceous material may be incorporated into the negative-electrode active material for use in a lithium secondary battery of the invention. Thus, battery performances can be further improved. The term "carbonaceous-substance property" herein means one or more properties selected from X-ray diffraction parameter, median diameter, aspect ratio, BET specific surface area, orientation ratio, Raman R value, tap density, true density, pore distribution, roundness, and ash content. Preferred embodiments include: one in which the volume-based particle size distribution is not symmetrical about the median diameter; one in which two or more carbon materials differing in Raman R value are contained; and one in which carbon materials differing in X-ray parameter are contained. One example of the effects thereof is that the incorporation of a carbon material, such as a graphite, e.g., a natural graphite or artificial graphite, or an amorphous carbon, e.g., a carbon black such as acetylene black or needle coke, as a sub material serves to reduce electrical resistance. One of these carbon materials may be used alone, or any desired two or more thereof may be used in combination in any desired proportion. In the case where such a carbon material is added as a sub material, the amount thereof may be 0.1% by mass or larger and is preferably 0.5% by mass or larger, more preferably 0.6% by mass or larger. The upper limit thereof may be 80% by mass or smaller and is preferably 50% by mass or smaller, more preferably 40% by mass or smaller, even more preferably 30% by mass or smaller. Amounts thereof smaller than the lower limit of that range are undesirable because they result in difficulties in obtaining the effect of improving conductivity. Amounts thereof exceeding the upper limit are undesirable because they lead to an increase in initial irreversible capacity.

[Negative Electrode [1]: Electrode Production]

Negative electrode [1] may be produced by an ordinary method. It can be formed in the same manner as described above. The current collector, thickness ratio between the current collector and the active-material layer, electrode density, binder, electrode-plate orientation ratio, impedance, etc. also are the same as described above.

<Negative Electrode [2]>

An explanation will be given below on negative electrode [2] for use in a lithium secondary battery of the invention, i.e., "a negative electrode containing as a negative-electrode active material at least one amorphous carbonaceous substance which, when examined by wide-angle X-ray diffractometry, has an interplanar spacing (d002) for the (002) planes of 0.337 nm or larger and a crystallite size (Lc) of 80 nm or smaller and which, in an examination by argon ion laser Raman spectroscopy, has a Raman R value defined as the ratio of the peak intensity at 1, 360 $cm^{-1}$ to the peak intensity at 1, 580 $cm^{-1}$ of 0.2 or higher".

[Negative Electrode [2]: Negative-Electrode Active Material]

The negative-electrode active material for use in negative electrode [2] is described below.

The negative-electrode active material for use in negative electrode [2] in a lithium secondary battery of the invention comprises an amorphous carbonaceous substance satisfying at least the following (a), (b), and (c).

(a) The interplanar spacing (d002) for the (002) planes as determined by wide-angle X-ray diffractometry is 0.337 nm or larger.

(b) The crystallite size (Lc) of the (002) planes as determined by wide-angle X-ray diffractometry is 80 nm or smaller.

(c) The Raman R value defined as the ratio of the peak intensity at 1,360 $cm^{-1}$ to the peak intensity at 1,580 $cm^{-1}$ in an examination by argon ion laser Raman spectroscopy (hereinafter often referred to simply as "Raman R value") is 0.2 or higher.

Although the negative-electrode active material for use in this invention comprises an amorphous carbonaceous substance satisfying at least (a), (b), and (c), the content of this amorphous carbonaceous substance in the whole negative-electrode active material is preferably 10% by mass or higher, especially preferably 50% by mass or higher. More preferably, the content thereof is 100%, i.e., this amorphous carbonaceous substance accounts for the whole negative-electrode active material. Negative-electrode active materials usable with this amorphous carbonaceous substance are not particularly limited, and known negative-electrode active materials such as artificial graphites and natural graphites may be used.

[[Interplanar Spacing (d002) and Lc]]

The interplanar spacing (d002) for the (002) planes of the amorphous carbonaceous substance for use as the negative-electrode active material of negative electrode [2] in a lithium secondary battery of the invention, as determined by wide-angle X-ray diffractometry, is 0.337 nm or larger, preferably 0.34 nm or larger. The upper limit thereof is generally 0.39 nm or smaller, preferably 0.38 nm or smaller, more preferably 0.37 nm or smaller, even more preferably 0.36 or smaller, especially preferably 0.35 or smaller. In case where the interplanar spacing (d002) thereof exceeds the upper limit of that range, crystallinity decreases considerably and the resultant decrease in conductivity among the particles becomes not negligible. There are hence cases where the effect of improving short-time high-current-density charge/discharge characteristics is difficult to obtain. On the other hand, when the interplanar spacing (d002) thereof is smaller than the lower limit of that range, there are cases where crystallinity is too high and the effect of improving short-time high-current-density charge/discharge characteristics is difficult to obtain.

The term "interplanar spacing (d002) for the (002) planes as determined by wide-angle X-ray diffractometry" in the invention means the value of d (interplanar spacing) of the lattice planes ((002) planes) as determined by X-ray diffractometry by the method of the Japan Society for Promotion of Scientific Research.

On the other hand, the crystallite size (Lc) for the (002) planes of the amorphous carbonaceous substance as determined by X-ray diffractometry by the method of the Japan Society for Promotion of Scientific Research is 80 nm or smaller, preferably 35 nm or smaller, more preferably 20 nm or smaller, even more preferably 10 nm or smaller. The lower limit thereof is generally 0.1 nm or larger, preferably 1 nm or larger. When the Lc thereof is smaller than the lower limit of that range, there are cases where crystallinity decreases considerably and the resultant decrease in conductivity among the particles becomes not negligible and where the effect of improving suitability for short-time high-current-density charge/discharge is difficult to obtain. On the other hand, when the Lc thereof exceeds the upper limit of that range, there are cases where crystallinity is too high and the effect of improving suitability for short-time high-current-density charge/discharge is difficult to obtain.

[[Raman R Value]]

The Raman R value of the amorphous carbonaceous substance for use as the negative-electrode active material of negative electrode [2] in a lithium secondary battery of the invention should be 0.2 or higher, and is preferably 0.5 or higher, especially preferably 0.7 or higher, more preferably 0.8 or higher. The upper limit thereof is preferably 1.5 or lower, more preferably 1.2 or lower. In case where the Raman R value thereof is lower than the lower limit of that range, the surface of such particles has too high crystallinity and suitability for charge decreases. There are hence cases where the effect of improving suitability for short-time high-current-density charge/discharge is difficult to obtain. On the other hand, in case where the Raman R value thereof exceeds the upper limit of that range, the surface of such particles has considerably reduced crystallinity, resulting in increased contact resistance among the particles. There are hence cases where the effect of improving suitability for short-time high-current-density charge/discharge is difficult to obtain.

The examination for a Raman spectrum is made with a Raman spectrometer (e.g., a Raman spectrometer manufactured by Japan Spectroscopic Co., Ltd.). In the examination, a sample is charged into a measuring cell by causing the sample to fall naturally into the cell and the surface of the sample in the cell is irradiated with argon ion laser light while rotating the cell in a plane perpendicular to the laser light. The Raman spectrum obtained is examined for the intensity $I_A$ of a peak $P_A$ at 1,580 cm$^{-1}$ and the intensity $I_B$ of a peak $P_B$ at 1,360 cm$^{-1}$. The ratio between these intensities R ($R=I_B/I_A$) is calculated and this ratio is defined as the Raman R value of the amorphous carbonaceous substance. Furthermore, the half-value width of the peak $P_A$ at 1,580 cm$^{-1}$ in the Raman spectrum obtained is measured, and this value is defined as the Raman half-value width of the amorphous carbonaceous substance.

Conditions for this Raman spectroscopy are as follows.
Wavelength of argon ion laser: 514.5 nm
Laser power on sample: 15-25 mW
Resolution: 10-20 cm$^{-1}$
Examination range: 1,100 cm$^{-1}$ to 1,730 cm$^{-1}$
Analysis for Raman R value and Raman half-value width: background processing
Smoothing: simple average; convolution, 5 points The Raman half-value width at 1,580 cm$^{-1}$ of the amorphous carbonaceous substance for use as the negative-electrode active material of negative electrode [2] in a lithium secondary battery of the invention is not particularly limited. However, the half-value width thereof is generally 20 cm$^{-1}$ or larger, preferably 25 cm$^{-1}$ or larger. The upper limit thereof is generally 150 cm$^{-1}$ or smaller, preferably 140 cm$^{-1}$ or smaller. In case where the Raman half-value width thereof is smaller than the lower limit of that range, the surface of such particles has too high crystallinity and suitability for charge decreases. There is hence a possibility that the effect of improving suitability for short-time high-current-density charge/discharge might be difficult to obtain. On the other hand, in case where the Raman half-value width thereof exceeds the upper limit of that range, the surface of such particles has considerably reduced crystallinity, resulting in increased contact resistance among the particles. There is hence a possibility that the effect of improving suitability for short-time high-current-density charge/discharge might be difficult to obtain. It is, however, noted that there are cases where the Raman half-value widths of some peaks cannot be judged because of the shapes of the peaks.

Although the amorphous carbonaceous substance for use in this invention satisfies the requirements concerning interplanar spacing (d002), crystallite size (Lc), and Raman R value described above, it is preferred from the standpoint of battery performance balance that the carbonaceous substance should further satisfy any one of the following requirements or simultaneously satisfy two or more thereof. It is especially preferred that any one of or two or more of true density, H/C value, O/C value, tap density, BET specific surface area, pore volume in the range of 0.01 μm to 1 μm, ash content, and volume-average particle diameter, among those requirements, should be simultaneously satisfied.

[[True Density]]

The true density of the amorphous carbonaceous substance is generally 2.22 g/cm$^3$ or lower, preferably 2.2 g/cm$^3$ or lower, more preferably 2.1 g/cm$^3$ or lower, even more preferably 2.0 g/cm$^3$ or lower. The lower limit thereof is generally 1.4 g/cm$^3$ or higher, preferably 1.5 g/cm$^3$ or higher, more preferably 1.6 g/cm$^3$ or higher, even more preferably 1.7 g/cm$^3$ or higher, especially preferably 1.8 g/cm$^3$ or higher. When the true density thereof is lower than the lower limit of that range, there are cases where this carbon has too low crystallinity, resulting in an increase in initial irreversible capacity. When the true density thereof exceeds the upper limit of that range, there are cases where this carbon has too high crystallinity and the effect of improving suitability for short-time high-current-density charge/discharge is difficult to obtain.

In the invention, true density is defined as one determined by the liquid-phase displacement method (pycnometer method) using butanol.

[[O/C Value]]

The upper limit of the atomic amount ratio O/C value of the amorphous carbonaceous substance is generally 0.15 or lower, preferably 0.1 or lower, more preferably 0.05 or lower, even more preferably 0.03 or lower. The lower limit thereof is generally 0 or higher, preferably 0.01 or higher.

The term O/C value means the ratio of the molar concentration of oxygen atoms in the amorphous carbonaceous substance to the molar concentration of carbon atoms therein. It is an index to the amount of functional groups, such as carboxyl, phenolic hydroxyl, and carbonyl groups, present in the substance. An amorphous carbonaceous substance having a high O/C value frequently has an oxygen-containing functional group bonded to, e.g., an edge face of the carbon crystallite. When the O/C value of the amorphous carbonaceous substance exceeds the upper limit of that range, there are cases where irreversible capacity increases.

[[H/C Value]]

The upper limit of the atomic amount ratio H/C value of the amorphous carbonaceous substance is generally 0.3 or lower, preferably 0.15 or lower, more preferably 0.1 or lower, even more preferably 0.08 or lower. The lower limit thereof is generally 0 or higher, preferably 0.01 or higher.

The term H/C value means the ratio of the molar concentration of hydrogen atoms in the amorphous carbonaceous substance to the molar concentration of carbon atoms therein. It is an index to the amount of hydrogen present in an edge face of the crystallite of the amorphous carbonaceous substance. An amorphous carbonaceous material having a high H/C value frequently has a large hydrogen amount relative to carbon amount in, e.g., edge faces of the carbon crystallites in the particle surface. When the H/C value of the amorphous carbonaceous substance exceeds the upper limit of that range, there are cases where irreversible capacity increases.

The terms "O/C value" and "H/C value" in the invention are values determined by the following CHN elemental analysis.

[[CHN Elemental Analysis]]

An amorphous carbonaceous substance to be examined was vacuum-dried at 120° C. for about 15 hours and then dried at 100° C. for 1 hour on a hot plate in a dry box. Subsequently, a sample was taken out of the dried carbonaceous substance and placed in an aluminum cup in an argon atmosphere, and this sample was heat-treated. The carbon content, hydrogen content, and nitrogen content were determined respectively from the weights of the CO2 gas, H2O, and NO2 generated by the combustion. The inorganic content was determined from the weight of the residue which remained after the combustion. The oxygen amount was determined by subtracting the carbon content, hydrogen content, nitrogen content, and inorganic content from the whole weight. From these values, the number of moles of each element was calculated. The O/C value and H/C value were determined from the numbers of moles of the elements contained, using the following equations.

O/C value=(number of moles of oxygen contained)/(number of moles of carbon contained)

H/C value(number of moles of hydrogen contained)/(number of moles of carbon contained)

[[Tap Density]]

The tap density of the amorphous carbonaceous substance for use as the negative-electrode active material of negative electrode [2] in a lithium secondary battery of the invention is preferably 0.1 g/cm$^3$ or higher, more preferably 0.2 g/cm$^3$ or higher, even more preferably 0.5 g/cm$^3$ or higher, especially preferably 0.7 g/cm$^3$ or higher. The upper limit thereof is preferably 1.4 g/cm$^3$ or lower, more preferably 1.2 g/cm$^3$ or lower, especially preferably 1.1 g/cm$^3$ or lower. In case where the tap density thereof is lower than the lower limit of that range, this amorphous carbonaceous substance, when used in a negative electrode, is less apt to have a high loading density and has a reduced interparticle contact area. There are hence cases where interparticle resistance increases and short-time high-current-density chare/discharge characteristics decrease. On the other hand, in case where the tap density thereof exceeds the upper limit of that range, the electrode has too small an amount of interparticle interstices and a reduced amount of channels for the non-aqueous electrolyte. There are hence cases where short-time high-current-density chare/discharge characteristics decrease.

In the invention, the tap density of a sample is determined by dropping the sample through a sieve having an opening size of 300 μm into a 20-cm$^3$ tapping cell to fill the cell with the sample up to the brim, subsequently conducting tapping operations 1,000 times over a stroke length of 10 mm using a powder densimeter (e.g., Tap Denser, manufactured by Seishin Enterprise Co., Ltd.), and determining a density from the resultant volume of the sample and the weight thereof. This density is defined as the tap density.

[[BET Specific Surface Area]]

The specific surface area of the amorphous carbonaceous substance for use as the negative-electrode active material of negative electrode [2] in a lithium secondary battery of the invention, as determined by the BET method, is preferably 0.1 m$^2$/g or larger, especially preferably 0.5 m$^2$/g or larger, more preferably 0.7 m$^2$/g or larger, even more preferably 1.5 m$^2$/g or larger. The upper limit thereof is preferably 100 m$^2$/g or smaller, especially preferably 50 m$^2$/g or smaller, more preferably 25 m$^2$/g or smaller, even more preferably 15 m$^2$/g or smaller. When the BET specific surface area thereof is smaller than the lower limit of that range, there are cases where use of this amorphous carbonaceous substance as a negative-electrode material is apt to result in poor lithium acceptance during charge and in lithium deposition on the electrode surface. On the other hand, when the specific surface area thereof exceeds the upper limit of that range, there are cases where use of this amorphous carbonaceous substance as a negative-electrode material is apt to result in enhanced reactivity with the nonaqueous electrolyte and enhanced gas evolution and a preferred battery is difficult to obtain.

BET specific surface area is defined as a value measured with a surface area meter (e.g., a fully automatic surface area measuring apparatus manufactured by Ohukura Riken Co., Ltd.) by preliminarily drying a sample at 350° C. for 15 minutes in a nitrogen stream and then measuring the specific surface area thereof by the gas-flowing nitrogen adsorption BET one-point method using a nitrogen/helium mixture gas precisely regulated so as to have a nitrogen pressure of 0.3 relative to atmosphere pressure.

[[Volume-Average Particle Diameter]]

The volume-average particle diameter of the amorphous carbonaceous substance for use as the negative-electrode active material of negative electrode [2] in a lithium secondary battery of the invention, which is defined as the volume-average particle diameter (median diameter) determined by the laser diffraction/scattering method, is preferably 1 μm or larger, especially preferably 3 μm or larger, more preferably 5 μm or larger, even more preferably 7 μm or larger. The upper limit thereof is generally 50 μm or smaller, preferably 40 μm or smaller, more preferably 30 μm or smaller, even more preferably 25 μm or smaller. When the volume-average particle diameter thereof is smaller than the lower limit of that range, there are cases where irreversible capacity increases, leading to a loss in initial battery capacity. When the volume-average particle diameter thereof exceeds the upper limit of that range, there are cases where such an amorphous carbonaceous substance is undesirable from the standpoint of battery production because an uneven coating surface is apt to result when an electrode plate is produced.

[[Pore Volume]]

With respect to the pore volume of the amorphous carbonaceous substance for use as the negative-electrode active material of negative electrode [2] in a lithium secondary battery of the invention, the amount of interstices corresponding to a pore diameter of from 0.01 μm to 1 μm which include pores in the particles and particle surface irregularities formed by steps, as determined by mercury porosimetry (mercury intrusion method), may be 0.01 mL/g or larger and is preferably 0.05 mL/g or larger, more preferably 0.1 mL/g or larger. The upper limit thereof may be 0.6 mL/g or smaller and is preferably 0.4 mL/g or smaller, more preferably 0.3 mL/g or smaller. When the amount of interstices therein is larger than the upper limit of that range, there are cases where a large amount of a binder is necessary in electrode plate formation. When the amount thereof is smaller than the lower limit, there are cases where short-time high-current-density charge/discharge characteristics decrease and the effect of diminishing electrode expansion/contraction during charge/discharge is not obtained.

The total pore volume is preferably 0.1 mL/g or larger, more preferably 0.25 mL/g or larger. The upper limit thereof is generally 10 mL/g or smaller, preferably 5 mL/g or smaller, more preferably 2 mL/g or smaller. When the total pore volume exceeds the upper limit of that range, there are cases where a large amount of a binder is necessary in electrode plate formation. When the total pore volume is smaller than the lower limit, there are cases where the dispersing effect of a thickener or binder in electrode plate formation is not obtained.

The average pore diameter of the amorphous carbonaceous substance is preferably 0.05 μm or larger, more preferably 0.1 μm or larger, even more preferably 0.5 μm or larger. The upper limit thereof is generally 50 μm or smaller, preferably 20 μm or smaller, more preferably 10 μm or smaller. When the average pore diameter thereof exceeds the upper limit of that range, there are cases where a large amount of a binder is necessary. When the average pore diameter thereof is smaller than the lower limit, there are cases where short-time high-current-density charge/discharge characteristics decrease.

As an apparatus for the mercury porosimetry is used a mercury porosimeter (Autopore 9520, manufactured by Micromeritics Corp.). About 0.2 g of a sample (negative-electrode material) is weighed out and placed in a powder cell and this cell is closed. The sample in the cell is pretreated by degassing it at room temperature under vacuum (50 μmHg or lower) for 10 minutes. Subsequently, the pressure in the cell is reduced to 4 psia (about 28 kPa) and mercury is introduced thereinto. The internal pressure is stepwise elevated from 4 psia (about 28 kPa) to 40,000 psia (about 280 MPa) and then lowered to 25 psia (about 170 kPa). The number of steps in the pressure elevation is 80 or larger. In each step, the amount of mercury intruded is measured after an equilibrium time of 10 seconds. A pore distribution is calculated from the mercury intrusion curve thus obtained, using the Washburn equation. For the calculation, the surface tension (γ) and contact angle (ψ) of mercury are taken as 485 dyne/cm and 140°, respectively. The average pore diameter used is the pore diameter corresponding to a cumulative pore volume of 50%.

[[Ash Content]]

The ash content of the amorphous carbonaceous substance for use as the negative-electrode active material of negative electrode [2] in a lithium secondary battery of the invention is preferably 1% by mass or lower, especially preferably 0.5% by mass or lower, more preferably 0.1% by mass or lower, based on the whole amorphous carbonaceous substance. The lower limit thereof is preferably 1 ppm by mass or higher. When the ash content thereof exceeds the upper limit of that range, there are cases where battery performance deterioration caused by reaction with the non-aqueous electrolyte during charge/discharge becomes not negligible. On the other hand, when the ash content thereof is lower than the lower limit of that range, there are cases where the production of this carbonaceous substance necessitates much time and energy and an apparatus for pollution prevention, resulting in an increase in cost.

[[Roundness]]

The roundness of the amorphous carbonaceous substance for use as the negative-electrode active material of negative electrode [2] in a lithium secondary battery of the invention is generally 0.1 or higher, preferably 0.8 or higher, more preferably 0.85 or higher, especially preferably 0.9 or higher. With respect to the upper limit thereof, a particle having a roundness of 1 theoretically is a true sphere. In case where the roundness thereof is lower than the lower limit of that range, use of this negative-electrode active material results in a reduced loading and interparticle resistance increases. There are hence cases where short-time high-current-density charge/discharge characteristics decrease.

In the invention, roundness is defined by the following equation.

Roundness=(length of periphery of equivalent circle having the same area as projected particle shape)/(actual length of periphery of projected particle shape)

The value of roundness is determined, for example, with a flow type particle image analyzer (e.g., FPIA, manufactured by Sysmex Industrial Corp.) by dispersing about 0.2 g of a sample in a 0.2% by mass aqueous solution (about 50 mL) of poly(oxyethylene(20)) sorbitan monolaurate as a surfactant, propagating an ultrasonic wave of 28 kHz to the dispersion for 1 minute at an output of 60 W, subsequently examining particles having a particle diameter in the range of 3-40 μm with the analyzer having a detection range set at 0.6-400 μm, and averaging the measured values.

[[Orientation Ratio]]

The orientation ratio of the amorphous carbonaceous substance for use as the negative-electrode active material of negative electrode [2] in a lithium secondary battery of the invention is generally 0.005 or higher, preferably 0.01 or higher, more preferably 0.015 or higher. The upper limit thereof is theoretically 0.67 or lower. When the orientation ratio thereof is lower than the lower limit of that range, there are cases where short-time high-density charge/discharge characteristics decrease.

Orientation ratio is determined by X-ray diffractometry. The peaks attributable to the (110) diffraction and (004) diffraction of the carbon obtained by X-ray diffractometry are subjected to peak separation by fitting with asymmetric Pearson VII as a profile function. Thus, the integrated intensities of the (110) diffraction and (004) diffraction peaks are calculated. From the integrated intensities obtained, the ratio represented by (integrated intensity of (110) diffraction)/(integrated intensity of (004) diffraction) is calculated. This ratio is defined as the active-material orientation ratio.

Conditions for this X-ray diffractometry are as follows. Incidentally, "2θ" represents diffraction angle.

Target: Cu(Kα line) graphite monochromator
Slit:
  Divergence slit=1 degree
  Receiving slit=0.1 mm
  Scattering slit=1 degree
Examination range and step angle/measuring time:
  (110) plane: 76.5°≤2θ≤78.5° 0.01°/3 sec
  (004) plane: 53.5°≤2θ≤56.0° 0.01°/3 sec

[[Aspect Ratio]]

The aspect ratio of the amorphous carbonaceous substance for use as the negative-electrode active material of negative electrode [2] in a lithium secondary battery of the invention is theoretically 1 or higher. The upper limit thereof is generally 10 or lower, preferably 8 or lower, more preferably 5 or lower. When the aspect ratio thereof exceeds the upper limit, there are cases where this amorphous carbonaceous material causes streak lines in electrode plate formation and an even coating surface cannot be obtained, resulting in a decrease in short-time high-current-density charge/discharge characteristics.

The aspect ratio of a particle is represented by A/B, wherein A is the length of the longest axis of the particle in a three-dimensional examination and B is the length of the shortest axis perpendicular to that axis. The examination of particles is made with a scanning electron microscope capable of enlargement examination. Fifty are arbitrarily selected from particles fixed to an edge face of a metal having a thickness of 50 μm or smaller, and each particle is examined for A and B while rotating or inclining the stage to which the sample is fixed. The average of the A/B values is determined.

The amorphous carbonaceous substance contained as the negative-electrode active material of negative electrode [2] in a lithium secondary battery of the invention preferably is an amorphous carbonaceous substance selected from the following (1) to (4):

(1) one obtained by further heat-treating a carbonization product selected from the group consisting of coal coke, petroleum coke, furnace black, acetylene black, and pitch-derived carbon fibers;

(2) an organic substance selected from the group consisting of pitch materials, aromatic hydrocarbons, nitrogen-ring compounds, sulfur-ring compounds, polyphenylenes, organic synthetic polymers, natural polymers, thermoplastic resins, and thermosetting resins and/or a product of the pyrolysis of the organic substance and/or a substance obtained by further heat-treating the pyrolysis product;

(3) a product of the pyrolysis of a solution obtained by dissolving the organic substance (2) in a low-molecular organic solvent and/or a substance obtained by further heat-treating the pyrolysis product; and (4) a product of the carbonization of a gas containing an organic substance.

The substance in (2) is not particularly limited as long as it is capable of carbonization. Examples thereof include the following organic substances: pitch materials; aromatic hydrocarbons such as acenaphthylene, decacyclene, anthracene, and phenanthrene; nitrogen-ring compounds such as phenazine and acridine; sulfur-ring compounds such as thiophene and bithiophene; polyphenylenes such as biphenyl and terphenyl; poly(vinylchloride), poly(vinylalcohol), poly(vinylbutyral), substances obtained by crosslinking or insolubilizing these compounds; nitrogen-containing organic polymers such as polyacrylonitrile and polypyrrole; sulfur-containing organic polymers such as polythiophene; organic polymers such as polystyrene; natural polymers such as polysaccharides represented by cellulose, lignin, mannan, poly(galacturonic acid), chitosan, and saccharose; thermoplastic resins such as poly(phenylene sulfide) and poly(phenylene oxide); thermosetting resins such as furfuryl alcohol resins, phenol-formaldehyde resins, and imide resins; and solutions obtained by dissolving any of such organic substances in a low-molecular organic solvent, e.g., benzene, toluene, xylene, quinoline, or n-hexane. Examples thereof further include gases capable of carbonization and containing any of those organic substances.

Preferred of these are pitch materials. This is because pitch materials have a high actual carbon ratio and, hence, can give a material in high yield. The term "pitch material" in this description means a substance which is a pitch or a similar material and can be carbonized or graphitized by an appropriate treatment. Examples of the pitch materials which can be used include tars, heavy oils, and pitches. Examples of the tars include coal tar and petroleum tar. Examples of the heavy oils include petroleum-derived heavy oils such as catalytically cracked oil, thermally cracked oil, topping residues, and vacuum distillation residues. Examples of the pitches include coal tar pitch, petroleum pitch, and synthetic pitch. Of these, coal tar pitch is preferred because it has high aromaticity. Anyone of these pitch materials may be used alone, or any desired two or more thereof may be used in combination in any desired proportion.

With respect to (3), preferred examples thereof include a carbonization product obtained from a precursor which is a product of the pyrolysis of a solution of the organic substance (2) in a low-molecular organic solvent such as benzene, toluene, xylene, quinoline, or n-hexane.

With respect to (4), examples include hydrocarbon compounds such as methane, ethane, propane, benzene, acetylene, and ethylene; and carbon monoxide.

To conduct a crosslinking treatment is also preferred. A crosslinking treatment is conducted for the purpose of giving a crosslinked pitch material or the like which, when heat-treated, gives a carbonaceous material which is less apt to be graphitized. By conducting this treatment, charge capacity per unit mass can be increased.

Examples of the crosslinking treatment include: a crosslinking treatment in which a vinyl monomer such as divinylbenzene, trivinylbenzene, diallyl phthalate, ethylene glycol dimethacrylate, or N,N-methylenebisacrylamide is used in combination with a radical polymerization initiator such as α,α'-azobisisobutyronitrile (AIBN), benzoyl peroxide (BPO), lauryl peroxide, cumene hydroperoxide, t-butyl hydroperoxide, or hydrogen peroxide; and an oxidizing agent treatment in which an oxidizing gas such as oxygen, ozone, or nitrogen dioxide or an oxidizing liquid such as sulfuric acid, nitric acid, or an aqueous hydrogen peroxide solution is used. One example of methods for such crosslinking treatments comprises mixing a pitch material kept at 50° C.-400° C. with a crosslinking agent, oxidizing agent, etc. to treat the material.

[[Li-NMR Shift]]

When an amorphous carbonaceous substance for use as the negative-electrode active material of negative electrode [2] in a lithium secondary battery of the invention is charged to a fully charged state and subjected, in this state, to 7Li-NMR analysis, then there are cases where a main resonance peak is observed in a position shifted by 80-200 ppm to the low-magnetic-field side from the resonance line for LiCl as a reference. This amorphous carbonaceous substance has an increased capacity per unit mass. It is therefore preferred to use an amorphous carbonaceous substance which has undergone a crosslinking treatment.

[[Processes for Producing Amorphous Carbonaceous Substance]]

Processes for producing the amorphous carbonaceous substance described above are not particularly limited unless they depart from the spirit of the invention. Examples thereof include several processes. For producing the amorphous carbonaceous substance, it is necessary to conduct a heat treatment one or more times. However, a heat treatment may be conducted in two or more portions. It is also preferred to conduct any of various treatments before or after a heat treatment and/or during the heat treatment. Examples of the various treatments include pulverization, classification, and the crosslinking treatment described above. The pulverization and classification treatments can be conducted in any stage, i.e., before, after, or during the heat treatment, as long as the carbonaceous substance is solid. In the case of the crosslinking treatment, it preferably is conducted before or during the heat treatment. By conducting these treatments, the specific surface area of the negative-electrode active material can be regulated and the capacity thereof per unit mass can be increased.

Apparatus usable for the pulverization before the heat treatment are not particularly limited. Examples of coarse pulverizers include shearing mills, jaw crushers, impact crushers, and cone crushers. Examples of intermediate pulverizers include roll crushers and hammer mills. Examples of fine pulverizers include ball mills, oscillating mills, pin mills, stirring mills, and jet mills.

Apparatus usable for the heat treatment of a raw material are not particularly limited. For example, use can be made of a reaction vessel such as a shuttle furnace, tunnel kiln, electric furnace, Riedhammer furnace, rotary kiln, or autoclave, a coker (heat-treatment vessel for coke production), a direct voltage application type electric furnace, or the like. During the treatment of a raw material, stirring may be conducted according to need.

Temperature conditions in the case of conducting the heat treatment are not particularly limited. However, the temperature is generally 600° C. or higher, preferably 900° C. or higher. The upper limit thereof is generally 2,500° C. or lower, preferably 1,300° C. or lower. In case where the temperature conditions are lower than the lower limit of that range, there is a possibility that crystallinity might become too low, resulting in an increase in irreversible capacity. On the other hand, in case where the temperature exceeds the upper limit of that range, there is a possibility that crystallinity might become too high, resulting in reduced short-time high-current-density charge/discharge characteristics.

The amorphous carbonaceous substance which has undergone the heat treatment may be subjected to pulverization and classification according to the size of the aggregates or particles. Apparatus usable for the pulverization are not particularly limited. Examples of crushers include shearing mills, jaw crushers, impact crushers, and cone crushers. Examples of intermediate pulverizers include roll crushers and hammer mills. Examples of pulverizers include ball mills, oscillating mills, pin mills, stirring mills, and jet mills. Apparatus usable for the classification are not particularly limited. However, in the case of dry sieving, use can be made of a rotary sieve, swing sieve, revolving sieve, vibrating sieve, or the like. In the case of dry air classification, use can be made of a gravitational classifier, inertial classifier, or centrifugal classifier (e.g., classifier or cyclone). Furthermore, for wet sieving, use can be made of a mechanical wet classifier, hydraulic classifier, sedimentation classifier, centrifugal wet classifier, or the like.

[Negative Electrode [2]: Electrode Production]

Negative electrode [2] may be produced by an ordinary method. It can be formed in the same manner as described above. The current collector, thickness ratio between the current collector and the active-material layer, electrode density, binder, electrode-plate orientation ratio, impedance, etc. also are the same as described above.

<Negative Electrode [3]>

An explanation will be given below on negative electrode [3] for use in a lithium secondary battery of the invention, i.e., "a negative electrode containing as a negative-electrode active material a titanium-containing metal oxide capable of occluding and releasing lithium".

[Negative Electrode [3]: Negative-Electrode Active Material]

The negative-electrode active material for use in negative electrode [3] is described below.

[[Constitution of Negative-Electrode Active Material]]

The negative-electrode active material for use in negative electrode [3] in a lithium secondary battery of the invention contains a titanium-containing metal oxide capable of occluding and releasing lithium. Preferred of such metal oxides is a composite oxide of lithium and titanium (hereinafter abbreviated to "lithium-titanium composite oxide"). Furthermore, the metal oxide preferably is a titanium-containing metal oxide having a spinel structure. A metal oxide simultaneously satisfying these, i.e., a lithium-titanium composite oxide having a spinel structure, is especially preferred because use of this composite oxide in the negative-electrode active material for a lithium secondary battery is effective in considerably reducing output resistance.

Also preferred are lithium-titanium composite oxides in which the lithium or titanium has been replaced by one or more other metallic elements, e.g., at least one element selected from the group consisting of Na, K, Co, Al, Fe, Ti, Mg, Cr, Ga, Cu, Zn, and Nb.

The metal oxide preferably is a lithium-titanium composite oxide represented by general formula (1) wherein $0.7 \leq x \leq 1.5$, $1.5 \leq y \leq 2.3$, and $0 \leq z \leq 1.6$, because the structure thereof is stable during lithium ion doping/undoping.

$$Li_xTi_yM_zO_4 \tag{1}$$

[In general formula (1), M represents at least one element selected from the group consisting of Na, K, Co, Al, Fe, Ti, Mg, Cr, Ga, Cu, Zn, and Nb.]

Of the compositions represented by general formula (1), the following structures are especially preferred because they bring about a satisfactory balance among battery performances.

Structures represented by general formula (1), i.e., $Li_xTi_yM_zO_4$, wherein
(a) $1.2 \leq x \leq 1.4$, $1.5 \leq y \leq 1.7$, and $z=0$;
(b) $0.9 \leq x \leq 1.1$, $1.9 \leq y \leq 2.1$, and $z=0$; or
(c) $0.7 \leq x \leq 0.9$, $2.1 \leq y \leq 2.3$, and $z=0$.

Especially preferred typical compositions of those compounds are: $Li_{4/3}Ti_{5/3}O_4$ for (a), $Li_1Ti_2O_4$ for (b), and $Li_{4/5}Ti_{11/5}O_4$ for (c).

Preferred examples of the structure wherein $z \neq 0$ include $Li_{4/3}Ti_{4/3}Al_{1/3}O_4$.

[[Properties, Shape, etc. of Negative-Electrode Active Material]]

It is preferred that the negative-electrode active material for use in negative electrode [3] in a lithium secondary battery of the invention should satisfy at least one of the following properties besides the requirements described above. Especially preferably, the negative-electrode active material simultaneously satisfies two or more of the following properties besides the requirements described above.

[[[BET Specific Surface Area]]]

The specific surface area of the titanium-containing metal oxide for use as the negative-electrode active material in negative electrode [3] in a lithium secondary battery of the invention, as determined by the BET method, is preferably 0.5 $m^2/g$ or larger, more preferably 0.7 $m^2/g$ or larger, especially preferably 1.0 $m^2/g$ or larger, even more preferably 1.5 $m^2/g$ or larger. The upper limit thereof is preferably 200 $m^2/g$ or smaller, more preferably 100 $m^2/g$ or smaller, especially preferably 50 $m^2/g$ or smaller, even more preferably 25 $m^2/g$ or smaller. When the BET specific surface area thereof is smaller than the lower limit of that range, there are cases where use of this metal oxide as a negative-electrode material results in a reduced reaction area available for contact with the nonaqueous electrolyte and in an increase in output resistance. On the other hand, in case where the BET specific surface area thereof exceeds the upper limit of that range, the proportion of surfaces and edge faces of crystals of the titanium-containing metal oxide increases and this causes crystal deformation. There are hence cases where irreversible capacity becomes not negligible and a preferred battery is difficult to obtain.

BET specific surface area is defined as a value measured with a surface area meter (e.g., a fully automatic surface area measuring apparatus manufactured by Ohukura Riken Co., Ltd.) by preliminarily drying a sample at 350° C. for 15 minutes in a nitrogen stream and then measuring the specific surface area thereof by the gas-flowing nitrogen adsorption BET one-point method using a nitrogen/helium mixture gas precisely regulated so as to have a nitrogen pressure of 0.3 relative to atmosphere pressure.

[[[Volume-Average Particle Diameter]]]

The volume-average particle diameter (secondary-particle diameter in the case where the primary particles have aggregated to form secondary particles) of the titanium-containing metal oxide for use as the negative-electrode active material in negative electrode [3] in a lithium secondary battery of the invention, which is defined as the volume-average particle diameter (median diameter) determined by the laser diffraction/scattering method, is preferably 0.1 μm or larger, more preferably 0.5 μm or larger, even more preferably 0.7 μm or larger. The upper limit thereof is generally 50 μm or smaller, preferably 40 μm or smaller, more preferably 30 μm or smaller, even more preferably 25 μm or smaller. When the volume-average particle diameter thereof is smaller than the lower limit of that range, there are cases where a large amount of a binder is necessary in electrode production and this results in a decrease in battery capacity. When the volume-average particle diameter thereof exceeds the upper limit of that range, there are cases where such a metal oxide is undesirable from the standpoint of battery production because an uneven coating surface is apt to result when an electrode plate is produced.

[[[Average Primary-Particle Diameter]]]

In the case where the primary particles have aggregated to form secondary particles, the average primary-particle diameter of the titanium-containing metal oxide for use as the negative-electrode active material in a lithium secondary battery of the invention is preferably 0.01 μm or larger, more preferably 0.05 μm or larger, even more preferably 0.1 μm or larger, most preferably 0.2 μm or larger. The upper limit thereof is preferably 2 μm or smaller, more preferably 1.6 μm or smaller, even more preferably 1.3 μm or smaller, most preferably 1 μm or smaller. In case where the average primary-particle diameter thereof exceeds the upper limit, spherical secondary particles are difficult to form and this adversely influences powder loading or results in a considerably reduced specific surface area. There may hence be a high possibility that battery performances such as output characteristics might decrease. Conversely, when the average primary-particle diameter thereof is smaller than the lower limit, crystal growth is usually insufficient and, hence, there are cases where this positive-electrode active material poses a problem, for example, that charge/discharge reversibility is poor.

Primary-particle diameter is determined through an examination with a scanning electron microscope (SEM). Specifically, arbitrarily selected 50 primary-particle images in a photograph having a magnification capable of particle observation, e.g., 10,000-100,000 diameters, each are examined for the length of the longest segment of a horizontal line which extends across the primary-particle image from one side to the other side of the boundary. These measured lengths are averaged, whereby the average value can be determined.

[[[Shape]]]

The particle shape of the titanium-containing metal oxide for use in negative electrode [3] in a lithium secondary battery of the invention may be any of massive, polyhedral, spherical, ellipsoidal, platy, acicular, columnar, and other shapes such as those in common use. Preferred of these is one in which the primary particles have aggregated to form secondary particles and these secondary particles have a spherical or ellipsoidal shape. In electrochemical elements, the active material in each electrode usually expands/contracts with the charge/discharge of the element and, hence, deterioration is apt to occur, such as active-material breakage and conduction path breakage, due to the stress caused by the expansion/contraction. Because of this, a positive-electrode active material in which the primary particles have aggregated to form secondary particles is preferable to an active material composed of primary particles only since the particles in the former active material relieve the stress caused by expansion/contraction to prevent deterioration. Furthermore, particles of a spherical or ellipsoidal shape are preferable to particles showing axial orientation, e.g., platy ones, because the former particles are less apt to orient during electrode molding and hence this electrode is reduced in expansion/contraction during charge/discharge, and because these particles are apt to be evenly mixed with a conductive material in electrode production.

[[[Tap Density]]]

The tap density of the titanium-containing metal oxide for use as the negative-electrode active material in negative electrode [3] in a lithium secondary battery of the invention is preferably 0.05 $g/cm^3$ or higher, more preferably 0.1 $g/cm^3$ or higher, even more preferably 0.2 $g/cm^3$ or higher, especially preferably 0.4 $g/cm^3$ or higher. The upper limit thereof is preferably 2.8 $g/cm^3$ or lower, more preferably 2.4 $g/cm^3$ or lower, especially preferably 2 $g/cm^3$ or lower. In case where the tap density thereof is lower than the lower limit of that range, this metal oxide, when used in a negative electrode, is less apt to have a high loading density and has a reduced interparticle contact area. There are hence cases where interparticle resistance increases and output resistance increases. On the other hand, in case where the tap density thereof exceeds the upper limit of that range, the electrode has too small an amount of interparticle interstices and a reduced amount of channels for the nonaqueous electrolyte. There are hence cases where output resistance increases.

In the invention, the tap density of a sample is determined by dropping the sample through a sieve having an opening size of 300 μm into a 20-cm$^3$ tapping cell to fill the cell with the sample up to the brim, subsequently conducting tapping operations 1,000 times over a stroke length of 10 mm using a powder densimeter (e.g., Tap Denser, manufactured by Seishin Enterprise Co., Ltd.), and determining a density from the resultant volume of the sample and the weight thereof. This density is defined as the tap density.

[[[Roundness]]]

The roundness of the titanium-containing metal oxide for use as the negative-electrode active material of negative electrode [3] in a lithium secondary battery of the invention is generally 0.10 or higher, preferably 0.80 or higher, more preferably 0.85 or higher, especially preferably 0.90 or higher. With respect to the upper limit thereof, a particle having a roundness of 1 theoretically is a true sphere. In case where the roundness thereof is lower than the lower limit of that range, use of this negative-electrode active material results in a reduced loading and interparticle resistance increases. There are hence cases where short-time high-current-density charge/discharge characteristics decrease.

In the invention, roundness is defined by the following equation.

Roundness=(length of periphery of equivalent circle having the same area as projected particle shape)/(actual length of periphery of projected particle shape)

The value of roundness is determined with a flow type particle image analyzer (e.g., FPIA, manufactured by Sysmex Industrial Corp.) by dispersing about 0.2 g of a sample in a 0.2% by mass aqueous solution (about 50 mL) of poly(oxyethylene(20)) sorbitan monolaurate as a surfactant, propagating an ultrasonic wave of 28 kHz to the dispersion for 1 minute at an output of 60 W, and then examining particles having a particle diameter in the range of 3-40 μm with the analyzer having a detection range set at 0.6-400 μm.

[[[Aspect Ratio]]]

The aspect ratio of the titanium-containing metal oxide for use as the negative-electrode active material of negative electrode [3] in a lithium secondary battery of the invention is theoretically 1 or higher. The upper limit thereof may be 5 or lower and is preferably 4 or lower, more preferably 3 or lower, even more preferably 2 or lower. When the aspect ratio thereof exceeds the upper limit, there are cases where this metal oxide causes streak lines in electrode plate formation and an even coating surface cannot be obtained, resulting in a decrease in short-time high-current-density charge/discharge characteristics.

The aspect ratio of a particle is represented by A/B, wherein A is the length of the longest axis of the particle in a three-dimensional examination and B is the length of the shortest axis perpendicular to that axis. The examination of particles is made with a scanning electron microscope capable of enlargement examination. Fifty are arbitrarily selected from particles fixed to an edge face of a metal having a thickness of 50 μm or smaller, and each particle is examined for A and B while rotating or inclining the stage to which the sample is fixed. The average of the A/B values is determined.

[[Processes for Producing Negative-Electrode Active Material]]

Processes for producing the negative-electrode active material of negative electrode [3] in a lithium secondary battery of the invention are not particularly limited unless they depart from the spirit of the invention. Examples thereof include several processes, and processes in general use for producing inorganic compounds may be employed. For example, use may be made of a method in which a titanium source, e.g., titanium oxide, is evenly mixed with an Li source, e.g., LiOH, $Li_2CO_3$, or $LiNO_3$, and optionally with a source of other element (s) and this mixture is heat-treated at a high temperature to obtain the active material. Especially for producing spherical or ellipsoidal active materials, various techniques are usable. Examples thereof include: a method which comprises dissolving or pulverizing/dispersing a titanium source, e.g., titanium oxide, optionally together with a source of other element(s) in a solvent, e.g., water, regulating the pH of the solution or dispersion with stirring to produce a spherical precursor, recovering and optionally drying the precursor, subsequently adding thereto an Li source, e.g., LiOH, $Li_2CO_3$, or $LiNO_3$, and heat-treating the mixture at a high temperature to obtain the active material; a method which comprises dissolving or pulverizing/dispersing a titanium source, e.g., titanium oxide, optionally together with a source of other element(s) in a solvent, e.g., water, drying and forming the solution or dispersion with a spray dryer or the like to obtain a spherical or ellipsoidal precursor, adding thereto an Li source, e.g., LiOH, $Li_2CO_3$, or $LiNO_3$, and heat-treating the mixture at a high temperature to obtain the active material; and a method which comprises dissolving or pulverizing/dispersing a titanium source, e.g., titanium oxide, together with an Li source, e.g., LiOH, $Li_2CO_3$, or $LiNO_3$, and optionally with a source of other element(s) in a solvent, e.g., water, drying and forming the solution or dispersion with a spray dryer or the like to obtain a spherical or ellipsoidal precursor, and heat-treating the precursor at a high temperature to obtain the active material.

In those steps, one or more of elements other than Ti, such as, e.g., Al, Mn, Ti, V, Cr, Mn, Fe, Co, Li, Ni, Cu, Zn, Mg, Ga, Zr, C, Si, Sn, and Ag, can be caused to be present in the titanium-containing metal oxide structure and/or present so as be in contact with the titanium-containing oxide. The incorporation of such elements can be used for regulating the operating voltage and capacity of the battery.

[Negative Electrode [3]: Electrode Production]

Negative electrode [3] may be produced by an ordinary method. It can be formed in the same manner as described above. The current collector, thickness ratio between the current collector and the active-material layer, electrode density, binder, electrode-plate orientation ratio, impedance, etc. also are the same as described above.

<Negative Electrode [4]>

An explanation will be given below on negative electrode [4] for use in a lithium secondary battery of the invention, i.e., "a negative electrode containing as a negative-electrode active material a carbonaceous substance having a roundness of 0.85 or higher and a surface functional-group amount O/C value of from 0 to 0.01".

[Negative Electrode [4]: Negative-Electrode Active Material]

The negative-electrode active material for use in negative electrode [4] is described below.

The negative-electrode active material for use in negative electrode [4] in a lithium secondary battery of the invention comprises a carbonaceous substance satisfying at least the following requirements (a) and (b).

(a) The roundness is 0.85 or higher.
(b) The surface functional-group amount O/C value is from 0 to 0.01.

Details of the carbonaceous substance for use in this invention are explained below.

[[Roundness]]

The roundness of the carbonaceous substance is generally 0.85 or higher, preferably 0.87 or higher, more preferably 0.89 or higher, especially preferably 0.92 or higher. With respect to the upper limit thereof, a particle having a roundness of 1 theoretically is a true sphere. In case where the roundness thereof is lower than the lower limit of that range, use of this negative-electrode active material results in a reduced loading and compaction in negative-electrode formation is difficult and leads to particle breakage. There is hence a possibility that those inner parts of the particles which have poor high-temperature storability at a low state of charge are apt to be exposed.

In the invention, roundness is defined by the following equation.

Roundness=(length of periphery of equivalent circle having the same area as projected particle shape)/(actual length of periphery of projected particle shape)

The value of roundness is determined, for example, with a flow type particle image analyzer (e.g., FPIA, manufactured by Sysmex Industrial Corp.) by dispersing about 0.2 g of a sample in a 0.2% by mass aqueous solution (about 50 mL) of poly(oxyethylene(20)) sorbitan monolaurate as a surfactant, propagating an ultrasonic wave of 28 kHz to the dispersion for 1 minute at an output of 60 W, and then examining particles having a particle diameter in the range of 3-40 μm with the analyzer having a detection range set at 0.6-400 μm.

[[O/C Value]]

The surface functional-group amount O/C value of the carbonaceous substance should be from 0 to 0.01. The upper limit of the O/C value thereof is preferably 0.005 or lower. The closer the O/C value to 0, the more the carbonaceous substance is preferred.

The term O/C value in the invention indicates the proportion of the amount of surface functional groups determined by X-ray photoelectron spectroscopy (XPS). Incase where the surface functional-group amount O/C value exceeds the upper limit of that range, the particle surface has an increased amount of a functional group and the SEI film which is formed on the surface during charge in the presence of a specific compound does not have sufficient stability. There are hence cases where high-temperature storability at a low state of charge decreases.

Surface functional-group amount O/C value means the ratio of the concentration of oxygen atoms present on the surface of, e.g., a graphite material, to the concentration of carbon atoms present thereon. It is an index to the amount of functional groups, such as carboxyl, phenolic hydroxyl, and carbonyl groups, present on the surface. When a carbon material has a high surface functional-group amount O/C value, this frequently means that an oxygen-containing surface functional group is bonded to, e.g., edge faces of the carbon crystallites in the particle surface. Incidentally, the surface functional-group amount O/C value of a graphite material is determined by determining the areas of C1s and O1s spectral peaks in X-ray photoelectron spectroscopy and calculating the carbon-oxygen atomic concentration ratio O/C (O atom concentration/C atom concentration) from the peak areas. Although specific procedures of the determination are not particularly limited, an example is as follows.

An X-ray photoelectron spectrometer (e.g., ESCA, manufactured by ULVAC-PHI, INC.) is used for the X-ray photoelectron spectroscopy. A sample to be examined (here, a graphite material) is placed on a sample table so as to form a flat surface. An aluminum Kα line is used as an X-ray source to obtain a spectrum having C1s (280-300 eV) and O1s (525-545 eV) peaks in the multiplex mode. Charge correction is made, with the top of the C1s peak being at 284.3 eV, and the areas of the C1s and O1s spectral peaks are determined. Furthermore, these areas are multiplied by the apparatus sensitivity coefficient to calculate the concentrations of surface C atoms and surface O atoms. From the O and C atom concentrations obtained, the atomic concentration ratio O/C (O atom concentration/C atom concentration) is calculated. This ratio is defined as the surface functional-group amount O/C value of the graphite material.

Although the carbonaceous substance for use in this invention satisfies the requirements concerning "roundness" and "surface functional-group amount O/C value" described above, it is preferred from the standpoint of battery performance balance that the carbonaceous substance should further satisfy anyone of the following requirements or simultaneously satisfy two or more thereof. It is preferred that any one of or two or more of tap density, Raman R value, and volume-average particle diameter, among those requirements, should be simultaneously satisfied.

[[Tap Density]]

The tap density of the carbonaceous substance is generally 0.55 g/cm$^3$ or higher, preferably 0.7 g/cm$^3$ or higher, more preferably 0.8 g/cm$^3$ or higher, especially preferably 0.9 g/cm$^3$ or higher. The upper limit thereof is preferably 2 g/cm$^3$ or lower, more preferably 1.8 g/cm$^3$ or lower, especially preferably 1.6 g/cm$^3$ or lower. In case where the tap density thereof is lower than the lower limit of that range, this carbonaceous substance, when used in a negative electrode, is less apt to have a high loading density. There are hence cases where a high-capacity battery cannot be obtained. On the other hand, in case where the tap density thereof exceeds the upper limit of that range, the electrode has too small an amount of interparticle interstices and electrical conductivity among the particles is difficult to secure. There are hence cases where preferred battery characteristics are difficult to obtain.

In the invention, the tap density of a sample is determined by dropping the sample through a sieve having an opening size of 300 μm into a 20-cm$^3$ tapping cell to fill the cell with the sample up to the brim, subsequently conducting tapping operations 1,000 times over a stroke length of 10 mm using a powder densimeter (e.g., Tap Denser, manufactured by Seishin Enterprise Co., Ltd.), and calculating a density from the resultant volume of the sample and the weight thereof. This value is defined as the tap density.

[[Raman R Value, Half-Value Width]]

The R value of the carbonaceous substance, as determined by argon ion laser Raman spectroscopy, is generally 0.001 or higher, preferably 0.01 or higher. The upper limit thereof is generally 0.2 or lower, preferably 0.18 or lower, more preferably 0.15 or lower. When the R value thereof is lower than the lower limit of that range, the surface of such particles has too high crystallinity and there are cases where the number of intercalation sites into which lithium comes with charge/discharge decreases. Namely, there are cases where suitability for charge decreases. On the other hand, in case where the R value thereof exceeds the upper limit of that range, the surface of such particles has reduced crystallinity and the SEI film which is formed on the surface during charge in the presence of a specific compound is not sufficiently stable. There are hence cases where high-temperature storability at a low state of charge decreases.

The Raman half-value width around 1,580 cm$^{-1}$ of the carbonaceous substance is not particularly limited. However, the half-value width thereof is generally 10 cm$^{-1}$ or larger, preferably 15 cm$^{-1}$ or larger. The upper limit thereof is generally 35 cm$^{-1}$ or smaller, preferably 30 cm$^{-1}$ or smaller. When the Raman half-value width thereof is smaller than the lower limit of that range, the surface of such particles has too high crystallinity and there are cases where the number of intercalation sites into which lithium comes with charge/discharge decreases. Namely, there are cases where suitability for charge decreases. On the other hand, when the Raman half-value width thereof exceeds the upper limit of that range, the surface of such particles has reduced crystallinity and the SEI film which is formed on the surface during charge in the presence of a specific compound is not sufficiently stable. There are hence cases where high-temperature storability at a low state of charge decreases.

The examination for a Raman spectrum is made with a Raman spectrometer (e.g., a Raman spectrometer manufactured by Japan Spectroscopic Co., Ltd.). In the examination, a sample is charged into a measuring cell by causing the sample to fall naturally into the cell and the surface of the sample in the cell is irradiated with argon ion laser light while rotating the cell in a plane perpendicular to the laser light. The Raman spectrum obtained is examined for the intensity $I_A$ of a peak $P_A$ around 1,580 cm$^{-1}$ and the intensity $I_B$ of a peak $P_B$ around 1,360 cm$^{-1}$. The ratio between these intensities R ($R=I_B/I_A$) is calculated and this ratio is defined as the Raman R value of the carbon material. Furthermore, the half-value width of the peak $P_A$ around 1,580 cm$^{-1}$ in the Raman spectrum obtained is measured, and this value is defined as the Raman half-value width of the carbonaceous substance.

Conditions for this Raman spectroscopy are as follows.
Wavelength of argon ion laser: 514.5 nm
Laser power on sample: 15-25 mW
Resolution: 10-20 cm$^{-1}$
Examination range: 1,100-1,730 cm$^{-1}$
Analysis for R value and half-value width: background processing
Smoothing: simple average; convolution, 5 points

[[Volume-Average Particle Diameter]]

With respect to the volume-average particle diameter of the carbonaceous substance, the volume-average particle diameter (median diameter) thereof as determined by the laser diffraction/scattering method is generally 1 μm or larger, preferably 3 μm or larger, more preferably 5 μm or larger, even more preferably 7 μm or larger. The upper limit thereof is generally 50 μm or smaller, preferably 40 μm or smaller, more preferably 30 μm or smaller, even more preferably 25 μm or smaller. When the volume-average particle diameter thereof is smaller than the lower limit of that range, there are cases where irreversible capacity increases, leading to a loss in initial battery capacity. When the volume-average particle diameter thereof exceeds the upper limit of that range, there are cases where such a carbonaceous substance is undesirable from the standpoint of battery production because an uneven coating surface is apt to result when an electrode plate is produced.

Furthermore, in the volume-based particle diameter distribution thereof, the ratio of the 90% particle diameter to the 10% particle diameter ($d_{90}/d_{10}$) may be 1.2 or higher and is preferably 1.5 or higher, more preferably 1.7 or higher. The upper limit thereof may be 8 or lower and is preferably 5 or lower, more preferably 4 or lower, even more preferably 3 or lower.

Volume-average particle diameter in the invention is defined as the median diameter determined by dispersing the carbon powder in a 0.2% by mass aqueous solution (about 1 mL) of polyoxyethylene (20) sorbitan monolaurate as a surfactant and examining the dispersion with a laser diffraction type particle size distribution analyzer (e.g., LA-700, manufactured by HORIBA, Ltd.). With respect to the 90% particle diameter/10% particle diameter ratio ($d_{90}/d_{10}$), the volume-based 90% particle diameter and 10% particle diameter are determined in the same manner and the ratio ($d_{90}/d_{10}$) can be calculated therefrom.

[[X-Ray Parameter]]

The carbonaceous substance preferably has a value of d (interplanar spacing) for the lattice planes (002), as determined by X-ray diffractometry in accordance with the method of the Japan Society for Promotion of Scientific Research, of 0.335 nm or larger. The upper limit of the value of d is 0.340 nm or smaller and is preferably 0.337 nm or smaller. When the value of d is too large, there are cases where such particles have reduced crystallinity to increase initial irreversible capacity. On the other hand, 0.335 is a theoretical value for graphites. Furthermore, the crystallite size (Lc) of this carbon material, as determined by X-ray diffractometry in accordance with the method of the Japan Society for Promotion of Scientific Research, is generally 30 nm or larger, preferably 50 nm or larger, more preferably 80 nm or larger. In case where the Lc thereof is smaller than the lower limit of that range, there is a possibility that such particles might have reduced crystallinity to increase initial irreversible capacity.

[[Ash Content]]

The ash content of the carbonaceous substance is preferably 1% by mass or lower, especially 0.5% by mass or lower, in particular 0.1% by mass or lower, based on the whole carbonaceous substance. The lower limit of the ash content thereof is preferably at least 1 ppm by mass of the whole carbonaceous substance. When the ash content thereof exceeds the upper limit of that range, there are cases where battery performance deterioration caused by reaction with the electrolyte during charge/discharge becomes not negligible. When the ash content thereof is lower than the lower limit of that range, there are cases where the production of this carbonaceous substance necessitates much time and energy and an apparatus for pollution prevention, resulting in an increase in cost.

[[BET Specific Surface Area]]

The specific surface area of the carbonaceous substance, as determined by the BET method, is generally 0.1 m$^2$/g or larger, preferably 0.7 m$^2$/g or larger, more preferably 1 m$^2$/g or larger, even more preferably 1.5 m$^2$/g or larger. The upper limit thereof is generally 100 m$^2$/g or smaller, preferably 25 m$^2$/g or smaller, more preferably 15 m$^2$/g or smaller, even more preferably 10 m$^2$/g or smaller. When the specific surface area thereof is smaller than the lower limit of that range, there are cases where use of this carbonaceous substance as a negative-electrode material is apt to result in poor lithium acceptance during charge and in lithium deposition on the electrode surface. On the other hand, when the specific surface area thereof exceeds the upper limit of that range, there are cases where use of this carbonaceous substance as a negative-electrode material is apt to result in enhanced reactivity with the electrolyte and enhanced gas evolution and a preferred battery is difficult to obtain.

BET specific surface area is defined as a value measured with a surface area meter (e.g., a fully automatic surface area measuring apparatus manufactured by Ohukura Riken Co., Ltd.) by preliminarily drying a sample at 350° C. for 15 minutes in a nitrogen stream and then measuring the specific surface area thereof by the gas-flowing nitrogen adsorption BET one-point method using a nitrogen/helium mixture gas precisely regulated so as to have a nitrogen pressure of 0.3 relative to atmosphere pressure.

[[Pore Distribution]]

In the carbonaceous substance, the amount of interstices corresponding to a pore diameter of from 0.01 μm to 1 μm which include pores in the particles and particle surface irregularities formed by steps, as determined by mercury porosimetry (mercury intrusion method), is generally 0.01 mL/g or larger, preferably 0.05 mL/g or larger, more preferably 0.1 mL/g or larger. The upper limit thereof is generally 0.6 mL/g or smaller, preferably 0.4 mL/g or smaller, more preferably 0.3 mL/g or smaller. When the amount of interstices therein is larger than the upper limit of that range, there are cases where a large amount of a binder is necessary in electrode plate formation. On the other hand, when the amount thereof is smaller than the lower limit of that range, there are cases where high-current-density charge/discharge characteristics decrease and the effect of diminishing electrode expansion/contraction during charge/discharge is not obtained.

The total pore volume is preferably 0.1 mL/g or larger, more preferably 0.25 mL/g or larger. The upper limit thereof is generally 10 mL/g or smaller, preferably 5 mL/g or smaller, more preferably 2 mL/g or smaller. When the total pore volume exceeds the upper limit of that range, there are cases where a large amount of a binder is necessary in electrode plate formation. When the total pore volume is smaller than the lower limit, there are cases where the dispersing effect of a thickener or binder in electrode plate formation is not obtained.

The average pore diameter of the carbonaceous substance is preferably 0.05 μm or larger, more preferably 0.1 μm or larger, even more preferably 0.5 μm or larger. The upper limit thereof is generally 50 μm or smaller, preferably 20 μm or smaller, more preferably 10 μm or smaller. When the average pore diameter thereof exceeds the upper limit of that range, there are cases where a large amount of a binder is necessary. On the other hand, when the average pore diameter thereof is smaller than the lower limit of that range, there are cases where high-current-density charge/discharge characteristics decrease.

As an apparatus for the mercury porosimetry is used a mercury porosimeter (Autopore 9520, manufactured by Micromeritics Corp.). About 0.2 g of a sample (negative-electrode material) is weighed out and placed in a powder cell and this cell is closed. The sample in the cell is pretreated by degassing it at room temperature under vacuum (50 μmHg or lower) for 10 minutes. Subsequently, the pressure in the cell is reduced to 4 psia (about 28 kPa) and mercury is introduced thereinto. The internal pressure is stepwise elevated from 4 psia (about 28 kPa) to 40,000 psia (about 280 MPa) and then lowered to 25 psia (about 170 kPa). The number of steps in the pressure elevation is 80 or larger. In each step, the amount of mercury intruded is measured after an equilibrium time of 10 seconds. A pore distribution is calculated from the mercury intrusion curve thus obtained, using the Washburn equation. For the calculation, the surface tension ($\gamma$) and contact angle ($\psi$) of mercury are taken as 485 dyne/cm and 140°, respectively.

The average pore diameter used is the pore diameter corresponding to a cumulative pore volume of 50%.

[[True Density]]

The true density of the carbonaceous substance is generally 2 g/cm$^3$ or higher, preferably 2.1 g/cm$^3$ or higher, more preferably 2.2 g/cm$^3$ or higher, even more preferably 2.22 g/cm$^3$ or higher. The upper limit thereof may be 2.26 g/cm$^3$ or lower. This upper limit is a theoretical value for graphites. When the true density of the carbonaceous substance is lower than the lower limit of that range, there are cases where this carbon has too low crystallinity, resulting in an increase in initial irreversible capacity. In the invention, true density is defined as one determined by the liquid-phase displacement method (pycnometer method) using butanol.

[[Orientation Ratio]]

The orientation ratio of the carbonaceous substance is generally 0.005 or higher, preferably 0.01 or higher, more preferably 0.015 or higher. The upper limit thereof is theoretically 0.67 or lower. When the orientation ratio thereof is lower than the lower limit of that range, there are cases where high-density charge/discharge characteristics decrease.

Orientation ratio is determined by X-ray diffractometry. The peaks attributable to the (110) diffraction and (004) diffraction of the carbon obtained by X-ray diffractometry are subjected to peak separation by fitting with asymmetric Pearson VII as a profile function. Thus, the integrated intensities of the (110) diffraction and (004) diffraction peaks are calculated. From the integrated intensities obtained, the ratio represented by (integrated intensity of (110) diffraction)/(integrated intensity of (004) diffraction) is calculated. This ratio is defined as the active-material orientation ratio.

Conditions for this X-ray diffractometry are as follows. Incidentally, "2θ" represents diffraction angle.

Target: Cu(Kα line) graphite monochromator
Slit:
    Divergence slit=1 degree
    Receiving slit=0.1 mm
    Scattering slit=1 degree
Examination range and step angle/measuring time:
    (110) plane: 76.5°≤2θ≤78.5° 0.01°/3 sec
    (004) plane: 53.5°≤2θ≤56.0° 0.01°/3 sec

[[Aspect Ratio]]

The aspect ratio of the carbonaceous substance is theoretically 1 or higher. The upper limit thereof may be 10 or lower and is preferably 8 or lower, more preferably 5 or lower. When the aspect ratio thereof exceeds the upper limit, there are cases where this carbonaceous substance causes streak lines in electrode plate formation and an even coating surface cannot be obtained, resulting in a decrease in high-current-density charge/discharge characteristics.

The aspect ratio of a particle is represented by A/B, wherein A is the length of the longest axis of the particle in a three-dimensional examination and B is the length of the shortest axis perpendicular to that axis. The examination of particles is made with a scanning electron microscope capable of enlargement examination. Fifty are arbitrarily selected from graphite particles fixed to an edge face of a metal having a thickness of 50 μm or smaller, and each particle is examined for A and B while rotating or inclining the stage to which the sample is fixed. The average of the A/B values is determined.

[[Processes for Producing Carbonaceous Substance and Raw Materials Therefor]]

The carbonaceous substance for use in this invention may be one which occurs naturally or one produced artificially.

However, one derived from a natural graphite is preferred. The carbonaceous substance may be one obtained by subjecting a naturally occurring one or artificially produced one to a specific treatment. Processes for producing the carbonaceous substance (including classification methods) also are not particularly limited. For example, a carbonaceous substance obtained by a classification technique such as, e.g., sieving or air classification so as to have the properties described above may be employed.

Of these, a carbonaceous substance obtained by heat-treating a naturally occurring carbon material (raw natural graphite material) is preferred from the standpoints of availability and processability in a preceding step. Furthermore, a carbonaceous substance obtained by subjecting a naturally occurring carbon material (raw natural graphite material) or an artificially produced carbon material to a mechanical energy treatment to modify/round the material and heat-treating the rounded carbonaceous substance is preferred from the standpoints of loading improvement, etc. Moreover, a carbonaceous substance prepared by subjecting a raw natural graphite material to a mechanical energy treatment and heat-treating the resultant rounded natural graphite is especially preferred from the standpoints of balance among lithium secondary battery performances, etc. Hereinafter, the carbon material (raw material) which has not undergone a heat treatment, e.g., a raw natural graphite material, is often referred to simply as "raw material before heat treatment".

[[[Raw Natural Graphite Material]]]

Natural graphites are especially preferred raw materials for the carbonaceous substance as stated above.

Natural graphites are classified into flake graphite, crystalline (vein) graphite, and amorphous graphite according to properties (see "Graphite" in *Funrūtai Purosesu Gijutsu Shūsei*, published by Industrial Technology Center in 1974; and *HANDBOOK OF CARBON, GRAPHITE, DIAMOND AND FULLERENES*, published by Noyes Publications). With respect to the degree of graphitization, crystalline graphite has a highest graphitization degree of 100% and flake graphite is second, which has a graphitization degree of 99.9%. The graphitization degree of amorphous graphite is as low as 28%. The quality of the natural graphites is governed mainly by locality and vein. Flake graphite occurs in Madagascar, China, Brazil, Ukraine, Canada, etc. Crystalline graphite occurs mainly in Sri Lanka. Amorphous graphite occurs mainly in the Korean Peninsula, China, Mexico, etc. Of these natural graphites, flake graphite and crystalline graphite are preferred raw materials for the carbonaceous substance because of their advantages including a high degree of graphitization and a low impurity content.

[[[Mechanical Energy Treatment/Rounding Treatment]]]

The mechanical energy treatment is conducted so that the ratio between the volume-average particle diameters before and after the treatment becomes 1 or less. The term "ratio between the volume-average particle diameters before and after the treatment" means a value obtained by dividing the volume-average particle diameter as measured after the treatment by the volume-average particle diameter as measured before the treatment. In the mechanical energy treatment in the invention for producing a raw material before heat treatment, it is preferred to conduct the mechanical energy treatment so that the ratio between the average particle diameters before and after this treatment becomes 1 or less.

The mechanical energy treatment is performed for the purposes of reducing the size of the powder particles to 1 or less in terms of the ratio between the average particle diameters before and after the treatment and simultaneously regulating the particle shape. This mechanical energy treatment belongs to the pulverization treatment among engineering unit operations utilizable for particle design, such as pulverization, classification, mixing, granulation, surface modification, and reaction.

Pulverization means an operation in which a force is applied to a substance to thereby reduce the size thereof and regulate the particle diameter, particle size distribution, and loading of the substance. Pulverization treatments are classified according to the kind of force to be applied to the substance and the method of treatment. Forces to be applied to the substance are roughly divided into the following four: (1) breaking force (impact force), (2) crushing force (compressive force), (3) milling force (grinding force), and (4) scraping force (shear force). On the other hand, treatment methods are roughly divided into the following two: volume pulverization in which cracks are generated and propagated in inner parts of the particles; and surface pulverization in which surface parts of the particles are scraped off. Volume pulverization proceeds by means of impact force, compressive force, and shear force, while surface pulverization proceeds by means of grinding force and shear force. Pulverization is a treatment based on any of various combinations of such kinds of forces to be applied to a substance and such treatment methods. A suitable combination can be determined according to the purpose of the treatment.

There are cases where pulverization is conducted by a chemical reaction, e.g., explosion, or by volume expansion. However, pulverization is generally conducted with a mechanical apparatus such as a pulverizer. It is preferred that the pulverization treatment to be used for producing a rounded carbonaceous substance as a raw material in the invention should be a treatment which finally involves a high proportion of surface treatment, regardless of whether volume pulverization occurs or not. This is because surface pulverization is important for eliminating angles of the surface-pulverized particles and thereby imparting roundness to the particle shape. Specifically, use may be made of a method in which surface treatment is conducted after volume pulverization has proceeded to some degree or a method in which surface treatment only is conducted almost without conducting volume pulverization. Furthermore, volume pulverization and surface treatment may be simultaneously conducted. It is preferred to conduct a pulverization treatment in which surface pulverization proceeds finally and angles are eliminated from the surface of the particles.

The apparatus to be used for conducting the mechanical energy treatment is selected from ones usable for conducting the preferred treatment described above. The mechanical energy treatment may be accomplished with one or more of the four kinds of forces applicable to a substance. However, it is preferred and effective to repeatedly apply impact force as a main force and other mechanical actions such as compressive, frictional, shear, and other forces, including those caused by particle interaction, to the particles. Consequently, a preferred apparatus specifically is one which comprises a casing and disposed therein a rotor having many blades and in which the rotor is rotated at a high speed to thereby apply mechanical actions such as impact, compressive, frictional, and shear forces to a carbon material introduced therein and conduct surface treatment while allowing volume pulverization to proceed. More preferred is one which has a mechanism in which a carbonaceous substance is circulated to thereby repeatedly apply mechanical actions thereto.

Examples of the preferred apparatus include Hybridization System (manufactured by Nara Machinery Co., Ltd.), Kryptron (Earth Technica Co., Ltd.), CF Mill (manufactured by Ube Industries, Ltd.), and Mechanofusion System (manufactured by Hosokawa Micron Corp.). Preferred of these is Hybridization System, manufactured by Nara Machinery Co., Ltd. In the case where the treatment is conducted with this apparatus, the rotor is rotated at a peripheral speed of preferably 30-100 m/sec, more preferably 40-100 m/sec, even more preferably 50-100 m/sec. Although a carbonaceous substance can be treated by merely passing it through the apparatus, it is preferred to treat the carbonaceous substance while causing it to circulate or reside in the apparatus for 30 seconds or longer. More preferably, the carbonaceous substance is treated while circulating or residing in the apparatus for 1 minute or longer.

Through such mechanical energy treatment, the carbon particles become particles in which only parts near the surface are rough and which have exposed strains and edge faces, while retaining high crystallinity as a whole. Thus, the carbon particles come to have an increased amount of surfaces where lithium ions can come in and out, and hence have a high capacity even at a high current density.

In general, flaky, crystalline, and platy carbon materials tend to become poorer in suitability for loading as the particle diameter decreases. It is thought that as a result of pulverization, the particles come to have more irregular shapes, have a larger amount of surface projections such as "fine splits", "half-peeled parts", and "bent parts", and have finer particles of irregular shapes adherent to the particle surface at some degree of strength. The impaired suitability for loading is thought to be attributable to increased resistance between adjacent particles due to such causes.

As long as such shape irregularity is reduced and the particle shape becomes close to sphere, a decrease in particle diameter should result in a limited decrease in loading and large-diameter carbon particles and small-diameter carbon particles should have almost the same tap density.

[[[Properties of Raw Material before Heat Treatment]]]

It is desirable that the raw material before heat treatment should have properties which satisfy any one of the following items (1) to (11) or simultaneously satisfy two or more thereof. The methods of determining the following properties and the definitions thereof are the same as in the carbonaceous substances described above.

(1) X-Ray Parameter

The raw material before heat treatment preferably has a value of d (interplanar spacing) for the lattice planes (002), as determined by X-ray diffractometry in accordance with the method of the Japan Society for Promotion of Scientific Research, of 0.335 nm or larger. The lower limit of the value of d is smaller than 0.340 nm, and is preferably 0.337 nm or smaller. When the value of d is too large, there are cases where crystallinity decreases to increase initial irreversible capacity. On the other hand, 0.335 is a theoretical value for graphites. Furthermore, the crystallite size (Lc) of this carbon material, as determined by X-ray diffractometry in accordance with the method of the Japan Society for Promotion of Scientific Research, is generally 30 nm or larger, preferably 50 nm or larger, more preferably 80 nm or larger. In case where the Lc thereof is smaller than the lower limit of that range, there is a possibility that crystallinity might decrease to increase initial irreversible capacity.

(2) Ash Content

The ash content of the raw material before heat treatment is generally 1% by mass or lower, especially 0.5% by mass or lower, in particular 0.1% by mass or lower, based on the whole raw material before heat treatment. The lower limit of the ash content thereof is generally preferably at least 1 ppm by mass of the whole raw material. When the ash content thereof exceeds the upper limit of that range, there are cases where battery performance deterioration caused by reaction with the electrolyte during charge/discharge becomes not negligible. When the ash content thereof is lower than the lower limit of that range, there are cases where the production of this raw material necessitates much time and energy and an apparatus for pollution prevention, resulting in an increase in cost.

(3) Volume-Average Particle Diameter

With respect to the volume-average particle diameter of the raw material before heat treatment, the volume-average particle diameter (median diameter) thereof as determined by the laser diffraction/scattering method is generally 1 µm or larger, preferably 3 µm or larger, more preferably 5 µm or larger, even more preferably 7 µm or larger. The upper limit thereof is generally 50 µm or smaller, preferably 40 µm or smaller, more preferably 30 µm or smaller, even more preferably 25 µm or smaller. When the volume-average particle diameter thereof is smaller than the lower limit of that range, there are cases where irreversible capacity increases, leading to a loss in initial battery capacity. When the volume-average particle diameter thereof exceeds the upper limit of that range, there are cases where such a raw material is undesirable from the standpoint of battery production because an uneven coating surface is apt to result when an electrode plate is produced.

(4) Raman R Value, Raman Half-Value Width

The R value of the raw material before heat treatment as determined by the argon ion laser Raman spectroscopy is generally 0.10 or higher, preferably 0.15 or higher, more preferably 0.17 or higher, even more preferably 0.2 or higher. The upper limit thereof is generally 0.8 or lower, preferably 0.6 or lower, more preferably 0.4 or lower. When the R value thereof is lower than the lower limit of that range, there is a possibility that the particles might have not been sufficiently rounded and the effect of improving suitability for loading cannot be obtained. On the other hand, when the R value thereof exceeds the upper limit of that range, the surface of such particles has reduced crystallinity and enhanced reactivity with the electrolyte and this may lead to a decrease in efficiency and enhanced gas evolution.

The Raman half-value width around 1,580 $cm^{-1}$ of the raw material before heat treatment is not particularly limited. However, the half-value width thereof is generally 10 $cm^{-1}$ or larger, preferably 15 $cm^{-1}$ or larger. The upper limit thereof is generally 80 $cm^{-1}$ or smaller, preferably 60 $cm^{-1}$ or smaller, more preferably 45 $cm^{-1}$ or smaller, even more preferably 40 $cm^{-1}$ or smaller. When the Raman half-value width thereof is smaller than the lower limit of that range, there is a possibility that the particles might have not been sufficiently rounded and the effect of improving suitability for loading cannot be obtained. On the other hand, when the Raman half-value width thereof exceeds the upper limit of that range, the surface of such particles has reduced crystallinity and enhanced reactivity with the electrolyte and this may lead to a decrease in efficiency and enhanced gas evolution.

(5) BET Specific Surface Area

The specific surface area of the raw material before heat treatment, as determined by the BET method, is generally 0.1 $m^2/g$ or larger, preferably 0.7 $m^2/g$ or larger, more preferably 1 $m^2/g$ or larger, even more preferably 1.5 $m^2/g$ or larger. The upper limit thereof is generally 100 $m^2/g$ or smaller, preferably 50 $m^2/g$ or smaller, more preferably 15 m²/g or smaller, even more preferably 10 m²/g or smaller. When the specific surface area thereof is smaller than the lower limit of that range, there are cases where use of the carbonaceous substance obtained from this raw material as a negative-electrode material is apt to result in poor lithium acceptance during charge and in lithium deposition on the electrode surface. On the other hand, when the specific surface area thereof exceeds the upper limit of that range, there are cases where the carbonaceous substance obtained therefrom through a heat treatment is apt to excessively react with the electrolyte and evolve a larger amount of a gas, although it has a reduced specific surface area, making it difficult to obtain a preferred battery.

(6) Pore Distribution

In the raw material before heat treatment, the amount of interstices corresponding to a pore diameter of from 0.01 μm to 1 μm which include pores in the particles and particle surface irregularities formed by steps, as determined by mercury porosimetry (mercury intrusion method), is generally 0.01 mL/g or larger, preferably 0.05 mL/g or larger, more preferably 0.1 mL/g or larger. The upper limit thereof is generally 0.6 mL/g or smaller, preferably 0.4 mL/g or smaller, more preferably 0.3 mL/g or smaller. When the amount of interstices therein is larger than the upper limit of that range, there are cases where a large amount of a binder is necessary in electrode plate formation. On the other hand, when the amount thereof is smaller than the lower limit of that range, there are cases where high-current-density charge/discharge characteristics decrease and the effect of diminishing electrode expansion/contraction during charge/discharge is not obtained.

The total pore volume is preferably 0.1 mL/g or larger, more preferably 0.25 mL/g or larger. The upper limit thereof is generally 10 mL/g or smaller, preferably 5 mL/g or smaller, more preferably 2 mL/g or smaller. When the total pore volume exceeds the upper limit of that range, there are cases where a large amount of a binder is necessary in electrode plate formation. When the total pore volume is smaller than the lower limit, there are cases where the dispersing effect of a thickener or binder in electrode plate formation is not obtained.

The average pore diameter of the raw material before heat treatment is preferably 0.05 μm or larger, more preferably 0.1 μm or larger, even more preferably 0.5 μm or larger. The upper limit thereof is generally 50 μm or smaller, preferably 20 μm or smaller, more preferably 10 μm or smaller. When the average pore diameter thereof exceeds the upper limit of that range, there are cases where a large amount of a binder is necessary. On the other hand, when the average pore diameter thereof is smaller than the lower limit of that range, there are cases where high-current-density charge/discharge characteristics decrease.

(7) Roundness

With respect to the degree of sphericity of the raw material before heat treatment, the roundness of the particles having a particle diameter in the range of 3-40 μm is generally preferably 0.85 or higher, more preferably 0.87 or higher, especially preferably 0.90 or higher, even more preferably 0.92 or higher. High roundness values are preferred because they are effective in improving high-current-density charge/discharge characteristics and suitability for loading.

Methods for improving roundness are not particularly limited. However, a raw material before heat treatment in which the particles have been rounded by a rounding treatment with the mechanical energy described above is preferred because it gives an electrode in which the interstices among particles are uniform in shape.

(8) True Density

The true density of the raw material before heat treatment is generally 2 g/cm³ or higher, preferably 2.1 g/cm³ or higher, more preferably 2.2 g/cm³ or higher, even more preferably 2.22 g/cm³ or higher. The upper limit thereof may be 2.26 g/cm³ or lower. This upper limit is a theoretical value for graphites. When the true density of the raw material is lower than the lower limit of that range, there are cases where the carbon has too low crystallinity, resulting in an increase in initial irreversible capacity.

(9) Tap Density

The tap density of the raw material before heat treatment is generally 0.55 g/cm³ or higher, preferably 0.7 g/cm³ or higher, more preferably 0.8 g/cm³ or higher, especially preferably 0.9 g/cm³ or higher. The upper limit thereof is preferably 2 g/cm³ or lower, more preferably 1.8 g/cm³ or lower, especially preferably 1.6 g/cm³ or lower. When the tap density thereof is lower than the lower limit of that range, there are cases where the carbonaceous substance obtained from this raw material, when used in a negative electrode, is less apt to have a high loading density and cannot give a battery having a high capacity. On the other hand, when the tap density thereof exceeds the upper limit of that range, the amount of interparticle interstices in the electrode is too small and it is difficult to secure electrical conductivity among the particles. There are hence cases where preferred battery performances are difficult to obtain.

(10) Orientation Ratio

The orientation ratio of the raw material before heat treatment is generally 0.005 or higher, preferably 0.01 or higher, more preferably 0.015 or higher. The upper limit thereof is theoretically 0.67 or lower. When the orientation ratio thereof is lower than the lower limit of that range, there are cases where high-density charge/discharge characteristics decrease.

(11) Aspect Ratio

The aspect ratio of the raw material before heat treatment is theoretically 1 or higher. The upper limit thereof is generally 10 or lower, preferably 8 or lower, more preferably 5 or lower. When the aspect ratio thereof exceeds the upper limit, there are cases where the carbonaceous substance obtained from this raw material causes streak lines in electrode plate formation and an even coating surface cannot be obtained, resulting in a decrease in high-current-density charge/discharge characteristics.

[[[Heat Treatment Temperature]]]

The temperature in the heat treatment of the raw material before heat treatment is generally 600° C. or higher, preferably 1,200° C. or higher, more preferably 2,000° C. or higher, even more preferably 2,500° C. or higher, especially preferably 2,800° C. or higher. The upper limit thereof is generally 3,200° C. or lower, preferably 3,100° C. or lower. When the temperature conditions are lower than the lower limit of that range, there are cases where the surface of the graphite particles which has been disordered by the rounding treatment, etc. does not undergo a sufficient crystal repair and the graphite particles come to have neither a reduced Raman R value nor a reduced BET specific surface area. On the other hand, when the temperature exceeds the upper limit of that range, there are cases where graphite sublimation is apt to occur in an increased amount.

[[[Method of Heat Treatment]]]

The heat treatment is accomplished by heating the raw material once to a temperature in that range. Although the holding time period in which the temperature conditions are kept in that range is not particularly limited, it generally is longer than 10 seconds and is not longer than 168 hours.

In general, the heat treatment is conducted in an inert gas atmosphere, e.g., nitrogen gas, or in a non-oxidizing atmosphere formed by the gas generated from the raw graphite. It is, however, noted that in a furnace of the type in which the raw material is buried in a breeze (fine carbon powder obtained by pitch heat-treating), there are cases where the atmosphere in an initial stage is a mixture with the air. In such cases, it is not always necessary to use a completely inert gas atmosphere.

Apparatus usable for the heat treatment are not particularly limited. For example, use can be made of a shuttle furnace, tunnel kiln, electric furnace, Riedhammer furnace, rotary kiln, direct voltage application type electric furnace, Acheson furnace, resistance heating furnace, induction heating furnace, or the like.

Besides the treatments described above, various treatments including classification can be conducted. Classification is a treatment for removing coarse particles and fine particles in order to obtain a target particle diameter. Apparatus usable for the classification are not particularly limited. However, in the case of dry sieving, use can be made of a rotary sieve, swing sieve, revolving sieve, vibrating sieve, or the like. In the case of dry air classification, use can be made of a gravitational classifier, inertial classifier, or centrifugal classifier (e.g., classifier or cyclone). In the case of wet sieving, use can be made of a mechanical wet classifier, hydraulic classifier, sedimentation classifier, centrifugal wet classifier, or the like. Classification may be conducted before the heat treatment or may be conducted in another timing, e.g., after the heat treatment. It is also possible to omit the classification treatment itself. However, from the standpoint of productivity of the graphite powder as a negative-electrode material, it is preferred to conduct a classification treatment immediately after the rounding treatment and prior to the heat treatment.

[[Minor-Material Mixing]]

Besides the carbonaceous substance described above, one or more carbonaceous substances (carbonaceous materials) differing in carbonaceous-substance property from that carbonaceous substance may be incorporated into the negative-electrode active material for use in this invention. Thus, battery performances can be further improved. The term "carbonaceous-substance property" herein means one or more properties selected from X-ray diffraction parameter, median diameter, aspect ratio, BET specific surface area, orientation ratio, Raman R value, tap density, true density, pore distribution, roundness, and ash content. Preferred embodiments include: one in which the volume-based particle size distribution is not symmetrical about the median diameter; one in which two or more carbon materials differing in Raman R value are contained; and one in which carbon materials differing in X-ray parameter are contained. One example of the effects thereof is that the incorporation of a carbon material, such as a graphite, e.g., a natural graphite or artificial graphite, or an amorphous carbon, e.g., a carbon black such as acetylene black or needle coke, as a sub material serves to reduce electrical resistance. One of these carbon materials may be used alone, or any desired two or more thereof may be used in combination in any desired proportion. In the case where such a carbon material is added as a sub material, the amount thereof is generally 0.1% by mass or larger, preferably 0.5% by mass or larger, more preferably 0.6% by mass or larger. The upper limit thereof is generally 80% by mass or smaller, preferably 50% by mass or smaller, more preferably 40% by mass or smaller, especially preferably 30% by mass or smaller. Amounts thereof smaller than the lower limit of that range are undesirable because they result in difficulties in obtaining the effect of improving conductivity. When the amount thereof exceeds the upper limit, there are cases where this leads to an increase in initial irreversible capacity.

[Negative Electrode [4]: Electrode Production]

The negative electrode may be produced by an ordinary method. It can be formed in the same manner as described above. The current collector, thickness ratio between the current collector and the active-material layer, electrode density, binder, electrode-plate orientation ratio, impedance, etc. also are the same as described above.

<Negative Electrode [5]>

An explanation will be given below on negative electrode [5] for use in a lithium secondary battery of the invention, i.e., "a negative electrode containing as a negative-electrode active material an orientation-differing-carbon composite comprising two or more carbonaceous substances differing in orientation".

[Negative Electrode [5]: Negative-Electrode Active Material]

The negative-electrode active material for use in negative electrode [5] is described below.

[[Constitution of Orientation-Differing-Carbon Composite]]

The negative-electrode active material to be used in negative electrode [5] in a lithium secondary battery of the invention comprises an orientation-differing-carbon composite comprising two or more carbonaceous substances differing in orientation.

The term "differing in orientation" herein means that when the powder is examined with a polarizing microscope and the optically anisotropic structures are visually compared in the pattern of anisotropic units, i.e., the size, direction, number, etc. of the anisotropic units, then the structures differ in at least any of the size, direction, number, etc. of the anisotropic units. Examples thereof include: the case where one of carbonaceous substance 1 and carbonaceous substance 2 has crystal orientation in one direction and the other has random crystal orientation; and the case where both of carbonaceous substance 1 and carbonaceous substance 2 have crystal orientation in respective certain directions and these directions are different. In the case where one or each of carbonaceous substance 1 and carbonaceous substance 2 is not composed of single-crystal particles but composed of aggregates of crystals, each unit aggregate is taken as one region and the optically anisotropic structures are compared in the aggregation pattern of the anisotropic units.

With respect to the state in which carbonaceous substance and carbonaceous substance 2 coexist in the orientation-differing-carbon composite, it is preferred that the two carbonaceous substances should be contained in one secondary particle. The term "contained in one secondary particle" herein means, for example, the state in which the carbonaceous substances differing in orientation are physically restrained or adhered, the state in which the carbonaceous substances retain a shape by means of electrostatic restraint or adhesion, or the state in which the carbonaceous substances are restrained by bonding. The term "physically restrained or adhered" herein means a state such as that in which one of the carbonaceous substances is surrounded by the other or the state in which one is caught by the other. The term "electrostatic restraint or adhesion" means the state in which one of the carbonaceous substances is adherent to the other by means of electrostatic energy. As long as the carbonaceous substances in this restrained or adhered state are different from each other in orientation as described above, the original carbonaceous substances may be equal. Furthermore, the term "the state in which the carbonaceous substances are restrained by bonding" means chemical bonding by hydrogen bonds, covalent bonds, ionic bonds, etc.

Preferred of those is the state in which the surface of one of the carbonaceous substances at least partly has an interface where another carbonaceous substance, which differs in orientation from that carbonaceous substance, is adhered and/or bonded to that carbonaceous substance. Such composite having an interface is preferred because this composite, as compared with negative-electrode active materials having no interface and having the same particle shape as the composite, is effective in dispersing in many directions the expansion caused by lithium intercalation during charge to thereby prevent battery deterioration.

The part differing in orientation is not limited as to whether it is one formed by the bonding of an externally supplied material and/or of a product of alteration thereof or one formed by the alteration of a surface-part material of a carbonaceous substance. The term "coating" herein means that the interface between one carbonaceous substance and the surface of the other carbonaceous substance at least partly has chemical bonds and the former carbonaceous substance is (1) in the state of covering the whole surface, (2) in the state of locally covering the carbonaceous particles, (3) in the state of selectively covering part of the surface, or (4) in the state of being present in ultrafine regions including chemical bonds.

Around the interface, the orientation of the carbonaceous substances may change continuously or discontinuously. Namely, it is preferred that the orientation-differing-carbon composite should be one which has an interface where carbonaceous substances differing in orientation are adhered and/or bonded to each other, and in which the orientation of the carbonaceous substances at the interface changes discontinuously and/or continuously.

The components of the orientation-differing-carbon composite (A) are not particularly limited as long as they have crystallinity. However, it is preferred that one or more of the carbonaceous substances differing in orientation should be a graphitic carbonaceous substance (B) derived from a natural graphite (D) (hereinafter, this substance (B) is abbreviated to "natural-graphite-derived carbonaceous substance (B)), because use of this carbonaceous substance (B) increases charge capacity per unit mass.

The proportion of the natural-graphite-derived carbonaceous substance (B) contained in the orientation-differing-carbon composite is generally 5% by mass or higher, preferably 20% by mass or higher, more preferably 30% by mass or higher, even more preferably 40% by mass or higher, especially preferably 50% by mass or higher, based on the orientation-differing-carbon composite. The upper limit thereof is generally 99.9% by mass or lower, preferably 99% by mass or lower, more preferably 95% by mass or lower, even more preferably 90% by mass or lower. When the proportion of the carbonaceous substance (B) is lower than the lower limit of that range, there are cases where electrode rolling results in a considerably increased load and this causes electrode peeling, etc. On the other hand, when the proportion thereof exceeds the upper limit of that range, there are cases where the composite comprising particles differing in orientation has weak interfacial bonding.

With respect to other components of the orientation-differing-carbon composite, it is also preferred, from the standpoints of interface formation during the preparation of the orientation-differing-carbon composite and interfacial-bonding improvement, that one or more of the carbonaceous substances differing in orientation should be a carbonaceous substance (C) selected from the following (1) to (5):

(1) a carbonization product selected from the group consisting of coal coke, petroleum coke, furnace black, acetylene black, and pitch-derived carbon fibers;

(2) a carbonization product obtained from a precursor which is an organic substance selected from the group consisting of pitch materials, aromatic hydrocarbons, nitrogen-ring compounds, sulfur-ring compounds, polyphenylenes, organic synthetic polymers, natural polymers, thermoplastic resins, and thermosetting resins and/or a product of the pyrolysis of the organic substance;

(3) a carbonization product obtained from a precursor which is a product of the pyrolysis of a solution obtained by dissolving the organic substance (2) in a low-molecular organic solvent;

(4) a product of the carbonization of a gas containing an organic substance; and (5) a product of the graphitization of any of (1) to (4) above.

The substance in (2) is not particularly limited as long as it is capable of carbonization. Examples thereof include the following organic substances: pitch materials; aromatic hydrocarbons such as acenaphthylene, decacyclene, anthracene, and phenanthrene; nitrogen-ring compounds such as phenazine and acridine; sulfur-ring compounds such as thiophene and bithiophene; polyphenylenes such as biphenyl and terphenyl; poly(vinylchloride), poly(vinylalcohol), poly(vinylbutyral), and substances obtained by insolubilizing these compounds; nitrogen-containing organic polymers such as polyacrylonitrile and polypyrrole; sulfur-containing organic polymers such as polythiophene; organic polymers such as polystyrene; natural polymers such as polysaccharides represented by cellulose, lignin, mannan, poly(galacturonic acid), chitosan, and saccharose; thermoplastic resins such as poly(phenylene sulfide) and poly(phenylene oxide); thermosetting resins such as furfuryl alcohol resins, phenol-formaldehyde resins, and imide resins; and solutions obtained by dissolving any of such organic substances in a low-molecular organic solvent, e.g., benzene, toluene, xylene, quinoline, or n-hexane. Examples thereof further include gases capable of carbonization.

Preferred of these are pitch materials. This is because pitch materials have a high actual carbon ratio and, hence, can give a material in high yield. The term "pitch material" in this description means a substance which is a pitch or a similar material and can be carbonized or graphitized by an appropriate treatment. Examples of the pitch materials which can be used include tars, heavy oils, and pitches. Examples of the tars include coal tar and petroleum tar. Examples of the heavy oils include petroleum-derived heavy oils such as catalytically cracked oil, thermally cracked oil, topping residues, and vacuum distillation residues. Examples of the pitches include coal tar pitch, petroleum pitch, and synthetic pitch. Of these, coal tar pitch is preferred because it has high aromaticity. Any one of these pitch materials may be used alone, or any desired two or more thereof may be used in combination in any desired proportion.

With respect to (3), preferred examples thereof include a carbonization product obtained from a precursor which is a product of the pyrolysis of a solution of the organic substance (2) in a low-molecular organic solvent such as benzene, toluene, xylene, quinoline, or n-hexane.

With respect to (4), examples include hydrocarbon compounds such as methane, ethane, propane, benzene, acetylene, and ethylene and carbon monoxide.

The proportion of the carbonaceous substance (C) contained in the orientation-differing-carbon composite is generally 0.1% by mass or higher, preferably 1% by mass or higher, more preferably 5% by mass or higher, even more preferably 10% by mass or higher. There is no particular upper limit on the proportion thereof, as long as the composite has an interface where orientation changes. When the proportion of the carbonaceous substance (C) is lower than the lower limit of that range, there are cases where interfacial bonding in the orientation-differing-carbon composite becomes weak. Furthermore, proportions thereof lower than the lower limit of that range may lessen the effect of inhibiting particle deformation during pressing which is produced by the carbonaceous substance (C) contained, resulting in reduced cycle characteristics.

From the standpoints of pressing load during electrode rolling and of balance of interfacial bonding in the composite, a more preferred constitution of this negative-electrode active material for use in a lithium secondary battery of the invention is one in which the orientation-differing-carbon composite comprises both of one or more natural-graphite-derived carbonaceous substances (B) and one or more carbonaceous substances (C).

For the same reasons as described above, the proportion by mass of the natural-graphite-derived carbonaceous substance (B) to the carbonaceous substance (C) (natural-graphite-derived carbonaceous substance (B)/carbonaceous substance (C)) in the orientation-differing-carbon composite is generally 20/80 or higher, preferably 40/60 or higher, more preferably 60/40 or higher, even more preferably 70/30 or higher. The upper limit thereof may be 99.9/0.1 or lower and is preferably 99/1 or lower, more preferably 95/5 or lower. When the proportion thereof is higher than the higher limit of that range (when the proportion of the natural-graphite-derived carbonaceous substance (B) is too high), there is a possibility that the interfacial bonding brought about by the carbonaceous substance (C) might decrease. On the other hand, when the proportion thereof is lower than the lower limit of that range (when the proportion of the natural-graphite-derived carbonaceous substance (B) is too low), there are cases where electrode rolling results in a considerably increased pressing load to cause peeling during the rolling.

The orientation-differing-carbon composite comprising the natural-graphite-derived carbonaceous substance (B) and the carbonaceous substance (C) may be in any desired form unless this is counter to the spirit of the invention. Examples thereof are shown below.

(i) The form in which the surface of the natural-graphite-derived carbonaceous substance (B) is wholly or partly adhered to and/or covered with and/or bonded to the carbonaceous substance (C).

(ii) The form in which the carbonaceous substance (C) is bonded to the whole or part of the surface of the natural-graphite-derived carbonaceous substance (B) to combine two or more particles of the natural-graphite-derived carbonaceous substance (B) and/or carbonaceous substance (C).

(iii) The form which comprises a mixture of (i) and (ii) above in any proportion.

The natural-graphite-derived carbonaceous substance (B) and the carbonaceous substance (C) may be replaced by each other. Specific examples of the state of combination in the orientation-differing-carbon composite include: the state in which the surface of the particle serving as a core is adhered to and/or covered with and/or bonded to a carbonaceous substance differing in orientation; the state in which the surface of the core particle is adhered to and/or covered with and/or bonded to two or more such carbonaceous substances; and the state in which particles serving as cores have been aggregated in non-parallel arrangement. The term "the state in which particles have been aggregated in non-parallel arrangement" herein means that particles having a certain degree of crystallinity have been fixed, in the state of being randomly oriented, with another carbonaceous substance and have bonds which cause the two substances to differ in orientation.

[[Preparation of Orientation-Differing-Carbon Composite]]

The preparation of the orientation-differing-carbon composite will be described later under "Production Process 1 and Production Process 2 for Producing Orientation-Differing-Carbon Composite". In preparing the orientation-differing-carbon composite, crystallinity can be improved by conducting a heat treatment and capacity per unit weight can hence be increased. The temperature for the heat treatment is generally 400° C. or higher, preferably 1,000° C. or higher, more preferably 2,000° C. or higher, even more preferably 2, 400° C. or higher, especially preferably 2, 800° C. or higher. The upper limit thereof is generally 3,400° C. or lower, preferably 3,200° C. or lower. In case where the temperature is lower than the lower limit of that range, there is a possibility that crystallinity improvement might be insufficient and the effect of increasing capacity per unit weight cannot be obtained. On the other hand, in case where the temperature exceeds the upper limit of that range, there is a possibility that the loss caused by carbon sublimation becomes not negligible, resulting in a decrease in yield.

[[Properties of Orientation-Differing-Carbon Composite]]

It is preferred that the orientation-differing-carbon composite should have properties which satisfy any one of the following items (1) to (5) or simultaneously satisfy two or more thereof.

(1) Roundness

With respect to the degree of sphericity of the orientation-differing-carbon composite, the roundness of the particles having a particle diameter in the range of 3-40 μm is generally 0.1 or higher, preferably 0.5 or higher, more preferably 0.8 or higher, even more preferably 0.85 or higher, most preferably 0.9 or higher. High roundness values are preferred because they are effective in improving high-current-density charge/discharge characteristics. Roundness is defined by the following equation. When a particle has a roundness of 1, this particle theoretically is a true sphere.

$$\text{Roundness} = (\text{length of periphery of equivalent circle having the same area as projected particle shape})/(\text{actual length of periphery of projected particle shape})$$

The value of roundness is determined, for example, with a flow type particle image analyzer (e.g., FPIA, manufactured by Sysmex Industrial Corp.) by dispersing about 0.2 g of a sample in a 0.2% by mass aqueous solution (about 50 mL) of poly(oxyethylene(20)) sorbitan monolaurate as a surfactant, propagating an ultrasonic wave of 28 kHz to the dispersion for 1 minute at an output of 60 W, and then examining particles having a particle diameter in the range of 3-40 μm with the analyzer having a detection range set at 0.6-400 μm.

Methods for improving roundness are not particularly limited. However, an orientation-differing-carbon composite in which the particles have been rounded by a rounding treatment is preferred because it gives an electrode in which the interstices among particles are uniform in shape. Examples of the rounding treatment include: a method in which a shear force or compressive force is applied to thereby mechanically make the shape of the particles close to sphere; and a method of mechanical/physical treatment in which fine particles are aggregated into particles by means of the bonding force of a binder or of the fine particles themselves.

(2) Raman R Value, Raman Half-Value Width

The Raman R value of the orientation-differing-carbon composite as determined by the argon ion laser Raman spectroscopy is generally 0.01 or higher, preferably 0.02 or higher, more preferably 0.04 or higher. The upper limit thereof is generally 0.35 or lower, preferably 0.30 or lower, more preferably 0.25 or lower. When the Raman R value thereof is lower than the lower limit of that range, the surface of such particles has too high crystallinity and there are cases where the number of intercalation sites into which lithium comes with charge/discharge decreases. Namely, there are cases where suitability for charge decreases. On the other hand, when the Raman R value thereof exceeds the upper limit of that range, the surface of such particles has reduced crystallinity and enhanced reactivity with the nonaqueous electrolyte and this may lead to a decrease in efficiency and enhanced gas evolution.

The Raman half-value width around 1,580 $cm^{-1}$ of the carbon material in this invention is not particularly limited. However, the half-value width thereof is generally 5 $cm^{-1}$ or larger, preferably 10 $cm^{-1}$ or larger. The upper limit thereof is generally 40 $cm^{-1}$ or smaller, preferably 35 $cm^{-1}$ or smaller, more preferably 30 $cm^{-1}$ or smaller. When the Raman half-value width thereof is smaller than the lower limit of that range, the surface of such particles has too high crystallinity and there are cases where the number of intercalation sites into which lithium comes with charge/discharge decreases. Namely, there are cases where suitability for charge decreases. On the other hand, when the Raman half-value width thereof exceeds the upper limit of that range, the surface of such particles has reduced crystallinity and enhanced reactivity with the nonaqueous electrolyte and this may lead to a decrease in efficiency and enhanced gas evolution.

The examination for a Raman spectrum is made with a Raman spectrometer (e.g., a Raman spectrometer manufactured by Japan Spectroscopic Co., Ltd.). In the examination, a sample is charged into a measuring cell by causing the sample to fall naturally into the cell and the surface of the sample in the cell is irradiated with argon ion laser light while rotating the cell in a plane perpendicular to the laser light. The Raman spectrum obtained is examined for the intensity $I_A$ of a peak $P_A$ around 1,580 $cm^{-1}$ and the intensity $I_B$ of a peak $P_B$ around 1,360 $cm^{-1}$. The ratio between these intensities R ($R=I_B/I_A$) is calculated and this ratio is defined as the Raman R value of the carbon material. Furthermore, the half-value width of the peak $P_A$ around 1,580 $cm^{-1}$ in the Raman spectrum obtained is measured, and this value is defined as the Raman half-value width of the carbon material.

Conditions for this Raman spectroscopy are as follows.
Wavelength of argon ion laser: 514.5 nm
Laser power on sample: 15-25 mW
Resolution: 10-20 $cm^{-1}$
Examination range: 1,100 $cm^{-1}$ to 1,730 $cm^{-1}$
Analysis for Raman R value and Raman half-value width: background processing
Smoothing: simple average; convolution, 5 points (3) Tap Density The tap density of the orientation-differing-carbon composite desirably is generally 0.55 $g/cm^3$ or higher, preferably 0.70/$cm^3$ or higher, more preferably 0.9 $g/cm^3$ or higher, especially preferably 1 $g/cm^3$ or higher. The tap density thereof is preferably 2.0 $g/cm^3$ or lower, more preferably 1.8 $g/cm^3$ or lower, even more preferably 1.7 $g/cm^3$ or lower, especially preferably 1.5 $g/cm^3$ or lower. When the tap density thereof is lower than the lower limit of that range, there are cases where this orientation-differing-carbon composite, when used in a negative electrode, is less apt to have a high loading density and cannot give a battery having a high capacity. On the other hand, when the tap density thereof exceeds the upper limit of that range, the amount of interparticle interstices in the electrode is too small and it is difficult to secure electrical conductivity among the particles. There are hence cases where preferred battery performances are difficult to obtain.

In the invention, the tap density of a sample is determined by dropping the sample through a sieve having an opening size of 300 μm into a 20-$cm^3$ tapping cell to fill the cell with the sample up to the brim, subsequently conducting tapping operations 1,000 times over a stroke length of 10 mm using a powder densimeter (e.g., Tap Denser, manufactured by Seishin Enterprise Co., Ltd.), and determining a density from the resultant volume of the sample and weight thereof. This density is defined as the tap density.

(4) BET Specific Surface Area

The specific surface area of the orientation-differing-carbon composite as a carbon material for use in this invention, as determined by the BET method, is generally 0.1 $m^2/g$ or larger, preferably 0.7 $m^2/g$ or larger, more preferably 1.0 $m^2/g$ or larger, even more preferably 1.2 $m^2/g$ or larger. The upper limit thereof is generally 100 $m^2/g$ or smaller, preferably 25 $m^2/g$ or smaller, more preferably 15 $m^2/g$ or smaller, even more preferably 10 $m^2/g$ or smaller. When the specific surface area thereof is smaller than the lower limit of that range, there are cases where use of this orientation-differing-carbon composite as a negative-electrode material is apt to result in poor lithium acceptance during charge and in lithium deposition on the electrode surface. On the other hand, when the specific surface area thereof exceeds the upper limit of that range, there are cases where use of this orientation-differing-carbon composite as a negative-electrode material is apt to result in enhanced reactivity with the nonaqueous electrolyte and enhanced gas evolution and a preferred battery is difficult to obtain.

BET specific surface area is defined as a value measured with a surface area meter (e.g., a fully automatic surface area measuring apparatus manufactured by Ohukura Riken Co., Ltd.) by preliminarily drying a sample at 350° C. for 15 minutes in a nitrogen stream and then measuring the specific surface area thereof by the gas-flowing nitrogen adsorption BET one-point method using a nitrogen/helium mixture gas precisely regulated so as to have a nitrogen pressure of 0.3 relative to atmospheric pressure.

(5) Volume-Average Particle Diameter

With respect to the volume-average particle diameter of the orientation-differing-carbon composite, the volume-average particle diameter (median diameter) thereof as determined by the laser diffraction/scattering method is generally 1 μm or larger, preferably 3 μm or larger, more preferably 5 μm or larger, even more preferably 7 μm or larger. The upper limit thereof is generally 100 μm or smaller, preferably 50 μm or smaller, more preferably 40 μm or smaller, even more preferably 30 μm or smaller, especially preferably 25 μm or smaller. When the volume-average particle diameter thereof is smaller than the lower limit of that range, there are cases where irreversible capacity increases, leading to a loss in initial battery capacity. When the volume-average particle diameter thereof exceeds the upper limit of that range, there are cases where such a carbon composite is undesirable from the standpoint of battery production because an uneven coating surface is apt to result when an electrode plate is produced.

Volume-average particle diameter in the invention is defined as the median diameter determined by dispersing the carbon powder in a 0.2% by mass aqueous solution (about 1 mL) of poly(oxyethylene (20)) sorbitan monolaurate as a surfactant and examining the dispersion with a laser diffraction type particle size distribution analyzer (e.g., LA-700, manufactured by HORIBA, Ltd.).

From the standpoint of balance among battery characteristics, the orientation-differing-carbon composite preferably satisfies one or more of the following items (6) to (11) besides items (1) to (5) given above.

(6) X-Ray Parameter

The orientation-differing-carbon composite preferably has a value of d (interplanar spacing) for the lattice planes (002), as determined by X-ray diffractometry in accordance with the method of the Japan Society for Promotion of Scientific Research, of 0.335 nm or larger. The lower limit of the value of d desirably is generally 0.340 nm or smaller, preferably 0.337 nm or smaller. When the value of d exceeds the upper limit of that range, there is a possibility that crystallinity might decrease to increase initial irreversible capacity. The value of 0.335 nm as the lower limit is a theoretical value for graphites. Furthermore, the crystallite size (Lc) of this carbon material, as determined by X-ray diffractometry in accordance with the method of the Japan Society for Promotion of Scientific Research, is generally 30 nm or larger, preferably 50 nm or larger, more preferably 80 nm or larger. In case where the Lc thereof is smaller than the lower limit of that range, there is a possibility that crystallinity might decrease to increase initial irreversible capacity.

(7) Ash Content

The ash content of the orientation-differing-carbon composite is generally 1% by mass or lower, especially 0.5% by mass or lower, in particular 0.1% by mass or lower, based on the whole orientation-differing-carbon composite. The lower limit of the ash content thereof is preferably at least 1 ppm by mass of the whole carbon composite. When the ash content thereof exceeds the upper limit of that range, there are cases where battery performance deterioration caused by reaction with the nonaqueous electrolyte during charge/discharge becomes not negligible. When the ash content thereof is lower than the lower limit of that range, there are cases where the production of this carbon composite necessitates much time and energy and an apparatus for pollution prevention, resulting in an increase in cost.

(8) Pore Distribution

In the orientation-differing-carbon composite, the amount of interstices corresponding to a pore diameter of from 0.01 µm to 1 µm which include pores in the particles and particle surface irregularities formed by steps, as determined by mercury porosimetry (mercury intrusion method), may be 0.001 mL/g or larger and is preferably 0.002 mL/g or larger. The upper limit thereof is generally 0.6 mL/g or smaller, preferably 0.4 mL/g or smaller, more preferably 0.3 mL/g or smaller. When the amount of interstices therein is larger than the upper limit of that range, there are cases where a large amount of a binder is necessary in electrode plate formation. On the other hand, when the amount thereof is smaller than the lower limit of that range, there are cases where high-current-density charge/discharge characteristics decrease and the effect of diminishing electrode expansion/contraction during charge/discharge is not obtained.

The total pore volume is preferably 0.1 mL/g or larger, more preferably 0.25 mL/g or larger. The upper limit thereof is generally 10 mL/g or smaller, preferably 5 mL/g or smaller, more preferably 2 mL/g or smaller. When the total pore volume exceeds the upper limit of that range, there are cases where a large amount of a binder is necessary in electrode plate formation. When the total pore volume is smaller than the lower limit, there are cases where the dispersing effect of a thickener or binder in electrode plate formation is not obtained.

The average pore diameter of the orientation-differing-carbon composite is preferably 0.05 µm or larger, more preferably 0.1 µm or larger, even more preferably 0.5 µm or larger. The upper limit thereof is generally 50 µm or smaller, preferably 20 µm or smaller, more preferably 10 µm or smaller. When the average pore diameter thereof exceeds the upper limit of that range, there are cases where a large amount of a binder is necessary. On the other hand, when the average pore diameter thereof is smaller than the lower limit of that range, there are cases where high-current-density charge/discharge characteristics decrease.

As an apparatus for the mercury porosimetry is used a mercury porosimeter (Autopore 9520, manufactured by Micromeritics Corp.). About 0.2 g of a sample (negative-electrode material) is weighed out and placed in a powder cell and this cell is closed. The sample in the cell is pretreated by degassing it at room temperature under vacuum (50 µmHg or lower) for 10 minutes. Subsequently, the pressure in the cell is reduced to 4 psia (about 28 kPa) and mercury is introduced thereinto. The internal pressure is stepwise elevated from 4 psia (about 28 kPa) to 40,000 psia (about 280 MPa) and then lowered to 25 psia (about 170 kPa). The number of steps in the pressure elevation is 80 or larger. In each step, the amount of mercury intruded is measured after an equilibrium time of 10 seconds. A pore distribution is calculated from the mercury intrusion curve thus obtained, using the Washburn equation. For the calculation, the surface tension ($\gamma$) and contact angle ($\psi$) of mercury are taken as 485 dyne/cm and 140°, respectively. The average pore diameter used is the pore diameter corresponding to a cumulative pore volume of 50%.

(9) True Density

The true density of the orientation-differing-carbon composite is generally 2.0 g/cm$^3$ or higher, preferably 2.1 g/cm$^3$ or higher, more preferably 2.2 g/cm$^3$ or higher, even more preferably 2.22 g/cm$^3$ or higher. The upper limit thereof may be 2.26 g/cm$^3$ or lower. This upper limit is a theoretical value for graphites. When the true density of the orientation-differing-carbon composite is lower than the lower limit of that range, there are cases where this carbon has too low crystallinity, resulting in an increase in initial irreversible capacity. In the invention, true density is defined as one determined by the liquid-phase displacement method (pycnometer method) using butanol.

(10) Orientation Ratio (Powder)

The orientation ratio of the orientation-differing-carbon composite is generally 0.005 or higher, preferably 0.01 or higher, more preferably 0.015 or higher. The upper limit thereof is theoretically 0.67 or lower. When the orientation ratio thereof is lower than the lower limit of that range, there are cases where high-density charge/discharge characteristics decrease.

Orientation ratio is determined by X-ray diffractometry. The peaks attributable to the (110) diffraction and (004) diffraction of the carbon obtained by X-ray diffractometry are subjected to peak separation by fitting with asymmetric Pearson VII as a profile function. Thus, the integrated intensities of the (110) diffraction and (004) diffraction peaks are calculated. From the integrated intensities obtained, the ratio represented by (integrated intensity of (110) diffraction)/(integrated intensity of (004) diffraction) is calculated. This ratio is defined as the active-material orientation ratio.

Conditions for this X-ray diffractometry are as follows. Incidentally, "2θ" represents diffraction angle.

Target: Cu(Kα line) graphite monochromator
Slit:
  Divergence slit=1 degree
  Receiving slit=0.1 mm
  Scattering slit=1 degree
Examination range and step angle/measuring time:
  (110) plane: 76.5°≤2θ≤78.5° 0.01°/3 sec
  (004) plane: 53.5°≤2θ≤56.0° 0.01°/3 sec

(11) Aspect Ratio (Powder)

The aspect ratio of the orientation-differing-carbon composite is theoretically 1 or higher. The upper limit thereof may be 10 or lower and is preferably 8 or lower, more preferably 5 or lower. When the aspect ratio thereof exceeds the upper limit, there are cases where this orientation-differing-carbon composite causes streak lines in electrode plate formation and an even coating surface cannot be obtained, resulting in a decrease in high-current-density charge/discharge characteristics.

The aspect ratio of a carbon material particle is represented by A/B, wherein A is the length of the longest axis of the particle in a three-dimensional examination and B is the length of the shortest axis perpendicular to that axis. The examination of carbon particles is made with a scanning electron microscope capable of enlargement examination. Fifty are arbitrarily selected from graphite particles fixed to an edge face of a metal having a thickness of 50 μm or smaller, and each particle is examined for A and B while rotating or inclining the stage to which the sample is fixed. The average of the A/B values is determined.

[[Raw Materials for Natural-Graphite-Derived Carbonaceous Substance (B)]]

Examples of raw materials for the natural-graphite-derived carbonaceous substance (B) to be contained in the orientation-differing-carbon composite include ones obtained from a natural graphite having such high crystallinity that the interplanar spacing (d002) for the (002) planes as determined by wide-angle X-ray diffractometry is generally 0.340 nm or smaller. Specifically, it is preferred to use a powder selected from natural graphites, materials obtained by mechanically pulverizing natural graphites to improve their roundness and/or by heat-treating natural graphites at 1,000° C. or higher, materials obtained by heat-treating expanded graphites, and high-purity products obtained from those graphites.

The natural graphites (D) usable as precursors for the natural-graphite-derived carbonaceous substance (B) are classified into flake graphite, crystalline (vein) graphite, and amorphous graphite according to properties (see "Graphite" in *Funrutai Purosesu Gijutsu Shusei* (published by Industrial Technology Center in 1974); and *HANDBOOK OF CARBON, GRAPHITE, DIAMOND AND FULLERENES* (published by Noyes Publications)). With respect to the degree of graphitization, crystalline graphite has a highest graphitization degree of 100% and flake graphite is second, which has a graphitization degree as high as 99.9%. However, the graphitization degree of amorphous graphite is as low as 28%. Flake graphite, among such natural graphites, occurs in Madagascar, China, Brazil, Ukraine, Canada, etc. Crystalline graphite occurs mainly in Sri Lanka. Amorphous graphite occurs mainly in the Korean Peninsula, China, Mexico, etc. Of these natural graphites, amorphous graphite generally has a small particle diameter and a low purity. In contrast, flake graphite and crystalline graphite have advantages such as the degree of graphitization and a low impurity content, and can hence be advantageously used in the invention.

[[Preparation of Natural-Graphite-Derived Carbonaceous Substance (B)]]

The preparation of the natural-graphite-derived carbonaceous substance (B) will be described later under "Production Process 1 and Production Process 2 for Producing Orientation-Differing-Carbon Composite".

[[Properties of Natural-Graphite-Derived Carbonaceous Substance (B)]]

It is desirable that the natural-graphite-derived carbonaceous substance (B) should satisfy any one of the following items (1) to (11) or simultaneously satisfy two or more thereof. The definition of each of the following properties, method of determining the same, etc. are the same as those described above with regard to the orientation-differing-carbon composite.

(1) X-Ray Parameter

The natural-graphite-derived carbonaceous substance preferably has a value of d (interplanar spacing) for the lattice planes (002), as determined by X-ray diffractometry in accordance with the method of the Japan Society for Promotion of Scientific Research, of 0.335 nm or larger. The value of d thereof desirably is generally 0.340 nm or smaller, preferably 0.337 nm or smaller. When the value of d exceeds the upper limit of that range, there is a possibility that crystallinity might decrease to enhance the increase in initial irreversible capacity. The value of 0.335 nm is a theoretical value for graphites. Furthermore, the crystallite size (Lc) of this carbon material, as determined by X-ray diffractometry in accordance with the method of the Japan Society for Promotion of Scientific Research, is generally 30 nm or larger, preferably 50 nm or larger, more preferably 90 nm or larger. In case where the Lc thereof is smaller than the lower limit of that range, there is a possibility that crystallinity might decrease to enhance the increase in initial irreversible capacity.

(2) Ash Content

The ash content of the natural-graphite-derived carbonaceous substance is generally 1% by mass or lower, especially 0.5% by mass or lower, in particular 0.1% by mass or lower, based on the whole natural-graphite-derived carbonaceous substance. The lower limit of the ash content thereof is preferably at least 1 ppm by mass of the whole carbonaceous substance. When the ash content thereof exceeds the upper limit of that range, there are cases where battery performance deterioration caused by reaction with the nonaqueous electrolyte during charge/discharge becomes not negligible. When the ash content thereof is lower than the lower limit of that range, there are cases where the production of this carbonaceous substance necessitates much time and energy and an apparatus for pollution prevention, resulting in an increase in cost.

(3) Volume-Average Particle Diameter

With respect to the volume-average particle diameter of the natural-graphite-derived carbonaceous substance, the volume-average particle diameter (median diameter) thereof as determined by the laser diffraction/scattering method is generally 1 μm or larger, preferably 3 μm or larger, more preferably 5 μm or larger, even more preferably 7 μm or larger. The upper limit thereof is generally 50 µm or smaller, preferably 40 µm or smaller, more preferably 30 µm or smaller, even more preferably 25 µm or smaller. When the volume-average particle diameter thereof is smaller than the lower limit of that range, there are cases where irreversible capacity increases, leading to a loss in initial battery capacity. When the volume-average particle diameter thereof exceeds the upper limit of that range, there are cases where such a carbonaceous substance is undesirable from the standpoint of battery production because an uneven coating surface is apt to result when an electrode plate is produced.

(4) Raman R Value, Raman Half-Value Width

The Raman R value of the natural-graphite-derived carbonaceous substance as determined by the argon ion laser Raman spectroscopy is generally 0.01 or higher, preferably 0.02 or higher, more preferably 0.04 or higher. The upper limit thereof may be 0.35 or lower and is preferably 0.30 or lower, more preferably 0.25 or lower. When the Raman R value thereof is lower than the lower limit of that range, the surface of such particles has too high crystallinity and there are cases where the number of intercalation sites into which lithium comes with charge/discharge decreases. Namely, there are cases where suitability for charge decreases. On the other hand, when the Raman R value thereof exceeds the upper limit of that range, the surface of such particles has reduced crystallinity and enhanced reactivity with the nonaqueous electrolyte and this may lead to a decrease in efficiency and enhanced gas evolution.

The Raman half-value width around 1,580 $cm^{-1}$ of the carbon material in the invention is not particularly limited. However, the half-value width thereof is generally 5 $cm^{-1}$ or larger, preferably 10 $cm^{-1}$ or larger. The upper limit thereof is generally 40 $cm^{-1}$ or smaller, preferably 35 $cm^{-1}$ or smaller, more preferably 30 $cm^{-1}$ or smaller. When the Raman half-value width thereof is smaller than the lower limit of that range, the surface of such particles has too high crystallinity and there are cases where the number of intercalation sites into which lithium comes with charge/discharge decreases. Namely, there are cases where suitability for charge decreases. On the other hand, when the Raman half-value width thereof exceeds the upper limit of that range, the surface of such particles has reduced crystallinity and enhanced reactivity with the nonaqueous electrolyte and this may lead to a decrease in efficiency and enhanced gas evolution.

(5) BET Specific Surface Area

The specific surface area of the natural-graphite-derived carbonaceous substance, as determined by the BET method, is generally 0.1 $m^2/g$ or larger, preferably 0.7 $m^2/g$ or larger, more preferably 1.0 $m^2/g$ or larger, even more preferably 1.5 $m^2/g$ or larger. The upper limit thereof is generally 100 $m^2/g$ or smaller, preferably 25 $m^2/g$ or smaller, more preferably 15 $m^2/g$ or smaller, even more preferably 10 $m^2/g$ or smaller. When the specific surface area thereof is smaller than the lower limit of that range, there are cases where use of the carbon composite containing this carbonaceous substance as a negative-electrode material is apt to result in poor lithium acceptance during charge and in lithium deposition on the electrode surface. On the other hand, when the specific surface area thereof exceeds the upper limit of that range, there are cases where use of the carbon composite containing this carbonaceous substance as a negative-electrode material is apt to result in enhanced reactivity with the nonaqueous electrolyte and enhanced gas evolution and a preferred battery is difficult to obtain.

(6) Pore Distribution

In the natural-graphite-derived carbonaceous substance, the amount of interstices corresponding to a pore diameter of from 0.01 µm to 1 µm which include pores in the particles and particle surface irregularities formed by steps, as determined by mercury porosimetry (mercury intrusion method), is generally 0.01 mL/g or larger, preferably 0.05 mL/g or larger, more preferably 0.1 mL/g or larger. The upper limit thereof is generally 0.6 mL/g or smaller, preferably 0.4 mL/g or smaller, more preferably 0.3 mL/g or smaller. When the amount of interstices therein is larger than the upper limit of that range, there are cases where a large amount of a binder is necessary in electrode plate formation. When the amount thereof is smaller than the lower limit, there are cases where high-current-density charge/discharge characteristics decrease and the effect of diminishing electrode expansion/contraction during charge/discharge is difficult to obtain.

The total pore volume is preferably 0.1 mL/g or larger, more preferably 0.25 mL/g or larger. The upper limit thereof is generally 10 mL/g or smaller, preferably 5 mL/g or smaller, more preferably 2 mL/g or smaller. When the total pore volume exceeds the upper limit of that range, there are cases where a large amount of a binder is necessary in electrode plate formation. When the total pore volume is smaller than the lower limit, there are cases where the dispersing effect of a thickener or binder in electrode plate formation is not obtained.

The average pore diameter of the natural-graphite-derived carbonaceous substance is preferably 0.05 µm or larger, more preferably 0.1 µm or larger, especially preferably 0.5 µm or larger. The upper limit thereof is generally 50 µm or smaller, preferably 20 µm or smaller, more preferably 10 µm or smaller. When the average pore diameter thereof exceeds the upper limit of that range, there are cases where a large amount of a binder is necessary. When the average pore diameter thereof is smaller than the lower limit, there are cases where high-current-density charge/discharge characteristics decrease.

(7) Roundness

With respect to the degree of sphericity of the natural-graphite-derived carbonaceous substance, the roundness of the particles having a particle diameter in the range of 3-40 µm is preferably 0.1 or higher, especially preferably 0.5 or higher, more preferably 0.8 or higher, even more preferably 0.85 or higher, most preferably 0.9 or higher. High roundness values are preferred because they are effective in improving high-current-density charge/discharge characteristics.

(8) True Density

The true density of the natural-graphite-derived carbonaceous substance is generally 2.0 $g/cm^3$ or higher, preferably 2.1 $g/cm^3$ or higher, more preferably 2.2 $g/cm^3$ or higher, even more preferably 2.22 $g/cm^3$ or higher. The upper limit thereof may be 2.26 $g/cm^3$ or lower. This upper limit is a theoretical value for graphites. When the true density of the carbonaceous substance is lower than the lower limit of that range, there are cases where the carbon has too low crystallinity, resulting in an increase in initial irreversible capacity.

(9) Tap Density

The tap density of the natural-graphite-derived carbonaceous substance desirably is generally 0.1 $g/cm^3$ or higher, preferably 0.5 $g/cm^3$ or higher, more preferably 0.7 $g/cm^3$ or higher, especially preferably 0.9 $g/cm^3$ or higher. The upper limit thereof is preferably 2.0 $g/cm^3$ or lower, more preferably 1.8 $g/cm^3$ or lower, especially preferably 1.6 $g/cm^3$ or lower. When the tap density thereof is lower than the lower limit of that range, there are cases where the carbon composite containing this carbonaceous substance, when used in a negative electrode, is less apt to have a high loading density and cannot give a battery having a high capacity. On the other hand, when the tap density thereof exceeds the upper limit of that range, the amount of interparticle interstices in the electrode is too small and it is difficult to secure electrical conductivity among the particles. There are hence cases where preferred battery performances are difficult to obtain.

(10) Orientation Ratio (Powder)

The orientation ratio of the natural-graphite-derived carbonaceous substance is generally 0.005 or higher, preferably 0.01 or higher, more preferably 0.015 or higher. The upper limit thereof is theoretically 0.67 or lower. When the orientation ratio thereof is lower than the lower limit of that range, there are cases where high-density charge/discharge characteristics decrease.

(11) Aspect Ratio (Powder)

The aspect ratio of the natural-graphite-derived carbonaceous substance is theoretically 1 or higher. The upper limit thereof is generally 10 or lower, preferably 8 or lower, more preferably 5 or lower. When the aspect ratio thereof exceeds the upper limit, there are cases where the carbon composite containing this carbonaceous substance causes streak lines in electrode plate formation and an even coating surface cannot be obtained, resulting in a decrease in high-current-density charge/discharge characteristics.

[[Raw Materials for Carbonaceous Substance (C)]]

Raw materials for the carbonaceous substance (C) to be contained in the orientation-differing-carbon composite in this invention are not particularly limited as long as they are capable of carbonization. Examples thereof include the following organic substances: pitch materials; aromatic hydrocarbons such as acenaphthylene, decacyclene, anthracene, and phenanthrene; nitrogen-ring compounds such as phenazine and acridine; sulfur-ring compounds such as thiophene and bithiophene; polyphenylenes such as biphenyl and terphenyl; poly(vinylchloride), poly(vinylalcohol), poly(vinylbutyral), and substances obtained by insolubilizing these compounds; nitrogen-containing organic polymers such as polyacrylonitrile and polypyrrole; sulfur-containing organic polymers such as polythiophene; organic polymers such as polystyrene; natural polymers such as polysaccharides represented by cellulose, lignin, mannan, poly(galacturonic acid), chitosan, and saccharose; thermoplastic resins such as poly(phenylene sulfide) and poly(phenylene oxide); thermosetting resins such as furfuryl alcohol resins, phenol-formaldehyde resins, and imide resins; and solutions obtained by dissolving any of such organic substances in a low-molecular organic solvent, e.g., benzene, toluene, xylene, quinoline, or n-hexane. Examples thereof further include gases capable of carbonization.

Preferred of these are pitch materials. This is because pitch materials have a high actual carbon ratio and, hence, can give a material in high yield. The term "pitch material" in this description means a substance which is a pitch or a similar material and can be carbonized or graphitized by an appropriate treatment. Examples of the pitch materials which can be used include tars, heavy oils, and pitches. Examples of the tars include coal tar and petroleum tar. Examples of the heavy oils include petroleum-derived heavy oils such as catalytically cracked oil, thermally cracked oil, topping residues, and vacuum distillation residues. Examples of the pitches include coal tar pitch, petroleum pitch, and synthetic pitch. Of these, coal tar pitch is preferred because it has high aromaticity. Anyone of these pitch materials may be used alone, or any desired two or more thereof may be used in combination in any desired proportion.

In the pitch materials described above, the quinoline insoluble content is not particularly limited. However, pitch materials having a quinoline insoluble content of 30 or lower are generally used. Quinoline insolubles are, for example, submicron carbon particles, a fine sludge, etc. which are contained in a slight amount in coal tar. In case where such ingredients are contained in too large an amount, they considerably inhibit crystallinity from improving in a graphitization step and this leads to a considerable decrease in discharge capacity after graphitization. For determining the content of quinoline insolubles, use can be made of, e.g., the method as provided for in JIS K2425.

The pitch materials described above may be used as a raw material in combination with any of various thermosetting resins, thermoplastic resins, and the like unless this lessens the effects of the invention.

[[Preparation of Carbonaceous Substance (C)]]

The preparation of the carbonaceous substance (C) will be described later under "Production Process 1 and Production Process 2 for Producing Orientation-Differing-Carbon Composite".

[[Properties of Carbonaceous Substance (C)]]

It is preferred that the carbonaceous substance (C) should satisfy any one of the following items (1) to (4) or simultaneously satisfy two or more thereof. The definition of each of the following properties, method of determining the same, etc. are the same as those described above with regard to the orientation-differing-carbon composite.

(1) X-Ray Parameter

The carbonaceous substance (C) preferably has a value of d (interplanar spacing) for the lattice planes (002), as determined by X-ray diffractometry in accordance with the method of the Japan Society for Promotion of Scientific Research, of 0.335 nm or larger. The value of d thereof desirably is generally 0.345 nm or smaller, preferably 0.340 nm or smaller, more preferably 0.337 nm or smaller. Furthermore, the crystallite size (Lc) of this carbon material, as determined by X-ray diffractometry in accordance with the method of the Japan Society for Promotion of Scientific Research, is generally 5 nm or larger, preferably 10 nm or larger, more preferably 50 nm or larger, even more preferably 80 nm or larger. In case where the Lc thereof is smaller than the lower limit of that range, there is a possibility that crystallinity might decrease to enhance the increase in initial irreversible capacity.

(2) Ash Content

The ash content of the carbonaceous substance (C) is generally 1% by mass or lower, especially 0.5% by mass or lower, in particular 0.1% by mass or lower, based on the whole orientation-differing-carbon composite. The lower limit of the ash content thereof is preferably at least 1 ppm by mass of the whole carbon composite. When the ash content thereof exceeds the upper limit of that range, there are cases where battery performance deterioration caused by reaction with the nonaqueous electrolyte during charge/discharge becomes not negligible. When the ash content thereof is lower than the lower limit of that range, there are cases where the production of this carbonaceous substance necessitates much time and energy and an apparatus for pollution prevention, resulting in an increase in cost.

(3) Raman R Value, Raman Half-Value Width

The Raman R value of the carbonaceous substance (C) as determined by the argon ion laser Raman spectroscopy is generally 0.01 or higher, preferably 0.03 or higher, more preferably 0.05 or higher. The upper limit thereof is generally 0.60 or lower, preferably 0.30 or lower. When the Raman R value thereof is lower than the lower limit of that range, the surface of such particles has too high crystallinity and there are cases where the number of intercalation sites into which lithium comes with charge/discharge decreases. Namely, there are cases where suitability for charge decreases. On the other hand, when the Raman R value thereof exceeds the upper limit of that range, the surface of such particles has reduced crystallinity and enhanced reactivity with the nonaqueous electrolyte and this may lead to a decrease in efficiency and enhanced gas evolution.

The Raman half-value width around 1,580 cm$^{-1}$ of the carbonaceous substance (C) in the invention is not particularly limited. However, the half-value width thereof is generally 5 cm$^{-1}$ or larger, preferably 10 cm$^{-1}$ or larger. The upper limit thereof is generally 60 cm$^{-1}$ or smaller, preferably 45 cm$^{-1}$ or smaller, more preferably 30 cm$^{-1}$ or smaller. When the Raman half-value width thereof is smaller than the lower limit of that range, the surface of such particles has too high crystallinity and there are cases where the number of intercalation sites into which lithium comes with charge/discharge decreases. On the other hand, when the Raman half-value width thereof exceeds the upper limit of that range, the surface of such particles has reduced crystallinity and enhanced reactivity with the nonaqueous electrolyte and this may lead to a decrease in efficiency and enhanced gas evolution.

(4) True Density

The true density of the carbonaceous substance (C) is generally 2.0 g/cm$^3$ or higher, preferably 2.2 g/cm$^3$ or higher, more preferably 2.22 g/cm$^3$ or higher. The upper limit thereof may be up to 2.26 g/cm$^3$, which is a theoretical value for graphites. When the true density of the carbonaceous substance (C) is lower than the lower limit of that range, there are cases where the carbon has too low crystallinity, resulting in an increase in initial irreversible capacity.

[Negative Electrode [5]: Processes for Producing Orientation-Differing-Carbon Composite]

Production processes are not particularly limited, and any technique may be used unless it departs from the spirit of the invention. However, a preferred example thereof roughly comprises the following (1) and (2).

(1) A starting material for the carbonaceous substance (C) is wholly or partly brought into a liquid state in any step, and the material in this liquid state is mixed and/or kneaded with a natural graphite (D).

(2) The composite obtained in that step is subjected to volatile removal/heat-treating, graphitized, and then pulverized and classified to regulate the particle size. Between these steps, a pulverization/classification step may be conducted one or more times.

Specific examples of the process roughly explained above are shown below.

[[Production Process 1 for Producing Orientation-Differing-Carbon Composite]]

The orientation-differing-carbon composite in the invention preferably comprises a natural-graphite-derived carbonaceous substance (B) and, combined therewith, a carbonaceous substance (C) differing in orientation from the natural-graphite-derived carbonaceous substance (B). Examples of processes for producing it include a process which comprises mixing the natural graphite (D) with a precursor for the carbonaceous substance (C), i.e., a pitch material or a material obtained by heat-treating a pitch material or another material and pulverizing the heat-treated material (hereinafter abbreviated to "heat-treated graphite crystal precursor"), and with a natural polymer or the like in a given proportion, subjecting the mixture to heat treatment A, subsequently pulverizing the heat-treated mixture, and then subjecting the resultant powder to heat treatment B (heat-treating and graphitization). The pulverization may be omitted when the heat-treated mixture has a sufficiently small median diameter and does not necessitate pulverization.

[[[Production of Heat-Treated Graphite Crystal Precursor]]]

A pitch material is subjected beforehand to a heat treatment to obtain a heat-treated graphite crystal precursor. This heat treatment conducted beforehand is called pitch heat treatment. This heat-treated graphite crystal precursor is pulverized and subsequently mixed with a natural graphite (D), and this mixture is subjected to heat treatment A, during which the precursor melts partly or wholly. By regulating the content of volatiles through the heat treatment conducted beforehand (pitch heat treatment), the molten state can be properly controlled. Examples of the volatiles contained in the heat-treated graphite crystal precursor generally include hydrogen, benzene, naphthalene, anthracene, and pyrene.

Temperature conditions for the pitch heat treatment are not particularly limited. However, the temperature is generally in the range of from 300° C. to 550° C. When the heat treatment temperature is lower than the lower limit of that range, there are cases where volatiles remain in an increased amount and, hence, safe pulverization in the air is difficult to conduct. On the other hand, when the temperature exceeds the upper limit, there are cases where the heat-treated graphite crystal precursor does not melt partly or wholly during the heat treatment A and particles comprising a natural-graphite-derived carbonaceous substance (B) and the heat-treated graphite crystal precursor combined therewith (orientation-differing-carbon composite) are difficult to obtain. The pitch heat treatment is conducted in an inert gas atmosphere such as, e.g., nitrogen gas or in the atmosphere of volatiles generated from the pitch material.

Apparatus usable for the pitch heat treatment are not particularly limited. For example, use can be made of a reaction vessel such as a shuttle furnace, tunnel kiln, electric furnace, or autoclave, a coker (heat-treatment vessel for coke production), or the like. During the pitch heat treatment, stirring may be conducted according to need.

It is preferred that the heat-treated graphite crystal precursor to be used should be one having a volatile content of generally 5% by mass or higher. When the graphite crystal precursor having a volatile content in that range is used, the carbonaceous substance (C) is combined with a natural-graphite-derived carbonaceous substance (B) by the heat treatment A, whereby an orientation-differing-carbon composite having the properties specified above can be obtained.

First, a process for producing the bulk mesophase which is the precursor for graphite crystals obtained beforehand by heat-treating a pitch material (bulk mesophase is a graphite crystal precursor which has been heat-treated; hereinafter it is abbreviated to "heat-treated graphite crystal precursor) will be explained.

(Volatile Content of Heat-Treated Graphite Crystal Precursor)

The volatile content of the graphite crystal precursor obtained by the pitch heat treatment is not particularly limited. However, the volatile content thereof is generally 5% by mass or higher, preferably 6% by mass or higher, and is generally 20% by mass or lower, preferably 15% by mass or lower. When the volatile content thereof is lower than the lower limit of that range, there are cases where safe pulverization in the air is difficult to conduct because of the volatiles contained in a large amount. On the other hand, when the volatile content thereof is higher than the upper limit, there are cases where the graphite crystal precursor does not melt partly or wholly during the heat treatment A and particles comprising a natural-graphite-derived carbonaceous substance (B) and the heat-treated graphite crystal precursor combined therewith (orientation-differing-carbon composite) are difficult to obtain. For determining the content of volatiles, use is made of, e.g., the method as provided for in JIS M8812.

(Softening Point of Heat-Treated Graphite Crystal Precursor)

The softening point of the graphite crystal precursor obtained by the pitch heat treatment is not particularly limited. However, the softening point thereof is generally 250° C. or higher, preferably 300° C. or higher, more preferably 370° C. or higher, and is generally 470° C. or lower, preferably 450° C. or lower, more preferably 430° C. or lower. When the softening point thereof is lower than the lower limit, there are cases where a heat treatment of this graphite crystal precursor results in a low carbonization yield and a homogeneous mixture with a natural-graphite-derived carbonaceous substance (B) is difficult to obtain. When the softening point thereof exceeds the upper limit, there are cases where the graphite crystal precursor does not melt partly or wholly during the heat treatment A and particles comprising a natural-graphite-derived carbonaceous substance (B) and the heat-treated graphite crystal precursor combined therewith (orientation-differing-carbon composite) are difficult to obtain.

The values of softening point used are ones measured by examining a sample molded in a thickness of 1 mm with a tableting press, by the penetration method using an apparatus for thermomechanical analysis (e.g., TMA4000, manufactured by Bruker AXS K.K.) in a nitrogen stream under the conditions of a heating rate of 10° C./min, needle tip shape of 1 mm$\phi$, and load of 20 gf.

(Pulverization of Heat-Treated Graphite Crystal Precursor)

Subsequently, the heat-treated graphite crystal precursor obtained by the pitch heat treatment is pulverized. This pulverization is conducted for the purpose of pulverizing the heat-treated graphite crystal precursor crystals which have come into a half-oriented state in each of large units due to the heat treatment and/or of evenly mixing and combining the heat-treated graphite crystal precursor with a natural graphite (D).

The pulverization of the heat-treated graphite crystal precursor obtained by the pitch heat treatment is not particularly limited. However, it is conducted so that the particle size of the heat-treated graphite crystal precursor is reduced by the pulverization to a value which is generally 1 μm or larger, preferably 5 μm or larger, and is generally 10 mm or smaller, preferably 5 mm or smaller, more preferably 500 μm or smaller, especially preferably 200 μm or smaller, even more preferably 50 μm or smaller. When the particle size thereof is smaller than 1 μm, there are cases where the heat-treated graphite crystal precursor is oxidized during or after the pulverization when the surface of the precursor comes into contact with air. This oxidation may inhibit crystallinity from improving in the step of graphitization, leading to a decrease in discharge capacity after the graphitization. On the other hand, when the particle size thereof exceeds 10 mm, the size-reducing effect of the pulverization is lessened and this tends to result in crystal orientation and the orientation of the carbonaceous substance (C). There are hence cases where the electrode employing this orientation-differing carbonaceous composite (A) has a reduced active-material orientation ratio and the electrode expansion which occurs upon battery charge is difficult to inhibit. Furthermore and/or alternatively, there are cases where the increased difference in particle diameter between the natural graphite (D) and the heat-treated graphite crystal precursor makes it difficult to conduct even mixing and this tends to result in a composite which is not homogeneous.

Apparatus usable for the pulverization are not particularly limited. Examples of crushers include shearing mills, jaw crushers, impact crushers, and cone crushers. Examples of intermediate pulverizers include roll crushers and hammer mills. Examples of pulverizers include ball mills, oscillating mills, pin mills, stirring mills, jet mills, and turbo mills.

[[[Heat Treatment of Natural Graphite (D) and Heat-Treated Graphite Crystal Precursor]]]

A natural graphite (D) is mixed with the heat-treated graphite crystal precursor (raw material for a carbonaceous substance (C)) in a given proportion. This mixture is subjected to heat treatment A, pulverization, and heat treatment B (heat-treating and graphitization) to thereby produce an orientation-differing-carbon composite.

(Mixing of Natural Graphite (D) and Heat-Treated Graphite Crystal Precursor)

The mixing of the natural graphite (D) with the heat-treated graphite crystal precursor, which is conducted before heat treatment A, is not particularly limited in mixing ratio. However, the two ingredients are mixed together so that the proportion of the natural graphite (D) to the mixture is generally 20% by mass or higher, preferably 30% by mass or higher, more preferably 40% by mass or higher, and is generally 95% by mass or lower, preferably 90% by mass or lower. When the proportion thereof is lower than the lower limit, the proportion of the carbonaceous substance (C) in the orientation-differing carbonaceous composite (A) increases. There are hence cases where use of this carbon composite (A) in electrode formation is less apt to result in a high loading density and necessitates an excessively high pressing load. Namely, the effect to be produced by combining the natural-graphite-derived carbonaceous substance (B) is difficult to obtain. When the proportion of the natural graphite (D) exceeds the upper limit, the natural-graphite-derived carbonaceous substance (B) in the orientation-differing carbonaceous composite (A) comes to have an increased amount of exposed surfaces and this may result in an increase in the specific surface area of the orientation-differing carbonaceous composite (A). Namely, there are cases where such carbon composite (A) is undesirable from the standpoint of powder properties.

Apparatus usable for mixing the natural graphite (D) with the heat-treated graphite crystal precursor regulated so as to have a given particle size are not particularly limited. Examples thereof include V-shaped mixers, W-shaped mixers, change-can mixers, kneaders, drum mixers, and shearing mixers.

(Heat Treatment A)

Subsequently, the mixture of the natural graphite (D) and the heat-treated graphite crystal precursor is subjected to heat treatment A. This heat treatment is conducted for the purpose of re-melting or fusing the pulverized heat-treated graphite crystal precursor to thereby fix the natural graphite (D) and the fine particles of the heat-treated graphite crystal precursor while keeping the two ingredients in contact with each other in an unoriented state. Thus, the mixture of the natural graphite (D) and the heat-treated graphite crystal precursor can be converted to not a mere mixture of particles but a more homogeneous composite mixture (hereinafter suitably referred to as "graphite composite mixture").

Temperature conditions for the heat treatment A are not particularly limited. However, the temperature is generally 300° C. or higher, preferably 400° C. or higher, more preferably 450° C. or higher, and is generally 650° C. or lower, preferably 600° C. or lower. When the temperature in heat treatment A is lower than the lower limit of that range, a large amount of volatiles remain in the material after heat treatment A and, hence, there is a possibility that the powder particles might be fused to each other during the step of heat-treating or graphitization. Namely, there are cases where re-pulverization becomes necessary. On the other hand, when the temperature exceeds the upper limit of that range, there are cases where the ingredient which was re-melted is broken into an acicular shape during pulverization, resulting in a decrease in tap density. Heat treatment A is conducted in an inert gas atmosphere, e.g., nitrogen gas, or in the atmosphere of volatiles generated from the heat-treated graphite crystal precursor which has been reduced into fine particles by pulverization.

Apparatus usable for heat treatment A are not particularly limited. For example, a shuttle furnace, tunnel kiln, electric furnace, or the like can be used.

(Treatment as Substitute for Pulverization of Heat-Treated Graphite Crystal Precursor and for Heat Treatment A)

Incidentally, a treatment as a substitute for the pulverization and heat treatment A described above can be conducted. Namely, it is possible to mix the heat-treated graphite crystal precursor with a natural graphite (D) and heat-treat the mixture while conducting a treatment in which the structure of the graphite crystal precursor can be reduced into fine particles in an unoriented state, e.g., a treatment in which mechanical energy is applied at a temperature in a range where the heat-treated graphite crystal precursor melts or softens.

This heat treatment as a substitute is not particularly limited. However, it is conducted at a temperature which is generally 200° C. or higher, preferably 250° C. or higher, and is generally 450° C. or lower, preferably 400° C. or lower. When the temperature conditions are lower than the lower limit of that range, there are cases where the melting or softening of the graphite crystal precursor during this substitute treatment is insufficient and this precursor is difficult to combine with the natural graphite (D). When the temperature exceeds the upper limit, the heat treatment is apt to proceed rapidly and there are hence cases where the particles of the carbonaceous heat-treated graphite crystal precursor, etc. are broken into an acicular shape during pulverization, resulting in a decrease in tap density.

This substitute treatment is generally conducted in an inert atmosphere, e.g., nitrogen gas, or in an oxidizing atmosphere, e.g., air. It should, however, be noted that when the treatment is conducted in an oxidizing atmosphere, there are cases where high crystallinity is difficult to obtain after graphitization. It is therefore necessary to prevent oxygen from excessively making the precursor infusible. Specifically, the substitute treatment is conducted so that the graphite crystal precursor after the treatment has an oxygen content of generally 8% by mass or lower, preferably 5% by mass or lower.

Apparatus usable for the substitute treatment are not particularly limited. However, a mixer, kneader, or the like can be used.

(Pulverization)

Subsequently, the graphite composite mixture which has undergone heat treatment A is pulverized. This graphite composite mixture is in the form of aggregates formed through heat treatment A by combining the finely powdered structure in an unoriented state with the natural graphite (D) through melting or fusion. This pulverization is conducted for the purpose of pulverizing the aggregates to a target particle diameter.

The particle size of the graphite composite mixture after the pulverization is not particularly limited. However, it is generally 1 μm or larger, preferably 3 μm or larger, more preferably 5 μm or larger, even more preferably 7 μm or larger, and is generally 50 μm or smaller, preferably 35 μm or smaller, more preferably 30 μm or smaller. In case where the particle size thereof is smaller than the lower limit of that range, the resultant orientation-differing carbonaceous composite (A) has a reduced tap density and gives an electrode less apt to have an increased active-material loading density. Namely, a high-capacity battery is difficult to obtain. On the other hand, when the particle size thereof exceeds the upper limit of that range, there are cases where the resultant orientation-differing carbonaceous composite (A) is apt to cause coating unevenness when used in producing an electrode through coating fluid application.

Apparatus usable for the pulverization are not particularly limited. Examples of crushers include jaw crushers, impact crushers, and cone crushers. Examples of intermediate pulverizers include roll crushers and hammer mills. Examples of pulverizers include ball mills, oscillating mills, pin mills, stirring mills, and jet mills.

(Heat Treatment B: Burning)

Heat treatment B means heat-treating and graphitization. The heat-treating is first explained. However, this heat-treating may be omitted. The graphite composite mixture which has been reduced into fine particles by the pulverization is heat-treated. This heat-treating is conducted for the purpose of removing volatiles from the graphite composite mixture in order to control the fusion of the graphite composite mixture in graphitization.

Temperature conditions in the heat-treating are not particularly limited. However, the temperature is generally 600° C. or higher, preferably 1,000° C. or higher. The upper limit thereof is generally 2,400° C. or lower, preferably 1,300° C. or lower. When the temperature conditions are lower than the lower limit of that range, there are cases where the powder of the graphite composite mixture is apt to fuse during graphitization. On the other hand, in case where the temperature exceeds the upper limit of that range, the heat-treating apparatus becomes costly. Consequently, the heat-treating is conducted usually under temperature conditions within that range.

The heat-treating is conducted in an inert gas atmosphere, e.g., nitrogen gas, or in a non-oxidizing atmosphere comprising gases generated from the graphite composite mixture which has been re-pulverized. For the purpose of simplifying production steps, graphitization may be directly conducted without via a heat-treating step.

Apparatus usable for the heat-treating are not particularly limited. For example, use can be made of a shuttle furnace, tunnel kiln, electric furnace, Riedhammer furnace, rotary kiln, or the like.

(Heat Treatment B: Graphitization)

Subsequently, the graphite composite mixture which has been heat-treated is graphitized. This graphitization is conducted for the purpose of improving crystallinity in order to increase discharge capacity in battery evaluation. Through the graphitization, an orientation-differing carbonaceous composite (A) can be obtained.

Temperature conditions in the graphitization are not particularly limited. However, the temperature is generally 2,800° C. or higher, preferably 2,900° C. or higher, more preferably 3,000° C. or higher, and is generally 3,400° C. or lower, preferably 3,200° C. or lower. When the temperature exceeds the upper limit of that range, there are cases where a battery having a reduced reversible capacity results. Namely, there are cases where a high-capacity battery is difficult to produce. In addition, temperatures higher than the upper limit of that range may apt to result in enhanced graphite sublimation.

The graphitization is conducted in an inert gas atmosphere, e.g., argon gas, or in a non-oxidizing atmosphere comprising gases generated from the graphite composite mixture which has been heat-treated. Apparatus usable for the graphitization are not particularly limited. Examples thereof include direct voltage application type electric furnaces, Acheson furnaces, and indirect voltage application type furnaces such as resistance heating furnaces and induction heating furnaces.

Incidentally, a graphitization catalyst such as, e.g., Si or B may be added to inner parts or the surface of a material (the natural graphite (D), pitch material, or graphite crystal precursor) during the graphitization or in any of the steps before the graphitization, i.e., the steps ranging from the heat treatment to the heat-treating.

(Other Treatments)

Besides the treatments described above, other various treatments including classification can be conducted unless such treatments lessen the effects of the invention. Classification is a treatment for removing coarse particles and fine particles in order to regulate the particle size after the graphitization treatment to a target particle diameter.

Apparatus usable for the classification are not particularly limited. However, in the case of dry sieving, use can be made of a rotary sieve, swing sieve, revolving sieve, vibrating sieve, or the like. In the case of dry air classification, use can be made of a gravitational classifier, inertial classifier, or centrifugal classifier (e.g., classifier or cyclone). Furthermore, for wet sieving, use can be made of a mechanical wet classifier, hydraulic classifier, sedimentation classifier, centrifugal wet classifier, or the like.

Classification may be conducted immediately after the pulverization after heat treatment A, or may be conducted in another timing. For example, it may be conducted after the heat-treating after the pulverization or conducted after the graphitization. It is also possible to omit the classification treatment itself. However, from the standpoints of reducing the BET specific surface area of the orientation-differing carbonaceous composite (A) and of productivity, it is preferred to conduct a classification treatment immediately after the pulverization after heat treatment A.

(Treatment after Production of Orientation-Differing Carbonaceous Composite (A))

An artificial-graphite powder separately produced or a natural-graphite powder may be further mixed with the orientation-differing carbonaceous composite (A) produced by the procedure described above, for the purposes of regulating the BET specific surface area of the negative-electrode material, improving suitability for electrode pressing, improving discharge capacity, cost reduction, etc.

[Negative Electrode [5]: Production Process 2 for Orientation-Differing-Carbon Composite]

The orientation-differing-carbon composite may be produced also by the following process. The orientation-differing-carbon composite in the invention preferably comprises a natural-graphite-derived carbonaceous substance (B) and, combined therewith, a carbonaceous substance (C) differing in orientation from the natural-graphite-derived carbonaceous substance (B). Examples of processes for producing it include a process in which the natural graphite (D) and a pitch material as a precursor for the carbonaceous substance (C) are subjected to the steps of "kneading (mixing)", "molding", "heat-treating", "graphitization", and "pulverization". Of these steps, "molding", "heat-treating", and "pulverization" may be omitted and/or conducted simultaneously with another step. Specifically, the carbon composite can be obtained, for example, by the following production process.

[[Kneading (Mixing)]]

Raw materials comprising a natural graphite (D), a pitch material, and optional ingredients, e.g., a graphitization catalyst, are mixed together. In this operation, it is preferred to conduct heating for even mixing. Thus, a mixture is obtained in which the liquid pitch material is adherent to the natural graphite (D) and the raw material which does not melt at the kneading temperature. In this case, use may be made of a method in which all raw materials are charged into a kneading machine and are kneaded and heated simultaneously. Alternatively, use may be made of a method in which the ingredients other than the pitch material are charged into a kneading machine and heated with stirring and the pitch material having ordinary temperature or in a vulcanized and molten state is charged after the contents have been heated to a kneading temperature.

The heating temperature for the kneading is generally a temperature not lower than the softening point of the pitch material, preferably a temperature higher than the softening point by 10° C. or more, more preferably a temperature higher than the softening point by 20° C. or more. The upper limit thereof is generally 300° C. or lower, preferably 250° C. or lower. When the temperature is lower than the lower limit of that range, there are cases where the pitch material has an increased viscosity to make the mixing difficult. On the other hand, when the temperature exceeds the upper limit of that range, there are cases where the system being mixed comes to have too high a viscosity due to volatilization and polycondensation.

A mixing machine of the kind having stirring blades is preferred. As the stirring blades, general ones can be used, such as the Z type or the matiscator type. The amount of the raw materials to be charged into the mixing machine generally is 10% by volume or larger, preferably 15% by volume or larger, and is 50% by volume or smaller, preferably 30% by volume or smaller, based on the capacity of the mixing machine. A mixing period of 5 minutes or longer is necessary. The mixing period is up to the time when the volatilization of volatile ingredients results in a large viscosity change. Usually, the mixing period is 30-120 minutes. It is preferred that the mixing machine be preheated to the kneading temperature before the mixing.

[[Molding]]

The mixture obtained may be subjected as it is to the step of volatile removal/heat-treating, which is conducted for the removal of volatile ingredients and carbonization. It is, however, preferred to mold the mixture in order to facilitate handling before it is subjected to the step of volatile removal/heat-treating.

Molding methods are not particularly limited as long as the resultant shape can be maintained. Use can be made of extrusion molding, molding with a mold, hydraulic molding, or the like. Of these molding techniques, extrusion molding is apt to give molded objects in which the particles are oriented, while hydraulic molding is inferior in productivity although the particles are in a randomly oriented state. Molding with a mold is preferable to these two techniques because it has advantages that the operation is relatively easy and a molded object can be obtained without breaking the structure in which the particles are in a randomly oriented state due to the mixing.

The molding may be conducted either at room temperature (cold molding) or with heating (hot molding; temperature not lower than the softening point of the pitch material). In the case of cold molding, it is desirable that the mixture which has been cooled after the kneading should be crushed beforehand to a maximum size of 1 mm or smaller in order to improve moldability and obtain molded-object evenness. The shape and size of the molded object are not particularly limited. In the case of hot molding, however, formation of too large a molding necessitates much time in conducting even preheating prior to the molding. Consequently, the size thereof is generally preferably up to about 150 cm in terms of maximum dimension.

With respect to molding pressure, too high a pressure makes it difficult to remove volatile ingredients through pores of the resultant molded object and orients particles of the natural graphite (D) which are not completely round, making it difficult to conduct pulverization in a later step. Consequently, the upper limit of the molding pressure is generally 3,000 kgf/cm$^2$ (294 MPa) or lower, preferably 500 kgf/cm$^2$ (49 MPa) or lower, more preferably 10 kgf/cm$^2$ (0.98 MPa) or lower. Although the lower limit of the pressure is not particularly limited, it is preferably regulated to a value which enables the molded object to retain its shape in the step of volatile removal/heat-treating.

[[Volatile Removal/Burning]]

The molded object obtained is subjected to the step of volatile removal/heat-treating for the purpose of removing volatile ingredients from the natural graphite (D) and pitch material to thereby prevent the volatile ingredients from fouling a packing and the molded object from adhering to the packing during graphitization. The volatile removal/heat-treating is conducted at a temperature which is generally 600° C. or higher, preferably 650° C. or higher, and is generally 1,300° C. or lower, preferably 1,100° C. or lower, for a period of generally 0.1-10 hours. For the purpose of preventing oxidation, the heating is conducted generally in the stream of an inert gas, e.g., nitrogen or argon, or in a non-oxidizing atmosphere formed by packing a particulate carbon material such as, e.g., a breeze or packing coke in spaces.

Apparatus usable for the volatile removal/heat-treating are not particularly limited as long as they can be used for heat-treating in a non-oxidizing atmosphere, like electric furnaces, gas furnaces, Riedhammer furnaces for electrode materials, and the like. The heating rate in the heating desirably is low from the standpoint of removing volatile ingredients. In general, heating from about 200° C., at which low-boiling ingredients begin to volatilize, to about 700° C., at which hydrogen becomes the only substance which generates, is conducted at 3-100° C./hr.

[[Graphitization]]

The carbonized molding obtained by the volatile removal/heat-treating is subsequently graphitized by high-temperature heating. Conditions for this graphitization are the same as described above under Production Process 1.

With respect to atmospheres for the graphitization, it is conducted in the stream of an inert gas, e.g., nitrogen or argon, or in a non-oxidizing atmosphere formed by packing a particulate carbon material such as, e.g., a breeze or packing coke in spaces, in order to prevent oxidation. Apparatus usable for the graphitization are not particularly limited as long as they meet the purpose. For example, an electric furnace, gas furnace, Acheson furnace, or the like can be used. Conditions including heating rate, cooling rate, and heat treatment period can be determined at will within the ranges allowable for the apparatus.

[[Pulverization]]

The graphitization product thus obtained is usually in the form of aggregates. This product, without any treatment, is usually difficult to use as a negative-electrode active material. Consequently, pulverization and/or removal of large particles and small particles is conducted. Methods for pulverizing the graphitization product are not particularly limited. Examples of pulverization devices include devices for mechanical grinding, such as, e.g., ball mills, hammer mills, CF mills, atomizer mills, and pulverizers, and pulverization devices utilizing wind force, such as, e.g., jet mills. For crushing and intermediate pulverization, use may be made of an impact type crushing device, such as a jaw crusher, hammer mill, or roller mill. The timing of pulverization may be before the graphitization or after the graphitization.

[Negative Electrode [5]: Minor-Material Mixing]

Besides the orientation-differing-carbon composite, one or more carbonaceous substances (carbonaceous materials) differing in carbonaceous-substance property from the carbon composite may be incorporated into the negative-electrode active material for use in a lithium secondary battery of the invention. Thus, battery performances can be further improved. The term "carbonaceous-substance property" herein means one or more properties selected from X-ray diffraction parameter, median diameter, aspect ratio, BET specific surface area, orientation ratio, Raman R value, tap density, true density, pore distribution, roundness, and ash content. Preferred embodiments include: one in which the volume-based particle size distribution is not symmetrical about the median diameter; one in which two or more carbon materials differing in Raman R value are contained; and one in which carbon materials differing in X-ray parameter are contained. One example of the effects thereof is that the incorporation of a carbon material, such as a graphite, e.g., a natural graphite or artificial graphite, or an amorphous carbon, e.g., a carbon black such as acetylene black or needle coke, as a sub material serves to reduce electrical resistance. One of these carbon materials may be used alone, or any desired two or more thereof may be used in combination in any desired proportion. In the case where such a carbon material is added as a sub material, the amount thereof may be 0.1% by mass or larger and is preferably 0.5% by mass or larger, more preferably 0.6% by mass or larger. The upper limit thereof may be 80% by mass or smaller and is preferably 50% by mass or smaller, more preferably 40% by mass or smaller, even more preferably 30% by mass or smaller. When the amount thereof is smaller than the lower limit of that range, there are cases where the effect of improving conductivity is difficult to obtain. When the amount thereof exceeds the upper limit, there are cases where this leads to an increase in initial irreversible capacity.

[Negative Electrode [5]: Electrode Production]

This negative electrode may be produced by an ordinary method. It can be formed in the same manner as described above. The current collector, thickness ratio between the current collector and the active-material layer, electrode density, binder, electrode-plate orientation ratio, impedance, etc. also are the same as described above.

<Negative Electrode [6]>

An explanation will be given below on negative electrode [6] for use in a lithium secondary battery of the invention, i.e., "a negative electrode containing, as a negative-electrode active material, graphitic carbon particles which have a roundness of 0.85 or higher and an interplanar spacing (d002) for the (002) planes as determined by wide-angle X-ray diffractometry of smaller than 0.337 nm and which, in an examination by argon ion laser Raman spectroscopy, have a Raman R value defined as the ratio of the peak intensity at 1,360 cm$^{-1}$ to the peak intensity at 1,580 cm$^{-1}$ of from 0.12 to 0.8".

[Negative Electrode [6]: Negative-Electrode Active Material]

The negative-electrode active material for use in negative electrode [6] is described below.

The negative-electrode active material for use in negative electrode [6] in a lithium secondary battery of the invention comprises graphitic carbon particles satisfying at least the following (a), (b), and (c).

(a) The roundness is 0.85 or higher.
(b) The interplanar spacing (d002) for the (002) planes as determined by wide-angle X-ray diffractometry is smaller than 0.337 nm.
(c) The Raman R value defined as the ratio of the peak intensity at 1,360 cm$^{-1}$ to the peak intensity at 1,580 cm$^{-1}$ in an examination by argon ion laser Raman spectroscopy (hereinafter often referred to simply as "Raman R value") is from 0.12 to 0.8.

[[Roundness]]

The roundness of the graphitic carbon particles for use as a negative-electrode active material in a lithium secondary battery of the invention is generally 0.85 or higher, preferably 0.87 or higher, more preferably 0.89 or higher, especially preferably 0.92 or higher. With respect to the upper limit thereof, a particle having a roundness of 1 theoretically is a true sphere. In case where the roundness thereof is lower than the lower limit of that range, use of this negative-electrode active material results in a reduced loading and thermal conductivity decreases. There are hence cases where a quick output recovery is inhibited. In particular, there are cases where an output recovery from a low-output state at low temperatures is slow.

In the invention, roundness is defined by the following equation.

Roundness=(length of periphery of equivalent circle having the same area as projected particle shape)/(actual length of periphery of projected particle shape)

The value of roundness is determined, for example, with a flow type particle image analyzer (e.g., FPIA, manufactured by Sysmex Industrial Corp.) by dispersing about 0.2 g of a sample in a 0.2% by mass aqueous solution (about 50 mL) of poly(oxyethylene(20)) sorbitan monolaurate as a surfactant, propagating an ultrasonic wave of 28 kHz to the dispersion for 1 minute at an output of 60 W, and then examining particles having a particle diameter in the range of 3-40 µm with the analyzer having a detection range set at 0.6-400 µm.

[[Interplanar Spacing (d002)]]

The interplanar spacing (d002) for the (002) planes of the graphitic carbon particles for use as the negative-electrode active material of negative electrode [6] in a lithium secondary battery of the invention, as determined by wide-angle X-ray diffractometry, is smaller than 0.337 nm, and is preferably 0.336 nm or smaller. The lower limit thereof is 0.335, which is a theoretical value for graphites. In case where the interplanar spacing (d002) thereof exceeds the upper limit of that range, crystallinity decreases and heat conduction by electrons decreases. There are hence cases where the property of quickly recovering output decreases.

In particular, there are cases where an output recovery from a low-output state at low temperatures is slow.

The term "interplanar spacing (d002) for the (002) planes as determined by wide-angle X-ray diffractometry" in the invention means the value of d (interplanar spacing) for the lattice planes ((002) planes) as determined by X-ray diffractometry by the method of the Japan Society for Promotion of Scientific Research.

The crystallite size (Lc) of the graphitic carbon particles as determined by X-ray diffractometry by the method of the Japan Society for Promotion of Scientific Research is not particularly limited. However, the Lc thereof is generally 10 nm or larger, preferably 30 nm or larger, more preferably 80 nm or larger. In case where the Lc thereof is smaller than the lower limit of that range, crystallinity decreases and heat conduction by electrons decreases. There are hence cases where the property of quickly recovering output decreases.

[[Raman R Value]]

The Raman R value of the graphitic carbon particles for use as the negative-electrode active material of negative electrode [6] in a lithium secondary battery of the invention should be 0.12 or higher, and is preferably 0.15 or higher, more preferably 0.17 or higher, especially preferably 0.2 or higher. The upper limit thereof is preferably 0.8 or lower, more preferably 0.6 or lower, especially preferably 0.45 or lower. In case where the Raman R value thereof is lower than the lower limit of that range, the surface of such particles has too high crystallinity and the number of charge/discharge sites decreases. There are hence cases where output itself decreases accordingly. On the other hand, in case where the Raman R value thereof exceeds the upper limit of that range, the surface of such particles has reduced crystallinity. There are hence cases where heat conduction by electrons decreases and the property of recovering output decreases.

The examination for a Raman spectrum is made with a Raman spectrometer (e.g., a Raman spectrometer manufactured by Japan Spectroscopic Co., Ltd.). In the examination, a sample is charged into a measuring cell by causing the sample to fall naturally into the cell and the surface of the sample in the cell is irradiated with argon ion laser light while rotating the cell in a plane perpendicular to the laser light. The Raman spectrum obtained is examined for the intensity $I_A$ of a peak $P_A$ at 1,580 cm$^{-1}$ and the intensity $I_B$ of a peak $P_B$ at 1,360 cm$^{-1}$. The ratio between these intensities R ($R=I_B/I_A$) is calculated and this ratio is defined as the Raman R value of the graphitic carbon particles. Furthermore, the half-value width of the peak $P_A$ at 1,580 cm$^{-1}$ in the Raman spectrum obtained is measured, and this value is defined as the Raman half-value width of the graphitic carbon particles.

Conditions for this Raman spectroscopy are as follows.
Wavelength of argon ion laser: 514.5 nm
Laser power on sample: 15-25 mW
Resolution: 10-20 cm$^{-1}$
Examination range: 1,100 cm$^{-1}$ to 1,730 cm$^{-1}$
Analysis for Raman R value and Raman half-value width: background processing
Smoothing: simple average; convolution, 5 points The Raman half-value width at 1,580 cm$^{-1}$ of the graphitic carbon particles for use as the negative-electrode active material of negative electrode [6] in a lithium secondary battery of the invention is not particularly limited. However, the half-value width thereof is generally 10 cm$^{-1}$ or larger, preferably 15 cm$^{-1}$ or larger. The upper limit thereof is generally 60 cm$^{-1}$ or smaller, preferably 50 cm$^{-1}$ or smaller, more preferably 45 cm$^{-1}$ or smaller. In case where the Raman half-value width thereof is smaller than the lower limit of that range, the surface of such particles has too high crystallinity and the number of charge/discharge sites decreases. There are hence cases where output itself decreases accordingly. On the other hand, in case where the Raman half-value width thereof exceeds the upper limit of that range, the surface of such particles has reduced crystallinity. There are hence cases where heat conduction by electrons decreases and the property of recovering output decreases.

[[Tap Density]]

The tap density of the graphitic carbon particles for use as the negative-electrode active material of negative electrode [6] in a lithium secondary battery of the invention is preferably 0.55 g/cm$^3$ or higher, more preferably 0.7 g/cm$^3$ or higher, even more preferably 0.8 g/cm$^3$ or higher, especially preferably 1 g/cm$^3$ or higher. The upper limit thereof is preferably 2 g/cm$^3$ or lower, more preferably 1.8 g/cm$^3$ or lower, especially preferably 1.6 g/cm$^3$ or lower. In case where the tap density thereof is lower than the lower limit of that range, this graphitic carbon, when used in a negative electrode, is less apt to have a high loading density and has a reduced interparticle contact area. There are hence cases where thermal conductivity decreases. On the other hand, in case where the tap density thereof exceeds the upper limit of that range, the electrode has too small an amount of interparticle interstices and a reduced amount of channels for the nonaqueous electrolyte. There are hence cases where output itself decreases.

In the invention, the tap density of a sample is determined by dropping the sample through a sieve having an opening size of 300 μm into a 20-cm$^3$ tapping cell to fill the cell with the sample up to the brim, subsequently conducting tapping operations 1,000 times over a stroke length of 10 mm using a powder densimeter (e.g., Tap Denser, manufactured by Seishin Enterprise Co., Ltd.), and determining a density from the resultant volume of the sample and the weight thereof. This density is defined as the tap density.

[[BET Specific Surface Area]]

The specific surface area of the graphitic carbon particles for use as the negative-electrode active material of negative electrode [6] in a lithium secondary battery of the invention, as determined by the BET method, is preferably 0.1 m$^2$/g or larger, more preferably 0.7 m$^2$/g or larger, especially preferably 1 m$^2$/g or larger, even more preferably 1.5 m$^2$/g or larger. The upper limit thereof is preferably 100 m$^2$/g or smaller, more preferably 50 m$^2$/g or smaller, especially preferably 25 m$^2$/g or smaller, even more preferably 15 m$^2$/g or smaller. When the BET specific surface area thereof is smaller than the lower limit of that range, there are cases where use of this graphitic carbon as a negative-electrode material is apt to result in poor lithium acceptance during charge and in lithium deposition on the electrode surface. On the other hand, when the specific surface area thereof exceeds the upper limit of that range, there are cases where use of this graphitic carbon as a negative-electrode material is apt to result in enhanced reactivity with the nonaqueous electrolyte and enhanced gas evolution and a preferred battery is difficult to obtain.

BET specific surface area is defined as a value measured with a surface area meter (e.g., a fully automatic surface area measuring apparatus manufactured by Ohukura Riken Co., Ltd.) by preliminarily drying a sample at 350° C. for 15 minutes in a nitrogen stream and then measuring the specific surface area thereof by the gas-flowing nitrogen adsorption BET one-point method using a nitrogen/helium mixture gas precisely regulated so as to have a nitrogen pressure of 0.3 relative to atmospheric pressure.

[[Volume-Average Particle Diameter]]

The volume-average particle diameter of the graphitic carbon particles for use as the negative-electrode active material of negative electrode [6] in a lithium secondary battery of the invention, which is defined as the volume-average particle diameter (median diameter) determined by the laser diffraction/scattering method, is preferably 1 μm or larger, more preferably 3 μm or larger, especially preferably 5 μm or larger, even more preferably 7 μm or larger. The upper limit thereof is generally 50 μm or smaller, preferably 40 μm or smaller, more preferably 30 μm or smaller, especially preferably 25 μm or smaller. When the volume-average particle diameter thereof is smaller than the lower limit of that range, there are cases where irreversible capacity increases, leading to a loss in initial battery capacity. When the volume-average particle diameter thereof exceeds the upper limit of that range, there are cases where such graphitic carbon particles are undesirable from the standpoint of battery production because an uneven coating surface is apt to result when an electrode plate is produced.

[[Pore Volume]]

With respect to the pore volume of the graphitic carbon particles for use as the negative-electrode active material of negative electrode [6] in a lithium secondary battery of the invention, the amount of interstices corresponding to a pore diameter of from 0.01 μm to 1 μm which include pores in the particles and particle surface irregularities formed by steps, as determined by mercury porosimetry (mercury intrusion method), is generally 0.01 mL/g or larger, preferably 0.05 mL/g or larger, more preferably 0.1 mL/g or larger. The upper limit thereof is generally 0.6 mL/g or smaller, preferably 0.4 mL/g or smaller, more preferably 0.3 mL/g or smaller. When the amount of interstices therein is larger than the upper limit of that range, there are cases where a large amount of a binder is necessary in electrode plate formation. When the amount thereof is smaller than the lower limit, there are cases where high-current-density charge/discharge characteristics decrease and the effect of diminishing electrode expansion/contraction during charge/discharge is not obtained.

The total pore volume is preferably 0.1 mL/g or larger, more preferably 0.25 mL/g or larger. The upper limit thereof is generally 10 mL/g or smaller, preferably 5 mL/g or smaller, more preferably 2 mL/g or smaller. When the total pore volume exceeds the upper limit of that range, there are cases where a large amount of a binder is necessary in electrode plate formation. When the total pore volume is smaller than the lower limit, there are cases where the dispersing effect of a thickener or binder in electrode plate formation is not obtained.

The average pore diameter of the graphitic carbon particles is preferably 0.05 μm or larger, more preferably 0.1 μm or larger, even more preferably 0.5 μm or larger. The upper limit thereof may be 50 μm or smaller and is preferably 20 μm or smaller, more preferably 10 μm or smaller. When the average pore diameter thereof exceeds the upper limit of that range, there are cases where a large amount of a binder is necessary. When the average pore diameter thereof is smaller than the lower limit, there are cases where high-current-density charge/discharge characteristics decrease.

As an apparatus for the mercury porosimetry was used a mercury porosimeter (Autopore 9520, manufactured by Micromeritics Corp.). About 0.2 g of a sample (negative-electrode material) was weighed out and placed in a powder cell and this cell was closed. The sample in the cell was pretreated by degassing it at room temperature under vacuum (50 μmHg or lower) for 10 minutes. Subsequently, the pressure in the cell was reduced to 4 psia (about 28 kPa) and mercury was introduced thereinto. The internal pressure was stepwise elevated from 4 psia (about 28 kPa) to 40,000 psia (about 280 MPa) and then lowered to 25 psia (about 170 kPa). The number of steps in the pressure elevation was 80 or larger. In each step, the amount of mercury intruded was measured after an equilibrium time of 10 seconds. A pore distribution was calculated from the mercury intrusion curve thus obtained, using the Washburn equation. For the calculation, the surface tension ($\gamma$) and contact angle ($\psi$) of mercury were taken as 485 dyne/cm and 140°, respectively. The average pore diameter used was the pore diameter corresponding to a cumulative pore volume of 50%.

[[Ash Content]]

The ash content of the graphitic carbon particles for use as the negative-electrode active material of negative electrode [6] in a lithium secondary battery of the invention is preferably 1% by mass or lower, especially preferably 0.5% by mass or lower, more preferably 0.1% by mass or lower, based on the whole graphitic carbon particles. The lower limit thereof is preferably 1 ppm or higher. When the ash content thereof exceeds the upper limit of that range, there are cases where battery performance deterioration caused by reaction with the nonaqueous electrolyte during charge/discharge becomes not negligible. On the other hand, when the ash content thereof is lower than the lower limit of that range, there are cases where the production of this graphitic carbon necessitates much time and energy and an apparatus for pollution prevention, resulting in an increase in cost.

The true density of the graphitic carbon particles is generally 2.0 g/cm$^3$ or higher, preferably 2.1 g/cm$^3$ or higher, more preferably 2.2 g/cm$^3$ or higher, even more preferably 2.22 g/cm$^3$ or higher. The upper limit thereof may be 2.26 g/cm$^3$ or lower. This upper limit is a theoretical value for graphites. When the true density thereof is lower than the lower limit of that range, there are cases where this carbon has too low crystallinity, resulting in an increase in initial irreversible capacity. In the invention, true density is defined as one determined by the liquid-phase displacement method (pycnometer method) using butanol.

[[Orientation Ratio]]

The orientation ratio of the graphitic carbon particles for use as the negative-electrode active material of negative electrode [6] in a lithium secondary battery of the invention is generally 0.005 or higher, preferably 0.01 or higher, more preferably 0.015 or higher. The upper limit thereof is theoretically 0.67 or lower. When the orientation ratio thereof is lower than the lower limit of that range, there are cases where high-density charge/discharge characteristics decrease.

Orientation ratio is determined by X-ray diffractometry. The peaks attributable to the (110) diffraction and (004) diffraction of the carbon obtained by X-ray diffractometry are subjected to peak separation by fitting with asymmetric Pearson VII as a profile function. Thus, the integrated intensities of the (110) diffraction and (004) diffraction peaks are calculated. From the integrated intensities obtained, the ratio represented by (integrated intensity of (110) diffraction)/(integrated intensity of (004) diffraction) is calculated. This ratio is defined as the active-material orientation ratio.

Conditions for this X-ray diffractometry are as follows. Incidentally, "2θ" represents diffraction angle.
  Target: Cu(Kα line) graphite monochromator
  Slit:
    Divergence slit=1 degree
    Receiving slit=0.1 mm
    Scattering slit=1 degree
  Examination range and step angle/measuring time:
    (110) plane: 76.5°≤2θ≤78.5° 0.01°/3 sec
    (004) plane: 53.5°≤2θ≤56.0° 0.01°/3 sec

[[Aspect Ratio]]

The aspect ratio of the graphitic carbon particles for use as the negative-electrode active material of negative electrode [6] in a lithium secondary battery of the invention is theoretically 1 or higher. The upper limit thereof may be 10 or lower and is preferably 8 or lower, more preferably 5 or lower. When the aspect ratio thereof exceeds the upper limit, there are cases where this graphitic carbon causes streak lines in electrode plate formation and an even coating surface cannot be obtained, resulting in a decrease in high-current-density charge/discharge characteristics.

The aspect ratio of a particle is represented by A/B, wherein A is the length of the longest axis of the particle in a three-dimensional examination and B is the length of the shortest axis perpendicular to that axis. The examination of particles is made with a scanning electron microscope capable of enlargement examination. Fifty are arbitrarily selected from particles fixed to an edge face of a metal having a thickness of 50 μm or smaller, and each particle is examined for A and B while rotating or inclining the stage to which the sample is fixed. The average of the A/B values is determined.

The graphitic carbon particles for use as the negative-electrode active material of negative electrode [6] in a lithium secondary battery of the invention may be ones which occur naturally or ones produced artificially. However, the graphitic carbon particles preferably are ones comprising a natural graphite. The graphitic carbon particles may be ones obtained by subjecting naturally occurring ones or artificially produced ones to a specific treatment. Processes for producing the graphitic carbon particles (including classification methods) also are not particularly limited. For example, graphitic carbon particles obtained by a classification technique such as, e.g., sieving or air classification so as to have the properties described above may be employed.

Especially preferred graphitic carbon particles, among those, are ones produced by modifying naturally occurring carbonaceous particles or artificially produced carbonaceous particles by subjecting them to a mechanical energy treatment. More preferred are ones produced by this modification in which the carbonaceous particles to be subjected as a raw material to the mechanical energy treatment comprise a natural graphite.

[[Mechanical Energy Treatment]]

This mechanical energy treatment is explained below. The carbonaceous particles to be subjected as a raw material to the mechanical energy treatment are not particularly limited. Examples thereof include carbonaceous particles derived from a natural or artificial graphite and carbonaceous particles which are a graphite precursor. Properties of these raw materials will be shown below.

[[[Graphite-Derived Carbonaceous Particles as Raw Material for Mechanical Energy Treatment]]]

It is desirable that the graphite-derived carbonaceous particles to be used as a raw material should have properties which satisfy any one of the following items (1) to (11) or simultaneously satisfy two or more thereof. The methods of determining the following properties and the definitions thereof are the same as in the graphitic carbon particles described above.

(1) X-Ray Parameter

The graphite-derived carbonaceous particles as a raw material preferably have a value of d (interplanar spacing) for the lattice planes (002), as determined by X-ray diffractometry in accordance with the method of the Japan Society for Promotion of Scientific Research, of 0.335 nm or larger. The upper limit of the value of d desirably is generally 0.340 nm or smaller, preferably 0.337 nm or smaller. Furthermore, the crystallite size (Lc) of the graphite-derived carbonaceous particles, as determined by X-ray diffractometry in accordance with the method of the Japan Society for Promotion of Scientific Research, is generally 30 nm or larger, preferably 50 nm or larger, more preferably 100 nm or larger. In case where the Lc thereof is smaller than the lower limit of that range, there is a possibility that crystallinity might decrease to enhance the increase in initial irreversible capacity.

(2) Ash Content

The ash content of the graphite-derived carbonaceous particles as a raw material is preferably 1% by mass or lower, especially 0.5% by mass or lower, in particular 0.1% by mass or lower, based on the whole graphite-derived carbonaceous substance. The lower limit of the ash content thereof is preferably at least 1 ppm by mass of the whole carbonaceous substance. When the ash content thereof exceeds the upper limit of that range, there are cases where battery performance deterioration caused by reaction with the nonaqueous electrolyte during charge/discharge becomes not negligible. When the ash content thereof is lower than the lower limit of that range, there are cases where the production of this carbonaceous substance necessitates much time and energy and an apparatus for pollution prevention, resulting in an increase in cost.

(3) Volume-Average Particle Diameter

With respect to the volume-average particle diameter of the graphite-derived carbonaceous particles as a raw material, the volume-average particle diameter (median diameter) thereof as determined by the laser diffraction/scattering method is generally 1 μm or larger, preferably 3 μm or larger, more preferably 5 μm or larger, even more preferably 7 μm or larger. Although the upper limit thereof is not particularly limited, it is generally 10 mm or smaller, preferably 1 mm or smaller, more preferably 500 μm or smaller, even more preferably 100 μm or smaller, especially preferably 50 μm or smaller. When the volume-average particle diameter thereof is smaller than the lower limit of that range, there are cases where application of mechanical energy results in too small a particle diameter and this leads to an increase in irreversible capacity. When the volume-average particle diameter thereof exceeds the upper limit of that range, there are cases where the apparatus to be used for the application of mechanical energy is difficult to operate efficiently and this leads to a time loss.

(4) Raman R Value, Raman Half-Value Width

The Raman R value of the graphite-derived carbonaceous particles as a raw material, as determined by the argon ion laser Raman spectroscopy, is generally 0.01 or higher, preferably 0.03 or higher, more preferably 0.1 or higher. The upper limit thereof may be 0.6 or lower and is preferably 0.4 or lower. When the Raman R value thereof is lower than the lower limit of that range, the surface of such particles has too high crystallinity. Even after the Raman R value thereof is increased by applying mechanical energy, crystallinity remains low. There are hence cases where the number of intercalation sites into which lithium comes with charge/discharge decreases. Namely, there are cases where suitability for charge decreases. On the other hand, when the Raman R value thereof exceeds the upper limit of that range, the surface of such particles comes to have further reduced crystallinity upon reception of mechanical energy. There are hence cases where the particles have enhanced reactivity with the nonaqueous electrolyte, leading to a decrease in efficiency and enhanced gas evolution.

The Raman half-value width around 1,580 $cm^{-1}$ of the graphite-derived carbonaceous particles is not particularly limited. However, the half-value width thereof is generally 10 $cm^{-1}$ or larger, preferably 15 $cm^{-1}$ or larger. The upper limit thereof is generally 50 $cm^{-1}$ or smaller, preferably 45 $cm^{-1}$ or smaller, more preferably 40 $cm^{-1}$ or smaller. When the Raman half-value width thereof is smaller than the lower limit of that range, the surface of such particles has too high crystallinity. Even after the Raman half-value width thereof is increased by applying mechanical energy, crystallinity remains low. There are hence cases where the number of intercalation sites into which lithium comes with charge/discharge decreases. Namely, there are cases where suitability for charge decreases. On the other hand, when the Raman half-value width thereof exceeds the upper limit of that range, the surface of such particles comes to have further reduced crystallinity upon reception of mechanical energy. There are hence cases where the particles have enhanced reactivity with the nonaqueous electrolyte, leading to a decrease in efficiency and enhanced gas evolution.

(5) BET Specific Surface Area

The specific surface area of the graphite-derived carbonaceous particles as a raw material, as determined by the BET method, is generally 0.05 $m^2/g$ or larger, preferably 0.2 $m^2/g$ or larger, more preferably 0.5 $m^2/g$ or larger, especially preferably 1 $m^2/g$ or larger. The upper limit thereof is generally 50 $m^2/g$ or smaller, preferably 25 $m^2/g$ or smaller, more preferably 15 $m^2/g$ or smaller, especially preferably 10 $m^2/g$ or smaller. When the BET specific surface area thereof is smaller than the lower limit of that range, there are cases where use of this carbonaceous substance is apt to result in poor lithium acceptance during charge and in lithium deposition on the electrode surface even after the BET specific surface area thereof is increased by applying mechanical energy. On the other hand, when the specific surface area thereof exceeds the upper limit of that range, this carbonaceous substance comes to have a further increased BET specific area upon reception of mechanical energy. There are hence cases where use of this carbonaceous substance as a negative-electrode active material is apt to result in enhanced reactivity with the nonaqueous electrolyte and enhanced gas evolution and a preferred battery is difficult to obtain.

(7) Roundness

With respect to the degree of sphericity of the graphite-derived carbonaceous particles as a raw material, the roundness of the particles having a particle diameter in the range of 3-40 μm is preferably 0.1 or higher, more preferably 0.2 or higher, especially preferably 0.4 or higher, even more preferably 0.5 or higher, most preferably 0.6 or higher. When the roundness thereof is lower than the lower limit of that range, there are cases where rounding does not proceed sufficiently even with application of mechanical energy, resulting in a decrease in high-current-density charge/discharge characteristics.

(8) True Density

The true density of the graphite-derived carbonaceous particles as a raw material is generally 2 g/cm$^3$ or higher, preferably 2.1 g/cm$^3$ or higher, more preferably 2.2 g/cm$^3$ or higher, especially preferably 2.22 g/cm$^3$ or higher. The upper limit thereof may be 2.26 g/cm$^3$ or lower. This upper limit is a theoretical value for graphites. When the true density of the carbonaceous substance is lower than the lower limit of that range, there are cases where this carbon has too low crystallinity, resulting in an increase in initial irreversible capacity.

(9) Tap Density

The tap density of the graphite-derived carbonaceous particles as a raw material desirably is generally 0.05 g/cm$^3$ or higher, preferably 0.1 g/cm$^3$ or higher, more preferably 0.2 g/cm$^3$ or higher, especially preferably 0.5 g/cm$^3$ or higher. The tap density thereof is preferably 2 g/cm$^3$ or lower, more preferably 1.8 g/cm$^3$ or lower, especially preferably 1.6 g/cm$^3$ or lower. When the tap density thereof is lower than the lower limit of that range, there are cases where application of mechanical energy does not result in a sufficiently improved tap density. Namely, there are cases where the treated carbonaceous substance, when used as a negative-electrode active material, is less apt to have a high loading density and cannot give a battery having a high capacity. On the other hand, when the tap density thereof exceeds the upper limit of that range, application of mechanical energy results in a further increased tap density. There is hence a possibility that use of the treated carbonaceous substance in electrode formation might give an electrode which has too small an amount of interparticle interstices and has a deficiency in passages for the nonaqueous electrolyte, resulting in a decrease in high-current-density charge/discharge characteristics. The tap density of the graphite-derived carbonaceous particles also is measured and defined by the same method as described above.

(10) Orientation Ratio (Powder)

The orientation ratio of the graphite-derived carbonaceous particles as a raw material is generally 0.001 or higher, preferably 0.005 or higher. The upper limit thereof is theoretically 0.67 or lower. When the orientation ratio thereof is lower than the lower limit of that range, there are cases where application of mechanical energy does not result in a sufficiently improved orientation ratio, resulting in a decrease in high-density charge/discharge characteristics.

(11) Aspect Ratio (Powder)

The aspect ratio of the graphite-derived carbonaceous particles as a raw material is theoretically 1 or higher. The upper limit thereof is generally 10 or lower, preferably 8 or lower, more preferably 5 or lower. When the aspect ratio thereof exceeds the upper limit, there are cases where application of mechanical energy does not result in a sufficiently reduced aspect ratio and where the treated carbonaceous substance causes streak lines in electrode plate formation and an even coating surface cannot be obtained, resulting in a decrease in high-current-density charge/discharge characteristics.

The graphite-derived carbonaceous particles as a raw material described above may be ones made of a highly crystalline carbon material in which carbon-hexagonal planar structures have grown. Examples of this carbon material include a highly oriented graphite in which the hexagonal planes have been grown so as to enhance planar orientation and an isotropic high-density graphite in which highly oriented graphite particles have been aggregated in isotropic directions. Preferred examples of the highly oriented graphite include natural graphites occurring in Sri Lanka and Madagascar, the so-called Kish graphite obtained by precipitating carbon from supersaturated molten iron, and some artificial graphites having a high degree of graphitization.

Natural graphites are classified into flake graphite, crystalline (vein) graphite, and amorphous graphite according to properties (see "Graphite" in *Funrūtai Purosesu Gijutsu Shūsei* (published by Industrial Technology Center in 1974); and *HANDBOOK OF CARBON, GRAPHITE, DIAMOND AND FULLERENES* (published by Noyes Publications)). With respect to the degree of graphitization, crystalline graphite has a highest graphitization degree of 100% and flake graphite is second, which has a graphitization degree as high as 99.9%. However, the graphitization degree of amorphous graphite is as low as 28%. Flake graphite, among such natural graphites, occurs in Madagascar, China, Brazil, Ukraine, Canada, etc. Crystalline graphite occurs mainly in Sri Lanka. Amorphous graphite occurs mainly in the Korean Peninsula, China, Mexico, etc. Of these natural graphites, amorphous graphite generally has a small particle diameter and a low purity. In contrast, flake graphite and crystalline graphite have advantages such as a high degree of graphitization and a low impurity content, and can hence be advantageously used in the invention.

Artificial graphites can be produced by heating a petroleum-derived heavy oil, coal-derived heavy oil, petroleum coke, or coal coke at a temperature of 1,500-3,000° C. or higher in a non-oxidizing atmosphere.

In the invention, any artificial graphite can be used as a raw material as long as it comes to have high orientation and high capacity through the mechanical energy treatment and a heat treatment. Furthermore, even an incompletely graphitized material such as, e.g., a graphite precursor, among those artificial graphites, can be used as a raw material for the mechanical energy treatment in the invention as long as it can become graphitic carbon particles satisfying the properties described above through the mechanical energy treatment.

[[[Details of Mechanical Energy Treatment]]]

The mechanical energy treatment of such graphite-derived carbonaceous particles as a raw material is a treatment for reducing the particle diameter thereof so that the ratio between the volume-average particle diameters before and after the treatment becomes 1 or lower and for heightening the tap density thereof and increasing the Raman R value thereof 1.1 time or more.

Through such mechanical energy treatment, the carbonaceous particles such as graphite-derived carbonaceous particles as a raw material become particles in which only parts near the surface are rough and which have exposed strains and edge faces, while maintaining high crystallinity as a whole. Thus, the particles come to have an increased amount of surfaces where lithium ions can come in and out, and hence have a high capacity even at a high current density.

The "mechanical energy treatment" in the invention belongs to a "pulverization treatment" among engineering unit operations utilizable for particle design, such as pulverization, classification, mixing, granulation, surface modification, and reaction. However, it simultaneously includes a surface treatment which causes fine structural defects in the surface structure by impacts, friction, compression, etc.

In general, a pulverization treatment means an operation in which a force is applied to a substance to thereby reduce the size thereof and regulate the particle diameter, particle size distribution, and loading of the substance. Pulverization treatments are classified according to the kind of force to be applied to the substance and the method of treatment. Forces to be applied to the substance are roughly divided into the following four: breaking force (impact force), crushing force (compressive force), milling force (grinding force), and scraping force (shear force). On the other hand, treatment methods are roughly divided into the following two: volume pulverization in which cracks are generated and propagated in inner parts of the particles; and surface pulverization in which surface parts of the particles are scraped off. Volume pulverization proceeds by means of impact force, compressive force, and shear force, while surface pulverization proceeds by means of grinding force and shear force. Pulverization is a treatment based on any of various combinations of such kinds of forces to be applied to a substance and such treatment methods. A suitable combination can be determined according to the purpose of the treatment. There are cases where a pulverization treatment is conducted by a chemical reaction, e.g., explosion, or by volume expansion. However, pulverization is generally conducted with a mechanical apparatus such as a pulverizer.

The mechanical energy treatment use of which is preferred for producing the graphitic carbon particles in the invention preferably is a treatment which finally involves surface treatment and involves a high proportion of the pulverization of particle surface parts (surface pulverization) regardless of whether volume pulverization occurs or not. This is because particle surface pulverization is important for eliminating angles of the carbonaceous particles, e.g., graphitic carbon particles, and thereby imparting roundness to the particle shape. Specifically, a mechanical energy treatment may be conducted in such a manner that surface pulverization is conducted after volume pulverization has proceeded to some degree, or may be conducted in such a manner that surface pulverization only is conducted almost without conducting volume pulverization. Furthermore, a mechanical energy treatment may be conducted in such a manner that volume pulverization and surface pulverization are simultaneously conducted. Preferred is a mechanical energy treatment in which surface pulverization proceeds finally and angles are eliminated from the surface of the particles.

The mechanical energy treatment in the invention is a treatment for reducing the particle diameter thereof so that the ratio between the volume-average particle diameters before and after the treatment becomes 1 or lower and for heightening the tap density thereof and increasing the Raman R value thereof 1.1 time or more.

The term "ratio between the volume-average particle diameters before and after the treatment" means a value obtained by dividing the volume-average particle diameter as measured after the treatment by the volume-average particle diameter as measured before the treatment. Although the value of (volume-average particle diameter after the treatment)/(volume-average particle diameter before the treatment) is 1 or smaller, it is preferably 0.95 or smaller. When the value thereof is substantially 1, there are cases where the loading-improving effect of the mechanical energy treatment through roundness improvement is low. Incidentally, the treatment in which the particle size is reduced so that the ratio between the average particle diameters before and after the treatment becomes 1 or lower is effective also in regulating the particle shape.

The mechanical energy treatment in the invention is one which increases tap density. To increase tap density means an improvement in the degree of sphericity represented by roundness as will be described later. The mechanical energy treatment hence should be one which produces such an effect. Although the value of (tap density after the treatment)/(tap density before the treatment) is 1 or larger, it is preferably 1.1 or larger. When the value thereof is smaller than 1, there are cases where the effect of improving loading through a roundness improvement is low.

The mechanical energy treatment in the invention is one which increases Raman R value 1.1 time or more. To increase Raman R value means that crystallinity around the particle surface decreases as will be described later. The mechanical energy treatment hence should be one which produces such an effect. Although the value of (Raman R value after the treatment)/(Raman R value before the treatment) is 1.1 or larger, it is preferably 1.4 or larger. When the value thereof is smaller than 1.1, there are cases where the effect of improving suitability for charge through a change in Raman R value is low.

The mechanical energy treatment in the invention imparts roundness to particles and increases the tap density of the particles. It is known that for heightening the tap density of powder particles, it is effective to fill interstices among the particles with smaller particles capable of coming into the interstices. Although it may be thought that the tap density of carbonaceous particles, e.g., graphite-derived carbonaceous particles, can be increased by subjecting the particles to a treatment such as pulverization to reduce the particle diameter thereof, the particle diameter reduction by such a technique generally reduces rather than increases the tap density. The reason for this is thought to be that the pulverization makes the particle shape more irregular.

On the other hand, the proportion of interstices in a layer packed with powder particles decreases as the number of particles in contact with one particle (any particle selected) increases (i.e., as the coordination number n increases). Namely, important factors influencing tap density include the proportions of particle sizes, i.e., particle diameter distribution. It should, however, be noted that this investigation was made on a model powder composed of spherical particles. The carbonaceous particles to be handled in the invention, e.g., graphite-derived carbonaceous particles before treatment, are flaky, crystalline, or platy. Because of this, even when it is attempted to heighten a tap density by regulating the particle diameter distribution by merely conducting general pulverization, classification, etc. only, such a highly packed state cannot be attained.

Flaky, crystalline, and platy carbonaceous particles such as, e.g., graphite-derived carbonaceous particles, generally tend to decrease in tap density as the particle diameter decreases. The reasons for this are thought to be as follows. As a result of pulverization, the particles come to have more irregular shapes, have a larger amount of surface projections such as "fine splits", "half-peeled parts", and "bent parts", and have finer particles of irregular shapes adherent to the particle surface at some degree of strength. These are causative of increased resistance between adjacent particles and impaired suitability for loading, resulting in a decrease in tap density.

As long as such shape irregularity is reduced and the particle shape becomes close to sphere, a decrease in particle diameter should result in a limited decrease in loading and large-diameter carbon particles and small-diameter carbon particles should have almost the same tap density.

As a result of investigations made by the inventors on carbonaceous or graphitic particulate materials which are almost equal in true density and in average particle diameter, it has been ascertained that the materials having a more spherical shape have a higher tap density. Namely, it is important to impart roundness to the particle shape and make the shape close to sphere. As the particle shape becomes close to sphere, the suitability for loading of the powder simultaneously improves greatly. For the reasons shown above, powder tap density is employed as an index to the application of mechanical energy. In the case where the suitability for loading of a powdery or particulate material was improved through a treatment, it can be thought that this improvement is a result of the rounding of the particles due to the treatment used. Furthermore, when particles are treated by the method according to the invention while considerably reducing the particle diameter and the carbon material thus obtained has a tap density which is higher than the tap densities of carbon materials obtained by general pulverization and having almost the same particle diameter, then this can be thought to be a result of rounding.

As indexes to the crystallinity of particles and the roughness of the particle surface, i.e., to the amount of crystal edge faces present, use can be made of interplanar spacing (d002) for the (002) planes and crystallite size (Lc) both determined by wide-angle X-ray diffractometry and Raman R value. In general, carbon materials having a smaller interplanar spacing (d002) for the (002) planes and a larger crystallite size (Lc) have lower Raman R value. Namely, carbonaceous particles such as graphite-derived carbonaceous particles as a whole have almost the same crystalline state. In contrast, the graphitic carbon particles according to this invention have a small interplanar spacing (d002) for the (002) planes and a large crystallite size (Lc) and, despite this, have a high Raman R value. This means that in these graphitic carbon particles, a surface layer (to a depth of about 100 Å from the particle surface) has disordered crystallinity and a large amount of exposed edge faces although the particles have high bulk crystallinity.

From the standpoint of improving suitability for loading, the mechanical energy treatment in the invention preferably is one which further increases roundness 1.02 times, especially preferably 1.04 times.

[[[Apparatus for Mechanical Energy Treatment]]]

The apparatus to be used for conducting the mechanical energy treatment is selected from ones usable for conducting the preferred treatment described above. An investigation made by the inventors revealed the following. The mechanical energy treatment may be accomplished with one or more of the four kinds of forces. However, it is effective to employ an apparatus which repeatedly applies impact force as a main force and other mechanical actions such as compressive force, frictional force, shear force, etc., including those caused by particle interaction, to the particles. Specifically, a preferred apparatus is one which comprises a casing and disposed therein a rotor having blades and in which the rotor is rotated at a high speed to thereby apply mechanical actions such as impact, compressive, frictional, and shear forces to carbonaceous particles introduced therein and conduct surface pulverization while allowing volume pulverization to proceed. More preferred is one which has a mechanism in which carbonaceous particles are circulated to thereby repeatedly apply mechanical actions thereto. The number of blades in the casing is preferably 3 or more, especially preferably 5 or more.

One example of preferred apparatus which satisfy such requirements is Hybridization System, manufactured by Nara Machinery Co., Ltd. In the case where the treatment is conducted with this apparatus, the rotor is rotated at a peripheral speed of preferably 30-100 m/sec, more preferably 40-100 m/sec, even more preferably 50-100 m/sec. Although carbonaceous particles can be treated by merely passing these through the apparatus, it is preferred to treat the carbonaceous particles while causing these to circulate or reside in the apparatus for 30 seconds or longer. More preferably, the carbonaceous particles are treated while circulating or residing in the apparatus for 1 minute or longer.

In the case where the graphite-derived carbonaceous particles as a raw material have a true density lower than 2.25 and the crystallinity thereof is not so high, it is preferred that a heat treatment for enhancing crystallinity should be further conducted after the mechanical energy treatment. This heat treatment is conducted at a temperature of preferably 2,000° C. or higher, more preferably 2,500° C. or higher, even more preferably 2,800° C. or higher.

[Negative Electrode [6]: Electrode Production]

The negative electrode may be produced by an ordinary method. It can be formed in the same manner as described above. The current collector, thickness ratio between the current collector and the active-material layer, electrode density, binder, electrode-plate orientation ratio, impedance, etc. also are the same as described above.

<Negative Electrode [7]>

An explanation will be given below on negative electrode [7] for use in a lithium secondary battery of the invention, i.e., "a negative electrode containing as a negative-electrode active material a multielement-containing negative-electrode active material (C) which contains at least one of a lithium-occluding metal (A) selected from the group consisting of Al, Pb, Zn, Sn, Bi, In, Mg, Ga, Cd, Ag, Si, B, Au, Pt, Pd, and Sb and/or a lithium-occluding alloy (B) and further contains C and/or N as element Z."

[Negative Electrode [7]: Negative-Electrode Active Material]

The negative-electrode active material for use in negative electrode [7] is described below.

[[Composition]]

The negative-electrode active material to be used in negative electrode [7] in a lithium secondary battery of the invention is characterized by containing at least a metal capable of occluding lithium (lithium-occluding metal (A)) and/or an alloy capable of occluding lithium (lithium-occluding alloy (B)) and containing C and/or N as element Z.

The lithium-occluding metal (A) means at least one member selected from the group consisting of Al, Pb, Zn, Sn, Bi, In, Mg, Ga, Cd, Ag, Si, B, Au, Pt, Pd, and Sb. Preferred of these is Al, Si, Sn, or Pb. More preferred is Si or Sn. Even more preferred is Si. The reasons for the preference of Si include that it brings about a high capacity per unit mass.

The lithium-occluding alloy (B) means one comprising two or more of those lithium-occluding metals (A) or one comprising a lithium-occluding metal (A) and at least one element other than the lithium-occluding metal (A), C, and N. This element other than the lithium-occluding metal (A), C, and N preferably is one or more elements selected from Groups 4, 5, 6, 8, 9, 10, 11, 13, and 16 of the periodic table. More preferred are one or more of the elements Ti, Zr, V, Cr, W, B, O, and Co. Even more preferred are one or more of the elements Ti, Zr, W, O, and Co. These elements are apt to form high-melting compounds and, hence, can be advantageously used from the standpoint of reactivity control. The content of the alloy-forming element, i.e., the element other than the lithium-occluding metal (A), C, and N, is preferably 50% by mole or lower based on the whole lithium-occluding alloy (B) from the standpoint of capacity.

Examples of the state in which the C and/or N as element Z is present in the multielement-containing negative-electrode active material (C) include:

1. the state in which element Z is contained in the lithium-occluding metal (A) and/or lithium-occluding alloy (B) (element-Z-internally-possessing lithium-occluding substance (D));
2. the state in which element Z is present around the lithium-occluding metal (A) and/or lithium-occluding alloy (B) (element-Z-externally-possessing lithium-occluding substance (F)); and
3. the state in which element Z is present in both the states 1. and 2. above.

In a preferred embodiment of the element-Z-internally-possessing lithium-occluding substance (D), element Z (C and/or N) is present in a non-equilibrium state in the lithium-occluding metal (A) and/or lithium-occluding alloy (B). Especially preferably, the lithium-occluding metal (A) is Si.

A preferred embodiment of the element-Z-externally-possessing lithium-occluding substance (F) is one in which element Z is C. This is because C can impart electrical conductivity.

Although the multielement-containing negative-electrode active material (C) for use as a negative-electrode active material in this invention contains a lithium-occluding metal (A) and/or a lithium-occluding alloy (B) and further contains C and/or N as an essential component, it preferably further contains one or more elements selected from Groups 4, 5, 6, 8, 9, 10, 11, 13, and 16 of the periodic table. More preferred are one or more of the elements Ti, Zr, V, Cr, W, B, O, and Co. Even more preferred are one or more of the elements Ti, Zr, W, O, and Co.

1. Element-Z-Internally-Possessing Lithium-Occluding Substance (D)

Of the lithium-occluding metals (A) usable in the invention, Si is apt to produce the effect. Because of this, the element-Z-internally-posses sing lithium-occluding substance (D) preferably is one which comprises as a main component a compound represented by the general formula $SiZ_xM_y$ (wherein Z, M, x, and y are as defined under the following (1) to (4)) and constituting a phase in which element Z is present in a non-equilibrium state in Si:

(1) element Z is C and/or N;
(2) element M is one or more elements selected from elements other than Si and element Z;
(3) x is such a value that, with respect to the Z concentration $(p/(a+p))$ in the compound $Si_aZ_p$ (wherein a and p are integers) present in an equilibrium state so as to have a composition closest to Si, the value of Z concentration ratio $Q(Z)$ calculated with the equation $Q(Z)=[x/(1+x)]/[p/(a+p)]$ is 0.10-0.95; and (4) y is a number in the range of $0 \leq y \leq 0.50$.

(With Respect to $SiZ_xM_y$)
((Element Z))

Element Z in $SiZ_xM_y$ is at least one element which is C and/or N. The reasons why C and/or N is preferred as the element Z to be internally possessed include the following:

(1) C and N each are capable of forming a compound having a higher melting point than Si;
(2) C and N each have a smaller covalent radius than Si;
(3) C and N each have a low coefficient of diffusion in Si; and
(4) C and N each change little in volume even when reacted with lithium.

Specifically, the elements C and N can form compounds which have a higher melting point than Si and are present in an equilibrium state, such as, e.g., SiC and $Si_3N_4$. High-melting compounds generally are stable compounds having a large negative value of free energy regarding formation and, hence, can effectively reduce the activity of Si. From the standpoint of controlling reactivity with the nonaqueous electrolyte, element Z preferably is C and/or N.

Furthermore, since the elements C and N each have a smaller covalent radius than Si, they are less apt to form a compound present in an equilibrium state in the compound $SiZ_xM_y$, although details of this tendency are unclear. This is thought to be effective in more evenly distributing element Z in a high concentration. The elements C and N can hence more effectively reduce the activity of Si and are preferred also from the standpoint of controlling reactivity with the nonaqueous electrolyte.

Moreover, since the elements C and N each have a low coefficient of diffusion in Si, the elements C and N, when present in the state of being dispersed in the Si, inhibit the Si from aggregating or crystallizing with charge/discharge. The elements C and N are preferred also from the standpoint of inhibiting the Si from becoming fine particles or reacting with the nonaqueous electrolyte. In addition, since the elements C and N change little in volume even when reacted with lithium, they are less apt to influence Si conduction path breakage and are hence preferred.

Incidentally, when a compound capable of being present in an equilibrium state has a lower melting point than Si, such as, e.g., $Cu_3Si$ or $Ni_2Si$, as in the case of elements such as Cu and Ni, there are cases where the activity of Si is not effectively reduced and reactivity with nonaqueous electrolyte is difficult to control. Moreover, since the elements Cu and Ni have a high coefficient of diffusion in Si, the aggregation and crystallization of Si proceed with charge/discharge. There are hence cases where the Si is apt to become fine particles and cycle characteristics are not improved. When such a compound present in an equilibrium state in the compound $SiZ_xM_y$ is a main component, there are cases where the activity of Si does not decrease and reactivity with the nonaqueous electrolyte cannot be controlled, resulting in impaired cycle characteristics, etc.

((Element M))

Element M in $SiZ_xM_y$ is one or more elements selected from elements other than Si and element Z. Preferably, element M is one or more elements selected from Groups 4, 5, 6, 8, 9, 10, 11, 13, and 16 of the periodic table. From the standpoint of reaction inhibition, the elements Ti, Zr, V, Cr, W, B, and O are preferred because these elements are apt to form a high-melting compound. More preferred are the elements Ti, Zr, W, and O.

With respect to the composition of $SiZ_xM_y$, x in the $SiZ_xM_y$ is such a value that, with respect to the Z concentration $(p/(a+p))$ in the compound $Si_aZ_p$ (wherein a and p are integers) present in an equilibrium state so as to have a composition closest to Si, the value of Z concentration ratio $Q(Z)$ calculated with the equation $Q(Z)=[x/(1+x)]/[p/(a+p)]$ is generally 0.10 or larger, preferably 0.15 or larger, more preferably 0.30 or larger, especially preferably 0.40 or larger. The upper limit of the value of $Q(Z)$ is generally 0.95 or smaller, preferably 0.85 or smaller, more preferably 0.75 or smaller, especially preferably 0.65 or smaller. The "compound present in an equilibrium state so as to have a composition closest to Si" means the compound $Si_aZ_p$ in which the value of $p/(a+p)$ is minimum and which is present in an equilibrium state.

Incidentally, the compound $Si_aZ_p$ present in an equilibrium state so as to have a composition closest to Si, in this invention, is described in phase diagrams for Si and element Z (e.g., *Desk Handbooks Phase Diagrams for Binary Alloys*, ASM International). In this invention, the Z concentration ratio $Q(Z)$ described above is used for the Z concentration (p/(a+p)) of this $Si_aZ_p$, and the range of x is specified in terms of the numerical-value range of the Z concentration ratio Q(Z).

The term "compound present in an equilibrium state" herein means a constant-proportion compound, such as the compound $Si_aZ_p$ (wherein a and p are integers), indicated by a vertex in a diagram, e.g., the phase diagram given above. For example, when Z is C, SiC is known as a stable compound and this compound is regarded as the compound present in an equilibrium state in the invention. Consequently, when Z is C, then SiC corresponds to the $Si_aZ_p$ according to the invention. Furthermore, when Z is, for example, N, then $Si_3N_4$ is known as the most stable compound. However, $Si_2N_3$ and SiN also are known to be present as constant-proportion compounds. In this invention, all these compounds are regarded as compounds present in an equilibrium state. Consequently, when Z is N, then SiN corresponds to the $Si_aZ_p$ according to the invention.

On the other hand, the term "compound constituting a phase present in a non-equilibrium state" means any compound other than the compounds present in an equilibrium state. In the case of the compound present in a non-equilibrium state, no specific constant-proportion compound is formed and Si atoms and Z atoms are evenly dispersed when viewed macroscopically.

When the Z concentration ratio Q (Z) is lower than the lower limit of that range, the effect of reducing the activity of Si is low. There are hence cases where reactivity with the nonaqueous electrolyte cannot be controlled and electrode expansion is enhanced, making it impossible to obtain preferred cycle characteristics. On the other hand, when the ratio Q (Z) exceeds the upper limit of that range, a stable compound $Si_aZ_p$ or the like present in an equilibrium state is formed and the activity of Si is not reduced even when the amount of element Z is increased. There are hence cases where reactivity with the nonaqueous electrolyte cannot be controlled. Furthermore, $Si_aZ_p$ or the like has low electrical conductivity. There are hence cases where formation of such a compound results in impaired electrical conductivity of the active material and difficulties in lithium doping/undoping, making it impossible to conduct charge/discharge.

When the Z concentration ratio Q(Z) is 1, this means that the Si is present as a stable compound $Si_aZ_p$; this state is undesirable. When the ratio Q(Z) is far higher than the upper limit of that range, the effect of increasing capacity which is produced by the Si contained is difficult to obtain and there are cases where preferred battery characteristics are not obtained.

Incidentally, when the elements C and N are simultaneously used as element Z, the values of the Z concentration ratio Q(Z) are determined respectively for the two elements from the element Z concentrations based on $Si_aZ_p$, and the sum of these is taken as the Z concentration ratio Q(Z).

Symbol y in $SiZ_xM_y$ is a real number satisfying $0 \leq y \leq 0.5$. In the case where the compound $SiZ_xM_y$ contains element M and $y \neq 0$, the proportion y of element M in this compound $SiZ_xM_y$ is generally 0.08 or higher, preferably 0.10. The upper limit thereof is generally 0.50 or lower, preferably 0.40 or lower, more preferably 0.30 or lower. When y exceeds the upper limit of that range, the content of Si is low and there are cases where high capacity is difficult to obtain. In the case where the compound contains substantially no element M, the proportion y of element M is such that y=0 or y≈0. In this invention, y≈0 indicates the case where the element M unavoidably came into the compound during, e.g., steps for producing the negative-electrode active material according to the invention (i.e., the case where substantially no element M is contained) and the y is, e.g., less than 0.08.

The composition of the multielement-containing negative-electrode active material (C) can be determined in an ordinary manner, for example, with an X-ray photoelectron spectroscope (e.g., "ESCA" manufactured by ULVAC-PHI, INC.) by placing the negative-electrode active material on a sample table so that the side containing the negative-electrode compound faces upward and forms a flat surface, making a depth profile examination while conducting Ar sputtering using an aluminum Kα line as an X-ray source, and calculating the concentrations of the atoms of Si, element Z, element M, etc.

(Composition of $SiC_xO_y$)

In the case where element Z is C and element M is O, then x in the general formula $SiC_xO_y$ is generally 0.053 or larger, preferably 0.08 or larger, more preferably 0.15 or larger, especially preferably 0.25 or larger. The upper limit of x is generally 0.90 or smaller, preferably 0.75 or smaller, more preferably 0.60 or smaller, especially preferably 0.45 or smaller. Furthermore, y is generally 0 or larger, preferably a value larger than 0, especially preferably 0.08 or larger, more preferably 0.10 or larger. The upper limit of y is generally 0.50 or smaller, preferably 0.40 or smaller, especially preferably 0.30 or smaller.

(State of Element Z Present in Si in Element-Z-Internally-Possessing Lithium-Occluding Substance (D))

With respect to the state in which element Z is present in Si in the negative-electrode compound $SiZ_xM_y$ in the invention, the value of XIsz in X-ray diffractometry is not particularly limited. However, in the case where element Z is C, the value of XIsz is preferably 1.2 or smaller, more preferably 0.7 or smaller. In the case where element Z is N, the value of XIsz is preferably 1.1 or smaller, more preferably 1.0 or smaller. When the value of XIsz is not larger than the upper limit of that range, this means that a phase in which element Z is present in a non-equilibrium state in the Si constitutes a main component and any compound present in an equilibrium state, e.g., $Si_aZ_p$, is not a main component. Such values of XIsz are preferred because of freedom from the following problems associated with too large values of XIsz. When the value of XIsz exceeds the upper limit of that range, i.e., when the phase of a compound present in an equilibrium state, such as, e.g., $Si_aZ_p$ (silicon carbide or silicon nitride when element Z is C or N, respectively), is a main component, then the activity of Si is not reduced. There are hence cases where reactivity with the nonaqueous electrolyte cannot be controlled, resulting in impaired cycle characteristics. Furthermore, since the $Si_aZ_p$ or the like has poor electrical conductivity, there are cases where the active-material thin film has impaired electrical conductivity and lithium doping/undoping becomes difficult, making it impossible to conduct charge/discharge. There also are cases where this active material has a reduced capacity per unit mass. Such values of XIsz are hence undesirable. The lower limit of the value of XIsz is generally 0.00 or larger.

((Method of X-Ray Diffractometry))

In X-ray diffractometry, the value of XIsz can be determined, for example, by setting the negative-electrode active material according to the invention on a surface to be irradiated and examining the active material with an X-ray diffractometer (e.g., "X-Ray Diffractometer" manufactured by Rigaku Corp.). Examination conditions are the same as those shown in Examples which will be given later.

The definitions of the value of XIsz are as follows.
(((Value of XIsz when Element Z is C)))

The peak intensity Isz at a 2θ of 35.7° and the peak intensity Is at a 2θ of 28.4° are measured, and the intensity ratio XIsz (XIsz=Isz/Is) is calculated and defined as the XIsz of the active-material thin film. The peak at a 2θ of 35.7° and the peak at a 2θ of 28.4° are thought to be a peak attributable to SiC and a peak attributable to silicon, respectively. When the value of XIsz is 1.2 or smaller, this means that almost no SiC is detected.

(((Value of XIsz when Element Z is N)))

The peak intensity Isz at a 2θ of 70.2° and the peak intensity Is at a 2θ of 28.4° are measured, and the intensity ratio XIsz (XIsz=Isz/Is) is calculated and defined as the XIsz of the active-material thin film. The peak at a 2θ of 27.1° and the peak at a 2θ of 28.4° are thought to be a peak attributable to $Si_3N_4$ and a peak attributable to silicon, respectively. When the value of XIsz is 1.1 or smaller, this means that almost no $Si_3N_4$ is detected.

(State of Element Z Distributed in Element-Z-Internally-Possessing Lithium-Occluding Substance (D))

In the $SiZ_xM_y$ in the invention, element Z is present, for example, as atoms, molecules, clusters, etc. of the size of 1 μm or smaller. With respect to the state in which element Z is distributed, it is preferably distributed evenly in the $SiZ_xM_y$, more preferably distributed so as to have a concentration gradient in which the concentration thereof increases from a central part of the $SiZ_xM_y$ toward the surface thereof (in the case of the negative-electrode material in a thin film form described later, the concentration has a gradient so that it increases from the part in contact with the current collector toward the surface of the thin film; in the case of the negative-electrode material in a powder form, the concentration has a gradient so that it increases from a central part of each particle toward the particle surface). When element Z is unevenly distributed and locally present in the negative-electrode active material, the expansion/contraction of Si with charge/discharge localizes in Si parts where element Z is absent. There are hence cases where electrical conductivity becomes poor with the progress of cycling. The state in which element Z is dispersed can be ascertained, for example, by EPMA as will be shown later.

(State of Element M Distribution)

The state in which element M is distributed in the $SiZ_xM_y$ in the invention is not particularly limited. Element M may be distributed either evenly or unevenly.

(Raman RC Value, Raman RSC Value, and Raman RS Value)

In the invention, the element-Z-internally-possessing lithium-occluding substance (D) in analysis by Raman spectroscopy has a Raman RC value of generally 0.0 or higher. The upper limit of the Raman RC value thereof is preferably 2.0 or lower. In case where the Raman RC value thereof exceeds the upper limit of that range, the effect of increasing capacity which is produced by the Si contained is difficult to obtain, making it difficult to obtain preferred battery characteristics. Especially when element Z comprises C, the Raman RC value of the negative-electrode active material $SiZ_xM_y$ according to the invention is preferably 2.0 or lower, more preferably 1.0 or lower, especially preferably 0.5 or lower. The lower limit of the Raman RC value thereof is generally 0.0 or higher because of limitations in measurement.

In the invention, the element-Z-internally-possessing lithium-occluding substance (D) in analysis by Raman spectroscopy has a Raman RSC value of generally 0.0 or higher. The upper limit of the Raman RSC value thereof is preferably 0.25 or lower. When the Raman RSC value thereof exceeds the upper limit of that range, there are cases where electrical conductivity becomes poor and lithium doping/undoping becomes difficult, making it impossible to conduct charge/discharge. Furthermore, especially when element Z comprises C, the RSC value of the substance (D) is preferably 0.25 or lower, more preferably 0.20 or lower. The lower limit of the Raman RSC value thereof is generally 0.0 or higher because of limitations in measurement.

In the invention, the element-Z-internally-possessing lithium-occluding substance (D) in analysis by Raman spectroscopy has a Raman RS value of preferably 0.40 or higher, more preferably 0.50 or higher. The upper limit of the Raman RS value thereof is preferably 1.00 or lower, more preferably 0.90 or lower. In case where the Raman RS value thereof is lower than the lower limit of that range, there is a possibility that cycle characteristics might be impaired. On the other hand, Raman RS values thereof exceeding the upper limit of that range are undesirable because there is a possibility that charge/discharge might be impossible. Especially when element Z comprises C, the Raman RS value of the substance (D) is preferably 0.40 or higher, more preferably 0.50 or higher. The upper limit thereof is preferably 0.75 or lower, more preferably 0.65 or lower. Furthermore, especially when element Z comprises N, the Raman RS value of the substance (D) is preferably 0.40 or higher, more preferably 0.50 or higher. The upper limit thereof is preferably 1.00 or lower, more preferably 0.90 or lower.

Raman RC value, Raman RSC value, and Raman RS value in analysis by Raman spectroscopy in the invention are determined by Raman spectroscopy conducted by the following method of Raman spectroscopy, and the definitions thereof are as follows.

((Method of Raman Spectroscopy))

A Raman spectrometer (e.g., "Raman Spectrometer" manufactured by Japan Spectroscopic Co., Ltd.) is used. A negative electrode of the invention for nonaqueous-electrolyte secondary batteries is set in a measuring cell, and is examined while irradiating the surface of the sample in the cell with argon ion laser light. The Raman spectrum obtained is subjected to background correction to thereby determine the Raman RC value, RSC value, and RS value. The background correction is conducted by connecting the initiation and termination points for a peak with a straight line to determine a background and subtracting this value from the peak intensity.

Conditions for this Raman spectroscopy are as follows. Smoothing is conducted by determining a simple average for 15 convolution points.

Wavelength of argon ion laser: 514.5 nm
Laser power on sample: 15-40 mW
Resolution: 10-20 $cm^{-1}$
Examination range: 200 $cm^{-1}$ to 1,900 $cm^{-1}$ (((Raman RC Value)))

The peak intensity Ic of a peak "c" appearing at around 1,300 $cm^{-1}$ to 1,600 $cm^{-1}$ and the peak intensity Ias of a peak "as" appearing at around 300 $cm^{-1}$ to 500 $cm^{-1}$ are measured, and the intensity ratio RC between these (RC=Ic/Ias) is calculated. This ratio is defined as the Raman RC value of the negative electrode. The peak "c" and the peak "as" are thought to be peaks attributable to carbon and silicon, respectively. Consequently, Raman RC value reflects the amount of carbon. When the Raman RC value is 2.0 or lower, this means that almost no carbon is detected.

(((Raman RSC Value)))

The peak intensity Isc of a peak "sc" appearing at around 650 $cm^{-1}$ to 850 $cm^{-1}$ and the peak intensity Ias of a peak "as" appearing at around 300 cm$^{-1}$ to 500 cm$^{-1}$ are measured, and the intensity ratio RSC between these (RSC=Isc/Ias) is calculated. This ratio is defined as the Raman RSC value of the negative electrode.

The peak "sc" and the peak "as" are thought to be peaks attributable to SiC and silicon, respectively. Consequently, Raman RSC value reflects the amount of SiC. When the Raman RSC value is 0.25 or lower, this means that almost no SiC is detected.

(((Raman RS Value)))

The intensity Is at 520 cm$^{-1}$ and the peak intensity Ias of a peak "as" appearing at around 300 cm$^{-1}$ to 500 cm$^{-1}$ are measured, and the intensity ratio RS between these (RS=Is/Ias) is calculated. This ratio is defined as the Raman RS value of the negative electrode. Raman RS value reflects the state of Si.

(IRsc Value)

When a negative electrode having the negative-electrode active material for use in the invention, which has undergone charge/discharge, is examined by infrared reflection spectroscopy, it gives an IRsc value of preferably 0.9 or higher, more preferably 1.1 or higher, especially preferably 1.2 or higher. When the IRsc value thereof is lower than the lower limit of that range, there are cases where the negative electrode containing Si reacts with the nonaqueous electrolyte during cycling and the amount of the active material substantially capable of charge/discharge decreases gradually, making it difficult to obtain preferred cycle characteristics. The upper limit of the IRsc value thereof is about 3.0. The IRsc value of a negative electrode in infrared reflection spectroscopy in the invention is determined by the following infrared reflection spectroscopy with an infrared spectrophotometer and is defined as shown below.

((Method of Infrared Reflection Spectroscopy with Infrared Spectrophotometer))

An infrared spectrophotometer (e.g., "*Magna* 560" manufactured by Thermo Electron Corp.) is used. The active-material side of the negative electrode of a lithium secondary battery which has undergone charge/discharge is set in a measuring cell and examined by the reflection method. The examination is made in an inert atmosphere using a sample holder for reflection examination having a window made of diamond. The infrared absorption spectrum obtained is subjected to background correction to thereby determine the IRsc value. The background correction is conducted by prolonging a straight line connecting minimum values in the range of 2,000-4,000 cm$^{-1}$ to determine a background and subtracting this value from each intensity. The reflection intensity Isc at 1,600 cm$^{-1}$ and the reflection intensity Iaco at 1,650 cm$^{-1}$ are measured, and the intensity ratio IRsc between these (IRsc=Isc/Iaco) is calculated. This ratio is defined as the IRsc value after charge/discharge.

Isc is thought to indicate a film derived from Si, while Iaco is thought to indicate a film derived from a lithium alkyl carbonate, although details thereof are unclear. Consequently, the IRsc reflects the state and amount of the negative-electrode film (solid electrolyte interface: SEI). When the IRsc value is 0.9 or higher, this means that the negative-electrode film is constituted of a film derived from a lithium alkyl carbonate and a film derived from Si.

<Effect/Principle>

Activity is explained first. In general, activity is a kind of thermodynamic concentration. In a multicomponent system comprising substance amounts $n_1, n_2 \ldots n_i \ldots$, when the chemical potential of component i and the chemical potential of the pure substance are expressed by $\mu_i$ and $\mu_i^0$, respectively, then $a_i$ defined by $$\mu_i - \mu_i^0 = RT \log a_i$$

is called activity.

Furthermore, the ratio $\gamma_i$ of the activity $a_i$ to the concentration $c_i$ $$a_i/c_i = \gamma_i$$

is called activity coefficient.

For example, when a system comprising a solvent and a solute is considered to be a thermodynamic solution, the activity coefficient is an amount corresponding to a difference between the chemical potential of a certain component of the system regarded as an ideal solution and the true chemical potential of the certain component of the system regarded as a real solution. In the case of (1) the real solution in which a certain component i is the solute, as the solute concentration decreases, the system approaches an ideal solution in which the component i is the solute and the activity coefficient approaches 1. Conversely, in the case of (2) the real solution in which a certain component i is the solvent, as the solvent concentration increases, the system approaches an ideal solution in which the component i is the solvent and the activity coefficient approaches 1. Furthermore, when the chemical potential of the component i is more stable in the real solution than in the ideal solution, then $\gamma_i < 1$.

An example of Si which showed satisfactory properties in the invention is an element-Z-containing Si compound (solid solution; regarded as a real solution) in which component i is Si and element Z regarded as a solute is contained in the Si regarded as a solvent. Because of the solute contained, the solvent Si has a reduced activity $a_i$ and $\gamma_i < 1$. This Si compound is more stable than Si (regarded as an ideal solution). It is thought that this Si compound was hence inhibited from reacting with the nonaqueous electrolyte.

It should, however, be noted that when a compound in which Si and element Z are present in an equilibrium state, e.g., $Si_aZ_p$, is formed, it is impossible to efficiently reduce the activity of Si. It is therefore important that element Z should be present in Si in a non-equilibrium state.

[Negative Electrode [7]: Form]

In this invention, the negative-electrode active material to be used in negative electrode [7] generally is in a thin film form or a powder form. In the invention, a negative electrode employing the active material in a thin film form may be obtained by forming an active-material layer on a current collector by vapor phase growth as described in the production processes which will be given later. A negative electrode employing the active material in a powder form is obtained, for example, by applying the powdery active material, a binder, etc. on a current collector to form an active-material layer.

[[Active Material in Thin Film Form]]
[[[Structure]]]

Examples of the structure of the active material in a thin film form deposited on a current collector include a columnar structure and a lamellar structure.

[[[Film Thickness]]]

The thickness of the active material in a thin film form corresponds to the thickness of the active-material layer of the negative electrode employing the active material. It is generally 1 μm or larger, preferably 3 μm or larger. The upper limit thereof is generally 30 μm or smaller, preferably 20 μm or smaller, even more preferably 15 μm or smaller. In case where the thickness of the active material in a thin film form is smaller than the lower limit of that range, negative electrodes of the invention employing this active material (hereinafter a negative electrode employing a thin-film-form active material is often referred to as "thin-film negative electrode") have a low capacity per sheet and it is necessary to use many such negative electrodes for obtaining a high-capacity battery. Consequently, the total volume of the necessary positive electrodes, separators, and current collectors for the thin-film negative electrodes themselves also is increased. The amount of the negative-electrode active material which can be packed per unit battery volume is substantially reduced accordingly, making it difficult to increase battery capacity. On the other hand, when the thickness thereof exceeds the upper limit of that range, there are cases where the thin-film-form active material peels off the current collector base due to expansion/contraction with charge/discharge. There is hence a possibility that cycle characteristics might be impaired.

[[Active Material in Powder Form]]
[[[Shape]]]

Examples of the shape of the powder-form active material include spherical, polyhedral, and irregular shapes.

[[[Volume-Average Particle Diameter]]]

The volume-average particle diameter of the active material in a powder form is not particularly limited. However, it is generally 0.1 µm or larger, preferably 1 µm or larger, more preferably 3 µm or larger. The upper limit thereof is generally 50 µm or smaller, preferably 30 µm or smaller, more preferably 25 µm or smaller. When the volume-average particle diameter of the powder-form active material is smaller than the lower limit of that range, it is difficult to secure conduction paths among particles of the powder-form active material and conduction paths between the powder-form active material and the conductive material which will be described later, because of the too small particle diameter. There are hence cases where cycle characteristics are impaired. On the other hand, when the volume-average particle diameter thereof exceeds the upper limit of that range, there are cases where formation of a negative-electrode active-material layer on a current collector through coating fluid application results in unevenness as will be described later.

As the volume-average particle diameter of the active material in a powder form, use can be made of the value obtained by mixing a sample with a 2% by volume aqueous solution (about 1 mL) of poly(oxyethylene (20)) sorbitan monolaurate as a surfactant and examining the sample with a laser diffraction type particle size distribution analyzer (e.g., "LA-920" manufactured by HORIBA, Ltd.) using ion-exchanged water as a dispersion medium to determine the volume-average particle diameter (median diameter). In the Examples given later, the volume-average particle diameter was determined by this method.

[[[BET Specific Surface Area]]]

The BET specific surface area of the active material in a powder form is not particularly limited. However, the BET specific surface area thereof is generally 0.1 $m^2/g$ or larger, preferably 0.5 $m^2/g$ or larger, more preferably 1.0 $m^2/g$ or larger, and is generally 100 $m^2/g$ or smaller, preferably 30 $m^2/g$ or smaller, more preferably 15 $m^2/g$ or smaller. When the BET specific surface area thereof is smaller than the lower limit of that range, use of this active material in a negative electrode is apt to result in poor lithium acceptance during battery charge and in lithium deposition on the electrode surface. Such small BET specific surface areas are hence undesirable from the standpoint of safety. On the other hand, when the BET specific surface area thereof exceeds the upper limit of that range, there are cases where use of this active material in a negative electrode is apt to result in enhanced reactivity with the nonaqueous electrolyte and enhanced gas evolution and a preferred battery is difficult to obtain.

The BET specific surface area of the active material in a powder form is determined with a surface area meter (e.g., a fully automatic surface area measuring apparatus manufactured by Ohukura Riken Co., Ltd.) by preliminarily drying the powder-form active material at 350° C. for 15 minutes in a nitrogen stream and then measuring the specific surface area thereof by the gas-flowing nitrogen adsorption BET one-point method using a nitrogen/helium mixture gas precisely regulated so as to have a nitrogen pressure of 0.3 relative to atmospheric pressure.

[[[Tap Density]]]

The tap density of the active material in a powder form is not particularly limited. However, the tap density thereof is generally 0.2 $g/cm^3$ or higher, preferably 0.3 $g/cm^3$ or higher, more preferably 0.5 $g/cm^3$ or higher, and is generally 3.5 $g/cm^3$ or lower, preferably 2.5 $g/cm^3$ or lower. When the tap density thereof is lower than the lower limit of that range, there are cases where a negative-electrode active-material layer having an increased loading density is difficult to form and a high-capacity battery is difficult to obtain. On the other hand, when the tap density thereof exceeds the upper limit of that range, there are cases where the negative-electrode active-material layer has a reduced amount of interstices and preferred battery characteristics are difficult to obtain.

In the invention, the tap density of the active material in a powder form is determined by dropping the active material through a sieve having an opening size of 300 µm into a 20-$cm^3$ tapping cell to fill the cell therewith up to the brim, subsequently conducting tapping operations 1,000 times over a stroke length of 10 mm using a powder densimeter (e.g., Tap Denser, manufactured by Seishin Enterprise Co., Ltd.), and determining a density from the resultant volume of the sample and the weight thereof. This density is defined as the tap density.

2. Element-Z-Externally-Possessing Lithium-Occluding Substance (F)

The element-Z-externally-possessing lithium-occluding substance (F) is a material comprising a lithium-occluding metal (A) and/or lithium-occluding alloy (B) and C (carbon) (carbonaceous substance (E)) combined therewith as element Z in the negative electrode. The term "combined" herein means, for example, the state in which the lithium-occluding metal (A) and/or lithium-occluding alloy (B) and the carbonaceous substance (E) are restrained by bonding, the state in which they are physically restrained, or the state in which they retain a shape by means of electrostatic restraint. The term "physical restraint" herein means a state such as that in which the lithium-occluding metal (A) and/or lithium-occluding alloy (B) is surrounded by the carbonaceous substance (E) or the state in which the former is caught by the latter. The term "electrostatic restraint" means the state in which the lithium-occluding metal (A) and/or lithium-occluding alloy (B) is adherent to the carbonaceous substance (E) by means of electrostatic energy. Furthermore, the term "the state of being restrained by bonding" means chemical bonding by hydrogen bonds, covalent bonds, ionic bonds, etc.

Of these, the state in which the surface of the lithium-occluding metal (A) and/or lithium-occluding alloy (B) at least partly has an interface where a layer of the carbonaceous substance (E) is bonded thereto is advantageous from the standpoint of resistance reduction. The term coating herein means that the interface between the metal (A) and/or alloy (B) and the surface of the carbonaceous substance (E)

at least partly has chemical bonds and the metal (A) and/or alloy (B) is (1) in the state of covering the whole surface, (2) in the state of locally covering the carbonaceous particles, (3) in the state of selectively covering part of the surface, or (4) in the state of being present in ultrafine regions including chemical bonds.

At the interface, crystallinity may change continuously or discontinuously. Namely, it is preferred that the element-Z-externally-possessing lithium-occluding substance (F) should be one which has an interface where the lithium-occluding metal (A) and/or lithium-occluding alloy (B) is covered with and/or bonded to the carbonaceous substance (E) and the interface changes in crystallinity discontinuously and/or continuously.

[Negative Electrode [7]: Properties of Carbonaceous Substance (E)]

[[Composition of Carbonaceous Substance (E)]]

The carbonaceous substance (E) especially preferably is a product of the carbonization of the following (a) or (b). This carbonization product may contain a graphitic substance (G) such as a natural graphite or artificial graphite. Since the graphitic substance (G) has exceedingly developed crystallinity, it generally has higher electrical conductivity than the carbonaceous substance (E) and is highly effective in enhancing conductivity as compared with the carbonaceous substance (E). Because of this, coexistence with the carbonaceous substance (E) is preferred from the standpoint of improving electrical conductivity.

(a) An organic substance capable of carbonization which is selected from the group consisting of coal-derived heavy oil, straight-run heavy oil, petroleum-derived cracked heavy oil, aromatic hydrocarbons, nitrogen-ring compounds, sulfur-ring compounds, polyphenylenes, organic synthetic polymers, natural polymers, thermoplastic resins, and thermosetting resins.

(b) A solution obtained by dissolving any of these organic substances capable of carbonization in a low-molecular organic solvent.

The coal-derived heavy oil preferably is any of coal tar pitches ranging from soft pitch to hard pitch, dry distillation/liquefaction oil, and the like. The straight-run heavy oil preferably is any of topping residues, vacuum distillation residues, and the like. The petroleum-derived cracked heavy oil preferably is, for example, ethylene tar as a by-product of the thermal cracking of crude oil, naphtha, etc. The aromatic hydrocarbons preferably are acenaphthylene, decacyclene, anthracene, phenanthrene, and the like. The nitrogen-ring compounds preferably are phenazine, acridine, and the like. The sulfur-ring compounds preferably are thiophene, bithiophene, and the like. The polyphenylenes preferably are biphenyl, terphenyl, and the like. The organic synthetic polymers preferably are poly(vinyl chloride), poly(vinyl alcohol), poly(vinyl butyral), substances obtained by insolubilizing these compounds, polyacrylonitrile, polypyrrole, polythiophene, polystyrene, and the like. The natural polymers preferably are, for example, polysaccharides such as cellulose, lignin, mannan, poly(galacturonic acid), chitosan, saccharose, and the like. The thermoplastic resins preferably are poly(phenylene sulfide), poly(phenylene oxide), and the like. The thermosetting resins preferably are furfuryl alcohol resins, phenol-formaldehyde resins, imide resins, and the like.

Although the carbonaceous substance (E) preferably is a product of the carbonization of the "organic substance capable of carbonization" described above, it also preferably is a product of the carbonization of a solution obtained by dissolving the "organic substance capable of carbonization" in a low-molecular organic solvent such as benzene, toluene, xylene, quinoline, or n-hexane.

It is especially preferred that the (a) or (b) should be liquid. Namely, to cause carbonization to proceed in a liquid phase is preferred from the standpoint of forming an interface between the carbonaceous substance (E) and the lithium-occluding metal (A) and/or lithium-occluding alloy (B).

[[Properties of Carbonaceous Substance (E)]]

It is desirable that the carbonaceous substance (E) should have properties satisfying any one of the following items (1) to (3) or simultaneously satisfy two or more thereof. Furthermore, one carbonaceous substance (E) having such properties may be used alone, or any two or more such carbonaceous substances (E) may be used in combination in any desired proportion.

(1) X-Ray Parameter

With respect to the crystallinity of the carbonaceous substance (E), the value of d (interplanar spacing) for the lattice planes (002) (hereinafter abbreviated to "d002"), as determined by X-ray diffractometry in accordance with the method of the Japan Society for Promotion of Scientific Research, is preferably 0.38 nm or smaller, especially preferably 0.36 nm or smaller, more preferably 0.35 nm or smaller. When the value of d is too large, the surface of this carbonaceous substance (E) has considerably low crystallinity to increase resistance. There are hence cases where the effect of improving suitability for charge is lessened to reduce the effects of the invention. The lower limit thereof is at least 0.335 nm, which is a theoretical value for graphites.

Furthermore, the crystallite size (Lc) of this carbon material, as determined by X-ray diffractometry in accordance with the method of the Japan Society for Promotion of Scientific Research, is generally 1 nm or larger, preferably 1.5 nm or larger. When the Lc thereof is smaller than the lower limit of that range, there are cases where resistance increases and, hence, the effect of improving suitability for charge is lessened.

(2) Raman R Value, Raman Half-Value Width

The Raman R value of the carbonaceous substance (E) part as determined by the argon ion laser Raman spectroscopy is generally 0.2 or higher, preferably 0.3 or higher, more preferably 0.4 or higher. The upper limit thereof is generally 1.5 or lower, preferably 1.2 or lower. When the Raman R value thereof is lower than the lower limit of that range, the surface of such particles has too high crystallinity and there are cases where the number of intercalation sites into which lithium comes with charge/discharge decreases. Namely, there are cases where suitability for charge decreases. On the other hand, when the Raman R value thereof exceeds the upper limit of that range, the surface of such particles has reduced crystallinity and enhanced reactivity with the nonaqueous electrolyte and this may lead to a decrease in efficiency and enhanced gas evolution.

The Raman half-value width around 1,580 $cm^{-1}$ of the carbonaceous substance (E) part is not particularly limited. However, the half-value width thereof is generally 20 $cm^{-1}$ or larger, preferably 30 $cm^{-1}$ or larger. The upper limit thereof is generally 140 $cm^{-1}$ or smaller, preferably 100 $cm^{-1}$ or smaller. When the Raman half-value width thereof is smaller than the lower limit of that range, the surface of such particles has too high crystallinity and there are cases where the number of intercalation sites into which lithium comes with charge/discharge decreases. Namely, there are cases where suitability for charge decreases. On the other hand, when the Raman half-value width thereof exceeds the upper limit of that range, the surface of such particles has reduced crystallinity and enhanced reactivity with the nonaqueous electrolyte and this may lead to a decrease in efficiency and enhanced gas evolution.

(3) True Density

The true density of the carbonaceous substance (E) part is generally 1.4 g/cm$^3$ or higher, preferably 1.5 g/cm$^3$ or higher, more preferably 1.6 g/cm$^3$ or higher, even more preferably 1.7 g/cm$^3$ or higher. The upper limit thereof is up to 2.26 g/cm$^3$, which is a theoretical value for graphites. When the true density thereof is lower than the lower limit of that range, there are cases where this carbon has too low crystallinity, resulting in an increase in initial irreversible capacity.

Although the multielement-containing negative-electrode active material (C) to be used as the negative-electrode active material of negative electrode [7] in a lithium secondary battery of the invention preferably comprises the element-Z-externally-possessing lithium-occluding substance (F) constituted of a lithium-occluding metal (A) and/or lithium-occluding alloy (B) which has been combined with a carbonaceous substance (E), it is also preferred that this negative-electrode active material (C) further contains a graphitic substance (G) as carbon (C) as element Z besides the carbonaceous substance (E).

[[Composition and Properties of Graphitic Substance (G)]]

Examples of the composition of the graphitic substance (G) include natural graphites, artificial graphites, and materials obtained by subjecting these graphites to treatments, e.g., pulverization. It is desirable that the graphitic substance (G) should have properties which satisfy any one of the following items (1) to (3) or simultaneously satisfy two or more thereof. Furthermore, one graphitic substance (G) having such properties may be used alone, or any two or more such graphitic substances (G) may be used in combination in any desired proportion.

(1) X-Ray Parameter

With respect to the graphitic substance (G) part, the value of d (interplanar spacing) for the lattice planes (002), as determined by X-ray diffractometry in accordance with the method of the Japan Society for Promotion of Scientific Research, is at least 0.335 nm, which is a theoretical value for graphites. The upper limit thereof is preferably 0.340 nm or smaller, more preferably 0.338 nm or smaller, especially preferably 0.337 nm or smaller. When the value of d is too large, the surface of this graphitic substance (G) has considerably low crystallinity to increase resistance. There are hence cases where the effect of improving suitability for charge is lessened to reduce the effects of the invention.

Furthermore, the crystallite size (Lc) of the graphitic substance (G), as determined by X-ray diffractometry in accordance with the method of the Japan Society for Promotion of Scientific Research, is generally 10 nm or larger, preferably 50 nm or larger, more preferably 80 nm or larger. When the Lc thereof is smaller than the lower limit of that range, there are cases where resistance increases and, hence, the effect of improving suitability for charge is lessened.

(2) Raman R Value, Raman Half-Value Width

The Raman R value of the graphitic substance (G) part as determined by the argon ion laser Raman spectroscopy is generally 0.01 or higher, preferably 0.10 or higher. The upper limit thereof is generally 0.40 or lower, preferably 0.35 or lower, more preferably 0.25 or lower. When the Raman R value thereof is lower than the lower limit of that range, the surface of such particles has too high crystallinity and there are cases where the number of intercalation sites into which lithium comes with charge/discharge decreases. Namely, there are cases where suitability for charge decreases. On the other hand, when the Raman R value thereof exceeds the upper limit of that range, the surface of such particles has reduced crystallinity and enhanced reactivity with the nonaqueous electrolyte and this may lead to a decrease in efficiency and enhanced gas evolution.

The Raman half-value width around 1,580 cm$^{-1}$ of the graphitic substance (G) part is not particularly limited. However, the half-value width thereof is generally 10 cm$^{-1}$ or larger, preferably 15 cm$^{-1}$ or larger. The upper limit thereof is generally 50 cm$^{-1}$ or smaller, preferably 40 cm$^{-1}$ or smaller. When the Raman half-value width thereof is smaller than the lower limit of that range, the surface of such particles has too high crystallinity and there are cases where the number of intercalation sites into which lithium comes with charge/discharge decreases. Namely, there are cases where suitability for charge decreases. On the other hand, when the Raman half-value width thereof exceeds the upper limit of that range, the surface of such particles has reduced crystallinity and enhanced reactivity with the nonaqueous electrolyte and this may lead to a decrease in efficiency and enhanced gas evolution.

(3) True Density

The true density of the graphitic substance (G) part is generally 2.0 g/cm$^3$ or higher, preferably 2.1 g/cm$^3$ or higher, more preferably 2.2 g/cm$^3$ or higher, even more preferably 2.22 g/cm$^3$ or higher. The upper limit thereof is up to 2.26 g/cm$^3$, which is a theoretical value for graphites. When the true density thereof is lower than the lower limit of that range, there are cases where this carbon has too low crystallinity, resulting in an increase in initial irreversible capacity.

In the element-Z-externally-possessing lithium-occluding substance (F) for use in negative electrode [7] in a lithium secondary battery of the invention, the proportion of the lithium-occluding metal (A) and/or lithium-occluding alloy (B) to the carbonaceous substance (E) by mass desirably is generally 20/80 or higher, preferably 50/50 or higher, more preferably 80/20 or higher, especially preferably 90/10 or higher, and is preferably 99.9/0.1 or lower, more preferably 99/1 or lower, especially preferably 98/2 or lower. When the proportion thereof exceeds the upper limit of that range, there are cases where the presence of the carbonaceous substance (E) produces no effect. When the proportion thereof is lower than the lower limit of that range, there are cases where the effect of increasing capacity per unit mass is lessened. It is preferred that the proportion of the lithium-occluding metal (A) and lithium-occluding alloy (B) should be 20% by mass or higher based on the whole element-Z-externally-possessing lithium-occluding substance (F).

In the case where the graphitic substance (G) is contained, the content of the graphitic substance (G) is preferably 5% by mass or higher, more preferably 20% by mass or higher, even more preferably 50% by mass or higher, based on the sum of the carbonaceous substance (E) and the graphitic substance (G). The upper limit thereof is preferably 99% by mass or lower, more preferably 95% by mass or lower. When the content of the graphitic substance (G) is too high, there are cases where interfacial bonding is weak and the effect of improving electrical conductivity is difficult to obtain. When the content thereof is too low, there are cases where the effect of improving electrical conductivity which is produced by the graphitic substance (G) contained is difficult to obtain.

In the invention, the element-Z-externally-possessing lithium-occluding substance (F) is generally in a thin film form or a powder form. In the invention, a negative electrode employing the active material in a thin film form may be obtained by forming an active-material layer on a current collector by vapor phase growth as described in the production processes which will be given later. A negative electrode employing the active material in a powder form is obtained, for example, by applying the powdery active material, a binder, etc. on a current collector to form an active-material layer.

In the case where the element-Z-externally-possessing lithium-occluding substance (F) is in a powder form, the preferred ranges of powder properties thereof are the same as the preferred ranges of powder properties of the element-Z-internally-possessing lithium-occluding composite (D).

[Negative Electrode [7]: Current Collector]

(Material)

Examples of the material of the current collector include copper, nickel, and stainless steel. Of these, copper is preferred because it can be easily processed into a thin film and is inexpensive. Examples of copper foils include a rolled copper foil, which is produced by the rolling process, and an electrolytic copper foil, which is produced by the electrolytic process. Either of these can be used as a current collector. In the case of a copper foil having a thickness smaller than 25 µm, use can be made of a copper alloy (e.g., phosphor bronze, titanium-copper, Corson alloy, or Cu—Cr—Zr alloy) having a higher strength than pure copper.

The current collector comprising a copper foil produced by the rolling process is less apt to crack even when the negative electrode is rolled tightly or rolled at an acute angle, because the copper crystals are oriented in the rolling direction. This current collector can be advantageously used in small cylindrical batteries. The electrolytic copper foil is obtained by immersing a metallic drum in a nonaqueous electrolyte containing copper ions dissolved therein, causing current to flow through the system while rotating the drum to thereby deposit copper on the drum surface, and peeling the copper deposit from the drum. Copper may have been deposited on a surface of the rolled copper foil by the electrolytic process. One or each side of such a copper foil may have undergone a surface-roughening treatment or a surface treatment (e.g., a chromate treatment in a thickness of from several nanometers to about 1 µm or a priming treatment with titanium).

(Thickness)

The current collector base comprising a copper foil or the like preferably is thinner from the standpoint that a thin-film negative electrode having a small thickness can be produced therefrom and the thin-film negative electrode having a larger surface area can be packed into a battery can having the same volume for packing. However, a copper foil having an excessively small thickness is deficient in strength and may break upon winding, etc. in battery production. Consequently, the thickness of the foil is preferably about 10-70 µm. In the case where an active-material thin film is to be formed on each side of a copper foil, this copper foil preferably is even thinner. However, from the standpoint of preventing the copper foil from being cracked by the expansion/contraction of the active-material thin films with charge/discharge, the thickness of the copper foil in this case is more preferably 8-35 µm. In the case where metal foils other than copper foils are used as the current collector, these metal foils may have respective thicknesses suitable for these. However, the thicknesses thereof are roughly in the range of about 10-70 µm.

(Properties)

The current collector base is desired to further have the following properties.

(1) Average Surface Roughness (Ra)

The average surface roughness (Ra) of that side of the current collector base on which an active-material thin film is to be formed, as determined by the method provided for in JIS B 0601-1994, is not particularly limited. However, the average surface roughness thereof is generally 0.01 µm or higher, preferably 0.03 µm or higher, and is generally 1.5 µm or lower, preferably 1.3 µm or lower, especially preferably 1.0 µm or lower.

By regulating the average surface roughness (Ra) of the current collector base so as to be in the range of from the lower limit to upper limit, satisfactory charge/discharge cycle characteristics can be expected. Namely, by regulating the average surface roughness thereof to a value not lower than the lower limit, the area of the interface between the base and an active-material thin film is increased and adhesion to the active-material thin film is improved. The upper limit of the average surface roughness (Ra) thereof is not particularly limited. However, it is preferably 1.5 µm or lower because a foil having a practical thickness for batteries and having an average surface roughness (Ra) exceeding 1.5 µm is generally difficult to procure.

(2) Tensile Strength

The tensile strength of the current collector base is not particularly limited. However, it is generally 50 N/mm$^2$ or higher, preferably 100 N/mm$^2$ or higher, more preferably 150 N/mm$^2$ or higher. Tensile strength is a quotient obtained by dividing the maximum tensile force required before test piece breakage by the sectional area of the test piece. In the invention, the tensile strength is determined through a measurement conducted with the same apparatus and by the same method as for elongation. A current collector base having a high tensile strength can be inhibited from cracking with the expansion/contraction of the active-material thin film which occur upon charge/discharge. With this current collector base, satisfactory cycle characteristics can be obtained.

(3) 0.2% Proof Stress

The 0.2% proof stress of the current collector base is not particularly limited. However, it is generally 30 N/mm$^2$ or higher, preferably 100 N/mm$^2$ or higher, especially preferably 150 N/mm$^2$ or higher. The term 0.2% proof stress means the degree of load necessary for imparting a plastic (permanent) deformation of 0.2%. Namely, it means that application of that degree of load and subsequent removal thereof result in a 0.2% deformation. In the invention, the 0.2% proof stress is determined through a measurement conducted with the same apparatus and by the same method as for elongation. A current collector base having a high 0.2% proof stress can be inhibited from plastically deforming with the expansion/contraction of the active-material thin film which occur upon charge/discharge. With this current collector base, satisfactory cycle characteristics can be obtained.

[Negative Electrode [7]: Processes for Producing Multielement-Containing Negative-Electrode Active Materials (C)]

Processes for producing the multielement-containing negative-electrode active materials (C) (element-Z-internally-possessing lithium-occluding substance (D) and element-Z-externally-possessing lithium-occluding substance (F)) according to the invention are not particularly limited. For example, the negative-electrode active materials can be produced by the following processes.

1. Processes for Producing Element-Z-Internally-Possessing Lithium-Occluding Substance (D)
<Process 1>

Any one of the following is used as a vapor deposition source, sputtering source, or thermal spraying source:
- (i) a composition of Si, element Z, and element M (provided that it is a composition of Si and element Z when y=0 or y≈0);
- (ii) a mixture of Si, element Z, and element M (provided that it is a mixture of Si and element Z when y=0 or y≈0);
- (iii) Si, element Z, and element M which are separate materials (the separate materials each may be a gas comprising the element) (provided that (iii) is Si and element Z as separate materials when y=0 or y≈0);
- (iv) a combination of a composition or mixture of Si and element Z with element M as a separate material (which may be a gas comprising M);
- (v) a gas comprising Si, element Z, and element M (provided that it is a gas comprising Si and element Z when y=0 or y≈0);
- (vi) a combination of Si as a separate material with a composition or mixture of element Z and element M; and
- (vii) a combination of a composition or mixture of Si and element M with element Z as a separate material (which may be a gas comprising element Z).

Si, element Z, and element M (or Si and element Z when y=0 or y≈10) are simultaneously deposited on the current collector base described above by the vapor deposition method and/or sputtering method and the thermal spraying method to form a film having a thickness of 1-30 μm, preferably in the thickness described above in "Film Thickness" under "Active Material in Thin Film Form".

(Raw Materials)

Of the vapor deposition source, sputtering source, or thermal spraying source (hereinafter often referred to suitably as "raw material"), the Si separate-material raw material to be used can be, for example, crystalline Si or amorphous Si. As the raw-material Z, use can be made of the element C or N. With respect to element Z, two or more elements may be simultaneously used as long as they satisfy the items described above.

Of the raw materials, the raw material (i), i.e., a composition of Si, element Z, and element M (provided that it is a composition of Si and element Z when y=0 or y≈0), may be a single compound comprising a combination of Si, element Z, and element M or of Si and element Z, or may be two or more compounds of these elements. The Si, raw-material Z, and raw-material M may be used in the form of, e.g., a powder, granules, pellets, mass, or plate.

In the case where y≈0 in the general formula $SiZ_xM_y$, i.e., when the lithium-occluding substance (D) contains element M, the element M may be one or more elements selected from Groups 2, 4, 8, 9, 10, 11, 13, 14, 15, and 16 of the periodic table excluding Si and element Z. Preferably, one or more of the elements Ti, Zr, W, O, and Co may be used. More preferably, the element O may be used.

(Methods of Film Deposition)

Examples of methods for forming the active-material thin film include vapor phase growth methods such as, e.g., the vapor deposition method (vacuum deposition, CVD, or ion plating), sputtering method, and thermal spraying method (flame spraying or plasma spraying). Furthermore, a combination of the sputtering method and vapor deposition method or a combination of the sputtering method and thermal spraying method may be used for film deposition.

Such methods for forming a thin film of the negative-electrode active material will be explained below.

A. Sputtering Method

In the sputtering method, a raw material for the active material which has been emitted from a target comprising any of the raw materials by means of a plasma at a reduced pressure is caused to strike and deposit on a current collector base to thereby form a thin film. According to the sputtering method, the interface between the active-material thin film formed and the current collector base is in a satisfactory state and this active-material thin film has high adhesion to the current collector.

With respect to the method of applying a sputtering voltage to the target, either of a direct-current voltage and an alternating-current voltage may be used. In this operation, a substantially negative bias voltage may be applied to the current collector base to thereby control the collision energy of ions from the plasma. The degree of vacuum to be reached in the chamber before the initiation of thin-film formation is generally 0.1 Pa or lower from the standpoint of preventing impurity inclusion.

As a sputtering gas is used an inert gas such as, e.g., Ne, Ar, Kr, or Xe. Of these, argon gas is preferred from the standpoints of sputtering efficiency, etc. In the case where element Z in the compound $SiZ_xM_y$ is N, it is preferred from the standpoint of production that a slight amount of nitrogen gas be caused to coexist with the inert gas. The sputtering gas pressure is generally about 0.05-70 Pa. In forming an active-material thin film by the sputtering method, the temperature of the current collector base may be regulated by water cooling or with a heater, etc. The temperature of the current collector base is generally in the range of from room temperature to 900° C., and is preferably 150° C. or lower. The rate of film deposition in forming an active-material thin film by the sputtering method is generally 0.01-0.5 μm/min.

Prior to the formation of an active-material thin film, the surface of the current collector base can be etched by a pretreatment, e.g., reverse sputtering or another treatment such as plasma treatment. Such a pretreatment is effective in removing contaminants and an oxide film from the surface of the copper foil as the current collector base and improving the adhesion of the active-material thin film.

B. Vacuum Deposition Method

The vacuum deposition method is a technique in which the raw material for the active material is melted/vaporized and deposited on a current collector base. This method generally has an advantage that a thin film can be formed at a higher deposition rate than in the sputtering method. Compared to the sputtering method, the vacuum deposition method can be advantageously utilized from the standpoint of production cost because the time period necessary for forming an active-material thin film having a given thickness can be reduced. Specific examples thereof include the induction heating method, resistance heating method, and electron beam heating deposition method. In the induction heating method, a deposition material placed in an evaporation crucible of, e.g., graphite, is heated with an induction current. In the resistance heating method, a deposition material in an evaporation boat or the like is heated by applying a heating current thereto. In the electron beam heating deposition method, a deposition material is heated with electron beams. The deposition material is thus melted and vaporized to deposit a film.

With respect to the atmosphere for the vacuum deposition method, the deposition is generally conducted under vacuum. In the case where element Z in the compound $SiZ_xM_y$ is N, it is possible to use a technique in which the pressure in the chamber is reduced while introducing a slight amount of nitrogen gas together with an inert gas to conduct simultaneous deposition under vacuum and thereby form the $SiZ_xM_y$. The degree of vacuum to be reached in the chamber before the initiation of thin-film formation is generally 0.1 Pa or lower from the standpoint of preventing impurity inclusion.

In forming an active-material thin film by the vacuum deposition method, the temperature of the current collector base may be regulated with a heater, etc. The temperature of the current collector base is generally in the range of from room temperature to 900° C., and is preferably 150° C. or lower. The rate of film deposition in forming a negative-electrode active-material thin film by the vacuum deposition method is generally 0.1-50 μm/min.

As in the case of the sputtering method, the surface of the current collector base may be etched by ion irradiation with an ion gun or the like before the deposition of an active-material thin film on the current collector base. By such an etching treatment, adhesion between the base and the active-material thin film can be further enhanced. Furthermore, the current collector base may be bombarded with ions during thin-film formation, whereby the adhesion of the active-material thin film to the current collector base can be further improved.

C. CVD Method

In the CVD method, the raw material for the active material is deposited on a current collector base through a vapor-phase chemical reaction. A feature of the CVD method generally resides in that since compound gases in a reaction chamber are regulated by gas introduction, a variety of materials having a high purity can be synthesized. Specific examples of this method include the thermal CVD method, plasma CVD method, photo-CVD method, and cat-CVD method. The thermal CVD method is a technique in which a raw-material gas of a halogen compound having a high vapor pressure is introduced, together with a carrier gas or reaction gas, into a reaction vessel heated at around 1,000° C. to thermally cause a chemical reaction and thereby form a thin film. The plasma CVD method is a technique employing a plasma in place of heat energy. The photo-CVD method is a technique employing light energy in place of heat energy. The cat-CVD method, i.e., the catalytic chemical vapor deposition method, is a technique in which a catalytic decomposition reaction of a raw-material gas with a heated catalyst is utilized to thereby form a thin film.

Examples of the raw-material gases for use in the CVD method include $SiH_4$ and $SiCl_4$ as element Si sources and $NH_3$, $N_2$, $BCl_3$, $CH_4$, $C_2H_6$, and $C_3H_8$ as element Z sources.

D. Ion Plating Method

In the ion plating method, the raw material for the active material is melted/vaporized, and the vapor particles are ionized and excited in the presence of a plasma to thereby tenaciously deposit a film on a current collector base. Specifically, examples of methods for melting/vaporizing the raw material include the induction heating method, resistance heating method, and electron beam heating deposition method. Examples of methods for ionization and excitation include the activation reaction deposition method, multi-cathode thermoelectronic irradiation method, high-frequency excitation method, HCD method, cluster ion beam method, and multi-arc method. Techniques suitably selected respectively from those methods for raw-material vaporization and from those methods for ionization and excitation may be used in combination.

E. Thermal Spraying Method

In the thermal spraying method, the raw material for the active material is melted or softened by heating and formed into fine particles, which are accelerated toward a current collector base and solidified/deposited thereon. Specific examples thereof include the flame spraying method, arc spraying method, direct-current plasma spraying method, RF plasma spraying method, and laser spraying method.

F. Combination of Sputtering Method and Vapor Deposition Method

The high film deposition rate which is an advantage of the vapor deposition method and the tenacious deposit adhesion to a current collector base which is an advantage of the sputtering method can be utilized, for example, in the following manner. A first thin film layer is formed by the sputtering method and a second thin film layer is thereafter formed at a high rate by the vapor deposition method. Thus, an interference region having satisfactory adhesion to the current collector base is formed and an active-material thin film can be formed at a high deposition rate. By such a hybrid combination of film deposition techniques, a thin-film negative electrode having a high charge/discharge capacity and excellent charge/discharge cycle characteristics can be efficiently produced.

It is preferred that the formation of an active-material thin film using a combination of the sputtering method and the vapor deposition method should be conducted successively while maintaining a reduced-pressure atmosphere. This is because impurity inclusion can be prevented by successively forming a first thin film layer and a second thin film layer while avoiding exposure to the air. For example, it is preferred to use an apparatus for thin-film formation in which sputtering and vapor deposition are successively conducted in the same vacuum environment while moving the current collector base.

In the case where an active-material thin film is formed on each side of a current collector base by such a film deposition method in the invention, it is preferred that the formation of an active-material thin film layer (which may be the combination of a first thin film layer and a second thin film layer) on one side of the current collector base and the formation of an active-material thin film layer (which may be the combination of a first thin film layer and a second thin film layer) on the other side of the current collector base should be successively conducted while maintaining a reduced-pressure atmosphere.

<Process 2>

A production process for use in the case where element Z in the general formula $SiZ_xM_y$ is C is described below.

Any one of the following is used as a vapor deposition source, sputtering source, or thermal spraying source:

(i) a composition of Si, C, and element M (provided that it is a composition of Si and C when y=0 or y≈0);
  (ii) a mixture of Si, C, and element M (provided that it is a mixture of Si and C when y=0 or y≈0);
  (iii) Si, C, and element M which are separate materials (provided that (iii) is Si and C as separate materials when y=0 or y≈10);
  (iv) a combination of a composition or mixture of Si and C with element M as a separate material (which may be a gas comprising M);
  (v) a gas comprising Si, C, and element M (provided that it is a gas comprising Si and C when y=0 or y≈0);
  (vi) a combination of Si as a separate material with a composition or mixture of C and element M; and
  (vii) a combination of a composition or mixture of Si and element M with C as a separate material.

Si, C, and element M (or Si and C when y=0 or y≈0) are simultaneously deposited on the current collector base described above by the vapor deposition method and/or sputtering method and the thermal spraying method to form a film having a thickness of 1-30 μm, preferably in the thickness described above in "Film Thickness" under "Active Material in Thin Film Form".

(Raw Materials)

Of the vapor deposition source or sputtering source (hereinafter often referred to suitably as "raw material"), the raw-material Si to be used can be, for example, crystalline Si or amorphous Si. As the raw-material C, use can be made of, for example, a carbon material such as a natural graphite or artificial graphite. As the raw-material M can generally be used one or more of the elements in Groups 2, 4, 8, 9, 10, 11, 13, 14, 15, and 16 of the periodic table excluding Si and element Z. Preferably, one or more of the elements Ti, Zr, W, O, and Co may be used. Especially preferably, the element O may be used.

Of the raw materials, the raw material (i), i.e., a composition of Si, C, and element M, may be a single compound comprising a combination of Si, C, and element M, or may be two or more compounds of these elements. The raw-material Si, C, and M may be used in the form of, e.g., a powder, granules, pellets, mass, or plate. The raw material for element M may be a nitride or oxide of Si or C. However, in the case of a raw material which is present as a gas at ordinary temperature, e.g., O, it is preferred from the standpoint of production that the raw-material gas, e.g., O gas, should be caused to coexist during the deposition of Si and C.

(Methods of Film Deposition)

The same film deposition methods as in Process 1 may be used.

A. Sputtering Method

As a sputtering gas is used an inert gas such as, e.g., Ne, Ar, Kr, or Xe. Of these, argon gas is preferred from the standpoints of sputtering efficiency, etc. In the case where element M in the general formula $SiC_xM_y$ is O, it is preferred from the standpoint of production that a slight amount of oxygen gas be caused to coexist with each of those inert gases. The sputtering gas pressure is generally about 0.05-70 Pa.

B. Vacuum Deposition Method

With respect to the atmosphere for the vacuum deposition method, the deposition is generally conducted under vacuum. In the case where element M in the general formula $SiC_xM_y$ is O, it is possible to use a technique in which the pressure in the chamber is reduced while introducing a slight amount of oxygen gas together with each of those inert gases to conduct simultaneous deposition under vacuum and thereby form Si/C/M.

C. CVD Method

Examples of the raw-material gases for use in the CVD method include $SiH_4$ and $SiCl_4$ as element Si sources and $CH_4$, $C_2H_6$, and $C_3H_8$ as element C sources.

<Process 3>

A production process for use in the case where element Z and element M in general formula $SiZ_xM_y$ are C and O, respectively, is described below.

Any one of the following is used as a vapor deposition source, sputtering source, or thermal spraying source:
(I) a composition of Si and C;
(II) a mixture of Si and C;
(III) Si and C as separate materials; and
(IV) a gas containing Si and C.

Si and C are simultaneously deposited by the vapor deposition method and/or sputtering method and the thermal spraying method in such an atmosphere that the oxygen concentration in the deposition gas (or in the residual gas in the case of film deposition under vacuum) is 0.0001-0.125%. Thus, a film is deposited on the current collector base described above in a thickness of 1-30 μm, preferably in the thickness described above in "Film Thickness" under "Active Material in Thin Film Form".

(Raw Materials)

Of the vapor deposition source, sputtering source, or thermal spraying source, the raw-material Si to be used can be, for example, crystalline Si or amorphous Si. As the raw-material C, use can be made of, for example, a carbon material such as a natural graphite or artificial graphite. An 0-element-containing gas, e.g., oxygen, is used as oxygen in the deposition gas either alone or in combination with an inert gas. The raw-material Si and C may be used in the form of, e.g., a powder, granules, pellets, mass, or plate. It is preferred from the standpoint of production that oxygen gas should be caused to coexist as a raw-material gas during the deposition of Si and C.

(Methods of Film Deposition)

The same film deposition methods as in Process 1 may be used.

(Oxygen Concentration during Film Deposition)

During vapor deposition and/or sputtering and thermal spraying, the oxygen concentration in the deposition gas (or in the residual gas in the case of film deposition under vacuum) is generally 0.0001% or higher and is generally 0.125% or lower, preferably 0.100% or lower, more preferably 0.020% or lower. When the oxygen concentration in the deposition gas exceeds the upper limit of that range, the Si/C/O thin film has an increased element O amount. There are hence cases where this negative-electrode active material has enhanced reactivity with the nonaqueous electrolyte, leading to a decrease in charge/discharge efficiency. When the oxygen concentration therein is too low, there are cases where an Si/C/O thin film cannot be deposited.

Incidentally, the oxygen concentration in a deposition gas is obtained, for example, by analysis for mass spectrum with a quadrupole mass filter. In the case where argon gas with which oxygen gas coexists is used as a deposition gas, the oxygen concentration therein is determined by examining this argon gas with an oxygen analyzer.

<Process 4>

A production process for use in the case where element Z in the general formula $SiZ_xM_y$ is N and y therein is y=0 or y≈0 is described below.

Any one of the following is used as a vapor deposition source, sputtering source, or thermal spraying source:
(I) Si as a separate material;
(II) a composition containing Si;
(III) a mixture containing Si; and
(IV) a gas containing Si.

Si and N are simultaneously deposited by the vapor deposition method and/or sputtering method and the thermal spraying method in such an atmosphere that the nitrogen concentration in the deposition gas (or in the residual gas in the case of film deposition under vacuum) is 1-22%. Thus, a film is deposited on the current collector base described above in a thickness of 1-30 μm, preferably in the thickness described above in "Film Thickness" under "Active Material in Thin Film Form".

(Raw Materials)

Of the vapor deposition source, sputtering source, or thermal spraying source, the Si separate-material raw material to be used can be, for example, crystalline Si or amorphous Si. An N-element-containing gas, e.g., nitrogen, is used as N in the deposition gas either alone or in combination with an inert gas. The Si, etc. may be used in the form of, e.g., a powder, granules, pellets, mass, or plate. It is preferred from the standpoint of production that nitrogen gas should be caused to coexist as a raw-material gas during the deposition of Si.

(Methods of Film Deposition)

The same film deposition methods as in Process 1 may be used.

(Nitrogen Concentration during Film Deposition)

During vapor deposition and/or sputtering and thermal spraying, the nitrogen concentration in the deposition gas (or in the residual gas in the case of film deposition under vacuum) is generally 1% or higher and is generally 22% or lower, preferably 15% or lower, more preferably 10% or lower. When the nitrogen concentration in the deposition gas exceeds the upper limit of that range, the $SiN_x$ thin film has an increased element N amount. There are hence cases where a silicon nitride not participating in charge/discharge is yielded, leading to a decrease in charge/discharge capacity. When the nitrogen concentration therein is too low, there are cases where an $SiN_x$ thin film containing N cannot be deposited, leading to a decrease in cycle characteristics. Incidentally, the nitrogen concentration in a deposition gas is obtained, for example, by analysis for mass spectrum with a quadrupole mass filter.

2. Processes for Producing Element-Z-Externally-Possessing Lithium-Occluding Substance (F)

<Process 5>

A lithium-occluding metal (A) and/or a lithium-occluding alloy (B) is mixed with the organic substance capable of carbonization described above under "Composition of Carbonaceous Substance (E)". This mixture is heated to decompose the organic substance and carbonize it through a solid phase and/or a liquid phase and/or a gas phase. Thus, a carbonaceous substance (E) is formed to obtain a composite. Furthermore, the resultant particles are pulverized/classified to obtain an appropriate value of volume-average particle diameter.

(Raw Materials)

The lithium-occluding metal (A) and/or lithium-occluding alloy (B) as a raw material has a volume-average particle diameter of generally 100 μm or smaller, preferably 10 μm or smaller, more preferably 1 μm or smaller. The lower limit thereof is 1 nm or larger. When the volume-average particle diameter thereof exceeds the upper limit, expansion during charge is difficult to diminish and there are cases where capacity retention through cycling decreases. When the volume-average particle diameter thereof is smaller than the lower limit, pulverization is difficult and this may lead to a loss in time or cost. Although the raw material for the carbonaceous substance (E) is as described above, it preferably is a substance which undergoes a liquid phase when carbonized.

<Process 6>

A lithium-occluding metal (A) and/or lithium-occluding alloy (B) is mixed with a graphitic substance (G) and with the carbonaceous substance capable of carbonization described above under "Composition of Carbonaceous Substance (E)". This mixture is heated to decompose the organic substance and carbonize it in a liquid phase. Thus, a carbonaceous substance (E) was formed to obtained a composite. Furthermore, the resultant particles are pulverized/classified to obtain an appropriate value of volume-average particle diameter.

(Raw Materials)

The raw materials are the same as in <Process 5>.

<Process 7>

A lithium-occluding metal (A) and/or lithium-occluding alloy (B) is mixed with a graphitic substance (G) and with the carbonaceous substance capable of carbonization described above under "Composition of Carbonaceous Substance (E)". This mixture is heated to decompose the organic substance and carbonize it in a solid phase. Thus, a carbonaceous substance (E) was formed to obtained a composite. Furthermore, the resultant particles are pulverized/classified to obtain an appropriate value of volume-average particle diameter.

(Raw Materials)

The raw materials are the same as in <Process 5>.

<Process 8>

A lithium-occluding metal (A) and/or lithium-occluding alloy (B) is mixed with a graphitic substance (G) and with the carbonaceous substance capable of carbonization described above under "Composition of Carbonaceous Substance (E)". This mixture is heated to decompose the organic substance and carbonize it in a gas phase. Thus, a carbonaceous substance (E) was formed to obtained a composite. Furthermore, the resultant particles are pulverized/classified to obtain an appropriate value of volume-average particle diameter.

(Raw Materials)

The raw materials are the same as in <Process 5>.

[Negative Electrode 7: Electrode Formation with Active Material in Powder Form]

The negative electrode may be produced by an ordinary method. For example, it can be formed in the same manner as described above by adding a binder and a solvent to the negative-electrode active material optionally together with a thickener, conductive material, filler, etc. to obtain a slurry, applying it to a current collector, drying the slurry applied, and then pressing the coated current collector. The thickness of the negative-electrode active-material layer per one side in the stage just before the step of injecting an electrolyte in battery fabrication is generally 5 μm or larger, preferably 10 μm or larger, more preferably 15 μm or larger. The upper limit thereof may be 150 μm or smaller and is preferably 120 μm or smaller, more preferably 100 μm or smaller. When the thickness thereof is larger than the upper limit of that range, a nonaqueous electrolyte is less apt to infiltrate into around the interface of the current collector and, hence, there are cases where high-current-density charge/discharge characteristics decrease. When the thickness thereof is smaller than the lower limit of that range, the proportion by volume of the current collector to the negative-electrode active material increases and there are cases where battery capacity decreases. The negative-electrode active material may be molded by rolling to obtain a sheet electrode. It is also possible to subject the negative-electrode active material to compression molding to obtain a pellet electrode.

The binder, thickener, etc. to be used are the same as those described above.

<Negative Electrode [8]>

Negative electrode [8], i.e., "a negative electrode containing as a negative-electrode active material two or more negative-electrode active materials differing in property", for use in a lithium secondary battery of the invention will be explained below.

[Negative Electrode [8]: Negative-Electrode Active Material]

The negative-electrode active material for use in negative electrode [8] is described below.

The negative-electrode active material for use in negative electrode [8] in a lithium secondary battery of the invention is characterized by comprising two or more negative-electrode active materials differing in property.

The term "differing in property" used herein not only means that the active materials differ in any of powder particle shape and powder properties represented by X-ray diffraction parameter, median diameter, aspect ratio, BET specific surface area, orientation ratio, Raman R value, tap density, true density, pore distribution, roundness, ash content, etc., but also involves the following cases: the case where the active materials differ in material constitution, such as "a composite carbonaceous material comprising two or more carbonaceous substances differing in crystallinity" and "an orientation-differing-carbon composite comprising two or more carbonaceous substances differing in orientation", and the case where the active materials differ in processing or treatment, such as the case including "a negative-electrode active material which has undergone a heat treatment" or "a negative-electrode active material which has undergone a mechanical energy treatment".

[Difference in Shape, Property, etc.]

The negative-electrode active material to be used in negative electrode [8] in a lithium secondary battery of the invention may comprise two or more negative-electrode active materials differing in volume-average particle diameter (median diameter) among those properties. This negative-electrode active material can improve cycle characteristics while maintaining low-temperature output. The difference in volume-average particle diameter (median diameter) desirably is generally 1 μm or larger, preferably 2 μm or larger, more preferably 5 μm or larger. The upper limit thereof is generally 30 μm or smaller, preferably 25 μm or smaller. When the difference therein exceeds the upper limit of that range, the material having a larger median diameter tends to have too large a particle diameter and this may pose a problem that use of this negative-electrode active material in electrode production results in streak lines in the coating surface. On the other hand, when the difference therein is smaller than the lower limit of that range, there are cases where the effect to be produced by the mixing of two kinds is less apt to be obtained.

Furthermore, the negative-electrode active material to be used in negative electrode [8] in a lithium secondary battery of the invention may be a material having a volume-based particle size distribution which is not normal. This material also can impart satisfactory properties for the same reasons as described above. The term "having a volume-based particle size distribution which is not normal" means that the volume-based particle size distribution curve drawn with the logarithmic scale as abscissa is not symmetrical about the volume-average particle diameter (median diameter). With respect to the degree of asymmetry, the value of Z represented by the following equation (1) is generally 0.3 μm or larger, preferably 0.5 μm or larger, more preferably 1 μm or larger. When Z is smaller than that value, there are cases where the effect of improving cycle characteristics which is produced by a particle size distribution which is not normal is difficult to obtain.

$$Z=|(\text{mode diameter})-(\text{median diameter})| \quad (1)$$

In equation (1), the unit of mode diameter and that of median diameter each are "μm", and "| |" indicates absolute value.

In this invention, the volume-average particle diameter (median diameter) and the mode diameter are defined as values determined by dispersing the negative-electrode active material in a 0.2% by mass aqueous solution (about 1 mL) of poly(oxyethylene(2)) sorbitan monolaurate as a surfactant and examining the dispersion with a laser diffraction type particle size distribution analyzer (LA-700, manufactured by HORIBA, Ltd.). The "median diameter", which is generally referred to also as $d_{50}$, means the particle diameter at which the volume-based distribution of the particles is divided into two parts, i.e., a larger-size part and a smaller-size part, which are equal in amount. The "mode diameter" means the particle diameter at which the volume-based particle size distribution has a maximum value. On LA-700, manufactured by HORIBA, Ltd., those diameters are univocally shown simply as "median diameter" and "mode diameter" respectively.

It is also preferred to use a negative-electrode active material having a median diameter of 10 μm or smaller as at least one of the negative-electrode active materials. This is because use of this negative-electrode active material is effective in improving cycle characteristics while maintaining low-temperature output. The median diameter thereof is especially preferably 8 μm or smaller. It is especially preferred that the negative-electrode active material having a median diameter of 10 μm or smaller be used in an amount in the range of 0.5-10% by mass based on all negative-electrode active materials.

The negative-electrode active material for use in negative electrode [8] in a lithium secondary battery of the invention may comprise two or more negative-electrode active materials differing in Raman R value as determined by argon ion laser Raman spectroscopy. This negative-electrode active material can improve low-temperature output while maintaining cycle characteristics. The difference in Raman R value is generally 0.1 or larger, preferably 0.2 or larger, more preferably 0.3 or larger. The upper limit thereof is generally 1.4 or smaller, preferably 1.3 or smaller, more preferably 1.2 or smaller. When the difference therein is smaller than the lower limit of that range, there are cases where the effect to be produced by a difference in Raman R value is difficult to obtain. On the other hand, when the difference therein exceeds the upper limit of that range, there are cases where irreversible capacity increases due to the part having a higher Raman R value.

In this invention, the examination for a Raman spectrum is made with a Raman spectrometer (e.g., a Raman spectrometer manufactured by Japan Spectroscopic Co., Ltd.). In the examination, a sample is charged into a measuring cell by causing the sample to fall naturally into the cell and the surface of the sample in the cell is irradiated with argon ion laser light while rotating the cell in a plane perpendicular to the laser light. The Raman spectrum obtained is examined for the intensity $I_A$ of a peak $P_A$ at 1,580 cm$^{-1}$ and the intensity $I_B$ of a peak $P_B$ at 1,360 cm$^{-1}$. The ratio between these intensities R ($R=I_B/I_A$) is calculated and this ratio is defined as the Raman R value of the graphitic carbon particles. Furthermore, the half-value width of the peak $P_A$ at 1,580 cm$^{-1}$ in the Raman spectrum obtained is measured, and this value is defined as the Raman half-value width of the graphitic carbon particles.

Conditions for this Raman spectroscopy are as follows.
Wavelength of argon ion laser: 514.5 nm
Laser power on sample: 15-25 mW
Resolution: 10-20 cm$^{-1}$
Examination range: 1,100 cm$^{-1}$ to 1,730 cm$^{-1}$
Analysis for Raman R value and Raman half-value width: background processing
Smoothing: simple average; convolution, 5 points The Raman half-value width at 1,580 cm$^{-1}$ of the negative-electrode active materials for use as the negative-electrode active material of negative electrode [8] in a lithium secondary battery of the invention is not particularly limited. However, the half-value width thereof is generally 10 cm$^{-1}$ or larger, preferably 15 cm$^{-1}$ or larger. The upper limit thereof is generally 150 cm$^{-1}$ or smaller, preferably 140 cm$^{-1}$ or smaller. In case where the Raman half-value width thereof is smaller than the lower limit of that range, the surface of such particles has too high crystallinity and there are cases where low-temperature output decreases. On the other hand, in case where the Raman half-value width thereof exceeds the upper limit of that range, the surface of such particles has reduced crystallinity and, hence, there area cases where irreversible capacity increases.

The negative-electrode active material to be used in negative electrode [8] in a lithium secondary battery of the invention may comprise two or more negative-electrode active materials differing in crystallinity. This negative-electrode active material also can improve low-temperature output while maintaining cycle characteristics. The term crystallinity herein means a multilayer structure such as the repeating-structure thickness of superposed carbon-hexagonal planar structures, spacing thereof, etc. Although there are no particular limitations on specific properties usable for indicating a difference in crystallinity, the properties include interplanar spacing, crystallite size, and the like. It is preferred that the two or more negative-electrode active materials to be used in a lithium secondary battery of the invention should differ in any of these properties. When the difference in crystallinity is too small, there are cases where the effect to be produced by the mixing is difficult to obtain.

The negative-electrode active material to be used in negative electrode [8] in a lithium secondary battery of the invention may comprise two or more negative-electrode active materials differing in interplanar spacing (d002) for the (002) planes as determined by wide-angle X-ray diffractometry. This negative-electrode active material can improve low-temperature output while maintaining cycle characteristics. The difference in interplanar spacing (d002) is generally 0.0005 nm or larger, preferably 0.001 nm or larger, more preferably 0.003 nm or larger, even more preferably 0.004 nm or larger. The upper limit thereof is generally 0.05 or smaller, preferably 0.04 or smaller, more preferably 0.03 nm or smaller, even more preferably 0.02 or smaller. When the difference therein is smaller than the lower limit of that range, there are cases where the effect to be produced by a difference in crystallinity is difficult to obtain. On the other hand, when the difference therein exceeds the upper limit of that range, there are cases where irreversible capacity increases due to the part having lower crystallinity. The term "interplanar spacing (d002) for the (002) planes as determined by wide-angle X-ray diffractometry" in the invention means the value of d (interplanar spacing) for the lattice planes (002) as determined by X-ray diffractometry in accordance with the method of the Japan Society for Promotion of Scientific Research.

The negative-electrode active material to be used in negative electrode [8] in a lithium secondary battery of the invention may comprise two or more negative-electrode active materials differing in crystallite size (Lc) as determined by X-ray diffractometry in accordance with the method of the Japan Society for Promotion of Scientific Research. This negative-electrode active material can improve low-temperature output while maintaining cycle characteristics. The difference in crystallite size (Lc) as determined by X-ray diffractometry in accordance with the method of the Japan Society for Promotion of Scientific Research is generally 1 nm or larger, preferably 10 nm or larger, more preferably 50 nm or larger. When the difference therein is smaller than the lower limit of that range, there are cases where the effect to be produced by a difference in crystallite size is difficult to obtain.

The negative-electrode active material to be used in negative electrode [8] in a lithium secondary battery of the invention may comprise two or more negative-electrode active materials differing in true density. This negative-electrode active material also can improve low-temperature output while maintaining cycle characteristics. The difference in true density is generally 0.03 g/cm$^3$ or larger, preferably 0.05 g/cm$^3$ or larger, more preferably 0.1 g/cm$^3$ or larger, even more preferably 0.2 g/cm$^3$ or larger. The upper limit thereof is generally 0.7 g/cm$^3$ or smaller, preferably 0.5 g/cm$^3$ or smaller, more preferably 0.4 g/cm$^3$ or smaller. When the difference therein is smaller than the lower limit of that range, there are cases where the effect to be produced by a difference in true density is difficult to obtain. On the other hand, when the difference therein exceeds the upper limit of that range, there are cases where irreversible capacity increase due to the part having a lower true density.

True density in the invention is defined as one determined by the liquid-phase displacement method (pycnometer method) using butanol.

The negative-electrode active material to be used in this invention may comprise two or more negative-electrode active materials differing in roundness. This negative-electrode active material also can improve cycle characteristics while maintaining low-temperature output. The difference in roundness is generally 0.01 or larger, preferably 0.02 or larger, more preferably 0.03 or larger. The upper limit thereof is generally 0.3 or smaller, preferably 0.2 or smaller, more preferably 0.1 or smaller. When the difference therein is smaller than the lower limit of that range, there are cases where the effect to be produced by a difference in roundness is difficult to obtain. On the other hand, when the difference therein exceeds the upper limit of that range, there are cases where the part having a lower roundness poses a problem, for example, that streak lines generate in electrode formation.

Roundness in the invention is defined by the following equation.

$$\text{Roundness} = \frac{\text{length of periphery of equivalent circle having the same area as projected particle shape}}{\text{actual length of periphery of projected particle shape}}$$

The value of roundness is determined with a flow type particle image analyzer (e.g., FPIA, manufactured by Sysmex Industrial Corp.) by dispersing about 0.2 g of a sample in a 0.2% by mass aqueous solution (about 50 mL) of poly(oxyethylene(20)) sorbitan monolaurate as a surfactant, propagating an ultrasonic wave of 28 kHz to the dispersion for 1 minute at an output of 60 W, and then examining particles having a particle diameter in the range of 3-40 μm with the analyzer having a detection range set at 0.6-400 μm.

The negative-electrode active material to be used in negative electrode [8] in a lithium secondary battery of the invention may comprise two or more negative-electrode active materials differing in tap density. This negative-electrode active material also can improve cycle characteristics while maintaining low-temperature output. The difference in tap density is generally 0.1 g/cm$^3$ or larger, preferably 0.2 g/cm$^3$ or larger, more preferably 0.3 g/cm$^3$ or larger. When the difference therein is smaller than the lower limit of that range, there are cases where the effect to be produced by the mixing of materials differing in tap density is difficult to obtain.

In the invention, the tap density of a sample is determined by dropping the sample through a sieve having an opening size of 300 μm into a 20-cm$^3$ tapping cell to fill the cell with the sample up to the brim, subsequently conducting tapping operations 1,000 times over a stroke length of 10 mm using a powder densimeter (e.g., Tap Denser, manufactured by Seishin Enterprise Co., Ltd.), and determining a density from the resultant volume of the sample and the weight thereof. This density is defined as the tap density.

The negative-electrode active material to be used in negative electrode [8] in a lithium secondary battery of the invention may comprise two or more negative-electrode active materials differing in BET specific surface area. This negative-electrode active material also can improve low-temperature output while maintaining cycle characteristics. The difference in BET specific surface area is generally 0.1 m$^2$/g or larger, preferably 0.5 m$^2$/g or larger, more preferably 1 m$^2$/g or larger. The upper limit thereof is generally 20 m$^2$/g or smaller, preferably 15 m$^2$/g or smaller, more preferably 12 m$^2$/g or smaller. When the difference therein is smaller than the lower limit of that range, there are cases where the effect to be produced by the mixing of materials differing in BET specific surface area is difficult to obtain. On the other hand, when the difference therein exceeds the upper limit of that range, there are cases where irreversible capacity increases due to the part having a larger BET specific surface area.

In the invention, BET specific surface area is defined as a value measured with a surface area meter (a fully automatic surface area measuring apparatus manufactured by Ohukura Riken Co., Ltd.) by preliminarily drying a sample at 350° C. for 15 minutes in a nitrogen stream and then measuring the specific surface area thereof by the gas-flowing nitrogen adsorption BET one-point method using a nitrogen/helium mixture gas precisely regulated so as to have a nitrogen pressure of 0.3 relative to atmosphere pressure.

With respect to the mixing ratio between the two or more different negative-electrode active materials for use in negative electrode [8] in a lithium secondary battery of the invention, the proportion of one negative-electrode active material is generally 0.1% by mass or higher, preferably 1% by mass or higher, more preferably 10% by mass or higher, even more preferably 20% by mass or higher, based on all negative-electrode active materials. The upper limit thereof is generally 99.9% by mass or lower, preferably 99% by mass or lower, more preferably 90% by mass or lower, even more preferably 80% by mass or lower. When the proportion thereof is outside the range, there are cases where the effect to be produced by the mixing of two or more different negative-electrode active materials is difficult to obtain.

From the standpoint of high cost performance, it is preferred that at least one of the two different negative-electrode active materials in each of those embodiments should comprise a natural graphite and/or a product of processing of a natural graphite.

Natural graphites are classified into flake graphite, crystalline (vein) graphite, and amorphous graphite according to properties (see "Graphite" in *Funrūtai Purosesu Gijutsu Sh ūsei* (published by Industrial Technology Center in 1974); and *HANDBOOK OF CARBON, GRAPHITE, DIAMOND AND FULLERENES* (published by Noyes Publications)). With respect to the degree of graphitization, crystalline graphite has a highest graphitization degree of 100% and flake graphite is second, which has a graphitization degree as high as 99.9%. However, the graphitization degree of amorphous graphite is as low as 28%. Flake graphite, among such natural graphites, occurs in Madagascar, China, Brazil, Ukraine, Canada, etc. Crystalline graphite occurs mainly in Sri Lanka. Amorphous graphite occurs mainly in the Korean Peninsula, China, Mexico, etc. Of these natural graphites, amorphous graphite generally has a small particle diameter and a low purity. In contrast, flake graphite and crystalline graphite have advantages such as a high degree of graphitization and a low impurity content, and can hence be advantageously used in the invention.

[Negative Electrode [8]: Difference in Treatment]

The negative-electrode active material for use in this invention may comprise two or more negative-electrode active materials differing in processing or treatment. This negative-electrode active material also can improve low-temperature output while maintaining cycle characteristics. Examples of methods for processing a natural graphite include a method in which the graphite is subjected to a heat treatment and a treatment in which mechanical energy is applied to the graphite. One example of the heat treatment is shown below.

[[Heat Treatment Temperature]]

The temperature in a heat treatment for producing the negative-electrode active material is generally 600° C. or higher, preferably 1, 200° C. or higher, more preferably 2,000° C. or higher, even more preferably 2,500° C. or higher, especially preferably 2, 800° C. or higher. The upper limit thereof is generally 3, 200° C. or lower, preferably 3,100° C. or lower. When the temperature conditions are lower than the lower limit of that range, there are cases where the surface of the natural-graphite particles does not undergo a sufficient crystal repair. On the other hand, when the temperature exceeds the upper limit of that range, there are cases where graphite sublimation is apt to occur in an increased amount. It is also preferred that the negative-electrode active material for use in this invention should comprise two or more negative-electrode active materials differing in heat treatment temperature.

[[Method of Heat Treatment]]

The heat treatment is accomplished by heating the natural graphite once to a temperature in that range. Although the holding time period in which the temperature conditions are kept in that range is not particularly limited, it generally is longer than 10 seconds and is not longer than 168 hours.

In general, the heat treatment is conducted in an inert gas atmosphere, e.g., nitrogen gas, or in a non-oxidizing atmosphere formed by the gas generated from the raw natural graphite. It is, however, noted that in a furnace of the type in which the raw material is buried in a breeze (fine carbon powder obtained by pitch heat-treating), there are cases where the atmosphere in an initial stage is a mixture with the air. In such cases, it is not always necessary to use a completely inert gas atmosphere. Apparatus usable for the heat treatment are not particularly limited. For example, use can be made of a shuttle furnace, tunnel kiln, electric furnace, Riedhammer furnace, rotary kiln, direct voltage application type electric furnace, Acheson furnace, resistance heating furnace, induction heating furnace, or the like. It is also preferred that the negative-electrode active material for use in this invention should comprise two or more negative-electrode active materials differing in heat treatment method.

Besides the treatments described above, various treatments including classification can be conducted. Classification is a treatment for removing coarse particles and fine particles in order to obtain a target particle diameter. Apparatus usable for the classification are not particularly limited.

However, in the case of dry sieving, use can be made of a rotary sieve, swing sieve, revolving sieve, vibrating sieve, or the like. In the case of dry air classification, use can be made of a gravitational classifier, inertial classifier, or centrifugal classifier (e.g., classifier or cyclone). In the case of wet sieving, use can be made of a mechanical wet classifier, hydraulic classifier, sedimentation classifier, centrifugal wet classifier, or the like. Classification may be conducted before the heat treatment or may be conducted in another timing, e.g., after the heat treatment. It is also possible to omit the classification treatment itself. It is also preferred that the negative-electrode active material for use in this invention should comprise two or more negative-electrode active materials differing in classification treatment conditions.

The negative-electrode active material for use in this invention may comprise two or more negative-electrode active materials differing in mechanical energy treatment, which will be described below. This negative-electrode active material also can improve low-temperature output while maintaining cycle characteristics. One example of the mechanical energy treatment is shown below.

[[Mechanical Energy Treatment]]

The mechanical energy treatment is conducted so that the ratio between the volume-average particle diameters before and after the treatment becomes 1 or less. The term "ratio between the volume-average particle diameters before and after the treatment" means a value obtained by dividing the volume-average particle diameter as measured after the treatment by the volume-average particle diameter as measured before the treatment. In the mechanical energy treatment in the invention for producing a raw material before heat treatment, it is preferred to conduct the mechanical energy treatment so that the ratio between the average particle diameters before and after this treatment becomes 1 or less. The mechanical energy treatment is performed for the purposes of reducing the size of the powder particles to 1 or less in terms of the ratio between the average particle diameters before and after the treatment and simultaneously regulating the particle shape. This mechanical energy treatment belongs to the pulverization treatment among engineering unit operations utilizable for particle design, such as pulverization, classification, mixing, granulation, surface modification, and reaction.

Pulverization means an operation in which a force is applied to a substance to thereby reduce the size thereof and regulate the particle diameter, particle size distribution, and loading of the substance. Pulverization treatments are classified according to the kind of force to be applied to the substance and the method of treatment. Forces to be applied to the substance are roughly divided into the following four: (1) breaking force (impact force), (2) crushing force (compressive force), (3) milling force (grinding force), and (4) scraping force (shear force). On the other hand, treatment methods are roughly divided into the following two: volume pulverization in which cracks are generated and propagated in inner parts of the particles; and surface pulverization in which surface parts of the particles are scraped off. Volume pulverization proceeds by means of impact force, compressive force, and shear force, while surface pulverization proceeds by means of grinding force and shear force. Pulverization is a treatment based on any of various combinations of such kinds of forces to be applied to a substance and such treatment methods. A suitable combination can be determined according to the purpose of the treatment.

There are cases where pulverization is conducted by a chemical reaction, e.g., explosion, or by volume expansion. However, pulverization is generally conducted with a mechanical apparatus such as a pulverizer. It is preferred that the pulverization treatment to be used for producing a rounded carbonaceous substance as a raw material in the invention should be a treatment which finally involves a high proportion of surface treatment, regardless of whether volume pulverization occurs or not. This is because surface pulverization is important for eliminating angles of the surface-pulverized particles and thereby imparting roundness to the particle shape. Specifically, use may be made of a method in which surface treatment is conducted after volume pulverization has proceeded to some degree or a method in which surface treatment only is conducted almost without conducting volume pulverization. Furthermore, volume pulverization and surface treatment may be simultaneously conducted. It is preferred to conduct a pulverization treatment in which surface pulverization proceeds finally and angles are eliminated from the surface of the particles. The negative-electrode active material for use in this invention may comprise two or more negative-electrode active materials differing in the degree of such a surface treatment. This negative-electrode active material also can improve low-temperature output while maintaining cycle characteristics.

The apparatus to be used for conducting the mechanical energy treatment is selected from ones usable for conducting the preferred treatment described above. The mechanical energy treatment may be accomplished with one or more of the four kinds of forces applicable to a substance. However, it is preferred and effective to repeatedly apply impact force as a main force and other mechanical actions such as compressive, frictional, shear, and other forces, including those caused by particle interaction, to the particles. Consequently, a preferred apparatus specifically is one which comprises a casing and disposed therein a rotor having many blades and in which the rotor is rotated at a high speed to thereby apply mechanical actions such as impact, compressive, frictional, and shear forces to a carbon material introduced therein and conduct surface treatment while allowing volume pulverization to proceed. More preferred is one which has a mechanism in which a carbonaceous substance is circulated to thereby repeatedly apply mechanical actions thereto.

Examples of the preferred apparatus include Hybridization System (manufactured by Nara Machinery Co., Ltd.), Kryptron (manufactured by Earth Technica Co., Ltd.), CF Mill (manufactured by Ube Industries, Ltd.), and Mechanofusion System (manufactured by Hosokawa Micron Corp.). Preferred of these is Hybridization System, manufactured by Nara Machinery Co., Ltd. In the case where the treatment is conducted with this apparatus, the rotor is rotated at a peripheral speed of preferably 30-100 m/sec, more preferably 40-100 m/sec, even more preferably 50-100 m/sec. Although a carbonaceous substance can be treated by merely passing it through the apparatus, it is preferred to treat the carbonaceous substance while causing it to circulate or reside in the apparatus for seconds or longer. More preferably, the carbonaceous substance is treated while circulating or residing in the apparatus for 1 minute or longer.

Through such mechanical energy treatment, the carbon particles become particles in which only parts near the surface are rough and which have exposed strains and edge faces, while retaining high crystallinity as a whole. Thus, the carbon particles come to have an increased amount of surfaces where lithium ions can come in and out, and hence have a high capacity even at a high current density.

In general, flaky, crystalline, and platy carbon materials tend to become poorer in suitability for loading as the particle diameter decreases. It is thought that as a result of pulverization, the particles come to have more irregular shapes, have a larger amount of surface projections such as "fine splits", "half-peeled parts", and "bent parts", and have finer particles of irregular shapes adherent to the particle surface at some degree of strength. The impaired suitability for loading is thought to be attributable to increased resistance between adjacent particles due to such causes. As long as such shape irregularity is reduced and the particle shape becomes close to sphere, a decrease in particle diameter should result in a limited decrease in loading and large-diameter carbon particles and small-diameter carbon particles should have almost the same tap density.

The proportion of the natural graphite and/or product of processing of a natural graphite is generally 0.1% by mass or higher, preferably 1% by mass or higher, more preferably 10% by mass or higher, even more preferably 20% by mass or higher. The upper limit thereof is generally 99.9% by mass or lower, preferably 99% by mass or lower, more preferably 90% by mass or lower, even more preferably 80% by mass or lower. When the proportion thereof is lower than the lower limit of that range, there are cases where the addition of the natural graphite and/or product of processing of a natural graphite is less apt to attain an improvement in cost performance. On the other hand, when the proportion thereof exceeds the upper limit of that range, there are cases where the improving effect of different negative-electrode active materials is difficult to obtain.

[[Pore Volume, etc.]]

With respect to the pore volume of the negative-electrode active materials for use as the negative-electrode active material of a lithium secondary battery of the invention, the amount of interstices corresponding to a pore diameter of from 0.01 μm to 1 μm which include pores in the particles and particle surface irregularities formed by steps, as determined by mercury porosimetry (mercury intrusion method) (hereinafter abbreviated to "pore volume"), is generally 0.01 mL/g or larger, preferably 0.05 mL/g or larger, more preferably 0.1 mL/g or larger. The upper limit thereof is generally 0.6 mL/g or smaller, preferably 0.4 mL/g or smaller, more preferably 0.3 mL/g or smaller. When the amount of interstices therein is larger than the upper limit of that range, there are cases where a large amount of a binder is necessary in electrode plate formation. When the amount thereof is smaller than the lower limit, there are cases where high-current-density charge/discharge characteristics decrease and the effect of diminishing electrode expansion/contraction during charge/discharge is not obtained.

The total pore volume is preferably 0.1 mL/g or larger, more preferably 0.25 mL/g or larger. The upper limit thereof is generally 10 mL/g or smaller, preferably 5 mL/g or smaller, more preferably 2 mL/g or smaller. When the total pore volume exceeds the upper limit of that range, there are cases where a large amount of a binder is necessary in electrode plate formation. When the total pore volume is smaller than the lower limit, there are cases where the dispersing effect of a thickener or binder in electrode plate formation is not obtained.

The average pore diameter of this negative-electrode active material is preferably 0.05 μm or larger, more preferably 0.1 μm or larger, even more preferably 0.5 μm or larger. The upper limit thereof is generally 50 μm or smaller, preferably 20 μm or smaller, more preferably 10 μm or smaller. When the average pore diameter thereof exceeds the upper limit of that range, there are cases where a large amount of a binder is necessary. When the average pore diameter thereof is smaller than the lower limit, there are cases where high-current-density charge/discharge characteristics decrease.

As an apparatus for the mercury porosimetry is used a mercury porosimeter (Autopore 9520, manufactured by Micromeritics Corp.). About 0.2 g of a sample (negative-electrode material) is weighed out and placed in a powder cell and this cell is closed. The sample in the cell is pretreated by degassing it at room temperature under vacuum (50 μmHg or lower) for 10 minutes. Subsequently, the pressure in the cell is reduced to 4 psia (about 28 kPa) and mercury is introduced thereinto. The internal pressure is stepwise elevated from 4 psia (about 28 kPa) to 40,000 psia (about 280 MPa) and then lowered to 25 psia (about 170 kPa). The number of steps in the pressure elevation is 80 or larger. In each step, the amount of mercury intruded is measured after an equilibrium time of 10 seconds. A pore distribution is calculated from the mercury intrusion curve thus obtained, using the Washburn equation. For the calculation, the surface tension ($\gamma$) and contact angle ($\psi$) of mercury are taken as 485 dyne/cm and 140°, respectively. The average pore diameter used is the pore diameter corresponding to a cumulative pore volume of 50%.

[[Ash Content]]

The ash content of this negative-electrode active material for a lithium secondary battery of the invention is preferably 1% by mass or lower, more preferably 0.5% by mass or lower, especially preferably 0.1% by mass or lower, based on the whole graphitic carbon particles. The lower limit of the ash content thereof is preferably at least 1 ppm. When the ash content thereof exceeds the upper limit of that range, there are cases where battery performance deterioration caused by reaction with the nonaqueous electrolyte during charge/discharge becomes not negligible. On the other hand, when the ash content thereof is lower than the lower limit of that range, there are cases where the production of this active material necessitates much time and energy and an apparatus for pollution prevention, resulting in an increase in cost.

[[Orientation Ratio]]

The orientation ratio of the graphitic carbon particles for use as the negative-electrode active material in a lithium secondary battery of the invention is generally 0.005 or higher, preferably 0.01 or higher, more preferably 0.015 or higher. The upper limit thereof is theoretically 0.67 or lower. When the orientation ratio thereof is lower than the lower limit of that range, there are cases where high-density charge/discharge characteristics decrease.

Orientation ratio is determined by X-ray diffractometry. The peaks attributable to the (110) diffraction and (004) diffraction of the carbon obtained by X-ray diffractometry are subjected to peak separation by fitting with asymmetric Pearson VII as a profile function. Thus, the integrated intensities of the (110) diffraction and (004) diffraction peaks are calculated. From the integrated intensities obtained, the ratio represented by (integrated intensity of (110) diffraction)/(integrated intensity of (004) diffraction) is calculated. This ratio is defined as the orientation ratio of the active material.

Conditions for this X-ray diffractometry are as follows. Incidentally, "$2\theta$" represents diffraction angle.
Target: Cu(K$\alpha$ line) graphite monochromator
Slit:
    Divergence slit=1 degree
    Receiving slit=0.1 mm
    Scattering slit=1 degree Examination range and step angle/measuring time:
- (110) plane: 76.5°≤2θ≤78.5° 0.01°/3 sec
- (004) plane: 53.5°≤2θ≤56.0° 0.01°/3 sec

[[Aspect Ratio]]

The aspect ratio of the graphitic carbon particles for use as the negative-electrode active material in a lithium secondary battery of the invention is theoretically 1 or higher. The upper limit thereof is generally 10 or lower, preferably 8 or lower, more preferably 5 or lower. When the aspect ratio thereof exceeds the upper limit, there are cases where this graphitic material causes streak lines in electrode plate formation and an even coating surface cannot be obtained, resulting in a decrease in high-current-density charge/discharge characteristics.

The aspect ratio of a particle is represented by A/B, wherein A is the length of the longest axis of the particle in a three-dimensional examination and B is the length of the shortest axis perpendicular to that axis. The examination of particles is made with a scanning electron microscope capable of enlargement examination. Fifty are arbitrarily selected from graphite particles fixed to an edge face of a metal having a thickness of 50 μm or smaller, and each particle is examined for A and B while rotating or inclining the stage to which the sample is fixed. The average of the A/B values is determined.

The lithium secondary battery of the invention having negative electrode [8] is not particularly limited in the kinds of negative-electrode active materials as long as the negative electrode contains two or more negative-electrode active materials differing in property. However, the following should be noted. With respect to properties determined by X-ray diffractometry, such as interplanar spacing (d002), crystallite size (Lc), orientation ratio, and electrode plate orientation ratio, properties relating to a Raman spectrum, such as Raman R value and Raman half-value width, and ash content, those numerical values are for carbonaceous substances. Consequently, those numerical-value differences are applied to carbonaceous substances. On the other hand, with respect to properties relating to a particle size distribution, such as median diameter, mode diameter, and Z, BET specific surface area, properties determined by mercury porosimetry, such as pore volume, total pore volume, and average pore diameter, true density, roundness, tap density, and aspect ratio, those numerical values are not only for carbonaceous substances but for all substances usable as negative-electrode active materials. Those numerical-value differences are hence applied to all such substances. However, it is preferred that the substances having such two kinds of properties should be carbonaceous substances. In this case, the numerical values each are regarded as a value showing the property of carbonaceous substances and it is preferred to use two or more carbonaceous substances differing in this property as negative-electrode active materials.

[Negative Electrode [8]: Method of Mixing Two or More Negative-Electrode Active Materials]

Apparatus usable for mixing two or more negative-electrode active materials are not particularly limited. Examples thereof include twin-cylinder mixers, W-shaped mixers, change-can mixers, kneaders, drum mixers, and shearing mixers.

[Negative Electrode [8]: Electrode Production]

Negative electrode [8] may be produced by an ordinary method. It can be formed in the same manner as described above. The current collector, thickness ratio between the current collector and the active-material layer, electrode density, binder, electrode-plate orientation ratio, impedance, etc. also are the same as described above.

<Negative Electrodes [9] and [10]>

An explanation will be given below on negative electrode [9] (embodiment A) for use in a lithium secondary battery of the invention, i.e., "a negative electrode containing a negative-electrode active material which has a tap density of 0.1 g/cm$^3$ or higher and has a pore volume, in terms of the volume of particle pores corresponding to the diameter range of from 0.01 μm to 1 μm as determined by mercury porosimetry, of 0.01 mL/g or larger", and on negative electrode [10] (embodiment B) for use in a lithium secondary battery of the invention, i.e., "a negative electrode which, when charged to 60% of a nominal capacity, has a reaction resistance in a negative-electrode opposing cell of 500Ω or lower".

<<With Respect to Negative Electrode [9] (Embodiment A)>>

Embodiment A of the invention is one in which the negative electrode used in this invention is specified by properties of the negative-electrode active material to be contained therein. Namely, this embodiment relates to a lithium secondary battery having a nonaqueous electrolyte containing the specific compound shown above and a negative electrode containing a negative-electrode active material having the specific properties described below. Embodiment A of the invention is described below.

[Negative Electrode [9]: Negative-Electrode Active Material]

The negative-electrode active material in embodiment A of the invention is one which is capable of electrochemically occluding/releasing lithium ions and satisfies at least the following requirements (a) and (b).

(a) The tap density is 0.1 g/cm$^3$ or higher.
(b) The volume of pores in the range of from 0.01 μm to 1 μm as determined by mercury porosimetry is 0.01 mL/g or larger.

[[Tap Density]]

The tap density of the negative-electrode active material to be contained in negative electrode [9] in a lithium secondary battery of the invention is preferably 0.1 g/cm$^3$ or higher, more preferably 0.5 g/cm$^3$ or higher, even more preferably 0.7 g/cm$^3$ or higher, especially preferably 0.9 g/cm$^3$ or higher. The upper limit thereof is preferably 2 g/cm$^3$ or lower, more preferably 1.8 g/cm$^3$ or lower, especially preferably 1.6 g/cm$^3$ or lower. In case where the tap density thereof is lower than the lower limit of that range, the effect of attaining, in particular, high output is not attained. On the other hand, in case where the tap density thereof exceeds the upper limit of that range, the electrode has too small an amount of interparticle interstices and a reduced amount of channels for the nonaqueous electrolyte. There are hence cases where output itself decreases.

In the invention, the tap density of a sample is determined by dropping the sample through a sieve having an opening size of 300 μm into a 20-cm$^3$ tapping cell to fill the cell with the sample up to the brim, subsequently conducting tapping operations 1,000 times over a stroke length of 10 mm using a powder densimeter (e.g., Tap Denser, manufactured by Seishin Enterprise Co., Ltd.), and determining a density from the resultant volume of the sample and the weight thereof. This density is defined as the tap density.

[[Pore Volume]]

With respect to the pore volume of the negative-electrode active material to be contained in negative electrode [9] in a lithium secondary battery of the invention, the amount of interstices corresponding to a pore diameter of from 0.01 μm to 1 µm which include pores in the particles and particle surface irregularities formed by steps, as determined by mercury porosimetry (mercury intrusion method) (hereinafter abbreviated to "pore volume"), may be 0.01 mL/g or larger and is preferably 0.05 mL/g or larger, more preferably 0.1 mL/g or larger. The upper limit thereof is generally 0.6 mL/g or smaller, preferably 0.4 mL/g or smaller, more preferably 0.3 mL/g or smaller. When the amount of interstices therein is larger than the upper limit of that range, there are cases where a large amount of a binder is necessary in electrode plate formation. On the other hand, when the amount thereof is smaller than the lower limit of that range, it is impossible to attain long life and high output.

The total pore volume is preferably 0.1 mL/g or larger, more preferably 0.25 mL/g or larger, even more preferably 0.4 mL/g or larger. The upper limit thereof is generally 10 mL/g or smaller, preferably 5 mL/g or smaller, more preferably 2 mL/g or smaller. When the total pore volume exceeds the upper limit of that range, there are cases where a large amount of a binder is necessary in electrode plate formation. When the total pore volume is smaller than the lower limit, there are cases where the dispersing effect of a thickener or binder in electrode plate formation is not obtained. The term "total pore volume" herein means the sum of pore volumes measured in the whole range under the following examination conditions.

The average pore diameter of the negative-electrode active material is preferably 0.05 µm or larger, more preferably 0.1 µm or larger, even more preferably 0.5 µm or larger. The upper limit thereof is generally 50 µm or smaller, preferably 20 µm or smaller, more preferably 10 µm or smaller. When the average pore diameter thereof exceeds the upper limit of that range, there are cases where a large amount of a binder is necessary. When the average pore diameter thereof is smaller than the lower limit, there are cases where high-current-density charge/discharge characteristics decrease.

As an apparatus for the mercury porosimetry is used a mercury porosimeter (Autopore 9520, manufactured by Micromeritics Corp.). About 0.2 g of a sample (negative-electrode material) is weighed out and placed in a powder cell and this cell is closed. The sample in the cell is pretreated by degassing it at room temperature under vacuum (50 µmHg or lower) for 10 minutes. Subsequently, the pressure in the cell is reduced to 4 psia (about 28 kPa) and mercury is introduced thereinto. The internal pressure is stepwise elevated from 4 psia (about 28 kPa) to 40,000 psia (about 280 MPa) and then lowered to 25 psia (about 170 kPa). The number of steps in the pressure elevation is 80 or larger. In each step, the amount of mercury intruded is measured after an equilibrium time of 10 seconds. A pore distribution is calculated from the mercury intrusion curve thus obtained, using the Washburn equation. For the calculation, the surface tension (γ) and contact angle (ψ) of mercury are taken as 485 dyne/cm and 140°, respectively. The average pore diameter used is the pore diameter corresponding to a cumulative pore volume of 50%.

The lithium secondary battery as embodiment A of the invention can produce the effects of the invention described above and sufficiently exhibit its performances, as long as the negative-electrode active material satisfies requirements (a) and (b) described above. It is, however, preferred that the negative-electrode active material should further satisfy any one of the following items concerning properties or simultaneously satisfy two or more thereof. With respect to this negative electrode, it is especially preferred that it should satisfy any one of or simultaneously satisfy two or more of the items concerning the properties or constitution of the negative electrode in embodiment B, which will be described later.

[[BET Specific Surface Area]]

The specific surface area of the negative-electrode active material to be contained in negative electrode [9] in a lithium secondary battery of the invention, as determined by the BET method, is preferably 0.1 $m^2/g$ or larger, especially preferably 0.7 $m^2/g$ or larger, more preferably 1 $m^2/g$ or larger, even more preferably 1.5 $m^2/g$ or larger. The upper limit thereof is preferably 100 $m^2/g$ or smaller, especially preferably 50 $m^2/g$ or smaller, more preferably 25 $m^2/g$ or smaller, even more preferably 15 $m^2/g$ or smaller. When the BET specific surface area thereof is smaller than the lower limit of that range, there are cases where use of this negative-electrode material is apt to result in poor lithium acceptance during charge and in lithium deposition on the electrode surface. There also are cases where high output is not obtained. On the other hand, when the specific surface area thereof exceeds the upper limit of that range, there are cases where use of this negative-electrode material is apt to result in enhanced reactivity with the nonaqueous electrolyte and enhanced gas evolution and a preferred battery is difficult to obtain.

BET specific surface area is defined as a value measured with a surface area meter (e.g., a fully automatic surface area measuring apparatus manufactured by Ohukura Riken Co., Ltd.) by preliminarily drying a sample at 350° C. for 15 minutes in a nitrogen stream and then measuring the specific surface area thereof by the gas-flowing nitrogen adsorption BET one-point method using a nitrogen/helium mixture gas precisely regulated so as to have a nitrogen pressure of 0.3 relative to atmosphere pressure.

[[Volume-Average Particle Diameter]]

The volume-average particle diameter of the negative-electrode active material to be contained in negative electrode [9] in a lithium secondary battery of the invention, which is defined as the volume-average particle diameter (median diameter) as determined by the laser diffraction/scattering method, is preferably 1 µm or larger, especially preferably 3 µm or larger, more preferably 5 µm or larger, even more preferably 7 µm or larger. The upper limit thereof is generally 50 µm or smaller, preferably 40 jam or smaller, more preferably 30 µm or smaller, even more preferably 25 µm or smaller. When the volume-average particle diameter thereof is smaller than the lower limit of that range, there are cases where irreversible capacity increases, leading to a loss in initial battery capacity. When the volume-average particle diameter thereof exceeds the upper limit of that range, there are cases where such a negative-electrode active material is undesirable from the standpoint of battery production because an uneven coating surface is apt to result when an electrode plate is produced.

Volume-average particle diameter in the invention is defined as the median diameter determined by dispersing the carbon powder in a 0.2% by mass aqueous solution (about 1 mL) of poly(oxyethylene (20)) sorbitan monolaurate as a surfactant and examining the dispersion with a laser diffraction type particle size distribution analyzer (e.g., LA-700, manufactured by HORIBA, Ltd.).

[[Roundness]]

The roundness of the negative-electrode active material to be contained in negative electrode [9] in a lithium secondary battery of the invention is generally 0.1 or higher, preferably 0.5 or higher, more preferably 0.8 or higher, especially preferably 0.85 or higher, even more preferably 0.9 or higher. With respect to the upper limit thereof, a particle having a roundness of 1 theoretically is a true sphere. In case where the roundness thereof is lower than the lower limit of that range, there are cases where this negative-electrode active material poses a problem, for example, that streak lines generate in electrode formation.

In the invention, roundness is defined by the following equation.

Roundness=(length of periphery of equivalent circle having the same area as projected particle shape)/(actual length of periphery of projected particle shape)

The value of roundness is determined, for example, with a flow type particle image analyzer (e.g., FPIA, manufactured by Sysmex Industrial Corp.) by dispersing about 0.2 g of a sample in a 0.2% by mass aqueous solution (about 50 mL) of poly(oxyethylene(20)) sorbitan monolaurate as a surfactant, propagating an ultrasonic wave of 28 kHz to the dispersion for 1 minute at an output of 60 W, subsequently examining particles having a particle diameter in the range of 3-40 μm with the analyzer having a detection range set at 0.6-400 μm, and averaging the measured values.

[[Interplanar Spacing (d002)]]

The interplanar spacing (d002) for the (002) planes of the negative-electrode active material to be contained in negative electrode [9] in a lithium secondary battery of the invention, as determined by wide-angle X-ray diffractometry, is generally 0.38 nm or smaller, preferably 0.36 nm or smaller, more preferably 0.35 nm or smaller, even more preferably 0.345 nm or smaller. The lower limit thereof is at least 0.335 nm, which is a theoretical value for graphites. When the interplanar spacing (d002) thereof exceeds the upper limit of that range, there are cases where this negative-electrode active material has considerably reduced crystallinity, resulting in an increase in irreversible capacity.

The term "interplanar spacing (d002) for the (002) planes as determined by wide-angle X-ray diffractometry" in the invention means the value of d (interplanar spacing) for the lattice planes (002) as determined by X-ray diffractometry in accordance with the method of the Japan Society for Promotion of Scientific Research.

[[Crystallite Size (Lc)]]

The crystallite size (Lc) of the negative-electrode active material, as determined by X-ray diffractometry in accordance with the method of the Japan Society for Promotion of Scientific Research, is not particularly limited. However, it is generally 0.1 nm or larger, preferably 0.5 nm or larger, more preferably 1 nm or larger. In case where the Lc thereof is smaller than the lower limit of that range, there are cases where crystallinity decreases considerably to increase irreversible capacity.

[[True Density]]

The true density of the negative-electrode active material to be contained in negative electrode [9] in a lithium secondary battery of the invention is generally 1.5 g/cm$^3$ or higher, preferably 1.7 g/cm$^3$ or higher, more preferably 1.8 g/cm$^3$ or higher, even more preferably 1.85 g/cm$^3$ or higher. The upper limit thereof may be 2.26 g/cm$^3$ or lower. This upper limit is a theoretical value for graphites. When the true density of the negative-electrode active material is lower than the lower limit of that range, there are cases where this carbon has too low crystallinity, resulting in an increase in irreversible capacity. In the invention, true density is defined as one determined by the liquid-phase displacement method (pycnometer method) using butanol.

[[Raman R Value]]

The Raman R value of the negative-electrode active material to be contained in negative electrode [9] in a lithium secondary battery of the invention is generally 0.01 or higher, preferably 0.03 or higher, more preferably 0.1 or higher. The upper limit thereof is preferably 1.5 or lower, more preferably 1.2 or lower, especially preferably 0.5 or lower. When the Raman R value thereof is lower than the lower limit of that range, the surface of such particles has too high crystallinity and there are cases where the number of charge/discharge sites decreases, resulting in a decrease in output itself. On the other hand, when the Raman R value thereof exceeds the upper limit of that range, the surface of such particles has reduced crystallinity and there are hence cases where irreversible capacity increases.

The examination for a Raman spectrum is made with a Raman spectrometer (e.g., a Raman spectrometer manufactured by Japan Spectroscopic Co., Ltd.). In the examination, a sample is charged into a measuring cell by causing the sample to fall naturally into the cell and the surface of the sample in the cell is irradiated with argon ion laser light while rotating the cell in a plane perpendicular to the laser light. The Raman spectrum obtained is examined for the intensity $I_A$ of a peak $P_A$ at 1,580 cm$^{-1}$ and the intensity $I_B$ of a peak $P_B$ at 1,360 cm$^{-1}$. The ratio between these intensities R ($R=I_B/I_A$) is calculated and this ratio is defined as the Raman R value of the negative-electrode active material. Furthermore, the half-value width of the peak $P_A$ at 1,580 cm$^{-1}$ in the Raman spectrum obtained is measured, and this value is defined as the Raman half-value width of the negative-electrode active material.

Conditions for this Raman spectroscopy are as follows.
Wavelength of argon ion laser: 514.5 nm
Laser power on sample: 15-25 mW
Resolution: 10-20 cm$^{-1}$
Examination range: 1,100 cm$^{-1}$ to 1,730 cm$^{-1}$
Analysis for Raman R value and Raman half-value width: background processing
Smoothing: simple average; convolution, 5 points The Raman half-value width at 1,580 cm$^{-1}$ of the negative-electrode active material to be contained in negative electrode [9] in a lithium secondary battery of the invention is not particularly limited. However, the half-value width thereof is generally 10 cm$^{-1}$ or larger, preferably 15 cm$^{-1}$ or larger. The upper limit thereof is generally 150 cm$^{-1}$ or smaller, preferably 100 cm$^{-1}$ or smaller, more preferably 60 cm$^{-1}$ or smaller. When the Raman half-value width thereof is smaller than the lower limit of that range, the surface of such particles has too high crystallinity and there are cases where the number of charge/discharge sites decreases, resulting in a decrease in output itself. On the other hand, when the Raman half-value width thereof exceeds the upper limit of that range, the surface of such particles has reduced crystallinity and there are hence cases where irreversible capacity increases.

[[Ash Content]]

The ash content of the negative-electrode active material to be contained in negative electrode [9] in a lithium secondary battery of the invention is preferably 1% by mass or lower, more preferably 0.5% by mass or lower, especially preferably 0.1% by mass or lower. The lower limit thereof is preferably 1 ppm or higher. When the ash content thereof exceeds the upper limit of that range, there are cases where battery performance deterioration caused by reaction with the nonaqueous electrolyte during charge/discharge becomes not negligible, resulting in a decrease in capacity retention through cycling. On the other hand, when the ash content thereof is lower than the lower limit of that range, there are cases where the production of this negative-electrode active material necessitates much time and energy and an apparatus for pollution prevention, resulting in an increase in cost.

[[Aspect Ratio]]

The aspect ratio of the negative-electrode active material to be contained in negative electrode [9] in a lithium secondary battery of the invention is theoretically 1 or higher. The upper limit thereof is generally 10 or lower, preferably 8 or lower, more preferably 5 or lower. When the aspect ratio thereof exceeds the upper limit, there are cases where this active material causes streak lines in negative-electrode production and an even coating surface cannot be obtained, resulting in a decrease in high-current-density charge/discharge characteristics.

The aspect ratio of a particle is represented by A/B, wherein A is the length of the longest axis of the particle in a three-dimensional examination and B is the length of the shortest axis perpendicular to that axis. The examination of particles is made with a scanning electron microscope capable of enlargement examination. Fifty are arbitrarily selected from particles fixed to an edge face of a metal having a thickness of 50 μm or smaller, and each particle is examined for A and B while rotating or inclining the stage to which the sample is fixed. The average of the A/B values is determined.

[[Orientation Ratio]]

The orientation ratio of the negative-electrode active material to be contained in negative electrode [9] in a lithium secondary battery of the invention is generally 0.005 or higher, preferably 0.01 or higher, more preferably 0.015 or higher. The upper limit thereof is theoretically 0.67 or lower. When the orientation ratio thereof is lower than the lower limit of that range, there are cases where high-density charge/discharge characteristics decrease.

Orientation ratio is determined by X-ray diffractometry. The peaks attributable to the (110) diffraction and (004) diffraction of the carbon obtained by X-ray diffractometry are subjected to peak separation by fitting with asymmetric Pearson VII as a profile function. Thus, the integrated intensities of the (110) diffraction and (004) diffraction peaks are calculated. From the integrated intensities obtained, the ratio represented by (integrated intensity of (110) diffraction)/(integrated intensity of (004) diffraction) is calculated. This ratio is defined as the orientation ratio of the negative-electrode active material.

Conditions for this X-ray diffractometry are as follows. Incidentally, "2θ" represents diffraction angle.

Target: Cu(Kα line) graphite monochromator
Slit:
  Divergence slit=1 degree
  Receiving slit=0.1 mm
  Scattering slit=1 degree
Examination range and step angle/measuring time:
  (110) plane: 76.5°≤2θ≤78.5° 0.01°/3 sec
  (004) plane: 53.5°≤2θ≤56.0° 0.01°/3 sec

[Negative Electrode [9]: Electrode Production]

The negative electrode may be produced by an ordinary method. It can be formed in the same manner as described above. The current collector, thickness ratio between the current collector and the active-material layer, electrode density, binder, electrode-plate orientation ratio, impedance, etc. also are the same as described above.

<<With Respect to Negative Electrode [10] (Embodiment B)>>

Negative electrode [10] according to the invention (embodiment B) is one in which the negative electrode used in the invention is specified by a property and/or constitution of the negative electrode itself. This embodiment relates to a lithium secondary battery having a nonaqueous electrolyte containing the specific compound shown above and a negative electrode having the specific property and/or constitution shown below. Negative electrode [10] of the invention (embodiment (B)) is described below.

[Negative Electrode [10]: Properties and Constitution of the Negative Electrode]

The properties and constitution of the negative electrode used in the lithium secondary battery as embodiment B are explained below. The negative electrode comprises a current collector and a negative-electrode active-material layer formed thereon.

[[Reaction Resistance]]

The reaction resistance of the negative electrode used in embodiment B of the invention, as determined through an opposing impedance measurement, should be 500Ω or lower and is preferably 100Ω or lower, more preferably 50Ω or lower. There is no particular lower limit thereon. In case where the reaction resistance thereof exceeds the upper limit of that range, this negative electrode gives a lithium secondary battery which shows reduced output characteristics before and after a cycle test. Furthermore, capacity retention through cycling decreases due to the high resistance.

A method for the measurement of opposing impedance is described below. In a general impedance measurement in a lithium secondary battery, the alternating-current impedance between the positive-electrode terminal and negative-electrode terminal of the battery is measured. This method, however, has a drawback that the value measured indicates impedance for the system including both the positive electrode and the negative electrode and whether the impedance is attributable to the resistance of the positive electrode or that of the negative electrode cannot be unconditionally judged. Because of this, the reaction resistance in an opposing cell employing the negative electrode only is measured in the invention. The method of measuring reaction resistance in the invention is described below.

The lithium secondary battery to be examined is one which, when charged at a current at which the nominal capacity can be charged over 5 hours, subsequently kept for 20 minutes in the state of being neither charged nor discharged, and then discharged at a current at which the nominal capacity can be discharged over 1 hour, has a capacity of at least 80% of the nominal capacity. This lithium secondary battery in a discharged state is charged to 60% of the nominal capacity at a current at which the nominal capacity can be charged over 5 hours. Immediately thereafter, the lithium secondary battery is transferred to a gloved box filled with an argon atmosphere. In this gloved box, the lithium secondary battery is rapidly disassembled to take out the negative electrode while preventing the negative electrode from suffering discharge or short-circuiting. In the case where this negative electrode is a double-sided electrode, the electrode active material on one side is stripped off without marring the electrode active material on the other side. Two disks of 12.5 mmφ are punched out of this negative electrode, and are superposed through a separator so that the active-material sides rightly face each other. Sixty microliters of the nonaqueous electrolyte which has been used in the battery is dropped onto the separator and between the two negative electrodes, and the negative electrodes and separator are brought into tight contact with each other. While keeping this assemblage isolated from the surrounding air, the current collectors of the respective negative electrodes are electrically connected to each other and the assemblage is examined by the alternating-current impedance method. In the examination, the complex impedance is measured at a temperature of 25° C. in a frequency region of $10^{-2}$-$10^5$ Hz to determine a Cole-Cole plot. The circular arc for the negative-electrode resistance component in the plot is approximated to a semicircle to determine the reaction resistance (Rct) and the double-layer capacity (Cdl).

The lithium secondary battery as embodiment B of the invention can produce the effects of the invention described above and sufficiently exhibit its performances, as long as the negative electrode satisfies the requirement concerning the reaction resistance of a negative-electrode opposing cell. It is, however, preferred that the negative electrode should further satisfy any one of or simultaneously satisfy two or more of the following items concerning the properties or constitution of the negative electrode. With respect to the negative-electrode active material also, it is especially preferred that it should satisfy any one of or simultaneously satisfy two or more of the items concerning properties of the negative-electrode active material in embodiment A described above.

[[Double-Layer Capacity (Cdl)]]

The double-layer capacity (Cdl) of the negative electrode for use in this invention, as determined through the opposing impedance measurement, is preferably $1\times10^{-6}$ F or higher, especially preferably $1\times10^{-5}$ F or higher, even more preferably $3\times10^{-5}$ F or higher. When the double-layer capacity thereof is lower than the lower limit of that range, this negative electrode has a reduced area available for reaction and there are hence cases where output decreases accordingly.

[[Binder]]

The binder for binding the negative-electrode active material to a current collector is not particularly limited as long as it is a material stable to the nonaqueous electrolyte and the solvent to be used for electrode production. Usable substances, the proportion of the binder to the whole negative-electrode active-material layer, etc. are the same as described above.

[Negative Electrode [10]: Electrode Production]

Negative electrode [10] may be produced by an ordinary method. It can be formed in the same manner as described above. The current collector, thickness ratio between the current collector and the active-material layer, electrode density, binder, electrode-plate orientation ratio, impedance, etc. also are the same as described above.

<Nonaqueous Electrolytic Solution>

The nonaqueous electrolyte to be used in the invention is not particularly limited as long as it comprises an electrolyte (one or more lithium salts), a nonaqueous solvent for dissolving the electrolyte, and the specific compound. However, this nonaqueous electrolyte preferably is one which satisfies any requirement selected from the group consisting of the following electrolyte [1] to electrolyte [9]:

electrolyte [1]: the nonaqueous solvent as a component of the electrolyte is a mixed solvent at least containing ethylene carbonate and the proportion of the ethylene carbonate to the whole nonaqueous solvent is from 1% by volume to 25% by volume;

electrolyte [2]: the nonaqueous solvent as a component of the electrolyte contains at least one asymmetric chain carbonate and the proportion of the asymmetric chain carbonate to the whole nonaqueous solvent is from 5% by volume to 90% by volume;

electrolyte [3]: the nonaqueous solvent as a component of the electrolyte contains at least one chain carboxylic acid ester;

electrolyte [4]: the nonaqueous solvent as a component of the electrolyte contains at least one solvent having a flash point of 70° C. or higher in an amount of 60% by volume or larger based on the whole nonaqueous solvent;

electrolyte [5]: the lithium salts as a component of the electrolyte comprise $LiN(C_nF_{2n+1}SO_2)_2$ (wherein n is an integer of 1-4) and/or lithium bis(oxalato)borate;

electrolyte [6]: the lithium salts as a component of the electrolyte comprise a fluorine-containing lithium salt and the nonaqueous electrolyte contains hydrogen fluoride (HF) in an amount of from 10 ppm to 300 ppm of the whole electrolyte;

electrolyte [7]: the electrolyte contains vinylene carbonate and the content of the vinylene carbonate is in the range of from 0.001% by mass to 3% by mass based on the whole electrolyte;

electrolyte [8]: the electrolyte further contains at least one compound selected from the group consisting of compounds represented by general formula (4) given above, heterocyclic compounds containing nitrogen and/or sulfur, cyclic carboxylic acid esters, and fluorine-containing cyclic carbonates in an amount in the range of from 0.001% by mass to 5% by mass based on the whole nonaqueous electrolyte; and electrolyte [9]: the electrolyte further contains an overcharge inhibitor.

The nonaqueous electrolyte for general use in the lithium secondary battery of this invention is first described below.

[Lithium Salt]

The electrolyte is not particularly limited as long as it comprises one or more lithium salts known to be usable as electrolytes for lithium secondary batteries. Examples thereof include the following.

Inorganic lithium salts: inorganic fluoride salts such as $LiPF_6$, $LiBF_4$, $LiAsF_6$, and $LiSbF_6$; perhalogen acid salts such as $LiClO_4$, $LiBrO_4$, and $LiIO_4$; and inorganic chloride salts such as $LiAlCl_4$.

Fluorine-containing organolithium salts: perfluoroalkanesulfonic acid salts such as $LiCF_3SO_3$; perfluoroalkanesulfonylimide salts such as $LiN(CF_3SO_2)_2$, $LiN(CF_3CF_2SO_2)_2$, and $LiN(CF_3SO_2)(C_4F_9SO_2)$; perfluoroalkanesulfonyl methide salts such as $LiC(CF_3SO_2)_3$; and fluoroalkyl fluorophosphates such as $Li[PF_5(CF_2CF_2CF_3)]$, $Li[PF_4(CF_2CF_2CF_3)_2]$, $Li[PF_3(CF_2CF_2CF_3)_3]$, $Li[PF_5(CF_2CF_2CF_2CF_3)]$, $Li[PF_4(CF_2CF_2CF_2CF_3)_2]$, and $Li[PF_3(CF_2CF_2CF_2CF_3)_3]$.

Oxalatoborate salts: lithium bis(oxalato)borate and lithium difluorooxalatoborate.

One of these lithium salts may be used alone, or any desired two or more thereof may be used in combination in any desired proportion. Of those, $LiPF_6$ is preferred when solubility in the nonaqueous solvent and secondary-battery performances such as charge/discharge characteristics, output characteristics, and cycle characteristics are comprehensively judged.

A preferred example of use of two or more in combination is a combination of $LiPF_6$ and $LiBF_4$. In this case, the proportion of $LiBF_4$ to the sum of both is preferably from 0.01% by mass to 20% by mass, especially preferably from 0.1% by mass to 5% by mass.

Another example is a combination of an inorganic fluoride salt and a perfluoroalkanesulfonylimide salt. In this case, the proportion of the inorganic fluoride salt to the sum of both is preferably from 70% by mass to 99% by mass, more preferably from 80% by mass to 98% by mass. This combination is effective in inhibiting deterioration in high-temperature storage.

The concentration of the lithium salts in the nonaqueous electrolyte is not particularly limited. However, the concentration thereof is generally 0.5 mol/L or higher, preferably 0.6 mol/L or higher, more preferably 0.7 mol/L or higher. The upper limit thereof is generally 2 mol/L or lower, preferably 1.8 mol/L or lower, more preferably 1.7 mol/L or lower. When the concentration thereof is too low, there are cases where the nonaqueous electrolyte has an insufficient electrical conductivity. On the other hand, when the concentration thereof is too high, there are cases where the electrolyte has an increased viscosity and hence a reduced conductivity, and this may result in a decrease in performances of the lithium secondary battery.

[Nonaqueous Solvent]

The nonaqueous solvent to be used also can be one or more solvents suitably selected from those which have been proposed as solvents for nonaqueous electrolytes. Examples thereof include the following.

1) Cyclic Carbonate:

The alkylene group as a component of the cyclic carbonate has preferably 2-6 carbon atoms, especially preferably 2-4 carbon atoms. Examples of the cyclic carbonate include ethylene carbonate, propylene carbonate, and butylene carbonate. Preferred of these are ethylene carbonate and propylene carbonate.

2) Chain Carbonate:

A preferred chain carbonate is a dialkyl carbonate, in which the alkyl groups as components of the carbonate each have 1-5 carbon atoms, especially preferably 1-4 carbon atoms. Examples thereof include dialkyl carbonates such as dimethyl carbonate, diethyl carbonate, di-n-propyl carbonate, ethyl methyl carbonate, methyl n-propyl carbonate, and ethyl n-propyl carbonate. Preferred of these are dimethyl carbonate, diethyl carbonate, and ethyl methyl carbonate.

3) Cyclic Ester:

Examples thereof include γ-butyrolactone and γ-valerolactone.

4) Chain Ester:

Examples thereof include methyl acetate, ethyl acetate, propyl acetate, and methyl propionate.

5) Cyclic Ether:

Examples thereof include tetrahydrofuran, 2-methyltetrahydrofuran, and tetrahydropyran.

6) Chain Ether:

Examples thereof include dimethoxyethane and dimethoxymethane.

7) Sulfur-Containing Organic Solvent:

Examples thereof include sulfolane and diethyl sulfone.

Those solvents may be used alone or in combination of two or more thereof. However, it is preferred to use a combination of two or more compounds. For example, it is preferred to use a high-permittivity solvent, such as a cyclic carbonate or cyclic ester, in combination with a low-viscosity solvent, such as a chain carbonate or chain ester.

One preferred combination of solvents for constituting the nonaqueous solvent is a combination consisting mainly of at least one cyclic carbonate and at least one chain carbonate. In particular, the content of the sum of the cyclic carbonate and the chain carbonate in the nonaqueous solvent is 80% by volume or higher, preferably 85% by volume or higher, more preferably 90% by volume or higher. This combination may be one in which the proportion by volume of the cyclic carbonate to the sum of the cyclic carbonate and the chain carbonate is 5% or higher, preferably 10% or higher, more preferably 15% or higher, and is generally 50% or lower, preferably 35% or lower, more preferably 30% or lower. It is especially preferred that the preferred range of the total content by volume of the carbonates in the whole nonaqueous solvent should be employed in combination with the preferred range of the proportion by volume of the cyclic carbonate to the cyclic and chain carbonates. Use of such combination of nonaqueous solvents is preferred because the battery produced using this combination has a satisfactory balance between cycle characteristics and high-temperature storability (in particular, residual capacity and high-load discharge capacity after high-temperature storage).

A nonaqueous electrolyte which comprises that mixed solvent and, contained therein, one or more lithium salts and at least one compound selected from the group consisting of cyclic siloxane compounds represented by general formula (1) given above, fluorosilane compounds represented by general formula (2) given above, compounds represented by general formula (3) given above, compounds having an S—F bond in the molecule, nitric acid salts, nitrous acid salts, monofluorophosphoric acid salts, difluorophosphoric acid salts, acetic acid salts, and propionic acid salts is preferred because the battery produced using this electrolyte has a satisfactory balance among cycle characteristics, high-temperature storability (in particular, residual capacity and high-load discharge capacity after high-temperature storage), and inhibition of gas evolution.

Examples of the preferred combination of at least one cyclic carbonate and at least one chain carbonate include: ethylene carbonate and dimethyl carbonate; ethylene carbonate and diethyl carbonate; ethylene carbonate and ethyl methyl carbonate; ethylene carbonate, dimethyl carbonate, and diethyl carbonate; ethylene carbonate, dimethyl carbonate, and ethyl methyl carbonate; ethylene carbonate, diethyl carbonate, and ethyl methyl carbonate; and ethylene carbonate, dimethyl carbonate, diethyl carbonate, and ethyl methyl carbonate. Examples of preferred combinations further include such ethylene carbonate/chain carbonate combinations to which propylene carbonate has been further added. In the case where propylene carbonate is contained, the proportion by volume of ethylene carbonate to propylene carbonate is generally from 99:1 to 40:60, preferably from 95:5 to 50:50.

It is preferred that the content of propylene carbonate in the whole nonaqueous solvent should be regulated to 0.1% by volume or higher, preferably 1% by volume or higher, more preferably 2% by volume or higher, and to generally 10% by volume or lower, preferably 8% by volume or lower, more preferably 5% by volume or lower. This is because this combination brings about excellent low-temperature characteristics while maintaining the properties brought about by the combination of ethylene carbonate with one or more chain carbonates.

More preferred of those are ones which include an asymmetric chain carbonate. Especially preferred are ones comprising ethylene carbonate, a symmetric chain carbonate, and an asymmetric chain carbonate, such as: ethylene carbonate, dimethyl carbonate, and ethyl methyl carbonate; ethylene carbonate, diethyl carbonate, and ethyl methyl carbonate; and ethylene carbonate, dimethyl carbonate, diethyl carbonate, and ethyl methyl carbonate. This is because such combinations bring about a satisfactory balance between cycle characteristics and high-current discharge characteristics. Preferred of these are ones in which the asymmetric chain carbonate is ethyl methyl carbonate. Furthermore, the alkyl groups as components of each dialkyl carbonate preferably have 1-2 carbon atoms.

Other preferred examples of the nonaqueous solvent are ones containing a chain ester. Especially preferred chain esters are methyl acetate, ethyl acetate, and the like. The content by volume of the chain ester in the nonaqueous solvent is generally 5% or higher, preferably 8% or higher, more preferably 15% or higher, and is generally 50% or lower, preferably 35% or lower, more preferably 30% or lower, even more preferably 25% or lower. In particular, a nonaqueous solvent comprising the cyclic carbonate/chain carbonate mixed solvent and a chain ester is preferred from the standpoint of improving the low-temperature characteristics of the battery.

Still another preferred example of the nonaqueous solvent is one in which either one organic solvent selected from the group consisting of ethylene carbonate, propylene carbonate, γ-butyrolactone, and γ-valerolactone or a mixed solvent composed of two or more organic solvents selected from that group accounts for 60% by volume or more of the whole nonaqueous solvent. The mixed solvent preferably is one having a flash point of 50° C. or higher, and especially preferably is one having a flash point of 70° C. or higher. The nonaqueous electrolyte employing this solvent is less apt to suffer solvent vaporization and liquid leakage even when used at high temperatures. In particular, such nonaqueous solvent may be: one in which the content of γ-butyrolactone in the nonaqueous solvent is 60% by volume or higher; one in which the total content of ethylene carbonate and γ-butyrolactone in the nonaqueous solvent is 80% by volume or higher, preferably 90% by volume or higher, and the proportion by volume of ethylene carbonate to γ-butyrolactone is from 5:95 to 45:55; or one in which the total content of ethylene carbonate and propylene carbonate in the nonaqueous solvent is 80% by volume or higher, preferably 90% by volume or higher, and the proportion by volume of ethylene carbonate to propylene carbonate is from 30:70 to 60:40. Use of this nonaqueous solvent generally results in a satisfactory balance among cycle characteristics, high-current discharge characteristics, etc.

[Specific Compound]

As stated above, the nonaqueous electrolyte of the invention is characterized in that it contains at least one compound selected from the group consisting of cyclic siloxane compounds represented by general formula (1), fluorosilane compounds represented by general formula (2), compounds represented by general formula (3), compounds having an S—F bond in the molecule, nitric acid salts, nitrous acid salts, monofluorophosphoric acid salts, difluorophosphoric acid salts, acetic acid salts, and propionic acid salts (hereinafter, these compounds are often abbreviated to "specific compounds"), or that the at least one compound has been added to the electrolyte.

[[Cyclic Siloxane Compounds Represented by General Formula (1)]]

$R^1$ and $R^2$ in the cyclic siloxane compounds represented by general formula (1) are organic groups which have 1-12 carbon atoms and may be the same or different. Examples of $R^1$ and $R^2$ include chain alkyl groups such as methyl, ethyl, n-propyl, isopropyl, butyl, isobutyl, sec-butyl, and t-butyl; cycloalkyl groups such as cyclohexyl and norbornanyl; alkenyl groups such as vinyl, 1-propenyl, allyl, butenyl, and 1,3-butadienyl; alkynyl groups such as ethynyl, propynyl, and butynyl; halogenated alkyl groups such as trifluoromethyl; alkyl groups having a saturated heterocyclic group, such as 3-pyrrolidinopropyl; aryl groups such as phenyl which may have an alkyl substituent; aralkyl groups such as phenylmethyl and phenylethyl; trialkylsilyl groups such as trimethylsilyl; and trialkylsiloxy groups such as trimethylsiloxy.

Of those groups, ones having a smaller number of carbon atoms are more effective in enabling the compound to exhibit its properties. Organic groups having 1-6 carbon atoms are preferred. Alkenyl groups are preferred because they act on the nonaqueous electrolyte and the coating film on an electrode surface to improve input/output characteristics. Aryl groups are preferred because they function to scavenge radicals generating in the battery during charge/discharge to improve overall battery performances. Consequently, $R^1$ and $R^2$ especially preferred are methyl, vinyl, or phenyl.

In general formula (1), n represents an integer of 3-10, and is preferably an integer of 3-6, especially preferably 3 or 4.

Examples of the cyclic siloxane compounds represented by general formula (1) include cyclotrisiloxanes such as hexamethylcyclotrisiloxane, hexaethylcyclotrisiloxane, hexaphenylcyclotrisiloxane, and 1,3,5-trimethyl-1,3,5-trivinylcyclotrisiloxane, cyclotetrasiloxanes such as octamethylcyclotetrasiloxane, and cyclopentasiloxanes such as decamethylcyclopentasiloxane. Especially preferred of these are cyclotrisiloxanes.

[[Fluorosilane Compounds Represented by General Formula (2)]]

$R^3$ to $R^5$ in general formula (2) are organic groups which have 1-12 carbon atoms and may be the same or different. Examples thereof include the chain alkyl groups, cycloalkyl groups, alkenyl groups, alkynyl groups, halogenated alkyl groups, alkyl groups having a saturated heterocyclic group, aryl groups such as phenyl which may have an alkyl group, aralkyl groups, trialkylsilyl groups, and trialkylsiloxy groups enumerated above as examples of $R^1$ and $R^2$ in general formula (1). Examples thereof further include carbonyl groups such as ethoxycarbonylethyl; carboxyl groups such as acetoxy, acetoxymethyl, and trifluoroacetoxy; oxy groups such as methoxy, ethoxy, propoxy, butoxy, phenoxy, and allyloxy; amino groups such as allylamino; and benzyl.

In general formula (2), x represents an integer of 1-3. Symbols p, q, and r each represent an integer of 0-3, provided that $1 \leq p+q+r \leq 3$. Furthermore, $x+p+q+r=4$ holds inevitably.

Examples of the fluorosilane compounds represented by general formula (2) include monofluorosilanes such as trimethylfluorosilane, triethylfluorosilane, tripropylfluorosilane, phenyldimethylfluorosilane, triphenylfluorosilane, vinyldimethylfluorosilane, vinyldiethylfluorosilane, vinyldiphenylfluorosilane, trimethoxyfluorosilane, and triethoxyfluorosilane. Examples thereof further include difluorosilanes such as dimethyldifluorosialne, diethyldifluorosilane, divinyldifluorosilane, and ethylvinyldifluorosilane; and trifluorosilanes such as methyltrifluorosilane and ethyltrifluorosilane.

When a fluorosilane compound represented by general formula (2) has a low boiling point, there are cases where it is difficult to incorporate this compound into the nonaqueous electrolyte in a given amount because this compound volatilizes. Even after incorporation into the nonaqueous electrolyte, there is a possibility that the compound might volatilize under such conditions that the battery heats up upon charge/discharge or the environment comes to have a high temperature. Consequently, compounds having a boiling point of 50° C. or higher at 1 atm are preferred. Especially preferred are compounds having a boiling point of 60° C. or higher.

As in the case of the compounds represented by general formula (1), organic groups having a smaller number of carbon atoms are more effective in producing the effects. Alkenyl groups having 1-6 carbon atoms act on the non-aqueous electrolyte and the coating film on an electrode surface to improve input/output characteristics, while aryl groups function to scavenge radicals generating in the battery during charge/discharge to improve overall battery performances. Consequently, from this standpoint, the organic groups preferably are methyl, vinyl, or phenyl. Especially preferred examples of the compounds include trimethylfluorosilane, vinyldimethylfluorosilane, phenyldimethylfluorosilane, and vinyldiphenylfluorosilane.

[[Compounds Represented by General Formula (3)]]

$R^6$ to $R^8$ in general formula (3) are organic groups which have 1-12 carbon atoms and may be the same or different. Examples thereof include the chain alkyl groups, cycloalkyl groups, alkenyl groups, alkynyl groups, halogenated alkyl groups, alkyl groups having a saturated heterocyclic group, aryl groups such as phenyl which may have an alkyl group, aralkyl groups, trialkylsilyl groups, trialkylsiloxy groups, carbonyl groups, carboxyl groups, oxy groups, amino groups, and benzyl group enumerated above as examples of $R^3$ to $R^5$ in general formula (2).

Symbol A in the compounds represented by general formula (3) is not particularly limited as long as it is a group constituted of H, C, N, O, F, S, Si, and/or P. However, the element which is directly bonded to the oxygen atom in general formula (3) preferably is C, S, Si, or P. With respect to the state in which these atoms are present, the atoms each preferably are one contained in, e.g., a chain alkyl, cycloalkyl, alkenyl, alkynyl, halogenated alkyl, carbonyl, sulfonyl, trialkylsilyl, phosphoryl, or phosphinyl group or the like.

The compounds represented by general formula (3) have a molecular weight of preferably 1,000 or lower, especially preferably 800 or lower, more preferably 500 or lower. Examples of the compounds represented by general formula (3) include siloxane compounds such as hexamethyldisiloxane, 1,3-diethyltetramethyldisiloxane, hexaethyldisiloxane, and octamethyltrisiloxane; alkoxysilanes such as methoxytrimethylsilane and ethoxytrimethylsilane; peroxides such as bis(trimethylsilyl) peroxide; carboxylic acid esters such as trimethylsilyl acetate, triethylsilyl acetate, trimethylsilyl propionate, trimethylsilyl methacrylate, and trimethylsilyl trifluoroacetate; sulfonic acid esters such as trimethylsilyl methanesulfonate, trimethylsilyl ethanesulfonate, triethylsilyl methanesulfonate, and trimethylsilyl fluoromethanesulfonate; sulfuric acid esters such as bis(trimethylsilyl) sulfate; boric acid esters such as tris(trimethylsiloxy) boron; and phosphoric or phosphorous acid esters such as tris(trimethylsilyl) phosphate and tris(trimethylsilyl) phosphite.

Preferred of these are siloxane compounds, sulfonic acid esters, and sulfuric acid esters. Especially preferred are sulfonic acid esters. Preferred of the siloxane compounds is hexamethyldisiloxane. Preferred of the sulfonic acid esters is trimethylsilyl methanesulfonate. Preferred of the sulfuric acid esters is bis(trimethylsilyl) sulfate.

[[Compounds Having S—F Bond in Molecule]]

The compounds having an S—F bond in the molecule are not particularly limited. However, sulfonyl fluorides and fluorosulfonic acid esters are preferred.

Examples thereof include methanesulfonyl fluoride, ethanesulfonyl fluoride, methanebis(sulfonyl fluoride), ethane-1,2-bis(sulfonyl fluoride), propane-1,3-bis(sulfonyl fluoride), butane-1,4-bis(sulfonyl fluoride), difluoromethanebis (sulfonyl fluoride), 1,1,2,2-tetrafluoroethane-1,2-bis (sulfonyl fluoride), 1,1,2,2,3,3-hexafluoropropane-1,3-bis (sulfonyl fluoride), methyl fluorosulfonate, and ethyl fluorosulfonate. Preferred of these is methanesulfonyl fluoride, methanebis(sulfonyl fluoride), or methyl fluorosulfonate.

[[Nitric Acid Salts, Nitrous Acid Salts, Monofluorophosphoric Acid Salts, Difluorophosphoric Acid Salts, Acetic Acid Salts, and Propionic Acid Salts]]

The counter cations of the nitric acid salts, nitrous acid salts, monofluorophosphoric acid salts, difluorophosphoric acid salts, acetic acid salts, and propionic acid salts are not particularly limited. Examples thereof include metallic elements such as Li, Na, K, Mg, Ca, Fe, and Cu and ammonium and quaternary ammoniums represented by $NR^9R^{10}R^{11}R^{12}$ (wherein $R^9$ to $R^{12}$ each independently represent a hydrogen atom or an organic group having 1-12 carbon atoms). Examples of the organic groups having 1-12 carbon atoms represented by $R^9$ to $R^{12}$ include alkyl groups which may be substituted by one or more halogen atoms, cycloalkyl groups which may be substituted by one or more halogen atoms, aryl group which may be substituted by one or more halogen atoms, and heterocyclic groups containing a nitrogen atom. $R^9$ to $R^{12}$ each preferably are a hydrogen atom, alkyl group, cycloalkyl group, nitrogen-atom-containing heterocyclic group, or the like. Lithium, sodium, potassium, magnesium, calcium, or $NR^9R^{10}R^{11}R^{12}$ is preferred of those counter cations from the standpoint of the characteristics of the lithium secondary battery employing such compounds. Lithium is especially preferred. Of those compounds, nitric acid salts or difluorophosphoric acid salts are preferred from the standpoints of the percentage improvement in output characteristics and of cycle characteristics. Especially preferred is lithium difluorophosphate. These compounds each may be one synthesized in a nonaqueous solvent and used substantially as it is, or may be one synthesized separately, substantially isolated, and added to a nonaqueous solvent.

One of the specific compounds, i.e., cyclic siloxane compounds represented by general formula (1), fluorosilane compounds represented by general formula (2), compounds represented by general formula (3), compounds having an S—F bond in the molecule, nitric acid salts, nitrous acid salts, monofluorophosphoric acid salts, difluorophosphoric acid salts, acetic acid salts, and propionic acid salts, may be used alone. Alternatively, any desired two or more compounds selected from these may be used in combination in any desired proportion. With respect to the compounds in each group in the specific compounds, one of these may be used alone or any desired two or more thereof may be used in combination in any desired proportion.

The proportion of those specific compounds in the nonaqueous electrolyte should be 10 ppm or higher (0.001% by mass or higher) in terms of total content thereof based on the whole nonaqueous electrolyte, and is preferably 0.01% by mass or higher, more preferably 0.05% by mass or higher, even more preferably 0.1% by mass or higher. The upper limit thereof is preferably 5% by mass or lower, more preferably 4% by mass or lower, even more preferably 3% by mass or lower. When the concentration of the specific compounds is too low, there are cases where the effect of improving battery output or the effect of improving battery life is difficult to obtain. On the other hand, too high concentrations thereof may lead to a decrease in charge/discharge efficiency.

When any of those specific compounds is incorporated into a nonaqueous electrolyte and actually used in fabricating a secondary battery and this battery is disassembled to take out the nonaqueous electrolyte again, then there frequently are cases where the content of the specific compounds therein has decreased considerably. Because of this, in the case where the specific compound can be at least detected in the nonaqueous electrolyte discharged from a battery, this battery is regarded as within the scope of the invention. The nonaqueous electrolyte according to the invention can be prepared by dissolving one or more electrolyte lithium salts and the specific compound in a nonaqueous solvent and further dissolving one or more other compounds therein according to need. In preparing the nonaqueous electrolyte, it is preferred to dehydrate each raw material beforehand to a water content of generally 50 ppm or lower, preferably 30 ppm or lower, especially preferably 10 ppm or lower.

[Other Compounds]

Although the nonaqueous electrolyte in the invention comprises a nonaqueous solvent and one or more lithium salts as an electrolyte and the specific compound which are contained as essential ingredients in the solvent, other compounds can be incorporated therein in any desired amount according to need unless this incorporation lessens the effects of the invention. Examples of such other compounds include:

(1) overcharge inhibitors such as aromatic compounds, e.g., biphenyl, alkylbiphenyls, terphenyl, partially hydrogenated terphenyls, cyclohexylbenzene, t-butylbenzene, t-amylbenzene, diphenyl ether, and dibenzofuran; products of the partial fluorination of these aromatic compounds, e.g., 2-fluorobiphenyl, o-cyclohexylfluorobenzene, and p-cyclohexylfluorobenzene; and fluorine-containing anisole compounds, e.g., 2,4-difluoroanisole, 2,5-difluoroanisole, 2,6-difluoroanisole, and 3,5-difluoroanisole;

(2) negative-electrode coating agents such as vinylene carbonate, vinylethylene carbonate, fluoroethylene carbonate, trifluoropropylene carbonate, succinic anhydride, glutaric anhydride, maleic anhydride, citraconic anhydride, glutaconic anhydride, itaconic anhydride, and cyclohexanedicarboxylic anhydride; and (3) positive-electrode protective agents such as ethylene sulfite, propylene sulfite, dimethyl sulfite, propanesultone, butanesultone, methyl methanesulfonate, busulfan, methyl toluenesulfonate, dimethyl sulfate, ethylene sulfate, sulfolane, dimethyl sulfone, diethyl sulfone, dimethyl sulfoxide, diethyl sulfoxide, tetramethylene sulfoxide, diphenyl sulfide, thioanisole, diphenyl disulfide, and dipyridinium disulfide.

Preferred overcharge inhibitors are aromatic compounds such as biphenyl, alkylbiphenyls, terphenyl, partially hydrogenated terphenyls, cyclohexylbenzene, t-butylbenzene, t-amylbenzene, diphenyl ether, and dibenzofuran. Two or more of these may be used in combination. In the case where two or more are used in combination, it is especially preferred to use cyclohexylbenzene or terphenyl (or a product of partial hydrogenation thereof) in combination with t-butylbenzene or t-amylbenzene.

Preferred negative-electrode coating agents are vinylene carbonate, vinylethylene carbonate, fluoroethylene carbonate, succinic anhydride, and maleic anhydride. Two or more of these may be used in combination. In the case where two or more are used in combination, it is preferred to use vinylene carbonate in combination with vinylethylene carbonate, fluoroethylene carbonate, succinic anhydride, or maleic anhydride. Preferred positive-electrode protective agents are ethylene sulfite, propylene sulfite, propanesultone, butanesultone, methyl methanesulfonate, and busulfan. Two or more of these may be used in combination. It is especially preferred to use a combination of a negative-electrode coating agent and a positive-electrode protective agent or a combination of an overcharge inhibitor, a negative-electrode coating agent, and a positive-electrode protective agent.

The contents of such other compounds in the nonaqueous electrolyte are not particularly limited. However, the content of each compound is preferably 0.01% by mass or higher, more preferably 0.1% by mass or higher, even more preferably 0.2% by mass or higher, based on the whole nonaqueous electrolyte. The upper limit thereof is preferably 5% by mass or lower, more preferably 3% by mass or lower, even more preferably 2% by mass or lower. The addition of those compounds is effective in inhibiting the battery from rupturing/firing in an abnormal state caused by overcharge and in improving capacity retentivity after high-temperature storage and cycle characteristics.

Methods for preparing the nonaqueous electrolyte for the lithium secondary battery of the invention are not particularly limited. The nonaqueous electrolyte can be prepared by dissolving at least one lithium salt and the specific compound optionally together with other compounds in a nonaqueous solvent in an ordinary manner.

<Electrolytic Solution [1]>

The nonaqueous electrolyte preferably is one in which the nonaqueous solvent as a component of the electrolyte is a mixed solvent at least containing "ethylene carbonate" and the proportion of the ethylene carbonate to the whole nonaqueous solvent is from 1% by volume to 25% by volume (electrolyte [1]).

In this invention (electrolyte [1]), the kinds and contents of the "lithium salt", "nonaqueous solvent other than ethylene carbonate (EC)", "specific compound", and "other compounds", use conditions therefor, method of preparing the nonaqueous electrolyte, etc. are the same as described above.

<Electrolytic Solution [2]>

The nonaqueous electrolyte preferably is one in which the nonaqueous solvent as a component of the electrolyte contains "at least one asymmetric chain carbonate" and the proportion of the asymmetric chain carbonate to the whole nonaqueous solvent is from 5% by volume to 90% by volume (electrolyte [2]).

In this invention (electrolyte [2]), the kinds and contents of the "lithium salt", "nonaqueous solvent other than the asymmetric chain carbonate", "specific compound", and "other compounds", use conditions therefor, method of preparing the nonaqueous electrolyte, etc. are the same as described above.

In this invention (electrolyte [2]), at least one asymmetric chain carbonate is contained in an amount of from 5% by volume to 90% by volume based on the whole nonaqueous solvent. The content of the at least one asymmetric chain carbonate in the whole nonaqueous solvent is preferably 8% by volume or higher, especially preferably 10% by volume or higher, more preferably 15% by volume or higher, even more preferably 20% by volume or higher. The upper limit thereof is preferably 85% by volume or lower, especially preferably 70% by volume or lower, more preferably 60% by volume or lower, even more preferably 45% by volume or lower. To regulate the content of the asymmetric chain carbonate to such a value is desirable for reconciling the high low-temperature characteristics with cycle characteristics, etc. according to the invention.

The asymmetric chain carbonate is not particularly limited. However, asymmetric alkyl carbonates are preferred, and ones in which the alkyl groups have 1-4 carbon atoms are suitable. Examples of such asymmetric alkyl carbonates include ethyl methyl carbonate, methyl n-propyl carbonate, ethyl n-propyl carbonate, methyl isopropyl carbonate, ethyl isopropyl carbonate, n-butyl methyl carbonate, and n-butyl ethyl carbonate. Preferred of these are ethyl methyl carbonate, methyl n-propyl carbonate, ethyl n-propyl carbonate, n-butyl methyl carbonate, and n-butyl ethyl carbonate. More preferred are ethyl methyl carbonate, methyl n-propyl carbonate, and n-butyl methyl carbonate. Especially preferred is ethyl methyl carbonate. A mixture of two or more of these asymmetric chain carbonates may be used.

As stated above, the nonaqueous solvent may be a mixture of two or more nonaqueous solvents. In particular, it is preferred that the nonaqueous solvent should comprise, besides the asymmetric chain carbonate, at least one cyclic carbonate from the standpoints of improving the cycle characteristics and storability of the secondary battery, etc. In the case where at least one cyclic carbonate is contained, the proportion of the cyclic carbonate to the whole nonaqueous solvent is generally 5% by volume or higher, preferably 10% by volume or higher, more preferably 15% by volume or higher. The upper limit thereof is generally 50% by volume or lower, preferably 35% by volume or lower, more preferably 30% by volume or lower, even more preferably 25% by volume or lower. When the proportion of the cyclic carbonate to the whole nonaqueous solvent is too low, there are cases where the cycle characteristics and storability of the secondary battery are not improved. On the other hand, too high proportions thereof may result in a decrease in low-temperature discharge characteristics.

Furthermore, it is preferred that the nonaqueous solvent should comprise, besides the asymmetric chain carbonate, at least one symmetric chain carbonate from the standpoints of improving a balance among the cycle characteristics, storability, and low-temperature discharge characteristics of the secondary battery, etc. In the case where at least one symmetric chain carbonate is contained, the proportion of the symmetric chain carbonate to the whole nonaqueous solvent is generally 5% by volume or higher, preferably 10% by volume or higher, more preferably 15% by volume or higher. The upper limit thereof is generally 80% by volume or lower, preferably 70% by volume or lower, more preferably 50% by volume or lower, even more preferably 40% by volume or lower. When the proportion of the symmetric chain carbonate to the whole nonaqueous solvent is too low, there are cases where an improved balance among cycle characteristics, storability, and low-temperature discharge characteristics is not obtained. On the other hand, when the proportion thereof is too high, there are cases where satisfactory cycle characteristics are not obtained.

Moreover, it is preferred that the nonaqueous solvent should be a mixed solvent comprising the asymmetric chain carbonate and two or more other nonaqueous solvents. Namely, the nonaqueous solvent preferably is a mixed solvent composed of three or more ingredients including the asymmetric chain carbonate. The mixed solvent composed of two or more nonaqueous solvents, excluding the asymmetric chain carbonate, preferably comprises a combination of a high-permittivity solvent, such as a cyclic carbonate or cyclic ester, and a low-viscosity solvent such as a symmetric chain carbonate or chain ester, because this mixed solvent is effective in enhancing the overall battery performance including charge/discharge characteristics and battery life. Especially preferred is a combination of a cyclic carbonate and a symmetric chain carbonate. The mixing ratio in this case is not particularly limited. However, the amount of the high-permittivity solvent such as a cyclic carbonate or cyclic ester and that of the low-viscosity solvent such as a symmetric chain carbonate or chain ester are preferably 10-400 parts by volume and 10-800 parts by volume, respectively, per 100 parts by volume of the asymmetric chain carbonate from the standpoints of improving cycle characteristics and storability, etc.

One preferred combination of two or more nonaqueous solvents other than the asymmetric chain carbonate is a combination consisting mainly of at least one cyclic carbonate and at least one symmetric chain carbonate. Examples of the preferred combination of at least one cyclic carbonate and at least one symmetric chain carbonate include: ethylene carbonate and dimethyl carbonate; ethylene carbonate and diethyl carbonate; and ethylene carbonate, dimethyl carbonate, and diethyl carbonate. The contents of these ingredients in the whole nonaqueous solvent are not particularly limited. However, the contents of the asymmetric chain carbonate, cyclic carbonate, and symmetric chain carbonate are preferably 8-80% by volume, 10-35% by volume, and 10-70% by volume, respectively.

Examples of preferred combinations further include a combination comprising such ethylene carbonate/symmetric chain carbonate combination and propylene carbonate added thereto. In the case where propylene carbonate is contained, the proportion by volume of ethylene carbonate to propylene carbonate is preferably from 99:1 to 40:60, especially preferably from 95:5 to 50:50.

Another preferred combination of two or more nonaqueous solvents other than the asymmetric chain carbonate is a combination including a chain ester. In particular, one comprising the cyclic carbonate and at least one of the chain esters is preferred from the stand point of improving the low-temperature characteristics of the battery. The chain ester especially preferably is methyl acetate, ethyl acetate, or the like. The proportion of the chain ester to the whole nonaqueous solvent is preferably 5% by volume or higher, especially preferably 8% by volume or higher, more preferably 15% by volume or higher. The upper limit thereof is preferably 50% by volume or lower, especially preferably 35% by volume or lower, more preferably 30% by volume or lower, even more preferably 25% by volume or lower. Consequently, in this case, the contents of the asymmetric chain carbonate, cyclic carbonate, and chain ester in the whole nonaqueous solvent are preferably 8-85% by volume, 10-35% by volume, and 5-50% by volume, respectively.

Examples of preferred combinations further include a combination comprising such cyclic carbonate/chain ester combination and a symmetric chain carbonate added thereto. In the case where a symmetric chain carbonate is contained, the content of the symmetric chain carbonate in the whole nonaqueous solvent is preferably 10-60% by volume.

Specific examples of the preferred solvent combinations for use as the nonaqueous solvent of the nonaqueous electrolyte for a secondary battery of the invention include the following. Combinations of an asymmetric chain carbonate and one or more cyclic carbonates, such as: ethyl methyl carbonate and ethylene carbonate; methyl n-propyl carbonate and ethylene carbonate; ethyl methyl carbonate, ethylene carbonate, and propylene carbonate; and methyl n-propyl carbonate, ethylene carbonate, and propylene carbonate. Combinations of an asymmetric chain carbonate, a cyclic carbonate, and one or more symmetric chain carbonates, such as: ethyl methyl carbonate, ethylene carbonate, and dimethyl carbonate; ethyl methyl carbonate, ethylene carbonate, and diethyl carbonate; ethyl methyl carbonate, ethylene carbonate, diethyl carbonate, and dimethyl carbonate; methyl n-propyl carbonate, ethylene carbonate, and dimethyl carbonate; methyl n-propyl carbonate, ethylene carbonate, and diethyl carbonate; and methyl n-propyl carbonate, ethylene carbonate, diethyl carbonate, and dimethyl carbonate. Combinations of an asymmetric chain carbonate, a cyclic carbonate, and a chain ester, such as: ethyl methyl carbonate, ethylene carbonate, and methyl acetate; and ethyl methyl carbonate, ethylene carbonate, and ethyl acetate. Combinations of an asymmetric chain carbonate, a cyclic carbonate, a symmetric chain carbonate, and a chain ester, such as: ethyl methyl carbonate, ethylene carbonate, dimethyl carbonate, and methyl acetate; and ethyl methyl carbonate, ethylene carbonate, diethyl carbonate, and methyl acetate.

A nonaqueous electrolyte which comprises this mixed solvent, a lithium salt contained therein, and the specific compound, e.g., a difluorophosphoric acid salt, contained in the solvent in an amount of 10 ppm or more by mass of the whole electrolyte and in which the content of the asymmetric chain carbonate in the whole nonaqueous solvent is from 5% by volume to 90% by volume is preferred. This is because the secondary battery produced with this electrolyte has an improved balance among cycle characteristics, low-temperature discharge characteristics, high-temperature storability (in particular, residual capacity and high-load discharge capacity after high-temperature storage), and the inhibition of gas evolution.

<Electrolytic Solution [3]>

The nonaqueous electrolyte preferably is one in which the nonaqueous solvent as a component of the electrolyte contains "at least one chain carboxylic acid ester" (electrolyte [3]).

In this invention (electrolyte [3]), the kinds and contents of the "lithium salt", "nonaqueous solvent other than the chain carboxylic acid ester", "specific compound", and "other compounds", use conditions therefor, method of preparing the nonaqueous electrolyte, etc. are the same as described above.

The chain carboxylic acid ester to be used in this invention (electrolyte [3]) is not particularly limited. However, it preferably is a $C_{1-4}$-alkyl ester of a carboxylic acid in which the number of carbon atoms including that in the carboxyl group(s) is 1-5. Although the valence of this carboxylic acid also is not particularly limited, a monocarboxylic acid or a dicarboxylic acid is preferred.

Preferred of such carboxylic acid esters are fatty acid esters such as formic esters, acetic esters, propionic esters, and butyric esters and esters of various dicarboxylic acids. Especially preferred are acetic esters or propionic esters.

Specifically, methyl acetate, ethyl acetate, propyl acetate, methyl propionate, or ethyl propionate is preferred. Especially preferred is methyl acetate, ethyl acetate, or methyl propionate.

A mixture of two or more of those chain carboxylic acid esters may be used. The combination of esters to be mixed is not particularly limited. Examples of preferred combinations include: methyl acetate and ethyl acetate; methyl acetate and methyl propionate; ethyl acetate and methyl propionate; and methyl acetate, ethyl acetate, and methyl propionate. By using a suitable combination, a balance among output characteristics, high-temperature storability, etc. can be regulated according to purposes.

In the case where a mixed solvent composed of the chain carboxylic acid ester and other nonaqueous solvent(s) is used, the proportion of the chain carboxylic acid ester to all nonaqueous solvents is preferably 3% by volume or higher, especially preferably 5% by volume or higher, more preferably 8% by volume or higher, even more preferably 10% by volume or higher. The upper limit thereof is preferably 50% by volume or lower, especially preferably 35% by volume or lower, more preferably 30% by volume or lower, even more preferably 25% by volume or lower. To regulate the proportion of the ester to such a value is desirable for reconciling the high low-temperature characteristics with cycle characteristics, etc. according to the invention.

The use of a chain carboxylic acid ester in combination with the specific compound greatly improves low-temperature output characteristics. Although the reasons for this are unclear, the improvement is thought to be obtained by the following mechanism. There are cases where the specific compound, even in the absence of a chain carboxylic acid ester, has the effect of improving low-temperature characteristics to some degree. It is thought that the specific compound exerts some action on the electrodes and this brings about that effect. It is hence thought that the chain carboxylic acid ester enhances that action. Namely, it is thought that the presence of the chain carboxylic acid ester, which is highly flowable even at low temperatures, enables the specific compound to infiltrate into inner parts of the electrode plates and effectively produce its effect. Alternatively, it is thought that the chain carboxylic acid ester serves as a medium for interaction between the specific compound and the electrodes.

<Electrolytic Solution [4]>

The nonaqueous electrolyte preferably is one in which the nonaqueous solvent as a component of the electrolyte contains at least one solvent having a flash point of 70° C. or higher in an amount of 60% by volume or larger based on the whole nonaqueous solvent (electrolyte [4]).

In this invention (electrolyte [4]), the kinds and contents of the "lithium salt", "nonaqueous solvent other than the solvent having a flash point of 70° C. or higher", "specific compound", and "other compounds", use conditions therefor, method of preparing the nonaqueous electrolyte, etc. are the same as described above.

In this invention, the nonaqueous solvent should contain at least one solvent having a flash point of 70° C. or higher in a total amount of 60% by volume or larger based on the whole nonaqueous solvent. It is preferred that the nonaqueous solvent should contain at least one solvent having a flash point of 80° C. or higher in a total amount of 60% by volume or larger based on the whole nonaqueous solvent. Especially preferably, the nonaqueous solvent contains at least one solvent having a flash point of 90° C. or higher in a total amount of 60% by volume or larger based on the whole nonaqueous solvent.

The solvent having a flash point of 70° C. or higher is not particularly limited. Preferred examples thereof include ethylene carbonate, propylene carbonate, butylene carbonate, γ-butyrolactone, and γ-valerolactone. Especially preferred of these is ethylene carbonate, propylene carbonate, or γ-butyrolactone. These solvents may be used either alone or as a mixture of two or more thereof. Combinations thereof are not particularly limited.

From the standpoint of improving cycle characteristics, the nonaqueous solvent preferably has a composition in which ethylene carbonate or propylene carbonate is contained in an amount of 10% by volume or larger based on the whole nonaqueous solvent. On the other hand, since too high contents of ethylene carbonate result in a decrease in low-temperature characteristics, the content of ethylene carbonate is regulated to preferably 70% by volume or lower, especially preferably 60% by volume or lower, based on the whole nonaqueous solvent.

Preferred examples of the nonaqueous solvent containing at least one solvent having a flash point of 70° C. or higher in a total amount of 60% by volume or larger based on the whole nonaqueous solvent include:

(1) one in which the content of γ-butyrolactone in the whole nonaqueous solvent is 60% by volume or higher;
(2) one in which the total content of ethylene carbonate and γ-butyrolactone in the whole nonaqueous solvent is 80% by volume or higher, preferably 85% by volume or higher, and the proportion by volume of ethylene carbonate to γ-butyrolactone is from 5:95 to 45:55; and
(3) one in which the total content of ethylene carbonate and propylene carbonate in the whole nonaqueous solvent is 80% by volume or higher, preferably 85% by volume or higher, and the proportion by volume of ethylene carbonate to propylene carbonate is from 30:70 to 60:40.

Use of those nonaqueous solvents results in an improved balance especially between cycle characteristics and high-current discharge characteristics, etc.

Furthermore, this nonaqueous electrolyte preferably has a flash point of 40° C. or higher. The flash point thereof is especially preferably 50° C. or higher, more preferably 60° C. or higher, even more preferably 70° C. or higher. When the nonaqueous electrolyte has too low a flash point, there is a fear that the electrolyte may catch fire when the battery is exposed to a high temperature.

The nonaqueous solvent for use in this nonaqueous electrolyte for a secondary battery of the invention may comprise the solvent having a flash point of 70° C. or higher and, incorporated therein, a nonaqueous-solvent ingredient having a flash point lower than 70° C. (hereinafter abbreviated to "other nonaqueous-solvent ingredient"). This other nonaqueous-solvent ingredient may be one suitably selected from those which have been proposed as solvents for nonaqueous electrolytes. Examples thereof include the following.

(1) Chain Carbonates

Preferred chain carbonates are dialkyl carbonates, in which the constituent alkyl groups each have preferably 1-5, especially preferably 1-4 carbon atoms. Examples thereof include dialkyl carbonates such as dimethyl carbonate, diethyl carbonate, di-n-propyl carbonate, ethyl methyl carbonate, methyl n-propyl carbonate, and ethyl n-propyl carbonate. Preferred of these are dimethyl carbonate, diethyl carbonate, and ethyl methyl carbonate.

(2) Chain Esters

Examples thereof include methyl acetate, ethyl acetate, propyl acetate, and methyl propionate.

(3) Cyclic Ethers

Examples thereof include tetrahydrofuran, 2-methyltetrahydrofuran, and tetrahydropyran.

(4) Chain Ethers

Examples thereof include dimethoxyethane and dimethoxymethane.

One of such other nonaqueous-solvent ingredients may be used in combination with the "solvent having a flash point of 70° C. or higher", or two or more thereof may be used in combination with the solvent. In this case, to use, in particular, a chain carbonate and/or a chain ester in combination with the "solvent having a flash point of 70° C. or higher" is preferred from the standpoints of cycle characteristics and high-current discharge characteristics.

The content of the solvent having a flash point of 70° C. or higher in the whole nonaqueous solvent should be 60% by volume or higher, and is preferably 70% by volume or higher, more preferably 75% by volume or higher, especially preferably 80% by volume or higher, even more preferably 85% by volume or higher. The upper limit thereof is preferably 100% by volume or lower, especially preferably 90% by volume or lower. When the content of the solvent having a flash point of 70° C. or higher is too low, there are cases where the desired effects are not obtained. For example, there are cases where the battery is apt to suffer an internal-pressure increase when stored at high temperatures. On the other hand, when the content thereof is too high, there are cases where the electrolyte has an increased viscosity and hence a reduced electrical conductivity, and this may result in a decrease in performances of the lithium secondary battery.

The nonaqueous-electrolyte secondary battery employing the nonaqueous electrolyte (electrolyte [4]) according to this invention has excellent output characteristics despite the fact that a solvent having a high flash point is used in an amount not smaller than a certain value. Although the reasons for this are unclear, a possible explanation may be as follows; the following explanation should not be construed as limiting the invention. Namely, it is thought that the specific compound acts on the electrodes and reduces the reaction resistance relating to lithium ion elimination/insertion to improve output characteristics. Furthermore, solvents having a high flash point, such as ethylene carbonate, propylene carbonate, butylene carbonate, γ-butyrolactone, and γ-valerolactone, have a higher permittivity than chain carbonates, and that effect is thought to be produced remarkably when such a solvent having a high permittivity is present in an amount not below a certain level. Moreover, when the battery elements held in each battery case of the secondary battery have an electric capacity of 3 ampere-hours (Ah) or higher and/or when the secondary battery has a direct-current resistance component of 10 milliohms ($\Omega$) or less, then the contribution of the direct-current resistance component is small. The effects inherent in this nonaqueous electrolyte are thought to be more apt to be produced in such battery than in batteries in which the contribution of a direct-current resistance component is large.

<Electrolytic Solution [5]>

The nonaqueous electrolyte preferably is one in which the "lithium salts" as a component of the electrolyte comprise $LiN(C_nF_{2n+1}SO_2)_2$ (wherein n is an integer of 1-4) and/or lithium bis(oxalato)borate (electrolyte [5]).

In this invention (electrolyte [5]), the kinds and contents of the "nonaqueous solvent", "specific compound", and "other compounds", use conditions therefor, method of preparing the nonaqueous electrolyte, etc. are the same as described above.

Although this nonaqueous electrolyte (electrolyte [5]) for a secondary battery of the invention comprises a nonaqueous solvent and one or more lithium salts dissolved therein, these lithium salts comprise at least one member selected from the group consisting of $LiN(C_nF_{2n+1}SO_2)_2$ (wherein n is an integer of 1-4) and lithium bis(oxalato)borate. One of these lithium salts may be used alone, or any desired two or more of these may be used in combination in any desired proportion.

When the "specific compound" (b) is used in combination with the following (a) in an amount of 10 ppm or larger in the nonaqueous electrolyte for secondary battery, the nonaqueous electrolyte provided can realize a secondary battery having greatly improved output characteristics and excellent in high-temperature storability and cycle characteristics.

(a) $LiN(C_nF_{2n-1}SO_2)_2$ (wherein n is an integer of 1-4) and/or lithium bis(oxalato)borate Ingredient (a) is not particularly limited. However, LiN(CF$_3$SO$_2$)$_2$ or lithium bis(oxalato) borate is preferred because these salts are especially effective in producing those effects.

Although this nonaqueous electrolyte for a secondary battery of the invention contains LiN(C$_n$F$_{2n+1}$SO$_2$)$_2$ (wherein n is an integer of 1-4) and/or lithium bis(oxalato)borate as an essential lithium salt ingredient as described above, other known lithium salts (hereinafter abbreviated to "other lithium salts") may be used therewith.

The other lithium salts are not particularly limited. Examples thereof include the following.

Inorganic lithium salts: inorganic fluoride salts such as LiPF$_6$, LiBF$_4$, LiAsF$_6$, and LiSbF$_6$; perhalogen acid salts such as LiClO$_4$, LiBrO$_4$, and LiIO$_4$; and inorganic chloride salts such as LiAlCl$_4$.

Fluorine-containing organolithium salts: perfluoroalkanesulfonic acid salts such as LiCF$_3$SO$_3$; perfluoroalkanesulfonyl methide salts such as LiC(CF$_3$SO$_2$)$_3$; and fluoroalkyl fluorophosphates such as Li[PF$_5$(CF$_2$CF$_2$CF$_3$)], Li[PF$_4$(CF$_2$CF$_2$CF$_3$)$_2$], Li[PF$_3$(CF$_2$CF$_2$CF$_3$)$_3$], Li[PF$_5$(CF$_2$CF$_2$CF$_2$CF$_3$)], Li[PF$_4$(CF$_2$CF$_2$CF$_2$CF$_3$)$_2$], and Li[PF$_3$(CF$_2$CF$_2$CF$_2$CF$_3$)$_3$].

Other lithium oxalatoborates: lithium difluorooxalatoborate.

One of these lithium salts may be used alone, or any desired two or more thereof may be used in combination in any desired proportion. Of these "other lithium salts", LiPF$_6$ and LiBF$_4$ are preferred when solubility in nonaqueous solvents and secondary-battery performances such as charge/discharge characteristics, output characteristics, and cycle characteristics are comprehensively judged. Especially preferred is LiPF$_6$.

In the case where the LiN(C$_n$F$_{2n+1}$SO$_2$)$_2$ (wherein n is an integer of 1-4) and/or lithium bis(oxalato)borate is used as the main salt, the concentration thereof in the nonaqueous electrolyte is generally 0.3 mol/L or higher, preferably 0.5 mol/L or higher, more preferably 0.7 mol/L or higher. The upper limit thereof is generally 2 mol/L or lower, preferably 1.8 mol/L or lower, more preferably 1 mol/L or lower. In the case where other lithium salt, e.g., LiPF$_6$ or LiBF$_4$, is used as the main salt, the concentration of the LiN(C$_n$F$_{2n+1}$SO$_2$)$_2$ (wherein n is an integer of 1-4) and/or lithium bis(oxalato) borate may be 0.001 mol/L or higher and is preferably 0.01 mol/L or higher, more preferably 0.03 mol/L or higher. The upper limit thereof is generally 0.3 mol/L or lower, preferably 0.2 mol/L or lower, more preferably 0.1 mol/L or lower. The term main salt herein means the lithium salt contained in a highest concentration in the nonaqueous electrolyte.

The total concentration of the lithium salts in the nonaqueous electrolyte is not particularly limited. However, it is generally 0.5 mol/L or higher, preferably 0.6 mol/L or higher, more preferably 0.7 mol/L or higher. The upper limit thereof is generally 2 mol/L or lower, preferably 1.8 mol/L or lower, more preferably 1.7 mol/L or lower. When the concentration thereof is too low, there are cases where this nonaqueous electrolyte has an insufficient electrical conductivity. On the other hand, when the concentration thereof is too high, there are cases where this electrolyte has an increased viscosity and hence a reduced electrical conductivity, and this may result in a decrease in performances of the lithium secondary battery.

One preferred example of combinations of two or more lithium salts is a combination of at least one lithium salt selected from the group consisting of LiN(C$_n$F$_{2n+1}$SO$_2$)$_2$ (wherein n is an integer of 1-4) and lithium bis(oxalato) borate with LiPF$_6$.

This combination can improve, in particular, output characteristics and storability. When this combination is employed and the at least one lithium salt selected from the group consisting of LiN(C$_n$F$_{2n+1}$SO$_2$)$_2$ (wherein n is an integer of 1-4) and lithium bis(oxalato)borate is used as the main salt, then the concentration of the at least one lithium salt in the nonaqueous electrolyte is preferably 0.4 mol/L or higher, more preferably 0.5 mol/L or higher, especially preferably 0.6 mol/L or higher. The upper limit thereof is preferably 1.8 mol/L or lower, more preferably 1.5 mol/L or lower, especially preferably 1.2 mol/L or lower. The concentration of LiPF$_6$ in this case is preferably 0.001 mol/L or higher, more preferably 0.01 mol/L or higher, especially preferably 0.1 mol/L or higher. The upper limit thereof is preferably 1 mol/L or lower, more preferably 0.8 mol/L or lower, especially preferably 0.3 mol/L or lower, provided that the LiPF$_6$ concentration is lower than the concentration of the at least one lithium salt selected from the group consisting of LiN(C$_n$F$_{2n+1}$SO$_2$)$_2$ (wherein n is an integer of 1-4) and lithium bis(oxalato)borate.

In the case where LiPF$_6$ is used as the main salt, the concentration of the at least one lithium salt selected from the group consisting of LiN(C$_n$F$_{2n+1}$SO$_2$)$_2$ (wherein n is an integer of 1-4) and lithium bis(oxalato)borate is preferably 0.001 mol/L or higher, more preferably 0.01 mol/L or higher, especially preferably 0.03 mol/L or higher. The upper limit thereof is preferably 0.3 mol/L or lower, more preferably 0.2 mol/L or lower, especially preferably 0.1 mol/L or lower. In this case, the concentration of LiPF$_6$ is preferably 0.5 mol/L or higher, more preferably 0.6 mol/L or higher, especially preferably 0.7 mol/L or higher. The upper limit thereof is preferably 1.8 mol/L or lower, more preferably 1.7 mol/L or lower, especially preferably 1.5 mol/L or lower.

Furthermore, LiBF$_4$ may be used in combination with the combination of at least one lithium salt selected from the group consisting of LiN(C$_n$F$_{2n-1}$SO$_2$)$_2$ (wherein n is an integer of 1-4) and lithium bis(oxalato)borate with LiPF$_6$. This combination is preferred because it is effective in inhibiting the deterioration caused by high-temperature storage. In this case, the concentration of LiBF$_4$ is generally 0.001 mol/L or higher, preferably 0.01 mol/L or higher, more preferably 0.03 mol/L or higher. The upper limit thereof is generally 0.4 mol/L or lower, preferably 0.15 mol/L or lower, more preferably 0.1 mol/L or lower.

The nonaqueous electrolyte is preferred which contains LiN(C$_n$F$_{2n-1}$SO$_2$)$_2$ (wherein n is an integer of 1-4) and/or lithium bis(oxalato)borate and further contains at least one compound belonging to the group consisting of cyclic compounds represented by general formula (1) given above, compounds represented by general formula (2), chain compounds having in the molecule a structure represented by general formula (3), compounds having an S—F bond in the molecule, nitric acid salts, nitrous acid salts, monofluorophosphoric acid salts, difluorophosphoric acid salts, acetic acid salts, and propionic acid salts. This is because the battery produced with this electrolyte has an improved balance between cycle characteristics and high-temperature storability (in particular, residual capacity and high-load discharge capacity after high-temperature storage).

The nonaqueous-electrolyte secondary battery employing the nonaqueous electrolyte according to this invention is excellent in output characteristics and in high-temperature storability and cycle characteristics. Although the reasons for this are unclear, it is thought that the specific compound exerts some action on the electrodes and reduces the reaction resistance relating to lithium ion elimination/insertion to improve output characteristics. When LiN(C$_n$F$_{2n+1}$SO$_2$)$_2$ (wherein n is an integer of 1-4) and/or lithium bis(oxalato) borate is used as the lithium salt, this lithium salt is thought to moderately reacts on the surfaces of the negative electrode and positive electrode to form a stable composite protective coating film which has excellent lithium ion permeability and is derived from other components of the nonaqueous electrolyte and from this lithium salt. It is presumed that this composite coating film inhibits the highly active electrodes from undergoing unnecessary side reactions with the nonaqueous electrolyte and, as a result, high-temperature storability and cycle characteristics are improved while improving output characteristics.

<Electrolytic Solution [6]>

The nonaqueous electrolyte preferably is one in which the lithium salts as a component of the electrolyte comprise a fluorine-containing lithium salt and the nonaqueous electrolyte contains hydrogen fluoride (HF) in an amount of from 10 ppm to 300 ppm of the whole electrolyte (electrolyte [6]).

In this invention (electrolyte [6]), the kinds and contents of the "nonaqueous solvent", "specific compound", and "other compounds", use conditions therefor, method of preparing the nonaqueous electrolyte, etc. are the same as described above. In this invention (electrolyte [6]), the "fluorine-containing lithium salt" is not particularly limited as long as it is a fluorine-containing lithium salt known to be usable as an electrolyte for nonaqueous electrolytes for lithium secondary batteries. For example, those shown above can be used. One of these may be used alone, or any desired two or more thereof may be used in combination in any desired proportion. Of these, $LiPF_6$, $LiBF_4$, or the like is preferred from the standpoint of the ease of generating hydrogen fluoride (HF) in the presence of the alcohol which will be described later. $LiPF_6$ is preferred when solubility in nonaqueous solvents and secondary-battery performances such as charge/discharge characteristics, output characteristics, and cycle characteristics are comprehensively judged.

Besides the fluorine-containing lithium salt, a lithium salt containing no fluorine may be used as a mixture therewith in the electrolyte. Examples thereof include the following.

Inorganic lithium salts; perhalogen acid salts such as $LiClO_4$, $LiBrO_4$, and $LiIO_4$; and inorganic chloride salts such as $LiAlCl_4$.

Oxalatoborate salts: lithium bis(oxalato)borate.

The concentration of that lithium salt in the nonaqueous electrolyte is not particularly limited. However, it is generally 0.5 mol/L or higher, preferably 0.6 mol/L or higher, more preferably 0.7 mol/L or higher. The upper limit thereof is generally 2 mol/L or lower, preferably 1.8 mol/L or lower, more preferably 1.7 mol/L or lower. When the concentration thereof is too low, there are cases where the nonaqueous electrolyte has an insufficient electrical conductivity. On the other hand, when the concentration thereof is too high, there are cases where this electrolyte has an increased viscosity and hence a reduced electrical conductivity, and this may result in a decrease in performances of the lithium secondary battery.

The concentration of the fluorine-containing lithium salt in the nonaqueous electrolyte is not particularly limited. However, the concentration thereof is generally 0.5 mol/L or higher, preferably 0.6 mol/L or higher, more preferably 0.7 mol/L or higher. The upper limit thereof is generally 2 mol/L or lower, preferably 1.8 mol/L or lower, more preferably 1.7 mol/L or lower. When the concentration thereof is too low, there are cases where this nonaqueous electrolyte has an insufficient electrical conductivity or the generation of hydrogen fluoride (HF) is insufficient. On the other hand, when the concentration thereof is too high, there are cases where this nonaqueous electrolyte has an increased viscosity and hence a reduced electrical conductivity or the generation of hydrogen fluoride (HF) proceeds excessively, and this may result in a decrease in performances of the lithium secondary battery.

The proportion of the fluorine-containing lithium salt to all lithium salts in the nonaqueous electrolyte is preferably 50% by mass or higher, especially preferably 70% by mass or higher, based on all lithium salts. It is also especially preferred that all the lithium salt(s) mixed should be one or more fluorine-containing lithium salts. When the proportion of the fluorine-containing lithium salt(s) is too low, there are cases where the generation of hydrogen fluoride is insufficient.

One lithium salt may be used alone, or any desired two or more lithium salts may be used in any desired proportion. In the case where two or more lithium salts are used in combination, a preferred example thereof is a combination of $LiPF_6$ and $LiBF_4$. In this case, the proportion of $LiBF_4$ to the sum of both is especially preferably from 0.01% by mass to 20% by mass, more preferably from 0.1% by mass to 5% by mass. Another preferred example is a combination of an inorganic fluoride salt and a perfluoroalkanesulfonylimide salt. In this case, the proportion of the inorganic fluoride salt to the sum of both is especially preferably from 70% by mass to 99% by mass, more preferably from 80% by mass to 98% by mass. This combination is effective in inhibiting the deterioration caused by high-temperature storage.

The nonaqueous electrolyte comprising a nonaqueous solvent and a fluorine-containing lithium salt, e.g., $LiPF_6$, dissolved therein frequently contains hydrogen fluoride (HF). With respect to the causes of the presence of hydrogen fluoride (HF) in this electrolyte, the hydrogen fluoride can include one derived from an impurity contained in the fluorine-containing lithium salt and one yielded by the reaction of water or an alcohol present in a slight amount in the nonaqueous solvent with the fluorine-containing lithium salt. In patent document 16, which was cited above, there is a statement to the effect that the hydrogen fluoride (HF) contained in a nonaqueous electrolyte should be removed as much as possible, especially preferably to 15 ppm or lower. In the Examples given therein, the nonaqueous electrolyte having a concentration of 9 ppm gave most satisfactory results concerning cycle characteristics.

In the case of this invention (electrolyte [6]), the content of hydrogen fluoride (HF) is generally 10 ppm or higher, preferably 12 ppm or higher, more preferably 15 ppm or higher, especially preferably 20 ppm or higher, and is generally 300 ppm or lower, preferably 250 ppm or lower, more preferably 200 ppm or lower, even more preferably 150 ppm or lower. When the content thereof is too low, there are cases where the effect of improving output is insufficient. When the content thereof exceeds the upper limit of that range, there are cases where cycle characteristics as well as output are adversely influenced.

In order that hydrogen fluoride (HF) be contained, hydrogen fluoride may be directly added to the nonaqueous electrolyte or to a nonaqueous solvent as a raw material, or may be generated within the nonaqueous electrolyte by utilizing the reaction of water or an alcohol with a fluorine-containing lithium salt. For attaining this, use may be made of, for example, a method in which water or an alcohol is added to the nonaqueous electrolyte or either of these ingredients is incorporated beforehand into a raw-material nonaqueous solvent in an appropriate concentration. In this method, there are cases where a certain time period is required for the reaction to be completed. Namely, when a fluorine-containing lithium salt is dissolved in a nonaqueous solvent containing water or an alcohol and the specific compound is added thereto to prepare an electrolyte, then the reaction of the water or alcohol with the fluorine-containing lithium salt requires some time before completion. However, in the case where this method is used in battery fabrication, it is not always necessary to complete the reaction before initiation of the next step. In this invention, hydrogen fluoride (HF) may be generated within the battery as long as hydrogen fluoride (HF) is present in a concentration within the specific range when this battery functions as a battery. In the case where hydrogen fluoride (HF) is generated in a raw-material nonaqueous solvent, use may be made of a method in which hydrogen fluoride (HF) is generated in part of nonaqueous solvents to be used as a raw material and this solvent is mixed with a nonaqueous solvent containing neither water nor an alcohol.

In the case where water or an alcohol is to be incorporated beforehand into a nonaqueous solvent, there are cases where the solvent to be used, according to the purity thereof, originally contains water or an alcohol in an amount larger than a necessary amount. In this case, it is preferred to purify the nonaqueous solvent by an adsorption treatment, distillation, crystallization, or another technique to remove the water or alcohol before the solvent is used. A nonaqueous solvent which has undergone such water or alcohol removal and in which water or the alcohol remains in a given amount may be used as it is. Alternatively, a purified nonaqueous solvent may be used after water or an alcohol is added thereto so as to result in a given content.

The adsorption treatment can be conducted as long as the nonaqueous solvent is liquid. The nonaqueous solvent can be purified with an adsorbent which neither dissolves in nor reacts with the solvent, such as alumina, activated carbon, silica gel, Molecular Sieves (trade name) 4A, and/or Molecular Sieves 5A. In this case, raw materials which are liquid at ordinary temperature, such as dimethyl carbonate, may be separately purified. Use may also be made of a method in which raw materials which are solid at ordinary temperature, such as ethylene carbonate, are mixed with other raw materials to prepare a liquid and these raw materials are purified together. Examples of contacting methods include a method in which the nonaqueous solvent is continuously passed (hereinafter referred to as continuous process) and a method in which an adsorbent is added to the nonaqueous solvent and this mixture is allowed to stand or stirred (hereinafter referred to as batch process). In the continuous process, the contact time is preferably 0.1-5/hr in terms of liquid hourly space velocity (LHSV). The contact temperature is preferably 10-60° C. In the batch process, it is preferred that an adsorbent should be added in an amount of 0.1-30% by mass based on the nonaqueous solvent to treat the solvent for from 0.25 hours to 24 hours.

Raw materials which are solid at ordinary temperature, such as ethylene carbonate, may be subjected to a crystallization treatment. Crystallization can be conducted using a solvent such as acetonitrile, acetone, or toluene.

It is preferred that those purification conditions should be suitably regulated according to the kind and purity of the raw material to be used and the target content of water or an alcohol.

In producing the nonaqueous electrolyte according to this invention (electrolyte [6]) without adding hydrogen fluoride (HF), a nonaqueous solvent containing water or an alcohol is used for the nonaqueous electrolyte. Namely, water or an alcohol is added to a nonaqueous solvent before the solvent is used, or a nonaqueous solvent is used without removing water or an alcohol therefrom. It is preferred that an alcohol, in particular, a monohydric or dihydric alcohol, is contained. The alcohol is not particularly limited, and the kind of the alkyl group and the valence of the alcohol also are not particularly limited. Preferred examples thereof include monohydric alcohols such as methyl alcohol, ethyl alcohol, n-propyl alcohol, isopropyl alcohol, n-butyl alcohol, and t-butyl alcohol; diols such as ethylene glycol and propylene glycol; and triols such as glycerol. When "water or an alcohol" is added, especially preferred examples thereof include methyl alcohol, ethyl alcohol, ethylene glycol, and propylene glycol.

From the standpoints of productivity, cost, etc., it is industrially preferred that an alcohol which comes in due to nonaqueous-solvent production steps, etc. should be used for the nonaqueous solvent to be used for the electrolyte. Methyl alcohol, ethyl alcohol, ethylene glycol, or propylene glycol is especially preferred partly because these alcohols are contained in preferred nonaqueous solvents to be used.

It is desirable that the nonaqueous solvent to be used in the nonaqueous electrolyte according to this invention (electrolyte [6]) should contain water or an alcohol in an amount of 3 ppm or larger, preferably 10 ppm or larger, more preferably 20 ppm or larger, even more preferably 30 ppm or larger. The upper limit of the content thereof is desirably 150 ppm or lower, preferably 130 ppm or lower, more preferably 120 ppm or lower, even more preferably 100 ppm or lower. When the content of water or an alcohol in the nonaqueous solvent is too low, there are cases where high output characteristics, which are a feature of this invention, are not sufficiently obtained. When the content thereof is too high, there are cases where cycle characteristics and high-temperature storability are impaired.

In the case of a monohydric alcohol, among those alcohols, the content thereof in the nonaqueous solvent is preferably 5 ppm or higher, more preferably 10 ppm or higher, even more preferably 15 ppm or higher, and is preferably 100 ppm or lower, more preferably 80 ppm or lower, even more preferably 50 ppm or lower. In the case of a diol, the content thereof in the nonaqueous solvent is 3 ppm or higher, preferably 10 ppm or higher, more preferably 15 ppm or higher, even more preferably 20 ppm or higher, and is preferably 100 ppm or lower, more preferably 90 ppm or lower, even more preferably 80 ppm or lower, especially preferably 70 ppm or lower. In the case of water, the content thereof in the nonaqueous solvent is 3 ppm or higher, preferably 5 ppm or higher, more preferably 10 ppm or higher, and is preferably 100 ppm or lower, more preferably 80 ppm or lower, even more preferably 70 ppm or lower.

When hydrogen fluoride (HF) is caused to coexist in the certain amount with the specific compound in the nonaqueous electrolyte, the output of the lithium secondary battery can be improved without adversely influencing cycle characteristics.

Although the reasons why the coexistence of a certain amount of hydrogen fluoride (HF) with the specific compound in the nonaqueous electrolyte according to this invention improves output without adversely influencing cycle characteristics are unclear, they are thought to be as follows. However, the following functions/principle should not be construed as limiting the invention. There are cases where the specific compound has the effect of improving output characteristics to some degree regardless of the content of hydrogen fluoride (HF). It is thought that the specific compound exerts some action on the electrodes of the battery and reduces the reaction resistance relating to lithium ion elimination/insertion to thereby produce that effect. There is a possibility that hydrogen fluoride (HF) might enhance that action or serve as a medium for the action. For example, both of the specific compound and hydrogen fluoride (HF) act on the electrodes, or hydrogen fluoride (HF) serves as a medium when the specific compound acts on the electrodes. It is further thought that the hydrogen fluoride (HF) which thus serves has become capable of being stably present in the battery and is less apt to exert an adverse influence, e.g., to reduce cycle characteristics.

<Electrolytic Solution [7]>

The nonaqueous electrolyte preferably is one in which the electrolyte contains vinylene carbonate and the content of the vinylene carbonate is in the range of from 0.001% by mass to 3% by mass based on the whole electrolyte (electrolyte [7]).

In this invention (electrolyte [7]), the kinds and contents of the "lithium salt", "nonaqueous solvent", "specific compound", and "other compounds", use conditions therefor, method of preparing the nonaqueous electrolyte, etc. are the same as described above.

The nonaqueous electrolyte in this invention is characterized by containing vinylene carbonate as stated above. In this invention, the content of vinylene carbonate in the whole nonaqueous electrolyte is generally 0.001% by mass or higher, preferably 0.01% by mass or higher, more preferably 0.1% by mass or higher. The content thereof is generally 3% by mass or lower, preferably 2.8% by mass or lower, more preferably 2.5% by mass or lower. When the concentration of vinylene carbonate is too low, there are cases where the effect of improving cycle characteristics is difficult to obtain. On the other hand, too high concentrations thereof may lead to a decrease in low-temperature characteristics of the battery.

The proportion of the content of vinylene carbonate to the content of the specific compound in the nonaqueous electrolyte is not particularly limited. However, the proportion thereof in terms of ratio by mass is preferably 0.01 or higher, more preferably 0.1 or higher, especially preferably 0.3 or higher. The upper limit thereof is preferably 300 or lower, more preferably 100 or lower, especially preferably 30 or lower. When the proportion thereof is far outside that range, there are cases where the purpose of simultaneously attaining satisfactory cycle characteristics and satisfactory low-temperature characteristics is not accomplished.

When vinylene carbonate is used in combination with the specific compound, e.g., a difluorophosphoric acid salt, cycle characteristics are improved even when the vinylene carbonate is contained in a small amount. Although the reasons for this are unclear, the following are thought. The specific compound, e.g., a difluorophosphoric acid salt, reduces the amount of vinylene carbonate to be consumed at the positive electrode by the charge/discharge of the battery to thereby enable the vinylene carbonate to effectively form a coating film on the negative electrode. Furthermore, the coexistence of the specific compound, e.g., a difluorophosphoric acid salt, with vinylene carbonate changes the quality of the coating film to be formed on the negative electrode and gives a coating film of satisfactory quality which is thin and low in resistance and, despite this, can more highly inhibit the solvent and the electrolyte lithium salt from decomposing. These are thought to be causes of the improvement in cycle characteristics. In addition, these functions are thought to further realize an improvement in low-temperature characteristics.

<Electrolytic Solution [8]>

The nonaqueous electrolyte preferably is one in which the electrolyte further contains at least one compound selected from the group consisting of compounds represented by general formula (4) given above, heterocyclic compounds containing nitrogen and/or sulfur, cyclic carboxylic acid esters, and fluorine-containing cyclic carbonates in an amount in the range of from 0.001% by mass to 5% by mass based on the whole nonaqueous electrolyte (electrolyte [8]).

In this invention (electrolyte [8]), the kinds and contents of the "lithium salt", "nonaqueous solvent", "specific compound", and "other compounds", use conditions therefor, method of preparing the nonaqueous electrolyte, etc. are the same as described above.

The nonaqueous electrolyte in this invention (electrolyte [8]) further contains at least one compound selected from the group consisting of compounds represented by general formula (4) given above, heterocyclic compounds containing nitrogen and/or sulfur, cyclic carboxylic acid esters, and fluorine-containing cyclic carbonates (hereinafter the at least one compound is often abbreviated to "specific compound(s) B") in an amount in the range of from 0.001% by mass to 5% by mass based on the whole nonaqueous electrolyte.

[[Compounds Represented by General Formula (4)]]

In general formula (4) given above, $R^9$ to $R^{12}$ may be the same or different and each represent a group constituted of one or more elements selected from the group consisting of H, C, N, O, F, S, and P.

With respect to the state in which those atoms are present, the atoms each preferably are one constituting or contained in, e.g., a hydrogen atom, a fluorine atom, an alkyl, cycloalkyl, alkenyl, alkynyl, halogenated alkyl, alkoxy, carbonyl, carbonyloxy, oxycarbonyl, oxycarbonyloxy, sulfonyl, oxysulfonyl, sulfonyloxy, phosphoryl, or phosphinyl group, or the like. The compounds represented by general formula (4) have a molecular weight of preferably 500 or lower, especially preferably 300 or lower, more preferably 200 or lower.

Examples of the compounds represented by general formula (4) include carbonates such as vinylethylene carbonate, divinylethylene carbonate, methyl vinyl carbonate, ethyl vinyl carbonate, propyl vinyl carbonate, divinyl carbonate, allyl methyl carbonate, allyl ethyl carbonate, allyl propyl carbonate, and diallyl carbonate; esters such as vinyl acetate, vinyl propionate, vinyl acrylate, vinyl crotonate, vinyl methacrylate, allyl acetate, allyl propionate, methyl acrylate, ethyl acrylate, propyl acrylate, methyl methacrylate, ethyl methacrylate, and propyl methacrylate; sulfones such as divinyl sulfone, methyl vinyl sulfone, ethyl vinyl sulfone, propyl vinyl sulfone, diallyl sulfone, allyl methyl sulfone, allyl ethyl sulfone, and allyl propyl sulfone; sulfites such as divinyl sulfite, methyl vinyl sulfite, ethyl vinyl sulfite, and diallyl sulfite; sulfonates such as vinyl methanesulfonate, vinyl ethanesulfonate, allyl methanesulfonate, allyl ethanesulfonate, methyl vinylsulfonate, and ethyl vinylsulfonate; and sulfates such as divinyl sulfate, methyl vinyl sulfate, ethyl vinyl sulfate, and diallyl sulfate. Especially preferred of these are vinylethylene carbonate, divinylethylene carbonate, vinyl acetate, vinyl propionate, vinyl acrylate, divinyl sulfone, and vinyl methanesulfonate.

[[Heterocyclic Compounds Containing Nitrogen and/or Sulfur]]

The heterocyclic compounds containing nitrogen and/or sulfur are not particularly limited. Examples thereof include pyrrolidinone compounds such as 1-methyl-2-pyrrolidinone, 1,3-dimethyl-2-pyrrolidinone, 1,5-dimethyl-2-pyrrolidinone, 1-ethyl-2-pyrrolidinone, and 1-cyclohexyl-2-pyrrolidinone; oxazolidinone compounds such as 3-methyl-2-oxazolidinone, 3-ethyl-2-oxazolidinone, and 3-cyclohexyl-2-oxazolidinone; piperidone compounds such as 1-methyl-2- piperidone and 1-ethyl-2-piperidone; imidazolidinone compounds such as 1,3-dimethyl-2-imidazolidinone and 1,3-diethyl-2-imidazolidinone; sulfolane compounds such as sulfolane, 2-methylsulfolane, and 3-methylsulfolane; sulfolane; sulfites such as ethylene sulfite and propylene sulfite; and sultones such as 1,3-propanesultone, 1-methyl-1,3-propanesultone, 3-methyl-1,3-propanesultone, 1,4-butanesultone, 1,3-propenesultone, and 1,4-butenesultone. Especially preferred of these are 1-methyl-2-pyrrolidinone, 1-methyl-2-piperidone, 1,3-propanesultone, 1,4-butanesultone, 1,3-propenesultone, and 1,4-butenesultone.

[[Cyclic Carboxylic Acid Esters]]

The cyclic carboxylic acid esters are not particularly limited. Examples thereof include γ-butyrolactone, γ-valerolactone, γ-hexalactone, γ-heptalactone, γ-octalactone, γ-nonalactone, γ-decalactone, γ-undecalactone, γ-dodecalactone, α-methyl-γ-butyrolactone, α-ethyl-γ-butyrolactone, α-propyl-γ-butyrolactone, α-methyl-γ-valerolactone, α-ethyl-γ-valerolactone, α,α-dimethyl-γ-butyrolactone, α,α-dimethyl-γ-valerolactone, δ-valerolactone, δ-hexalactone, δ-octalactone, δ-nonalactone, δ-decalactone, δ-undecalactone, and δ-dodecalactone. Especially preferred of these are γ-butyrolactone and γ-valerolactone.

[[Fluorine-Containing Cyclic Carbonates]]

The fluorine-containing cyclic carbonates are not particularly limited. Examples thereof include fluoroethylene carbonate, difluoroethylene carbonate, trifluoroethylene carbonate, tetrafluoroethylene carbonate, and trifluoropropylene carbonate. Especially preferred of these is fluoroethylene carbonate.

One of the specific compounds B, i.e., at least one compound selected from the group consisting of compounds represented by general formula (4), heterocyclic compounds containing nitrogen and/or sulfur, cyclic carboxylic acid esters, and fluorine-containing cyclic carbonates, may be used alone. Alternatively, any desired two or more compounds selected from these may be used in combination in any desired proportion. With respect to the compounds in each group in the specific compounds B, one of these may be used alone or any desired two or more thereof may be used in combination in any desired proportion.

The proportion of those specific compounds B in the nonaqueous electrolyte is generally 0.001% by mass or higher, more preferably 0.05% by mass or higher, even more preferably 0.1% by mass or higher, in terms of total content thereof based on the whole nonaqueous electrolyte. The upper limit of the total content thereof is generally 5% by mass or lower, more preferably 4% by mass or lower, even more preferably 3% by mass or lower. When the concentration of the specific compounds B is too low, there are cases where the effect of improving cycle characteristics and storability is difficult to obtain. On the other hand, too high concentrations thereof may lead to a decrease in charge/discharge efficiency.

The nonaqueous-electrolyte secondary battery employing the nonaqueous electrolyte according to this invention is excellent in low-temperature discharge characteristics and in high-temperature storability and cycle characteristics. Although the reasons for this are unclear, they are thought to be as follows. However, the following functions/principle should not be construed as limiting the invention. The specific compound B undergoes reductional decomposition on the negative electrode during initial charge to form on the surface of the negative electrode a stable coating film derived from the specific compound B to thereby improve storability and cycle characteristics. This coating film, however, has considerably increased resistance at low temperatures. There has hence been a problem that the coating film reduces low-temperature discharge characteristics. Coexistence with the specific compound A is thought to inhibit the specific compound B from excessively reacting and enable it to form a stable composite protective coating film having excellent lithium ion permeability even at low temperatures. High-temperature storability and cycle characteristics are presumed to be thus improved while improving low-temperature discharge characteristics.

Moreover, when the battery elements held in each battery case of the secondary battery have an electric capacity of 3 ampere-hours (Ah) or higher and/or when the secondary battery has a direct-current resistance component of 10 milliohms ($\Omega$) or less, then the contribution of the direct-current resistance component is small. Those effects inherent in the nonaqueous electrolyte according to this invention are thought to be more apt to be produced in such battery than in batteries in which the contribution of a direct-current resistance component is large.

<Electrolytic Solution [9]>

The nonaqueous electrolyte preferably is one in which the electrolyte further contains an overcharge inhibitor (electrolyte [9]).

In this invention (electrolyte [9]), the kinds and contents of the "lithium salt", "nonaqueous solvent", "specific compound", and "other compounds", use conditions therefor, method of preparing the nonaqueous electrolyte, etc. are the same as described above.

The nonaqueous electrolyte for secondary battery according to this invention (electrolyte [9]) is characterized by containing an overcharge inhibitor. The overcharge inhibitor is not particularly limited. For example, the compound shown under the following (1), (2), or (3) is preferred.

(1) Biphenyl, terphenyl, diphenyl ether, or dibenzofuran which each may be substituted by one or more alkyl groups and/or one or more fluorine atoms
(2) Partially hydrogenated terphenyl
(3) Benzene substituted by one or more tertiary alkyl groups, one or more cycloalkyl groups, one or more fluorine atoms, and/or one or more methoxy groups Compound (1) is not particularly limited. Examples thereof include benzene ring assembly compounds such as biphenyl, alkylbiphenyls, and terphenyl; fluorine-containing benzene ring assembly compounds such as 2-fluorobiphenyl; aromatic ethers such as diphenyl ether; and heterocycle/aromatic-ring assembly compounds such as dibenzofuran.

Compound (3) is not particularly limited. Examples thereof include (cyclo)alkylbenzenes such as cyclohexylbenzene, t-butylbenzene, and t-amylbenzene; fluorine-atom-substituted benzene compounds such as o-cyclohexylfluorobenzene and p-cyclohexylfluorobenzene; and fluorine-containing anisoles such as 2,4-difluoroanisole, 2,5-difluoroanisole, 2,6-difluoroanisole, and 3,5-difluoroanisole.

Preferred examples include aromatic compounds such as biphenyl, alkylbiphenyls, terphenyl, partially hydrogenated terphenyls, cyclohexylbenzene, t-butylbenzene, t-amylbenzene, diphenyl ether, and dibenzofuran. These compounds are especially preferred because they enhance the effect of improving rate characteristics after high-temperature storage in this invention.

Two or more overcharge inhibitors may be used in combination. When two or more are used in combination, it is especially preferred to use cyclohexylbenzene or terphenyl (or product of partial hydrogenation thereof) in combination with t-butylbenzene or t-amylbenzene.

The term partially hydrogenated terphenyl herein means one formed by causing the double bonds of the benzene rings of terphenyl to partly add hydrogen. The partially hydrogenated terphenyl may be a single compound or may be a mixture of two or more compounds. For example, it may be a mixture of two or more partially hydrogenated terphenyls differing in the degree of partial hydrogenation, or may be partially hydrogenated terphenyls equal in the degree of partial hydrogenation. Furthermore, it may be a mixture of partially hydrogenated terphenyls differing in the position of the hydrogenated benzene ring, or may be a mixture of compounds differing in the positions of double bonds or a mixture comprising constitutional isomers.

The degree of partial hydrogenation of terphenyl is a value calculated on the assumption that the degree of partial hydrogenation of terphenyl in which no hydrogen has added to the double bonds of the benzene rings is 0% and the degree of partial hydrogenation of completely hydrogenated terphenyl, i.e., the case where hydrogen has added to all double bonds (the case where 18 mol of hydrogen atoms have added to 1 mol of terphenyl), is 100%. In the case of a mixture, a mole-average value is used. For example, in the case where 2 mol of hydrogen atoms have added to 1 mol of terphenyl, the degree of partial hydrogenation is 11.1% ($=2/18$).

When the degree of partial hydrogenation defined above is used, the degree of partial hydrogenation of the partially hydrogenated terphenyl for use in this invention can be a value which is higher than 0% and lower than 100%. Although the partially hydrogenated terphenyl can include terphenyl (degree of partial hydrogenation, 0%) or completely hydrogenated m-terphenyl (degree of hydrogenation, 100%), such a mixture preferably is one which has a degree of partial hydrogenation higher than 0% and lower than 100%. From the standpoints of battery storability and solubility in the electrolyte, the degree of partial hydrogenation of the terphenyl is preferably 30-70%, more preferably 35-60%. Although the terphenyl or the partially hydrogenated terphenyl is not particularly limited, m-terphenyl or a partially hydrogenated m-terphenyl is especially preferred.

The content of each of those overcharge inhibitors in the nonaqueous electrolyte is generally 0.01% by mass or higher, preferably 0.1% by mass or higher, especially preferably 0.2% by mass or higher. The upper limit thereof is generally 5% by mass or lower, preferably 3% by mass or lower, especially preferably 2% by mass or lower. When the content thereof is lower than the lower limit, there are cases where safety in overcharge cannot be sufficiently secured. When the content thereof exceeds the upper limit, there are cases where this nonaqueous electrolyte, even when the specific compound is incorporated therein, cannot give a battery having satisfactory storability.

When the specific compound is present, the deterioration of rate characteristics after storage to be caused by an overcharge additive is less apt to occur. Although unclear, the reasons for this are presumed to be as follows. In general, an overcharge inhibitor upon overcharge forms a polymer film on the surface of the positive electrode to considerably increase the internal resistance of the battery or generates a gas during the polymerization to thereby operate the current breaker in the battery can. An overcharge inhibitor thus functions to improve the safety of the secondary battery. However, it is thought that the polymer film formation partly occurs also during the high-temperature storage of the battery in a charged state and this is a cause of a decrease in battery discharge capacity and deterioration of rate characteristics. In the case where the specific compound according to the invention is present in such system, this compound acts on the surface of the positive electrode to form a weak barrier and thereby inhibit the reaction between the overcharge inhibitor and the positive-electrode active material in a usual charged state. However, when the battery is overcharged and the positive electrode comes into an excessively active state, then the weak barrier breaks or the reaction between the positive electrode and the overcharge inhibitor is accelerated despite inhibition by the barrier. It is thought that polymerization reaction thus proceeds and the desired safety in overcharge can be secured.

<Battery Design (Battery Constitution)>

The constitution of the lithium secondary battery (battery constitution) of the invention will be described below in detail.

The lithium secondary battery of the invention, which is capable of charge/discharge, is constituted at least of a positive electrode and a negative electrode which are capable of occluding/releasing lithium ions, the nonaqueous electrolyte described above, a microporous film separator disposed between the positive electrode and negative electrode, current collector terminals, and a case or the like. A protective element may be attached to an inner part and/or outer part of the battery according to need. In this description, characteristic parts of the constitution of the lithium secondary battery (battery constitution) of this invention are often referred to as structure [1] to structure [6].

[Discharge Capacity] (Structure [3])

The lithium secondary battery of this invention preferably is one in which the battery elements held in each battery case of the secondary battery have an electric capacity (electric capacity as measured when the battery in a fully charged state is discharged to a discharged state) (this capacity is often abbreviated to "battery capacity") of 3 ampere-hours (Ah) or higher. This is because such electric capacity enhances the effect of improving output characteristics. Consequently, it is preferred that the positive-electrode plate should be designed to have a discharge capacity, as measured in discharge from a fully charged state, of from 3 ampere-hours (Ah) to 20 Ah, more preferably from 4 Ah to 10 Ah (structure [3]). When the discharge capacity thereof is lower than 3 Ah, there are cases where high-current discharge results in a large decrease in voltage due to electrode reaction resistance and hence in a poor power efficiency. On the other hand, when the discharge capacity thereof is higher than 20 Ah, electrode reaction resistance is low and a satisfactory power efficiency is obtained. In this case, however, the battery has a wide temperature distribution during pulse charge/discharge due to internal heat generation and has poor durability in repetitions of charge/discharge. In addition, the efficiency of heat dissipation in the case of abrupt heat generation in an abnormality, such as overcharge or internal short-circuiting, is also poor. There are hence cases where the internal pressure increases and this not only results in the phenomenon in which the gas release valve works (valve working) but also increases the probability that the phenomenon in which the battery contents are vigorously ejected outside (rupture) occurs.

[Current Collector Structure] (Structure [2] and Structure [4])

The current collector structure is not particularly limited. However, for more effectively realizing an improvement in output characteristics of the lithium secondary battery of this invention, it is necessary to employ a structure reduced in the resistance of wiring parts and joint parts. In the case where the battery has such reduced internal resistance, use of the nonaqueous electrolyte described above produces its effects especially satisfactorily.

In the case where electrode groups are assembled into the multilayer structure which will be described later, a structure in which the current collector tabs for respective electrode layers are bundled together and connected to a terminal is suitable. When each electrode has a large area, this results in increased internal resistance. In this case, it is preferred to dispose two or more current collector tabs in each electrode to reduce the resistance. In the case of an electrode group having the wound structure which will be described later, two or more current collector tabs may be disposed on each of the positive electrode and negative electrode and bundled into a terminal to thereby reduce internal resistance.

By optimizing the current collector structure, internal resistance can be minimized. In a battery to be used at a high current, the impedance as measured by the 10-kHz alternating-current method (hereinafter abbreviated to "direct-current resistance component") is regulated preferably to 20 milliohms (mΩ) or lower, more preferably 10 milliohms (mΩ) or lower, even more preferably 5 milliohms (mΩ) or lower (structure [2]). On the other hand, when the direct-current resistance component is reduced to below 0.1 milliohm, high-output characteristics improve. In this case, however, the proportion by volume of the structural materials for current collection increases and this may result in a decrease in battery capacity.

For an impedance measurement, use was made of battery analyzer 1470, manufactured by Solartron, and frequency response analyzer 1255B, manufactured by Solartron. An alternating current of 10 kHz was applied with a bias of 5 mV, and the resultant resistance was measured and taken as direct-current resistance component.

The nonaqueous electrolyte in this invention is effective in reducing the reaction resistance relating to lithium elimination from and insertion into the electrode active materials, and this is thought to be a factor which realizes satisfactory output characteristics. However, it was found that in ordinary batteries having a high direct-current resistance component, the effect of reducing reaction resistance cannot be completely reflected in output characteristics because of inhibition by the direct-current resistance component. This drawback is mitigated by using a battery having a low direct-current resistance component, whereby the effects of the invention can be sufficiently produced.

From the standpoint of enabling the nonaqueous electrolyte to bring about its effects to fabricate a battery having high output characteristics, it is especially preferred that the requirement concerning impedance should be satisfied simultaneously with the requirement described above that the battery elements held in each battery case of the secondary battery have an electric capacity (electric capacity as measured when the battery in a fully charged state is discharged to a discharged state) (battery capacity) of 3 ampere-hours (Ah) or higher.

It is preferred that the connection between the current collector tabs and the terminal should have been made by any of spot welding, high-frequency welding, and ultrasonic welding (structure [4]). Although these welding techniques are easy welding techniques reduced in resistance, they have been regarded as disadvantageous because the welds react with impurities contained in the nonaqueous electrolyte and with by-products, etc. during long-term use and thus deteriorate to increase the direct-current resistance component. However, it is thought that when the nonaqueous electrolyte containing the specific compound is used, a stable coating film can be formed on the welds and the nonaqueous electrolyte is inhibited from undergoing side reactions on the positive electrode. It is therefore thought that even in long-term use, deterioration of the welds is less apt to proceed and this battery suffers no increase in direct-current resistance component and can retain high output.

[Battery Case 1] (Structure [5])

The material of the battery case is not particularly limited as long as it is a substance stable to the nonaqueous electrolyte to be used. Preferred examples thereof are metals such as nickel-plated steel sheets, stainless steel, aluminum or aluminum alloys, and magnesium alloys or laminated films comprising a resin and an aluminum foil. Especially preferred from the standpoint of weight reduction is a metal which is aluminum or an aluminum alloy or a laminated film including the metal.

When the nonaqueous electrolyte described above is used in this invention, it is especially preferred to use a metal which is aluminum or an aluminum alloy (structure [5]). Aluminum or aluminum alloys are lightweight materials having high formability. However, when such material is used as a battery case over long, it reacts with impurities contained in the nonaqueous electrolyte and with by-products, etc. and deteriorates. There are cases where with the progress of the deterioration, the case decreases in strength or is holed. When the nonaqueous electrolyte containing the specific compound is used, a stable coating film can be formed on the aluminum surface or aluminum alloy surface and this nonaqueous electrolyte is inhibited from undergoing side reactions on the positive electrode. Because of this, deterioration of the case is less apt to proceed even in long-term use.

Examples of the case made of the metal include one of a sealed structure formed by fusion-bonding metallic members to each other by laser welding, resistance welding, or ultrasonic welding and one of a caulked structure obtained by caulking members of the metal through a resinous gasket. Examples of the case made of the laminated film include a sealed structure formed by thermally fusion-bonding resin layers to each other. For the purpose of enhancing sealability, a resin different from the resin used in the laminated film may be interposed between the resin layers. Especially when resin layers are thermally fusion-bonded to each other through a current collector terminal to produce a sealed structure, metal/resin bonding is necessary and it is therefore preferred that the resin to be interposed should be a resin having polar groups or a modified resin having polar groups introduced therein.

[Battery Case 2] (Structure [6])

In this invention, it is also preferred that the battery case should be made of a casing material in which at least part of the battery inner side comprises a sheet formed from a thermoplastic resin and with which the electrode group can be enclosed by placing the electrode group in the casing material and bonding layers of the thermoplastic resin to each other by heat sealing (structure [6]).

The material of the battery case in structure [6] should be a material which is lightweight and stable to the nonaqueous electrolyte to be used, for the purpose of battery weight reduction, and in which at least part of the battery inner side comprises a sheet formed from a thermoplastic resin, from the standpoint of the necessity of easily enclosing an electrode group without fail.

In structure [6], the electrode group is enclosed by bonding layers of the thermoplastic resin to each other by heat sealing. The term "heat sealing" herein means an operation in which the thermoplastic-resin layers are brought into intimate contact with each other and the layers in this state are heated to a temperature not lower than the melting point of the thermoplastic resin to thereby bond the thermoplastic-resin layers to each other. It is preferred to use a sealer which has a strip-form heating part and is capable of heating with pressing. Although at least part of the battery inner side is made of a thermoplastic resin, the term "at least part" herein means that the sheet has a peripheral region sufficient for enclosing the electrode group. Only the part which is to be heat-sealed may be made of a thermoplastic resin. From the standpoint of the efficiency of a sheet production step, it is preferred that the battery inner side of the sheet should be wholly covered with a thermoplastic-resin layer.

Furthermore, in structure [6], when the microporous film separator which will be described later has the property of closing the pores upon heating, then the battery case preferably is made of a casing material in which at least part of the battery inner side comprises a sheet formed from a thermoplastic resin having a melting point higher than the pore closing initiator temperature of the microporous film separator. This casing material is preferred from the standpoint of safety in an abnormality, e.g., overcharge. The reasons for this are as follows. In case of abnormal heat generation due to, e.g., overcharge, the battery temperature rises. When the temperature exceeds the melting point of the thermoplastic resin constituting the casing material, the battery case ruptures or the electrolyte leaks out. There are cases where such troubles lead to a fire. However, when the microporous film separator has the property of closing the pores upon heating, then the pores of the microporous film separator are closed before the electrolyte leaks out through the casing material, whereby further heat generation can be inhibited. Namely, that constitution is preferred because there are cases where the abnormal heat generation leads to neither a rupture nor a fire. The term melting point herein means melting temperature such as that measured by the JIS K7121 method.

The thermoplastic resin in structure [6] is not particularly limited. Preferred examples thereof include polyolefins such as polyethylene, polypropylene, modified polyolefins, and polyolefin copolymers; polyesters such as poly(ethylene terephthalate); and polyamides such as nylons. One thermoplastic resin may be used alone or two or more thermoplastic resins may be used.

In this structure [6], a thermoplastic resin only may be used as the "at least part of the casing material". However, it is also preferred to use a composite material comprising a thermoplastic resin and another material such as, e.g., a thermosetting resin, elastomer, metallic material, glass fibers, or carbon fibers. The thermoplastic resin or the composite material may contain a filler or the like. The composition material especially preferably is a laminated sheet comprising a combination of a thermoplastic-resin layer with an elemental metal, such as aluminum, iron, copper, nickel, titanium, molybdenum, or gold, or an alloy such as stainless steel or Hastelloy. More preferred is a laminated sheet which comprises a combination with aluminum metal and has excellent processability. Namely, it is more preferred that the casing material should comprise a laminated sheet composed of superposed layers comprising an aluminum layer and a thermoplastic-resin layer. These metals or alloys each may be used as a foil of the metal or the like or as a vapor-deposited metal film.

In structure [6], examples of the case employing the casing material described above include one of a sealed structure formed by fusion-bonding resin layers to each other. For the purpose of enhancing sealability, a resin different from the resin used in the casing material may be interposed between the resin layers. Especially when resin layers are thermally fusion-bonded to each other through a current collector terminal to produce a sealed structure, metal/resin bonding is necessary and it is therefore preferred that the resin to be interposed should be a resin having polar groups or a modified resin having polar groups introduced therein.

In structure [6], the thickness of the casing material is not particularly limited. However, it is preferably 0.03 mm or larger, more preferably 0.04 mm or larger, even more preferably 0.05 mm or larger. The upper limit thereof is preferably 0.5 mm or smaller, more preferably 0.3 mm or smaller, even more preferably 0.2 mm or smaller. When the casing material is thinner than the lower limit of that range, it has reduced strength and there are cases where this material is apt to suffer deformation, breakage, etc. On the other hand, when the casing material is thicker than the upper limit of that range, the case has an increased mass and there are hence cases where the desired battery weight reduction cannot be attained.

Batteries of structure [6] employing the casing material described above have advantages that they are lightweight and have a high degree of freedom of shape. These batteries, on the other hand, have a disadvantage that gas evolution within the batteries results in an increase in internal pressure and this may be apt to deform the casing material. In the lithium secondary battery of this invention, the specific compound in the nonaqueous electrolyte is adsorbed onto the surface of the positive-electrode active material and this inhibits the positive electrode from undergoing side reactions and thereby inhibits the generation of a gas ingredient. Because of this, even when the casing material described above is used, this battery is free from that disadvantage, and those advantages of this casing material only are obtained. The lithium secondary battery of this invention is preferred in this respect.

[Microporous Film Separator]

The microporous film separator to be used in the invention is not particularly limited as long as it is a material which has given mechanical strength enabling the separator to electronically insulate the two electrodes from each other and which has high ion permeability and has oxidative resistance and reductional resistance respectively on the side to be in contact with the positive electrode and on the negative-electrode side. The material of the microporous film separator having such properties may be a resin, inorganic material, glass fibers, etc.

The resin is not particularly limited. Examples thereof include olefin polymers, fluoropolymers, cellulosic polymers, polyimides, and nylons. Specifically, it is preferred to select from materials which are stable to the nonaqueous electrolyte and have excellent liquid retentivity. It is preferred to use a porous sheet, nonwoven fabric, or the like formed from a polyolefin such as polyethylene or polypropylene. The inorganic material is not particularly limited. For example, use may be made of: oxides such as alumina and silicon dioxide; nitrides such as aluminum nitride and silicon nitride; and sulfuric acid salts such as barium sulfate and calcium sulfate. With respect to shape, particulate or fibrous materials may be used.

With respect to form, a separator of a thin film form is preferred, such as a nonwoven fabric, woven fabric, or microporous film. Suitable ones of a thin film form have a pore diameter of 0.01-1 µm and a thickness of 5-50 µm. Besides such a separator in an independent thin film form, use can be made of a separator obtained by forming a composite porous layer containing particles of the inorganic material with a resinous binder on a surface layer of the positive electrode and/or negative electrode. Examples of separators in this form include a porous layer formed by fixing alumina particles having a 90% particle diameter of 1 µm or smaller with a fluororesin as a binder on both sides of a positive electrode.

The microporous film separator to be used in the invention preferably has the property of closing the pores upon heating. When this microporous film separator is used in combination with a casing material in which at least part of the battery inner side has been formed from a thermoplastic resin having a melting point higher than the pore closing initiation temperature of the microporous film separator, then there is an effect that in case of abnormal heat generation due to, e.g., overcharge, the heat generation can be stopped before the battery case ruptures or the electrolyte leaks out. The term "property of closing the pores upon heating" herein means the following property of a porous layer which is made of a thermoplastic resin and has been formed so as to enable an electrolyte to move between the positive and negative electrodes. When heated to around the melting point of the thermoplastic resin, the porous layer closes its pores and thereby prevents the electrolyte from moving between the positive and negative electrodes.

[Battery Shape]

The battery shape is not particularly limited. Examples thereof include a bottomed cylindrical shape, bottomed polygonal shape, thin shape, sheet shape, and paper shape. From the standpoints of heightening volume efficiency and thereby enhancing suitability for mounting for incorporation into a system or appliance, the battery may have a modified shape suitable for mounting in peripheral systems to be disposed around the battery, such as a horse shoe shape or comb shape. From the standpoint of efficiently radiating the internal heat of the battery outward, a prismatic shape having at least one side which is relatively flat and has a large area is preferred.

In the battery of a bottomed cylindrical shape, the area of the outer surface is small for the power-generating elements packed. It is therefore preferred to employ a design which enables the Joule's heat generated upon charge or discharge due to internal resistance to efficiently escape outward. It is also preferred to design the battery so that a material having high thermal conductivity is packed in a higher proportion to enable the battery to have a narrow temperature distribution inside.

In the case of a bottomed polygonal shape, the proportion of double the area $S_1$ of the largest face (product of the width and height of the outer dimensions excluding the terminal parts; unit, $cm^2$) to the thickness T (unit, cm) of the battery outer shape, i.e., the value of $2 \times S_1/T$, is preferably 100 or larger, more preferably 200 or larger. By enlarging the largest face, the battery can be improved in cycle characteristics, high-temperature storability, and other properties and be increased in the efficiency of heat dissipation in abnormal heating-up, even when it is a high-output high-capacity battery. Thus, the battery can be inhibited from coming into a dangerous state such as "rupture" or "fire".

[Electrode Group]

The electrode group may be either of: one having a multilayer structure in which the positive-electrode plate and negative-electrode plate described later have been superposed through the microporous film separator described later; and one having a wound structure in which the positive-electrode plate and negative-electrode plate described later have been spirally wound through the microporous film separator described later. The proportion of the volume of the electrode group to the volume of the battery case which excludes any projection (hereinafter abbreviated to "electrode group proportion") is regulated to preferably from 0.3 to 0.7, more preferably from 0.4 to 0.6. In case where the electrode group proportion is lower than 0.3, a decrease in battery capacity results. In case where the electrode group proportion exceeds 0.7, this battery has a reduced space volume and, hence, a volume necessary for the current collector structure described later cannot be sufficiently secured. There are hence cases where battery resistance increases. In addition, there are cases where battery heating-up causes members to expand and a liquid component of the electrolyte to have a heightened vapor pressure, resulting in an increased internal pressure. This battery is reduced in various properties including charge/discharge cycling performance and high-temperature storability, and there are even cases where the gas release valve, which releases the gas from the internal pressure, works.

In the case where the electrode group has a multilayer structure, the positive electrode and the negative electrode each are an electrode in which the ratio of the overall length L (unit, cm) of the periphery of the electrode to double the electrode area $S_2$ (unit, $cm^2$), i.e., $L/(2 \times S_2)$, is preferably 1 or smaller, more preferably 0.5 or smaller, even more preferably 0.3 or smaller. The lower limit thereof is preferably 0.02 or larger, more preferably 0.03 or larger, even more preferably 0.05 or larger. In the multilayer structure, there are cases where those parts of the electrode which are near to the periphery have poor electrode film adhesion due to residual stress or cutting impact. Because of this, when $L/(2 \times S_2)$ is larger than the upper limit of that range, there are cases where output characteristics decrease. When $L/(2 \times S_2)$ is smaller than the lower limit of that range, there are cases where the battery area is too large and this battery is impracticable.

In the case where the electrode group has a wound structure, the proportion of the length-direction dimension to the width-direction dimension in the positive electrode is preferably from 15 to 200. When that proportion is lower than the lower limit of that range, there are cases where the bottomed cylindrical shape of the battery case has too large a height for the bottom area. Namely, this shape has a poor balance and is impracticable. Alternatively, there are cases where the positive-electrode active-material layer is too thick to give high output. When that proportion is below that range, there are cases where the bottomed cylindrical shape of the battery case has too small a height for the bottom area. Namely, this shape has a poor balance and is impracticable. Alternatively, there are cases where the proportion of the current collectors increases and the battery capacity decreases.

[Positive-Electrode Area] (Structure [1])

When the nonaqueous electrolyte is used in this invention, it is preferred that the area of the positive-electrode active-material layer relative to the outer surface area of the battery case should be large from the standpoints of high output and enhanced high-temperature stability. Specifically, from the standpoints of improving output and enabling the heat generated upon charge/discharge to be efficiently dissipated through the current collector, the overall electrode area of the positive electrode is preferably at least 15 times, more preferably at least 20 times the surface area of the case of the secondary battery (structure [1]). In the case of a bottomed polygonal shape, the term outer surface area of the case means the total area determined through calculation from the length, width, and thickness dimensions of the case part packed with power-generating elements and excluding the terminal projections. In the case of a bottomed cylindrical shape, that term means a geometric surface area determined through the approximation to a cylinder of the case part packed with power-generating elements and excluding the terminal projection. The term overall electrode area of the positive electrode means the geometric surface area of the positive electrode mix layer facing the mix layer containing a negative-electrode active material. In a structure in which a positive-electrode mix layer has been formed on each side of a current collector foil, that term means the sum of the areas calculated respectively for both sides.

[Protective Element]

Examples of the protective element include a PTC (positive temperature coefficient), which increases in resistance upon abnormal heating-up or when an excessive current flows, a temperature fuse, a thermister, and a valve (current breaker valve) which breaks current flow through the circuit in abnormal heating-up based on an abrupt increase in the internal pressure or internal temperature of the battery. It is preferred to select such a protective element which does not work under ordinary high-current use conditions. From the standpoint of high output, it is preferred to employ a design which prevents abnormal heating-up and thermal run-away even without a protective element.

[Battery Assembly]

When lithium secondary batteries of the invention are subjected as a power source to practical use, they are preferably used in the following manner. In practical use, power sources are frequently required to have a voltage not lower than the cell voltages. It is therefore necessary to take a measure, e.g., to serially connect cells or to use a booster. Because of this, lithium secondary batteries of the invention are preferably used as a battery assembly in which the batteries are serially connected. By fabricating a battery assembly, the resistance of connection parts can be reduced. The battery assembly can hence be inhibited from decreasing in output. From the standpoint of power-source voltage, it is preferred to fabricate the battery assembly by serially connecting five or more batteries.

Such a battery assembly obtained by connecting batteries is more influenced by heat generation with charge/discharge. It is therefore preferred that the battery assembly should have a cooling mechanism for keeping the batteries at a temperature not higher than a certain value. The battery temperature is preferably 10° C.-40° C. It is preferred to cool the batteries with water or surrounding air.

[Uses]

The lithium secondary batteries of the invention and the battery assembly comprising two or more serially connected lithium secondary batteries of the invention have a high output, long life, high safety, etc. It is therefore preferred that the batteries and the battery assembly should be used in applications where they are mounted on a vehicle and the power thereof is supplied at least to the driving system of the vehicle.

Incidentally, it is thought that the specific compound is adsorbed onto the surface of the positive-electrode active material and the surface of metallic materials to thereby inhibit side reactions with the electrolyte, etc. This inhibition of side reactions on the surface of the positive-electrode active material is preferred because it is thought to diminish gas evolution and enable the battery to be less apt to deform or suffer an increase in internal pressure even when a sheet-form casing material is employed. The inhibition of side reactions on the surface of the positive-electrode active material improves the life, output, and safety in overcharge of the battery and this is thought to be preferable for use in large batteries. Furthermore, the inhibition of side reactions on the surface of metallic materials is effective in inhibiting a direct-current resistance component from increasing over long-term use even when the connection between each current collector tab and the terminal was made by a simple welding technique attaining low resistance. This is thought to be preferable for use in large batteries. In addition, the specific compound reduces the reaction resistance of the positive electrode, and this is thought to be preferable because it is effective in further improving output in a battery designed to have a battery shape, positive-electrode area, etc. which are suitable for high output.

EXAMPLES

The invention will be explained below in more detail by reference to Examples and Comparative Examples. However, the invention should not be construed as being limited to the following Examples unless the invention departs from the spirit thereof.

Positive Electrode [1] [Positive-Electrode Active Materials]

The kinds and properties of the positive-electrode active materials used in the following Examples and Comparative Examples are as shown below.

Positive Electrode [1] Table 1

TABLE 1

| Positive-electrode active material | BET specific surface area $m^2/g$ | Average primary-particle diameter µm | Median diameter $d_{50}$ µm | Tap density $g/cm^3$ |
|---|---|---|---|---|
| A | 1.2 | 0.8 | 4.4 | 1.6 |
| B | 3.0 | 0.2 | 0.9 | 1.0 |
| C | 1.2 | 0.8 | 4.4 | 1.6 |
| D | 1.0 | 0.5 | 8.0 | 2.3 |
| E | 0.4 | 9.0 | 9.0 | 2.6 |

With respect to the properties of the positive-electrode active materials shown in Positive Electrode [1] Table 1, the BET specific surface area, average primary-particle diameter (measured with an SEM), median diameter $d_{50}$, and tap density were determined by the methods described above.

[Positive-Electrode Active Material A]

Positive-electrode active material A is a lithium-transition metal composite oxide synthesized by the method shown below, and is represented by the composition formula $LiMn_{0.33}Ni_{0.33}Co_{0.33}O_2$. $Mn_3O_4$, NiO, and $Co(OH)_2$ were weighed out as a manganese source, nickel source, and cobalt source, respectively, in such amounts as to result in an Mn:Ni:Co molar ratio of 1:1:1. Pure water was added thereto to prepare a slurry. Using a circulating medium-stirring type wet bead mill, the solid matters in the slurry were wet-pulverized with stirring to a median diameter of 0.2 µm.

The slurry was spray-dried with a spray dryer to obtain nearly spherical granulated particles having a particle diameter of about 5 µm consisting only of the manganese source, nickel source, and cobalt source. An LiOH powder having a median diameter of 3 µm was added to the resultant granulated particles in such an amount that the ratio of the number of moles of the Li to the total number of moles of the Mn, Ni, and Co became 1.05. The ingredients were mixed together by means of a high-speed mixer to obtain a powder mixture of the lithium source and the granulated particles of the nickel source, cobalt source, and manganese source. This powder mixture was heat-treated at 950° C. for 12 hours (heating/cooling rate, 5° C./min) in an air stream, subsequently disaggregated, and passed through a sieve having an opening size of 45 μm to obtain positive-electrode active material A.

[Positive-Electrode Active Material B]

Positive-electrode active material B is a lithium-transition metal composite oxide synthesized in the same manner as for positive-electrode active material A, except that the spray drying conditions were changed to obtain granulated particles having a particle diameter of about 1 and that the heat-treating temperature was changed to 930° C. This active material is represented by the composition formula $LiMn_{0.33}Ni_{0.33}Co_{0.33}O_2$.

[Positive-Electrode Active Material C]

Positive-electrode active material C is a positive-electrode active material synthesized by the following method and comprising positive-electrode active material A and a sulfur compound and an antimony compound which are adherent to the surface of the active material A. While 96.7 parts by weight of positive-electrode active material A was being stirred in a fluidizing vessel, an aqueous solution of 1.3 parts by weight of lithium sulfate ($Li_2SO_4 \cdot H_2O$) was sprayed over the active material. To the mixture obtained was added 2.0 parts by weight of antimony trioxide ($Sb_2O_3$; median diameter of the particles, 0.8 μm). The ingredients were sufficiently mixed together. This mixture was transferred to an alumina vessel and heat-treated at 680° C. for 2 hours in an air atmosphere to obtain positive-electrode active material C.

[Positive-Electrode Active Material D]

Positive-electrode active material D is a lithium-transition metal composite oxide synthesized by the method shown below, and is represented by the composition formula $Li_{1.04}Mn_{1.84}Al_{0.12}O_4$. LiOH, $Mn_2O_3$, and AlOOH were weighed out as a lithium source, manganese source, and aluminum source, respectively, in such amounts as to result in an Li:Mn:Al molar ratio of 1.04:1.84:0.12. Pure water was added thereto to prepare a slurry. Using a circulating medium-stirring type wet bead mill, the solid matters in the slurry were wet-pulverized with stirring to a median diameter of 0.5 μm.

The slurry was spray-dried with a spray dryer to obtain nearly spherical granulated particles having a particle diameter of about 10 μm comprising the lithium source, manganese source, and aluminum source. These granulated particles were heat-treated at 900° C. for 3 hours (heating rate, 5° C./min) in a nitrogen stream. Thereafter, the flowing gas was changed from nitrogen to air, and the particles were further heat-treated at 900° C. for 2 hours (cooling rate, 1° C./min). The particles were cooled to room temperature, subsequently taken out and disaggregated, and then passed through a sieve having an opening size of 45 μm to obtain positive-electrode active material D.

[Positive-Electrode Active Material E]

Positive-electrode active material E is a commercial product (lithium cobalt oxide manufactured by Nippon Chemical Industrial Co., Ltd.). It is a lithium cobalt oxide represented by the composition formula $Li_{1.03}CoO_2$.

Positive Electrode [1] Example 1

<<Production of Positive Electrode>>

Ninety percents by mass positive-electrode active material A as a positive-electrode active material was mixed with 5% by mass acetylene black as a conductive material and 5% by mass poly(vinylidene fluoride) (PVdF) as a binder in N-methylpyrrolidone solvent to prepare a slurry. The slurry obtained was applied to each side of an aluminum foil having a thickness of 15 μm and dried. The coated foil was rolled with a pressing machine to a thickness of 80 μm. Pieces each having a positive-electrode active-material layer size with a width of 100 mm and a length of 100 mm and including an uncoated part having a width of 30 mm were cut out of the rolled foil. Thus, positive electrodes were obtained. The positive-electrode active-material layers had a density of 2.35 g/cm³, and the value of (thickness of the positive-electrode active-material layer on one side)/(thickness of the current collector) was 2.2.

<<Production of Negative Electrode>>

To 98 parts by weight of artificial graphite powder KS-44 (trade name; manufactured by Timcal) were added 100 parts by weight of an aqueous dispersion of sodium carboxymethyl cellulose (concentration of sodium carboxymethyl cellulose, 1% by mass) as a thickener and 2 parts by weight of an aqueous dispersion of a styrene/butadiene rubber (concentration of styrene/butadiene rubber, 50% by mass) as a binder. The ingredients were mixed together by means of a disperser to obtain a slurry. The slurry obtained was applied to each side of a copper foil having a thickness of 10 μm and dried. The coated foil was rolled with a pressing machine to a thickness of 75 μm. Pieces each having a negative-electrode active-material layer size with a width of 104 mm and a length of 104 mm and including an uncoated part having a width of 30 mm were cut out of the rolled foil. Thus, negative electrodes were obtained.

<<Production of Electrolytic Solution>>

In a dry argon atmosphere, sufficiently dried lithium hexafluorophosphate ($LiPF_6$) was dissolved in a concentration of 1 mol/L in a mixed solvent composed of purified ethylene carbonate (EC), dimethyl carbonate (DMC), and ethyl methyl carbonate (EMC) in a volume ratio of 3:3:4. Furthermore, hexamethylcyclotrisiloxane was added thereto so as to result in a concentration of 0.3% by mass.

<<Production of Battery>>

Thirty-two positive electrodes and 33 negative electrodes were alternately disposed and superposed together with porous polyethylene sheet separators (thickness, 25 μm) sandwiched between the electrodes. In this operation, each positive electrode was disposed so that the positive-electrode active-material surface was within the range of the opposed negative-electrode active-material surface. The uncoated parts of the positive electrodes were welded together and those of the negative electrodes were welded together. Thus, current collector tabs were produced to obtain an electrode group. This electrode group was packed into a battery can (outer dimensions: 120×110×10 mm). Thereafter, 20 mL of the electrolyte was introduced into the battery can packed with the electrode group and sufficiently infiltrated into the electrodes. This can was sealed to fabricate a battery. The ratio of the total electrode area of the positive electrodes to the overall surface area of the battery case was 20.6.

<<Battery Evaluation>>

(Method of Measuring Battery Capacity)

The fresh battery which had undergone no charge/discharge cycling was subjected to 5 cycles of initial charge/discharge at 25° C. in a voltage range of 4.1-3.0 V at a current of 0.2 C (the value of current at which the rated capacity based on 1-hour-rate discharge capacity is discharged over 1 hour is taken as 1 C; the same applies hereinafter). The 0.2-C discharge capacity thereof as measured in the fifth cycle in this operation was taken as initial capacity. The results of battery evaluation are shown in Positive Electrode [1] Table 2.

(Method of Measuring Initial Output)

In a 25° C. environment, the battery was charged for 150 minutes at a constant current of 0.2 C and then discharged for 10 seconds at each of 0.1 C, 0.3 C, 1.0 C, 3.0 C, and 10.0 C. The voltage was measured at 10 seconds after the discharge initiation. The area of the triangle surrounded by the resultant current-voltage straight line and the final lower voltage (3 V) was taken as output (W). The results of battery evaluation are shown in Positive Electrode [1] Table 2.

(Cycle Test (Method of Measuring Battery Capacity after Durability Test and Output after Durability Test))

The battery was subjected to a cycle test in a high-temperature environment of 60° C., which is regarded as the upper-limit temperature for the actual use of lithium secondary batteries. The battery was charged by the constant-current constant-voltage method at 2 C to a final charge voltage of 4.1 V and then discharged at a constant current of 2 C to a final discharge voltage of 3.0 V. This charge/discharge operation as one cycle was repeated to conduct 500 cycles in total. The battery which had undergone the cycle test was subjected to 3 cycles of charge/discharge in a 25° C. environment at a current of 0.2 C. The 0.2-C discharge capacity thereof as measured in the third cycle was taken as battery capacity after durability test. Furthermore, the battery which had undergone the cycle test was examined for output. This output was taken as output after durability test. The results of battery evaluation are shown in Positive Electrode [1] Table 2.

Positive Electrode [1] Example 2

The same procedure as in Positive Electrode [1] Example 1 was conducted, except that 0.3% by mass trimethylsilyl methanesulfonate was incorporated into the electrolyte in place of the hexamethylcyclotrisiloxane. The results of battery evaluation are shown in Positive Electrode [1] Table 2.

Positive Electrode [1] Example 3

The same procedure as in Positive Electrode [1] Example was conducted, except that 0.3% by mass phenyldimethyl-fluorosilane was incorporated into the electrolyte in place of the hexamethylcyclotrisiloxane. The results of battery evaluation are shown in Positive Electrode [1] Table 2.

Positive Electrode [1] Example 4

The same procedure as in Example 1 was conducted, except that 0.3% by mass lithium difluorophosphate was incorporated into the electrolyte in place of the hexamethylcyclotrisiloxane. The results of battery evaluation are shown in Positive Electrode [1] Table 2.

Positive Electrode [1] Comparative Example 1

The same procedure as in Positive Electrode [1] Example 1 was conducted, except that hexamethylcyclotrisiloxane was not incorporated into the electrolyte. The results of battery evaluation are shown in Positive electrode [1] Table 2.

Positive Electrode [1] Table 2

TABLE 2

| | Specific compound | Battery capacity Ah | Initial output W | Battery capacity after durability test Ah | Output after durability test W |
|---|---|---|---|---|---|
| Example 1 | hexamethylcyclo-trisiloxane | 6.4 | 605 | 5.4 | 401 |
| Example 2 | trimethylsilyl methanesulfonate | 6.4 | 608 | 5.5 | 407 |
| Example 3 | phenyldimethyl-fluorosilane | 6.4 | 600 | 5.4 | 398 |
| Example 4 | $LiPO_2F_2$ | 6.4 | 618 | 5.5 | 415 |
| Comparative Example 1 | none | 6.4 | 525 | 5.1 | 325 |

Positive Electrode [1] Example 5

The same procedure as in Positive Electrode [1] Example 1 was conducted, except that a positive-electrode active material obtained by sufficiently mixing positive-electrode active material A with positive-electrode active material B in a mass ratio of 2:1 was used to produce positive electrodes. This positive-electrode active material obtained by mixing had a BET specific surface area of 1.8 m$^2$/g, average primary-particle diameter of 0.22 μm, median diameter $d_{50}$ of 3.2 μm, and tap density of 1.5 g/cm$^3$. The results of battery evaluation are shown in Positive Electrode [1] Table 3.

Positive Electrode [1] Example 6

The same procedure as in Positive Electrode [1] Example 5 was conducted, except that 0.3% by mass trimethylsilyl methanesulfonate was incorporated into the electrolyte in place of the hexamethylcyclotrisiloxane. The results of battery evaluation are shown in Positive Electrode [1] Table 3.

Positive Electrode [1] Example 7

The same procedure as in Positive Electrode [1] Example was conducted, except that 0.3% by mass phenyldimethyl-fluorosilane was incorporated into the electrolyte in place of the hexamethylcyclotrisiloxane. The results of battery evaluation are shown in Positive Electrode [1] Table 3.

Positive Electrode [1] Example 8

The same procedure as in Positive Electrode [1] Example was conducted, except that 0.3% by mass lithium difluorophosphate was incorporated into the electrolyte in place of the hexamethylcyclotrisiloxane. The results of battery evaluation are shown in Positive Electrode [1] Table 3.

Positive Electrode [1] Comparative Example 2

The same procedure as in Positive Electrode [1] Example 5 was conducted, except that hexamethylcyclotrisiloxane was not incorporated into the electrolyte. The results of battery evaluation are shown in Positive Electrode [1] Table 3.

Positive Electrode [1] Table 3

TABLE 3

|  | Specific compound | Battery capacity Ah | Initial output W | Battery capacity after durability test Ah | Output after durability test W |
|---|---|---|---|---|---|
| Example 5 | hexamethylcyclotrisiloxane | 6.4 | 641 | 5.2 | 406 |
| Example 6 | trimethylsilyl methanesulfonate | 6.4 | 648 | 5.2 | 409 |
| Example 7 | phenyldimethylfluorosilane | 6.4 | 637 | 5.1 | 403 |
| Example 8 | $LiPO_2F_2$ | 6.4 | 657 | 5.2 | 419 |
| Comparative Example 2 | none | 6.4 | 558 | 4.9 | 328 |

Positive Electrode [1] Example 9

The same procedure as in Positive Electrode [1] Example 1 was conducted, except that positive-electrode active material C was used as a positive-electrode active material to produce positive electrodes. The results of battery evaluation are shown in Positive Electrode [1] Table 4.

Positive Electrode [1] Example 10

The same procedure as in Positive Electrode [1] Example 9 was conducted, except that 0.3% by mass trimethylsilyl methanesulfonate was incorporated into the electrolyte in place of the hexamethylcyclotrisiloxane. The results of battery evaluation are shown in Positive Electrode [1] Table 4.

Positive Electrode [1] Example 11

The same procedure as in Positive Electrode [1] Example was conducted, except that 0.3% by mass phenyldimethylfluorosilane was incorporated into the electrolyte in place of the hexamethylcyclotrisiloxane. The results of battery evaluation are shown in Positive Electrode [1] Table 4.

Positive Electrode [1] Example 12

The same procedure as in Positive Electrode [1] Example was conducted, except that 0.3% by mass lithium difluorophosphate was incorporated into the electrolyte in place of the hexamethylcyclotrisiloxane. The results of battery evaluation are shown in Positive Electrode [1] Table 4.

Positive Electrode [1] Comparative Example 3

The same procedure as in Positive Electrode [1] Example 9 was conducted, except that hexamethylcyclotrisiloxane was not incorporated into the electrolyte. The results of battery evaluation are shown in Positive electrode [1] Table 4.

Positive Electrode [1] Table 4

TABLE 4

|  | Specific compound | Battery capacity Ah | Initial output W | Battery capacity after durability test Ah | Output after durability test W |
|---|---|---|---|---|---|
| Example 9 | hexamethylcyclotrisiloxane | 6.4 | 604 | 5.6 | 412 |
| Example 10 | trimethylsilyl methanesulfonate | 6.4 | 609 | 5.6 | 419 |
| Example 11 | phenyldimethylfluorosilane | 6.4 | 599 | 5.6 | 409 |
| Example 12 | $LiPO_2F_2$ | 6.4 | 618 | 5.6 | 427 |
| Comparative Example 3 | none | 6.4 | 525 | 5.3 | 337 |

Positive Electrode [1] Example 13

A battery was produced in the same manner as in Positive Electrode [1] Example 1, except that positive-electrode active material D was used as a positive-electrode active material in positive-electrode production, that the coated foil was rolled with a pressing machine to a thickness of 108 and that 28 positive electrodes thus produced and 29 negative electrodes were used. The value of (thickness of the positive-electrode active-material layer on one side of the positive electrode)/(thickness of the positive-electrode current collector) was 3.1. The ratio of the total electrode area of the positive electrodes to the overall surface area of the battery case was 18.1. This battery was evaluated in the same manner as in Positive Electrode [1] Example 1, except that the voltage range in the capacity measurement was changed to 3.0-4.2 V and the final upper voltage in the cycle test was changed to 4.2 V. The results of battery evaluation are shown in Positive Electrode [1] Table 5.

Positive Electrode [1] Example 14

The same procedure as in Positive Electrode [1] Example 13 was conducted, except that 0.3% by mass trimethylsilyl methanesulfonate was incorporated into the electrolyte in place of the hexamethylcyclotrisiloxane. The results of battery evaluation are shown in Positive Electrode [1] Table 5.

Positive Electrode [1] Example 15

The same procedure as in Positive Electrode [1] Example was conducted, except that 0.3% by mass phenyldimethylfluorosilane was incorporated into the electrolyte in place of the hexamethylcyclotrisiloxane. The results of battery evaluation are shown in Positive Electrode [1] Table 5.

Positive Electrode [1] Example 16

The same procedure as in Positive Electrode [1] Example was conducted, except that 0.3% by mass lithium difluorophosphate was incorporated into the electrolyte in place of the hexamethylcyclotrisiloxane. The results of battery evaluation are shown in Positive Electrode [1] Table 5.

Positive Electrode [1] Comparative Example 4

The same procedure as in Positive Electrode [1] Example 13 was conducted, except that hexamethylcyclotrisiloxane was not incorporated into the electrolyte. The results of battery evaluation are shown in Positive electrode [1] Table 5

Positive Electrode [1] Table 5

TABLE 5

| | Specific compound | Battery capacity Ah | Initial output W | Battery capacity after durability test Ah | Output after durability test W |
|---|---|---|---|---|---|
| Example 13 | hexamethylcyclo-trisiloxane | 5.6 | 792 | 3.5 | 392 |
| Example 14 | trimethylsilyl methanesulfonate | 5.6 | 800 | 3.6 | 398 |
| Example 15 | phenyldimethyl-fluorosilane | 5.6 | 788 | 3.5 | 388 |
| Example 16 | $LiPO_2F_2$ | 5.6 | 811 | 3.6 | 407 |
| Comparative Example 4 | none | 5.6 | 689 | 3.2 | 304 |

Positive Electrode [1] Example 17

The same procedure as in Positive Electrode [1] Example 13 was conducted, except that a positive-electrode active material obtained by sufficiently mixing positive-electrode active material D with positive-electrode active material E in amass ratio of 2:1 was used in positive-electrode production, that the coated foil was rolled with a pressing machine to a thickness of 94 μm, and that 29 positive electrodes thus produced and 30 negative electrodes were used. The value of (thickness of the positive-electrode active-material layer on one side of the positive electrode)/(thickness of the positive-electrode current collector) was 2.6. The ratio of the total electrode area of the positive electrodes to the overall surface area of the battery case was 18.7. The positive-electrode active material obtained by mixing had a BET specific surface area of 0.8 $m^2/g$, average primary-particle diameter of 0.50 μm, median diameter $d_{50}$ of 8.3 μm, and tap density of 2.5 $g/cm^3$. The results of battery evaluation are shown in Positive Electrode [1] Table 6.

Positive Electrode [1] Example 18

The same procedure as in Positive Electrode [1] Example 17 was conducted, except that 0.3% by mass trimethylsilyl methanesulfonate was incorporated into the electrolyte in place of the hexamethylcyclotrisiloxane. The results of battery evaluation are shown in Positive Electrode [1] Table 6.

Positive Electrode [1] Example 19

The same procedure as in Positive Electrode [1] Example was conducted, except that 0.3% by mass phenyldimethyl-fluorosilane was incorporated into the electrolyte in place of the hexamethylcyclotrisiloxane. The results of battery evaluation are shown in Positive Electrode [1] Table 6.

Positive Electrode [1] Example 20

The same procedure as in Positive Electrode [1] Example was conducted, except that 0.3% by mass lithium difluorophosphate was incorporated into the electrolyte in place of the hexamethylcyclotrisiloxane. The results of battery evaluation are shown in Positive Electrode [1] Table 6.

Positive Electrode [1] Comparative Example 5

The same procedure as in Positive Electrode [1] Example 17 was conducted, except that hexamethylcyclotrisiloxane was not incorporated into the electrolyte. The results of battery evaluation are shown in Positive Electrode [1] Table 6.

Positive Electrode [1] Table 6

TABLE 6

| | Specific compound | Battery capacity Ah | Initial output W | Battery capacity after durability test Ah | Output after durability test W |
|---|---|---|---|---|---|
| Example 17 | hexamethylcyclo-trisiloxane | 5.8 | 694 | 4.2 | 397 |
| Example 18 | trimethylsilyl methanesulfonate | 5.8 | 700 | 4.2 | 401 |
| Example 19 | phenyldimethyl-fluorosilane | 5.8 | 690 | 4.2 | 393 |
| Example 20 | $LiPO_2F_2$ | 5.8 | 711 | 4.3 | 411 |
| Comparative Example 5 | none | 5.8 | 604 | 3.9 | 313 |

The results given in Positive Electrode [1] Table 2 to Positive Electrode [1] Table 6 show the following. With respect to each of the positive electrodes, the incorporation of the specific compounds in the electrolyte brought about improvements in output and capacity retentivity. Furthermore, even after the cycle test, the battery capacity and the output were sufficiently retained.

Positive Electrode [2] [Positive-Electrode Active Materials]
The kinds and properties of the positive-electrode active materials used in the following Examples and Comparative Examples are as shown below.
Positive Electrode [2] Table 1

TABLE 7

| Positive-electrode active material | BET specific surface area $m^2/g$ | Average primary particle diameter μm | Median diameter $d_{50}$ μm | Tap density $g/cm^3$ |
|---|---|---|---|---|
| A | 0.6 | 0.7 | 9.0 | 2.1 |
| B | 3.1 | 0.2 | 0.8 | 1.2 |
| C | 0.6 | 0.7 | 9.0 | 2.1 |
| D | 0.5 | 0.6 | 10.9 | 2.1 |
| E | 1.0 | 0.5 | 8.0 | 2.3 |

With respect to the properties of the positive-electrode active materials shown in Positive Electrode [2] Table 1, the BET specific surface area, average primary-particle diameter (measured with an SEM), median diameter $d_{50}$, and tap density were determined by the methods described above.
[Positive-Electrode Active Material A]

Positive-electrode active material A is a lithium-transition metal composite oxide synthesized by the method shown below, and is represented by the composition formula $Li_{1.05}Ni_{0.80}Co_{0.15}Al_{0.05}O_2$. NiO, $Co(OH)_2$, AlOOH were weighed out as a nickel source, cobalt source, and aluminum source, respectively, in such amounts as to result in an Ni:Co:Al molar ratio of 80:15:5. Pure water was added thereto to prepare a slurry. Using a circulating medium-stirring type wet bead mill, the solid matters in the slurry were wet-pulverized with stirring to a median diameter of 0.25 μm.

The slurry was spray-dried with a spray dryer to obtain nearly spherical granulated particles having a particle diameter of about 10 µm consisting only of the nickel source, cobalt source, and aluminum source. An LiOH powder having a median diameter of 3 µm was added to the resultant granulated particles in such an amount that the ratio of the number of moles of the Li to the total number of moles of the Ni, Co, and Al became 1.05. The ingredients were mixed together by means of a high-speed mixer to obtain a powder mixture of the lithium source and the granulated particles of the nickel source, cobalt source, and aluminum source. This powder mixture was heat-treated at 740° C. for 6 hours (heating/cooling rate, 5° C./min) in an oxygen stream, subsequently disaggregated, and passed through a sieve having an opening size of 45 µm to obtain positive-electrode active material A.

[Positive-Electrode Active Material B]

Positive-electrode active material B is a lithium-transition metal composite oxide synthesized in the same manner as for positive-electrode active material A, except that the spray drying conditions were changed to obtain granulated particles having a particle diameter of about 1 µm and that the heat-treating temperature was changed to 720° C. This active material is represented by the composition formula $Li_{1.05}Ni_{0.80}Co_{0.15}Al_{0.05}O_2$.

[Positive-Electrode Active Material C]

Positive-electrode active material C is a positive-electrode active material synthesized by the following method and comprising positive-electrode active material A and a sulfur compound and an antimony compound which are adherent to the surface of the active material A. While 96.7 parts by weight of positive-electrode active material A was being stirred in a fluidizing vessel, an aqueous solution of 1.3 parts by weight of lithium sulfate ($Li_2SO_4H_2O$) was sprayed over the active material. To the mixture obtained was added 2.0 parts by weight of antimony trioxide ($Sb_2O_3$; median diameter of the particles, 0.8 µm). The ingredients were sufficiently mixed together. This mixture was transferred to an alumina vessel and heat-treated at 680° C. for 2 hours in an air atmosphere to obtain positive-electrode active material C.

[Positive-Electrode Active Material D]

Positive-electrode active material D is a lithium-transition metal composite oxide synthesized by the method shown below, and is represented by the composition formula $Li_{1.03}Ni_{0.65}Co_{0.20}Mn_{0.15}O_2$. $Ni(OH)_2$, $Co(OH)_2$, and $Mn_2O_3$ were weighed out as a nickel source, cobalt source, and manganese source, respectively, in such amounts as to result in an Ni:Co:Mn molar ratio of 65:20:15. Pure water was added thereto to prepare a slurry. Using a circulating medium-stirring type wet bead mill, the solid matters in the slurry were wet-pulverized with stirring to a median diameter of 0.2 µm.

The slurry was spray-dried with a spray dryer to obtain nearly spherical granulated particles having a particle diameter of about 12 µm consisting only of the nickel source, cobalt source, and manganese source. An LiOH powder having a median diameter of 3 µm was added to the resultant granulated particles in such an amount that the ratio of the number of moles of the Li to the total number of moles of the Ni, Co, and Mn became 1.05. The ingredients were mixed together by means of a high-speed mixer to obtain a powder mixture of the lithium source and the granulated particles of the nickel source, cobalt source, and manganese source. This powder mixture was heat-treated at 950° C. for 12 hours (heating/cooling rate, 5° C./min) in an air stream, subsequently disaggregated, and passed through a sieve having an opening size of 45 µm to obtain positive-electrode active material D.

[Positive-Electrode Active Material E]

Positive-electrode active material E is a lithium-transition metal composite oxide synthesized by the method shown below, and is represented by the composition formula $Li_{1.04}Mn_{1.84}Al_{0.12}O_4$. LiOH, $Mn_2O_3$, and AlOOH were weighed out as a lithium source, manganese source, and aluminum source, respectively, in such amounts as to result in an Li:Mn:Al molar ratio of 1.04:1.84:0.12. Pure water was added thereto to prepare a slurry. Using a circulating medium-stirring type wet bead mill, the solid matters in the slurry were wet-pulverized with stirring to a median diameter of 0.5 µm.

The slurry was spray-dried with a spray dryer to obtain nearly spherical granulated particles having a particle diameter of about 10 µm comprising the lithium source, manganese source, and aluminum source. These granulated particles were heat-treated at 900° C. for 3 hours (heating rate, 5° C./min) in a nitrogen stream. Thereafter, the flowing gas was changed from nitrogen to air, and the particles were further heat-treated at 900° C. for 2 hours (cooling rate, 1° C./min). The particles were cooled to room temperature, subsequently taken out and disaggregated, and then passed through a sieve having an opening size of 45 µm to obtain positive-electrode active material E.

Positive Electrode [2] Example 1

<<Production of Positive Electrode>>

Ninety percents by mass positive-electrode active material A as a positive-electrode active material was mixed with 5% by mass acetylene black as a conductive material and 5% by mass poly(vinylidene fluoride) (PVdF) as a binder in N-methylpyrrolidone solvent to prepare a slurry. The slurry obtained was applied to each side of an aluminum foil having a thickness of 15 µm and dried. The coated foil was rolled with a pressing machine to a thickness of 66 µm. Pieces each having a positive-electrode active-material layer size with a width of 100 mm and a length of 100 mm and including an uncoated part having a width of 30 mm were cut out of the rolled foil. Thus, positive electrodes were obtained. The positive-electrode active-material layers had a density of 2.35 g/cm$^3$, and the value of (thickness of the positive-electrode active-material layer on one side)/(thickness of the current collector) was 1.7.

<<Production of Negative Electrode>>

To 98 parts by weight of artificial graphite powder KS-44 (trade name; manufactured by Timcal) were added 100 parts by weight of an aqueous dispersion of sodium carboxymethyl cellulose (concentration of sodium carboxymethyl cellulose, 1% by mass) as a thickener and 2 parts by weight of an aqueous dispersion of a styrene/butadiene rubber (concentration of styrene/butadiene rubber, 50% by mass) as a binder. The ingredients were mixed together by means of a disperser to obtain a slurry. The slurry obtained was applied to each side of a copper foil having a thickness of 10 µm and dried. The coated foil was rolled with a pressing machine to a thickness of 75 µm. Pieces each having a negative-electrode active-material layer size with a width of 104 mm and a length of 104 mm and including an uncoated part having a width of 30 mm were cut out of the rolled foil. Thus, negative electrodes were obtained.

<<Production of Electrolytic Solution>>

In a dry argon atmosphere, sufficiently dried lithium hexafluorophosphate (LiPF$_6$) was dissolved in a concentration of 1 mol/L in a mixed solvent composed of purified ethylene carbonate (EC), dimethyl carbonate (DMC), and ethyl methyl carbonate (EMC) in a volume ratio of 3:3:4. Furthermore, hexamethylcyclotrisiloxane was added thereto so as to result in a concentration of 0.3% by mass.

<<Production of Battery>>

Thirty-four positive electrodes and 35 negative electrodes were alternately disposed and superposed together with porous polyethylene sheet separators (thickness, 25 μm) sandwiched between the electrodes. In this operation, each positive electrode was disposed so that the positive-electrode active-material surface was within the range of the opposed negative-electrode active-material surface. The uncoated parts of the positive electrodes were welded together and those of the negative electrodes were welded together. Thus, current collector tabs were produced to obtain an electrode group. This electrode group was packed into a battery can (outer dimensions: 120×110×10 mm). Thereafter, 20 mL of the electrolyte was introduced into the battery can packed with the electrode group and sufficiently infiltrated into the electrodes. This can was sealed to fabricate a battery. The ratio of the total electrode area of the positive electrodes to the overall surface area of the battery case was 21.9.

<<Battery Evaluation>>

(Method of Measuring Battery Capacity)

The fresh battery which had undergone no charge/discharge cycling was subjected to 5 cycles of initial charge/discharge at 25° C. in a voltage range of 4.1-3.0 V at a current of 0.2 C (the value of current at which the rated capacity based on 1-hour-rate discharge capacity is discharged over 1 hour is taken as 1 C; the same applies hereinafter). The 0.2-C discharge capacity thereof as measured in the fifth cycle in this operation was taken as initial capacity. The results of battery evaluation are shown in Positive Electrode [2] Table 2.

(Method of Measuring Initial Output)

In a 25° C. environment, the battery was charged for 150 minutes at a constant current of 0.2 C and then discharged for 10 seconds at each of 0.1 C, 0.3 C, 1.0 C, 3.0 C, and 10.0 C. The voltage was measured at 10 seconds after the discharge initiation. The area of the triangle surrounded by the resultant current-voltage straight line and the final lower voltage (3 V) was taken as output (W). The results of battery evaluation are shown in Positive Electrode [2] Table 2.

(Cycle Test (Method of Measuring Battery Capacity after Durability Test and Output after Durability Test))

The battery was subjected to a cycle test in a high-temperature environment of 60° C., which is regarded as the upper-limit temperature for the actual use of lithium secondary batteries. The battery was charged by the constant-current constant-voltage method at 2 C to a final charge voltage of 4.1 V and then discharged at a constant current of 2 C to a final discharge voltage of 3.0 V. This charge/discharge operation as one cycle was repeated to conduct 500 cycles in total. The battery which had undergone the cycle test was subjected to 3 cycles of charge/discharge in a 25° C. environment at a current of 0.2 C. The 0.2-C discharge capacity thereof as measured in the third cycle was taken as battery capacity after durability test. Furthermore, the battery which had undergone the cycle test was examined for output. This output was taken as output after durability test. The results of battery evaluation are shown in Positive Electrode [2] Table 2.

Positive Electrode [2] Example 2

The same procedure as in Positive Electrode [2] Example 1 was conducted, except that 0.3% by mass trimethylsilyl methanesulfonate was incorporated into the electrolyte in place of the hexamethylcyclotrisiloxane. The results of battery evaluation are shown in Positive Electrode [2] Table 2.

Positive Electrode [2] Example 3

The same procedure as in Positive Electrode [2] Example was conducted, except that 0.3% by mass phenyldimethylfluorosilane was incorporated into the electrolyte in place of the hexamethylcyclotrisiloxane. The results of battery evaluation are shown in Positive Electrode [2] Table 2.

Positive Electrode [2] Example 4

The same procedure as in Positive Electrode [2] Example was conducted, except that 0.3% by mass lithium difluorophosphate was incorporated into the electrolyte in place of the hexamethylcyclotrisiloxane. The results of battery evaluation are shown in Positive Electrode [2] Table 2.

Positive Electrode [2] Comparative Example 1

The same procedure as in Positive Electrode [2] Example 1 was conducted, except that hexamethylcyclotrisiloxane was not incorporated into the electrolyte. The results of battery evaluation are shown in Positive electrode [2] Table 2.

Positive Electrode [2] Table 2

TABLE 8

| | Specific compound | Battery capacity Ah | Initial output W | Battery capacity after durability test Ah | Output after durability test W |
|---|---|---|---|---|---|
| Example 1 | hexamethylcyclo trisiloxane | 6.1 | 551 | 5.4 | 377 |
| Example 2 | trimethylsilyl methanesulfonate | 6.1 | 556 | 5.4 | 381 |
| Example 3 | phenyldimethyl fluorosilane | 6.1 | 545 | 5.3 | 371 |
| Example 4 | $LiPO_2F_2$ | 6.1 | 563 | 5.4 | 387 |
| Comparative Example 1 | none | 6.1 | 478 | 5.0 | 303 |

Positive Electrode [2] Example 5

The same procedure as in Positive Electrode [2] Example 1 was conducted, except that a positive-electrode active material obtained by sufficiently mixing positive-electrode active material A with positive-electrode active material B in a mass ratio of 2:1 was used to produce positive electrodes. This positive-electrode active material obtained by mixing had a BET specific surface area of 1.4 m$^2$/g, average primary-particle diameter of 0.2 μm, median diameter $d_{50}$ of 6.3 μm, and tap density of 1.9 g/cm$^3$. The results of battery evaluation are shown in Positive Electrode [2] Table 3.

Positive Electrode [2] Example 6

The same procedure as in Positive Electrode [2] Example 5 was conducted, except that 0.3% by mass trimethylsilyl methanesulfonate was incorporated into the electrolyte in place of the hexamethylcyclotrisiloxane. The results of battery evaluation are shown in Positive Electrode [2] Table 3.

Positive Electrode [2] Example 7

The same procedure as in Positive Electrode [2] Example was conducted, except that 0.3% by mass phenyldimethylfluorosilane was incorporated into the electrolyte in place of the hexamethylcyclotrisiloxane. The results of battery evaluation are shown in Positive Electrode [2] Table 3.

Positive Electrode [2] Example 8

The same procedure as in Positive Electrode [2] Example was conducted, except that 0.3% by mass lithium difluorophosphate was incorporated into the electrolyte in place of the hexamethylcyclotrisiloxane. The results of battery evaluation are shown in Positive Electrode [2] Table 3.

Positive Electrode [2] Comparative Example 2

The same procedure as in Positive Electrode [2] Example 5 was conducted, except that hexamethylcyclotrisiloxane was not incorporated into the electrolyte. The results of battery evaluation are shown in Positive Electrode [2] Table 3.

Positive Electrode [2] Table 3

TABLE 9

| | Specific compound | Battery capacity Ah | Initial output W | Battery capacity after durability test Ah | Output after durability test W |
|---|---|---|---|---|---|
| Example 5 | hexamethylcyclotrisiloxane | 6.1 | 590 | 5.0 | 375 |
| Example 6 | trimethylsilyl methanesulfonate | 6.1 | 596 | 5.0 | 378 |
| Example 7 | phenyldimethyl fluorosilane | 6.1 | 585 | 4.9 | 369 |
| Example 8 | LiPO$_2$F$_2$ | 6.1 | 604 | 5.0 | 385 |
| Comparative Example 2 | none | 6.1 | 514 | 4.8 | 310 |

Positive Electrode [2] Example 9

The same procedure as in Positive Electrode [2] Example 1 was conducted, except that positive-electrode active material C was used as a positive-electrode active material to produce positive electrodes. The results of battery evaluation are shown in Positive Electrode [2] Table 4.

Positive Electrode [2] Example 10

The same procedure as in Positive Electrode [2] Example 9 was conducted, except that 0.3% by mass trimethylsilyl methanesulfonate was incorporated into the electrolyte in place of the hexamethylcyclotrisiloxane. The results of battery evaluation are shown in Positive Electrode [2] Table 4.

Positive Electrode [2] Example 11

The same procedure as in Positive Electrode [2] Example was conducted, except that 0.3% by mass phenyldimethylfluorosilane was incorporated into the electrolyte in place of the hexamethylcyclotrisiloxane. The results of battery evaluation are shown in Positive Electrode [2] Table 4.

Positive Electrode [2] Example 12

The same procedure as in Positive Electrode [2] Example was conducted, except that 0.3% by mass lithium difluorophosphate was incorporated into the electrolyte in place of the hexamethylcyclotrisiloxane. The results of battery evaluation are shown in Positive Electrode [2] Table 4.

Positive Electrode [2] Comparative Example 3

The same procedure as in Positive Electrode [2] Example 9 was conducted, except that hexamethylcyclotrisiloxane was not incorporated into the electrolyte. The results of battery evaluation are shown in Positive electrode [2] Table 4.

Positive Electrode [2] Table 4

TABLE 10

| | Specific compound | Battery capacity Ah | Initial output W | Battery capacity after durability test Ah | Output after durability test W |
|---|---|---|---|---|---|
| Example 9 | hexamethylcyclotrisiloxane | 6.1 | 548 | 5.3 | 374 |
| Example 10 | trimethylsilyl methanesulfonate | 6.1 | 555 | 5.4 | 379 |
| Example 11 | phenyldimethyl-fluorosilane | 6.1 | 546 | 5.3 | 371 |
| Example 12 | LiPO$_2$F$_2$ | 6.1 | 563 | 5.4 | 386 |
| Comparative Example 3 | none | 6.1 | 478 | 5.1 | 311 |

Positive Electrode [2] Example 13

A battery was produced in the same manner as in Positive Electrode [2] Example 1, except that positive-electrode active material D was used as a positive-electrode active material in positive-electrode production, that the coated foil was rolled with a pressing machine to a thickness of 68 μm, and that 34 positive electrodes thus produced and 35 negative electrodes were used. The value of (thickness of the positive-electrode active-material layer on one side of the positive electrode)/(thickness of the positive-electrode current collector) was 1.8. The ratio of the total electrode area of the positive electrodes to the overall surface area of the battery case was 21.9. This battery was evaluated in the same manner as in Positive Electrode [2] Example 1, except that the voltage range in the capacity measurement was changed to 3.0-4.2 V and the final upper voltage in the cycle test was changed to 4.2 V. The results of battery evaluation are shown in Positive Electrode [2] Table 5.

Positive Electrode [2] Example 14

The same procedure as in Positive Electrode [2] Example 13 was conducted, except that 0.3% by mass trimethylsilyl methanesulfonate was incorporated into the electrolyte in place of the hexamethylcyclotrisiloxane. The results of battery evaluation are shown in Positive Electrode [2] Table 5.

Positive Electrode [2] Example 15

The same procedure as in Positive Electrode [2] Example was conducted, except that 0.3% by mass phenyldimethylfluorosilane was incorporated into the electrolyte in place of the hexamethylcyclotrisiloxane. The results of battery evaluation are shown in Positive Electrode [2] Table 5.

Positive Electrode [2] Example 16

The same procedure as in Positive Electrode [2] Example was conducted, except that 0.3% by mass lithium difluorophosphate was incorporated into the electrolyte in place of the hexamethylcyclotrisiloxane. The results of battery evaluation are shown in Positive Electrode [2] Table 5.

Positive Electrode [2] Comparative Example 4

The same procedure as in Positive Electrode [2] Example 13 was conducted, except that hexamethylcyclotrisiloxane was not incorporated into the electrolyte. The results of battery evaluation are shown in Positive electrode [2] Table 5

Positive Electrode [2] Table 5

TABLE 11

| | Specific compound | Battery capacity Ah | Initial output W | Battery capacity after durability test Ah | Output after durability test W |
|---|---|---|---|---|---|
| Example 13 | hexamethylcyclo-trisiloxane | 6.1 | 580 | 5.0 | 369 |
| Example 14 | trimethylsilyl methanesulfonate | 6.1 | 586 | 5.0 | 374 |
| Example 15 | phenyldimethyl-fluorosilane | 6.1 | 578 | 5.0 | 366 |
| Example 16 | LiPO$_2$F$_2$ | 6.1 | 594 | 5.0 | 380 |
| Comparative Example 4 | none | 6.1 | 505 | 4.7 | 300 |

Positive Electrode [2] Example 17

The same procedure as in Positive Electrode [2] Example 1 was conducted, except that a positive-electrode active material obtained by sufficiently mixing positive-electrode active material A with positive-electrode active material E in a mass ratio of 2:1 was used in positive-electrode production, that the coated foil was rolled with a pressing machine to a thickness of 76 μm, and that 32 positive electrodes thus produced and 33 negative electrodes were used. The value of (thickness of the positive-electrode active-material layer on one side of the positive electrode)/(thickness of the positive-electrode current collector) was 2.0. The ratio of the total electrode area of the positive electrodes to the overall surface area of the battery case was 20.6. The positive-electrode active material obtained by mixing had a BET specific surface area of 0.7 m$^2$/g, average primary-particle diameter of 0.6 μm, median diameter d$_{50}$ of 8.7 μm, and tap density of 2.2 g/cm$^3$. The results of battery evaluation are shown in Positive Electrode [2] Table 6.

Positive Electrode [2] Example 18

The same procedure as in Positive Electrode [2] Example 17 was conducted, except that 0.3% by mass trimethylsilyl methanesulfonate was incorporated into the electrolyte in place of the hexamethylcyclotrisiloxane. The results of battery evaluation are shown in Positive Electrode [2] Table 6.

Positive Electrode [2] Example 19

The same procedure as in Positive Electrode [2] Example was conducted, except that 0.3% by mass phenyldimethylfluorosilane was incorporated into the electrolyte in place of the hexamethylcyclotrisiloxane. The results of battery evaluation are shown in Positive Electrode [2] Table 6.

Positive Electrode [2] Example 20

The same procedure as in Positive Electrode [2] Example was conducted, except that 0.3% by mass lithium difluorophosphate was incorporated into the electrolyte in place of the hexamethylcyclotrisiloxane. The results of battery evaluation are shown in Positive Electrode [2] Table 6.

Positive Electrode [2] Comparative Example 5

The same procedure as in Positive Electrode [2] Example 17 was conducted, except that hexamethylcyclotrisiloxane was not incorporated into the electrolyte. The results of battery evaluation are shown in Positive electrode [2] Table 6.

Positive Electrode [2] Table 6

TABLE 12

| | Specific compound | Battery capacity Ah | Initial output W | Battery capacity after durability test Ah | Output after durability test W |
|---|---|---|---|---|---|
| Example 17 | hexamethylcyclo-trisiloxane | 6.0 | 617 | 4.7 | 381 |
| Example 18 | trimethylsilyl methanesulfonate | 6.0 | 623 | 4.7 | 384 |
| Example 19 | phenyldimethyl-fluorosilane | 6.0 | 615 | 4.7 | 378 |
| Example 20 | LiPO$_2$F$_2$ | 6.0 | 632 | 4.8 | 392 |
| Comparative Example 5 | none | 6.0 | 538 | 4.6 | 316 |

The results given in Positive Electrode [2] Table 2 to Positive Electrode [2] Table 6 show the following. With respect to each of the positive electrodes, the incorporation of the specific compounds in the electrolyte brought about improvements in output and capacity retentivity. Furthermore, even after the cycle test, the battery capacity and the output were sufficiently retained.

Positive Electrode [3] [Positive-Electrode Active Materials]

The kinds and properties of the positive-electrode active materials used in the following Examples and Comparative Examples are as shown below.

Positive Electrode [3] Table 1

TABLE 13

| Positive-electrode active material | BET specific surface area m$^2$/g | Average primary-particle diameter μm | Median diameter d$_{50}$ μm | Tap density g/cm$^3$ |
|---|---|---|---|---|
| A | 1.3 | 0.7 | 6.0 | 2.0 |
| B | 2.9 | 0.2 | 0.9 | 1.1 |

TABLE 13-continued

| Positive-electrode active material | BET specific surface area m²/g | Average primary-particle diameter μm | Median diameter $d_{50}$ μm | Tap density g/cm³ |
|---|---|---|---|---|
| C | 1.3 | 0.7 | 6.0 | 2.0 |
| D | 1.0 | 0.5 | 8.0 | 2.3 |

With respect to the properties of the positive-electrode active materials shown in Positive Electrode [3] Table 1, the BET specific surface area, average primary-particle diameter (measured with an SEM), median diameter $d_{50}$, and tap density were determined by the methods described above.

[Positive-Electrode Active Material A]

Positive-electrode active material A is a lithium-transition metal composite oxide synthesized by the method shown below, and is represented by the composition formula $Li_{1.05}Ni_{0.8}Co_{0.2}O_2$. NiO and $Co(OH)_2$ were weighed out as a nickel source and a cobalt source, respectively, in such amounts as to result in an Ni:Co molar ratio of 80:20. Pure water was added thereto to prepare a slurry. Using a circulating medium-stirring type wet bead mill, the solid matters in the slurry were wet-pulverized with stirring to a median diameter of 0.25 μm.

The slurry was spray-dried with a spray dryer to obtain nearly spherical granulated particles having a particle diameter of about 8 μm consisting only of the nickel source and cobalt source. An LiOH powder having a median diameter of 3 μm was added to the resultant granulated particles in such an amount that the ratio of the number of moles of the Li to the total number of moles of the Ni and Co became 1.05. The ingredients were mixed together by means of a high-speed mixer to obtain a powder mixture of the lithium source and the granulated particles of the nickel source and cobalt source. This powder mixture was heat-treated at 740° C. for 6 hours (heating/cooling rate, 5° C./min) in an oxygen stream, subsequently disaggregated, and passed through a sieve having an opening size of 45 μm to obtain positive-electrode active material A.

[Positive-Electrode Active Material B]

Positive-electrode active material B is a lithium-transition metal composite oxide synthesized in the same manner as for positive-electrode active material A, except that the spray drying conditions were changed to obtain granulated particles having a particle diameter of about 1 μm and that the heat-treating temperature was changed to 720° C. This active material is represented by the composition formula 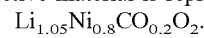
$Li_{1.05}Ni_{0.8}Co_{0.2}O_2$.

[Positive-Electrode Active Material C]

Positive-electrode active material C is a positive-electrode active material synthesized by the following method and comprising positive-electrode active material A and a sulfur compound and an antimony compound which are adherent to the surface of the active material A. While 96.7 parts by weight of positive-electrode active material A was being stirred in a fluidizing vessel, an aqueous solution of 1.3 parts by weight of lithium sulfate ($Li_2SO_4 \cdot H_2O$) was sprayed over the active material. To the mixture obtained was added 2.0 parts by weight of antimony trioxide ($Sb_2O_3$; median diameter of the particles, 0.8 μm). The ingredients were sufficiently mixed together. This mixture was transferred to an alumina vessel and heat-treated at 680° C. for 2 hours in an air atmosphere to obtain positive-electrode active material C.

[Positive-Electrode Active Material D]

Positive-electrode active material D is a lithium-transition metal composite oxide synthesized by the method shown below, and is represented by the composition formula $Li_{1.04}Mn_{1.84}Al_{0.12}O_4$. LiOH, $Mn_2O_3$, and AlOOH were weighed out as a lithium source, manganese source, and aluminum source, respectively, in such amounts as to result in an Li:Mn:Al molar ratio of 1.04:1.84:0.12. Pure water was added thereto to prepare a slurry. Using a circulating medium-stirring type wet bead mill, the solid matters in the slurry were wet-pulverized with stirring to a median diameter of 0.5 μm.

The slurry was spray-dried with a spray dryer to obtain nearly spherical granulated particles having a particle diameter of about 10 μm comprising the lithium source, manganese source, and aluminum source. These granulated particles were heat-treated at 900° C. for 3 hours (heating rate, 5° C./min) in a nitrogen stream. Thereafter, the flowing gas was changed from nitrogen to air, and the particles were further heat-treated at 900° C. for 2 hours (cooling rate, 1° C./min). The particles were cooled to room temperature, subsequently taken out and disaggregated, and then passed through a sieve having an opening size of 45 μm to obtain positive-electrode active material D.

Positive Electrode [3] Example 1

<<Production of Positive Electrode>>

Ninety percents by mass positive-electrode active material A as a positive-electrode active material was mixed with 5% by mass acetylene black as a conductive material and 5% by mass poly(vinylidene fluoride) (PVdF) as a binder in N-methylpyrrolidone solvent to prepare a slurry. The slurry obtained was applied to each side of an aluminum foil having a thickness of 15 μm and dried. The coated foil was rolled with a pressing machine to a thickness of 65 μm. Pieces each having a positive-electrode active-material layer size with a width of 100 mm and a length of 100 mm and including an uncoated part having a width of 30 mm were cut out of the rolled foil. Thus, positive electrodes were obtained. The positive-electrode active-material layers had a density of 2.35 g/cm³, and the value of (thickness of the positive-electrode active-material layer on one side)/(thickness of the current collector) was 1.7.

<<Production of Negative Electrode>>

To 98 parts by weight of artificial graphite powder KS-44 (trade name; manufactured by Timcal) were added 100 parts by weight of an aqueous dispersion of sodium carboxymethyl cellulose (concentration of sodium carboxymethyl cellulose, 1% by mass) as a thickener and 2 parts by weight of an aqueous dispersion of a styrene/butadiene rubber (concentration of styrene/butadiene rubber, 50% by mass) as a binder. The ingredients were mixed together by means of a disperser to obtain a slurry. The slurry obtained was applied to each side of a copper foil having a thickness of 10 μm and dried. The coated foil was rolled with a pressing machine to a thickness of 75 μm. Pieces each having a negative-electrode active-material layer size with a width of 104 mm and a length of 104 mm and including an uncoated part having a width of 30 mm were cut out of the rolled foil. Thus, negative electrodes were obtained.

<<Production of Electrolytic Solution>>

In a dry argon atmosphere, sufficiently dried lithium hexafluorophosphate ($LiPF_6$) was dissolved in a concentration of 1 mol/L in a mixed solvent composed of purified ethylene carbonate (EC), dimethyl carbonate (DMC), and ethyl methyl carbonate (EMC) in a volume ratio of 3:3:4.

Furthermore, hexamethylcyclotrisiloxane was added thereto so as to result in a concentration of 0.3% by mass.

<<Production of Battery>>

Thirty-four positive electrodes and 35 negative electrodes were alternately disposed and superposed together with porous polyethylene sheet separators (thickness, 25 μm) sandwiched between the electrodes. In this operation, each positive electrode was disposed so that the positive-electrode active-material surface was within the range of the opposed negative-electrode active-material surface. The uncoated parts of the positive electrodes were welded together and those of the negative electrodes were welded together. Thus, current collector tabs were produced to obtain an electrode group. This electrode group was packed into a battery can (outer dimensions: 120×110×10 mm). Thereafter, 20 mL of the electrolyte was introduced into the battery can packed with the electrode group and sufficiently infiltrated into the electrodes. This can was sealed to fabricate a battery. The ratio of the total electrode area of the positive electrodes to the overall surface area of the battery case was 21.9.

<<Battery Evaluation>>

(Method of Measuring Battery Capacity)

The fresh battery which had undergone no charge/discharge cycling was subjected to 5 cycles of initial charge/discharge at 25° C. in a voltage range of 4.1-3.0 V at a current of 0.2 C (the value of current at which the rated capacity based on 1-hour-rate discharge capacity is discharged over 1 hour is taken as 1 C; the same applies hereinafter). The 0.2-C discharge capacity thereof as measured in the fifth cycle in this operation was taken as initial capacity. The results of battery evaluation are shown in Positive Electrode [3] Table 2.

(Method of Measuring Initial Output)

In a 25° C. environment, the battery was charged for 150 minutes at a constant current of 0.2 C and then discharged for 10 seconds at each of 0.1 C, 0.3 C, 1.0 C, 3.0 C, and 10.0 C. The voltage was measured at 10 seconds after the discharge initiation. The area of the triangle surrounded by the resultant current-voltage straight line and the final lower voltage (3 V) was taken as output (W). The results of battery evaluation are shown in Positive Electrode [3] Table 2.

(Cycle Test (Method of Measuring Battery Capacity after Durability Test and Output after Durability Test))

The battery was subjected to a cycle test in a high-temperature environment of 60° C., which is regarded as the upper-limit temperature for the actual use of lithium secondary batteries. The battery was charged by the constant-current constant-voltage method at 2 C to a final charge voltage of 4.1 V and then discharged at a constant current of 2 C to a final discharge voltage of 3.0 V. This charge/discharge operation as one cycle was repeated to conduct 500 cycles in total. The battery which had undergone the cycle test was subjected to 3 cycles of charge/discharge in a 25° C. environment at a current of 0.2 C. The 0.2-C discharge capacity thereof as measured in the third cycle was taken as battery capacity after durability test. Furthermore, the battery which had undergone the cycle test was examined for output. This output was taken as output after durability test. The results of battery evaluation are shown in Positive Electrode [3] Table 2.

Positive Electrode [3] Example 2

The same procedure as in Positive Electrode [3] Example 1 was conducted, except that 0.3% by mass trimethylsilyl methanesulfonate was incorporated into the electrolyte in place of the hexamethylcyclotrisiloxane. The results of battery evaluation are shown in Positive Electrode [3] Table 2.

Positive Electrode [3] Example 3

The same procedure as in Positive Electrode [3] Example was conducted, except that 0.3% by mass phenyldimethylfluorosilane was incorporated into the electrolyte in place of the hexamethylcyclotrisiloxane. The results of battery evaluation are shown in Positive Electrode [3] Table 2.

Positive Electrode [3] Example 4

The same procedure as in Positive Electrode [3] Example was conducted, except that 0.3% by mass lithium difluorophosphate was incorporated into the electrolyte in place of the hexamethylcyclotrisiloxane. The results of battery evaluation are shown in Positive Electrode [3] Table 2.

Positive Electrode [3] Comparative Example 1

The same procedure as in Positive Electrode [3] Example 1 was conducted, except that hexamethylcyclotrisiloxane was not incorporated into the electrolyte. The results of battery evaluation are shown in Positive electrode [3] Table 2.

Positive Electrode [3] Table 2

TABLE 14

|  | Specific compound | Battery capacity Ah | Initial output W | Battery capacity after durability test Ah | Output after durability test W |
|---|---|---|---|---|---|
| Example 1 | hexamethylcyclotrisiloxane | 6.5 | 505 | 4.8 | 290 |
| Example 2 | trimethylsilyl methanesulfonate | 6.5 | 509 | 4.8 | 293 |
| Example 3 | phenyldimethylfluorosilane | 6.5 | 500 | 4.8 | 286 |
| Example 4 | $LiPO_2F_2$ | 6.5 | 516 | 4.8 | 297 |
| Comparative Example 1 | none | 6.5 | 438 | 4.7 | 244 |

Positive Electrode [3] Example 5

The same procedure as in Positive Electrode [3] Example 1 was conducted, except that a positive-electrode active material obtained by sufficiently mixing positive-electrode active material A with positive-electrode active material B in a mass ratio of 2:1 was used to produce positive electrodes. This positive-electrode active material obtained by mixing had a BET specific surface area of 1.8 m²/g, average primary-particle diameter of 0.2 μm, median diameter $d_{50}$ of 4.3 μm, and tap density of 1.8 g/cm³. The results of battery evaluation are shown in Positive Electrode [3] Table 3.

Positive Electrode [3] Example 6

The same procedure as in Positive Electrode [3] Example 5 was conducted, except that 0.3% by mass trimethylsilyl methanesulfonate was incorporated into the electrolyte in place of the hexamethylcyclotrisiloxane. The results of battery evaluation are shown in Positive Electrode [3] Table 3.

Positive Electrode [3] Example 7

The same procedure as in Positive Electrode [3] Example was conducted, except that 0.3% by mass phenyldimethylfluorosilane was incorporated into the electrolyte in place of the hexamethylcyclotrisiloxane. The results of battery evaluation are shown in Positive Electrode [3] Table 3.

Positive Electrode [3] Example 8

The same procedure as in Positive Electrode [3] Example was conducted, except that 0.3% by mass lithium difluorophosphate was incorporated into the electrolyte in place of the hexamethylcyclotrisiloxane. The results of battery evaluation are shown in Positive Electrode [3] Table 3.

Positive Electrode [3] Comparative Example 2

The same procedure as in Positive Electrode [3] Example 5 was conducted, except that hexamethylcyclotrisiloxane was not incorporated into the electrolyte. The results of battery evaluation are shown in Positive Electrode [3] Table 3.

Positive Electrode [3] Table 3

TABLE 15

| | Specific compound | Battery capacity Ah | Initial output W | Battery capacity after durability test Ah | Output after durability test W |
|---|---|---|---|---|---|
| Example 5 | hexamethylcyclo-trisiloxane | 6.5 | 524 | 4.6 | 288 |
| Example 6 | trimethylsilyl methanesulfonate | 6.5 | 529 | 4.6 | 290 |
| Example 7 | phenyldimethyl-fluorosilane | 6.5 | 519 | 4.6 | 284 |
| Example 8 | LiPO$_2$F$_2$ | 6.5 | 536 | 4.6 | 294 |
| Comparative Example 2 | none | 6.5 | 456 | 4.6 | 247 |

Positive Electrode [3] Example 9

The same procedure as in Positive Electrode [3] Example 1 was conducted, except that positive-electrode active material C was used as a positive-electrode active material to produce positive electrodes. The results of battery evaluation are shown in Positive Electrode [3] Table 4.

Positive Electrode [3] Example 10

The same procedure as in Positive Electrode [3] Example 9 was conducted, except that 0.3% by mass trimethylsilyl methanesulfonate was incorporated into the electrolyte in place of the hexamethylcyclotrisiloxane. The results of battery evaluation are shown in Positive Electrode [3] Table 4.

Positive Electrode [3] Example 11

The same procedure as in Positive Electrode [3] Example was conducted, except that 0.3% by mass phenyldimethylfluorosilane was incorporated into the electrolyte in place of the hexamethylcyclotrisiloxane. The results of battery evaluation are shown in Positive Electrode [3] Table 4.

Positive Electrode [3] Example 12

The same procedure as in Positive Electrode [3] Example was conducted, except that 0.3% by mass lithium difluorophosphate was incorporated into the electrolyte in place of the hexamethylcyclotrisiloxane. The results of battery evaluation are shown in Positive Electrode [3] Table 4.

Positive Electrode [3] Comparative Example 3

The same procedure as in Positive Electrode [3] Example 9 was conducted, except that hexamethylcyclotrisiloxane was not incorporated into the electrolyte. The results of battery evaluation are shown in Positive electrode [3] Table 4.

Positive Electrode [3] Table 4

TABLE 16

| | Specific compound | Battery capacity Ah | Initial output W | Battery capacity after durability test Ah | Output after durability test W |
|---|---|---|---|---|---|
| Example 9 | hexamethylcyclo-trisiloxane | 6.5 | 503 | 4.2 | 252 |
| Example 10 | trimethylsilyl methanesulfonate | 6.5 | 509 | 4.2 | 255 |
| Example 11 | phenyldimethyl-fluorosilane | 6.5 | 500 | 4.2 | 251 |
| Example 12 | LiPO$_2$F$_2$ | 6.5 | 516 | 4.2 | 259 |
| Comparative Example 3 | none | 6.5 | 438 | 4.2 | 217 |

Positive Electrode [3] Example 13

The same procedure as in Positive Electrode [3] Example 1 was conducted, except that a positive-electrode active material obtained by sufficiently mixing positive-electrode active material A with positive-electrode active material D in a mass ratio of 2:1 was used in positive-electrode production, that the coated foil was rolled with a pressing machine to a thickness of 74 μm, and that 32 positive electrodes thus produced and 33 negative electrodes were used. The value of (thickness of the positive-electrode active-material layer on one side of the positive electrode)/(thickness of the positive-electrode current collector) was 2.0. The ratio of the total electrode area of the positive electrodes to the overall surface area of the battery case was 20.6. The positive-electrode active material obtained by mixing had a BET specific surface area of 1.2 m$^2$/g, average primary-particle diameter of 0.6 μm, median diameter d$_{50}$ of 6.7 μm, and tap density of 2.2 g/cm$^3$. The results of battery evaluation are shown in Positive Electrode [3] Table 5.

Positive Electrode [3] Example 14

The same procedure as in Positive Electrode [3] Example 13 was conducted, except that 0.3% by mass trimethylsilyl methanesulfonate was incorporated into the electrolyte in place of the hexamethylcyclotrisiloxane. The results of battery evaluation are shown in Positive Electrode [3] Table 5.

Positive Electrode [3] Example 15

The same procedure as in Positive Electrode [3] Example was conducted, except that 0.3% by mass phenyldimethylfluorosilane was incorporated into the electrolyte in place of the hexamethylcyclotrisiloxane. The results of battery evaluation are shown in Positive Electrode [3] Table 5.

Positive Electrode [3] Example 16

The same procedure as in Positive Electrode [3] Example was conducted, except that 0.3% by mass lithium difluorophosphate was incorporated into the electrolyte in place of the hexamethylcyclotrisiloxane. The results of battery evaluation are shown in Positive Electrode [3] Table 5.

Positive Electrode [3] Comparative Example 4

The same procedure as in Positive Electrode [3] Example 13 was conducted, except that hexamethylcyclotrisiloxane was not incorporated into the electrolyte. The results of battery evaluation are shown in Positive Electrode [3] Table 5.

Positive Electrode [3] Table 5

TABLE 17

| | Specific compound | Battery capacity Ah | Initial output W | Battery capacity after durability test Ah | Output after durability test W |
|---|---|---|---|---|---|
| Example 13 | hexamethylcyclo-trisiloxane | 6.1 | 631 | 4.3 | 346 |
| Example 14 | trimethylsilyl methanesulfonate | 6.1 | 637 | 4.3 | 350 |
| Example 15 | phenyldimethyl-fluorosilane | 6.1 | 628 | 4.3 | 344 |
| Example 16 | LiPO$_2$F$_2$ | 6.1 | 645 | 4.3 | 354 |
| Comparative Example 4 | none | 6.1 | 549 | 4.3 | 297 |

The results given in Positive Electrode [3] Table 2 to Positive Electrode [3] Table 5 show the following. With respect to each of the positive electrodes, the incorporation of the specific compounds in the electrolyte brought about improvements in output and capacity retentivity. Furthermore, even after the cycle test, the battery capacity and the output were sufficiently retained.

Positive Electrode [4] [Positive-Electrode Active Materials]

The kinds and properties of the positive-electrode active materials used in the following Examples and Comparative Examples are as shown below.

Positive Electrode [4] Table 1

TABLE 18

| Positive-electrode active material | BET specific surface area m$^2$/g | Average primary-particle diameter μm | Median diameter d$_{50}$ μm | Tap density g/cm$^3$ |
|---|---|---|---|---|
| A | 1.1 | 0.9 | 7.0 | 2.1 |
| B | 3.2 | 0.2 | 0.8 | 1.0 |
| C | 1.1 | 0.9 | 7.0 | 2.1 |
| D | 1.0 | 0.5 | 8.0 | 2.3 |

With respect to the properties of the positive-electrode active materials shown in Positive Electrode [4] Table 1, the BET specific surface area, average primary-particle diameter (measured with an SEM), median diameter d$_{50}$, and tap density were determined by the methods described above.

[Positive-Electrode Active Material A]

Positive-electrode active material A is a lithium-cobalt composite oxide synthesized by the method shown below, and is represented by the composition formula LiCoO$_2$. LiOH and Co(OH)$_2$ were weighed out as a lithium source and a cobalt source, respectively, in such amounts as to result in an Li:Co molar ratio of 1:1. Pure water was added thereto to prepare a slurry. Using a circulating medium-stirring type wet bead mill, the solid matters in the slurry were wet-pulverized with stirring to a median diameter of 0.2 μm.

The slurry was spray-dried with a spray dryer to obtain nearly spherical granulated particles having a particle diameter of about 9 μm comprising the lithium source and the cobalt source. The granulated particles were heat-treated at 880° C. for 6 hours (heating/cooling rate, 5° C./min) in an air stream. The particles heat-treated were cooled to room temperature, subsequently taken out and disaggregated, and then passed through a sieve having an opening size of 45 μm to obtain positive-electrode active material A.

[Positive-Electrode Active Material B]

Positive-electrode active material B is a lithium-transition metal composite oxide synthesized in the same manner as for positive-electrode active material A, except that the spray drying conditions were changed to obtain granulated particles having a particle diameter of about 1 μm and that the heat-treating temperature was changed to 860° C. This active material is represented by the composition formula LiCoO$_2$.

[Positive-Electrode Active Material C]

Positive-electrode active material C is a positive-electrode active material synthesized by the following method and comprising positive-electrode active material A and a sulfur compound and an antimony compound which are adherent to the surface of the active material A. While 96.7 parts by weight of positive-electrode active material A was being stirred in a fluidizing vessel, an aqueous solution of 1.3 parts by weight of lithium sulfate (Li$_2$SO$_4$H$_2$O) was sprayed over the active material. To the mixture obtained was added 2.0 parts by weight of antimony trioxide (Sb$_2$O$_3$; median diameter of the particles, 0.8 μm). The ingredients were sufficiently mixed together. This mixture was transferred to an alumina vessel and heat-treated at 680° C. for 2 hours in an air atmosphere to obtain positive-electrode active material C.

[Positive-Electrode Active Material D]

Positive-electrode active material D is a lithium-transition metal composite oxide synthesized by the method shown below, and is represented by the composition formula Li$_{1.04}$Mn$_{1.84}$Al$_{0.12}$O$_4$. LiOH, Mn$_2$O$_3$, and AlOOH were weighed out as a lithium source, manganese source, and aluminum source, respectively, in such amounts as to result in an Li:Mn:Al molar ratio of 1.04:1.84:0.12. Pure water was added thereto to prepare a slurry. Using a circulating medium-stirring type wet bead mill, the solid matters in the slurry were wet-pulverized with stirring to a median diameter of 0.5 μm.

The slurry was spray-dried with a spray dryer to obtain nearly spherical granulated particles having a particle diameter of about 10 μm comprising the lithium source, manganese source, and aluminum source. These granulated particles were heat-treated at 900° C. for 3 hours (heating rate, 5° C./min) in a nitrogen stream. Thereafter, the flowing gas was changed from nitrogen to air, and the particles were further heat-treated at 900° C. for 2 hours (cooling rate, 1° C./min). The particles were cooled to room temperature, subsequently taken out and disaggregated, and then passed through a sieve having an opening size of 45 μm to obtain positive-electrode active material D.

Positive Electrode [4] Example 1

<<Production of Positive Electrode>>

Eighty-five percents by mass positive-electrode active material A as a positive-electrode active material was mixed with 10% by mass acetylene black as a conductive material and 5% by mass poly(vinylidene fluoride) (PVdF) as a binder in N-methylpyrrolidone solvent to prepare a slurry. The slurry obtained was applied to each side of an aluminum foil having a thickness of 15 μm and dried. The coated foil was rolled with a pressing machine to a thickness of 85 μm. Pieces each having a positive-electrode active-material layer size with a width of 100 mm and a length of 100 mm and including an uncoated part having a width of 30 mm were cut out of the rolled foil. Thus, positive electrodes were obtained. The positive-electrode active-material layers had a density of 2.35 g/cm$^3$, and the value of (thickness of the positive-electrode active-material layer on one side)/(thickness of the current collector) was 2.3.

<<Production of Negative Electrode>>

To 98 parts by weight of artificial graphite powder KS-44 (trade name; manufactured by Timcal) were added 100 parts by weight of an aqueous dispersion of sodium carboxymethyl cellulose (concentration of sodium carboxymethyl cellulose, 1% by mass) as a thickener and 2 parts by weight of an aqueous dispersion of a styrene/butadiene rubber (concentration of styrene/butadiene rubber, 50% by mass) as a binder. The ingredients were mixed together by means of a disperser to obtain a slurry. The slurry obtained was applied to each side of a copper foil having a thickness of 10 μm and dried. The coated foil was rolled with a pressing machine to a thickness of 75 μm. Pieces each having a negative-electrode active-material layer size with a width of 104 mm and a length of 104 mm and including an uncoated part having a width of 30 mm were cut out of the rolled foil. Thus, negative electrodes were obtained.

<<Production of Nonaqueous Electrolytic Solution>>

In a dry argon atmosphere, sufficiently dried lithium hexafluorophosphate (LiPF$_6$) was dissolved in a concentration of 1 mol/L in a mixed solvent composed of purified ethylene carbonate (EC), dimethyl carbonate (DMC), and ethyl methyl carbonate (EMC) in a volume ratio of 3:3:4. Furthermore, hexamethylcyclotrisiloxane was added thereto so as to result in a concentration of 0.3% by mass.

<<Production of Battery>>

Thirty-one positive electrodes and 32 negative electrodes were alternately disposed and superposed together with porous polyethylene sheet separators (thickness, 25 μm) sandwiched between the electrodes. In this operation, each positive electrode was disposed so that the positive-electrode active-material surface was within the range of the opposed negative-electrode active-material surface. The uncoated parts of the positive electrodes were welded together and those of the negative electrodes were welded together. Thus, current collector tabs were produced to obtain an electrode group. This electrode group was packed into a battery can (outer dimensions: 120×110×10 mm). Thereafter, 20 mL of the nonaqueous electrolyte was introduced into the battery can packed with the electrode group and sufficiently infiltrated into the electrodes. This can was sealed to fabricate a battery. The ratio of the total electrode area of the positive electrodes to the overall surface area of the battery case was 20.0.

<<Battery Evaluation>>

(Method of Measuring Battery Capacity)

The fresh battery which had undergone no charge/discharge cycling was subjected to 5 cycles of initial charge/discharge at 25° C. in a voltage range of 4.2-3.0 V at a current of 0.2 C (the value of current at which the rated capacity based on 1-hour-rate discharge capacity is discharged over 1 hour is taken as 1 C; the same applies hereinafter). The 0.2-C discharge capacity thereof as measured in the fifth cycle in this operation was taken as initial capacity. The results of battery evaluation are shown in Positive Electrode [4] Table 2.

(Method of Measuring Initial Output)

In a 25° C. environment, the battery was charged for 150 minutes at a constant current of 0.2 C and then discharged for 10 seconds at each of 0.1 C, 0.3 C, 1.0 C, 3.0 C, and 10.0 C. The voltage was measured at 10 seconds after the discharge initiation. The area of the triangle surrounded by the resultant current-voltage straight line and the final lower voltage (3 V) was taken as output (W). The results of battery evaluation are shown in Positive Electrode [4] Table 2.

(Cycle Test (Method of Measuring Battery Capacity after Durability Test and Output after Durability Test))

The battery was subjected to a cycle test in a high-temperature environment of 60° C., which is regarded as the upper-limit temperature for the actual use of lithium secondary batteries. The battery was charged by the constant-current constant-voltage method at 2 C to a final charge voltage of 4.2 V and then discharged at a constant current of 2 C to a final discharge voltage of 3.0 V. This charge/discharge operation as one cycle was repeated to conduct 500 cycles in total. The battery which had undergone the cycle test was subjected to 3 cycles of charge/discharge in a 25° C. environment at a current of 0.2 C. The 0.2-C discharge capacity thereof as measured in the third cycle was taken as battery capacity after durability test. Furthermore, the battery which had undergone the cycle test was examined for output. This output was taken as output after durability test. The results of battery evaluation are shown in Positive Electrode [4] Table 2.

Positive Electrode [4] Example 2

The same procedure as in Positive Electrode [4] Example 1 was conducted, except that 0.3% by mass trimethylsilyl methanesulfonate was incorporated into the nonaqueous electrolyte in place of the hexamethylcyclotrisiloxane. The results of battery evaluation are shown in Positive Electrode [4] Table 2.

Positive Electrode [4] Example 3

The same procedure as in Positive Electrode [4] Example was conducted, except that 0.3% by mass phenyldimethylfluorosilane was incorporated into the nonaqueous electrolyte in place of the hexamethylcyclotrisiloxane. The results of battery evaluation are shown in Positive Electrode [4] Table 2.

Positive Electrode [4] Example 4

The same procedure as in Positive Electrode [4] Example was conducted, except that 0.3% by mass lithium difluorophosphate was incorporated into the nonaqueous electrolyte in place of the hexamethylcyclotrisiloxane. The results of battery evaluation are shown in Positive Electrode [4] Table 2.

Positive Electrode [4] Comparative Example 1

The same procedure as in Positive Electrode [4] Example 1 was conducted, except that hexamethylcyclotrisiloxane was not incorporated into the nonaqueous electrolyte. The results of battery evaluation are shown in Positive electrode [4] Table 2.

Positive Electrode [4] Table 2

TABLE 19

| | Specific compound | Battery capacity Ah | Initial output W | Battery capacity after durability test Ah | Output after durability test W |
|---|---|---|---|---|---|
| Example 1 | hexamethylcyclo-trisiloxane | 5.9 | 530 | 4.2 | 296 |
| Example 2 | trimethylsilyl methanesulfonate | 5.9 | 535 | 4.2 | 299 |
| Example 3 | phenyldimethyl-fluorosilane | 5.9 | 524 | 4.2 | 292 |
| Example 4 | $LiPO_2F_2$ | 5.9 | 541 | 4.3 | 303 |
| Comparative Example 1 | none | 5.9 | 460 | 4.2 | 249 |

Positive Electrode [4] Example 5

The same procedure as in Positive Electrode [4] Example 1 was conducted, except that positive-electrode active material B was used as a positive-electrode active material to produce positive electrodes. The results of battery evaluation are shown in Positive Electrode [4] Table 3.

Positive Electrode [4] Example 6

The same procedure as in Positive Electrode [4] Example 5 was conducted, except that 0.3% by mass trimethylsilyl methanesulfonate was incorporated into the nonaqueous electrolyte in place of the hexamethylcyclotrisiloxane. The results of battery evaluation are shown in Positive Electrode [4] Table 3.

Positive Electrode [4] Example 7

The same procedure as in Positive Electrode [4] Example was conducted, except that 0.3% by mass phenyldimethyl-fluorosilane was incorporated into the nonaqueous electrolyte in place of the hexamethylcyclotrisiloxane. The results of battery evaluation are shown in Positive Electrode [4] Table 3.

Positive Electrode [4] Example 8

The same procedure as in Positive Electrode [4] Example was conducted, except that 0.3% by mass lithium difluorophosphate was incorporated into the nonaqueous electrolyte in place of the hexamethylcyclotrisiloxane. The results of battery evaluation are shown in Positive Electrode [4] Table 3.

Positive Electrode [4] Comparative Example 2

The same procedure as in Positive Electrode [4] Example 5 was conducted, except that hexamethylcyclotrisiloxane was not incorporated into the nonaqueous electrolyte. The results of battery evaluation are shown in Positive electrode [4] Table 3.

Positive Electrode [4] Table 3

TABLE 20

| | Specific compound | Battery capacity Ah | Initial output W | Battery capacity after durability test Ah | Output after durability test W |
|---|---|---|---|---|---|
| Example 5 | hexamethylcyclo-trisiloxane | 5.9 | 584 | 3.6 | 276 |
| Example 6 | trimethylsilyl methanesulfonate | 5.9 | 590 | 3.6 | 277 |
| Example 7 | phenyldimethyl-fluorosilane | 5.9 | 579 | 3.6 | 272 |
| Example 8 | $LiPO_2F_2$ | 5.9 | 598 | 3.6 | 281 |
| Comparative Example 2 | none | 5.9 | 509 | 3.6 | 236 |

Positive Electrode [4] Example 9

The same procedure as in Positive Electrode [4] Example 1 was conducted, except that a positive-electrode active material obtained by sufficiently mixing positive-electrode active material A with positive-electrode active material B in a mass ratio of 2:1 was used to produce positive electrodes. This positive-electrode active material obtained by mixing had a BET specific surface area of 1.8 m²/g, average primary-particle diameter of 0.2 μm, median diameter $d_{50}$ of 4.9 μm, and tap density of 1.8 g/cm³. The results of battery evaluation are shown in Positive Electrode [4] Table 4.

Positive Electrode [4] Example 10

The same procedure as in Positive Electrode [4] Example 9 was conducted, except that 0.3% by mass trimethylsilyl methanesulfonate was incorporated into the nonaqueous electrolyte in place of the hexamethylcyclotrisiloxane. The results of battery evaluation are shown in Positive Electrode [4] Table 4.

Positive Electrode [4] Example 11

The same procedure as in Positive Electrode [4] Example was conducted, except that 0.3% by mass phenyldimethyl-fluorosilane was incorporated into the nonaqueous electrolyte in place of the hexamethylcyclotrisiloxane. The results of battery evaluation are shown in Positive Electrode [4] Table 4.

Positive Electrode [4] Example 12

The same procedure as in Positive Electrode [4] Example was conducted, except that 0.3% by mass lithium difluorophosphate was incorporated into the nonaqueous electrolyte in place of the hexamethylcyclotrisiloxane. The results of battery evaluation are shown in Positive Electrode [4] Table 4.

Positive Electrode [4] Comparative Example 3

The same procedure as in Positive Electrode [4] Example 9 was conducted, except that hexamethylcyclotrisiloxane was not incorporated into the nonaqueous electrolyte. The results of battery evaluation are shown in Positive Electrode [4] Table 4.

Positive Electrode [4] Table 4

TABLE 21

|  | Specific compound | Battery capacity Ah | Initial output W | Battery capacity after durability test Ah | Output after durability test W |
|---|---|---|---|---|---|
| Example 9 | hexamethylcyclo-trisiloxane | 5.9 | 546 | 4.0 | 291 |
| Example 10 | trimethylsilyl methanesulfonate | 5.9 | 553 | 4.0 | 295 |
| Example 11 | phenyldimethyl-fluorosilane | 5.9 | 544 | 4.0 | 289 |
| Example 12 | $LiPO_2F_2$ | 5.9 | 560 | 4.0 | 299 |
| Comparative Example 3 | none | 5.9 | 476 | 4.0 | 250 |

Positive Electrode [4] Table 5

TABLE 22

|  | Specific compound | Battery capacity Ah | Initial output W | Battery capacity after durability test Ah | Output after durability test W |
|---|---|---|---|---|---|
| Example 13 | hexamethylcyclo-trisiloxane | 5.9 | 529 | 4.3 | 303 |
| Example 14 | trimethylsilyl methanesulfonate | 5.9 | 535 | 4.3 | 306 |
| Example 15 | phenyldimethyl-fluorosilane | 5.9 | 527 | 4.3 | 301 |
| Example 16 | $LiPO_2F_2$ | 5.9 | 541 | 4.3 | 310 |
| Comparative Example 4 | none | 5.9 | 460 | 4.3 | 260 |

Positive Electrode [4] Example 13

The same procedure as in Positive Electrode [4] Example 1 was conducted, except that positive-electrode active material C was used as a positive-electrode active material to produce positive electrodes. The results of battery evaluation are shown in Positive Electrode [4] Table 5.

Positive Electrode [4] Example 14

The same procedure as in Positive Electrode [4] Example 13 was conducted, except that 0.3% by mass trimethylsilyl methanesulfonate was incorporated into the nonaqueous electrolyte in place of the hexamethylcyclotrisiloxane. The results of battery evaluation are shown in Positive Electrode [4] Table 5.

Positive Electrode [4] Example 15

The same procedure as in Positive Electrode [4] Example was conducted, except that 0.3% by mass phenyldimethyl-fluorosilane was incorporated into the nonaqueous electrolyte in place of the hexamethylcyclotrisiloxane. The results of battery evaluation are shown in Positive Electrode [4] Table 5.

Positive Electrode [4] Example 16

The same procedure as in Positive Electrode [4] Example was conducted, except that 0.3% by mass lithium difluorophosphate was incorporated into the nonaqueous electrolyte in place of the hexamethylcyclotrisiloxane. The results of battery evaluation are shown in Positive Electrode [4] Table 5.

Positive Electrode [4] Comparative Example 4

The same procedure as in Positive Electrode [4] Example 13 was conducted, except that hexamethylcyclotrisiloxane was not incorporated into the nonaqueous electrolyte. The results of battery evaluation are shown in Positive electrode [4] Table 5.

Positive Electrode [4] Example 17

The same procedure as in Positive Electrode [4] Example 1 was conducted, except that a positive-electrode active material obtained by sufficiently mixing positive-electrode active material A with positive-electrode active material D in amass ratio of 2:1 was used in positive-electrode production, that the coated foil was rolled with a pressing machine to a thickness of 92 μm, and that 30 positive electrodes thus produced and 31 negative electrodes were used. The value of (thickness of the positive-electrode active-material layer on one side of the positive electrode)/(thickness of the positive-electrode current collector) was 2.6. The ratio of the total electrode area of the positive electrodes to the overall surface area of the battery case was 19.4. The positive-electrode active material obtained by mixing had a BET specific surface area of 1.1 m²/g, average primary-particle diameter of 0.6 μm, median diameter $d_{50}$ of 7.3 μm, and tap density of 2.2 g/cm³. The results of battery evaluation are shown in Positive Electrode [4] Table 6.

Positive Electrode [4] Example 18

The same procedure as in Positive Electrode [4] Example 17 was conducted, except that 0.3% by mass trimethylsilyl methanesulfonate was incorporated into the nonaqueous electrolyte in place of the hexamethylcyclotrisiloxane. The results of battery evaluation are shown in Positive Electrode [4] Table 6.

Positive Electrode [4] Example 19

The same procedure as in Positive Electrode [4] Example was conducted, except that 0.3% by mass phenyldimethyl-fluorosilane was incorporated into the nonaqueous electrolyte in place of the hexamethylcyclotrisiloxane. The results of battery evaluation are shown in Positive Electrode [4] Table 6.

Positive Electrode [4] Example 20

The same procedure as in Positive Electrode [4] Example was conducted, except that 0.3% by mass lithium difluorophosphate was incorporated into the nonaqueous electrolyte in place of the hexamethylcyclotrisiloxane. The results of battery evaluation are shown in Positive Electrode [4] Table 6.

Positive Electrode [4] Comparative Example 5

The same procedure as in Positive Electrode [4] Example 17 was conducted, except that hexamethylcyclotrisiloxane was not incorporated into the nonaqueous electrolyte. The results of battery evaluation are shown in Positive Electrode [4] Table 6.

Positive Electrode [4] Table 6

TABLE 23

| | Specific compound | Battery capacity Ah | Initial output W | Battery capacity after durability test Ah | Output after durability test W |
|---|---|---|---|---|---|
| Example 17 | hexamethylcyclo-trisiloxane | 5.7 | 624 | 3.9 | 333 |
| Example 18 | trimethylsilyl methanesulfonate | 5.7 | 629 | 3.9 | 335 |
| Example 19 | phenyldimethyl-fluorosilane | 5.7 | 621 | 3.9 | 330 |
| Example 20 | $LiPO_2F_2$ | 5.7 | 639 | 3.9 | 341 |
| Comparative Example 5 | none | 5.7 | 543 | 3.9 | 285 |

The results given in Positive Electrode [4] Table 2 to Positive Electrode [4] Table 6 show the following. With respect to each of the positive electrodes, the incorporation of the specific compounds in the nonaqueous electrolyte brought about improvements in initial output and in capacity retentivity. Furthermore, even after the cycle test, the battery capacity and the output were sufficiently retained.

Positive Electrode [5] [Positive-Electrode Active Materials]

The kinds and properties of the positive-electrode active materials used in the following Examples and Comparative Examples are as shown below.

Positive Electrode [5] Table 1

TABLE 24

| Positive-electrode active material | BET specific surface area $m^2/g$ | Average primary-particle diameter μm | Median diameter $d_{50}$ μm | Tap density $g/cm^3$ |
|---|---|---|---|---|
| A | 1.1 | 0.9 | 7.0 | 2.1 |
| B | 1.3 | 0.7 | 6.0 | 2.0 |
| C | 0.6 | 0.7 | 9.0 | 2.1 |
| D | 0.6 | 0.7 | 9.0 | 2.1 |
| E | 1.2 | 0.8 | 4.4 | 1.6 |
| F | 1.0 | 0.5 | 8.0 | 2.3 |

With respect to the properties of the positive-electrode active materials shown in Positive Electrode [5] Table 1, the BET specific surface area, average primary-particle diameter (measured with an SEM), median diameter $d_{50}$, and tap density were determined by the methods described above.

[Positive-Electrode Active Material A]

Positive-electrode active material A is a lithium-cobalt composite oxide synthesized by the method shown below, and is represented by the composition formula $LiCoO_2$. LiOH and $Co(OH)_2$ were weighed out as a lithium source and a cobalt source, respectively, in such amounts as to result in an Li:Co molar ratio of 1:1. Pure water was added thereto to prepare a slurry. Using a circulating medium-stirring type wet bead mill, the solid matters in the slurry were wet-pulverized with stirring to a median diameter of 0.2 μm.

The slurry was spray-dried with a spray dryer to obtain nearly spherical granulated particles having a particle diameter of about 9 μm comprising the lithium source and the cobalt source. The granulated particles were heat-treated at 880° C. for 6 hours (heating/cooling rate, 5° C./min) in an air stream. The particles heat-treated were cooled to room temperature, subsequently taken out and disaggregated, and then passed through a sieve having an opening size of 45 μm to obtain positive-electrode active material A.

[Positive-Electrode Active Material B]

Positive-electrode active material B is a lithium-transition metal composite oxide synthesized by the method shown below, and is represented by the composition formula $Li_{1.05}Ni_{0.8}Co_{0.2}O_2$. NiO and $Co(OH)_2$ were weighed out as a nickel source and a cobalt source, respectively, in such amounts as to result in an Ni:Co molar ratio of 80:20. Pure water was added thereto to prepare a slurry. Using a circulating medium-stirring type wet bead mill, the solid matters in the slurry were wet-pulverized with stirring to a median diameter of 0.25 μm.

The slurry was spray-dried with a spray dryer to obtain nearly spherical granulated particles having a particle diameter of about 8 μm consisting only of the nickel source and cobalt source. An LiOH powder having a median diameter of 3 μm was added to the resultant granulated particles in such an amount that the ratio of the number of moles of the Li to the total number of moles of the Ni and Co became 1.05. The ingredients were mixed together by means of a high-speed mixer to obtain a powder mixture of the lithium source and the granulated particles of the nickel source and cobalt source. This powder mixture was heat-treated at 740° C. for 6 hours (heating/cooling rate, 5° C./min) in an oxygen stream, subsequently disaggregated, and passed through a sieve having an opening size of 45 μm to obtain positive-electrode active material B.

[Positive-Electrode Active Material C]

Positive-electrode active material C is a lithium-transition metal composite oxide synthesized by the method shown below, and is represented by the composition formula $Li_{1.05}Ni_{0.80}Co_{0.15}Al_{0.05}O_2$. NiO, $Co(OH)_2$, AlOOH were weighed out as a nickel source, cobalt source, and aluminum source, respectively, in such amounts as to result in an Ni:Co:Al molar ratio of 80:15:5. Pure water was added thereto to prepare a slurry. Using a circulating medium-stirring type wet bead mill, the solid matters in the slurry were wet-pulverized with stirring to a median diameter of 0.25 μm.

The slurry was spray-dried with a spray dryer to obtain nearly spherical granulated particles having a particle diameter of about 10 μm consisting only of the nickel source, cobalt source, and aluminum source. An LiOH powder having a median diameter of 3 μm was added to the resultant granulated particles in such an amount that the ratio of the number of moles of the Li to the total number of moles of the Ni, Co, and Al became 1.05. The ingredients were mixed together by means of a high-speed mixer to obtain a powder mixture of the lithium source and the granulated particles of the nickel source, cobalt source, and aluminum source. This powder mixture was heat-treated at 740° C. for 6 hours (heating/cooling rate, 5° C./min) in an oxygen stream, subsequently disaggregated, and passed through a sieve having an opening size of 45 μm to obtain positive-electrode active material C.

[Positive-Electrode Active Material D]

Positive-electrode active material D is a positive-electrode active material synthesized by the following method and comprising positive-electrode active material C and a sulfur compound and an antimony compound which are adherent to the surface of the active material C. While 96.7 parts by weight of positive-electrode active material C was being stirred in a fluidizing vessel, an aqueous solution of 1.3 parts by weight of lithium sulfate ($Li_2SO_4H_2O$) was sprayed over the active material. To the mixture obtained was added 2.0 parts by weight of antimony trioxide ($Sb_2O_3$; median diameter of the particles, 0.8 μm). The ingredients were sufficiently mixed together. This mixture was transferred to an alumina vessel and heat-treated at 680° C. for 2 hours in an air atmosphere to obtain positive-electrode active material D.

[Positive-Electrode Active Material E]

Positive-electrode active material E is a lithium-transition metal composite oxide synthesized by the method shown below, and is represented by the composition formula $LiMn_{0.33}Ni_{0.33}Co_{0.33}O_2$. $Mn_3O_4$, NiO, and $Co(OH)_2$ were weighed out as a manganese source, nickel source, and cobalt source, respectively, in such amounts as to result in an Mn:Ni:Co molar ratio of 1:1:1. Pure water was added thereto to prepare a slurry. Using a circulating medium-stirring type wet bead mill, the solid matters in the slurry were wet-pulverized with stirring to a median diameter of 0.2 μm.

The slurry was spray-dried with a spray dryer to obtain nearly spherical granulated particles having a particle diameter of about 5 μm consisting only of the manganese source, nickel source, and cobalt source. An LiOH powder having a median diameter of 3 μm was added to the resultant granulated particles in such an amount that the ratio of the number of moles of the Li to the total number of moles of the Mn, Ni, and Co became 1.05. The ingredients were mixed together by means of a high-speed mixer to obtain a powder mixture of the lithium source and the granulated particles of the nickel source, cobalt source, and manganese source. This powder mixture was heat-treated at 950° C. for 12 hours (heating/cooling rate, 5° C./min) in an air stream, subsequently disaggregated, and passed through a sieve having an opening size of 45 μm to obtain positive-electrode active material E.

[Positive-Electrode Active Material F]

Positive-electrode active material F is a lithium-transition metal composite oxide synthesized by the method shown below, and is represented by the composition formula $Li_{1.04}Mn_{1.84}Al_{0.12}O_4$. LiOH, $Mn_2O_3$, and AlOOH were weighed out as a lithium source, manganese source, and aluminum source, respectively, in such amounts as to result in an Li:Mn:Al molar ratio of 1.04:1.84:0.12. Pure water was added thereto to prepare a slurry. Using a circulating medium-stirring type wet bead mill, the solid matters in the slurry were wet-pulverized with stirring to a median diameter of 0.5 μm.

The slurry was spray-dried with a spray dryer to obtain nearly spherical granulated particles having a particle diameter of about 10 μm comprising the lithium source, manganese source, and aluminum source. These granulated particles were heat-treated at 900° C. for 3 hours (heating rate, 5° C./min) in a nitrogen stream. Thereafter, the flowing gas was changed from nitrogen to air, and the particles were further heat-treated at 900° C. for 2 hours (cooling rate, 1° C./min). The particles were cooled to room temperature, subsequently taken out and disaggregated, and then passed through a sieve having an opening size of 45 μm to obtain positive-electrode active material F.

Positive Electrode [5] Example 1

<<Production of Positive Electrode>>

A positive-electrode active material obtained by sufficiently mixing positive-electrode active material A with positive-electrode active material B in a mass ratio of 1:1 was used to produce positive electrodes. This positive-electrode active material obtained by mixing had a BET specific surface area of 1.2 m²/g, average primary-particle diameter of 0.8 μm, median diameter $d_{50}$ of 6.5 μm, and tap density of 2.1 g/cm³.

Ninety percents by mass the positive-electrode active material obtained by mixing was mixed with 5% by mass acetylene black as a conductive material and 5% by mass poly(vinylidene fluoride) (PVdF) as a binder in N-methylpyrrolidone solvent to prepare a slurry. The slurry obtained was applied to each side of an aluminum foil having a thickness of 15 μm and dried. The coated foil was rolled with a pressing machine to a thickness of 70 μm. Pieces each having a positive-electrode active-material layer size with a width of 100 mm and a length of 100 mm and including an uncoated part having a width of 30 mm were cut out of the rolled foil. Thus, positive electrodes were obtained. The positive-electrode active-material layers had a density of 2.35 g/cm³, and the value of (thickness of the positive-electrode active-material layer on one side)/(thickness of the current collector) was 1.8.

<<Production of Negative Electrode>>

To 98 parts by weight of artificial graphite powder KS-44 (trade name; manufactured by Timcal) were added 100 parts by weight of an aqueous dispersion of sodium carboxymethyl cellulose (concentration of sodium carboxymethyl cellulose, 1% by mass) as a thickener and 2 parts by weight of an aqueous dispersion of a styrene/butadiene rubber (concentration of styrene/butadiene rubber, 50% by mass) as a binder. The ingredients were mixed together by means of a disperser to obtain a slurry. The slurry obtained was applied to each side of a copper foil having a thickness of 10 μm and dried. The coated foil was rolled with a pressing machine to a thickness of 75 μm. Pieces each having a negative-electrode active-material layer size with a width of 104 mm and a length of 104 mm and including an uncoated part having a width of 30 mm were cut out of the rolled foil. Thus, negative electrodes were obtained.

<<Production of Nonaqueous Electrolytic Solution>>

In a dry argon atmosphere, sufficiently dried lithium hexafluorophosphate ($LiPF_6$) was dissolved in a concentration of 1 mol/L in a mixed solvent composed of purified ethylene carbonate (EC), dimethyl carbonate (DMC), and ethyl methyl carbonate (EMC) in a volume ratio of 3:3:4. Furthermore, hexamethylcyclotrisiloxane was added thereto so as to result in a concentration of 0.3% by mass.

<<Production of Battery>>

Thirty-three positive electrodes and 34 negative electrodes were alternately disposed and superposed together with porous polyethylene sheet separators (thickness, 25 μm) sandwiched between the electrodes. In this operation, each positive electrode was disposed so that the positive-electrode active-material surface was within the range of the opposed negative-electrode active-material surface. The uncoated parts of the positive electrodes were welded together and those of the negative electrodes were welded together. Thus, current collector tabs were produced to obtain an electrode group. This electrode group was packed into a battery can (outer dimensions: 120×110×10 mm). Thereafter, 20 mL of the nonaqueous electrolyte was introduced into the battery can packed with the electrode group and sufficiently infiltrated into the electrodes. This can was sealed to fabricate a battery. The ratio of the total electrode area of the positive electrodes to the overall surface area of the battery case was 21.3.

<<Battery Evaluation>>

(Method of Measuring Battery Capacity)

The fresh battery which had undergone no charge/discharge cycling was subjected to 5 cycles of initial charge/ discharge at 25° C. in a voltage range of 4.2-3.0 V at a current of 0.2 C (the value of current at which the rated capacity based on 1-hour-rate discharge capacity is discharged over 1 hour is taken as 1 C; the same applies hereinafter). The 0.2-C discharge capacity thereof as measured in the fifth cycle in this operation was taken as initial capacity. The results of battery evaluation are shown in Positive Electrode [5] Table 2.
(Method of Measuring Initial Output)

In a 25° C. environment, the battery was charged for 150 minutes at a constant current of 0.2 C and then discharged for 10 seconds at each of 0.1 C, 0.3 C, 1.0 C, 3.0 C, and 10.0 C. The voltage was measured at 10 seconds after the discharge initiation. The area of the triangle surrounded by the resultant current-voltage straight line and the final lower voltage (3 V) was taken as output (W). The results of battery evaluation are shown in Positive Electrode [5] Table 2.
(Cycle Test (Method of Measuring Battery Capacity after Durability Test and Output after Durability Test))

The battery was subjected to a cycle test in a high-temperature environment of 60° C., which is regarded as the upper-limit temperature for the actual use of lithium secondary batteries. The battery was charged by the constant-current constant-voltage method at 2 C to a final charge voltage of 4.2 V and then discharged at a constant current of 2 C to a final discharge voltage of 3.0 V. This charge/discharge operation as one cycle was repeated to conduct 500 cycles in total. The battery which had undergone the cycle test was subjected to 3 cycles of charge/discharge in a 25° C. environment at a current of 0.2 C. The 0.2-C discharge capacity thereof as measured in the third cycle was taken as battery capacity after durability test. Furthermore, the battery which had undergone the cycle test was examined for output. This output was taken as output after durability test. The results of battery evaluation are shown in Positive Electrode [5] Table 2.

Positive Electrode [5] Example 2

The same procedure as in Positive Electrode [5] Example 1 was conducted, except that 0.3% by mass trimethylsilyl methanesulfonate was incorporated into the nonaqueous electrolyte in place of the hexamethylcyclotrisiloxane. The results of battery evaluation are shown in Positive Electrode [5] Table 2.

Positive Electrode [5] Example 3

The same procedure as in Positive Electrode [5] Example was conducted, except that 0.3% by mass phenyldimethylfluorosilane was incorporated into the nonaqueous electrolyte in place of the hexamethylcyclotrisiloxane. The results of battery evaluation are shown in Positive Electrode [5] Table 2.

Positive Electrode [5] Example 4

The same procedure as in Positive Electrode [5] Example was conducted, except that 0.3% by mass lithium difluorophosphate was incorporated into the nonaqueous electrolyte in place of the hexamethylcyclotrisiloxane. The results of battery evaluation are shown in Positive Electrode [5] Table 2.

Positive Electrode [5] Comparative Example 1

The same procedure as in Positive Electrode [5] Example 1 was conducted, except that hexamethylcyclotrisiloxane was not incorporated into the nonaqueous electrolyte. The results of battery evaluation are shown in Positive electrode [5] Table 2.

Positive Electrode [5] Table 2

TABLE 25

| | Specific compound | Battery capacity Ah | Initial output W | Battery capacity after durability test Ah | Output after durability test W |
|---|---|---|---|---|---|
| Example 1 | hexamethylcyclotrisiloxane | 6.3 | 539 | 4.6 | 309 |
| Example 2 | trimethylsilyl methanesulfonate | 6.3 | 544 | 4.6 | 311 |
| Example 3 | phenyldimethylfluorosilane | 6.3 | 534 | 4.6 | 305 |
| Example 4 | LiPO$_2$F$_2$ | 6.3 | 551 | 4.6 | 315 |
| Comparative Example 1 | none | 6.3 | 468 | 4.6 | 264 |

Positive Electrode [5] Example 5

The same procedure as in Positive Electrode [5] Example 1 was conducted, except that a positive-electrode active material obtained by sufficiently mixing positive-electrode active material A with positive-electrode active material E in amass ratio of 1:1 was used in positive-electrode production, that the coated foil was rolled with a pressing machine to a thickness of 78 μm, and that 32 positive electrodes thus produced and 33 negative electrodes were used. The value of (thickness of the positive-electrode active-material layer on one side of the positive electrode)/(thickness of the positive-electrode current collector) was 2.1. The ratio of the total electrode area of the positive electrodes to the overall surface area of the battery case was 20.6. The positive-electrode active material obtained by mixing had a BET specific surface area of 1.2 m$^2$/g, average primary-particle diameter of 0.8 μm, median diameter d$_{50}$ of 5.7 μm, and tap density of 2.0 g/cm$^3$. The results of battery evaluation are shown in Positive Electrode [5] Table 3.

Positive Electrode [5] Example 6

The same procedure as in Positive Electrode [5] Example 5 was conducted, except that 0.3% by mass trimethylsilyl methanesulfonate was incorporated into the nonaqueous electrolyte in place of the hexamethylcyclotrisiloxane. The results of battery evaluation are shown in Positive Electrode [5] Table 3.

Positive Electrode [5] Example 7

The same procedure as in Positive Electrode [5] Example was conducted, except that 0.3% by mass phenyldimethylfluorosilane was incorporated into the nonaqueous electrolyte in place of the hexamethylcyclotrisiloxane. The results of battery evaluation are shown in Positive Electrode [5] Table 3.

Positive Electrode [5] Example 8

The same procedure as in Positive Electrode [5] Example was conducted, except that 0.3% by mass lithium difluorophosphate was incorporated into the nonaqueous electrolyte in place of the hexamethylcyclotrisiloxane. The results of battery evaluation are shown in Positive Electrode [5] Table 3.

Positive Electrode [5] Comparative Example 2

The same procedure as in Positive Electrode [5] Example 5 was conducted, except that hexamethylcyclotrisiloxane was not incorporated into the nonaqueous electrolyte. The results of battery evaluation are shown in Positive Electrode [5] Table 3.

Positive Electrode [5] Table 3

TABLE 26

|  | Specific compound | Battery capacity Ah | Initial output W | Battery capacity after durability test Ah | Output after durability test W |
|---|---|---|---|---|---|
| Example 5 | hexamethylcyclo-trisiloxane | 6.1 | 589 | 5.0 | 377 |
| Example 6 | trimethylsilyl methanesulfonate | 6.1 | 595 | 5.0 | 379 |
| Example 7 | phenyldimethyl-fluorosilane | 6.1 | 584 | 5.0 | 370 |
| Example 8 | $LiPO_2F_2$ | 6.1 | 604 | 5.0 | 387 |
| Comparative Example 2 | none | 6.1 | 513 | 4.7 | 305 |

Positive Electrode [5] Example 9

The same procedure as in Positive Electrode [5] Example 1 was conducted, except that a positive-electrode active material obtained by sufficiently mixing positive-electrode active material A with positive-electrode active material F in amass ratio of 1:1 was used in positive-electrode production, that the coated foil was rolled with a pressing machine to a thickness of 91 μm, and that 30 positive electrodes thus produced and 31 negative electrodes were used. The value of (thickness of the positive-electrode active-material layer on one side of the positive electrode)/(thickness of the positive-electrode current collector) was 2.5. The ratio of the total electrode area of the positive electrodes to the overall surface area of the battery case was 19.4. The positive-electrode active material obtained by mixing had a BET specific surface area of 1.0 m²/g, average primary-particle diameter of 0.6 μm, median diameter $d_{50}$ of 7.5 μm, and tap density of 2.2 g/cm³. The results of battery evaluation are shown in Positive Electrode [5] Table 4.

Positive Electrode [5] Example 10

The same procedure as in Positive Electrode [5] Example 9 was conducted, except that 0.3% by mass trimethylsilyl methanesulfonate was incorporated into the nonaqueous electrolyte in place of the hexamethylcyclotrisiloxane. The results of battery evaluation are shown in Positive Electrode [5] Table 4.

Positive Electrode [5] Example 11

The same procedure as in Positive Electrode [5] Example was conducted, except that 0.3% by mass phenyldimethyl-fluorosilane was incorporated into the nonaqueous electrolyte in place of the hexamethylcyclotrisiloxane. The results of battery evaluation are shown in Positive Electrode [5] Table 4.

Positive Electrode [5] Example 12

The same procedure as in Positive Electrode [5] Example was conducted, except that 0.3% by mass lithium difluorophosphate was incorporated into the nonaqueous electrolyte in place of the hexamethylcyclotrisiloxane. The results of battery evaluation are shown in Positive Electrode [5] Table 4.

Positive Electrode [5] Comparative Example 3

The same procedure as in Positive Electrode [5] Example 9 was conducted, except that hexamethylcyclotrisiloxane was not incorporated into the nonaqueous electrolyte. The results of battery evaluation are shown in Positive Electrode [5] Table 4.

Positive Electrode [5] Table 4

TABLE 27

|  | Specific compound | Battery capacity Ah | Initial output W | Battery capacity after durability test Ah | Output after durability test W |
|---|---|---|---|---|---|
| Example 9 | hexamethylcyclo-trisiloxane | 5.7 | 679 | 4.2 | 390 |
| Example 10 | trimethylsilyl methanesulfonate | 5.7 | 687 | 4.2 | 397 |
| Example 11 | phenyldimethyl-fluorosilane | 5.7 | 675 | 4.2 | 387 |
| Example 12 | $LiPO_2F_2$ | 5.7 | 696 | 4.3 | 404 |
| Comparative Example 3 | none | 5.7 | 592 | 3.9 | 313 |

Positive Electrode [5] Example 13

A battery was produced in the same manner as in Positive Electrode [5] Example 1, except that a positive-electrode active material obtained by sufficiently mixing positive-electrode active material C with positive-electrode active material E in a mass ratio of 1:1 was used in positive-electrode production, that the coated foil was rolled with a pressing machine to a thickness of 72 μm, and that 33 positive electrodes thus produced and 34 negative electrodes were used. The positive-electrode active material obtained by mixing had a BET specific surface area of 0.9 m²/g, average primary-particle diameter of 0.7 μm, median diameter $d_{50}$ of 6.7 μm, and tap density of 2.0 g/cm³. The value of (thickness of the positive-electrode active-material layer on one side of the positive electrode)/(thickness of the positive-electrode current collector) was 1.9. The ratio of the total electrode area of the positive electrodes to the overall surface area of the battery case was 21.3. This battery was evaluated in the same manner as in Positive Electrode [5] Example 1, except that the voltage range in the capacity measurement was changed to 3.0-4.1 V and the final upper voltage in the cycle test was changed to 4.1 V. The results of battery evaluation are shown in Positive Electrode [5] Table 5.

Positive Electrode [5] Example 14

The same procedure as in Positive Electrode [5] Example 13 was conducted, except that 0.3% by mass trimethylsilyl methanesulfonate was incorporated into the nonaqueous electrolyte in place of the hexamethylcyclotrisiloxane. The results of battery evaluation are shown in Positive Electrode [5] Table 5.

Positive Electrode [5] Example 15

The same procedure as in Positive Electrode [5] Example was conducted, except that 0.3% by mass phenyldimethylfluorosilane was incorporated into the nonaqueous electrolyte in place of the hexamethylcyclotrisiloxane. The results of battery evaluation are shown in Positive Electrode [5] Table 5.

Positive Electrode [5] Example 16

The same procedure as in Positive Electrode [5] Example was conducted, except that 0.3% by mass lithium difluorophosphate was incorporated into the nonaqueous electrolyte in place of the hexamethylcyclotrisiloxane. The results of battery evaluation are shown in Positive Electrode [5] Table 5.

Positive Electrode [5] Comparative Example 4

The same procedure as in Positive Electrode [5] Example 13 was conducted, except that hexamethylcyclotrisiloxane was not incorporated into the nonaqueous electrolyte. The results of battery evaluation are shown in Positive Electrode [5] Table 5.

Positive Electrode [5] Table 5

TABLE 28

|  | Specific compound | Battery capacity Ah | Initial output W | Battery capacity after durability test Ah | Output after durability test W |
|---|---|---|---|---|---|
| Example 13 | hexamethylcyclotrisiloxane | 6.3 | 578 | 5.5 | 397 |
| Example 14 | trimethylsilyl methanesulfonate | 6.3 | 584 | 5.6 | 402 |
| Example 15 | phenyldimethylfluorosilane | 6.3 | 576 | 5.5 | 393 |
| Example 16 | $LiPO_2F_2$ | 6.3 | 591 | 5.6 | 410 |
| Comparative Example 4 | none | 6.3 | 503 | 5.1 | 315 |

Positive Electrode [5] Example 17

The same procedure as in Positive Electrode [5] Example 1 was conducted, except that a positive-electrode active material obtained by sufficiently mixing positive-electrode active material C with positive-electrode active material F in a mass ratio of 1:1 was used in positive-electrode production, that the coated foil was rolled with a pressing machine to a thickness of 78 μm, and that 32 positive electrodes thus produced and 33 negative electrodes were used. The value of (thickness of the positive-electrode active-material layer on one side of the positive electrode)/(thickness of the positive-electrode current collector) was 2.1. The ratio of the total electrode area of the positive electrodes to the overall surface area of the battery case was 20.6. The positive-electrode active material obtained by mixing had a BET specific surface area of 0.8 $m^2/g$, average primary-particle diameter of 0.6 μm, median diameter $d_{50}$ of 8.5 μm, and tap density of 2.2 $g/cm^3$. The results of battery evaluation are shown in Positive Electrode [5] Table 6.

Positive Electrode [5] Example 18

The same procedure as in Positive Electrode [5] Example 17 was conducted, except that 0.3% by mass trimethylsilyl methanesulfonate was incorporated into the nonaqueous electrolyte in place of the hexamethylcyclotrisiloxane. The results of battery evaluation are shown in Positive Electrode [5] Table 6.

Positive Electrode [5] Example 19

The same procedure as in Positive Electrode [5] Example was conducted, except that 0.3% by mass phenyldimethylfluorosilane was incorporated into the nonaqueous electrolyte in place of the hexamethylcyclotrisiloxane. The results of battery evaluation are shown in Positive Electrode [5] Table 6.

Positive Electrode [5] Example 20

The same procedure as in Positive Electrode [5] Example was conducted, except that 0.3% by mass lithium difluorophosphate was incorporated into the nonaqueous electrolyte in place of the hexamethylcyclotrisiloxane. The results of battery evaluation are shown in Positive Electrode [5] Table 6.

Positive Electrode [5] Comparative Example 5

The same procedure as in Positive Electrode [5] Example 17 was conducted, except that hexamethylcyclotrisiloxane was not incorporated into the nonaqueous electrolyte. The results of battery evaluation are shown in Positive Electrode [5] Table 6.

Positive Electrode [5] Table 6

TABLE 29

|  | Specific compound | Battery capacity Ah | Initial output W | Battery capacity after durability test Ah | Output after durability test W |
|---|---|---|---|---|---|
| Example 17 | hexamethylcyclotrisiloxane | 6.1 | 723 | 5.0 | 457 |
| Example 18 | trimethylsilyl methanesulfonate | 6.1 | 732 | 5.0 | 469 |
| Example 19 | phenyldimethylfluorosilane | 6.1 | 719 | 5.0 | 455 |
| Example 20 | $LiPO_2F_2$ | 6.1 | 741 | 5.0 | 477 |
| Comparative Example 5 | none | 6.1 | 630 | 4.6 | 363 |

Positive Electrode [5] Example 21

A battery was produced in the same manner as in Positive Electrode [5] Example 1, except that a positive-electrode active material obtained by sufficiently mixing positive-electrode active material D with positive-electrode active material E in a mass ratio of 1:1 was used in positive-electrode production, that the coated foil was rolled with a pressing machine to a thickness of 72 μm, and that 33 positive electrodes thus produced and 34 negative electrodes were used. The positive-electrode active material obtained by mixing had a BET specific surface area of 0.9 m²/g, average primary-particle diameter of 0.7 μm, median diameter $d_{50}$ of 6.7 μm, and tap density of 2.0 g/cm³. The value of (thickness of the positive-electrode active-material layer on one side of the positive electrode)/(thickness of the positive-electrode current collector) was 1.9. The ratio of the total electrode area of the positive electrodes to the overall surface area of the battery case was 21.3. This battery was evaluated in the same manner as in Positive Electrode [5] Example 1, except that the voltage range in the capacity measurement was changed to 3.0-4.1 V and the final upper voltage in the cycle test was changed to 4.1 V. The results of battery evaluation are shown in Positive Electrode [5] Table 7.

Positive Electrode [5] Example 22

The same procedure as in Positive Electrode [5] Example 17 was conducted, except that 0.3% by mass trimethylsilyl methanesulfonate was incorporated into the nonaqueous electrolyte in place of the hexamethylcyclotrisiloxane. The results of battery evaluation are shown in Positive Electrode [5] Table 7.

Positive Electrode [5] Example 23

The same procedure as in Positive Electrode [5] Example was conducted, except that 0.3% by mass phenyldimethylfluorosilane was incorporated into the nonaqueous electrolyte in place of the hexamethylcyclotrisiloxane. The results of battery evaluation are shown in Positive Electrode [5] Table 7.

Positive Electrode [5] Example 24

The same procedure as in Positive Electrode [5] Example was conducted, except that 0.3% by mass lithium difluorophosphate was incorporated into the nonaqueous electrolyte in place of the hexamethylcyclotrisiloxane. The results of battery evaluation are shown in Positive Electrode [5] Table 7.

Positive Electrode [5] Comparative Example 6

The same procedure as in Positive Electrode [5] Example 17 was conducted, except that hexamethylcyclotrisiloxane was not incorporated into the nonaqueous electrolyte. The results of battery evaluation are shown in Positive Electrode [5] Table 7.

Positive Electrode [5] Table 7

TABLE 30

| | Specific compound | Battery capacity Ah | Initial output W | Battery capacity after durability test Ah | Output after durability test W |
|---|---|---|---|---|---|
| Example 21 | hexamethylcyclo-trisiloxane | 6.3 | 578 | 5.6 | 402 |
| Example 22 | trimethylsilyl methanesulfonate | 6.3 | 584 | 5.6 | 406 |
| Example 23 | phenyldimethyl-fluorosilane | 6.3 | 576 | 5.6 | 397 |
| Example 24 | LiPO₂F₂ | 6.3 | 591 | 5.7 | 415 |
| Comparative Example 6 | none | 6.3 | 503 | 5.2 | 319 |

Positive Electrode [5] Example 25

The same procedure as in Positive Electrode [5] Example 1 was conducted, except that a positive-electrode active material obtained by sufficiently mixing positive-electrode active material E with positive-electrode active material F in amass ratio of 1:1 was used in positive-electrode production, that the coated foil was rolled with a pressing machine to a thickness of 86 μm, and that 31 positive electrodes thus produced and 32 negative electrodes were used. The value of (thickness of the positive-electrode active-material layer on one side of the positive electrode)/(thickness of the positive-electrode current collector) was 2.4. The ratio of the total electrode area of the positive electrodes to the overall surface area of the battery case was 20.0. The positive-electrode active material obtained by mixing had a BET specific surface area of 1.1 m²/g, average primary-particle diameter of 0.6 μm, median diameter $d_{50}$ of 6.2 μm, and tap density of 2.0 g/cm³. The results of battery evaluation are shown in Positive Electrode [5] Table 8.

Positive Electrode [5] Example 26

The same procedure as in Positive Electrode [5] Example 17 was conducted, except that 0.3% by mass trimethylsilyl methanesulfonate was incorporated into the nonaqueous electrolyte in place of the hexamethylcyclotrisiloxane. The results of battery evaluation are shown in Positive Electrode [5] Table 8.

Positive Electrode [5] Example 27

The same procedure as in Positive Electrode [5] Example was conducted, except that 0.3% by mass phenyldimethylfluorosilane was incorporated into the nonaqueous electrolyte in place of the hexamethylcyclotrisiloxane. The results of battery evaluation are shown in Positive Electrode [5] Table 8.

Positive Electrode [5] Example 28

The same procedure as in Positive Electrode [5] Example was conducted, except that 0.3% by mass lithium difluorophosphate was incorporated into the nonaqueous electrolyte in place of the hexamethylcyclotrisiloxane. The results of battery evaluation are shown in Positive Electrode [5] Table 8.

Positive Electrode [5] Comparative Example 7

The same procedure as in Positive Electrode [5] Example 17 was conducted, except that hexamethylcyclotrisiloxane was not incorporated into the nonaqueous electrolyte. The results of battery evaluation are shown in Positive Electrode [5] Table 8.

Positive Electrode [5] Table 8

TABLE 31

| | Specific compound | Battery capacity Ah | Initial output W | Battery capacity after durability test Ah | Output after durability test W |
|---|---|---|---|---|---|
| Example 25 | hexamethylcyclo-trisiloxane | 5.9 | 744 | 4.8 | 474 |

TABLE 31-continued

|  | Specific compound | Battery capacity Ah | Initial output W | Battery capacity after durability test Ah | Output after durability test W |
|---|---|---|---|---|---|
| Example 26 | trimethylsilyl methanesulfonate | 5.9 | 755 | 4.9 | 484 |
| Example 27 | phenyldimethyl-fluorosilane | 5.9 | 739 | 4.8 | 469 |
| Example 28 | LiPO$_2$F$_2$ | 5.9 | 763 | 4.9 | 493 |
| Comparative Example 7 | none | 5.9 | 648 | 4.4 | 368 |

The results given in Positive Electrode [5] Table 2 to Positive Electrode [5] Table 8 show the following. With respect to each of the positive electrodes, the incorporation of the specific compounds in the nonaqueous electrolyte brought about improvements in output and capacity retentivity. Furthermore, even after the cycle test, the battery capacity and the output were sufficiently retained.

Negative Electrode [1] [Production of Negative-Electrode Active Materials]

(Negative-Electrode Active-Material Production 1)

A commercial natural-graphite powder as a particulate carbonaceous substance was repeatedly passed through an ASTM 400-mesh sieve five times in order to prevent inclusion of coarse particles. The negative-electrode material thus obtained is referred to as carbonaceous substance (A).

(Negative-Electrode Active-Material Production 2)

A petroleum-derived heavy oil obtained in the thermal cracking of naphtha was carbonized at 1,300° C. in an inert gas. Thereafter, the resultant sinter was classified to thereby obtain carbonaceous substance (B). In the classification, the sinter was repeatedly passed through an ASTM 400-mesh sieve five times in order to prevent inclusion of coarse particles.

(Negative-Electrode Active-Material Production 3)

A mixture obtained by evenly mixing 95% by mass carbonaceous substance (A) with 5% by mass carbonaceous substance (B) is referred to as binary crystalline carbonaceous mixture (C).

(Negative-Electrode Active-Material Production 4)

Carbonaceous substance (A) was mixed with a petroleum-derived heavy oil obtained in thermal naphtha cracking, and this mixture was carbonized at 1,300° C. in an inert gas. Thereafter, the resultant sinter was classified to thereby obtain composite carbonaceous substance (D) comprising particles of the carbonaceous substance (A) and a carbonaceous substance having different crystallinity adherent to the surface of the particles. In the classification, the sinter was passed through an ASTM 400-mesh sieve five times in order to prevent inclusion of coarse particles. It was ascertained from actual carbon ratio that the negative-electrode active-material powder obtained comprised 95 parts by weight of a graphite and 5 parts by weight of a lowly crystalline carbonaceous substance with which the graphite was covered.

(Negative-Electrode Active-Material Production 5)

The same procedure as in Negative-Electrode Active-Material Production 4 was conducted, except that the petroleum-derived heavy oil obtained in thermal naphtha cracking was mixed in a reduced amount. Thus, composite carbonaceous substance (E) was obtained which comprised 99 parts by weight of a graphite and 1 part by weight of a lowly crystalline carbonaceous substance with which the graphite was covered.

(Negative-Electrode Active-Material Production 6)

The same procedure as in Negative-Electrode Active-Material Production 4 was conducted, except that the petroleum-derived heavy oil obtained in thermal naphtha cracking was mixed in an increased amount. Thus, composite carbonaceous substance (F) was obtained which comprised 90 parts by weight of a graphite and 10 parts by weight of a lowly crystalline carbonaceous substance with which the graphite was covered.

(Negative-Electrode Active-Material Production 7)

The same procedure as in Negative-Electrode Active-Material Production 4 was conducted, except that the petroleum-derived heavy oil obtained in thermal naphtha cracking was mixed in an increased amount. Thus, composite carbonaceous substance (G) was obtained which comprised 70 parts by weight of a graphite and 30 parts by weight of a lowly crystalline carbonaceous substance with which the graphite was covered.

(Negative-Electrode Active-Material Production 8)

The same procedure as in Negative-Electrode Active-Material Production 4 was conducted, except that graphitization was further conducted at 3,000° C. in an inert gas. Thus, composite carbonaceous substance (I) was obtained which comprised 95 parts by weight of a graphite and 5 parts by weight of a lowly crystalline carbonaceous substance with which the graphite was covered.

(Negative-Electrode Active-Material Production 9)

Carbonaceous substance (A) was mixed with a phenol-formaldehyde solution, and this mixture was carbonized at 1,300° C. in an inert gas. Thereafter, the resultant sinter was classified to thereby obtain a composite carbonaceous powder comprising graphite particles and a carbonaceous substance having different crystallinity adherent to the surface of the particles. In the classification, the sinter was repeatedly passed through an ASTM 400-mesh sieve five times in order to prevent inclusion of coarse particles. This composite powder is referred to as composite carbonaceous substance (J). It was ascertained from actual carbon ratio that the negative-electrode active-material powder obtained comprised 95 parts by weight of a graphite and 5 parts by weight of a lowly crystalline carbonaceous substance with which the graphite was covered.

(Negative-Electrode Active-Material Production 10)

Coal tar pitch having a quinoline insoluble content of 0.05% by mass or lower was heat-treated at 460° C. for 10 hours in a reaction furnace. The massive carbonaceous substance obtained was ground with a mill (Orient Mill, manufactured by Seishin Enterprise Co., Ltd.) and further pulverized with a pulverizer (Turbo Mill, manufactured by Matsubo Corp.) to reduce the massive substance into fine particles having a median diameter of 17 μm. These particles were packed into a metallic container and heat-treated at 540° C. for 2 hours in a nitrogen gas stream in a box-shaped electric furnace. The mass obtained was crushed with a crusher (Roll Jaw Crusher, manufactured by Yoshida Seishakusho Co., Ltd.) and further pulverized with a pulverizer (Turbo Mill, manufactured by Matsubo Corp.). The powder obtained was put in a container and heat-treated at 1,300° C. for 1 hour in a nitrogen atmosphere in an electric furnace. Thereafter, the resultant sinter was classified to thereby obtain carbonaceous substance (K). In the classification, the sinter was repeatedly passed through an ASTM 400-mesh sieve five times in order to prevent inclusion of coarse particles.

(Negative-Electrode Active-Material Production 11)

Carbonaceous substance (K) was mixed with a phenol-formaldehyde solution, and this mixture was carbonized at 1,300° C. in an inert gas. Thereafter, the resultant sinter was classified to thereby obtain a composite carbonaceous powder comprising graphite particles and a carbonaceous substance having different crystallinity adherent to the surface of the particles. In the classification, the sinter was repeatedly passed through an ASTM 400-mesh sieve five times in order to prevent inclusion of coarse particles. This composite powder is referred to as composite carbonaceous substance (L). It was ascertained from actual carbon ratio that the negative-electrode active-material powder obtained comprised 60 parts by weight of a graphite and 40 parts by weight of a lowly crystalline carbonaceous substance with which the graphite was covered.

(Negative-Electrode Active-Material Production 12)

Carbonaceous substance (K) was mixed with a petroleum-derived heavy oil obtained in thermal naphtha cracking, and this mixture was carbonized at 1,300° C. in an inert gas. Thereafter, the resultant sinter was classified to thereby obtain a composite carbonaceous powder comprising graphite particles and a carbonaceous substance having different crystallinity adherent to the surface of the particles. In the classification, the sinter was passed through an ASTM 400-mesh sieve five times in order to prevent inclusion of coarse particles. Thus, a composite carbonaceous substance (M) was obtained. It was ascertained from actual carbon ratio that the negative-electrode active-material powder obtained comprised 95 parts by weight of a graphite and 5 parts by weight of a lowly crystalline carbonaceous substance with which the graphite was covered.

(Negative-Electrode Active-Material Production 13)

Coal tar pitch having a quinoline insoluble content of 0.05% by mass or lower was heat-treated at 460° C. for 10 hours in a reaction furnace. The massive carbonaceous substance obtained was ground with a mill (Orient Mill, manufactured by Seishin Enterprise Co., Ltd.) and further pulverized with a pulverizer (Turbo Mill, manufactured by Matsubo Corp.) to reduce the massive substance into fine particles having a median diameter of 17 μm. These particles were packed into a metallic container and heat-treated at 540° C. for 2 hours in a nitrogen gas stream in a box-shaped electric furnace. The mass obtained was crushed with a crusher (Roll Jaw Crusher, manufactured by Yoshida Seishakusho Co., Ltd.) and further pulverized with a pulverizer (Turbo Mill, manufactured by Matsubo Corp.). The powder obtained was put in a container and heat-treated at 1,000° C. for 1 hour in a nitrogen atmosphere in an electric furnace. Furthermore, the powder heat-treated was transferred to a graphite crucible and heated with a direct voltage application type electric furnace at 3,000° C. over 5 hours in an inert atmosphere to graphitize it. Thus, carbonaceous substance (N) was obtained. This carbonaceous substance (N) was mixed with a petroleum-derived heavy oil obtained in thermal naphtha cracking, and this mixture was carbonized at 900° C. in an inert gas. Thereafter, the resultant sinter was classified to thereby obtain composite carbonaceous substance (O) comprising graphite particles and a carbonaceous substance having different crystallinity adherent to the surface of the particles. In the classification, the sinter was passed through an ASTM 400-mesh sieve five times in order to prevent inclusion of coarse particles. It was ascertained from actual carbon ratio that the negative-electrode active-material powder obtained comprised 95 parts by weight of a graphite and 5 parts by weight of a lowly crystalline carbonaceous substance with which the graphite was covered.

(Negative-Electrode Active-Material Production 14)

The same procedure as in Negative-Electrode Active-Material Production 4 was conducted, except that natural flake graphite was used in place of carbonaceous substance (A). Thus, composite carbonaceous substance (P) was obtained which comprised 95 parts by weight of a graphite and 5 parts by weight of a lowly crystalline carbonaceous substance with which the graphite was covered.

(Negative-Electrode Active-Material Production 15)

The same procedure as in Negative-Electrode Active-Material Production 4 was conducted, except that the petroleum-derived heavy oil obtained in thermal naphtha cracking was mixed in a reduced amount in Negative-Electrode Active-Material Production 14. Furthermore, the powder obtained was transferred to a graphite crucible and heated with a direct voltage application type electric furnace at 3,000° C. over 5 hours in an inert atmosphere to graphitize it. Thereafter, the resultant sinter was classified to thereby obtain composite carbonaceous substance (Q) comprising particles and a carbonaceous substance having different crystallinity adherent to the surface of the particles. In the classification, the sinter was passed through an ASTM 400-mesh sieve five times in order to prevent inclusion of coarse particles. It was ascertained from actual carbon ratio that the composite carbonaceous substance (Q) obtained comprised 99 parts by weight of a graphite and 1 part by weight of a lowly crystalline carbonaceous substance with which the graphite was covered.

(Negative-Electrode Active-Material Production 16)

The same procedure as in Negative-Electrode Active-Material Production 4 was conducted, except that a natural graphite having a volume-average particle diameter of 48 μm was used in place of carbonaceous substance (A). Thus, composite carbonaceous substance (R) was obtained which comprised 95 parts by weight of a graphite and 5 parts by weight of a lowly crystalline carbonaceous substance with which the graphite was covered.

(Negative-Electrode Active-Material Production 17)

The same procedure as in Negative-Electrode Active-Material Production 4 was conducted, except that a natural graphite which had been lowly purified and had a residual ash content of 1% was used in place of carbonaceous substance (A). Thus, composite carbonaceous substance (S) was obtained which comprised 95 parts by weight of a graphite and 5 parts by weight of a lowly crystalline carbonaceous substance with which the graphite was covered.

Properties of the negative-electrode active materials obtained are shown in Negative Electrode [1] Table 1. The methods used for determining the properties are as described hereinabove.

Negative Electrode [1] Table 1

TABLE 32

| Negative-electrode active material | Particle diameter μm | Roundness — | Specific surface area m²/g | Raman R value — | Raman half-value width cm$^{-1}$ | $d_{002}$ nm | Ash content mass % | Micro-pore distribution mL/g | Total pore distribution mL/g | True density g/cm³ | Roundness — | Aspect ratio — |
|---|---|---|---|---|---|---|---|---|---|---|---|---|
| Carbonaceous substance (A) | 14.2 | 0.93 | 10.5 | 0.28 | 26 | 0.335 | 0.07 | 0.125 | 0.760 | 2.26 | 0.93 | 1.4 |
| Carbonaceous substance (B) | 15.0 | 0.87 | 12.2 | 0.90 | 85 | 0.345 | 0.04 | 0.084 | 0.490 | 2.10 | 0.90 | 1.4 |

TABLE 32-continued

| Negative-electrode active material | Particle diameter μm | Round-ness | Specific surface area m²/g | Raman R value | Raman half-value width cm⁻¹ | $d_{002}$ nm | Ash content mass % | Micro-pore distribution mL/g | Total pore distribution mL/g | True density g/cm³ | Round-ness | Aspect ratio |
|---|---|---|---|---|---|---|---|---|---|---|---|---|
| Binary crystalline carbonaceous mixture (C) | 14.7 | 0.91 | 10.6 | 0.33 | 32 | 0.336 | 0.05 | 0.120 | 0.758 | 2.25 | 0.91 | 1.7 |
| Composite carbonaceous substance (D) | 15.2 | 0.93 | 3.0 | 0.35 | 37 | 0.336 | 0.07 | 0.101 | 0.692 | 2.25 | 0.93 | 1.4 |
| Composite carbonaceous substance (E) | 14.2 | 0.93 | 7.2 | 0.42 | 32 | 0.336 | 0.07 | 0.120 | 0.750 | 2.26 | 0.93 | 1.4 |
| Composite carbonaceous substance (F) | 15.7 | 0.93 | 3.0 | 0.42 | 44 | 0.336 | 0.06 | 0.090 | 0.683 | 2.24 | 0.93 | 1.4 |
| Composite carbonaceous substance (G) | 14.2 | 0.91 | 2.5 | 0.68 | 65 | 0.338 | 0.06 | 0.086 | 0.625 | 2.21 | 0.91 | 1.6 |
| Composite carbonaceous substance (I) | 15.5 | 0.93 | 2.8 | 0.28 | 29 | 0.335 | 0.03 | 0.125 | 0.346 | 2.26 | 0.93 | 1.4 |
| Composite carbonaceous substance (J) | 15.9 | 0.92 | 5.4 | 0.45 | 46 | 0.337 | 0.08 | 0.132 | 0.634 | 2.24 | 0.92 | 1.5 |
| Carbonaceous substance (K) | 18.0 | 0.91 | 7.5 | 1.00 | 86 | 0.345 | 0.05 | 0.086 | 0.489 | 2.10 | 0.87 | 2.3 |
| Composite carbonaceous substance (L) | 19.3 | 0.92 | 4.2 | 1.30 | 90 | 0.348 | 0.05 | 0.145 | 0.621 | 2.09 | 0.90 | 2.3 |
| Composite carbonaceous substance (M) | 17.8 | 0.91 | 5.5 | 1.04 | 88 | 0.345 | 0.07 | 0.991 | 0.593 | 2.25 | 0.90 | 2.2 |
| Composite carbonaceous substance (O) | 18.3 | 0.91 | 1.7 | 0.22 | 22 | 0.336 | 0.03 | 0.058 | 0.345 | 2.25 | 0.92 | 2.0 |
| Composite carbonaceous substance (P) | 19.4 | 0.80 | 3.4 | 0.25 | 27 | 0.336 | 0.08 | 0.125 | 0.693 | 2.25 | 0.80 | 3.1 |
| Composite carbonaceous substance (Q) | 19.4 | 0.80 | 2.5 | 0.21 | 20 | 0.336 | 0.09 | 0.121 | 0.743 | 2.26 | 0.80 | 3.0 |
| Composite carbonaceous substance (R) | 53.2 | 0.90 | 2.2 | 0.38 | 40 | 0.336 | 0.08 | 0.124 | 0.789 | 2.25 | 0.92 | 1.4 |
| Composite carbonaceous substance (S) | 15.7 | 0.93 | 3.1 | 0.34 | 36 | 0.336 | 0.50 | 0.101 | 0.693 | 2.25 | 0.93 | 1.4 |

Negative Electrode [1] [Production of Batteries]

<<Positive-Electrode Production 1>>

Ninety percents by mass lithium cobalt oxide ($LiCoO_2$) as a positive-electrode active material was mixed with 5% by mass acetylene black as a conductive material and 5% by mass poly(vinylidene fluoride) (PVdF) as a binder in N-methylpyrrolidone solvent to prepare a slurry. The slurry obtained was applied to each side of an aluminum foil having a thickness of 15 μm and dried. The coated foil was rolled with a pressing machine to a thickness of 80 μm. Pieces each having an active-material layer size with a width of 100 mm and a length of 100 mm and including an uncoated part having a width of 30 mm were cut out of the rolled foil. Thus, positive electrodes were obtained. The positive electrodes thus obtained had an active-material density of 2.35 g/cm³.

<<Positive-Electrode Production 2>>

Positive electrodes were produced in the same manner as in Positive-Electrode Production 1, except that the mass of the active material to be applied per side was doubled.

<<Positive-Electrode Production 3>>

Ninety percents by mass $LiNi_{0.80}Co_{0.15}Al_{0.05}O_2$ as a positive-electrode active material was mixed with 5% by mass acetylene black as a conductive material and 5% by mass poly(vinylidene fluoride) (PVdF) as a binder in N-methylpyrrolidone solvent to prepare a slurry. The slurry obtained was applied to each side of an aluminum foil having a thickness of 15 μm and dried. The coated foil was rolled with a pressing machine to a thickness of 65 μm. Pieces each having an active-material layer size with a width of 100 mm and a length of 100 mm and including an uncoated part having a width of 30 mm were cut out of the rolled foil. Thus, positive electrodes were obtained. The positive electrodes thus obtained had an active-material density of 2.35 g/cm³.

<<Negative-Electrode Production 1>>

To 98 parts by weight of a negative-electrode active material were added 100 parts by weight of an aqueous dispersion of sodium carboxymethyl cellulose (concentration of sodium carboxymethyl cellulose, 1% by mass) as a thickener and 2 parts by weight of an aqueous dispersion of a styrene/butadiene rubber (concentration of styrene/butadiene rubber, 50% by mass) as a binder. The ingredients were mixed together by means of a disperser to obtain a slurry. The slurry obtained was applied to each side of a rolled copper foil having a thickness of 10 μm and dried. The coated foil was rolled with a pressing machine to a thickness of 75 μm. Pieces each having an active-material layer size with a width of 104 mm and a length of 104 mm and including an uncoated part having a width of 30 mm were cut out of the rolled foil. Thus, negative electrodes were obtained. The negative electrodes thus obtained had an active-material density of 1.35 g/cm$^3$.

<<Negative-Electrode Production 2>>

Negative electrodes were produced in the same manner as in Negative-Electrode Production 1, except that the weight of the active material to be applied per side was doubled.

<<Negative-Electrode Production 3>>

Negative electrodes were produced in the same manner as in Negative-Electrode Production 1, except that the active-material density on one side was 1.70 g/cm$^3$.

<<Negative-Electrode Production 4>>

To 95 parts by weight of composite carbonaceous substance A were added 100 parts by weight of an aqueous dispersion of sodium carboxymethyl cellulose (concentration of sodium carboxymethyl cellulose, 1% by mass) as a thickener and 8 parts by weight of an aqueous dispersion of a styrene/butadiene rubber (concentration of styrene/butadiene rubber, 50% by mass) as a binder. The ingredients were mixed together by means of a disperser to obtain a slurry. The slurry obtained was applied to each side of a copper foil having a thickness of 10 μm and dried. The coated foil was rolled with a pressing machine to a thickness of 75 μm. Pieces each having an active-material layer size with a width of 104 mm and a length of 104 mm and including an uncoated part having a width of 30 mm were cut out of the rolled foil. Thus, negative electrodes were obtained. The negative electrodes thus obtained had an active-material density of 1.35 g/cm$^3$.

<<Electrolytic-Solution Production 1>>

In a dry argon atmosphere, sufficiently dried lithium hexafluorophosphate (LiPF$_6$) was dissolved in a concentration of 1 mol/L in a mixture of ethylene carbonate (EC), dimethyl carbonate (DMC), and ethyl methyl carbonate (EMC) (volume ratio, 3:3:4). Furthermore, lithium difluorophosphate (LiPO$_2$F$_2$) was added thereto so as to result in a concentration of 0.3% by mass.

<<Electrolytic-Solution Production 2>>

In a dry argon atmosphere, sufficiently dried lithium hexafluorophosphate (LiPF$_6$) was dissolved in a concentration of 1 mol/L in a mixture of ethylene carbonate (EC), dimethyl carbonate (DMC), and ethyl methyl carbonate (EMC) (volume ratio, 3:3:4). Furthermore, trimethylsilyl methanesulfonate was added thereto so as to result in a concentration of 0.3% by mass.

<<Electrolytic-Solution Production 3>>

In a dry argon atmosphere, sufficiently dried lithium hexafluorophosphate (LiPF$_6$) was dissolved in a concentration of 1 mol/L in a mixture of ethylene carbonate (EC), dimethyl carbonate (DMC), and ethyl methyl carbonate (EMC) (volume ratio, 3:3:4). Furthermore, hexamethylcyclotrisiloxane was added thereto so as to result in a concentration of 0.3% by mass.

<<Electrolytic-Solution Production 4>>

In a dry argon atmosphere, sufficiently dried lithium hexafluorophosphate (LiPF$_6$) was dissolved in a concentration of 1 mol/L in a mixture of ethylene carbonate (EC), dimethyl carbonate (DMC), and ethyl methyl carbonate (EMC) (volume ratio, 3:3:4).

<<Battery Production 1>>

Thirty-two positive electrodes and 33 negative electrodes were alternately disposed and superposed together with porous polyethylene sheet separators (thickness, 25 μm) sandwiched between the electrodes. In this operation, each positive electrode was disposed so that the positive-electrode active-material surface was within the range of the opposed negative-electrode active-material surface. The uncoated parts of the positive electrodes were welded together and those of the negative electrodes were welded together. Thus, current collector tabs were produced to obtain an electrode group. This electrode group was packed into a battery can (outer dimensions: 120×110×10 mm). Thereafter, 20 mL of a nonaqueous electrolyte was introduced into the battery can packed with the electrode group and sufficiently infiltrated into the electrodes. This can was sealed to fabricate a prismatic battery. This battery had a rated discharge capacity of about 6 ampere-hours (Ah) and a direct-current resistance as measured by the 10-kHz alternating-current method of about 5 milliohms (mΩ).

<<Battery Production 2>>

Sixteen positive electrodes and 17 negative electrodes were alternately disposed and superposed together with porous polyethylene sheet separators (thickness, 25 μm) sandwiched between the electrodes. In this operation, each positive electrode was disposed so that the positive-electrode active-material surface was within the range of the opposed negative-electrode active-material surface. The uncoated parts of the positive electrodes were welded together and those of the negative electrodes were welded together. Thus, current collector tabs were produced to obtain an electrode group. This electrode group was packed into a battery can (outer dimensions: 120×110×10 mm). Thereafter, 20 mL of a nonaqueous electrolyte was introduced into the battery can packed with the electrode group and sufficiently infiltrated into the electrodes. This can was sealed to fabricate a prismatic battery. This battery had a rated discharge capacity of about 6 ampere-hours (Ah) and a direct-current resistance as measured by the 10-kHz alternating-current method of about 7 milliohms (mΩ).

Negative Electrode [1] Example 1

A battery was produced by the method described under <<Battery Production 1>> using the negative electrodes produced in <<Negative-Electrode Production 1>> in which binary crystalline carbonaceous mixture (C) was used as the negative-electrode active material and further using the positive electrodes produced in <<Positive-Electrode Production 1>> and the electrolyte produced in <<Electrolytic-Solution Production 1>>. This battery was examined by the methods which will be described under <<Battery Evaluation>> given later and by the measurement methods described above.

Negative Electrode [1] Example 2

A battery was produced in the same manner as in Negative Electrode [1] Example 1, except that composite carbonaceous substance (D) was used as the negative-electrode active material in <<Negative-Electrode Production 1>>. The battery evaluation described under <<Battery Evaluation>> was conducted.

Negative Electrode [1] Example 3

A battery was produced in the same manner as in Negative Electrode [1] Example 1, except that composite carbonaceous substance (E) was used as the negative-electrode active material in <<Negative-Electrode Production 1>>. The battery evaluation described under <<Battery Evaluation>> was conducted.

Negative Electrode [1] Example 4

A battery was produced in the same manner as in Negative Electrode [1] Example 1, except that composite carbonaceous substance (F) was used as the negative-electrode active material in <<Negative-Electrode Production 1>>. The battery evaluation described under <<Battery Evaluation>> was conducted.

Negative Electrode [1] Example 5

A battery was produced in the same manner as in Negative Electrode [1] Example 1, except that composite carbonaceous substance (G) was used as the negative-electrode active material in <<Negative-Electrode Production 1>>. The battery evaluation described under <<Battery Evaluation>> was conducted.

Negative Electrode [1] Example 6

A battery was produced in the same manner as in Negative Electrode [1] Example 1, except that composite carbonaceous substance (J) was used as the negative-electrode active material in <<Negative-Electrode Production 1>>. The battery evaluation described under <<Battery Evaluation>> was conducted.

Negative Electrode [1] Example 7

A battery was produced in the same manner as in Example 1, except that composite carbonaceous substance (I) was used as the negative-electrode active material in <<Negative-Electrode Production 1>>. The battery evaluation described under <<Battery Evaluation>> was conducted.

Negative Electrode [1] Example 8

A battery was produced in the same manner as in Negative Electrode [1] Example 1, except that composite carbonaceous substance (M) was used as the negative-electrode active material in <<Negative-Electrode Production 1>>. The battery evaluation described under <<Battery Evaluation>> was conducted.

Negative Electrode [1] Example 9

A battery was produced in the same manner as in Negative Electrode [1] Example 1, except that composite carbonaceous substance (R) was used as the negative-electrode active material in <<Negative-Electrode Production 1>>. The battery evaluation described under <<Battery Evaluation>> was conducted.

Negative Electrode [1] Example 10

A battery was produced in the same manner as in Negative Electrode [1] Example 1, except that composite carbonaceous substance (L) was used as the negative-electrode active material in <<Negative-Electrode Production 1>>. The battery evaluation described under <<Battery Evaluation>> was conducted.

Negative Electrode [1] Example 11

A battery was produced in the same manner as in Negative Electrode [1] Example 1, except that composite carbonaceous substance (S) was used as the negative-electrode active material in <<Negative-Electrode Production 1>>. The battery evaluation described under <<Battery Evaluation>> was conducted.

Negative Electrode [1] Example 12

A battery was produced in the same manner as in Negative Electrode [1] Example 1, except that composite carbonaceous substance (O) was used as the negative-electrode active material in <<Negative-Electrode Production 1>>. The battery evaluation described under <<Battery Evaluation>> was conducted.

Negative Electrode [1] Example 13

A battery was produced in the same manner as in Negative Electrode [1] Example 1, except that composite carbonaceous substance (P) was used as the negative-electrode active material in <<Negative-Electrode Production 1>>. The battery evaluation described under <<Battery Evaluation>> was conducted.

Negative Electrode [1] Example 14

A battery was produced in the same manner as in Example 1, except that composite carbonaceous substance (Q) was used as the negative-electrode active material in <<Negative-Electrode Production 1>>. The battery evaluation described under <<Battery Evaluation>> was conducted.

Negative Electrode [1] Example 15

A battery was produced by the method described under <<Battery Production 2>> using the negative electrodes produced in <<Negative-Electrode Production 2>> in which composite carbonaceous substance (D) was used as the negative-electrode active material and further using the positive electrodes produced in <<Positive-Electrode Production 2>> and the electrolyte produced in <<Electrolytic-Solution Production 1>>. Except these, battery evaluation was conducted in the same manner as in Negative Electrode [1] Example 1.

Negative Electrode [1] Example 16

A battery was produced by the method described under <<Battery Production 1>> using the negative electrodes produced in <<Negative-Electrode Production 3>> in which composite carbonaceous substance (D) was used as the negative-electrode active material and further using the positive electrodes produced in <<Positive-Electrode Production 1>> and the electrolyte produced in <<Electrolytic-Solution Production 1>>. Except these, battery evaluation was conducted in the same manner as in Negative Electrode [1] Example 1.

Negative Electrode [1] Example 17

A battery was produced by the method described under <<Battery Production 1>> using the negative electrodes produced in <<Negative-Electrode Production 4>> in which composite carbonaceous substance (D) was used as the negative-electrode active material and further using the positive electrodes produced in <<Positive-Electrode Production 1>> and the electrolyte produced in <<Electrolytic- Solution Production 1>>. Except these, battery evaluation was conducted in the same manner as in Negative Electrode [1] Example 1.

The results of evaluation in Negative Electrode [1] Example 1 to Negative Electrode [1] Example 17 are shown in Negative Electrode [1] Table 2.

Negative Electrode [1] Examples 18 to 34

Battery evaluation was conducted in the same manner as in Negative Example [1] Examples 1 to 17, except that the electrolyte used in these Examples was replaced by the electrolyte produced in <<Electrolytic-Solution Production 2>>. The results of evaluation in Negative Electrode [1] Example 18 to Negative Electrode [1] Example 34 are shown in Negative Electrode [1] Table 3.

Negative Electrode [1] Examples 35 to 51

Battery evaluation was conducted in the same manner as in Negative Example [1] Examples 1 to 17, except that the electrolyte used in these Examples was replaced by the electrolyte produced in <<Electrolytic-Solution Production 3>>. The results of evaluation in Negative Electrode [1] Example 35 to Negative Electrode [1] Example 51 are shown in Negative Electrode [1] Table 4.

Negative Electrode [1] Comparative Example 1

A battery was produced in the same manner as in Negative Electrode [1] Example 1, except that carbonaceous substance (A) was used as the negative-electrode active material in <<Negative-Electrode Production 1>>. The battery evaluation described under <<Battery Evaluation>> was conducted.

Negative Electrode [1] Comparative Example 2

A battery was produced in the same manner as in Negative Electrode [1] Comparative Example 1, except that the electrolyte used in the Comparative Example was replaced by the electrolyte produced in <<Electrolytic-Solution Production 4>>. The battery evaluation described under <<Battery Evaluation>> was conducted.

Negative Electrode [1] Comparative Example 3

A battery was produced in the same manner as in Negative Electrode [1] Example 1, except that carbonaceous substance (B) was used as the negative-electrode active material in <<Negative-Electrode Production 1>>. The battery evaluation described under <<Battery Evaluation>> was conducted.

Negative Electrode [1] Comparative Example 4

A battery was produced in the same manner as in Negative Electrode [1] Comparative Example 3, except that the electrolyte used in the Negative Electrode [1] Comparative Example 3 was replaced by the electrolyte produced in <<Electrolytic-Solution Production 4>>. The battery evaluation described under <<Battery Evaluation>> was conducted.

Negative Electrode [1] Comparative Example 5

A battery was produced in the same manner as in Negative Electrode [1] Example 1, except that the electrolyte used in the Negative Electrode [1] Example 1 was replaced by the electrolyte produced in <<Electrolytic-Solution Production 4>>. The battery evaluation described under <<Battery Evaluation>> was conducted.

Negative Electrode [1] Comparative Example 6

A battery was produced in the same manner as in Negative Electrode [1] Example 2, except that the electrolyte used in the Example was replaced by the electrolyte produced in <<Electrolytic-Solution Production 4>>. The battery evaluation described under <<Battery Evaluation>> was conducted.

Negative Electrode [1] Comparative Example 7

A battery was produced in the same manner as in Negative Electrode [1] Example 1, except that carbonaceous substance (K) was used as the negative-electrode active material in <<Negative-Electrode Production 1>>. The battery evaluation described under <<Battery Evaluation>> was conducted.

Negative Electrode [1] Comparative Example 8

A battery was produced in the same manner as in Negative Electrode [1] Comparative Example 7, except that the electrolyte used in the Comparative Example was replaced by the electrolyte produced in <<Electrolytic-Solution Production 4>>. The battery evaluation described under <<Battery Evaluation>> was conducted.

Negative Electrode [1] Comparative Examples 9 to 11

Battery evaluation was conducted in the same manner as in Negative Electrode [1] Comparative Examples 1, 3, and 7, except that the electrolyte used in these Comparative Examples was replaced by the electrolyte produced in <<Electrolytic-Solution Production 2>>.

Negative Electrode [1] Comparative Examples 12 to 14

Battery evaluation was conducted in the same manner as in Negative Electrode [1] Comparative Examples 1, 3, and 7, except that the electrolyte used in these Comparative Examples was replaced by the electrolyte produced in <<Electrolytic-Solution Production 3>>.

The results of evaluation in Negative Electrode [1] Comparative Example 1 to Negative Electrode [1] Comparative Example 14 are shown in Negative Example [1] Table 5.

Negative Electrode [1] Example 52

A battery was produced by the method described under <<Battery Production 1>> using the negative electrodes produced in <<Negative-Electrode Production 1>> in which composite carbonaceous substance (D) was used as the negative-electrode active material and further using the positive electrodes produced in <<Positive-Electrode Production 3>> and the electrolyte produced in <<Electrolytic-Solution Production 1>>. The battery evaluation described under <<Battery Evaluation>> was conducted.

Negative Electrode [1] Example 53

A battery was produced in the same manner as in Example 52, except that the electrolyte used in Example 52 was replaced by the electrolyte produced in <<Electrolytic-Solution Production 2>>. The battery evaluation described under <<Battery Evaluation>> was conducted.

Negative Electrode [1] Example 54

A battery was produced in the same manner as in Example 52, except that the electrolyte used in Example 52 was replaced by the electrolyte produced in <<Electrolytic-Solution Production 3>>. The battery evaluation described under <<Battery Evaluation>> was conducted.

Negative Electrode [1] Comparative Example 15

A battery was produced in the same manner as in Example 52, except that the electrolyte used in Example 52 was replaced by the electrolyte produced in <<Electrolytic-Solution Production 4>>. The battery evaluation described under <<Battery Evaluation>> was conducted.

The results of evaluation in Examples 52 to 54 and Comparative Example 15 are shown in Negative Example [1] Table 6.

Negative Electrode [1]<<Battery Evaluation>>
(Capacity Measurement)

The battery which had undergone no charge/discharge cycling was subjected to 5 cycles of initial charge/discharge at 25° C. in a voltage range of 4.2-3.0 V at a current of 0.2 C (the value of current at which the rated capacity based on 1-hour-rate discharge capacity is discharged over 1 hour is taken as 1 C; the same applies hereinafter). The 0.2-C discharge capacity thereof as measured in the fifth cycle in this operation was taken as initial capacity. An output measurement shown below was then made.

(Output Measurement)

In a 25° C. environment, the battery was charged for 150 minutes at a constant current of 0.2 C and then discharged for 10 seconds at each of 0.1 C, 0.3 C, 1.0 C, 3.0 C, and 10.0 C. The voltage was measured at 10 seconds after the discharge initiation. The area of the triangle surrounded by the resultant current-voltage straight line and the final lower voltage (3 V) was taken as output (W).

(Cycle Test)

The battery was subjected to a cycle test in a high-temperature environment of 60° C., which is regarded as the upper-limit temperature for the actual use of lithium secondary batteries. The battery was charged by the constant-current constant-voltage method at 2 C to a final charge voltage of 4.2 V and then discharged at a constant current of 2 C to a final discharge voltage of 3.0 V. This charge/discharge operation as one cycle was repeated to conduct 500 cycles in total. The battery which had undergone the cycle test was subjected to 3 cycles of charge/discharge in a 25° C. environment. The 0.2-C discharge capacity thereof as measured in the third cycle was taken as capacity after cycling. Using the following calculation formula, the capacity retention through cycling was determined from the initial capacity measured prior to the cycling and the capacity after cycling measured after completion of the cycle test.

Capacity retention through cycling (%)=100×(capacity after cycling)/(initial capacity)

The battery which had undergone the cycle test was subjected to the output measurement described under (Output Measurement). From the output measured before the cycle test and from the output thus determined after completion of the cycle test, the output retention represented by the following formula was calculated.

Output retention (%)=100×(output after cycle test)/(output before cycling)

Impedance Rct and double-layer capacity Cdl in Negative Electrode [1] Table 2 are parameters contributing to output. The smaller the value of impedance Rct and the larger the value of double-layer capacity Cdl, the more the output tends to improve. Incidentally, "Impedance Rct" and "Double-layer capacity Cdl" were determined by the methods described hereinabove under "Impedance".

Negative Electrode [1] Table 2

TABLE 33

| No. | Negative-electrode active material | Impedance Rct Ω | Impedance Cdl ×10$^{-4}$ F | Initial capacity mAh | Direct current resistance mΩ | Capacity retention through cycling % | Initial output W | Output after cycling W | Output retention % |
|---|---|---|---|---|---|---|---|---|---|
| Ex. 1 | Binary crystalline carbonaceous mixture (C) | 22 | 1.1 | 6001 | 5.2 | 80 | 574 | 420 | 73 |
| Ex. 2 | Composite carbonaceous substance (D) | 25 | 0.9 | 6010 | 4.9 | 84 | 595 | 450 | 76 |
| Ex. 3 | Composite carbonaceous substance (E) | 11 | 1.9 | 6005 | 5.2 | 82 | 602 | 432 | 72 |
| Ex. 4 | Composite carbonaceous substance (F) | 28 | 1.2 | 6000 | 5.2 | 83 | 581 | 420 | 72 |
| Ex. 5 | Composite carbonaceous substance (G) | 30 | 0.8 | 5890 | 5.6 | 81 | 567 | 396 | 70 |
| Ex. 6 | Composite carbonaceous substance (J) | 24 | 1.2 | 5987 | 5.1 | 82 | 588 | 414 | 70 |
| Ex. 7 | Composite carbonaceous substance (I) | 35 | 1.0 | 6010 | 5.3 | 84 | 574 | 414 | 72 |
| Ex. 8 | Composite carbonaceous substance (M) | 75 | 0.7 | 5609 | 5.4 | 79 | 560 | 390 | 70 |

TABLE 33-continued

| No. | Negative-electrode active material | Impedance Rct Ω | Impedance Cdl ×10⁻⁴ F | Initial capacity mAh | Direct current resistance mΩ | Capacity retention through cycling % | Initial output W | Output after cycling W | Output retention % |
|---|---|---|---|---|---|---|---|---|---|
| Ex. 9 | Composite carbonaceous substance (R) | 25 | 0.9 | 6007 | 4.9 | 78 | 574 | 408 | 71 |
| Ex. 10 | Composite carbonaceous substance (L) | 60 | 0.7 | 5045 | 5.5 | 76 | 532 | 342 | 64 |
| Ex. 11 | Composite carbonaceous substance (S) | 22 | 1.0 | 6002 | 5.8 | 81 | 574 | 402 | 70 |
| Ex. 12 | Composite carbonaceous substance (O) | 150 | 0.1 | 5928 | 5.4 | 80 | 539 | 366 | 68 |
| Ex. 13 | Composite carbonaceous substance (P) | 42 | 0.7 | 5920 | 5.4 | 82 | 539 | 366 | 68 |
| Ex. 14 | Composite carbonaceous substance (Q) | 45 | 0.9 | 5902 | 5.2 | 79 | 553 | 372 | 67 |
| Ex. 15 | Composite carbonaceous substance (D) | 14 | 0.8 | 5989 | 5.1 | 76 | 560 | 366 | 65 |
| Ex. 16 | Composite carbonaceous substance (D) | 15 | 1.0 | 5989 | 4.8 | 79 | 588 | 396 | 67 |
| Ex. 17 | Composite carbonaceous substance (D) | 50 | 0.4 | 5982 | 5.5 | 78 | 602 | 390 | 65 |

In Negative Electrode [1] Table 2, the electrolyte is one produced in <<Electrolytic-Solution Production 1>> and containing 0.3% by mass lithium difluorophosphate ($LiPO_2F_2$).

Negative Electrode [1] Table 3

TABLE 34

| No. | Negative-electrode active material | Impedance Rct Ω | Impedance Cdl ×10⁻⁴ F | Initial capacity mAh | Direct current resistance mΩ | Capacity retention through cycling % | Initial output W | Output after cycling W | Output retention % |
|---|---|---|---|---|---|---|---|---|---|
| Ex. 18 | Binary crystalline carbonaceous mixture (C) | 23 | 1.1 | 5821 | 5.3 | 78 | 557 | 400 | 72 |
| Ex. 19 | Composite carbonaceous substance (D) | 27 | 0.9 | 5830 | 5.6 | 82 | 577 | 426 | 74 |
| Ex. 20 | Composite carbonaceous substance (E) | 12 | 1.8 | 5825 | 4.9 | 80 | 584 | 415 | 71 |
| Ex. 21 | Composite carbonaceous substance (F) | 30 | 1.2 | 5820 | 4.6 | 81 | 564 | 391 | 69 |
| Ex. 22 | Composite carbonaceous substance (G) | 32 | 0.7 | 5713 | 5.5 | 79 | 550 | 375 | 68 |
| Ex. 23 | Composite carbonaceous substance (J) | 25 | 1.2 | 5807 | 5.2 | 80 | 570 | 396 | 69 |
| Ex. 24 | Composite carbonaceous substance (I) | 37 | 0.9 | 5830 | 5.3 | 82 | 557 | 394 | 71 |
| Ex. 25 | Composite carbonaceous substance (M) | 80 | 0.7 | 5441 | 5.1 | 77 | 543 | 368 | 68 |
| Ex. 26 | Composite carbonaceous substance (R) | 27 | 0.9 | 5827 | 5.3 | 76 | 557 | 389 | 70 |

TABLE 34-continued

| No. | Negative-electrode active material | Impedance Rct Ω | Impedance Cdl ×10⁻⁴ F | Initial capacity mAh | Direct current resistance mΩ | Capacity retention through cycling % | Initial output W | Output after cycling W | Output retention % |
|---|---|---|---|---|---|---|---|---|---|
| Ex. 27 | Composite carbonaceous substance (L) | 64 | 0.7 | 4894 | 4.8 | 74 | 516 | 318 | 62 |
| Ex. 28 | Composite carbonaceous substance (S) | 23 | 0.9 | 5822 | 4.7 | 79 | 557 | 382 | 69 |
| Ex. 29 | Composite carbonaceous substance (O) | 159 | 0.1 | 5750 | 4.8 | 78 | 523 | 348 | 67 |
| Ex. 30 | Composite carbonaceous substance (P) | 45 | 0.6 | 5742 | 5.2 | 80 | 523 | 336 | 64 |
| Ex. 31 | Composite carbonaceous substance (Q) | 48 | 0.8 | 5725 | 5.2 | 77 | 536 | 345 | 64 |
| Ex. 32 | Composite carbonaceous substance (D) | 15 | 0.8 | 5809 | 5.0 | 74 | 543 | 335 | 62 |
| Ex. 33 | Composite carbonaceous substance (D) | 16 | 1.0 | 5809 | 4.7 | 77 | 570 | 372 | 65 |
| Ex. 34 | Composite carbonaceous substance (D) | 53 | 0.4 | 5803 | 4.9 | 76 | 584 | 365 | 63 |

In Negative Electrode [1] Table 3, the electrolyte is one produced in <<Electrolytic-Solution Production 2>> and containing 0.3% by mass trimethylsilyl methanesulfonate.

Negative Electrode [1] Table 4

TABLE 35

| No. | Negative-electrode active material | Impedance Rct Ω | Impedance Cdl ×10⁻⁴ F | Initial capacity mAh | Direct current resistance mΩ | Capacity retention through cycling % | Initial output W | Output after cycling W | Output retention % |
|---|---|---|---|---|---|---|---|---|---|
| Ex. 35 | Binary crystalline carbonaceous mixture (C) | 26 | 1.3 | 6061 | 4.8 | 78 | 557 | 391 | 70 |
| Ex. 36 | Composite carbonaceous substance (D) | 30 | 1.0 | 6070 | 5.2 | 81 | 577 | 419 | 73 |
| Ex. 37 | Composite carbonaceous substance (E) | 13 | 2.0 | 6065 | 5.1 | 80 | 584 | 402 | 69 |
| Ex. 38 | Composite carbonaceous substance (F) | 34 | 1.3 | 6060 | 5.0 | 81 | 564 | 391 | 69 |
| Ex. 39 | Composite carbonaceous substance (G) | 36 | 0.8 | 5949 | 5.2 | 79 | 550 | 369 | 67 |
| Ex. 40 | Composite carbonaceous substance (J) | 29 | 1.3 | 6047 | 4.9 | 80 | 570 | 386 | 68 |
| Ex. 41 | Composite carbonaceous substance (I) | 42 | 1.1 | 6070 | 4.7 | 81 | 557 | 386 | 69 |
| Ex. 42 | Composite carbonaceous substance (M) | 90 | 0.8 | 5665 | 5.1 | 77 | 543 | 363 | 67 |
| Ex. 43 | Composite carbonaceous substance (R) | 30 | 1.0 | 6067 | 5.0 | 76 | 557 | 377 | 68 |
| Ex. 44 | Composite carbonaceous substance (L) | 72 | 0.8 | 5095 | 4.8 | 74 | 516 | 314 | 61 |

TABLE 35-continued

| No. | Negative-electrode active material | Impedance Rct Ω | Impedance Cdl ×10⁻⁴ F | Initial capacity mAh | Direct current resistance mΩ | Capacity retention through cycling % | Initial output W | Output after cycling W | Output retention % |
|---|---|---|---|---|---|---|---|---|---|
| Ex. 45 | Composite carbonaceous substance (S) | 26 | 1.1 | 6062 | 5.3 | 79 | 557 | 358 | 64 |
| Ex. 46 | Composite carbonaceous substance (O) | 180 | 0.1 | 5987 | 5.1 | 78 | 523 | 341 | 65 |
| Ex. 47 | Composite carbonaceous substance (P) | 50 | 0.7 | 5979 | 4.9 | 80 | 523 | 341 | 65 |
| Ex. 48 | Composite carbonaceous substance (Q) | 54 | 1.0 | 5961 | 5.1 | 77 | 536 | 354 | 66 |
| Ex. 49 | Composite carbonaceous substance (D) | 17 | 0.9 | 6049 | 5.0 | 74 | 543 | 345 | 63 |
| Ex. 50 | Composite carbonaceous substance (D) | 18 | 1.1 | 6049 | 4.6 | 77 | 570 | 352 | 62 |
| Ex. 51 | Composite carbonaceous substance (D) | 60 | 0.4 | 6042 | 5.4 | 76 | 584 | 350 | 60 |

In Negative Electrode [1] Table 4, the electrolyte is one produced in <<Electrolytic-Solution Production 3>> and containing 0.3% by mass hexamethylcyclotrisiloxane.

Negative Electrode [1] Table 5

TABLE 36

| No. | Negative-elctrode active material | Specific compound | Impedance Rct Ω | Impedance Cdl ×10⁻⁴ F | Initial capacity mAh | Direct current resistance mΩ | Capacity retention through cycling % | Initial output W | Ouput after cycling W | Ouput retention % |
|---|---|---|---|---|---|---|---|---|---|---|
| Comp. Ex. 1 | Carbonaceous substance (A) | lithium difluorophosphate | 9 | 1.4 | 6006 | 4.7 | 75 | 525 | 342 | 65 |
| Comp. Ex. 2 | Carbonaceous substance (A) | — | 9 | 1.4 | 6003 | 4.9 | 72 | 504 | 312 | 62 |
| Comp. Ex. 3 | Carbonaceous substance (B) | lithium difluorophosphate | 50 | 0.5 | 5102 | 5.1 | 75 | 483 | 318 | 66 |
| Comp. Ex. 4 | Carbonaceous substance (B) | — | 50 | 0.5 | 5034 | 5.2 | 73 | 455 | 288 | 63 |
| Comp. Ex. 5 | Binary crystalline carbonaceous mixture (C) | — | 22 | 1.1 | 5989 | 5.4 | 75 | 511 | 330 | 65 |
| Comp. Ex. 6 | Composite carbonaceous substance (D) | — | 9 | 1.4 | 5996 | 4.9 | 78 | 518 | 330 | 64 |
| Comp. Ex. 7 | Carbonaceous substance (K) | lithium difluorophosphate | 60 | 0.5 | 5042 | 4.9 | 75 | 511 | 282 | 55 |
| Comp. Ex. 8 | Carbonaceous substance (K) | — | 60 | 0.5 | 5111 | 5.0 | 73 | 497 | 276 | 56 |
| Comp. Ex. 9 | Carbonaceous substance (A) | trimethylsilyl methanesulfonate | 10 | 1.4 | 5886 | 4.6 | 74 | 515 | 331 | 64 |
| Comp. Ex. 10 | Carbonaceous substance (B) | trimethylsilyl methanesulfonate | 53 | 0.5 | 4898 | 4.9 | 74 | 473 | 312 | 66 |
| Comp. Ex. 11 | Carbonaceous substance (K) | trimethylsilyl methanesulfonate | 64 | 0.5 | 4992 | 4.8 | 74 | 501 | 266 | 53 |
| Comp. Ex. 12 | Carbonaceous substance (A) | hexamethylcyclo-trisiloxane | 11 | 1.5 | 6186 | 4.9 | 72 | 504 | 315 | 63 |
| Comp. Ex. 13 | Carbonaceous substance (B) | hexamethylcyclo-trisiloxane | 59 | 0.5 | 5204 | 5.3 | 72 | 464 | 298 | 64 |
| Comp. Ex. 14 | Carbonaceous substance (K) | hexamethylcyclo-trisiloxane | 74 | 0.6 | 5395 | 5.4 | 72 | 491 | 244 | 50 |

Negative Electrode [1] Table 6

TABLE 36

| No. | Electrolytic solution | Additive for electrolyte solution | Initial capacity mAh | Direct current resistance mΩ | Capacity retention through cycling % | Initial output W | Output after cycling W | Output retention % |
|---|---|---|---|---|---|---|---|---|
| Ex. 52 | Electrolytic-Solution Production 1 | lithium difluorophosphate | 5780 | 4.6 | 88 | 634 | 465 | 73 |
| Ex. 53 | Electrolytic-Solution Production 2 | trimethylsilyl methanesulfonate | 5830 | 5.5 | 88 | 632 | 457 | 72 |
| Ex. 54 | Electrolytic-Solution Production 3 | hexamethylcyclotrisiloxane | 5760 | 4.9 | 88 | 619 | 452 | 73 |
| Comp. Ex. 15 | Electrolytic-Solution Production 4 | none | 5810 | 4.7 | 82 | 543 | 364 | 67 |

The results given in Negative Electrode [1] Tables 2 to 6 show the following. The output retention through cycling was greatly improved by the combination of an electrolyte containing lithium difluorophosphate, trimethylsilyl methanesulfonate, or hexamethylcyclotrisiloxane and a negative-electrode active material comprising two or more carbonaceous substances differing in crystallinity.

Negative Electrode [2] [Production of Negative-Electrode Active Materials]

(Negative-Electrode Active-Material Production 1)

Coal tar pitch having a quinoline insoluble content of 0.05% by mass or lower was heat-treated at 460° C. for 10 hours in a reaction furnace. The massive carbonaceous substance obtained was ground with a mill (Orient Mill, manufactured by Seishin Enterprise Co., Ltd.) and further pulverized with a pulverizer (Turbo Mill, manufactured by Matsubo Corp.) to reduce the massive substance into fine particles having a median diameter of 18 µm. These particles were packed into a metallic container and heat-treated at 540° C. for 2 hours in a nitrogen gas stream in a box-shaped electric furnace. The mass obtained was crushed with a crusher (Roll Jaw Crusher, manufactured by Yoshida Seishakusho Co., Ltd.) and further pulverized with a pulverizer (Turbo Mill, manufactured by Matsubo Corp.). The powder obtained was put in a container and heat-treated at 1,000° C. for 1 hour in a nitrogen atmosphere in an electric furnace. Thereafter, the resultant sinter was classified to thereby obtain amorphous carbonaceous substance (A). In the classification, the sinter was repeatedly passed through an ASTM 400-mesh sieve five times in order to prevent inclusion of coarse particles.

(Negative-Electrode Active-Material Production 2)

Coal tar pitch having a quinoline insoluble content of 0.05% by mass or lower was heat-treated at 460° C. for 10 hours in a reaction furnace. The massive carbonaceous substance obtained was packed into a metallic container and heat-treated at 1,000° C. for 2 hours in a nitrogen gas stream in a box-shaped electric furnace. The amorphous mass obtained was crushed with a crusher (Roll Jaw Crusher, manufactured by Yoshida Seisakusho Co., Ltd.) and further pulverized with a pulverizer (Turbo Mill, manufactured by Matsubo Corp.) to obtain an amorphous powder. The powder obtained was repeatedly passed through an ASTM 400-mesh sieve five times in order to prevent inclusion of coarse particles. The negative-electrode active material thus obtained is referred to as amorphous carbonaceous substance (B).

(Negative-Electric Active-Material Production 3)

The amorphous mass obtained in (Negative-Electrode Active-Material Production 2) was transferred to a graphite crucible and heat-treated with a direct voltage application type electric furnace at 2,200° C. over 5 hours in an inert atmosphere. The mass obtained was crushed with a crusher (Roll Jaw Crusher, manufactured by Yoshida Seisakusho Co., Ltd.) and further pulverized with a pulverizer (Turbo Mill, manufactured by Matsubo Corp.). The powder obtained was repeatedly passed through an ASTM 400-mesh sieve five times in order to prevent inclusion of coarse particles. The negative-electrode active material thus obtained is referred to as amorphous carbonaceous substance (C).

(Negative-Electric Active-Material Production 4)

The amorphous mass obtained in (Negative-Electrode Active-Material Production 2) was transferred to a graphite crucible and heated with a direct voltage application type electric furnace at 3,000° C. over 5 hours in an inert atmosphere to graphitize it. The mass obtained was crushed with a crusher (Roll Jaw Crusher, manufactured by Yoshida Seisakusho Co., Ltd.) and further pulverized with a pulverizer (Turbo Mill, manufactured by Matsubo Corp.). The powder obtained was repeatedly passed through an ASTM 400-mesh sieve five times in order to prevent inclusion of coarse particles. The negative-electrode active material thus obtained is referred to as graphitic carbonaceous substance (D).

(Negative-Electrode Active-Material Production 5)

A commercial powder of natural flake graphite was repeatedly passed through an ASTM 400-mesh sieve five times in order to prevent inclusion of coarse particles. The negative-electrode active material thus obtained is referred to as graphitic carbonaceous substance (E).

The negative-electrode active materials obtained in Negative-Electrode Active-Material Productions 1 to 5 were examined for properties, shape, etc. by the methods described above. The results obtained are shown in Negative Electrode [2] Table 1.

Negative Electrode [2] Table 1

TABLE 37

| Production No. | Negative-electrode active material | d002 nm | Lc nm | Raman R value | Raman half-value width cm$^{-1}$ | True density g/cm$^3$ | BET specific surface area m$^2$/g | Tap density g/cm$^3$ | Ash content % | Volume-average particle diameter μm |
|---|---|---|---|---|---|---|---|---|---|---|
| 1 | Amorphous carbonaceous substance (A) | 0.344 | 2.4 | 0.98 | 83.0 | 1.93 | 1.5 | 1.1 | 0.05 | 12.4 |
| 2 | Amorphous carbonaceous substance (B) | 0.343 | 2.2 | 1.06 | 86.0 | 1.97 | 5.4 | 0.9 | 0.05 | 14.6 |
| 3 | Amorphous carbonaceous substance (C) | 0.340 | 32.9 | 0.21 | 27.8 | 2.21 | 7.1 | 0.3 | 0.03 | 14.7 |
| 4 | Graphitic carbonaceous substance (D) | 0.336 | 100< | 0.11 | 25.9 | 2.26 | 8.6 | 0.4 | 0.02 | 15.3 |
| 5 | Graphitic carbonaceous substance (E) | 0.335 | 100< | 0.16 | 25.8 | 2.26 | 10.4 | 0.7 | 0.04 | 11.6 |

Negative Electrode [2] [Production of Batteries]

<<Positive-Electrode Production 1>>

Ninety percents by mass lithium cobalt oxide (LiCoO$_2$) as a positive-electrode active material was mixed with 5% by mass acetylene black as a conductive material and 5% by mass poly(vinylidene fluoride) (PVdF) as a binder in N-methylpyrrolidone solvent to prepare a slurry. The slurry obtained was applied to each side of an aluminum foil having a thickness of 15 μm and dried. The coated foil was rolled with a pressing machine to a thickness of 80 μm. Pieces each having an active-material layer size with a width of 100 mm and a length of 100 mm and including an uncoated part having a width of 30 mm were cut out of the rolled foil. Thus, positive electrodes were obtained. The positive electrodes thus obtained had an active-material density of 2.35 g/cm$^3$.

<<Negative-Electrode Production 1>>

To 98 parts by weight of a negative-electrode active material were added 100 parts by weight of an aqueous dispersion of sodium carboxymethyl cellulose (concentration of sodium carboxymethyl cellulose, 1% by mass) as a thickener and 2 parts by weight of an aqueous dispersion of a styrene/butadiene rubber (concentration of styrene/butadiene rubber, 50% by mass) as a binder. The ingredients were mixed together by means of a disperser to obtain a slurry. The slurry obtained was applied to each side of a rolled copper foil having a thickness of 10 μm and dried. The coated foil was rolled with a pressing machine to a thickness of 75 μm. Pieces each having an active-material layer size with a width of 104 mm and a length of 104 mm and including an uncoated part having a width of 30 mm were cut out of the rolled foil. Thus, negative electrodes were obtained. The negative electrodes thus obtained had an active-material density of 1.35 g/cm$^3$.

<<Nonaqueous-Electrolytic-Solution Production 1>>

In a dry argon atmosphere, sufficiently dried lithium hexafluorophosphate (LiPF$_6$) was dissolved in a concentration of 1 mol/L in a mixture of ethylene carbonate (EC), dimethyl carbonate (DMC), and ethyl methyl carbonate (EMC) (volume ratio, 3:3:4). Furthermore, lithium difluorophosphate (LiPO$_2$F$_2$) was added thereto so as to result in a concentration of 0.3% by mass.

<<Nonaqueous-Electrolytic-Solution Production 2>>

In a dry argon atmosphere, sufficiently dried lithium hexafluorophosphate (LiPF$_6$) was dissolved in a concentration of 1 mol/L in a mixture of ethylene carbonate (EC), dimethyl carbonate (DMC), and ethyl methyl carbonate (EMC) (volume ratio, 3:3:4). Furthermore, trimethylsilyl methanesulfonate was added thereto so as to result in a concentration of 0.3% by mass.

<<Nonaqueous-Electrolytic-Solution Production 3>>

In a dry argon atmosphere, sufficiently dried lithium hexafluorophosphate (LiPF$_6$) was dissolved in a concentration of 1 mol/L in a mixture of ethylene carbonate (EC), dimethyl carbonate (DMC), and ethyl methyl carbonate (EMC) (volume ratio, 3:3:4). Furthermore, hexamethylcyclotrisiloxane was added thereto so as to result in a concentration of 0.3% by mass.

<<Nonaqueous-Electrolytic-Solution Production 4>>

In a dry argon atmosphere, sufficiently dried lithium hexafluorophosphate (LiPF$_6$) was dissolved in a concentration of 1 mol/L in a mixture of ethylene carbonate (EC), dimethyl carbonate (DMC), and ethyl methyl carbonate (EMC) (volume ratio, 3:3:4).

<<Battery Production 1>>

Thirty-two positive electrodes and 33 negative electrodes were alternately disposed and superposed together with porous polyethylene sheet separators (thickness, 25 μm) sandwiched between the electrodes. In this operation, each positive electrode was disposed so that the positive-electrode active-material surface was within the range of the opposed negative-electrode active-material surface. The uncoated parts of the positive electrodes were welded together and those of the negative electrodes were welded together. Thus, current collector tabs were produced to obtain an electrode group. This electrode group was packed into a battery can (outer dimensions: 120×110×10 mm). Thereafter, 20 mL of a nonaqueous electrolyte was introduced into the battery can packed with the electrode group and sufficiently infiltrated into the electrodes. This can was sealed to fabricate a prismatic battery. This battery had a rated discharge capacity of about 6 ampere-hours (Ah) and a direct-current resistance component as measured by the 10-kHz alternating-current method of about 5 milliohms (mΩ). The ratio of the total electrode area of the positive electrodes to the overall surface area of the battery case was 20.6.

Negative Electrode [2] Example 1

A battery was produced by the method described under <<Battery Production 1>> using the negative electrodes produced in <<Negative-Electrode Production 1>> in which amorphous carbonaceous substance (A) was used as the negative-electrode active material and further using the positive electrodes produced in <<Positive-Electrode Production 1>> and the nonaqueous electrolyte produced in <<Nonaqueous-Electrolytic-Solution Production 1>>. This battery was subjected to the battery evaluation described under <<Battery Evaluation>> given later. The results are shown in Negative Electrode [2] Table 2.

Negative Electrode [2] Example 2

A battery was produced in the same manner as in Negative Electrode [2] Example 1, except that amorphous carbonaceous substance (B) was used as the negative-electrode active material in <<Negative-Electrode Production 1>>. The battery evaluation described under <<Battery Evaluation>> was conducted. The results are shown in Negative Electrode [2] Table 2.

Negative Electrode [2] Example 3

A battery was produced in the same manner as in Negative Electrode [2] Example 1, except that amorphous carbonaceous substance (C) was used as the negative-electrode active material in <<Negative-Electrode Production 1>>. The battery evaluation described under <<Battery Evaluation>> was conducted. The results are shown in Negative Electrode [2] Table 2.

Negative Electrode [2] Examples 4 to 6

Batteries were produced and evaluated respectively in the same manners as in Negative Electrode [2] Examples 1 to 2, except that the nonaqueous electrolyte used in these Examples was replaced by the nonaqueous electrolyte produced in <<Nonaqueous-Electrolytic-Solution Production 2>>. The results are shown in Negative Electrode [2] Table 2.

Negative Electrode [2] Examples 7 to 9

Batteries were produced and evaluated respectively in the same manners as in Negative Electrode [2] Examples 1 to 3, except that the nonaqueous electrolyte used in these Examples was replaced by the nonaqueous electrolyte produced in <<Nonaqueous-Electrolytic-Solution Production 3>>. The results are shown in Negative Electrode [2] Table 2.

Negative Electrode [2] Comparative Examples 1 to 3

Batteries were produced and evaluated respectively in the same manners as in Negative Electrode [2] Examples 1 to 3, except that the nonaqueous electrolyte used in these Examples was replaced by the nonaqueous electrolyte produced in <<Nonaqueous-Electrolytic-Solution Production 4>>. The results are shown in Negative Electrode [2] Table 2.

Negative Electrode [2] Comparative Example 4

A battery was produced in the same manner as in Negative Electrode [2] Example 1, except that graphitic carbonaceous substance (D) was used as the negative-electrode active material in <<Negative-Electrode Production 1>>. The battery evaluation described under <<Battery Evaluation>> was conducted. The results are shown in Negative Electrode [2] Table 2.

Negative Electrode [2] Comparative Example 5

A battery was produced in the same manner as in Negative Electrode [2] Example 1, except that graphitic carbonaceous substance (E) was used as the negative-electrode active material in <<Negative-Electrode Production 1>>. The battery evaluation described under <<Battery Evaluation>> was conducted. The results are shown in Negative Electrode [2] Table 2.

Negative Electrode [2] Comparative Examples 6 and 7

Batteries were produced and evaluated respectively in the same manners as in Negative Electrode [2] Comparative Examples 4 and 5, except that the nonaqueous electrolyte used in these Comparative Examples was replaced by the nonaqueous electrolyte produced in <<Nonaqueous-Electrolytic-Solution Production 2>>. The results are shown in Negative Electrode [2] Table 2.

Negative Electrode [2] Comparative Examples 8 and 9

Batteries were produced and evaluated respectively in the same manners as in Negative Electrode [2] Comparative Examples 4 and 5, except that the nonaqueous electrolyte used in these Comparative Examples was replaced by the nonaqueous electrolyte produced in <<Nonaqueous-Electrolytic-Solution Production 3>>. The results are shown in Negative Electrode [2] Table 2.

Negative Electrode [2] Comparative Examples 10 and 11

Batteries were produced and evaluated respectively in the same manners as in Negative Electrode [2] Comparative Examples 4 and 5, except that the nonaqueous electrolyte used in these Comparative Examples was replaced by the nonaqueous electrolyte produced in <<Nonaqueous-Electrolytic-Solution Production 4>>. The results are shown in Negative Electrode [2] Table 2.

Negative Electrode [2]<<Battery Evaluation>>
(Capacity Measurement)

The fresh battery which had undergone no charge/discharge was subjected to 5 cycles of initial charge/discharge at 25° C. in a voltage range of 4.1-3.0 Vat 25° C. (voltage range, 4.1-3.0 V). The 0.2-C (the value of current at which the rated capacity based on 1-hour-rate discharge capacity is discharged over 1 hour is taken as 1 C; the same applies hereinafter) discharge capacity thereof as measured in the fifth cycle in this operation was taken as initial capacity.

(Test for Determining Short-Time High-Current-Density Charge/Discharge Characteristics)

The battery which had undergone the capacity measurement was charged at a constant current of 0.2 C for 150 minutes in a 25° C. room-temperature atmosphere. A high-load current of 10 C was caused to flow in the charge direction and the discharge direction each for about 10 seconds, with the voltage in that 0.2-C charge as the center. This charge/discharge operation as one cycle which took 35 seconds including a pause period was continuously repeated. At the time when the battery had undergone 100,000 cycles, it was taken out. This battery was discharged to 3 V at a current of 0.2 C and subjected to 1 cycle in the same manner as in (Capacity Measurement). The capacity as measured in this cycle was taken as capacity after cycling. The short-time high-current-density charge/discharge characteristics were calculated using the following formula.

[Short-time high-current-density charge/discharge characteristics]=100×[capacity after cycling]/[initial capacity]

Negative Electrode [2] Table 2

TABLE 38

| No. | Negative-electrode active material | Specific compound | Initial capacity mAh | Short-time high-current-density charge/discharge characteristics % |
|---|---|---|---|---|
| Ex. 1 | Amorphous carbonaceous substance (A) | lithium difluorophosphate | 6020 | 93 |
| Ex. 2 | Amorphous carbonaceous substance (B) | lithium difluorophosphate | 6035 | 94 |
| Ex. 3 | Amorphous carbonaceous substance (C) | lithium difluorophosphate | 6001 | 90 |
| Ex. 4 | Amorphous carbonaceous substance (A) | trimethylsilyl methanesulfonate | 6021 | 91 |
| Ex. 5 | Amorphous carbonaceous substance (B) | trimethylsilyl methanesulfonate | 6023 | 92 |
| Ex. 6 | Amorphous carbonaceous substance (C) | trimethylsilyl methanesulfonate | 6015 | 88 |
| Ex. 7 | Amorphous carbonaceous substance (A) | hexamethylcyclo-trisiloxane | 6004 | 91 |
| Ex. 8 | Amorphous carbonaceous substance (B) | hexamethylcyclo-trisiloxane | 5997 | 90 |
| Ex. 9 | Amorphous carbonaceous substance (C) | hexamethylcyclo-trisiloxane | 5987 | 92 |
| Comp. Ex. 1 | Amorphous carbonaceous substance (A) | — | 6012 | 88 |
| Comp. Ex. 2 | Amorphous carbonaceous substance (B) | — | 6029 | 89 |
| Comp. Ex. 3 | Amorphous carbonaceous substance (C) | — | 6009 | 85 |
| Comp. Ex. 4 | Graphitic carbonaceous substance (D) | lithium difluorophosphate | 5998 | 87 |
| Comp. Ex. 5 | Graphitic carbonaceous substance (E) | lithium difluorophosphate | 6012 | 78 |
| Comp. Ex. 6 | Graphitic carbonaceous substance (D) | trimethylsilyl methanesulfonate | 6001 | 86 |
| Comp. Ex. 7 | Graphitic carbonaceous substance (E) | trimethylsilyl methanesulfonate | 6003 | 79 |
| Comp. Ex. 8 | Graphitic carbonaceous substance (D) | hexamethylcyclo-trisiloxane | 6032 | 87 |
| Comp. Ex. 9 | Graphitic carbonaceous substance (E) | hexamethylcyclo-trisiloxane | 6002 | 78 |
| Comp. Ex. 10 | Graphitic carbonaceous substance (D) | — | 6004 | 85 |
| Comp. Ex. 11 | Graphitic carbonaceous substance (E) | — | 5990 | 77 |

The results given in Negative Electrode [2] Table 2 show the following. The short-time high-current-density charge/discharge characteristics were greatly improved by the use of an electrolyte containing lithium difluorophosphate, trimethylsilyl methanesulfonate, or hexamethylcyclotrisiloxane and of an amorphous carbonaceous substance contained as a negative-electrode active material and having an interplanar spacing (d002) for the (002) planes and an Lc, both determined by wide-angle X-ray diffractometry, of 0.337 nm or larger and 80 nm or smaller, respectively, and a Raman R value of 0.2 or higher.

Negative Electrode [3] [Production of Negative-Electrode Active Materials]

(Negative-Electrode Active-Material Production 1)

Commercial $Li_{1.33}Ti_{1.66}O_4$ having a volume-average particle diameter of 23 μm was repeatedly passed through an ASTM 400-mesh sieve five times in order to prevent inclusion of coarse particles. Thus, lithium-titanium composite oxide (A) was obtained.

(Negative-Electrode Active-Material Production 2)

Commercial $Li_{1.33}Ti_{1.66}O_4$ having a volume-average particle diameter of 1.0 μm was repeatedly passed through an ASTM 400-mesh sieve five times in order to prevent inclusion of coarse particles. Thus, lithium-titanium composite oxide (B) was obtained.

(Negative-Electrode Active-Material Production 3)

Commercial $Li_{1.33}Ti_{1.66}O_4$ having a volume-average particle diameter of 0.1 μm was repeatedly passed through an ASTM 400-mesh sieve five times in order to prevent inclusion of coarse particles. Thus, lithium-titanium composite oxide (C) was obtained.

(Negative-Electrode Active-Material Production 4)

A commercial powder of natural flake graphite was repeatedly passed through an ASTM 400-mesh sieve five times in order to prevent inclusion of coarse particles. The negative-electrode active material thus obtained is referred to as graphitic carbonaceous substance (D).

The composition, structure, shape, properties, etc. of each of the negative-electrode active materials are summarized in Negative Electrode [3] Table 1.

Negative Electrode [3] Table 1

TABLE 39

| Production No. | Negative-electrode active material | Composition | Structure | Volume-average particle diameter μm | BET specific surface area m$^2$/g | Tap density g/cm$^3$ | Roundness | Aspect ratio |
|---|---|---|---|---|---|---|---|---|
| 1 | Lithium-titanium composite oxide (A) | Li$_{1.33}$Ti$_{1.66}$O$_4$ | spinel structure | 23 | 3.2 | 1.5 | 0.99 | 1.0 |
| 2 | Lithium-titanium composite oxide (B) | Li$_{1.33}$Ti$_{1.66}$O$_4$ | spinel structure | 1.0 | 10.5 | 1.2 | 0.99 | 1.0 |
| 3 | Lithium-titanium composite oxide (C) | Li$_{1.33}$Ti$_{1.66}$O$_4$ | spinel structure | 0.1 | 38.9 | 0.5 | 0.97 | 1.0 |
| 4 | Graphitic carbonaceous substance (D) | C | flake graphite | 11.6 | 10.4 | 0.7 | 0.90 | 1.8 |

Negative Electrode [3] [Production of Batteries]

<<Positive-Electrode Production 1>>

Ninety percents by mass lithium cobalt oxide (LiCoO$_2$) as a positive-electrode active material was mixed with 5% by mass acetylene black as a conductive material and 5% by mass poly(vinylidene fluoride) (PVdF) as a binder in N-methylpyrrolidone solvent to prepare a slurry. The slurry obtained was applied to one side of an aluminum foil having a thickness of 15 μm and dried. The coated foil was rolled with a pressing machine to a thickness of 80 μm. Pieces each having an active-material layer size with a width of 100 mm and a length of 100 mm and including an uncoated part having a width of 30 mm were cut out of the rolled foil. Thus, positive electrodes were obtained. The positive electrodes thus obtained had an active-material density of 2.35 g/cm$^3$.

<<Negative-Electrode Production 1>>

Ninety parts by weight of a negative-electrode active material was mixed with 5% by mass acetylene black as a conductive material and 5% by mass poly(vinylidene fluoride) (PVdF) as a binder in N-methylpyrrolidone solvent to prepare a slurry. The slurry obtained was applied to one side of a rolled copper foil having a thickness of 10 μm and dried. The coated foil was rolled with a pressing machine to a thickness of 90 μm. Pieces each having an active-material layer size with a width of 104 mm and a length of 104 mm and including an uncoated part having a width of 30 mm were cut out of the rolled foil. Thus, negative electrodes were obtained.

<<Nonaqueous-Electrolytic-Solution Production 1>>

In a dry argon atmosphere, sufficiently dried lithium hexafluorophosphate (LiPF$_6$) was dissolved in a concentration of 1 mol/L in a mixture of ethylene carbonate (EC), dimethyl carbonate (DMC), and ethyl methyl carbonate (EMC) (volume ratio, 3:3:4). Furthermore, lithium difluorophosphate (LiPO$_2$F$_2$) was added thereto so as to result in a concentration of 0.3% by mass.

<<Nonaqueous-Electrolytic-Solution Production 2>>

In a dry argon atmosphere, sufficiently dried lithium hexafluorophosphate (LiPF$_6$) was dissolved in a concentration of 1 mol/L in a mixture of ethylene carbonate (EC), dimethyl carbonate (DMC), and ethyl methyl carbonate (EMC) (volume ratio, 3:3:4). Furthermore, trimethylsilyl methanesulfonate was added thereto so as to result in a concentration of 0.3% by mass.

<<Nonaqueous-Electrolytic-Solution Production 3>>

In a dry argon atmosphere, sufficiently dried lithium hexafluorophosphate (LiPF$_6$) was dissolved in a concentration of 1 mol/L in a mixture of ethylene carbonate (EC), dimethyl carbonate (DMC), and ethyl methyl carbonate (EMC) (volume ratio, 3:3:4). Furthermore, hexamethylcyclotrisiloxane was added thereto so as to result in a concentration of 0.3% by mass.

<<Nonaqueous-Electrolytic-Solution Production 4>>

In a dry argon atmosphere, sufficiently dried lithium hexafluorophosphate (LiPF$_6$) was dissolved in a concentration of 1 mol/L in a mixture of ethylene carbonate (EC), dimethyl carbonate (DMC), and ethyl methyl carbonate (EMC) (volume ratio, 3:3:4).

(Battery Production 1)

A negative electrode and a positive electrode each having a size of 12.5 mmφ were punched out and vacuum-dried at 110° C. Thereafter, the electrodes were transferred to a gloved box. In an argon atmosphere, the positive electrode and the negative electrode were disposed face to face through a polyethylene separator which had been punched out in a size of 14 mmφ. A nonaqueous electrolyte described under Nonaqueous-Electrolytic-Solution Production was added thereto to produce a 2032 type coin battery (lithium secondary battery).

Negative Electrode [3] Example 1

A battery was produced by the method described under <<Battery Production 1>> using the negative electrode produced in <<Negative-Electrode Production 1>> in which lithium-titanium composite oxide (A) was used as the negative-electrode active material and further using the positive electrode produced in <<Positive-Electrode Production 1>> and the nonaqueous electrolyte produced in <<Nonaqueous-Electrolytic-Solution Production 1>>. This battery was subjected to the battery evaluation described under <<Battery Evaluation>> given later. The results are shown in Negative Electrode [3] Table 2.

Negative Electrode [3] Example 2

A battery was produced in the same manner as in Negative Electrode [3] Example 1, except that lithium-titanium composite oxide (B) was used as the negative-electrode active material in <<Negative-Electrode Production 1>>. The battery evaluation described under <<Battery Evaluation>> was conducted. The results are shown in Negative Electrode [3] Table 2.

Negative Electrode [3] Example 3

A battery was produced in the same manner as in Negative Electrode [3] Example 1, except that lithium-titanium composite oxide (C) was used as the negative-electrode active material in <<Negative-Electrode Production 1>>. The battery evaluation described under <<Battery Evaluation>> was conducted. The results are shown in Negative Electrode [3] Table 2.

Negative Electrode [3] Examples 4 to 6

Batteries were produced and evaluated respectively in the same manners as in Negative Electrode [3] Examples 1 to 3, except that the nonaqueous electrolyte used in these Examples was replaced by the nonaqueous electrolyte produced in <<Nonaqueous-Electrolytic-Solution Production 2>>. The results are shown in Negative Electrode [3] Table 2.

Negative Electrode [3] Examples 7 to 9

Batteries were produced and evaluated respectively in the same manners as in Negative Electrode [3] Examples 1 to 3, except that the nonaqueous electrolyte used in these Examples was replaced by the nonaqueous electrolyte produced in <<Nonaqueous-Electrolytic-Solution Production 3>>. The results are shown in Negative Electrode [3] Table 2.

Negative Electrode [3] Comparative Examples 1 to 3

Batteries were produced and evaluated respectively in the same manners as in Negative Electrode [3] Examples 1 to 3, except that the nonaqueous electrolyte used in these Examples was replaced by the nonaqueous electrolyte produced in <<Nonaqueous-Electrolytic-Solution Production 4>>. The results are shown in Negative Electrode [3] Table 2.

Negative Electrode [3] Comparative Example 4

A battery was produced in the same manner as in Negative Electrode [3] Example 1, except that graphitic carbonaceous substance (D) was used as the negative-electrode active material in <<Negative-Electrode Production 1>>. The battery evaluation described under <<Battery Evaluation>> was conducted. The results are shown in Negative Electrode [3] Table 2.

Negative Electrode [3] Comparative Example 5

A battery was produced and evaluated in the same manner as in Negative Electrode [3] Comparative Example 4, except that the nonaqueous electrolyte used in the Comparative Example was replaced by the nonaqueous electrolyte produced in <<Nonaqueous-Electrolytic-Solution Production 2>>. The results are shown in Negative Electrode [3] Table 2.

Negative Electrode [3] Comparative Example 6

A battery was produced and evaluated in the same manner as in Negative Electrode [3] Comparative Example 4, except that the nonaqueous electrolyte used in the Comparative Example was replaced by the nonaqueous electrolyte produced in <<Nonaqueous-Electrolytic-Solution Production 3>>. The results are shown in Negative Electrode [3] Table 2.

Negative Electrode [3] Comparative Example 7

A battery was produced and evaluated in the same manner as in Negative Electrode [3] Comparative Examples 4, except that the nonaqueous electrolyte used in the Comparative Example was replaced by the nonaqueous electrolyte produced in <<Nonaqueous-Electrolytic-Solution Production 4>>. The results are shown in Negative Electrode [3] Table 2.

Negative Electrode [3]<<Battery Evaluation>>

(Capacity Measurement)

With respect to each fresh battery which had undergone no charge/discharge, the battery capacity was calculated from the amount of the active material present on the copper foil; the capacity of each lithium-titanium composite oxide and that of the graphitic carbonaceous substance were taken as 175 mAh/g and 350 mAh/g, respectively. Each battery employing a lithium-titanium composite oxide was subjected to 5 cycles of initial charge/discharge at 25° C. in a voltage range of 2.7-1.9 V at 0.2 C based on that battery capacity (the value of current at which the rated capacity based on 1-hour-rate discharge capacity is discharged over 1 hour is taken as 1 C; the same applies hereinafter). Each battery employing the graphitic carbonaceous substance was subjected in the same manner to initial charge/discharge at 25° C. in a voltage range of 4.1-3.0 V. The 0.2-C discharge capacity as measured in the fifth cycle in this operation was taken as initial capacity.

(Measurement of Output Resistance)

In a 25° C. environment, each battery was charged for 150 minutes at a constant current of 0.2 C. In a −30° C. environment, the battery was discharged for 10 seconds at each of 0.1 C, 0.3 C, 1.0 C, 3.0 C, and 10.0 C. The voltage was measured at 10 seconds after the discharge initiation. The inclination of the resultant current-voltage straight line was taken as output resistance (Ω). The results obtained are shown in Negative Electrode [3] Table 2.

Negative Electrode [3] Table 2

TABLE 40

| No. | Negative-electrode active material | Specific compound | Output resistance Ω | Output resistance reduction % |
|---|---|---|---|---|
| Ex. 1 | Lithium-titanium composite oxide (A) | lithium difluorophosphate | 75 | 34 |
| Ex. 2 | Lithium-titanium composite oxide (B) | lithium difluorophosphate | 69 | 31 |
| Ex. 3 | Lithium-titanium composite oxide (C) | lithium difluorophosphate | 65 | 28 |
| Ex. 4 | Lithium-titanium composite oxide (A) | trimethylsilyl methanesulfonate | 68 | 40 |
| Ex. 5 | Lithium-titanium composite oxide (B) | trimethylsilyl methanesulfonate | 71 | 29 |
| Ex. 6 | Lithium-titanium composite oxide (C) | trimethylsilyl methanesulfonate | 64 | 29 |
| Ex. 7 | Lithium-titanium composite oxide (A) | hexamethylcyclo-trisiloxane | 71 | 38 |
| Ex. 8 | Lithium-titanium composite oxide (B) | hexamethylcyclo-trisiloxane | 66 | 34 |
| Ex. 9 | Lithium-titanium composite oxide (C) | hexamethylcyclo-trisiloxane | 63 | 30 |
| Comp. Ex. 1 | Lithium-titanium composite oxide (A) | — | 114 | — |
| Comp. Ex. 2 | Lithium-titanium composite oxide (B) | — | 100 | — |
| Comp. Ex. 3 | Lithium-titanium composite oxide (C) | — | 90 | — |
| Comp. Ex. 4 | Graphitic carbonaceous substance (D) | lithium difluorophosphate | 130 | 17 |
| Comp. Ex. 5 | Graphitic carbonaceous substance (D) | trimethylsilyl methanesulfonate | 137 | 13 |

TABLE 40-continued

| No. | Negative-electrode active material | Specific compound | Output resistance Ω | Output resistance reduction % |
|---|---|---|---|---|
| Comp. Ex. 6 | Graphitic carbonaceous substance (D) | hexamethylcyclo-trisiloxane | 135 | 14 |
| Comp. Ex. 7 | Graphitic carbonaceous substance (D) | — | 157 | — |

In Negative Electrode [3] Table 2, "Output resistance reduction" means the reduction in output resistance (%) which is determined from a comparison with the corresponding battery containing no specific compound.

The results given in Negative Electrode [3] Table 2 show the following. The output resistance is remarkably reduced by using an electrolyte containing lithium difluorophosphate, trimethylsilyl methanesulfonate, or hexamethylcyclotrisiloxane and using a negative-electrode active material comprising a titanium-containing metal oxide capable of occluding and releasing lithium.

Negative Electrode [4] [Production of Negative-Electrode Active Materials]

(Negative-Electrode Active-Material Production 1)

Highly purified natural flake graphite (ash content, 0.05% by weight) having a median diameter of about 150 μm was subjected to a rounding treatment with a rounding apparatus (Hybridization System, manufactured by Nara Machinery Co., Ltd.) at a rotation speed of 6,500 rpm for 5 minutes. Furthermore, this graphite was treated with an air classifier (OMC-100, manufactured by Seishin Enterprise Co., Ltd.) to remove 45% by weight fine particles therefrom. Thus, rounded natural graphite (C) was obtained.

(Negative-Electrode Active-Material Production 2)

A powder of the rounded natural graphite (C) obtained through classification was packed into a graphite crucible. This powder was heat-treated with a direct voltage application type electric furnace at 3,000° C. for 5 hours in an inert atmosphere to obtain carbonaceous substance (D).

(Negative-Electrode Active-Material Production 3)

The same procedure as in (Negative-Electrode Active-Material Production 2) was conducted, except that the heat treatment temperature was changed to 2,000° C. Thus, carbonaceous substance (E) was obtained.

(Negative-Electrode Active-Material Production 4)

The same procedure as in (Negative-Electrode Active-Material Production 2) was conducted, except that the heat treatment temperature was changed to 1,600° C. Thus, carbonaceous substance (F) was obtained.

(Negative-Electrode Active-Material Production 5)

The same procedure as in (Negative-Electrode Active-Material Production 2) was conducted, except that the heat treatment temperature was changed to 1,200° C. Thus, carbonaceous substance (G) was obtained.

(Negative-Electrode Active-Material Production 5)

Highly purified natural flake graphite (ash content, 0.1% by weight) having a median diameter of 17 μm, tap density of 0.5 g/cm$^3$, and BET specific surface area of 6 m$^2$/g was heat-treated in the same manner as in (Negative-Electrode Active-Material Production 2) without being subjected to a rounding treatment. Thus, heat-treated natural graphite (H) was obtained.

(Negative-Electrode Active-Material Production 6)

A highly purified natural graphite (ash content, 0.5% by weight) having a median diameter of 20 μm, tap density of 0.75 g/cm$^3$, and BET specific surface area of 3 m$^2$/g was heat-treated in the same manner as in (Negative-Electrode Active-Material Production 2) without being subjected to a rounding treatment. Thus, carbonaceous substance (I) was obtained.

The rounded natural graphite (C), carbonaceous substance (D), carbonaceous substance (E), carbonaceous substance (F), carbonaceous substance (G), heat-treated natural graphite (H), and carbonaceous substance (I) produced were examined for shape and properties by the methods described above. The results obtained are shown in Negative Electrode [4] Table 1.

Negative Electrode [4] Table 1

TABLE 41

| Negative-electrode active-material production No. | Negative-electrode active material | Tap density g/cm$^3$ | BET specific surface area m$^2$/g | Raman R value | Raman half-value width cm$^{-1}$ | O/C value | $d_{50}$ μm | $d_{90}/d_{10}$ | d002 nm | Lc004 nm | Roundness |
|---|---|---|---|---|---|---|---|---|---|---|---|
| 1 | Rounded natural graphite (C) | 1.0 | 7.5 | 0.27 | 23.5 | 0.032 | 17 | 2.5 | 0.3354 | 100< | 0.94 |
| 2 | Carbonaceous substance (D) | 1.0 | 5.4 | 0.03 | 20.5 | <0.001 | 17 | 2.5 | 0.3354 | 100< | 0.94 |
| 3 | Carbonaceous substance (E) | 1.0 | 5.7 | 0.04 | 21.0 | <0.001 | 17 | 2.5 | 0.3354 | 100< | 0.94 |
| 4 | Carbonaceous substance (F) | 1.0 | 6.0 | 0.08 | 21.4 | <0.001 | 17 | 2.5 | 0.3354 | 100< | 0.94 |
| 5 | Carbonaceous substance (G) | 1.0 | 6.5 | 0.14 | 22.5 | <0.001 | 17 | 2.5 | 0.3354 | 100< | 0.94 |
| 6 | Heat-treated natural graphite (H) | 0.3 | 4.7 | 0.04 | 25.0 | <0.001 | 17 | 4.5 | 0.3354 | 100< | 0.82 |
| 7 | Carbonaceous substance (I) | 0.7 | 4.0 | 0.03 | 22.9 | <0.001 | 20 | 7.7 | 0.3354 | 100< | 0.86 |

Negative Electrode [4] [Production of Batteries]

<<Positive-Electrode Production 1>>

Ninety percents by mass lithium cobalt oxide (LiCoO$_2$) as a positive-electrode active material was mixed with 5% by mass acetylene black as a conductive material and 5% by mass poly(vinylidene fluoride) (PVdF) as a binder in N-methylpyrrolidone solvent to prepare a slurry. The slurry obtained was applied to each side of an aluminum foil having a thickness of 15 μm and dried. The coated foil was rolled with a pressing machine to a thickness of 80 μm. Pieces each having an active-material layer size with a width of 100 mm and a length of 100 mm and including an uncoated part having a width of 30 mm were cut out of the rolled foil. Thus, positive electrodes were obtained. The positive electrodes thus obtained had an active-material density of 2.35 g/cm$^3$.

<<Negative-Electrode Production 1>>

To 98 parts by weight of a negative-electrode active material were added 100 parts by weight of an aqueous dispersion of sodium carboxymethyl cellulose (concentration of sodium carboxymethyl cellulose, 1% by mass) as a thickener and 2 parts by weight of an aqueous dispersion of a styrene/butadiene rubber (concentration of styrene/butadiene rubber, 50% by mass) as a binder. The ingredients were mixed together by means of a disperser to obtain a slurry. The slurry obtained was applied to each side of a rolled copper foil having a thickness of 10 μm and dried. The coated foil was rolled with a pressing machine to a thickness of 75 μm. Pieces each having an active-material layer size with a width of 104 mm and a length of 104 mm and including an uncoated part having a width of 30 mm were cut out of the rolled foil. Thus, negative electrodes were obtained. The negative electrodes thus obtained had an active-material density of 1.35 g/cm$^3$.

<<Nonaqueous-Electrolytic-Solution Production 1>>

In a dry argon atmosphere, sufficiently dried lithium hexafluorophosphate (LiPF$_6$) was dissolved in a concentration of 1 mol/L in a mixture of ethylene carbonate (EC), dimethyl carbonate (DMC), and ethyl methyl carbonate (EMC) (volume ratio, 3:3:4). Furthermore, lithium difluorophosphate (LiPO$_2$F$_2$) was added thereto so as to result in a concentration of 0.3% by mass.

<<Nonaqueous-Electrolytic-Solution Production 2>>

In a dry argon atmosphere, sufficiently dried lithium hexafluorophosphate (LiPF$_6$) was dissolved in a concentration of 1 mol/L in a mixture of ethylene carbonate (EC), dimethyl carbonate (DMC), and ethyl methyl carbonate (EMC) (volume ratio, 3:3:4). Furthermore, trimethylsilyl methanesulfonate was added thereto so as to result in a concentration of 0.3% by mass.

<<Nonaqueous-Electrolytic-Solution Production 3>>

In a dry argon atmosphere, sufficiently dried lithium hexafluorophosphate (LiPF$_6$) was dissolved in a concentration of 1 mol/L in a mixture of ethylene carbonate (EC), dimethyl carbonate (DMC), and ethyl methyl carbonate (EMC) (volume ratio, 3:3:4). Furthermore, hexamethylcyclotrisiloxane was added thereto so as to result in a concentration of 0.3% by mass.

<<Nonaqueous-Electrolytic-Solution Production 4>>

In a dry argon atmosphere, sufficiently dried lithium hexafluorophosphate (LiPF$_6$) was dissolved in a concentration of 1 mol/L in a mixture of ethylene carbonate (EC), dimethyl carbonate (DMC), and ethyl methyl carbonate (EMC) (volume ratio, 3:3:4).

<<Battery Production 1>>

Thirty-two positive electrodes and 33 negative electrodes were alternately disposed and superposed together with porous polyethylene sheet separators (thickness, 25 μm) sandwiched between the electrodes. In this operation, each positive electrode was disposed so that the positive-electrode active-material surface was within the range of the opposed negative-electrode active-material surface. The uncoated parts of the positive electrodes were welded together and those of the negative electrodes were welded together. Thus, current collector tabs were produced to obtain an electrode group. This electrode group was packed into a battery can (outer dimensions: 120×110×10 mm). Thereafter, 20 mL of a nonaqueous electrolyte was introduced into the battery can packed with the electrode group and sufficiently infiltrated into the electrodes. This can was sealed to fabricate a prismatic battery. This battery has a rated discharge capacity of about 6 ampere-hours (Ah) and a direct-current resistance component as measured by the 10-kHz alternating-current method of about 5 milliohms (mΩ). The ratio of the total electrode area of the positive electrodes to the overall surface area of the battery case was 20.6.

Negative Electrode [4] Example 1

A battery was produced by the method described under <<Battery Production 1>> using the negative electrodes produced in <<Negative-Electrode Production 1>> in which carbonaceous substance (D) was used as the negative-electrode active material and further using the positive electrodes produced in <<Positive-Electrode Production 1>> and the nonaqueous electrolyte produced in <<Nonaqueous-Electrolytic-Solution Production 1>>. This battery was examined by the methods which will be described under <<Battery Evaluation>> given later and by the measurement methods described above. The results are shown in Negative Electrode [4] Table 2.

Negative Electrode [4] Example 2

A battery was produced in the same manner as in Negative Electrode [4] Example 1, except that carbonaceous substance (E) was used as the negative-electrode active material in <<Negative-Electrode Production 1>>. The battery evaluation described under <<Battery Evaluation>> was conducted. The results are shown in Negative Electrode [4] Table 2.

Negative Electrode [4] Example 3

A battery was produced in the same manner as in Negative Electrode [4] Example 1, except that carbonaceous substance (F) was used as the negative-electrode active material in <<Negative-Electrode Production 1>>. The battery evaluation described under <<Battery Evaluation>> was conducted. The results are shown in Negative Electrode [4] Table 2.

Negative Electrode [4] Example 4

A battery was produced in the same manner as in Negative Electrode [4] Example 1, except that carbonaceous substance (G) was used as the negative-electrode active material in <<Negative-Electrode Production 1>>. The battery evaluation described under <<Battery Evaluation>> was conducted. The results are shown in Negative Electrode [4] Table 2.

Negative Electrode [4] Example 5

A battery was produced in the same manner as in Negative Electrode [4] Example 1, except that carbonaceous substance (I) was used as the negative-electrode active material in <<Negative-Electrode Production 1>>. The battery evaluation described under <<Battery Evaluation>> was conducted. The results are shown in Negative Electrode [4] Table 2.

Negative Electrode [4] Examples 6 to 10

Batteries were produced and evaluated respectively in the same manners as in Negative Electrode [4] Examples 1 to 5, except that the nonaqueous electrolyte used in these Examples was replaced by the nonaqueous electrolyte produced in <<Nonaqueous-Electrolytic-Solution Production 2>>. The results are shown in Table 2 (Negative Electrode [4] Table 2).

Negative Electrode [4] Examples 11 to 15

Batteries were produced and evaluated respectively in the same manners as in Negative Electrode [4] Examples 1 to 5, except that the nonaqueous electrolyte used in these Examples was replaced by the nonaqueous electrolyte produced in <<Nonaqueous-Electrolytic-Solution Production 3>>. The results are shown in Negative Electrode [4] Table 2.

Negative Electrode [4] Comparative Example 1

A battery was produced in the same manner as in Negative Electrode [4] Example 1, except that rounded natural graphite (C) was used as the negative-electrode active material in <<Negative-Electrode Production 1>>. The battery evaluation described under <<Battery Evaluation>> was conducted. The results are shown in Negative Electrode [4] Table 2.

Negative Electrode [4] Comparative Example 2

A battery was produced in the same manner as in Negative Electrode [4] Comparative Example 1, except that the nonaqueous electrolyte used in the Comparative Example was replaced by the nonaqueous electrolyte produced in <<Nonaqueous-Electrolytic-Solution Production 4>>. The battery evaluation described under <<Battery Evaluation>> was conducted. The results are shown in Negative Electrode [4] Table 2.

Negative Electrode [4] Comparative Example 3

A battery was produced in the same manner as in Negative Electrode [4] Example 1, except that heat-treated natural graphite (H) was used as the negative-electrode active material in <<Negative-Electrode Production 1>>. The battery evaluation described under <<Battery Evaluation>> was conducted. The results are shown in Negative Electrode [4] Table 2.

Negative Electrode [4] Comparative Example 4

A battery was produced in the same manner as in Negative Electrode [4] Comparative Example 3, except that the nonaqueous electrolyte used in the Comparative Example was replaced by the nonaqueous electrolyte produced in <<Nonaqueous-Electrolytic-Solution Production 4>>. The battery evaluation described under <<Battery Evaluation>> was conducted. The results are shown in Negative Electrode [4] Table 2.

Negative Electrode [4] Comparative Example 5

A battery was produced in the same manner as in Negative Electrode [4] Example 5, except that the nonaqueous electrolyte used in the Example was replaced by the nonaqueous electrolyte produced in <<Nonaqueous-Electrolytic-Solution Production 4>>. The battery evaluation described under <<Battery Evaluation>> was conducted. The results are shown in Negative Electrode [4] Table 2.

Negative Electrode [4] Comparative Example 6

A battery was produced in the same manner as in Negative Electrode [4] Example 1, except that the nonaqueous electrolyte used in the Example was replaced by the nonaqueous electrolyte produced in <<Nonaqueous-Electrolytic-Solution Production 4>>.

The battery evaluation described under <<Battery Evaluation>> was conducted. The results are shown in Negative Electrode [4] Table 2.

Negative Electrode [4] Comparative Examples 7 and 8

Batteries were produced and evaluated respectively in the same manners as in Negative Electrode [4] Comparative Examples 1 and 3, except that the nonaqueous electrolyte used in these Comparative Examples was replaced by the nonaqueous electrolyte produced in <<Nonaqueous-Electrolytic-Solution Production 2>>. The results are shown in Negative Electrode [4] Table 2.

Negative Electrode [4] Comparative Examples 9 and 10

Batteries were produced and evaluated respectively in the same manners as in Negative Electrode [4] Comparative Examples 1 and 3, except that the nonaqueous electrolyte used in these Comparative Examples was replaced by the nonaqueous electrolyte produced in <<Nonaqueous-Electrolytic-Solution Production 3>>. The results are shown in Negative Electrode [4] Table 2.

Negative Electrode [4] Table 2

TABLE 42

| No. | Negative-electrode active material | Specific compound | Initial capacity mAh | Capacity after storage in low state of charge mAh | Recovery after storage in low state of charge % |
|---|---|---|---|---|---|
| Example 1 | Carbonaceous substance (D) | lithium difluorophosphate | 6034 | 5504 | 91.2 |
| Example 2 | Carbonaceous substance (E) | lithium difluorophosphate | 6015 | 5509 | 91.6 |
| Example 3 | Carbonaceous substance (F) | lithium difluorophosphate | 6025 | 5302 | 88.0 |
| Example 4 | Carbonaceous substance (G) | lithium difluorophosphate | 6009 | 5109 | 85.0 |
| Example 5 | Carbonaceous substance (I) | lithium difluorophosphate | 6032 | 5023 | 83.3 |
| Example 6 | Carbonaceous substance (D) | trimethylsilyl methanesulfonate | 6028 | 5405 | 89.7 |
| Example 7 | Carbonaceous substance (E) | trimethylsilyl methanesulfonate | 6019 | 5398 | 89.7 |
| Example 8 | Carbonaceous substance (F) | trimethylsilyl methanesulfonate | 6015 | 5411 | 90.0 |

TABLE 42-continued

| No. | Negative-electrode active material | Specific compound | Initial capacity mAh | Capacity after storage in low state of charge mAh | Recovery after storage in low state of charge % |
|---|---|---|---|---|---|
| Example 9 | Carbonaceous substance (G) | trimethylsilyl methanesulfonate | 6022 | 5202 | 86.4 |
| Example 10 | Carbonaceous substance (I) | trimethylsilyl methanesulfonate | 5999 | 5111 | 85.2 |
| Example 11 | Carbonaceous substance (D) | hexamethylcyclotrisiloxane | 6002 | 5468 | 91.1 |
| Example 12 | Carbonaceous substance (E) | hexamethylcyclotrisiloxane | 6003 | 5389 | 89.8 |
| Example 13 | Carbonaceous substance (F) | hexamethylcyclotrisiloxane | 6034 | 5201 | 86.2 |
| Example 14 | Carbonaceous substance (G) | hexamethylcyclotrisiloxane | 6012 | 5109 | 85.0 |
| Example 15 | Carbonaceous substance (I) | hexamethylcyclotrisiloxane | 6034 | 4987 | 82.6 |
| Comparative Example 1 | Rounded natural graphite (C) | lithium difluorophosphate | 6021 | 4877 | 81.0 |
| Comparative Example 2 | Rounded natural graphite (C) | — | 6009 | 4523 | 75.3 |
| Comparative Example 3 | Heat-treated natural graphite (H) | lithium difluorophosphate | 6002 | 4700 | 78.3 |
| Comparative Example 4 | Heat-treated natural graphite (H) | — | 6001 | 4690 | 78.2 |
| Comparative Example 5 | Carbonaceous substance (I) | — | 6001 | 4567 | 76.1 |
| Comparative Example 6 | Carbonaceous substance (D) | — | 6009 | 4776 | 79.5 |
| Comparative Example 7 | Rounded natural graphite (C) | trimethylsilyl methanesulfonate | 6001 | 4809 | 80.1 |
| Comparative Example 8 | Heat-treated natural graphite (H) | trimethylsilyl methanesulfonate | 6012 | 4798 | 79.8 |
| Comparative Example 9 | Rounded natural graphite (C) | hexamethylcyclotrisiloxane | 6021 | 4877 | 81.0 |
| Comparative Example 10 | Heat-treated natural graphite (H) | hexamethylcyclotrisiloxane | 5999 | 4897 | 81.6 |

Negative Electrode [4] <<Battery Evaluation>>
(Capacity Measurement)

The battery which had undergone no charge/discharge cycling was subjected to 5 cycles of initial charge/discharge at 25° C. in a voltage range of 4.2-3.0 V at a current of 0.2 C (the value of current at which the rated capacity based on 1-hour-rate discharge capacity is discharged over 1 hour is taken as 1 C; the same applies hereinafter). The 0.2-C discharge capacity thereof as measured in the fifth cycle in this operation was taken as initial capacity.
(Storage Test)

The battery was stored in a high-temperature environment of 60° C., which is regarded as the upper-limit temperature for the actual use of lithium secondary batteries. The battery was charged by the constant-current constant-voltage method at 0.2 C to a final charge voltage of 4.2 V to 20% of the initial capacity measured in Capacity Measurement. Thereafter, this battery was stored in a 60° C. high-temperature environment for 1 week. The battery after the storage was discharged at 0.2 C to 3 V in a 25° C. environment and then subjected to 3 cycles of charge/discharge under the same conditions as in (Capacity Measurement). The 0.2-C discharge capacity thereof as measured in the third cycle was taken as capacity after storage in low state of charge. The capacity retention through cycling was determined using the following calculation formula from the initial capacity measured before the storage test and the capacity after storage in low state of charge measured after completion of the storage test.

Recovery after storage in low state of charge (%)=100×(capacity after storage in low state of charge)/(initial capacity)

The results given above show the following. The recovery after storage in low state of charge, as determined after storage in a low state of charge, was greatly improved by using an electrolyte containing lithium difluorophosphate, trimethylsilyl methanesulfonate, or hexamethylcyclotrisiloxane and by using a negative electrode containing as a negative-electrode active material a carbonaceous substance having a roundness of 0.85 or higher and a surface functional-group amount O/C value of from 0 to 0.01.

Negative Electrode [5] [Production of Negative-Electrode Materials]
[Negative-Electrode Material Production 1]

Coal tar pitch having a quinoline insoluble content of 0.05% by mass or lower was heat-treated at 460° C. for 10 hours in a reaction furnace to obtain a massive heat-treated graphite crystal precursor which was meltable and had a softening point of 385° C. The massive heat-treated graphite crystal precursor obtained was ground with an intermediate pulverizer (Orient Mill, manufactured by Seishin Enterprise Co., Ltd.) and further pulverized with a pulverizer (Turbo Mill, manufactured by Matsubo Corp.) to reduce the massive precursor into fine particles. Thus, graphite crystal precursor powder (E) was obtained, which had a median diameter of 17 μm.

A natural graphite having a median diameter of 17 μm, aspect ratio of 1.4, tap density of 1.0 g/cm$^3$, BET specific surface area of 6.5 g/cm$^3$, and roundness of 0.92 was mixed with the fine graphite crystal precursor powder (E) in an amount of 50% by mass based on the total weight of the fine graphite crystal precursor powder and the natural graphite. Thus, a powder mixture was obtained.

This powder mixture of the heat-treated graphite crystal precursor was packed into a metallic container and subjected to heat treatment A at 540° C. for 2 hours in a nitrogen gas stream in a box-shaped electric furnace. During the heat treatment A, the fine graphite crystal precursor powder melted and was evenly combined with the natural graphite. As a result, a massive mixture of the heat-treated graphite crystal precursor was obtained.

This solidified mass of the mixture of the heat-treated graphite crystal precursor was crushed with a crusher (Roll Jaw Crusher, manufactured by Yoshida Seisakusho Co., Ltd.) and further pulverized with a pulverizer (Turbo Mill, manufactured by Matsubo Corp.) to obtain a powder having a median diameter of 18.5 μm.

The powder obtained was put in a container and heat-treated with an electric furnace at 1,000° C. for 1 hour in a nitrogen atmosphere. The powder obtained through the heat-treating (precursor mixture (F) before heat treatment B)

remained in a powder state, and appeared to have undergone almost no melting or fusion bonding.

Furthermore, the powder heat-treated was transferred to a graphite crucible and heated with a direct voltage application type electric furnace at 3,000° C. over 5 hours in an inert atmosphere to graphitize it. This powder was repeatedly passed through an ASTM 400-mesh sieve five times in order to prevent inclusion of coarse particles. Thus, orientation-differing-carbon composite (G) was obtained.

[Negative-Electrode Material Production 2]

The natural graphite used in [Negative-Electrode Material Production 1] and a binder pitch having a softening point of 88° C. as a graphitizable binder were mixed with each other in a weight ratio of 100:30. This mixture was introduced into a kneader having a matiscator type stirring blade and preheated at 128° C., and was kneaded for 20 minutes.

The mixture sufficiently kneaded was packed into that mold of a mold press which had been preheated at 108° C. After the mixture in the mold was allowed to stand for 5 minutes to make the temperature of the mixture stable, the plunger was pushed to apply a pressure of 2 kgf/cm$^2$ (0.20 MPa) and mold the mixture. That pressure was maintained for 1 minute and the operation was then stopped. After the resultant pressure decrease ended, the molded object comprising the natural graphite and a graphite crystal precursor powder combined therewith was taken out.

The molded object obtained was placed in a metallic saggar as a refractory container and the space was filled with a graphitic breeze. In an electric furnace, this molded object was heated from room temperature to 1,000° C. over 48 hours and held at 1,000° C. for 3 hours to conduct volatile removal/heat-treating. Subsequently, the molded object was placed in a graphite crucible and the space was filled with a graphitic breeze. Using a direct voltage application type electric furnace, this molded object was heated at 3,000° C. for 4 hours in an inert atmosphere to conduct graphitization.

The graphitic molded object obtained was crushed with a jaw crusher and then pulverized with a mill having a pulverization blade rotation speed set at 4,000 rpm. Furthermore, sieving with an ASTM 400-mesh sieve was repeatedly conducted five times as a classification treatment in order to prevent inclusion of coarse particles. Thus, orientation-differing-carbon composite (H) was obtained.

[Negative-Electrode Material Production 3]

The same procedure as in [Negative-Electrode Material Production 2] was conducted, except that the heat treatment with a direct voltage application type electric furnace was conducted at 2,200° C. Thus, orientation-differing-carbon composite (I) was obtained.

[Negative-Electrode Material Production 4]

The same procedure as in [Negative-Electrode Material Production 2] was conducted, except that the natural graphite was replaced by a coke having a median diameter of 10 μm, aspect ratio of 2.3, tap density of 0.64 g/cm$^3$, BET specific surface area of 9.5 m$^2$/g, and roundness of 0.83. Thus, orientation-differing-carbon composite (J) was obtained.

[Negative-Electrode Material Production 5]

The same procedure as in [Negative-Electrode Material Production 2] was conducted, except that the coke used in [Negative-Electrode Material Production 4], silicon carbide as a graphitization catalyst, and a binder pitch having a softening point of 88° C. as a graphitizable binder were mixed together in amass ratio of 100:10:30. Thus, orientation-differing-carbon composite (K) was obtained.

[Negative-Electrode Material Production 6]

The same procedure as in [Negative-Electrode Material Production 2] was conducted, except that the natural graphite was replaced by natural flake graphite having a median diameter of 19.8 μm, aspect ratio of 3.2, tap density of 0.47 g/cm$^3$, BET specific surface area of 5.9 m$^2$/g, and roundness of 0.81. Thus, orientation-differing-carbon composite (L) was obtained.

[Negative-Electrode Material Production 7]

The same procedure as in [Negative-Electrode Material Production 2] was conducted, except that the natural graphite was replaced by a natural graphite having a median diameter of 35 μm, aspect ratio of 1.4, tap density of 1.02 g/cm$^3$, BET specific surface area of 3.9 m$^2$/g, and roundness of 0.90. Thus, orientation-differing-carbon composite (M) was obtained.

[Negative-Electrode Material Production 8]

The same procedure as in [Negative-Electrode Material Production 2] was conducted, except that the pulverization blade rotation speed was set at 1,500 rpm. Thus, orientation-differing-carbon composite (N) was obtained.

[Negative-Electrode Material Production 9]

The same procedure as in [Negative-Electrode Material Production 2] was conducted, except that the natural graphite was replaced by a natural graphite having a median diameter of 6 μm, aspect ratio of 1.5, and tap density of 0.15 g/cm$^3$. Thus, orientation-differing-carbon composite (O) was obtained.

[Negative-Electrode Material Production 10]

The graphite crystal precursor powder (E) obtained in [Negative-Electrode Material Production 1] was packed into a metallic container and subjected to heat treatment A at 540° C. for 2 hours in a nitrogen gas stream in a box-shaped electric furnace. The graphite crystal precursor powder (E) melted during the heat treatment A to give a mass.

This solidified mass of the heat-treated graphite crystal precursor was crushed with a crusher (Roll Jaw Crusher, manufactured by Yoshida Seisakusho Co., Ltd.) and further pulverized with a pulverizer (Turbo Mill, manufactured by Matsubo Corp.) to obtain a powder having a median diameter of 18.5 μm.

The powder obtained was put in a container and heat-treated with an electric furnace at 1,000° C. for 1 hour in a nitrogen atmosphere. The powder obtained through the heat-treating remained in a powder state, and appeared to have undergone almost no melting or fusion bonding.

Furthermore, the powder heat-treated was transferred to a graphite crucible and heated with a direct voltage application type electric furnace at 3,000° C. over 5 hours in an inert atmosphere to graphitize it. This powder was repeatedly passed through an ASTM 400-mesh sieve five times in order to prevent inclusion of coarse particles. Thus, carbonaceous substance (P) was obtained.

[Negative-Electrode Material Production 11]

The natural graphite used in [Negative-Electrode Material Production 1] was packed into a metallic container and subjected to heat treatment A at 540° C. for 2 hours in a nitrogen gas stream in a box-shaped electric furnace. After the heat treatment A, the natural graphite appeared to have undergone no melting/fusion bonding. The powder obtained was put in a container and heat-treated with an electric furnace at 1,000° C. for 1 hour in a nitrogen atmosphere. The powder obtained through the heat-treating remained in a powder state and appeared to have undergone no melting or fusion bonding.

Furthermore, the powder heat-treated was transferred to a graphite crucible and heated with a direct voltage application type electric furnace at 3,000° C. over 5 hours in an inert atmosphere to graphitize it. This powder was repeatedly passed through an ASTM 400-mesh sieve five times in order to prevent inclusion of coarse particles. Thus, carbonaceous substance (Q) was obtained.

[Negative-Electrode Material Production 12]

Carbonaceous substance (P) and carbonaceous substance (Q) were evenly mixed together each in an amount of 50% by mass. Thus, carbonaceous substance mixture (R) was obtained.

Negative Electrode [5] [Production of Batteries]

<<Positive-Electrode Production 1>>

Ninety percents by mass lithium cobalt oxide ($LiCoO_2$) as a positive-electrode active material was mixed with 5% by mass acetylene black as a conductive material and 5% by mass poly(vinylidene fluoride) (PVdF) as a binder in N-methylpyrrolidone solvent to prepare a slurry. The slurry obtained was applied to each side of an aluminum foil having a thickness of 15 µm and dried. The coated foil was rolled with a pressing machine to a thickness of 80 µm. Pieces each having an active-material layer size with a width of 100 mm and a length of 100 mm and including an uncoated part having a width of 30 mm were cut out of the rolled foil. Thus, positive electrodes were obtained. The positive electrodes thus obtained had an active-material density of 2.35 $g/cm^3$.

<<Negative-Electrode Production 1>>

To 98 parts by weight of a negative-electrode active material were added 100 parts by weight of an aqueous dispersion of sodium carboxymethyl cellulose (concentration of sodium carboxymethyl cellulose, 1% by mass) as a thickener and 2 parts by weight of an aqueous dispersion of a styrene/butadiene rubber (concentration of styrene/butadiene rubber, 50% by mass) as a binder. The ingredients were mixed together by means of a disperser to obtain a slurry. The slurry obtained was applied to each side of a rolled copper foil having a thickness of 10 µm and dried. The coated foil was rolled with a pressing machine to a thickness of 75 µm. Pieces each having an active-material layer size with a width of 104 mm and a length of 104 mm and including an uncoated part having a width of 30 mm were cut out of the rolled foil. Thus, negative electrodes were obtained. The negative electrodes thus obtained had an active-material density of 1.35 $g/cm^3$.

<<Nonaqueous-Electrolytic-Solution Production 1>>

In a dry argon atmosphere, sufficiently dried lithium hexafluorophosphate ($LiPF_6$) was dissolved in a concentration of 1 mol/L in a mixture of ethylene carbonate (EC), dimethyl carbonate (DMC), and ethyl methyl carbonate (EMC) (volume ratio, 3:3:4). Furthermore, lithium difluorophosphate ($LiPO_2F_2$) was added thereto so as to result in a concentration of 0.3% by mass.

<<Nonaqueous-Electrolytic-Solution Production 2>>

In a dry argon atmosphere, sufficiently dried lithium hexafluorophosphate ($LiPF_6$) was dissolved in a concentration of 1 mol/L in a mixture of ethylene carbonate (EC), dimethyl carbonate (DMC), and ethyl methyl carbonate (EMC) (volume ratio, 3:3:4). Furthermore, trimethylsilyl methanesulfonate was added thereto so as to result in a concentration of 0.3% by mass.

<<Nonaqueous-Electrolytic-Solution Production 3>>

In a dry argon atmosphere, sufficiently dried lithium hexafluorophosphate ($LiPF_6$) was dissolved in a concentration of 1 mol/L in a mixture of ethylene carbonate (EC), dimethyl carbonate (DMC), and ethyl methyl carbonate (EMC) (volume ratio, 3:3:4). Furthermore, hexamethylcyclotrisiloxane was added thereto so as to result in a concentration of 0.3% by mass.

<<Nonaqueous-Electrolytic-Solution Production 4>>

In a dry argon atmosphere, sufficiently dried lithium hexafluorophosphate ($LiPF_6$) was dissolved in a concentration of 1 mol/L in a mixture of ethylene carbonate (EC), dimethyl carbonate (DMC), and ethyl methyl carbonate (EMC) (volume ratio, 3:3:4).

<<Battery Production 1>>

Thirty-two positive electrodes and 33 negative electrodes were alternately disposed and superposed together with porous polyethylene sheet separators (thickness, 25 µm) sandwiched between the electrodes. In this operation, each positive electrode was disposed so that the positive-electrode active-material surface was within the range of the opposed negative-electrode active-material surface. The uncoated parts of the positive electrodes were welded together and those of the negative electrodes were welded together. Thus, current collector tabs were produced to obtain an electrode group. This electrode group was packed into a battery can (outer dimensions: 120×110×10 mm). Thereafter, 20 mL of a nonaqueous electrolyte was introduced into the battery can packed with the electrode group and sufficiently infiltrated into the electrodes. This can was sealed to fabricate a prismatic battery. This battery has a rated discharge capacity of about 6 ampere-hours (Ah) and a direct-current resistance as measured by the 10-kHz alternating-current method of about 5 milliohms (mΩ).

Negative Electrode [5] Example 1

A battery was produced by the method described under <<Battery Production 1>> using the negative electrodes produced in <<Negative-Electrode Production 1>> in which orientation-differing-carbon composite (G) was used as the negative-electrode active material and further using the positive electrodes produced in <<Positive-Electrode Production 1>> and the nonaqueous electrolyte produced in <<Nonaqueous-Electrolytic-Solution Production 1>>. This battery was examined by the methods which will be described under <<Battery Evaluation>> given later and by the measurement methods described above.

Negative Electrode [5] Example 2

A battery was produced in the same manner as in Negative Electrode [5] Example 1, except that orientation-differing-carbon composite (H) was used as the negative-electrode active material in <<Negative-Electrode Production 1>>. The battery evaluation described under <<Battery Evaluation>> was conducted.

Negative Electrode [5] Example 3

A battery was produced in the same manner as in Negative Electrode [5] Example 1, except that orientation-differing-carbon composite (I) was used as the negative-electrode active material in <<Negative-Electrode Production 1>>. The battery evaluation described under <<Battery Evaluation>> was conducted.

Negative Electrode [5] Example 4

A battery was produced in the same manner as in Negative Electrode [5] Example 1, except that orientation-differing-carbon composite (J) was used as the negative-electrode active material in <<Negative-Electrode Production 1>>. The battery evaluation described under <<Battery Evaluation>> was conducted.

Negative Electrode [5] Example 5

A battery was produced in the same manner as in Negative Electrode [5] Example 1, except that orientation-differing-carbon composite (K) was used as the negative-electrode active material in <<Negative-Electrode Production 1>>. The battery evaluation described under <<Battery Evaluation>> was conducted.

Negative Electrode [5] Example 6

A battery was produced in the same manner as in Negative Electrode [5] Example 1, except that orientation-differing-carbon composite (L) was used as the negative-electrode active material in <<Negative-Electrode Production 1>>. The battery evaluation described under <<Battery Evaluation>> was conducted.

Negative Electrode [5] Example 7

A battery was produced in the same manner as in Negative Electrode [5] Example 1, except that orientation-differing-carbon composite (M) was used as the negative-electrode active material in <<Negative-Electrode Production 1>>. The battery evaluation described under <<Battery Evaluation>> was conducted.

Negative Electrode [5] Example 8

A battery was produced in the same manner as in Negative Electrode [5] Example 1, except that orientation-differing-carbon composite (N) was used as the negative-electrode active material in <<Negative-Electrode Production 1>>. The battery evaluation described under <<Battery Evaluation>> was conducted.

Negative Electrode [5] Example 9

A battery was produced in the same manner as in Negative Electrode [5] Example 1, except that orientation-differing-carbon composite (0) was used as the negative-electrode active material in <<Negative-Electrode Production 1>>. The battery evaluation described under <<Battery Evaluation>> was conducted.

Negative Electrode [5] Example 10 to 18

Batteries were produced in the same manners as in Negative Electrode [5] Examples 1 to 9, except that the nonaqueous electrolyte used in these Examples was replaced by the nonaqueous electrolyte produced in <<Nonaqueous-Electrolytic-Solution Production 2>>. The batteries were evaluated by the same methods.

Negative Electrode [5] Example 19 to 27

Batteries were produced in the same manners as in Negative Electrode [5] Examples 1 to 9, except that the nonaqueous electrolyte used in these Examples was replaced by the nonaqueous electrolyte produced in <<Nonaqueous-Electrolytic-Solution Production 3>>. The batteries were evaluated by the same methods.

Negative Electrode [5] Comparative Example 1

A battery was produced in the same manner as in Negative Electrode [5] Example 1, except that carbonaceous substance (P) was used as the negative-electrode active material in <<Negative-Electrode Production 1>>. The battery evaluation described under <<Battery Evaluation>> was conducted.

Negative Electrode [5] Comparative Example 2

A battery was produced in the same manner as in Negative Electrode [5] Comparative Example 1, except that the nonaqueous electrolyte used in the Comparative Example was replaced by the nonaqueous electrolyte produced in <<Nonaqueous-Electrolytic-Solution Production 4>>. The battery evaluation described under <<Battery Evaluation>> was conducted.

Negative Electrode [5] Comparative Example 3

A battery was produced in the same manner as in Negative Electrode [5] Example 1, except that carbonaceous substance (Q) was used as the negative-electrode active material in <<Negative-Electrode Production 1>>. The battery evaluation described under <<Battery Evaluation>> was conducted.

Negative Electrode [5] Comparative Example 4

A battery was produced in the same manner as in Negative Electrode [5] Comparative Example 3, except that the nonaqueous electrolyte used in the Comparative Example was replaced by the nonaqueous electrolyte produced in <<Nonaqueous-Electrolytic-Solution Production 4>>. The battery evaluation described under <<Battery Evaluation>> was conducted.

Negative Electrode [5] Comparative Example 5

A battery was produced in the same manner as in Negative Electrode [5] Example 1, except that carbonaceous substance mixture (R) was used as the negative-electrode active material in <<Negative-Electrode Production 1>>. The battery evaluation described under <<Battery Evaluation>> was conducted.

Negative Electrode [5] Comparative Example 6

A battery was produced in the same manner as in Negative Electrode [5] Comparative Example 5, except that the nonaqueous electrolyte used in the Comparative Example was replaced by the nonaqueous electrolyte produced in <<Nonaqueous-Electrolytic-Solution Production 4>>. The battery evaluation described under <<Battery Evaluation>> was conducted.

Negative Electrode [5] Comparative Example 7

A battery was produced in the same manner as in Negative Electrode [5] Example 1, except that the nonaqueous electrolyte used in the Example was replaced by the nonaqueous electrolyte produced in <<Nonaqueous-Electrolytic-Solution Production 4>>. The battery evaluation described under <<Battery Evaluation>> was conducted.

Negative Electrode [5] Comparative Example 8

A battery was produced in the same manner as in Negative Electrode [5] Example 2, except that the nonaqueous electrolyte used in the Example was replaced by the nonaqueous electrolyte produced in <<Nonaqueous-Electrolytic-Solution Production 4>>. The battery evaluation described under <<Battery Evaluation>> was conducted.

Negative Electrode [5] Comparative Example 9

A battery was produced in the same manner as in Negative Electrode [5] Example 4, except that the nonaqueous electrolyte used in the Example was replaced by the nonaqueous electrolyte produced in <<Nonaqueous-Electrolytic-Solution Production 4>>. The battery evaluation described under <<Battery Evaluation>> was conducted.

Negative Electrode [5] Comparative Example 10

A battery was produced in the same manner as in Negative Electrode [5] Example 5, except that the nonaqueous electrolyte used in the Example was replaced by the nonaqueous electrolyte produced in <<Nonaqueous-Electrolytic-Solution Production 4>>. The battery evaluation described under <<Battery Evaluation>> was conducted.

Negative Electrode [5] Comparative Example 11 to 13

Batteries were produced in the same manners as in Negative Electrode [5] Comparative Examples 1, 3, and 5, except that the nonaqueous electrolyte used in these Comparative Examples was replaced by the nonaqueous electrolyte produced in <<Nonaqueous-Electrolytic-Solution Production 2>>. The batteries were evaluated by the same methods.

Negative Electrode [5] Comparative Example 14 to 16

Batteries were produced in the same manners as in Negative Electrode [5] Comparative Examples 1, 3, and 5, except that the nonaqueous electrolyte used in these Comparative Examples was replaced by the nonaqueous electrolyte produced in <<Nonaqueous-Electrolytic-Solution Production 3>>. The batteries were evaluated by the same methods.

Negative Electrode [5]<<Battery Evaluation>>
(Capacity Measurement)

The battery which had undergone no charge/discharge cycling was subjected to 5 cycles of initial charge/discharge at 25° C. in a voltage range of 4.2-3.0 V at a current of 0.2 C (the value of current at which the rated capacity based on 1-hour-rate discharge capacity is discharged over 1 hour is taken as 1 C; the same applies hereinafter). The 0.2-C discharge capacity thereof as measured in the fifth cycle in this operation was taken as initial capacity. The output measurement shown below was then made.

(Low-State-Of-Charge Cycle Test)

The battery was subjected to a cycle test in a high-temperature environment of 60° C., which is regarded as the upper-limit temperature for the actual use of lithium secondary batteries. The battery was charged by the constant-current constant-voltage method at 2 C to a final charge voltage of 4.2 V to 20% of the initial capacity measured in Capacity Measurement and then discharged at a constant current of 2 C to a final discharge voltage of 3.0 V. This charge/discharge operation as one cycle was repeated to conduct 500 cycles in total.

The battery which had undergone the cycle test was subjected to 3 cycles of charge/discharge in a 25° C. environment. The 0.2-C discharge capacity thereof as measured in the third cycle was taken as capacity after low-state-of-charge cycling. Using the following calculation formula, the capacity retention through cycling was determined from the initial capacity measured prior to the cycling and the capacity after low-state-of-charge cycling measured after completion of the cycle test.

Capacity retention through cycling (%)=100×(capacity after low-state-of-charge cycling)/(initial capacity)

The negative-electrode active materials used in the Negative Electrode [5] Examples and Negative Electrode [5] Comparative Examples are listed in Negative Electrode [5] Table 1, and the results of battery evaluation are shown in Negative Electrode [5] Table 2 and Negative Electrode [5] Table 3. The results given in Negative Electrode [5] Table 2 and Negative Electrode [5] Table 3 show the following. The capacity retention through a low-state-of-charge cycle test (capacity retention through cycling) was greatly improved by using an electrolyte containing lithium difluorophosphate, trimethylsilyl methanesulfonate, or hexamethylcyclotrisiloxane in combination with an orientation-differing-carbon composite as a negative-electrode active material.

Negative Electrode [5] Table 1

TABLE 43

| Negative-electrode active material | Particle diameter μm | Round-ness — | Specific surface area m$^2$/g | Raman R value — | Raman half-value width cm$^{-1}$ | Tap density g/cm$^3$ | d002 nm | Lc nm | Ash content mass % | Micro-pore distribution mL/g | Total pore distribution mL/g | True density g/cm$^3$ | Aspect ratio — |
|---|---|---|---|---|---|---|---|---|---|---|---|---|---|
| Orientation-differing-carbon composite (G) | 17.5 | 0.92 | 2.3 | 0.06 | 20.1 | 1.20 | 0.3357 | >100 | 0.02 | 0.042 | 0.448 | 2.26 | 1.3 |
| Orientation-differing-carbon composite (H) | 18.0 | 0.93 | 2.8 | 0.12 | 22.1 | 1.17 | 0.3358 | >100 | 0.02 | 0.022 | 0.467 | 2.26 | 1.2 |
| Orientation-differing-carbon composite (I) | 18.5 | 0.91 | 3.0 | 0.17 | 24.5 | 1.10 | 0.3610 | >100 | 0.05 | 0.030 | 0.489 | 2.24 | 1.4 |
| Orientation-differing-carbon composite (J) | 21.4 | 0.88 | 2.3 | 0.12 | 21.4 | 0.75 | 0.3359 | >100 | 0.03 | 0.067 | 0.569 | 2.25 | 1.5 |
| Orientation-differing-carbon composite (K) | 20.7 | 0.89 | 3.0 | 0.08 | 21.9 | 0.73 | 0.3357 | >100 | 0.05 | 0.079 | 0.656 | 2.26 | 1.5 |

TABLE 43-continued

| Negative-electrode active material | Particle diameter μm | Round-ness — | Specific surface area m²/g | Raman R value — | Raman half-value width cm⁻¹ | Tap density g/cm³ | d002 nm | Lc nm | Ash content mass % | Micro-pore distribution mL/g | Total pore distribution mL/g | True density g/cm³ | Aspect ratio — |
|---|---|---|---|---|---|---|---|---|---|---|---|---|---|
| Orientation-differing-carbon composite (L) | 21.4 | 0.82 | 2.5 | 0.13 | 23.5 | 0.63 | 0.3357 | >100 | 0.03 | 0.033 | 0.556 | 2.26 | 2.5 |
| Orientation-differing-carbon composite (M) | 35.2 | 0.91 | 1.4 | 0.05 | 21.1 | 1.11 | 0.3356 | >100 | 0.04 | 0.018 | 0.405 | 2.26 | 1.3 |
| Orientation-differing-carbon composite (N) | 22.0 | 0.92 | 0.9 | 0.06 | 22.1 | 1.25 | 0.3356 | >100 | 0.05 | 0.020 | 0.455 | 2.26 | 1.2 |
| Orientation-differing-carbon composite (O) | 16.5 | 0.90 | 3.8 | 0.09 | 24.3 | 0.50 | 0.3359 | >100 | 0.03 | 0.102 | 0.764 | 2.25 | 1.7 |
| Carbonaceous substance (P) | 18.9 | 0.86 | 1.5 | 0.11 | 27.8 | 1.06 | 0.3357 | >100 | 0.04 | 0.024 | 0.459 | 2.25 | 2.3 |
| Carbonaceous substance (Q) | 17.7 | 0.93 | 5.4 | 0.03 | 20.5 | 1.00 | 0.3354 | >100 | 0.03 | 0.112 | 0.701 | 2.26 | 1.3 |
| Carbonaceous substance mixture (R) | 18.8 | 0.90 | 3.4 | 0.06 | 23.8 | 1.02 | 0.3355 | >100 | 0.03 | 0.090 | 0.590 | 2.26 | 1.8 |

Negative Electrode [5] Table 2

TABLE 44

| No. | Negative-electrode active material | Specific compound | Initial capacity mAh | Capacity after low-state-of-charge cycling mAh | Capacity retention through cycling % |
|---|---|---|---|---|---|
| Example 1 | Orientation-differing-carbon composite (G) | lithium difluoro-phosphate | 6045 | 5592 | 92.5 |
| Example 2 | Orientation-differing-carbon composite (H) | lithium difluoro-phosphate | 6032 | 5640 | 93.5 |
| Example 3 | Orientation-differing-carbon composite (I) | lithium difluoro-phosphate | 5780 | 5162 | 89.3 |
| Example 4 | Orientation-differing-carbon composite (J) | lithium difluoro-phosphate | 6013 | 5478 | 91.1 |
| Example 5 | Orientation-differing-carbon composite (K) | lithium difluoro-phosphate | 6003 | 5427 | 90.4 |
| Example 6 | Orientation-differing-carbon composite (L) | lithium difluoro-phosphate | 6009 | 5426 | 90.3 |
| Example 7 | Orientation-differing-carbon composite (M) | lithium difluoro-phosphate | 6001 | 5383 | 89.7 |
| Example 8 | Orientation-differing-carbon composite (N) | lithium difluoro-phosphate | 5914 | 5246 | 88.7 |
| Example 9 | Orientation-differing-carbon composite (O) | lithium difluoro-phosphate | 5959 | 5375 | 90.2 |
| Example 10 | Orientation-differing-carbon composite (G) | trimethylsilyl methane-sulfonate | 6037 | 5410 | 89.6 |
| Example 11 | Orientation-differing-carbon composite (H) | trimethylsilyl methane-sulfonate | 6035 | 5441 | 90.2 |
| Example 12 | Orientation-differing-carbon composite (I) | trimethylsilyl methane-sulfonate | 5806 | 5058 | 87.1 |
| Example 13 | Orientation-differing-carbon composite (J) | trimethylsilyl methane-sulfonate | 6019 | 5346 | 88.8 |
| Example 14 | Orientation-differing-carbon composite (K) | trimethylsilyl methane-sulfonate | 5997 | 5241 | 87.4 |
| Example 15 | Orientation-differing-carbon composite (L) | trimethylsilyl methane-sulfonate | 6011 | 5300 | 88.2 |
| Example 16 | Orientation-differing-carbon composite (M) | trimethylsilyl methane-sulfonate | 6006 | 5233 | 87.1 |
| Example 17 | Orientation-differing-carbon composite (N) | trimethylsilyl methane-sulfonate | 5921 | 5104 | 86.2 |
| Example 18 | Orientation-differing-carbon composite (O) | trimethylsilyl methane-sulfonate | 5968 | 5101 | 85.5 |
| Example 19 | Orientation-differing-carbon composite (G) | hexamethyl-cyclo-trisiloxane | 6039 | 5767 | 95.5 |

TABLE 44-continued

| No. | Negative-electrode active material | Specific compound | Initial capacity mAh | Capacity after low-state-of-charge cycling mAh | Capacity retention through cycling % |
|---|---|---|---|---|---|
| Example 20 | Orientation-differing-carbon composite (H) | hexamethyl-cyclo-trisiloxane | 6023 | 5580 | 92.6 |
| Example 21 | Orientation-differing-carbon composite (I) | hexamethyl-cyclo-trisiloxane | 5793 | 5208 | 89.9 |
| Example 22 | Orientation-differing-carbon composite (J) | hexamethyl-cyclo-trisiloxane | 6009 | 5364 | 89.3 |
| Example 23 | Orientation-differing-carbon composite (K) | hexamethyl-cyclo-trisiloxane | 6003 | 5349 | 89.1 |
| Example 24 | Orientation-differing-carbon composite (L) | hexamethyl-cyclo-trisiloxane | 6010 | 5306 | 88.3 |
| Example 25 | Orientation-differing-carbon composite (M) | hexamethyl-cyclo-trisiloxane | 5996 | 5413 | 90.3 |
| Example 26 | Orientation-differing-carbon composite (N) | hexamethyl-cyclo-trisiloxane | 5917 | 5275 | 89.1 |
| Example 27 | Orientation-differing-carbon composite (O) | hexamethyl-cyclo-trisiloxane | 5961 | 5500 | 92.3 |

Negative Electrode [5] Table 3

TABLE 45

| No. | Negative-electrode active material | Specific compound | Initial capacity mAh | Capacity after low-state-of-charge cycling mAh | Capacity retention through cycling % |
|---|---|---|---|---|---|
| Comparative Example 1 | Carbonaceous substance (P) | lithium difluorophosphate | 5890 | 4671 | 79.3 |
| Comparative Example 2 | Carbonaceous substance (P) | — | 5873 | 4552 | 77.5 |
| Comparative Example 3 | Carbonaceous substance (Q) | lithium difluorophosphate | 6058 | 4919 | 81.2 |
| Comparative Example 4 | Carbonaceous substance (Q) | — | 6067 | 4866 | 80.2 |
| Comparative Example 5 | Carbonaceous substance mixture (R) | lithium difluorophosphate | 5890 | 4836 | 82.1 |
| Comparative Example 6 | Carbonaceous substance mixture (R) | — | 5887 | 4739 | 80.5 |
| Comparative Example 7 | Orientation-differing-carbon composite (G) | — | 6031 | 4915 | 81.5 |
| Comparative Example 8 | Orientation-differing-carbon composite (H) | — | 6045 | 4975 | 82.3 |
| Comparative Example 9 | Orientation-differing-carbon composite (J) | — | 5790 | 4713 | 81.4 |
| Comparative Example 10 | Orientation-differing-carbon composite (K) | — | 5813 | 4604 | 79.2 |
| Comparative Example 11 | Carbonaceous substance (P) | trimethylsilyl methanesulfonate | 5903 | 4728 | 80.1 |
| Comparative Example 12 | Carbonaceous substance (Q) | trimethylsilyl methanesulfonate | 6038 | 4921 | 81.5 |
| Comparative Example 13 | Carbonaceous substance mixture (R) | trimethylsilyl methanesulfonate | 5900 | 4832 | 81.9 |
| Comparative Example 14 | Carbonaceous substance (P) | hexamethyl-cyclo-trisiloxane | 5940 | 4764 | 80.2 |
| Comparative Example 15 | Carbonaceous substance (Q) | hexamethyl-cyclo-trisiloxane | 6002 | 4874 | 81.2 |
| Comparative Example 16 | Carbonaceous substance mixture (R) | hexamethyl-cyclo-trisiloxane | 5970 | 4782 | 80.1 |

Negative Electrode [6] [Production of Negative-Electrode Active Materials]

(Negative-Electrode Active-Material Production 1)

A commercial natural-graphite powder (A) was repeatedly passed through an ASTM 400-mesh sieve five times in order to prevent inclusion of coarse particles. The negative-electrode active material thus obtained is referred to as carbonaceous substance (B).

(Negative-Electrode Active-Material Production 2)

A commercial natural-graphite powder (C) (d002, 0.336 nm; Lc, 100 nm or larger; Raman R value, 0.11; tap density, 0.46 g/cm$^3$; true density, 2.27 g/cm$^3$; volume-average particle diameter, 28.7 µm) was treated with a pulverizer (Turbo Mill, manufactured by Matsubo Corp.). The resultant powder was repeatedly passed through an ASTM 400-mesh sieve five times in order to prevent inclusion of coarse particles. Thus, carbonaceous substance (D) was prepared.

(Negative-Electrode Active-Material Production 3)

The natural-graphite powder (C) was treated with Hybridization System (Hybridization System Type NHS-1, manufactured by Nara Machinery Co., Ltd.) under the conditions of a treatment amount of 90 g, rotor peripheral speed of 60 m/s, and treatment period of 3 minutes to thereby round the particles. Furthermore, this powder was repeatedly passed through an ASTM 400-mesh sieve five times in order to prevent inclusion of coarse particles. The negative-electrode active material thus obtained is referred to as carbonaceous substance (E). This operation was repeated to thereby obtain the active material in an amount necessary for battery production.

(Negative-Electrode Active-Material Production 4)

A commercial natural-graphite powder (F) (d002, 0.336 nm; Lc, 100 nm or larger; Raman R value, 0.09; tap density, 0.57 g/cm$^3$; true density, 2.26 g/cm$^3$; volume-average particle diameter, 85.4 μm) was rounded with Hybridization System under the conditions of a treatment amount of 90 g, rotor peripheral speed of 30 m/s, and treatment period of 1 minute. Furthermore, this powder was repeatedly passed through an ASTM 400-mesh sieve five times in order to prevent inclusion of coarse particles. The negative-electrode active material thus obtained is referred to as carbonaceous substance (G). This operation was repeated to thereby obtain the active material in an amount necessary for battery production.

(Negative-Electrode Active-Material Production 5)

Coal tar pitch having a quinoline insoluble content of 0.05% by mass or lower was heat-treated at 460° C. for 10 hours in a reaction furnace to obtain a massive carbonized precursor which was meltable and had a softening point of 385° C. The massive carbonized precursor obtained was packed into a metallic container and heat-treated at 1,000° C. for 2 hours in a nitrogen gas stream in a box-shaped electric furnace. The amorphous mass obtained was crushed with a crusher (Roll Jaw Crusher, manufactured by Yoshida Seisakusho Co., Ltd.) and further pulverized with a pulverizer (Turbo Mill, manufactured by Matsubo Corp.). Thus, an amorphous powder having a volume-average particle diameter of 18 μm was obtained. The powder obtained was repeatedly passed through an ASTM 400-mesh sieve five times in order to prevent inclusion of coarse particles. The negative-electrode active material thus obtained is referred to as carbonaceous substance (H).

(Negative-Electrode Active-Material Production 6)

Carbonaceous substance (H) obtained in (Negative-Electrode Active-Material Production 5) was transferred to a graphite crucible and heated with a direct voltage application type electric furnace at 3,000° C. over 5 hours in an inert atmosphere to graphitize it. The powder obtained was repeatedly passed through an ASTM 400-mesh sieve five times in order to prevent inclusion of coarse particles. The negative-electrode active material thus obtained is referred to as carbonaceous substance (I).

(Negative-Electrode Active-Material Production 7)

Carbonaceous substance (I) obtained in (Negative-Electrode Active-Material Production 6) was rounded with Hybridization System under the conditions of a treatment amount of 90 g, rotor peripheral speed of 30 m/s, and treatment period of 1 minute. Furthermore, this powder was repeatedly passed through an ASTM 400-mesh sieve five times in order to prevent inclusion of coarse particles. The negative-electrode active material thus obtained is referred to as carbonaceous substance (J). This operation was repeated to thereby obtain the active material in an amount necessary for battery production.

(Negative-Electrode Active-Material Production 8)

A natural-graphite powder (K) (d002, 0.336 nm; Lc, 100 nm or larger; Raman R value, 0.10; tap density, 0.49 g/cm³; true density, 2.27 g/cm³; volume-average particle diameter, 27.3 μm; ash content, 0.5% by mass) having a lower purity than the natural-graphite powder (A) was rounded and sieved under the same conditions as in (Negative-Electrode Active-Material Production 3). Thus, carbonaceous substance (L) was prepared. This operation was repeated to thereby obtain the active material in an amount necessary for battery production.

(Negative-Electrode Active-Material Production 9)

A commercial powder of natural flake graphite (M) was repeatedly passed through an ASTM 400-mesh sieve five times in order to prevent inclusion of coarse particles. The negative-electrode active material thus obtained is referred to as carbonaceous substance (N).

Carbonaceous substances (B), (D), (E), (G), (H), (I), (J), (L), and (N) were examined for shape and properties by the methods described above. The results obtained are shown in Negative Electrode [6] Table 1.

Negative Electrode [6] Table 1

TABLE 46

| Negative electrode active material production No. | Negative electrode active material Carbonaceous substance | Particle diameter μm | Roundness | BET specific surface area m²/g | Raman R value | Raman half-value width cm⁻¹ | Tap density g/cm³ | d002 nm | Lc nm | Ash content mass % | Micro-pore distribution mL/g | Total pore distribution mL/g | True density g/cm³ | Aspect ratio |
|---|---|---|---|---|---|---|---|---|---|---|---|---|---|---|
| 1 | (B) | 14.0 | 0.82 | 4.9 | 0.09 | 19 | 0.54 | 0.335 | >100 | 0.1 | 0.110 | 0.692 | 2.26 | 1.7 |
| 2 | (D) | 9.1 | 0.93 | 12.0 | 0.42 | 40 | 0.85 | 0.336 | >100 | 0.1 | 0.124 | 0.799 | 2.26 | 1.2 |
| 3 | (E) | 13.6 | 0.94 | 10.6 | 0.33 | 30 | 0.92 | 0.335 | >100 | 0.1 | 0.119 | 0.859 | 2.26 | 1.2 |
| 4 | (G) | 35.4 | 0.90 | 4.6 | 0.18 | 24 | 0.78 | 0.336 | >100 | 0.1 | 0.098 | 0.629 | 2.26 | 1.6 |
| 5 | (H) | 15.4 | 0.90 | 4.6 | 1.03 | 121 | 0.94 | 0.345 | 30 | 0.1 | 0.048 | 0.662 | 1.92 | 2.3 |
| 6 | (I) | 17.5 | 0.90 | 1.7 | 0.11 | 24 | 1.00 | 0.335 | >100 | 0.0 | 0.079 | 0.610 | 2.26 | 2.0 |
| 7 | (J) | 12.5 | 0.92 | 2.7 | 0.15 | 26 | 1.05 | 0.335 | >100 | 0.0 | 0.087 | 0.680 | 2.26 | 1.8 |
| 8 | (L) | 15.7 | 0.93 | 10.8 | 0.34 | 36 | 0.91 | 0.336 | >100 | 0.5 | 0.110 | 0.789 | 2.25 | 1.3 |
| 9 | (N) | 17.0 | 0.83 | 8.9 | 0.15 | 22 | 0.49 | 0.336 | >100 | 0.0 | 0.125 | 0.693 | 2.26 | 2.4 |

Negative Electrode [6] [Production of Batteries]

<<Positive-Electrode Production 1>>

Ninety percents by mass lithium cobalt oxide ($LiCoO_2$) as a positive-electrode active material was mixed with 5% by mass acetylene black as a conductive material and 5% by mass poly(vinylidene fluoride) (PVdF) as a binder in N-methylpyrrolidone solvent to prepare a slurry. The slurry obtained was applied to each side of an aluminum foil having a thickness of 15 μm and dried. The coated foil was rolled with a pressing machine to a thickness of 80 μm. Pieces each having an active-material layer size with a width of 100 mm and a length of 100 mm and including an uncoated part having a width of 30 mm were cut out of the rolled foil. Thus, positive electrodes were obtained. The positive electrodes thus obtained had an active-material density of 2.35 g/cm³.

<<Negative-Electrode Production 1>>

To 98 parts by weight of a negative-electrode active material were added 100 parts by weight of an aqueous dispersion of sodium carboxymethyl cellulose (concentration of sodium carboxymethyl cellulose, 1% by mass) as a thickener and 2 parts by weight of an aqueous dispersion of a styrene/butadiene rubber (concentration of styrene/butadiene rubber, 50% by mass) as a binder. The ingredients were mixed together by means of a disperser to obtain a slurry. The slurry obtained was applied to each side of a rolled copper foil having a thickness of 10 μm and dried. The coated foil was rolled with a pressing machine to a thickness of 75 μm. Pieces each having an active-material layer size with a width of 104 mm and a length of 104 mm and including an uncoated part having a width of 30 mm were cut out of the rolled foil. Thus, negative electrodes were obtained. The negative electrodes thus obtained had an active-material density of 1.35 g/cm$^3$.

<<Nonaqueous-Electrolytic-Solution Production 1>>

In a dry argon atmosphere, sufficiently dried lithium hexafluorophosphate (LiPF$_6$) was dissolved in a concentration of 1 mol/L in a mixture of ethylene carbonate (EC), dimethyl carbonate (DMC), and ethyl methyl carbonate (EMC) (volume ratio, 3:3:4). Furthermore, lithium difluorophosphate (LiPO$_2$F$_2$) was added thereto so as to result in a concentration of 0.3% by mass.

<<Nonaqueous-Electrolytic-Solution Production 2>>

In a dry argon atmosphere, sufficiently dried lithium hexafluorophosphate (LiPF$_6$) was dissolved in a concentration of 1 mol/L in a mixture of ethylene carbonate (EC), dimethyl carbonate (DMC), and ethyl methyl carbonate (EMC) (volume ratio, 3:3:4). Furthermore, trimethylsilyl methanesulfonate was added thereto so as to result in a concentration of 0.3% by mass.

<<Nonaqueous-Electrolytic-Solution Production 3>>

In a dry argon atmosphere, sufficiently dried lithium hexafluorophosphate (LiPF$_6$) was dissolved in a concentration of 1 mol/L in a mixture of ethylene carbonate (EC), dimethyl carbonate (DMC), and ethyl methyl carbonate (EMC) (volume ratio, 3:3:4). Furthermore, hexamethylcyclotrisiloxane was added thereto so as to result in a concentration of 0.3% by mass.

<<Nonaqueous-Electrolytic-Solution Production 4>>

In a dry argon atmosphere, sufficiently dried lithium hexafluorophosphate (LiPF$_6$) was dissolved in a concentration of 1 mol/L in a mixture of ethylene carbonate (EC), dimethyl carbonate (DMC), and ethyl methyl carbonate (EMC) (volume ratio, 3:3:4).

<<Battery Production 1>>

Thirty-two positive electrodes and 33 negative electrodes were alternately disposed and superposed together with porous polyethylene sheet separators (thickness, 25 μm) sandwiched between the electrodes. In this operation, each positive electrode was disposed so that the positive-electrode active-material surface was within the range of the opposed negative-electrode active-material surface. The uncoated parts of the positive electrodes were welded together and those of the negative electrodes were welded together. Thus, current collector tabs were produced to obtain an electrode group. This electrode group was packed into a battery can (outer dimensions: 120×110×10 mm). Thereafter, 20 mL of a nonaqueous electrolyte was introduced into the battery can packed with the electrode group and sufficiently infiltrated into the electrodes. This can was sealed to fabricate a prismatic battery. This battery has a rated discharge capacity of about 6 ampere-hours (Ah) and a direct-current resistance component as measured by the 10-kHz alternating-current method of about 5 milliohms (mΩ). The ratio of the total electrode area of the positive electrodes to the overall surface area of the battery case was 20.6.

Negative Electrode [6] Example 1

A battery was produced by the method described under <<Battery Production 1>> using the negative electrodes produced in <<Negative-Electrode Production 1>> in which carbonaceous substance (D) was used as the negative-electrode active material and further using the positive electrodes produced in <<Positive-Electrode Production 1>> and the nonaqueous electrolyte produced in <<Nonaqueous-Electrolytic-Solution Production 1>>. This battery was examined by the methods which will be described under <<Battery Evaluation>> given later and by the measurement methods described above. The results are shown in Table 2 (Negative Electrode [6] Table 2).

Negative Electrode [6] Example 2

A battery was produced in the same manner as in Negative Electrode [6] Example 1, except that carbonaceous substance (E) was used as the negative-electrode active material in <<Negative-Electrode Production 1>>. The battery evaluation described under <<Battery Evaluation>> was conducted. The results are shown in Negative Electrode [6] Table 2.

Negative Electrode [6] Example 3

A battery was produced in the same manner as in Negative Electrode [6] Example 1, except that carbonaceous substance (G) was used as the negative-electrode active material in <<Negative-Electrode Production 1>>. The battery evaluation described under <<Battery Evaluation>> was conducted. The results are shown in Negative Electrode [6] Table 2.

Negative Electrode [6] Example 4

A battery was produced in the same manner as in Negative Electrode [6] Example 1, except that carbonaceous substance (J) was used as the negative-electrode active material in <<Negative-Electrode Production 1>>. The battery evaluation described under <<Battery Evaluation>> was conducted. The results are shown in Negative Electrode [6] Table 2.

Negative Electrode [6] Example 5

A battery was produced in the same manner as in Negative Electrode [6] Example 1, except that carbonaceous substance (L) was used as the negative-electrode active material in <<Negative-Electrode Production 1>>. The battery evaluation described under <<Battery Evaluation>> was conducted. The results are shown in Negative Electrode [6] Table 2.

Negative Electrode [6] Examples 6 to 10

Batteries were produced and evaluated respectively in the same manners as in Negative Electrode [6] Examples 1 to 5, except that the nonaqueous electrolyte used in these Examples was replaced by the nonaqueous electrolyte produced in <<Nonaqueous-Electrolytic-Solution Production 2>>. The results are shown in Negative Electrode [6] Table 2.

Negative Electrode [6] Examples 11 to 15

Batteries were produced and evaluated respectively in the same manners as in Negative Electrode [6] Examples 1 to 5, except that the nonaqueous electrolyte used in these Examples was replaced by the nonaqueous electrolyte pro- Negative Electrode [6] Comparative Example 1

A battery was produced in the same manner as in Negative Electrode [6] Example 1, except that carbonaceous substance (B) was used as the negative-electrode active material in <<Negative-Electrode Production 1>>. The battery evaluation described under <<Battery Evaluation>> was conducted. The results are shown in Negative Electrode [6] Table 2.

Negative Electrode [6] Comparative Example 2

A battery was produced in the same manner as in Negative Electrode [6] Comparative Example 1, except that the non-aqueous electrolyte used in the Comparative Example was replaced by the nonaqueous electrolyte produced in <<Nonaqueous-Electrolytic-Solution Production 4>>. The battery evaluation described under <<Battery Evaluation>> was conducted. The results are shown in Negative Electrode [6] Table 2.

Negative Electrode [6] Comparative Example 3

A battery was produced in the same manner as in Negative Electrode [6] Example 2, except that the nonaqueous electrolyte used in the Example was replaced by the nonaqueous electrolyte produced in <<Nonaqueous-Electrolytic-Solution Production 4>>. The battery evaluation described under <<Battery Evaluation>> was conducted. The results are shown in Negative Electrode [6] Table 2.

Negative Electrode [6] Comparative Example 4

A battery was produced in the same manner as in Negative Electrode [6] Example 1, except that the nonaqueous electrolyte used in the Example was replaced by the nonaqueous electrolyte produced in <<Nonaqueous-Electrolytic-Solution Production 4>>. The battery evaluation described under <<Battery Evaluation>> was conducted. The results are shown in Negative Electrode [6] Table 2.

Negative Electrode [6] Comparative Example 5

A battery was produced in the same manner as in Negative Electrode [6] Example 1, except that carbonaceous substance (H) was used as the negative-electrode active material in <<Negative-Electrode Production 1>>. The battery evaluation described under <<Battery Evaluation>> was conducted. The results are shown in Negative Electrode [6] Table 2.

Negative Electrode [6] Comparative Example 6

A battery was produced in the same manner as in Negative Electrode [6] Comparative Example 5, except that the nonaqueous electrolyte used in the Comparative Example was replaced by the nonaqueous electrolyte produced in <<Nonaqueous-Electrolytic-Solution Production 4>>. The battery evaluation described under <<Battery Evaluation>> was conducted. The results are shown in Negative Electrode [6] Table 2.

Negative Electrode [6] Comparative Example 7

A battery was produced in the same manner as in Negative Electrode [6] Example 1, except that carbonaceous substance (N) was used as the negative-electrode active material in <<Negative-Electrode Production 1>>. The battery evaluation described under <<Battery Evaluation>> was conducted. The results are shown in Negative Electrode [6] Table 2.

Negative Electrode [6] Comparative Example 8

A battery was produced in the same manner as in Negative Electrode [6] Comparative Example 7, except that the nonaqueous electrolyte used in the Comparative Example was replaced by the nonaqueous electrolyte produced in <<Nonaqueous-Electrolytic-Solution Production 4>>. The battery evaluation described under <<Battery Evaluation>> was conducted. The results are shown in Negative Electrode [6] Table 2.

Negative Electrode [6] Comparative Example 9

A battery was produced in the same manner as in Negative Electrode [6] Example 1, except that carbonaceous substance (I) was used as the negative-electrode active material in <<Negative-Electrode Production 1>>. The battery evaluation described under <<Battery Evaluation>> was conducted. The results are shown in Negative Electrode [6] Table 2.

Negative Electrode [6] Comparative Example 10

A battery was produced in the same manner as in Negative Electrode [6] Comparative Example 9, except that the nonaqueous electrolyte used in the Comparative Example was replaced by the nonaqueous electrolyte produced in <<Nonaqueous-Electrolytic-Solution Production 4>>. The battery evaluation described under <<Battery Evaluation>> was conducted. The results are shown in Negative Electrode [6] Table 2.

Negative Electrode [6] Comparative Examples 11 to 14

Batteries were produced and evaluated respectively in the same manners as in Negative Electrode [6] Comparative Examples 1, 5, 7, and 9, except that the nonaqueous electrolyte used in these Comparative Examples was replaced by the nonaqueous electrolyte produced in <<Nonaqueous-Electrolytic-Solution Production 2>>. The results are shown in Negative Electrode [6] Table 2.

Negative Electrode [6] Comparative Examples 15 to 18

Batteries were produced and evaluated respectively in the same manners as in Negative Electrode [6] Comparative Examples 1, 5, 7, and 9, except that the nonaqueous electrolyte used in these Comparative Examples was replaced by the nonaqueous electrolyte produced in <<Nonaqueous-Electrolytic-Solution Production 3>>. The results are shown in Negative Electrode [6] Table 2.

Negative Electrode [6]<<Battery Evaluation>>
(Capacity Measurement)

The fresh battery which had undergone no charge/discharge was subjected to 5 cycles of initial charge/discharge at 25° C. in a voltage range of 4.1-3.0 V at 25° C. (voltage range, 4.1-3.0 V). The 0.2-C (the value of current at which the rated capacity based on 1-hour-rate discharge capacity is discharged over 1 hour is taken as 1 C; the same applies hereinafter) discharge capacity thereof as measured in the fifth cycle in this operation was taken as initial capacity.

(Output Measurement 1)

In a 25° C. environment, the battery was charged for 150 minutes at a constant current of 0.2 C. This battery was allowed to stand in a −30° C. environment for 3 hours and then discharged for 10 seconds at each of 0.1 C, 0.3 C, 1.0 C, 3.0 C, and 5.0 C. The voltage was measured at 10 seconds after the discharge initiation. The area of the triangle surrounded by the resultant current-voltage straight line and the final lower voltage (3 V) was taken as initial low-temperature output (W).

(Output Measurement 2)

After Output Measurement 1, 4.1-V low-voltage charge was conducted for 1 hour. Thereafter, the battery was transferred to a 25° C. environment, allowed to stand for 15 minutes, and then discharged for 10 seconds at each of 0.1 C, 0.3 C, 1.0 C, 3.0 C, and 5.0 C. The voltage was measured at 10 seconds after the discharge initiation. The area of the triangle surrounded by the resultant current-voltage straight line and the final lower voltage (3 V) was taken as output during heating up (W).

Using the following calculation formula, the percentage improvement in temperature adaptation output (%) was calculated from the results of Output Measurement 1 and Output Measurement 2.

Percentage improvement in temperature adaptation output (%)=[(output during heating up($W$)/initial low-temperature output($W$))−1]×100

Impedance Rct and double-layer capacity Cdl in Negative Electrode [6] Table 2 are parameters contributing to output. The smaller the value of impedance Rct and the larger the value of double-layer capacity Cdl, the more the output tends to improve. Incidentally, "Impedance Rct" and "Double-layer capacity Cdl" were determined by the methods described hereinabove under "Impedance".

Negative Electrode [6] Table 2

TABLE 47

| No. | Negative-electrode active material Carbonaceous substance | Specific compound | Initial low-temperature output W | Output during heating up W | Percentage improvement in temperature adaptation output % | Impedance Rct Ω | Double-layer capacity Cdl ×10$^{-4}$ F |
|---|---|---|---|---|---|---|---|
| Example 1 | (D) | lithium difluorophosphate | 21.7 | 29.0 | 33 | 6 | 0.8 |
| Example 2 | (E) | lithium difluorophosphate | 22.2 | 31.0 | 40 | 8 | 0.6 |
| Example 3 | (G) | lithium difluorophosphate | 20.0 | 24.9 | 24 | 13 | 0.5 |
| Example 4 | (J) | lithium difluorophosphate | 21.5 | 27.6 | 28 | 100 | 0 |
| Example 5 | (L) | lithium difluorophosphate | 21.9 | 29.6 | 35 | 8 | 0.5 |
| Example 6 | (D) | trimethylsilyl methanesulfonate | 21.6 | 27.7 | 28 | 9 | 1 |
| Example 7 | (E) | trimethylsilyl methanesulfonate | 21.9 | 29.1 | 33 | 11 | 0.9 |
| Example 8 | (G) | trimethylsilyl methanesulfonate | 20.2 | 24.5 | 21 | 22 | 0.6 |
| Example 9 | (J) | trimethylsilyl methanesulfonate | 21.2 | 25.9 | 22 | 135 | 0 |
| Example 10 | (L) | trimethylsilyl methanesulfonate | 21.9 | 28.7 | 31 | 10 | 1 |
| Example 11 | (D) | hexamethylcyclotrisiloxane | 22.0 | 27.9 | 27 | 9 | 0.9 |
| Example 12 | (E) | hexamethylcyclotrisiloxane | 22.1 | 30.2 | 37 | 9 | 0.6 |
| Example 13 | (G) | hexamethylcyclotrisiloxane | 20.1 | 24.1 | 20 | 20 | 0.5 |
| Example 14 | (J) | hexamethylcyclotrisiloxane | 21.3 | 25.8 | 21 | 121 | 0 |
| Example 15 | (L) | hexamethylcyclotrisiloxane | 21.5 | 29.2 | 36 | 9 | 0.7 |
| Comparative Example 1 | (B) | lithium difluorophosphate | 21.1 | 24.7 | 17 | 7 | 1 |
| Comparative Example 2 | (B) | — | 20.0 | 21.1 | 5 | 13 | 1.2 |
| Comparative Example 3 | (E) | — | 20.5 | 22.7 | 11 | 10 | 0.9 |
| Comparative Example 4 | (D) | — | 21.5 | 23.4 | 9 | 10 | 1 |
| Comparative Example 5 | (H) | lithium difluorophosphate | 21.3 | 23.0 | 8 | 36 | 0.2 |
| Comparative Example 6 | (H) | — | 20.7 | 21.2 | 2 | 50 | 0.3 |
| Comparative Example 7 | (N) | lithium difluorophosphate | 19.4 | 21.4 | 10 | 11 | 0.8 |
| Comparative Example 8 | (N) | — | 19.0 | 20.1 | 6 | 16 | 0.7 |
| Comparative Example 9 | (I) | lithium difluorophosphate | 17.5 | 19.5 | 11 | 125 | 0 |
| Comparative Example 10 | (I) | — | 17.1 | 18.3 | 7 | 160 | 0 |
| Comparative Example 11 | (B) | trimethylsilyl methanesulfonate | 21.1 | 24.7 | 14 | 7 | 1.1 |
| Comparative Example 12 | (H) | trimethylsilyl methanesulfonate | 21.3 | 23.0 | 5 | 44 | 0.3 |
| Comparative Example 13 | (N) | trimethylsilyl methanesulfonate | 19.4 | 21.4 | 7 | 13 | 0.7 |
| Comparative Example 14 | (I) | trimethylsilyl methanesulfonate | 17.5 | 19.4 | 9 | 131 | 0 |
| Comparative Example 15 | (B) | hexamethylcyclotrisiloxane | 21.1 | 24.7 | 15 | 9 | 1.4 |
| Comparative Example 16 | (H) | hexamethylcyclotrisiloxane | 21.3 | 23.0 | 6 | 42 | 0.4 |
| Comparative Example 17 | (N) | hexamethylcyclotrisiloxane | 19.4 | 21.4 | 9 | 13 | 0.4 |
| Comparative Example 18 | (I) | hexamethylcyclotrisiloxane | 17.5 | 19.4 | 10 | 142 | 0 |

The results given in Negative Electrode [6] Table 2 show the following. The output recovery from a −30° C. low-temperature state through heating up was greatly accelerated by using an electrolyte containing lithium difluorophosphate, trimethylsilyl methanesulfonate, or hexamethylcyclotrisiloxane and using a negative electrode containing, as a negative-electrode active material, graphitic carbon particles having a roundness of 0.85 or higher, an interplanar spacing (d002) for the (002) planes as determined by wide-angle X-ray diffractometry of smaller than 0.337 nm, and a Raman R value of from 0.12 to 0.8.

Negative Electrode [7]<Production of Negative Electrodes>
(Negative-Electrode Production 1)

A mixture of Si and C (disk having an Si/C areal ratio of about 100:9) was used as a target material to conduct deposition of an active-material thin film for 45 minutes on an electrolytic copper foil having an average surface roughness (Ra) of 0.2 μm, tensile strength of 280 N/mm$^2$, 0.2% proof stress of 220 N/mm$^2$, and thickness of 18 μm as a current collector base with a direct-current sputtering apparatus ("HSM-52" manufactured by Shimadzu Corp.). Thus, a thin-film negative electrode (1) was obtained.

In this operation, the current collector base was attached to a water-cooled holder and kept at about 25° C. The chamber was evacuated to 4×10$^{-4}$ Pa beforehand. Thereafter, high-purity argon gas was caused to flow through the chamber at 40 sccm, and the pressure of the internal atmosphere was adjusted to 1.6 Pa by regulating the degree of opening of the main valve. Film deposition was then conducted at a power density of 4.7 W/cm² and a deposition rate (film formation rate) of about 1.8 nm/sec (0.108 µm/min). The sputtering gas had an oxygen concentration of 0.0010%. Prior to the thin-film formation, reverse sputtering was conducted to etch the surface of the electrolytic copper foil for the purpose of removing the oxide film present on the base surface.

Figure 1B:
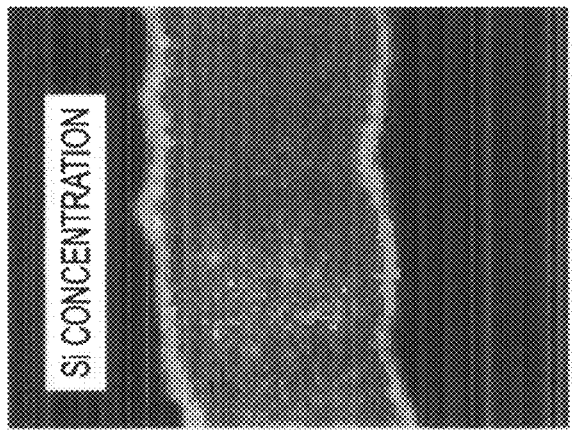
FIG. 1(B) shows the Si distribution of thin film negative electrode produced in Negative Electrode Production 1.
Figure 1C:
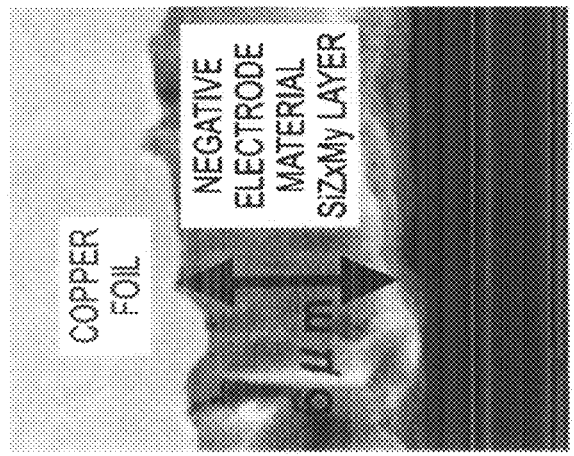
FIG. 1(C) shows the C distribution of thin film negative electrode produced in Negative Electrode Production 1.

From an examination with a scanning electron microscope (SEM) of a section of the thin-film negative electrode (1) obtained, it was found that the thickness of the thin film deposited was 6 µm (see FIG. 1 (a)). Furthermore, the thin film was analyzed for composition by XPS by the method shown below. As a result, the thin film was found to contain the element C in an amount of 24 at. %, and the C concentration ratio Q(C) to the element C concentration in the SiC corresponded to 0.49. The value of Si/C/O in terms of atomic concentration ratio was 1.00/0.33/0.04. Raman values of the thin film were determined by the following method. As a result, RC=0.05; no peak "sc" concerning RSC was detected; and RS=0.55. Furthermore, the thin film was examined by X-ray diffractometry by the following method. As a result, no clear peak attributable to SiC was detected and XIsz=0.38. The results obtained are shown in Negative Electrode [7] Table 1.

Furthermore, the thin film was examined for the mass concentration distribution of Si in the film thickness direction with an electron probe microanalyzer (EPMA) by the method shown below. As a result, the difference (absolute value) between the maximum value or minimum value of Si and the average was found to be within 25%, indicating that Si had been deposited substantially continuously from the current collector as shown in FIG. 1 (b). Moreover, the thin film was examined for element C distribution. As a result, the element C was found to be evenly distributed so as to have a size of 1 µm or smaller in the thin Si film as shown in FIG. 1 (c).

(Negative-Electrode Production 2)

An active-material thin film was deposited in the same manner as in (Negative-Electrode Production 1), except that Si was used as a target material. Thus, a thin-film negative electrode (2) was produced.

From an examination with a scanning electron microscope (SEM) of a section of the thin-film negative electrode (2) obtained, the thin film deposited was found to have a thickness of 6 µm. The thin film was analyzed for composition. As a result, the thin film was found to contain neither the element C nor the element N and have an atomic concentration ratio Si/O of 1.00/0.02. Furthermore, Raman values of the thin film were determined. As a result, no peak "c" concerning RC was detected, no peak "sc" concerning RSC was detected, and RS=0.30. The results obtained are shown in Negative Electrode [7] Table 1.

<XPS>

In analysis by X-ray photoelectron spectroscopy, an X-ray photoelectron spectroscope ("ESCA" manufactured by ULVAC-PHI, INC.) was used. The thin-film negative electrode was placed on the sample table so that the surface of the electrode was flat, and a depth profile examination was made while conducting Ar sputtering using an aluminum Kα line as an X-ray source. A spectrum including Si2p (90-110 eV), C1s (280-300 eV), and O1s (525-545 eV) was obtained for a depth (e.g., 200 nm) where concentrations had become constant. Charge correction was made, with the top of the C1s peak obtained being at 284.5 eV. The areas of the Si2p, C1s, and O1s peaks in the spectrum were determined and multiplied by the apparatus sensitivity coefficient to calculate the atomic concentrations of Si, C, and O. From the Si, C, and O atomic concentrations obtained, the atomic concentration ratio Si/C/O (Si atom concentration/C atom concentration/0 atom concentration) is calculated. This ratio is defined as the composition value Si/C/O of the thin film.

<Raman Spectroscopy>

In Raman spectroscopy, a Raman spectrometer ("Raman Spectrometer" manufactured by Japan Spectroscopic Co., Ltd.) was used. The thin-film negative electrode was set in a measuring cell and was examined while irradiating the surface of the sample in the cell with argon ion laser light.

Conditions for this Raman spectroscopy are as follows.
Wavelength of argon ion laser: 514.5 nm
Laser power on sample: 15-40 mW
Resolution: 10-20 cm$^{-1}$
Examination range: 200 cm$^{-1}$ to 1,900 cm$^{-1}$
Smoothing: simple average; convolution, 15 points <X-Ray Diffractometry>

In X-ray diffractometry, "RINT 2000PC", manufactured by Rigaku Corp., was used. The thin-film negative electrode was set in a measuring cell and examined by the out-of-plane method in the range of 2θ=10-70°. Background correction was made by connecting a point around 2θ=15-28° to a point around 2θ=40-45° with a straight line.

<EPMA Examination>

For EPMA analysis for a film-thickness-direction mass concentration distribution or a distribution in a thin-film section, use was made of an electron probe microanalyzer ("JXA-8100" manufactured by JEOL Ltd.). A section of the thin-film negative electrode was prepared with a microtome without conducting resin embedding, and the section ranging from the current collector to the surface of the thin film was subjected to elemental analysis. In determining a film-thickness-direction mass concentration distribution, the sum of the found element amounts was converted to 100% and this value was used to determine the film-thickness-direction mass concentration distribution of Si.

Negative Electrode [7] Table 1

TABLE 48

| Negative-electrode active material | Kind of element Z | Z concentration ratio Q(Z) | Composition of SiZ$_x$M$_y$ Atomic concentration ratio | | | Raman values of SiZ$_x$M$_y$ | | | XIsz of SiZ$_x$M$_y$ by X-ray diffractometry |
|---|---|---|---|---|---|---|---|---|---|
| | | | Si | Z | O | RC | RSC | RS | |
| Thin-film negative electrode (1) | C | 0.49 | 1.00 | 0.33 | 0.04 | 0.05 | nopeak | 0.55 | 0.38 |

TABLE 48-continued

| Negative-electrode active material | Kind of element Z | Z concentration ratio Q(Z) | Composition of $SiZ_xM_y$ Atomic concentration ratio | | | Raman values of $SiZ_xM_y$ | | | $XIsz$ of $SiZ_xM_y$ by X-ray diffractometry |
|---|---|---|---|---|---|---|---|---|---|
| | | | Si | Z | O | RC | RSC | RS | |
| Thin-film negative electrode (2) | (Si) | (0.00) | 1.00 | (0.00) | 0.02 | nopeak | nopeak | 0.30 | — |

In Negative Electrode [7] Table 1, (Si) does not fall under element Z.

Negative Electrode [7]<Production of Positive Electrode>

(Positive-Electrode Production 1)

Ninety percents by mass lithium cobalt oxide ($LiCoO_2$) as a positive-electrode active material was mixed with 5% by mass acetylene black as a conductive material and 5% by mass poly(vinylidene fluoride) (PVdF) as a binder in N-methylpyrrolidone solvent to prepare a slurry. The slurry obtained was applied to one side of an aluminum foil having a thickness of 15 μm and dried. The coated foil was rolled with a pressing machine to a thickness of 80 μm.

Negative Electrode [7]<Production of Nonaqueous Electrolytic Solutions>

(Nonaqueous-Electrolytic-Solution Production 1)

In a dry argon atmosphere, sufficiently dried lithium hexafluorophosphate ($LiPF_6$) was dissolved in a concentration of 1 mol/L in a mixture of ethylene carbonate (EC), dimethyl carbonate (DMC), and ethyl methyl carbonate (EMC) (volume ratio, 3:3:4). Furthermore, lithium difluorophosphate ($LiPO_2F_2$) was added thereto so as to result in a concentration of 0.3% by mass.

(Nonaqueous-Electrolytic-Solution Production 2)

In a dry argon atmosphere, sufficiently dried lithium hexafluorophosphate ($LiPF_6$) was dissolved in a concentration of 1 mol/L in a mixture of ethylene carbonate (EC), dimethyl carbonate (DMC), and ethyl methyl carbonate (EMC) (volume ratio, 3:3:4). Furthermore, trimethylsilyl methanesulfonate was added thereto so as to result in a concentration of 0.3% by mass.

(Nonaqueous-Electrolytic-Solution Production 3)

In a dry argon atmosphere, sufficiently dried lithium hexafluorophosphate ($LiPF_6$) was dissolved in a concentration of 1 mol/L in a mixture of ethylene carbonate (EC), dimethyl carbonate (DMC), and ethyl methyl carbonate (EMC) (volume ratio, 3:3:4). Furthermore, hexamethylcyclotrisiloxane was added thereto so as to result in a concentration of 0.3% by mass.

(Nonaqueous-Electrolytic-Solution Production 4)

In a dry argon atmosphere, sufficiently dried lithium hexafluorophosphate ($LiPF_6$) was dissolved in a concentration of 1 mol/L in a mixture of ethylene carbonate (EC), dimethyl carbonate (DMC), and ethyl methyl carbonate (EMC) (volume ratio, 3:3:4).

Negative Electrode [7]<Production of Lithium Secondary Battery>

A thin-film negative electrode and a positive electrode each having a size of 10 mmϕ were punched out and vacuum-dried at 110° C. Thereafter, the electrodes were transferred to a gloved box. In an argon atmosphere, the positive electrode and the negative electrode were disposed face to face through a polyethylene separator which had been punched out in a size of 14 mmϕ. A nonaqueous electrolyte was added thereto to produce a 2032 type coin battery (lithium secondary battery).

Negative Electrode [7] Example 1

A coin battery was produced by the method described under <Production of Lithium Secondary Battery> using the negative electrode produced in (Negative-Electrode Production 1), the positive electrode produced in (Positive-Electrode Production), and the nonaqueous electrolyte produced in (Nonaqueous-Electrolytic-Solution Production 1). This battery was examined for battery characteristics by the methods which will be described under <Battery Evaluation> given later.

Negative Electrode [7] Example 2

A battery was produced in the same manner as in Negative Electrode [7] Example 1, except that the nonaqueous electrolyte used in Negative Electrode [7] Example 1 was replaced by the nonaqueous electrolyte produced in (Nonaqueous-Electrolytic-Solution Production 2). Battery evaluation was conducted by the methods described under <Battery Evaluation>. The results are shown in Negative Electrode [7] Table 2.

Negative Electrode [7] Example 3

A battery was produced in the same manner as in Negative Electrode [7] Example 1, except that the nonaqueous electrolyte used in Negative Electrode [7] Example 1 was replaced by the nonaqueous electrolyte produced in (Nonaqueous-Electrolytic-Solution Production 3). Battery evaluation was conducted by the methods described under <Battery Evaluation>. The results are shown in Negative Electrode [7] Table 2.

Negative Electrode [7] Comparative Example 1

A battery was produced in the same manner as in Negative Electrode [7] Example 1, except that the nonaqueous electrolyte used in Negative Electrode [7] Example 1 was replaced by the nonaqueous electrolyte produced in (Nonaqueous-Electrolytic-Solution Production 4). Battery evaluation was conducted by the methods described under <Battery Evaluation>. The results are shown in Negative Electrode [7] Table 2.

Negative Electrode [7] Comparative Example 2

A battery was produced in the same manner as in Negative Electrode [7] Example 1, except that the negative electrode used in Negative Electrode [7] Example 1 was replaced by the negative electrode produced in (Negative-Electrode Production 2).

Battery evaluation was conducted by the methods described under <Battery Evaluation>. The results are shown in Negative Electrode [7] Table 2.

Negative Electrode [7] Comparative Example 3

A battery was produced in the same manner as in Negative Electrode [7] Comparative Example 2, except that the nonaqueous electrolyte used in Negative Electrode [7] Comparative Example 2 was replaced by the nonaqueous electrolyte produced in (Nonaqueous-Electrolytic-Solution Production 2). Battery evaluation was conducted by the methods described under <Battery Evaluation>. The results are shown in Negative Electrode [7] Table 2.

Negative Electrode [7] Comparative Example 4

A battery was produced in the same manner as in Negative Electrode [7] Comparative Example 2, except that the nonaqueous electrolyte used in Negative Electrode [7] Comparative Example 2 was replaced by the nonaqueous electrolyte produced in (Nonaqueous-Electrolytic-Solution Production 3). Battery evaluation was conducted by the methods described under <Battery Evaluation>. The results are shown in Negative Electrode [7] Table 2.

Negative Electrode [7] Comparative Example 5

A battery was produced in the same manner as in Negative Electrode [7] Comparative Example 2, except that the nonaqueous electrolyte used in Negative Electrode [7] Comparative Example 2 was replaced by the nonaqueous electrolyte produced in (Nonaqueous-Electrolytic-Solution Production 4). Battery evaluation was conducted by the methods described under <Battery Evaluation>. The results are shown in Negative Electrode [7] Table 2.

Negative Electrode [7] <Battery Evaluation>

The coin battery produced in <Production of Lithium Secondary Battery> was evaluated for discharge capacity and examined for suitability for charge by the following methods.

<<Evaluation of Discharge Capacity>>

The lithium counter electrode was charged to 4.2 V at a current density of 1.23 mA/cm$^2$ and further charged at a constant voltage of 4.2 V until the current value reached 0.123 mA to dope the negative electrode with lithium. Thereafter, the lithium counter electrode was discharged to 2.5 V at a current density of 1.23 mA/cm$^2$. This charge/discharge cycle was repeated five times, and the average of the discharge capacity values for the third to fifth cycles was taken as discharge capacity. In the case of determining discharge capacity per unit mass, the mass of the active material was determined by subtracting the mass of the copper foil punched out so as to have the same area as the negative electrode from the mass of the negative electrode and that discharge capacity was calculated using the following formula.

Discharge capacity (mAh/g)=[average discharge capacity for 3rd to 5th cycles (mAh)]/[mass of active material (g)]

Mass of active material (g)=[mass of negative electrode (g)]–[mass of copper foil having the same area (g)]

<<Examination of Suitability for Charge>>

The capacity as measured in a 25° C. environment in charge at 0.2 C (the value of current at which the rated capacity based on 1-hour-rate discharge capacity is discharged over 1 hour is taken as 1 C; the same applies hereinafter) to 4.2 V was taken as 0.2-C charge capacity. This battery was discharged at 0.2 C to 2.5 V and then charged at 1 C to 4.2 V; the capacity as measured in this charge was taken as 1-C charge capacity. From the results obtained, suitability for charge was determined using the following formula.

Suitability for charge (%)=100×[1-C charge capacity]/[0.2-C charge capacity]

Negative Electrode [7] Table 2

TABLE 49

| No. | Nonaqueous electrolyte Specific compound | Negative-electrode active material | Discharge capacity (mAh/g) | 0.2-C charge capacity (mAh/g) | 1-C charge capacity (mAh/g) | Suitability for charge (%) | Remarks |
|---|---|---|---|---|---|---|---|
| Example 1 | lithium difluorophosphate | Thin-film negative electrode (1) | 2614 | 2680 | 2567 | 95.8 | within the invention |
| Example 2 | trimethylsilyl methanesulfonate | Thin-film negative electrode (1) | 2598 | 2690 | 2566 | 95.4 | within the invention |
| Example 3 | hexamethylcyclotrisiloxane | Thin-film negative electrode (1) | 2621 | 2670 | 2488 | 93.2 | within the invention |
| Comparative Example 1 | — | Thin-film negative electrode (1) | 2614 | 2690 | 2405 | 89.4 | no specific compound |
| Comparative Example 2 | lithium difluorophosphate | Thin-film negative electrode (2) | 3920 | 4012 | 3406 | 84.9 | no element Z |
| Comparative Example 3 | trimethylsilyl methanesulfonate | Thin-film negative electrode (2) | 3896 | 4002 | 3458 | 86.4 | no element Z |
| Comparative Example 4 | hexamethylcyclotrisiloxane | Thin-film negative electrode (2) | 3945 | 3989 | 3486 | 87.4 | no element Z |
| Comparative Example 5 | — | Thin-film negative electrode (2) | 3930 | 3998 | 3406 | 85.2 | no element Z |

The results given in Negative Electrode [7] Table 2 show the following. The lithium secondary batteries which employed a nonaqueous electrolyte containing lithium difluorophosphate, trimethylsilyl methanesulfonate, or hexamethylcyclotrisiloxane and further employed as a negative-electrode active material a multielement-containing negative-electrode active material (C) containing at least one of the lithium-occluding metal (A) and/or lithium-occluding alloy (B) and further containing at least one element (element Z) selected from C and N had greatly improved suitability for charge.

Negative Electrode [8] [Production of Negative-Electrode Active Materials]

(Negative-Electrode Active-Material Production 1)

A natural-graphite powder (d002, 0.336 nm; Lc, 100 nm or larger; Raman R value, 0.11; tap density, 0.46 g/cm$^3$; true density, 2.27 g/cm$^3$; volume-average particle diameter, 35.4 μm) was treated with Hybridization System (Hybridization System Type NHS-1, manufactured by Nara Machinery Co., Ltd.) under the conditions of a treatment amount of 90 g, rotor peripheral speed of 60 m/s, and treatment period of 3 minutes to thereby round the particles. Furthermore, this powder was repeatedly passed through an ASTM 400-mesh sieve five times in order to prevent inclusion of coarse particles. The negative-electrode active material thus obtained is referred to as carbonaceous substance (A). This operation was repeated to thereby obtain the active material in an amount necessary for battery production.

(Negative-Electrode Active-Material Production 2)

A commercial powder of natural flake graphite was treated with an air classifier to remove fine particles. The powder obtained was repeatedly passed through an ASTM 400-mesh sieve five times in order to prevent inclusion of coarse particles. The negative-electrode active material thus obtained is referred to as carbonaceous substance (B).

(Negative-Electrode Active-Material Production 3)

Coal tar pitch having a quinoline insoluble content of 0.05% by mass or lower was heat-treated at 460° C. for 10 hours in a reaction furnace to obtain a massive carbonized precursor which was meltable and had a softening point of 385° C. The massive carbonized precursor obtained was packed into a metallic container and heat-treated at 1,000° C. for 2 hours in a nitrogen gas stream in a box-shaped electric furnace. The amorphous mass obtained was crushed with a crusher (Roll Jaw Crusher, manufactured by Yoshida Seisakusho Co., Ltd.) and further pulverized with a pulverizer (Turbo Mill, manufactured by Matsubo Corp.). Thereafter, the powder was treated with an air classifier to remove fine particles. The powder obtained was repeatedly passed through an ASTM 400-mesh sieve five times in order to prevent inclusion of coarse particles. Thus, an amorphous powder having a volume-average diameter of 9 μm was obtained. The negative-electrode active material thus obtained is referred to as carbonaceous substance (C).

(Negative-Electrode Active-Material Production 4)

Carbonaceous substance (A) was mixed with a petroleum-derived heavy oil obtained in thermal naphtha cracking, and this mixture was carbonized at 1,300° C. in an inert gas. Thereafter, the resultant sinter was classified to thereby obtain a carbonaceous substance comprising particles of the carbonaceous substance (A) and a carbonaceous substance having different crystallinity adherent to the surface of the particles. In the classification, the sinter was passed through an ASTM 400-mesh sieve five times in order to prevent inclusion of coarse particles. Thus, carbonaceous substance (D) was obtained. It was ascertained from actual carbon ratio that the negative-electrode active-material powder obtained comprised 95 parts by weight of a graphite and 5 parts by weight of a carbonaceous substance which was derived from the petroleum-derived heavy oil and with which the graphite was covered.

(Negative-Electrode Active-Material Production 5)

Eighty percents by mass carbonaceous substance (A) was mixed with 20% by mass carbonaceous substance (B) until the mixture became homogeneous. Thus, carbonaceous-substance mixture (E) was obtained.

(Negative-Electrode Active-Material Production 6)

Ninety-five percents by mass carbonaceous substance (A) was mixed with 5% by mass carbonaceous substance (C) until the mixture became homogeneous. Thus, carbonaceous-substance mixture (F) was obtained.

(Negative-Electrode Active-Material Production 7)

Eighty percents by mass carbonaceous substance (D) was mixed with 20% by mass carbonaceous substance (A) until the mixture became homogeneous. Thus, carbonaceous-substance mixture (G) was obtained.

Carbonaceous substances (A), (B), and (C) and carbonaceous-substance mixtures (E), (F), and (G), which were produced in Negative-Electrode Active-Material Productions 1 to 7, were examined for properties, shape, etc. by the methods described above. The results obtained are summarized in Negative Electrode [8] Table 1.

Negative Electrode [8] Table 1

TABLE 50

| Negative electrode active material | Median diameter μm | Mode diameter μm | Z μm | Roundness — | BET specific surface area m$^2$/g | Raman R value — | Raman half-value width cm$^{-1}$ | Tap density g/cm$^3$ | Interplanar spacing d002 nm | Lc nm | Ash content mass % | True density g/cm$^3$ | Aspect ratio — |
|---|---|---|---|---|---|---|---|---|---|---|---|---|---|
| Carbonaceous substance (A) | 14.7 | 14.8 | 0.1 | 0.93 | 10.9 | 0.32 | 28 | 0.95 | 0.335 | >100 | 0.07 | 2.26 | 1.2 |
| Carbonaceous substance (B) | 12.2 | 12.4 | 0.2 | 0.90 | 7.5 | 0.12 | 20 | 0.22 | 0.335 | >100 | 0.03 | 2.26 | 1.8 |
| Carbonaceous substance (C) | 9.7 | 9.8 | 0.1 | 0.89 | 8.5 | 1.05 | 90 | 0.68 | 0.343 | 2.2 | 0.05 | 2.10 | 1.9 |
| Carbonaceous substance (D) | 15.2 | 15.4 | 0.2 | 0.93 | 3.0 | 0.35 | 37 | 0.98 | 0.336 | >100 | 0.07 | 2.25 | 1.4 |
| Carbonaceous-substance mixture (E) | 13.8 | 14.2 | 0.4 | 0.93 | 10.1 | 0.29 | 26 | 0.80 | 0.335 | >100 | 0.06 | 2.26 | 1.3 |
| Carbonaceous-substance mixture (F) | 14.3 | 14.6 | 0.3 | 0.93 | 10.7 | 0.37 | 28 | 0.91 | 0.336 | >100 | 0.07 | 2.25 | 1.2 |
| Carbonaceous-substance mixture (G) | 13.8 | 14.8 | 1.0 | 0.92 | 3.7 | 0.31 | 36 | 0.85 | 0.336 | >100 | 0.06 | 2.25 | 1.5 |

Negative Electrode [8] [Production of Batteries]
<<Positive-Electrode Production 1>>

Ninety percents by mass lithium cobalt oxide ($LiCoO_2$) as a positive-electrode active material was mixed with 5% by mass acetylene black as a conductive material and 5% by mass poly(vinylidene fluoride) (PVdF) as a binder in N-methylpyrrolidone solvent to prepare a slurry. The slurry obtained was applied to each side of an aluminum foil having a thickness of 15 µm and dried. The coated foil was rolled with a pressing machine to a thickness of 80 µm. Pieces each having an active-material layer size with a width of 100 mm and a length of 100 mm and including an uncoated part having a width of 30 mm were cut out of the rolled foil. Thus, positive electrodes were obtained. The positive electrodes thus obtained had an active-material density of 2.35 g/cm$^3$.

<<Negative-Electrode Production 1>>

To 98 parts by weight of a negative-electrode active material were added 100 parts by weight of an aqueous dispersion of sodium carboxymethyl cellulose (concentration of sodium carboxymethyl cellulose, 1% by mass) as a thickener and 2 parts by weight of an aqueous dispersion of a styrene/butadiene rubber (concentration of styrene/butadiene rubber, 50% by mass) as a binder. The ingredients were mixed together by means of a disperser to obtain a slurry. The slurry obtained was applied to each side of a rolled copper foil having a thickness of 10 µm and dried. The coated foil was rolled with a pressing machine to a thickness of 75 µm. Pieces each having an active-material layer size with a width of 104 mm and a length of 104 mm and including an uncoated part having a width of 30 mm were cut out of the rolled foil. Thus, negative electrodes were obtained. The negative electrodes thus obtained had an active-material density of 1.35 g/cm$^3$.

<<Nonaqueous-Electrolytic-Solution Production 1>>

In a dry argon atmosphere, sufficiently dried lithium hexafluorophosphate ($LiPF_6$) was dissolved in a concentration of 1 mol/L in a mixture of ethylene carbonate (EC), dimethyl carbonate (DMC), and ethyl methyl carbonate (EMC) (volume ratio, 3:3:4). Furthermore, lithium difluorophosphate ($LiPO_2F_2$) was added thereto so as to result in a concentration of 0.3% by mass.

<<Nonaqueous-Electrolytic-Solution Production 2>>

In a dry argon atmosphere, sufficiently dried lithium hexafluorophosphate ($LiPF_6$) was dissolved in a concentration of 1 mol/L in a mixture of ethylene carbonate (EC), dimethyl carbonate (DMC), and ethyl methyl carbonate (EMC) (volume ratio, 3:3:4). Furthermore, trimethylsilyl methanesulfonate was added thereto so as to result in a concentration of 0.3% by mass.

<<Nonaqueous-Electrolytic-Solution Production 3>>

In a dry argon atmosphere, sufficiently dried lithium hexafluorophosphate ($LiPF_6$) was dissolved in a concentration of 1 mol/L in a mixture of ethylene carbonate (EC), dimethyl carbonate (DMC), and ethyl methyl carbonate (EMC) (volume ratio, 3:3:4). Furthermore, hexamethylcyclotrisiloxane was added thereto so as to result in a concentration of 0.3% by mass.

<<Nonaqueous-Electrolytic-Solution Production 4>>

In a dry argon atmosphere, sufficiently dried lithium hexafluorophosphate ($LiPF_6$) was dissolved in a concentration of 1 mol/L in a mixture of ethylene carbonate (EC), dimethyl carbonate (DMC), and ethyl methyl carbonate (EMC) (volume ratio, 3:3:4).

<<Battery Production 1>>

Thirty-two positive electrodes and 33 negative electrodes were alternately disposed and superposed together with porous polyethylene sheet separators (thickness, 25 µm) sandwiched between the electrodes. In this operation, each positive electrode was disposed so that the positive-electrode active-material surface was within the range of the opposed negative-electrode active-material surface. The uncoated parts of the positive electrodes were welded together and those of the negative electrodes were welded together. Thus, current collector tabs were produced to obtain an electrode group. This electrode group was packed into a battery can (outer dimensions: 120×110×10 mm). Thereafter, 20 mL of a nonaqueous electrolyte was introduced into the battery can packed with the electrode group and sufficiently infiltrated into the electrodes. This can was sealed to fabricate a prismatic battery. This battery has a rated discharge capacity of about 6 ampere-hours (Ah) and a direct-current resistance component as measured by the 10-kHz alternating-current method of about 5 milliohms (mΩ). The ratio of the total electrode area of the positive electrodes to the overall surface area of the battery case was 20.6.

Negative Electrode [8] Example 1

A battery was produced by the method described under <<Battery Production 1>> using the negative electrodes produced in <<Negative-Electrode Production 1>> in which carbonaceous-substance mixture (E) was used as the negative-electrode active material and further using the positive electrodes produced in <<Positive-Electrode Production 1>> and the nonaqueous electrolyte produced in <<Nonaqueous-Electrolytic-Solution Production 1>>. This battery was subjected to the battery evaluation described under <<Battery Evaluation>> given later. The results are shown in Negative Electrode [8] Table 2.

Negative Electrode [8] Example 2

A battery was produced in the same manner as in Negative Electrode [8] Example 1, except that carbonaceous-substance mixture (F) was used as the negative-electrode active material in <<Negative-Electrode Production 1>>. The battery evaluation described under <<Battery Evaluation>> was conducted. The results are shown in Negative Electrode [8] Table 2.

Negative Electrode [8] Example 3

A battery was produced in the same manner as in Negative Electrode [8] Example 1, except that carbonaceous-substance mixture (G) was used as the negative-electrode active material in <<Negative-Electrode Production 1>>. The battery evaluation described under <<Battery Evaluation>> was conducted. The results are shown in Negative Electrode [8] Table 2.

Negative Electrode [8] Examples 4 to 6

Batteries were produced and evaluated respectively in the same manners as in Negative Electrode [8] Examples 1 to 3, except that the nonaqueous electrolyte used in these Examples was replaced by the nonaqueous electrolyte produced in <<Nonaqueous-Electrolytic-Solution Production 2>>. The results are shown in Negative Electrode [8] Table 2.

Negative Electrode [8] Examples 7 to 9

Batteries were produced and evaluated respectively in the same manners as in Negative Electrode [8] Examples 1 to 3, except that the nonaqueous electrolyte used in these Examples was replaced by the nonaqueous electrolyte produced in <<Nonaqueous-Electrolytic-Solution Production 3>>. The results are shown in Negative Electrode [8] Table 2.

Negative Electrode [8] Comparative Example 1

A battery was produced in the same manner as in Negative Electrode [8] Example 1, except that the nonaqueous electrolyte used in the Example was replaced by the nonaqueous electrolyte produced in <<Nonaqueous-Electrolytic-Solution Production 4>>. The battery evaluation described under <<Battery Evaluation>> was conducted. The results are shown in Negative Electrode [8] Table 2.

Negative Electrode [8] Comparative Example 2

A battery was produced in the same manner as in Negative Electrode [8] Example 2, except that the nonaqueous electrolyte used in the Example was replaced by the nonaqueous electrolyte produced in <<Nonaqueous-Electrolytic-Solution Production 4>>. The battery evaluation described under <<Battery Evaluation>> was conducted. The results are shown in Negative Electrode [8] Table 2.

Negative Electrode [8] Comparative Example 3

A battery was produced in the same manner as in Negative Electrode [8] Comparative Example 1, except that carbonaceous substance (A) was used as the negative-electrode active material in <<Negative-Electrode Production 1>>. The battery evaluation described under <<Battery Evaluation>> was conducted. The results are shown in Negative Electrode [8] Table 2.

Negative Electrode [8] Comparative Example 4

A battery was produced in the same manner as in Negative Electrode [8] Comparative Example 1, except that carbonaceous substance (B) was used as the negative-electrode active material in <<Negative-Electrode Production 1>>. The battery evaluation described under <<Battery Evaluation>> was conducted. The results are shown in Negative Electrode [8] Table 2.

Negative Electrode [8] Comparative Example 5

A battery was produced in the same manner as in Negative Electrode [8] Comparative Example 1, except that carbonaceous substance (C) was used as the negative-electrode active material in <<Negative-Electrode Production 1>>. The battery evaluation described under <<Battery Evaluation>> was conducted. The results are shown in Negative Electrode [8] Table 2.

Negative Electrode [8] Comparative Examples 6 to 8

Batteries were produced and evaluated respectively in the same manners as in Negative Electrode [8] Comparative Examples 3 to 5, except that the nonaqueous electrolyte used in these Comparative Examples was replaced by the nonaqueous electrolyte produced in <<Nonaqueous-Electrolytic-Solution Production 1>>. The results are shown in Negative Electrode [8] Table 2.

Negative Electrode [8] Comparative Examples 9 to 11

Batteries were produced and evaluated respectively in the same manners as in Negative Electrode [8] Comparative Examples 3 to 5, except that the nonaqueous electrolyte used in these Comparative Examples was replaced by the nonaqueous electrolyte produced in <<Nonaqueous-Electrolytic-Solution Production 2>>. The results are shown in Negative Electrode [8] Table 2.

Negative Electrode [8] Comparative Examples 12 to 14

Batteries were produced and evaluated respectively in the same manners as in Negative Electrode [8] Comparative Examples 3 to 5, except that the nonaqueous electrolyte used in these Comparative Examples was replaced by the nonaqueous electrolyte produced in <<Nonaqueous-Electrolytic-Solution Production 3>>. The results are shown in Negative Electrode [8] Table 2.

Negative Electrode [8]<<Battery Evaluation>>

(Capacity Measurement)

The fresh battery which had undergone no charge/discharge was subjected to 5 cycles of initial charge/discharge at 25° C. in a voltage range of 4.1-3.0 Vat 25° C. (voltage range, 4.1-3.0 V). The 0.2-C (the value of current at which the rated capacity based on 1-hour-rate discharge capacity is discharged over 1 hour is taken as 1 C; the same applies hereinafter) discharge capacity thereof as measured in the fifth cycle in this operation was taken as initial capacity.

(Output Measurement 1)

In a 25° C. environment, the battery was charged for 150 minutes at a constant current of 0.2 C. This battery was allowed to stand in a −30° C. environment for 3 hours and then discharged for 10 seconds at each of 0.1 C, 0.3 C, 1.0 C, 3.0 C, and 5.0 C. The voltage was measured at 10 seconds after the discharge initiation. The area of the triangle surrounded by the resultant current-voltage straight line and the final lower voltage (3 V) was taken as low-temperature output (W).

(Cycle Test)

The battery was subjected to a cycle test in a high-temperature environment of 60° C., which is regarded as the upper-limit temperature for the actual use of lithium secondary batteries. The battery was charged by the constant-current constant-voltage method at 2 C to a final charge voltage of 4.2 V and then discharged at a constant current of 2 C to a final discharge voltage of 3.0 V. This charge/discharge operation as one cycle was repeated to conduct 500 cycles in total. The battery which had undergone the cycle test was subjected to 3 cycles of charge/discharge in a 25° C. environment. The 0.2-C discharge capacity thereof as measured in the third cycle was taken as capacity after cycling. Using the following calculation formula, the capacity retention through cycling was determined from the initial capacity measured prior to the cycling and the capacity after cycling measured after completion of the cycle test.

Capacity retention through cycling (%)=100×(capacity after cycling)/(initial capacity)

Negative Electrode [8] Table 2

TABLE 51

| No. | Negative-electrode active material | Specific compound | Low-temperature output W | Capacity retention through cycling % |
|---|---|---|---|---|
| Ex. 1 | Carbonaceous-substance mixture (E) | lithium difluorophosphate | 26.2 | 81 |
| Ex. 2 | Carbonaceous-substance mixture (F) | lithium difluorophosphate | 27.4 | 80 |
| Ex. 3 | Carbonaceous-substance mixture (G) | lithium difluorophosphate | 29.4 | 85 |
| Ex. 4 | Carbonaceous-substance mixture (E) | trimethylsilyl methanesulfonate | 24.7 | 80 |
| Ex. 5 | Carbonaceous-substance mixture (F) | trimethylsilyl methanesulfonate | 28.2 | 78 |
| Ex. 6 | Carbonaceous-substance mixture (G) | trimethylsilyl methanesulfonate | 29.7 | 84 |
| Ex. 7 | Carbonaceous-substance mixture (E) | hexamethylcyclotrisiloxane | 26.1 | 80 |
| Ex. 8 | Carbonaceous-substance mixture (F) | hexamethylcyclotrisiloxane | 29.1 | 77 |
| Ex. 9 | Carbonaceous-substance mixture (G) | hexamethylcyclotrisiloxane | 28.8 | 84 |
| Comp. Ex. 1 | Carbonaceous-substance mixture (E) | — | 21.1 | 78 |
| Comp. Ex. 2 | Carbonaceous-substance mixture (F) | — | 23.2 | 75 |
| Comp. Ex. 3 | Carbonaceous substance (A) | — | 20.5 | 77 |
| Comp. Ex. 4 | Carbonaceous substance (B) | — | 24.5 | 71 |
| Comp. Ex. 5 | Carbonaceous substance (C) | — | 27.5 | 69 |
| Comp. Ex. 6 | Carbonaceous substance (A) | lithium difluorophosphate | 22.2 | 79 |
| Comp. Ex. 7 | Carbonaceous substance (B) | lithium difluorophosphate | 25.8 | 72 |
| Comp. Ex. 8 | Carbonaceous substance (C) | lithium difluorophosphate | 29.4 | 70 |
| Comp. Ex. 9 | Carbonaceous substance (A) | trimethylsilyl methanesulfonate | 21.7 | 80 |
| Comp. Ex. 10 | Carbonaceous substance (B) | trimethylsilyl methanesulfonate | 25.2 | 72 |
| Comp. Ex. 11 | Carbonaceous substance (C) | trimethylsilyl methanesulfonate | 28.8 | 70 |
| Comp. Ex. 12 | Carbonaceous substance (A) | hexamethylcyclotrisiloxane | 21.7 | 78 |
| Comp. Ex. 13 | Carbonaceous substance (B) | hexamethylcyclotrisiloxane | 24.5 | 72 |
| Comp. Ex. 14 | Carbonaceous substance (C) | hexamethylcyclotrisiloxane | 28.2 | 69 |

The results given in Negative Electrode [8] Table 2 show the following. Both satisfactory cycle characteristics and satisfactory low-temperature output are imparted by using an electrolyte containing lithium difluorophosphate, trimethylsilyl methanesulfonate, or hexamethylcyclotrisiloxane and using a negative electrode containing two or more negative-electrode active materials differing in property.

Negative Electrodes [9] and [10] [Production of Negative-Electrode Active Materials]

(Negative-Electrode Active-Material Production 1)

Highly purified natural flake graphite having a median diameter of about 150 μm (d002, 0.336 nm; Lc, 100 nm or larger; Raman R value, 0.11; true density, 2.27 g/cm³; ash content, 0.05% by mass) was subjected to a rounding treatment with a rounding apparatus (Hybridization System, manufactured by Nara Machinery Co., Ltd.) at a rotation speed of 6,500 rpm for 5 minutes. Furthermore, this graphite was treated with an air classifier (OMC-100, manufactured by Seishin Enterprise Co., Ltd.) to remove 45% by weight fine particles therefrom. Thus, carbonaceous substance (A) was obtained.

(Negative-Electrode Active-Material Production 2)

Carbonaceous substance (A) produced in (Negative-Electrode Active-Material Production 1) was packed into a graphite crucible and heat-treated with a direct voltage application type electric furnace at 3,000° C. for 5 hours in an inert atmosphere to obtain carbonaceous substance (B).

(Negative-Electrode Active-Material Production 3)

Carbonaceous substance (A) produced in (Negative-Electrode Active-Material Production 1) was mixed with a petroleum-derived heavy oil obtained in thermal naphtha cracking, and this mixture was carbonized at 1,300° C. in an inert gas. Thereafter, the resultant sinter was classified to thereby obtain a carbonaceous substance comprising particles of the carbonaceous substance (A) and a carbonaceous substance having different crystallinity adherent to the surface of the particles. In the classification, the sinter was passed through an ASTM 400-mesh sieve five times in order to prevent inclusion of coarse particles. Thus, carbonaceous substance (C) was obtained. It was ascertained from actual carbon ratio that the negative-electrode active-material powder obtained comprised 95 parts by weight of a graphite and 5 parts by weight of a carbonaceous substance which was derived from the petroleum-derived heavy oil and with which the graphite was covered.

(Negative-Electrode Active-Material Production 4)

Coal tar pitch having a quinoline insoluble content of 0.05% by mass or lower was heat-treated at 460° C. for 10 hours in a reaction furnace to obtain a massive carbonized precursor which was meltable and had a softening point of 385° C. The massive carbonized precursor obtained was packed into a metallic container and heat-treated at 1,000° C. for 2 hours in a nitrogen gas stream in a box-shaped electric furnace. The amorphous mass obtained was crushed with a crusher (Roll Jaw Crusher, manufactured by Yoshida Seisakusho Co., Ltd.) and further pulverized with a pulverizer (Turbo Mill, manufactured by Matsubo Corp.). Thus, an amorphous powder having a volume-average particle diameter of 17 μm was obtained. The powder obtained was repeatedly passed through an ASTM 400-mesh sieve five times in order to prevent inclusion of coarse particles. The negative-electrode active material thus obtained is referred to as carbonaceous substance (D).

Carbonaceous substance (A), carbonaceous substance (B), carbonaceous substance (C), and carbonaceous substance (D) produced above were examined for shape and properties by the methods described above. The results obtained are shown in Negative Electrodes [9] and [10] Table 1.

Negative Electrodes [9] and [10] Table 1

TABLE 52

| Negative-electrode active material | Tap density g/cm$^3$ | Pore volume mL/g | Total pore volume mL/g | Volume-average particle diameter μm | Roundness | BET specific surface area m$^2$/g | Raman R value | Raman half-value width cm$^{-1}$ | Inter-planar spacing d002 nm | Crystallite size Lc nm | Ash content % | True density g/cm$^3$ | Aspect ratio |
|---|---|---|---|---|---|---|---|---|---|---|---|---|---|
| Carbonaceous substance (A) | 0.99 | 0.228 | 0.78 | 16.5 | 0.94 | 7.5 | 0.27 | 24.0 | 0.335 | >100 | 0.05 | 2.26 | 1.1 |
| Carbonaceous substance (B) | 1.00 | 0.215 | 0.75 | 17.0 | 0.94 | 5.4 | 0.03 | 20.5 | 0.335 | >100 | 0.02 | 2.26 | 1.1 |
| Carbonaceous substance (C) | 1.08 | 0.203 | 0.68 | 16.5 | 0.93 | 2.7 | 0.35 | 34.0 | 0.336 | >100 | 0.07 | 2.25 | 1.2 |
| Carbonaceous substance (D) | 0.91 | 0.079 | 0.45 | 16.6 | 0.89 | 5.9 | 1.05 | 91.0 | 0.343 | 2.3 | 0.05 | 1.91 | 1.9 |

Negative Electrodes [9] and [10] [Production of Batteries]
<<Positive-Electrode Production 1>>

Ninety percents by mass lithium cobalt oxide (LiCoO$_2$) as a positive-electrode active material was mixed with 5% by mass acetylene black as a conductive material and 5% by mass poly(vinylidene fluoride) (PVdF) as a binder in N-methylpyrrolidone solvent to prepare a slurry. The slurry obtained was applied to each side of an aluminum foil having a thickness of 15 μm and dried. The coated foil was rolled with a pressing machine to a thickness of 80 μm. Pieces each having a positive-electrode active-material layer size with a width of 100 mm and a length of 100 mm and including an uncoated part having a width of 30 mm were cut out of the rolled foil. Thus, positive electrodes were obtained. In the positive electrodes thus obtained, the positive-electrode active-material layers had a density of 2.35 g/cm$^3$.

<<Negative-Electrode Production 1>>

To 98 parts by weight of a negative-electrode active material were added 100 parts by weight of an aqueous dispersion of sodium carboxymethyl cellulose (concentration of sodium carboxymethyl cellulose, 1% by mass) as a thickener and 2 parts by weight of an aqueous dispersion of a styrene/butadiene rubber (concentration of styrene/butadiene rubber, 50% by mass) as a binder. The ingredients were mixed together by means of a disperser to obtain a slurry. The slurry obtained was applied to each side of a rolled copper foil having a thickness of 10 μm as a current collector and dried. The coated foil was rolled with a pressing machine to a thickness of 75 μm. Pieces each having a negative-electrode active-material layer size with a width of 104 mm and a length of 104 mm and including an uncoated part having a width of 30 mm were cut out of the rolled foil. Thus, negative electrodes were obtained.

In the negative electrodes thus obtained, the negative-electrode active-material layers had a density in the range of 1.33-1.36 g/cm$^3$ (shown in the rightmost column in Negative Electrodes [9] and [10] Table 2). As apparent from the above, the content of the styrene/butadiene rubber as a binder for the negative-electrode active-material layers is 1% by mass based on the whole negative-electrode active-material layers. Furthermore, the value of (thickness of the negative-electrode active-material layer on one side)/(thickness of the current collector) is (75 μm)/(10 μm)=7.5.

<<Nonaqueous-Electrolytic-Solution Production 1>>

In a dry argon atmosphere, sufficiently dried lithium hexafluorophosphate (LiPF$_6$) was dissolved in a concentration of 1 mol/L in a mixture of ethylene carbonate (EC), dimethyl carbonate (DMC), and ethyl methyl carbonate (EMC) (volume ratio, 3:3:4). Furthermore, lithium difluorophosphate (LiPO$_2$F$_2$) was added thereto so as to result in a concentration of 0.3% by mass.

<<Nonaqueous-Electrolytic-Solution Production 2>>

In a dry argon atmosphere, sufficiently dried lithium hexafluorophosphate (LiPF$_6$) was dissolved in a concentration of 1 mol/L in a mixture of ethylene carbonate (EC), dimethyl carbonate (DMC), and ethyl methyl carbonate (EMC) (volume ratio, 3:3:4). Furthermore, trimethylsilyl methanesulfonate was added thereto so as to result in a concentration of 0.3% by mass.

<<Nonaqueous-Electrolytic-Solution Production 3>>

In a dry argon atmosphere, sufficiently dried lithium hexafluorophosphate (LiPF$_6$) was dissolved in a concentration of 1 mol/L in a mixture of ethylene carbonate (EC), dimethyl carbonate (DMC), and ethyl methyl carbonate (EMC) (volume ratio, 3:3:4). Furthermore, hexamethylcyclotrisiloxane was added thereto so as to result in a concentration of 0.3% by mass.

<<Nonaqueous-Electrolytic-Solution Production 4>>

In a dry argon atmosphere, sufficiently dried lithium hexafluorophosphate (LiPF$_6$) was dissolved in a concentration of 1 mol/L in a mixture of ethylene carbonate (EC), dimethyl carbonate (DMC), and ethyl methyl carbonate (EMC) (volume ratio, 3:3:4).

<<Battery Production 1>>

Thirty-two positive electrodes and 33 negative electrodes were alternately disposed and superposed together with porous polyethylene sheet separators (thickness, 25 μm) sandwiched between the electrodes. In this operation, each positive electrode was disposed so that the positive-electrode active-material surface was within the range of the opposed negative-electrode active-material surface. The uncoated parts of the positive electrodes were welded together and those of the negative electrodes were welded together. Thus, current collector tabs were produced to obtain an electrode group. This electrode group was packed into a battery can (outer dimensions: 120×110×10 mm). Thereafter, 20 mL of a nonaqueous electrolyte was introduced into the battery can packed with the electrode group and sufficiently infiltrated into the electrodes. This can was sealed to fabricate a prismatic battery. This battery has a rated discharge capacity of about 6 ampere-hours (Ah) and a direct-current resistance component as measured by the 10-kHz alternating-current method of about 5 milliohms (mΩ). The ratio of the total electrode area of the positive electrodes to the overall surface area of the battery case was 20.6.

Negative Electrodes [9] and [10] Example 1

A battery was produced by the method described under <<Battery Production 1>> using the negative electrodes produced in <<Negative-Electrode Production 1>> in which carbonaceous substance (A) was used as the negative-electrode active material and further using the positive electrodes produced in <<Positive-Electrode Production 1>> and the nonaqueous electrolyte produced in <<Nonaqueous-Electrolytic-Solution Production 1>>. This battery was examined by the methods which will be described under <<Battery Evaluation>> given later. The results are shown in Negative Electrodes [9] and [10] Table 2.

Negative Electrodes [9] and [10] Example 2

A battery was produced and evaluated in the same manner as in Negative Electrodes [9] and [10] Example 1, except that the nonaqueous electrolyte used in Negative Electrodes [9] and [10] Example 1 was replaced by the nonaqueous electrolyte produced in <<Nonaqueous-Electrolytic-Solution Production 2>>. The results are shown in Negative Electrodes [9] and [10] Table 2.

Negative Electrodes [9] and [10] Example 3

A battery was produced and evaluated in the same manner as in Negative Electrodes [9] and [10] Example 1, except that the nonaqueous electrolyte used in Negative Electrodes [9] and [10] Example 1 was replaced by the nonaqueous electrolyte produced in <<Nonaqueous-Electrolytic-Solution Production 3>>. The results are shown in Negative Electrodes [9] and [10] Table 2.

Negative Electrodes [9] and [10] Comparative Example 1

A battery was produced and evaluated in the same manner as in Negative Electrodes [9] and [10] Example 1, except that the nonaqueous electrolyte used in Negative Electrodes [9] and [10] Example 1 was replaced by the nonaqueous electrolyte produced in <<Nonaqueous-Electrolytic-Solution Production 4>>. The results are shown in Negative Electrodes [9] and [10] Table 2.

Negative Electrodes [9] and [10] Example 4

A battery was produced and evaluated in the same manner as in Negative Electrodes [9] and [10] Example 1, except that carbonaceous substance (B) was used as the negative-electrode active material in <<Negative-Electrode Production 1>> in Negative Electrodes [9] and [10] Example 1. The results are shown in Negative Electrodes [9] and [10] Table 2.

Negative Electrodes [9] and [10] Example 5

A battery was produced and evaluated in the same manner as in Negative Electrodes [9] and [10] Example 4, except that the nonaqueous electrolyte used in Negative Electrodes [9] and [10] Example 4 was replaced by the nonaqueous electrolyte produced in <<Nonaqueous-Electrolytic-Solution Production 2>>. The results are shown in Negative Electrodes [9] and [10].

Negative Electrodes [9] and [10] Example 6

A battery was produced and evaluated in the same manner as in Negative Electrodes [9] and [10] Example 4, except that the nonaqueous electrolyte used in Negative Electrodes [9] and [10] Example 4 was replaced by the nonaqueous electrolyte produced in <<Nonaqueous-Electrolytic-Solution Production 3>>. The results are shown in Negative Electrodes [9] and [10] Table 2.

Negative Electrodes [9] and [10] Comparative Example 2

A battery was produced and evaluated in the same manner as in Negative Electrodes [9] and [10] Example 4, except that the nonaqueous electrolyte used in Negative Electrodes [9] and [10] Example 4 was replaced by the nonaqueous electrolyte produced in <<Nonaqueous-Electrolytic-Solution Production 4>>. The results are shown in Negative Electrodes [9] and [10] Table 2.

Negative Electrodes [9] and [10] Example 7

A battery was produced and evaluated in the same manner as in Negative Electrodes [9] and [10] Example 1, except that carbonaceous substance (C) was used as the negative-electrode active material in <<Negative-Electrode Production 1>> in Negative Electrodes [9] and [10] Example 1. The results are shown in Negative Electrodes [9] and [10] Table 2.

Negative Electrodes [9] and [10] Example 8

A battery was produced and evaluated in the same manner as in Negative Electrodes [9] and [10] Example 7, except that the nonaqueous electrolyte used in Negative Electrodes [9] and [10] Example 7 was replaced by the nonaqueous electrolyte produced in <<Nonaqueous-Electrolytic-Solution Production 2>>. The results are shown in Negative Electrodes [9] and [10] Table 2.

Negative Electrodes [9] and [10] Example 9

A battery was produced and evaluated in the same manner as in Negative Electrodes [9] and [10] Example 7, except that the nonaqueous electrolyte used in Negative Electrodes [9] and [10] Example 7 was replaced by the nonaqueous electrolyte produced in <<Nonaqueous-Electrolytic-Solution Production 3>>. The results are shown in Negative Electrodes [9] and [10] Table 2.

Negative Electrodes [9] and [10] Comparative Example 3

A battery was produced and evaluated in the same manner as in Negative Electrodes [9] and [10] Example 7, except that the nonaqueous electrolyte used in Negative Electrodes [9] and [10] Example 7 was replaced by the nonaqueous electrolyte produced in <<Nonaqueous-Electrolytic-Solution Production 4>>. The results are shown in Negative Electrodes [9] and [10] Table 2.

Negative Electrodes [9] and [10] Example 10

A battery was produced and evaluated in the same manner as in Negative Electrodes [9] and [10] Example 1, except that carbonaceous substance (D) was used as the negative-electrode active material in <<Negative-Electrode Production 1>> in Negative Electrodes [9] and [10] Example 1. The results are shown in Negative Electrodes [9] and [10] Table 2.

Negative Electrodes [9] and [10] Example 11

A battery was produced and evaluated in the same manner as in Negative Electrodes [9] and [10] Example 10, except that the nonaqueous electrolyte used in Negative Electrodes [9] and [10] Example 10 was replaced by the nonaqueous electrolyte produced in <<Nonaqueous-Electrolytic-Solution Production 2>>. The results are shown in Negative Electrodes [9] and [10] Table 2.

Negative Electrodes [9] and [10] Example 12

A battery was produced and evaluated in the same manner as in Negative Electrodes [9] and [10] Example 10, except that the nonaqueous electrolyte used in Negative Electrodes [9] and [10] Example 10 was replaced by the nonaqueous electrolyte produced in <<Nonaqueous-Electrolytic-Solution Production 3>>. The results are shown in Negative Electrodes [9] and [10] Table 2.

Negative Electrodes [9] and [10] Comparative Example 4

A battery was produced and evaluated in the same manner as in Negative Electrodes [9] and [10] Example 10, except that the nonaqueous electrolyte used in Negative Electrodes [9] and [10] Example 10 was replaced by the nonaqueous electrolyte produced in <<Nonaqueous-Electrolytic-Solution Production 4>>. The results are shown in Negative Electrodes [9] and [10] Table 2.
Negative Electrodes [9] and [10]<<Battery Evaluation>>
(Capacity Measurement)
The battery which had undergone no charge/discharge cycling was subjected to 5 cycles of initial charge/discharge at 25° C. in a voltage range of 4.2-3.0 V at a current of 0.2 C (the value of current at which the rated capacity based on 1-hour-rate discharge capacity is discharged over 1 hour is taken as 1 C; the same applies hereinafter). The 0.2-C discharge capacity thereof as measured in the fifth cycle in this operation was taken as initial capacity. An output measurement shown below was then made.
(Output Measurement)
In a 25° C. environment, the battery was charged for 150 minutes at a constant current of 0.2 C and then discharged for 10 seconds at each of 0.1 C, 0.3 C, 1.0 C, 3.0 C, and 10.0 C. The voltage was measured at 10 seconds after the discharge initiation. The area of the triangle surrounded by the resultant current-voltage straight line and the final lower voltage (3 V) was taken as output (W). The output as measured before the cycle test is referred to as "initial output".
(Cycle Test)
The battery was subjected to a cycle test in a high-temperature environment of 60° C., which is regarded as the upper-limit temperature for the actual use of lithium secondary batteries. The battery was charged by the constant-current constant-voltage method at 2 C to a final charge voltage of 4.2 V and then discharged at a constant current of 2 C to a final discharge voltage of 3.0 V. This charge/discharge operation as one cycle was repeated to conduct 500 cycles in total. The battery which had undergone the cycle test was subjected to 3 cycles of charge/discharge in a 25° C. environment. The 0.2-C discharge capacity thereof as measured in the third cycle was taken as capacity after cycle test. Using the following calculation formula, the capacity retention through cycling was determined from the initial capacity measured prior to the cycle test and the capacity after cycle test measured after completion of the cycle test.

Capacity retention through cycling (%)=100×(capacity after cycle test)/(initial capacity)

Impedance Rct and double-layer capacity Cdl in Negative Electrodes [9] and [10] Table 2 are parameters contributing to output. The smaller the value of impedance Rct and the larger the value of double-layer capacity Cdl, the more the output tends to improve. Incidentally, "Impedance Rct" and "Double-layer capacity Cdl" were determined by the methods described hereinabove under "Impedance".

The battery which had undergone the cycle test was subjected to the output measurement described under (Output Measurement), and the value obtained is referred to as "output after cycle test". With respect to the lithium secondary batteries obtained in the Negative Electrodes [9] and [10] Examples and Negative Electrodes [9] and [10] Comparative Examples given above, the results of the output measurement, results of the capacity measurement, capacity retentions through cycling, and results of reaction resistance and double-layer capacity measurement in the opposing impedance measurement are summarized in Negative Electrodes [9] and [10] Table 2.
Negative Electrodes [9] and [10] Table 2

TABLE 53

| No. | Negative-electrode active material | Specific compound | Initial capacity mAh | Initial output W | Output after cycling W | Capacity retention through cycling % | Impedance Rct Reacion resistance Ω | Impedance Cdl Double-layer capacity ×10⁻⁴ F | Double of negative-electrode active-material layer g/cm³ |
|---|---|---|---|---|---|---|---|---|---|
| Ex. 1 | Carbonaceous substance (A) | lithium difluorophosphate | 6021 | 558 | 398 | 82 | 9.0 | 1.5 | 1.36 |
| Ex. 2 | Carbonaceous substance (A) | trimethylsilyl methanesulfonate | 6022 | 545 | 384 | 82 | 9.5 | 1.4 | 1.36 |
| Ex. 3 | Carbonaceous substance (A) | hexamethylcyclo-trisiloxane | 6020 | 531 | 375 | 81 | 10.8 | 1.4 | 1.36 |
| Comp. Ex. 1 | Carbonaceous substance (A) | — | 6099 | 486 | 290 | 78 | 12.1 | 1.3 | 1.36 |
| Ex. 4 | Carbonaceous substance (B) | lithium difluorophosphate | 6032 | 551 | 350 | 81 | 10.4 | 1.5 | 1.35 |
| Ex. 5 | Carbonaceous substance (B) | trimethylsilyl methanesulfonate | 6021 | 525 | 332 | 79 | 10.8 | 1.4 | 1.35 |
| Ex. 6 | Carbonaceous substance (B) | hexamethylcyclo-trisiloxane | 6112 | 524 | 315 | 78 | 10.8 | 1.4 | 1.35 |
| Comp. Ex. 2 | Carbonaceous substance (B) | — | 6099 | 469 | 275 | 71 | 12.3 | 1.5 | 1.35 |
| Ex. 7 | Carbonaceous substance (C) | lithium difluorophosphate | 5998 | 570 | 445 | 85 | 16.4 | 1.2 | 1.36 |

TABLE 53-continued

| No. | Negative-electrode active material | Specific compound | Initial capacity mAh | Initial output W | Output after cycling W | Capacity retention through cycling % | Impedance Rct Reacion resistance Ω | Impedance Cdl Double-layer capacity ×10⁻⁴ F | Double of negative-electrode active-material layer g/cm³ |
|---|---|---|---|---|---|---|---|---|---|
| Ex. 8 | Carbonaceous substance (C) | trimethylsilyl methanesulfonate | 6021 | 564 | 423 | 83 | 17.8 | 1.1 | 1.36 |
| Ex. 9 | Carbonaceous substance (C) | hexamethylcyclo-trisiloxane | 6070 | 554 | 418 | 82 | 15.6 | 1.2 | 1.36 |
| Comp. Ex. 3 | Carbonaceous substance (C) | — | 5989 | 507 | 340 | 79 | 19.4 | 1.1 | 1.36 |
| Ex. 10 | Carbonaceous substance (D) | lithium difluorophosphate | 5991 | 546 | 346 | 77 | 32.0 | 0.9 | 1.33 |
| Ex. 11 | Carbonaceous substance (D) | trimethylsilyl methanesulfonate | 5987 | 557 | 337 | 76 | 41.0 | 0.8 | 1.33 |
| Ex. 12 | Carbonaceous substance (D) | hexamethylcyclo-trisiloxane | 5982 | 541 | 335 | 76 | 34.2 | 0.9 | 1.33 |
| Comp. Ex. 4 | Carbonaceous substance (D) | — | 5889 | 521 | 287 | 73 | 48.0 | 0.7 | 1.33 |

The results given in Negative Electrodes [9] and [10] Table 2 show the following. A lithium secondary battery which, even when large, can attain a high output after cycling and a high capacity retention through cycling and has both a high output and a long life can be provided by using a nonaqueous electrolyte containing the specific compound, e.g., lithium difluorophosphate, trimethylsilyl methanesulfonate, or hexamethylcyclotrisiloxane, and by using a negative electrode containing a negative-electrode active material which has a tap density of 0.1 or higher and a pore volume, in terms of the volume of pores in the range of from 0.01 μm to 1 μm as determined by mercury porosimetry, of 0.01 mL/g or larger.

It was further found that the lithium secondary batteries which employ a nonaqueous electrolyte containing the specific compound and satisfy the requirement that the reaction resistance in a negative-electrode opposing cell is 500Ω or lower can attain a high output after cycling and a high capacity retention through cycling and have both a high output and a satisfactory life, even when large.

Electrolytic Solution [1]<Secondary-Battery Production>
[Production of Positive Electrode]

Ninety percents by mass lithium cobalt oxide (LiCoO$_2$) as a positive-electrode active material was mixed with 5% by mass acetylene black as a conductive material and 5% by mass poly(vinylidene fluoride) (PVdF) as a binder in N-methylpyrrolidone solvent to prepare a slurry. The slurry obtained was applied to each side of an aluminum foil having a thickness of 15 μm and dried. The coated foil was rolled with a pressing machine to a thickness of 80 μm. Pieces each having an active-material layer size with a width of 100 mm and a length of 100 mm and including an uncoated part having a width of 30 mm were cut out of the rolled foil. Thus, positive electrodes were obtained.

[Production of Negative Electrode]

To 98 parts by weight of artificial graphite powder KS-44 (trade name; manufactured by Timcal) were added 100 parts by weight of an aqueous dispersion of sodium carboxymethyl cellulose (concentration of sodium carboxymethyl cellulose, 1% by mass) as a thickener and 2 parts by weight of an aqueous dispersion of a styrene/butadiene rubber (concentration of styrene/butadiene rubber, 50% by mass) as a binder. The ingredients were mixed together by means of a disperser to obtain a slurry. The slurry obtained was applied to each side of a copper foil having a thickness of 10 μm and dried. The coated foil was rolled with a pressing machine to a thickness of 75 μm. Pieces each having an active-material layer size with a width of 104 mm and a length of 104 mm and including an uncoated part having a width of 30 mm were cut out of the rolled foil. Thus, negative electrodes were obtained.

[Battery Fabrication]

Thirty-two positive electrodes and 33 negative electrodes were alternately disposed and superposed together with porous polyethylene sheet separators (thickness, 25 μm) sandwiched between the electrodes. In this operation, each positive electrode was disposed so that the positive-electrode active-material surface was within the range of the opposed negative-electrode active-material surface. The uncoated parts of the positive electrodes were welded together and those of the negative electrodes were welded together. Thus, current collector tabs were produced to obtain an electrode group. This electrode group was packed into a battery can (outer dimensions: 120×110×10 mm). Thereafter, 20 mL of a nonaqueous electrolyte was introduced into the battery can packed with the electrode group and sufficiently infiltrated into the electrodes. This can was sealed to fabricate a prismatic battery. This battery has a rated discharge capacity of about 6 Ah and a direct-current resistance as measured by the 10-kHz alternating-current method of about 5 milliohms.

[Battery Evaluation]

(Method of Measuring Initial Capacity)

The fresh battery which had undergone no charge/discharge was subjected to 5 cycles of initial charge/discharge at 25° C. in a voltage range of 4.1-3.0 V at 25° C. (voltage range, 4.1-3.0 V). The 0.2-C (the value of current at which the rated capacity based on 1-hour-rate discharge capacity is discharged over 1 hour is taken as 1 C; the same applies hereinafter) discharge capacity thereof as measured in the fifth cycle in this operation was taken as initial capacity.

(Method of Measuring Low-Temperature Output)

In a 25° C. environment, the battery was charged for 150 minutes at a constant current of 0.2 C. This battery was discharged in a −30° C. environment for 10 seconds at each of 0.1 C, 0.3 C, 1.0 C, 3.0 C, and 5.0 C. The voltage was measured at 10 seconds after the discharge initiation. The area of the triangle surrounded by the resultant current-voltage straight line and the final lower voltage (3 V) was taken as output (W).

Electrolytic Solution [1] Example 1

In a dry argon atmosphere, lithium hexafluorophosphate (LiPF$_6$) was added to and dissolved in a mixture of ethylene carbonate (EC) and ethyl methyl carbonate (EMC) (volume ratio, 15:85) in such an amount as to result in a concentration of 1 mol/L. Hexamethylcyclotrisiloxane was mixed with this solution in such an amount as to result in a concentration of 0.3% by mass. Thus, a nonaqueous electrolyte was prepared. This nonaqueous electrolyte was used to produce a battery by the method described above. The battery was examined for low-temperature output. The results are shown in Electrolytic Solution [1] Table 1.

Electrolytic Solution [1] Example 2

In Electrolytic Solution [1] Example 1, a nonaqueous electrolyte was prepared using EC and EMC in a volume ratio of 20:80 and this nonaqueous electrolyte was used to produce a battery. This battery was examined for low-temperature output. The results are shown in Electrolytic Solution [1] Table 1.

Electrolytic Solution [1] Example 3

In Electrolytic Solution [1] Example 1, a nonaqueous electrolyte was prepared using a mixture of EC, dimethyl carbonate (DMC), and EMC (volume ratio, 15:40:45) in place of that nonaqueous solvent and this nonaqueous electrolyte was used to produce a battery. This battery was examined for low-temperature output. The results are shown in Electrolytic Solution [1] Table 1.

Electrolytic Solution [1] Example 4

In Electrolytic Solution [1] Example 1, phenyldimethylfluorosilane was mixed in place of the hexamethylcyclotrisiloxane and the nonaqueous electrolyte thus prepared was used to produce a battery. This battery was examined for low-temperature output. The results are shown in Electrolytic Solution [1] Table 1.

Electrolytic Solution [1] Example 5

In Electrolytic Solution [1] Example 1, hexamethyldisiloxane was mixed in place of the hexamethylcyclotrisiloxane and the nonaqueous electrolyte thus prepared was used to produce a battery. This battery was examined for low-temperature output. The results are shown in Electrolytic Solution [1] Table 1.

Electrolytic Solution [1] Example 6

In Electrolytic Solution [1] Example 1, trimethylsilyl methanesulfonate was mixed in place of the hexamethylcyclotrisiloxane and the nonaqueous electrolyte thus prepared was used to produce a battery. This battery was examined for low-temperature output. The results are shown in Electrolytic Solution [1] Table 1.

Electrolytic Solution [1] Example 7

In Electrolytic Solution [1] Example 1, methyl fluorosulfonate was mixed in place of the hexamethylcyclotrisiloxane and the nonaqueous electrolyte thus prepared was used to produce a battery. This battery was examined for low-temperature output. The results are shown in Electrolytic Solution [1] Table 1.

Electrolytic Solution [1] Example 8

In Electrolytic Solution [1] Example 1, lithium nitrate was mixed in place of the hexamethylcyclotrisiloxane and the nonaqueous electrolyte thus prepared was stored for 3 days and then used to produce a battery. This battery was examined for low-temperature output. The results are shown in Electrolytic Solution [1] Table 1.

Electrolytic Solution [1] Example 9

In Electrolytic Solution [1] Example 1, a nonaqueous electrolyte containing lithium difluorophosphate produced by the method described in *Inorganic Nuclear Chemistry Letters* (1969), 5(7), pp. 581-582 in place of the hexamethylcyclotrisiloxane was used to produce a battery. This battery was examined for low-temperature output. The results are shown in Electrolytic Solution [1] Table 1.

Electrolytic Solution [1] Example 10

In Electrolytic Solution [1] Example 9, the amount of the lithium difluorophosphate to be mixed was changed to 0.08% by mass based on the solution prepared by mixing the nonaqueous solvent and the lithium hexafluorophosphate. The nonaqueous electrolyte thus prepared was used to produce a battery. This battery was examined for low-temperature output. The results are shown in Electrolytic Solution [1] Table 1.

Electrolytic Solution [1] Example 11

In Electrolytic Solution [1] Example 1, lithium acetate was mixed in place of the hexamethylcyclotrisiloxane and the nonaqueous electrolyte thus prepared was stored for 3 days and then used to produce a battery. This battery was examined for low-temperature output. The results are shown in Electrolytic Solution [1] Table 1.

Electrolytic Solution [1] Example 12

<Secondary-Battery Production 2>
[Production of Positive Electrode]

Ninety percents by mass lithium cobalt oxide (LiCoO$_2$) as a positive-electrode active material was mixed with 5% by mass acetylene black as a conductive material and 5% by mass poly(vinylidene fluoride) (PVdF) as a binder in N-methylpyrrolidone solvent to prepare a slurry. The slurry obtained was applied to each side of an aluminum foil having a thickness of 20 μm and dried. The coated foil was rolled with a pressing machine to a thickness of 80 μm. A strip having a width of 52 mm and a length of 830 mm was cut out of the rolled foil to obtain a positive electrode. This positive electrode had a 50-mm uncoated part extending in the lengthwise direction on each of the front and back sides, and the active-material layer had a length of 780 mm.

[Production of Negative Electrode]

To 98 parts by weight of artificial graphite powder KS-44 (trade name; manufactured by Timcal) were added 100 parts by weight of an aqueous dispersion of sodium carboxymethyl cellulose (concentration of sodium carboxymethyl cellulose, 1% by mass) as a thickener and 2 parts by weight of an aqueous dispersion of a styrene/butadiene rubber (concentration of styrene/butadiene rubber, 50% by mass) as a binder. The ingredients were mixed together by means of a disperser to obtain a slurry. The slurry obtained was evenly applied to each side of a copper foil having a thickness of 18

μm as a negative-electrode current collector and dried. The coated foil was rolled with a pressing machine to a thickness of 85 μm. A strip having a width of 56 mm and a length of 850 mm was cut out of the rolled foil to obtain a negative electrode. This negative electrode had a 30-mm uncoated part extending in the lengthwise direction on each of the front and back sides.

[Production of Electrolytic Solution]

The same nonaqueous electrolyte as in Electrolytic Solution [1] Example 1 was produced.

[Battery Fabrication]

The positive electrode and the negative electrode were superposed and wound together with polyethylene separators so as to prevent the positive electrode and the negative electrode from coming into direct contact with each other to thereby obtain an electrode roll. This electrode roll was packed into a battery can so that the terminal of the positive electrode and that of the negative electrode protruded outward.

Subsequently, 5 mL of the electrolyte described later was introduced into the battery can, which was then caulked. Thus, a 18650 type cylindrical battery was produced. This battery had a rated discharge capacity of about 0.7 ampere-hours (Ah) and a direct-current resistance as measured by the 10-kHz alternating-current method of about 35 milliohms (mΩ). The overall electrode area of the positive electrode is 19.4 times the surface area of the case of this secondary battery. This battery was examined for low-temperature output in the same manner as in Electrolytic Solution [1] Example 1. The results are shown in Electrolytic Solution [1] Table 1.

Electrolytic Solution [1] Comparative Example 1

In Electrolytic Solution [1] Example 1, a nonaqueous electrolyte was prepared without mixing hexamethylcyclotrisiloxane and this nonaqueous electrolyte was used to produce a battery. This battery was examined for low-temperature output. The results are shown in Electrolytic Solution [1] Table 1.

Electrolytic Solution [1] Comparative Example 2

In Electrolytic Solution [1] Example 2, a nonaqueous electrolyte was prepared without mixing hexamethylcyclotrisiloxane and this nonaqueous electrolyte was used to produce a battery. This battery was examined for low-temperature output. The results are shown in Electrolytic Solution [1] Table 1.

Electrolytic Solution [1] Comparative Example 3

In Electrolytic Solution [1] Example 3, a nonaqueous electrolyte was prepared without mixing hexamethylcyclotrisiloxane and this nonaqueous electrolyte was used to produce a battery. This battery was examined for low-temperature output. The results are shown in Electrolytic Solution [1] Table 1.

Electrolytic Solution [1] Comparative Example 4

In a dry argon atmosphere, lithium hexafluorophosphate (LiPF$_6$) was added to and dissolved in a mixture of ethylene carbonate and ethyl methyl carbonate (volume ratio, 4:6) in such an amount as to result in a concentration of 1 mol/L. Hexamethylcyclotrisiloxane was mixed with this solution in such an amount as to result in a concentration of 0.3% by mass. Thus, a nonaqueous electrolyte was prepared.

This nonaqueous electrolyte was used to produce a battery. The battery was examined for low-temperature output. The results are shown in Electrolytic Solution [1] Table 1.

Electrolytic Solution [1] Comparative Example 5

In Electrolytic Solution [1] Comparative Example 4, phenyldimethylfluorosilane was mixed in place of the hexamethylcyclotrisiloxane and the nonaqueous electrolyte thus prepared was used to produce a battery. This battery was examined for low-temperature output. The results are shown in Electrolytic Solution [1] Table 1.

Electrolytic Solution [1] Comparative Example 6

In Electrolytic Solution [1] Comparative Example 4, hexamethyldisiloxane was mixed in place of the hexamethylcyclotrisiloxane and the nonaqueous electrolyte thus prepared was used to produce a battery. This battery was examined for low-temperature output. The results are shown in Electrolytic Solution [1] Table 1.

Electrolytic Solution [1] Comparative Example 7

In Electrolytic Solution [1] Comparative Example 4, trimethylsilyl methanesulfonate was mixed in place of the hexamethylcyclotrisiloxane and the nonaqueous electrolyte thus prepared was used to produce a battery. This battery was examined for low-temperature output. The results are shown in Electrolytic Solution [1] Table 1.

Electrolytic Solution [1] Comparative Example 8

In Electrolytic Solution [1] Comparative Example 4, methyl fluorosulfonate was mixed in place of the hexamethylcyclotrisiloxane and the nonaqueous electrolyte thus prepared was used to produce a battery. This battery was examined for low-temperature output. The results are shown in Electrolytic Solution [1] Table 1.

Electrolytic Solution [1] Comparative Example 9

In Electrolytic Solution [1] Comparative Example 4, lithium nitrate was mixed in place of the hexamethylcyclotrisiloxane and the nonaqueous electrolyte thus prepared was stored for 3 days and then used to produce a battery. This battery was examined for low-temperature output. The results are shown in Electrolytic Solution [1] Table 1.

Electrolytic Solution [1] Comparative Example 10

In Electrolytic Solution [1] Comparative Example 4, lithium difluorophosphate was mixed in place of the hexamethylcyclotrisiloxane and the nonaqueous electrolyte thus prepared was used to produce a battery. This battery was examined for low-temperature output. The results are shown in Electrolytic Solution [1] Table 1.

Electrolytic Solution [1] Comparative Example 11

In Electrolytic Solution [1] Comparative Example 4, lithium acetate was mixed in place of the hexamethylcyclotrisiloxane and the nonaqueous electrolyte thus prepared was stored for 3 days and then used to produce a battery. This battery was examined for low-temperature output. The results are shown in Electrolytic Solution [1] Table 1.

Electrolytic Solution [1] Comparative Example 12

In Electrolytic Solution [1] Comparative Example 4, a nonaqueous electrolyte was prepared without mixing hexamethylcyclotrisiloxane and this nonaqueous electrolyte was used to produce a battery. This battery was examined for low-temperature output. The results are shown in Electrolytic Solution [1] Table 1.

Electrolytic Solution [1] Comparative Example 13

In Electrolytic Solution [1] Example 12, the same nonaqueous electrolyte as in Electrolytic Solution [1] Comparative Example 1 was used to produce a battery. This battery was examined for low-temperature output. The results are shown in Electrolytic Solution [1] Table 1.

Electrolytic Solution [1] Table 1

TABLE 54

|   | Solvent | Proportion of EC (vol %) | Compound contained | Low-temperature output (W) | Remarks |
|---|---|---|---|---|---|
| Example 1 | EC:EMC | 15 | hexamethylcyclotrisiloxane | 20.1 | 26.4% increase based on Comparative Example 1 |
| Example 2 | EC:EMC | 20 | hexamethylcyclotrisiloxane | 19.9 | 25.9% increase based on Comparative Example 2 |
| Example 3 | EC:DMC:EMC | 15 | hexamethylcyclotrisiloxane | 20.5 | 27.3% increase based on Comparative Example 3 |
| Example 4 | EC:EMC | 15 | phenyldimethylfluorosilane | 19.8 | 24.5% increase based on Comparative Example 1 |
| Example 5 | EC:EMC | 15 | hexamethyldisiloxane | 20.2 | 27.0% increase based on Comparative Example 1 |
| Example 6 | EC:EMC | 15 | trimethylsilyl methanesulfonate | 20.4 | 28.3% increase based on Comparative Example 1 |
| Example 7 | EC:EMC | 15 | methyl fluorosulfonate | 19.8 | 24.5% increase based on Comparative Example 1 |
| Example 8 | EC:EMC | 15 | lithium nitrate | 20.0 | 25.8% increase based on Comparative Example 1 |
| Example 9 | EC:EMC | 15 | lithium difluorophosphate (0.3%) | 20.8 | 30.8% increase based on Comparative Example 1 |
| Example 10 | EC:EMC | 15 | lithium difluorophosphate (0.08%) | 19.0 | 19.5% increase based on Comparative Example 1 |
| Example 11 | EC:EMC | 15 | lithium acetate | 19.9 | 25.2% increase based on Comparative Example 1 |
| Example 12 | EC:EMC | 15 | hexamethylcyclotrisiloxane | 1.86 | 20.8% increase based on Comparative Example 13 |
| Comparative Example 1 | EC:EMC | 15 | none | 15.9 | |
| Comparative Example 2 | EC:EMC | 20 | none | 15.8 | |
| Comparative Example 3 | EC:DMC:EMC | 15 | none | 16.1 | |
| Comparative Example 4 | EC:EMC | 40 | hexamethylcyclotrisiloxane | 17.6 | 15.0% increase based on Comparative Example 12 |
| Comparative Example 5 | EC:EMC | 40 | phenyldimethylfluorosilane | 17.5 | 14.4% increase based on Comparative Example 12 |
| Comparative Example 6 | EC:EMC | 40 | hexamethyldisiloxane | 17.6 | 15.0% increase based on Comparative Example 12 |
| Comparative Example 7 | EC:EMC | 40 | trimethylsilyl methanesulfonate | 17.8 | 16.3% increase based on Comparative Example 12 |
| Comparative Example 8 | EC:EMC | 40 | methyl fluorosulfonate | 17.5 | 14.4% increase based on Comparative Example 12 |
| Comparative Example 9 | EC:EMC | 40 | lithium nitrate | 17.7 | 15.7% increase based on Comparative Example 12 |
| Comparative Example 10 | EC:EMC | 40 | lithium difluorophosphate | 17.9 | 17.0% increase based on Comparative Example 12 |
| Comparative Example 11 | EC:EMC | 40 | lithium acetate | 17.6 | 15.0% increase based on Comparative Example 12 |
| Comparative Example 12 | EC:EMC | 40 | none | 15.3 | |
| Comparative Example 13 | EC:EMC | 15 | none | 1.54 | |

Electrolytic Solution [1] Table 1 shows the following. The lithium secondary batteries of Electrolytic Solution [1]

Examples 1 to 11, in each of which the nonaqueous electrolyte contains a specific amount of EC and the specific compound, have improved low-temperature output characteristics as compared not only with the lithium secondary battery of Electrolytic Solution [1] Comparative Example 12, in which the electrolyte contains excess EC and does not contain the specific compound, but also with the lithium secondary batteries of Electrolytic Solution [1] Comparative Examples 1 to 3, in which the electrolytes contain EC in an amount in a specific range but do not contain the specific compound, and the lithium secondary batteries of Electrolytic Solution [1] Comparative Examples 4 to 11, in which the electrolytes contain the specific compound but contain excess EC. It was further found that the lithium secondary battery of Electrolytic Solution [1] Example 12, in which the nonaqueous electrolyte contains a specific amount of EC and the specific compound, has improved low-temperature output characteristics as compared with the lithium secondary battery of Electrolytic Solution [1] Comparative Example 13, in which the electrolyte has an EC amount in the specific range but does not contain the specific compound.

That effect is not a mere addition of effects to be brought about by the two requirements. When both of the two requirements are satisfied, the effects thereof are clearly amplified. Electrolytic Solution [1] Table 1 includes the percentage increase in low-temperature output of each battery employing a nonaqueous electrolyte containing the specific compound based on a battery employing a nonaqueous electrolyte which does not contain the specific compound (and which, except this, has the same composition). The values of that percentage increase for Electrolytic Solution [1] Examples 1 to 12 are larger than for Electrolytic Solution [1] Comparative Examples 4 to 11, in which the EC amount is excessively large, indicating that the effect of this invention is high.

The percentage increase in output for Electrolytic Solution [1] Example 12 based on the battery of Electrolytic Solution [1] Comparative Example 13 is 20.8%. On the other hand, in the case of Electrolytic Solution [1] Example 1 and Comparative Example 1, which have a different battery structure although employing the same materials, the percentage increase in output for Electrolytic Solution [1] Example 1 based on the battery of Electrolytic Solution [1] Comparative Example 1 is 26.4%. This indicates that battery structure influences the degree of the effect of the nonaqueous electrolyte according to the invention. Namely, the effect of this invention is high especially in high-capacity batteries and in batteries having a low direct-current resistance.

Furthermore, although not shown in the table, a battery employing an electrolyte having an EC content lower than 1% by volume had a slightly lower initial capacity than the battery of Electrolytic Solution [1] Example 1. This battery was poor in output characteristics at ordinary temperature and in cycle characteristics.

As described above, it has become possible to impart exceedingly high low-temperature output characteristics by using the nonaqueous electrolyte according to this invention, i.e., a nonaqueous electrolyte for secondary battery which is characterized by employing as the nonaqueous solvent a mixed solvent at least containing ethylene carbonate, the proportion of the ethylene carbonate to the whole nonaqueous solvent being from 1% by volume to 25% by volume, and by containing at least one compound selected from the group consisting of cyclic siloxane compounds represented by general formula (1), fluorosilane compounds represented by general formula (2), compounds represented by general formula (3), compounds having an S—F bond in the molecule, nitric acid salts, nitrous acid salts, monofluorophosphoric acid salts, difluorophosphoric acid salts, acetic acid salts, and propionic acid salts in an amount of 10 ppm or more of the whole nonaqueous electrolyte.

Furthermore, it has become possible that such effect can be more remarkably produced in battery structures such as that of Electrolytic Solution [1] Example 1, i.e., high-capacity batteries and batteries having a low direct-current resistance, than in battery structures such as that of Electrolytic Solution [1] Example 12.

Electrolytic Solution [2]<Secondary-Battery Production 1>
[Production of Positive Electrode]

Ninety percents by mass lithium cobalt oxide ($LiCoO_2$) as a positive-electrode active material was mixed with 5% by mass acetylene black as a conductive material and 5% by mass poly(vinylidene fluoride) (PVdF) as a binder in N-methylpyrrolidone solvent to prepare a slurry. The slurry obtained was applied to each side of an aluminum foil having a thickness of 20 μm and dried. The coated foil was rolled with a pressing machine to a thickness of 80 μm. A strip having a width of 52 mm and a length of 830 mm was cut out of the rolled foil to obtain a positive electrode. This positive electrode had a 50-mm uncoated part extending in the lengthwise direction on each of the front and back sides, and the active-material layer had a length of 780 mm.

[Production of Negative Electrode]

To 98 parts by weight of artificial graphite powder KS-44 (trade name; manufactured by Timcal) were added 100 parts by weight of an aqueous dispersion of sodium carboxymethyl cellulose (concentration of sodium carboxymethyl cellulose, 1% by mass) as a thickener and 2 parts by weight of an aqueous dispersion of a styrene/butadiene rubber (concentration of styrene/butadiene rubber, 50% by mass) as a binder. The ingredients were mixed together by means of a disperser to obtain a slurry. The slurry obtained was evenly applied to each side of a copper foil having a thickness of 18 μm as a negative-electrode current collector and dried. The coated foil was rolled with a pressing machine to a thickness of 85 μm. A strip having a width of 56 mm and a length of 850 mm was cut out of the rolled foil to obtain a negative electrode. This negative electrode had a 30-mm uncoated part extending in the lengthwise direction on each of the front and back sides.

[Battery Fabrication]

The positive electrode and the negative electrode were superposed and wound together with polyethylene separators so as to prevent the positive electrode and the negative electrode from coming into direct contact with each other to thereby obtain an electrode roll. This electrode roll was packed into a battery can so that the terminal of the positive electrode and that of the negative electrode protruded outward. Subsequently, 5 mL of the electrolyte which will be described later was introduced into the battery can, which was then caulked. Thus, a 18650 type cylindrical battery was produced. The electric capacity of the battery elements held in one battery case of this secondary battery, i.e., the rated discharge capacity of this battery, was about 0.7 ampere-hours (Ah). This battery had a direct-current resistance component as measured by the 10-kHz alternating-current method of about 35 milliohms (mΩ).

[Battery Evaluation]
(Initial Charge/Discharge)

At 25° C., the battery produced was charged to 4.2 V by the constant-current constant-voltage charging method at 0.2 C and then discharged to 3.0 V at a constant current of 0.2 C. This operation as one cycle was repeated to conducted 5 cycles and thereby stabilize the battery. The discharge capacity thereof as measured in the fifth cycle was taken as initial capacity. Incidentally, the value of current at which the rated capacity based on 1-hour-rate discharge capacity is discharged over 1 hour is taken as 1 C.

(Cycle Test)

At 60° C., the battery which had undergone the initial charge/discharge was charged to 4.2 V by the constant-current constant-voltage method at 1 C and then discharged to 3.0 V at a constant current of 1 C. This charge/discharge operation as one cycle was repeated to conduct 500 cycles. The proportion of the discharge capacity of the battery as measured in the 500th cycle to the discharge capacity thereof as measured in the first cycle was taken as capacity retention through cycling.

(Low-Temperature Test)

The battery which had undergone the initial charge/discharge was charged at 25° C. to 4.2 V by the constant-current constant-voltage charging method at 0.2 C and then discharged at −30° C. at a constant current of 0.2 C. The discharge capacity thereof as measured in this discharge was taken as initial low-temperature capacity. The proportion of the initial low-temperature capacity to the initial capacity was taken as proportion of initial low-temperature discharge.

Furthermore, at 25° C., the battery which had undergone the cycle test was charged to 4.2 V by the constant-current constant-voltage charging method at 0.2 C and then discharged to 3.0 V at a constant current of 0.2 C. This operation as one cycle was repeated to conduct 3 cycles. The discharge capacity thereof as measured in the third cycle was taken as capacity after cycling. Thereafter, the same battery was charged at 25° C. to 4.2 V by the constant-current constant-voltage charging method at 0.2 C and then discharged at −30° C. at a constant current of 0.2 C. The discharge capacity thereof as measured in this discharge was taken as low-temperature capacity after cycling. The proportion of the low-temperature capacity after cycling to the capacity after cycling was taken as proportion of low-temperature discharge after cycling.

Electrolytic Solution [2] Example 1

In a dry argon atmosphere, lithium hexafluorophosphate (LiPF$_6$) was added to and dissolved in a mixture of ethylene carbonate (EC), ethyl methyl carbonate (EMC), and diethyl carbonate (DEC) (volume ratio, 2:4:4) in such an amount as to result in a concentration of 0.9 mol/L. Lithium difluorophosphate produced by the method described in *Inorganic Nuclear Chemistry Letters* (1969), 5(7), pp. 581-582 was incorporated into that solution in such an amount as to result in a concentration of 0.3% by mass. Thus, a nonaqueous electrolyte was prepared. This nonaqueous electrolyte was used to produce a 18650 type cylindrical battery. The battery was examined for capacity retention through cycling and proportions of low-temperature discharge. The results are shown in Electrolytic Solution [2] Table 1. Incidentally, the electrolyte was recovered with a centrifugal separator from the battery which had undergone the measurement of low-temperature capacity after cycling, and subjected to trans-esterification reaction. The amount of the dimethyl carbonate (DMC) yielded by the reaction was determined by gas chromatography (GC) and, as a result, was found to be 0.5% by mass based on the electrolyte.

Electrolytic Solution [2] Comparative Example 1

A 18650 type cylindrical battery was produced in the same manner as in Electrolytic Solution [2] Example 1, except that lithium difluorophosphate was not incorporated. This battery was examined for capacity retention through cycling and proportions of low-temperature discharge in the same manners. The results are shown in Electrolytic Solution [2] Table 1. Incidentally, the electrolyte was recovered with a centrifugal separator from the battery which had undergone the measurement of low-temperature capacity after cycling, and subjected to transesterification reaction. The amount of the dimethyl carbonate (DMC) yielded by the reaction was determined by gas chromatography (GC) and, as a result, was found to be 9.7% by mass based on the electrolyte.

Electrolytic Solution [2] Comparative Example 2

In a dry argon atmosphere, lithium hexafluorophosphate (LiPF$_6$) was added to and dissolved in a mixture of ethylene carbonate (EC) and diethyl carbonate (DEC) (volume ratio, 2:8) in such an amount as to result in a concentration of 0.9 mol/L. Lithium difluorophosphate was incorporated into this solution in such an amount as to result in a concentration of 0.3% by mass. Thus, a nonaqueous electrolyte was prepared. This nonaqueous electrolyte was used to produce a 18650 type cylindrical battery. The battery was examined for capacity retention through cycling and proportions of low-temperature discharge. The results are shown in Electrolytic Solution [2] Table 1.

Electrolytic Solution [2] Example 2

A 18650 type cylindrical battery was produced in the same manner as in Electrolytic Solution [2] Example 1, except that methyl n-propyl carbonate was used in place of the ethyl methyl carbonate. This battery was examined for capacity retention through cycling and proportions of low-temperature discharge in the same manners. The results are shown in Electrolytic Solution [2] Table 1.

Electrolytic Solution [2] Comparative Example 3

A 18650 type cylindrical battery was produced in the same manner as in Electrolytic Solution [2] Example 2, except that lithium difluorophosphate was not incorporated. This battery was examined for capacity retention through cycling and proportions of low-temperature discharge in the same manners. The results are shown in Electrolytic Solution [2] Table 1.

Electrolytic Solution [2]<Secondary-Battery Production 2>
<Production of Positive Electrode>

Ninety percents by mass lithium cobalt oxide (LiCoO$_2$) as a positive-electrode active material was mixed with 5% by mass acetylene black as a conductive material and 5% by mass poly(vinylidene fluoride) (PVdF) as a binder in N-methylpyrrolidone solvent to prepare a slurry. The slurry obtained was applied to each side of an aluminum foil having a thickness of 15 μm and dried. The coated foil was rolled with a pressing machine to a thickness of 80 μm. Pieces each having an active-material layer size with a width of 100 mm and a length of 100 mm and including an uncoated part having a width of 30 mm were cut out of the rolled foil. Thus, positive electrodes were obtained.

<Production of Negative Electrode>

To 98 parts by weight of artificial graphite powder KS-44 (trade name; manufactured by Timcal) were added 100 parts by weight of an aqueous dispersion of sodium carboxymethyl cellulose (concentration of sodium carboxymethyl cellulose, 1% by mass) as a thickener and 2 parts by weight of an aqueous dispersion of a styrene/butadiene rubber (concentration of styrene/butadiene rubber, 50% by mass) as a binder. The ingredients were mixed together by means of a disperser to obtain a slurry. The slurry obtained was applied to each side of a copper foil having a thickness of 10 µm and dried. The coated foil was rolled with a pressing machine to a thickness of 75 µm. Pieces each having an active-material layer size with a width of 104 mm and a length of 104 mm and including an uncoated part having a width of 30 mm were cut out of the rolled foil. Thus, negative electrodes were obtained.

<Battery Fabrication>

Thirty-two positive electrodes and 33 negative electrodes were alternately disposed and superposed together with porous polyethylene sheet separators (thickness, 25 µm) sandwiched between the electrodes. In this operation, each positive electrode was disposed so that the positive-electrode active-material surface was within the range of the opposed negative-electrode active-material surface. The uncoated parts of the positive electrodes were welded together and those of the negative electrodes were welded together. Thus, current collector tabs were produced to obtain an electrode group. This electrode group was packed into a battery can (outer dimensions: 120×110×10 mm). Thereafter, 20 mL of the nonaqueous electrolyte which will be described later was introduced into the battery can packed with the electrode group and sufficiently infiltrated into the electrodes. This can was sealed to fabricate a prismatic battery. The electric capacity of the battery elements held in one battery case of this secondary battery, i.e., the rated discharge capacity of this battery, was about 6 ampere-hours (Ah). This battery had a direct-current resistance component as measured by the 10-kHz alternating-current method of about 5 milliohms (mΩ).

Electrolytic Solution [2] Example 3

The electrolyte used in Electrolytic Solution [2] Example 1 was used to produce a prismatic battery. This battery was subjected to the cycle test and the low-temperature test in the same manners as in Electrolytic Solution [2] Example 1 to determine the capacity retention through cycling and the proportions of low-temperature discharge thereof. The results are shown in Electrolytic Solution [2] Table 1.

Electrolytic Solution [2] Comparative Example 4

The electrolyte used in Electrolytic Solution [2] Comparative Example 1 was used to produce a prismatic battery. This battery was subjected to the cycle test and the low-temperature test to determine the capacity retention through cycling and the proportions of low-temperature discharge thereof. The results are shown in Electrolytic Solution [2] Table 1.

Electrolytic Solution [2] Comparative Example 5

The electrolyte used in Electrolytic Solution [2] Comparative Example 2 was used to produce a prismatic battery. This battery was subjected to the cycle test and the low-temperature test to determine the capacity retention through cycling and the proportions of low-temperature discharge thereof. The results are shown in Electrolytic Solution [2] Table 1.

Electrolytic Solution [2] Table 1

TABLE 55

| No. | Battery | Capacity retention through cycling (%) | Proportion of initial low-temperature discharge (%) | Proportion of low-temperature discharge after cycling (%) |
|---|---|---|---|---|
| Example 1 | cylindrical | 64 | 68 | 64 |
| Comparative Example 1 | cylindrical | 58 | 59 | 50 |
| Comparative Example 2 | cylindrical | 60 | 60 | 50 |
| Example 2 | cylindrical | 63 | 65 | 63 |
| Comparative Example 3 | cylindrical | 55 | 57 | 45 |
| Example 3 | prismatic | 73 | 74 | 71 |
| Comparative Example 4 | prismatic | 68 | 62 | 53 |
| Comparative Example 5 | prismatic | 68 | 63 | 59 |

As apparent from Electrolytic Solution [2] Table 1, a comparison among the cylindrical batteries (Electrolytic Solution [2] Examples 1 and 2 and Electrolytic Solution [2] Comparative Examples 1 to 3) and a separate comparison among the prismatic batteries (Electrolytic Solution [2] Example 3 and Electrolytic Solution [2] Comparative Examples 4 and 5) show the following. The lithium secondary batteries of the Electrolytic Solution [2] Examples, in each of which the nonaqueous electrolyte contains both an asymmetric chain carbonate and a difluorophosphoric acid salt, have been improved in both of capacity retention through cycling and the proportions of low-temperature discharge as compared with the lithium secondary batteries of the Electrolytic Solution [2] Comparative Examples, in each of which the nonaqueous electrolyte does not contain either of these.

As described above, the cylindrical batteries of the Examples and the Comparative Examples each have a rated discharge capacity lower than 3 ampere-hours (Ah) and a direct-current resistance component higher than 10 milliohms (mΩ). On the other hand, the prismatic batteries of the Example and the Comparative Examples each have a rated discharge capacity of 3 ampere-hours (Ah) or higher and a direct-current resistance component of 10 milliohms (mΩ) or lower. Namely, the prismatic batteries of the Example and the Comparative Examples have a lower resistance and a higher electric capacity than the cylindrical batteries. Furthermore, the degree of improvement in low-temperature characteristics of Electrolytic Solution [2] Example 3 on Electrolytic Solution [2] Comparative Example 4 is higher than the degree of improvement in low-temperature characteristics of Electrolytic Solution [2] Example 1 on Electrolytic Solution [2] Comparative Example 1. It was thus found that the effect of this invention is higher in secondary batteries having a high electric capacity and secondary batteries having a low direct-current resistance.

Electrolytic Solution [3]<Secondary-Battery Production 1>
[Production of Positive Electrode]

Ninety percents by mass lithium cobalt oxide ($LiCoO_2$) as a positive-electrode active material was mixed with 5% by mass acetylene black as a conductive material and 5% by mass poly(vinylidene fluoride) (PVdF) as a binder in N-methylpyrrolidone solvent to prepare a slurry. The slurry obtained was applied to each side of an aluminum foil having a thickness of 15 µm and dried. The coated foil was rolled with a pressing machine to a thickness of 80 µm. Pieces each having an active-material layer size with a width of 100 mm and a length of 100 mm and including an uncoated part having a width of 30 mm were cut out of the rolled foil. Thus, positive electrodes were obtained.

[Production of Negative Electrode]

To 98 parts by weight of artificial graphite powder KS-44 (trade name; manufactured by Timcal) were added 100 parts by weight of an aqueous dispersion of sodium carboxymethyl cellulose (concentration of sodium carboxymethyl cellulose, 1% by mass) as a thickener and 2 parts by weight of an aqueous dispersion of a styrene/butadiene rubber (concentration of styrene/butadiene rubber, 50% by mass) as a binder. The ingredients were mixed together by means of a disperser to obtain a slurry. The slurry obtained was applied to each side of a copper foil having a thickness of 10 μm and dried. The coated foil was rolled with a pressing machine to a thickness of 75 μm. Pieces each having an active-material layer size with a width of 104 mm and a length of 104 mm and including an uncoated part having a width of 30 mm were cut out of the rolled foil. Thus, negative electrodes were obtained.

[Battery Fabrication]

Thirty-two positive electrodes and 33 negative electrodes were alternately disposed and superposed together with porous polyethylene sheet separators (thickness, 25 μm) sandwiched between the electrodes. In this operation, each positive electrode was disposed so that the positive-electrode active-material surface was within the range of the opposed negative-electrode active-material surface. The uncoated parts of the positive electrodes were welded together and those of the negative electrodes were welded together. Thus, current collector tabs were produced to obtain an electrode group. This electrode group was packed into a battery can (outer dimensions: 120×110×10 mm).

Thereafter, 20 mL of the nonaqueous electrolyte shown in each of the Electrolytic Solution [3] Examples and Electrolytic Solution [3] Comparative Examples which will be given later was introduced into the battery can packed with the electrode group and sufficiently infiltrated into the electrodes. This can was sealed to fabricate a prismatic battery. This battery had a rated discharge capacity of about 6 ampere-hours (Ah) and a direct-current resistance as measured by the 10-kHz alternating-current method of about 5 milliohms (mΩ). The ratio of the total electrode area of the positive electrodes to the surface area of the case of this secondary battery is 20.65.

[Battery Evaluation]

(Capacity Measurement)

The fresh battery which had undergone no charge/discharge was subjected to 5 cycles of initial charge/discharge at 25° C. in a voltage range of 4.1-3.0 V at 25° C. (voltage range, 4.1-3.0 V). The 0.2-C (the value of current at which the rated capacity based on 1-hour-rate discharge capacity is discharged over 1 hour is taken as 1 C; the same applies hereinafter) discharge capacity thereof as measured in the fifth cycle in this operation was taken as initial capacity.

(Output Measurement)

In a 25° C. environment, the battery was charged for 150 minutes at a constant current of 0.2 C. This battery was discharged in a −30° C. environment for 10 seconds at each of 0.1 C, 0.3 C, 1.0 C, 3.0 C, and 5.0 C. The voltage was measured at 10 seconds after the discharge initiation. The area of the triangle surrounded by the resultant current-voltage straight line and the final lower voltage (3 V) was taken as output (W).

Electrolytic Solution [3] Example 1

In a dry argon atmosphere, lithium hexafluorophosphate (LiPF$_6$) was added to and dissolved in a mixture of ethylene carbonate (EC), ethyl methyl carbonate (EMC), and methyl propionate (MP) (volume ratio, 3:6:1) in such an amount as to result in a concentration of 1 mol/L. Hexamethylcyclotrisiloxane was mixed with this solution in such an amount as to result in a concentration of 0.3% by mass. Thus, a nonaqueous electrolyte was prepared. This nonaqueous electrolyte was used to produce a battery by the method described above. The battery was examined for low-temperature output. The results are shown in Electrolytic Solution [3] Table 1.

Electrolytic Solution [3] Example 2

In Electrolytic Solution [3] Example 1, a nonaqueous electrolyte was prepared using ethyl acetate (EA), in place of the methyl propionate, in the same amount and this nonaqueous electrolyte was used to produce a battery. This battery was examined for low-temperature output. The results are shown in Electrolytic Solution [3] Table 1.

Electrolytic Solution [3] Example 3

In Electrolytic Solution [3] Example 1, a nonaqueous electrolyte was prepared using methyl acetate (MA), in place of the methyl propionate, in the same amount and this nonaqueous electrolyte was used to produce a battery. This battery was examined for low-temperature output. The results are shown in Electrolytic Solution [3] Table 1.

Electrolytic Solution [3] Example 4

In a dry argon atmosphere, lithium hexafluorophosphate (LiPF$_6$) was added to and dissolved in a mixture of ethylene carbonate (EC), ethyl methyl carbonate (EMC), methyl propionate (MP), and methyl acetate (MA) (volume ratio, 30:60:5:5) in such an amount as to result in a concentration of 1 mol/L. Hexamethylcyclotrisiloxane was mixed with this solution in such an amount as to result in a concentration of 0.3% by mass. Thus, a nonaqueous electrolyte was prepared. This nonaqueous electrolyte was used to produce a battery by the method described above. The battery was examined for low-temperature output. The results are shown in Electrolytic Solution [3] Table 1.

Electrolytic Solution [3] Example 5

In Electrolytic Solution [3] Example 1, a nonaqueous electrolyte was prepared using a mixture of ethylene carbonate (EC), ethyl methyl carbonate (EMC), and methyl propionate (MP) having a volume ratio changed to 3:4:3, and this nonaqueous electrolyte was used to produce a battery by the method described above. This battery was examined for low-temperature output. The results are shown in Electrolytic Solution [3] Table 1.

Electrolytic Solution [3] Example 6

In a dry argon atmosphere, lithium hexafluorophosphate (LiPF$_6$) was added to and dissolved in a mixture of ethylene carbonate (EC) and methyl propionate (MP) (volume ratio, 3:7) in such an amount as to result in a concentration of 1 mol/L. Hexamethylcyclotrisiloxane was mixed with this solution in such an amount as to result in a concentration of 0.3% by mass. Thus, a nonaqueous electrolyte was prepared. This nonaqueous electrolyte was used to produce a battery by the method described above. The battery was examined for low-temperature output. The results are shown in Electrolytic Solution [3] Table 1.

Electrolytic Solution [3] Example 7

In Electrolytic Solution [3] Example 1, phenyldimethylfluorosilane was mixed, in place of the hexamethylcyclotrisiloxane, in the same amount to prepare a nonaqueous electrolyte and this nonaqueous electrolyte was used to produce a battery. This battery was examined for low-temperature output. The results are shown in Electrolytic Solution [3] Table 1.

Electrolytic Solution [3] Example 8

In Electrolytic Solution [3] Example 1, hexamethyldisiloxane was mixed, in place of the hexamethylcyclotrisiloxane, in the same amount to prepare a nonaqueous electrolyte and this nonaqueous electrolyte was used to produce a battery. This battery was examined for low-temperature output. The results are shown in Electrolytic Solution [3] Table 1.

Electrolytic Solution [3] Example 9

In Electrolytic Solution [3] Example 1, trimethylsilyl methanesulfonate was mixed, in place of the hexamethylcyclotrisiloxane, in the same amount to prepare a nonaqueous electrolyte and this nonaqueous electrolyte was used to produce a battery. This battery was examined for low-temperature output. The results are shown in Electrolytic Solution [3] Table 1.

Electrolytic Solution [3] Example 10

In Electrolytic Solution [3] Example 1, methyl fluorosulfonate was mixed, in place of the hexamethylcyclotrisiloxane, in the same amount to prepare a nonaqueous electrolyte and this nonaqueous electrolyte was used to produce a battery. This battery was examined for low-temperature output. The results are shown in Electrolytic Solution [3] Table 1.

Electrolytic Solution [3] Example 11

In Electrolytic Solution [3] Example 1, lithium nitrate was mixed, in place of the hexamethylcyclotrisiloxane, in the same amount to prepare a nonaqueous electrolyte and this nonaqueous electrolyte was stored for 3 days and then used to produce a battery. This battery was examined for low-temperature output. The results are shown in Electrolytic Solution [3] Table 1.

Electrolytic Solution [3] Example 12

In Electrolytic Solution [3] Example 1, lithium difluorophosphate produced by the method described in *Inorganic Nuclear Chemistry Letters* (1969), 5(7), pp. 581-582 was used, in place of the hexamethylcyclotrisiloxane, in the same amount (amount resulting in a concentration of 0.3% by mass based on the solution prepared by mixing the nonaqueous solvent and the lithium hexafluorophosphate) to prepare a nonaqueous electrolyte and this nonaqueous electrolyte was used to produce a battery. This battery was examined for low-temperature output. The results are shown in Electrolytic Solution [3] Table 1.

Electrolytic Solution [3] Example 13

In Electrolytic Solution [3] Example 12, the amount of the lithium difluorophosphate to be mixed was changed to 0.08% by mass based on the solution prepared by mixing the nonaqueous solvent and the lithium hexafluorophosphate. The nonaqueous electrolyte thus prepared was used to produce a battery. This battery was examined for low-temperature output. The results are shown in Electrolytic Solution [3] Table 1.

Electrolytic Solution [3] Example 14

<Secondary-Battery Production 2>
<Production of Positive Electrode>
Ninety percents by mass lithium cobalt oxide ($LiCoO_2$) as a positive-electrode active material was mixed with 5% by mass acetylene black as a conductive material and 5% by mass poly(vinylidene fluoride) (PVdF) as a binder in N-methylpyrrolidone solvent to prepare a slurry. The slurry obtained was applied to each side of an aluminum foil having a thickness of 20 μm and dried. The coated foil was rolled with a pressing machine to a thickness of 80 μm. A strip having a width of 52 mm and a length of 830 mm was cut out of the rolled foil to obtain a positive electrode. This positive electrode had a 50-mm uncoated part extending in the lengthwise direction on each of the front and back sides, and the active-material layer had a length of 780 mm.
<Production of Negative Electrode>
To 98 parts by weight of artificial graphite powder KS-44 (trade name; manufactured by Timcal) were added 100 parts by weight of an aqueous dispersion of sodium carboxymethyl cellulose (concentration of sodium carboxymethyl cellulose, 1% by mass) as a thickener and 2 parts by weight of an aqueous dispersion of a styrene/butadiene rubber (concentration of styrene/butadiene rubber, 50% by mass) as a binder. The ingredients were mixed together by means of a disperser to obtain a slurry. The slurry obtained was evenly applied to each side of a copper foil having a thickness of 18 μm as a negative-electrode current collector and dried. The coated foil was rolled with a pressing machine to a thickness of 85 μm. A strip having a width of 56 mm and a length of 850 mm was cut out of the rolled foil to obtain a negative electrode. This negative electrode had a 30-mm uncoated part extending in the lengthwise direction on each of the front and back sides.
<Production of Electrolytic Solution>
The same nonaqueous electrolyte as in Electrolytic Solution [3] Example 1 was produced.
<Battery Fabrication>
The positive electrode and the negative electrode were superposed and wound together with polyethylene separators so as to prevent the positive electrode and the negative electrode from coming into direct contact with each other to thereby obtain an electrode roll. This electrode roll was packed into a battery can so that the terminal of the positive electrode and that of the negative electrode protruded outward. Subsequently, 5 mL of the electrolyte described later was introduced into the battery can, which was then caulked. Thus, a 18650 type cylindrical battery was produced. This battery had a rated discharge capacity of about 0.7 ampere-hours (Ah) and a direct-current resistance as measured by the 10-kHz alternating-current method of about 35 milliohms (mΩ). The overall electrode area of the positive electrode is 19.4 times the surface area of the case of this secondary battery. This battery was examined for low-temperature output in the same manner as in Electrolytic Solution [3] Example 1. The results are shown in Electrolytic Solution [3] Table 1.

Electrolytic Solution [3] Comparative Example 1

In Electrolytic Solution [3] Example 1, a nonaqueous electrolyte was prepared without mixing hexamethylcyclotrisiloxane and this nonaqueous electrolyte was used to produce a battery by the method described above. This battery was examined for low-temperature output. The results are shown in Electrolytic Solution [3] Table 1.

Electrolytic Solution [3] Comparative Example 2

In Electrolytic Solution [3] Example 2, a nonaqueous electrolyte was prepared without mixing hexamethylcyclotrisiloxane and this nonaqueous electrolyte was used to produce a battery by the method described above. This battery was examined for low-temperature output. The results are shown in Electrolytic Solution [3] Table 1.

Electrolytic Solution [3] Comparative Example 3

In Electrolytic Solution [3] Example 3, a nonaqueous electrolyte was prepared without mixing hexamethylcyclotrisiloxane and this nonaqueous electrolyte was used to produce a battery by the method described above. This battery was examined for low-temperature output. The results are shown in Electrolytic Solution [3] Table 1.

Electrolytic Solution [3] Comparative Example 4

In Electrolytic Solution [3] Example 4, a nonaqueous electrolyte was prepared without mixing hexamethylcyclotrisiloxane and this nonaqueous electrolyte was used to produce a battery by the method described above. This battery was examined for low-temperature output. The results are shown in Electrolytic Solution [3] Table 1.

Electrolytic Solution [3] Comparative Example 5

In Electrolytic Solution [3] Example 5, a nonaqueous electrolyte was prepared without mixing hexamethylcyclotrisiloxane and this nonaqueous electrolyte was used to produce a battery by the method described above. This battery was examined for low-temperature output. The results are shown in Electrolytic Solution [3] Table 1.

Electrolytic Solution [3] Comparative Example 6

In a dry argon atmosphere, lithium hexafluorophosphate ($LiPF_6$) was added to and dissolved in a mixture of ethylene carbonate and ethyl methyl carbonate (volume ratio, 3:7) in such an amount as to result in a concentration of 1 mol/L. Thus, a nonaqueous electrolyte was prepared. This nonaqueous electrolyte was used to produce a battery by the method described above. The battery was examined for low-temperature output. The results are shown in Electrolytic Solution [3] Table 1.

Electrolytic Solution [3] Comparative Example 7

In a dry argon atmosphere, lithium hexafluorophosphate ($LiPF_6$) was added to and dissolved in a mixture of ethylene carbonate and ethyl methyl carbonate (volume ratio, 3:7) in such an amount as to result in a concentration of 1 mol/L. Hexamethylcyclotrisiloxane was mixed with this solution in such an amount as to result in a concentration of 0.3% by mass. Thus, a nonaqueous electrolyte was prepared. This nonaqueous electrolyte was used to produce a battery by the method described above. The battery was examined for low-temperature output. The results are shown in Electrolytic Solution [3] Table 1.

Electrolytic Solution [3] Comparative Example 8

In Electrolytic Solution [3] Comparative Example 7, phenyldimethylfluorosilane was mixed, in place of the hexamethylcyclotrisiloxane, in the same amount to prepare a nonaqueous electrolyte and this nonaqueous electrolyte was used to produce a battery by the method described above. This battery was examined for low-temperature output. The results are shown in Electrolytic Solution [3] Table 1.

Electrolytic Solution [3] Comparative Example 9

In Electrolytic Solution [3] Comparative Example 7, hexamethyldisiloxane was mixed, in place of the hexamethylcyclotrisiloxane, in the same amount to prepare a nonaqueous electrolyte and this nonaqueous electrolyte was used to produce a battery by the method described above. This battery was examined for low-temperature output. The results are shown in Electrolytic Solution [3] Table 1.

Electrolytic Solution [3] Comparative Example 10

In Electrolytic Solution [3] Comparative Example 7, trimethylsilyl methanesulfonate was mixed, in place of the hexamethylcyclotrisiloxane, in the same amount to prepare a nonaqueous electrolyte and this nonaqueous electrolyte was used to produce a battery by the method described above. This battery was examined for low-temperature output. The results are shown in Electrolytic Solution [3] Table 1.

Electrolytic Solution [3] Comparative Example 11

In Electrolytic Solution [3] Comparative Example 7, methyl fluorosulfonate was mixed, in place of the hexamethylcyclotrisiloxane, in the same amount to prepare a nonaqueous electrolyte and this nonaqueous electrolyte was used to produce a battery by the method described above. This battery was examined for low-temperature output. The results are shown in Electrolytic Solution [3] Table 1.

Electrolytic Solution [3] Comparative Example 12

In Electrolytic Solution [3] Comparative Example 7, lithium nitrate was mixed, in place of the hexamethylcyclotrisiloxane, in the same amount to prepare a nonaqueous electrolyte and this nonaqueous electrolyte was stored for 3 days and then used to produce a battery by the method described above. This battery was examined for low-temperature output. The results are shown in Electrolytic Solution [3] Table 1.

Electrolytic Solution [3] Comparative Example 13

In Electrolytic Solution [3] Comparative Example 7, lithium difluorophosphate was mixed, in place of the hexamethylcyclotrisiloxane, in the same amount to prepare a nonaqueous electrolyte and this nonaqueous electrolyte was used to produce a battery by the method described above. This battery was examined for low-temperature output. The results are shown in Electrolytic Solution [3] Table 1.

Electrolytic Solution [3] Comparative Example 14

In Electrolytic Solution [3] Example 14, a nonaqueous electrolyte prepared in the same manner as in Electrolytic Solution [3] Comparative Example 1 was used to produce a battery by the method described above. This battery was examined for low-temperature output. The results are shown in Electrolytic Solution [3] Table 1.
Electrolytic Solution [3] Table 1

TABLE 56

| No. | Nonaqueous solvent | Specific compound (mass %) | Low-temperature output (W) |
|---|---|---|---|
| Example 1 | EC:EMC:MP | hexamethylcyclotrisiloxane (0.3%) | 20.3 |
| Example 2 | EC:EMC:EA | hexamethylcyclotrisiloxane (0.3%) | 20.5 |
| Example 3 | EC:EMC:MA | hexamethylcyclotrisiloxane (0.3%) | 20.6 |
| Example 4 | EC:EMC:MA:MP | hexamethylcyclotrisiloxane (0.3%) | 20.5 |
| Example 5 | EC:EMC:MP | hexamethylcyclotrisiloxane (0.3%) | 20.0 |
| Example 6 | EC:MP | hexamethylcyclotrisiloxane (0.3%) | 19.1 |
| Example 7 | EC:EMC:MP | phenyldimethylfluorosilane (0.3%) | 20.0 |
| Example 8 | EC:EMC:MP | hexamethyldisiloxane (0.3%) | 20.5 |
| Example 9 | EC:EMC:MP | trimethylsilyl methanesulfonate (0.3%) | 20.6 |
| Example 10 | EC:EMC:MP | methyl fluorosulfonate (0.3%) | 20.0 |
| Example 11 | EC:EMC:MP | lithium nitrate (0.3%) | 20.2 |
| Example 12 | EC:EMC:MP | lithium difluorophosphate (0.3%) | 21.2 |
| Example 13 | EC:EMC:MP | lithium difluorophosphate (0.08%) | 19.0 |
| Example 14 | EC:EMC:MP | hexamethylcyclotrisiloxane (0.3%) | 1.84 |
| Comparative Example 1 | EC:EMC:MP | none | 15.7 |
| Comparative Example 2 | EC:EMC:EA | none | 15.8 |
| Comparative Example 3 | EC:EMC:MA | none | 16.1 |
| Comparative Example 4 | EC:EMC:MA:MP | none | 16.0 |
| Comparative Example 5 | EC:MP | none | 15.7 |
| Comparative Example 6 | EC:EMC | none | 15.5 |
| Comparative Example 7 | EC:EMC | hexamethylcyclotrisiloxane (0.3%) | 18.3 |
| Comparative Example 8 | EC:EMC | phenyldimethylfluorosilane (0.3%) | 18.0 |
| Comparative Example 9 | EC:EMC | hexamethyldisiloxane (0.3%) | 18.4 |
| Comparative Example 10 | EC:EMC | trimethylsilyl methanesulfonate (0.3%) | 18.5 |
| Comparative Example 11 | EC:EMC | methyl fluorosulfonate (0.3%) | 18.1 |
| Comparative Example 12 | EC:EMC | lithium nitrate (0.3%) | 18.4 |
| Comparative Example 13 | EC:EMC | lithium difluorophosphate (0.3%) | 18.6 |
| Comparative Example 14 | EC:EMC:MP | none | 1.52 |

Electrolytic Solution [3] Table 1 shows the following. The lithium secondary batteries of Electrolytic Solution [3] Examples 1 to 13, in each of which the nonaqueous electrolyte contains both a chain carboxylic acid ester and the specific compound, have improved low-temperature output characteristics as compared not only with the lithium secondary battery of Electrolytic Solution [3] Comparative Example 6, in which the electrolyte contains neither of these, but also with the lithium secondary batteries of Electrolytic Solution [3] Comparative Examples 1 to 5, in which the electrolytes do not contain the specific compound, and the lithium secondary batteries of Electrolytic Solution [3] Comparative Examples 7 to 13, in which the electrolytes do not contain a chain carboxylic acid ester. This effect is not a mere addition of effects to be brought about by the two ingredients. When the two ingredients are used in combination, the effects thereof are clearly amplified.

The percentage increase in output for Electrolytic Solution [3] Example 14 based on the battery of Electrolytic Solution [3] Comparative Example 14 is about 21%. On the other hand, in the case of Electrolytic Solution [3] Example 1 and Comparative Example 1, which have a different battery structure although employing the same materials, the percentage increase in output for Electrolytic Solution [3] Example 1 based on the battery of Electrolytic Solution [3] Comparative Example 1 is 29%. This indicates that battery structure influences the degree of the effect of the nonaqueous electrolyte according to the invention.

As described above, it has become possible to impart exceedingly high low-temperature output characteristics by using the nonaqueous electrolyte according to this invention, i.e., a nonaqueous electrolyte for secondary battery which is characterized by containing at least one chain carboxylic acid ester and further containing at least one compound selected from the group consisting of cyclic siloxane compounds represented by general formula (1), fluorosilane compounds represented by general formula (2), compounds represented by general formula (3), compounds having an S—F bond in the molecule, nitric acid salts, nitrous acid salts, monofluorophosphoric acid salts, difluorophosphoric acid salts, acetic acid salts, and propionic acid salts in an amount of 10 ppm or more of the whole nonaqueous electrolyte.

Electrolytic Solution [4]<Secondary-Battery Production 1 (Production of Prismatic Battery)>
[Production of Positive Electrode]

Ninety percents by mass lithium cobalt oxide (LiCoO$_2$) as a positive-electrode active material was mixed with 5% by mass acetylene black as a conductive material and 5% by mass poly(vinylidene fluoride) (PVdF) as a binder in N-methylpyrrolidone solvent to prepare a slurry. The slurry obtained was applied to each side of an aluminum foil having a thickness of 15 μm and dried. The coated foil was rolled with a pressing machine to a thickness of 80 μm. Pieces each having an active-material layer size with a width of 100 mm and a length of 100 mm and including an uncoated part having a width of 30 mm were cut out of the rolled foil. Thus, positive electrodes were obtained.
[Production of Negative Electrode]

Two kilograms of artificial graphite powder KS-44 (trade name; manufactured by Timcal) was mixed with 1 kg of petroleum pitch. Using a batch heating oven, the slurry mixture obtained was heated to 1,100° C. over 2 hours and held at that temperature for 2 hours in an inert atmosphere.

The mixture heat-treated was pulverized and the particles were passed through vibrating sieves to regulate the particle diameters to 18-22 μm. Finally, an "amorphous-substance-coated graphitic carbonaceous substance" was obtained which comprised the graphite and 7% by mass amorphous carbon with which the surface of the graphite was coated. This "amorphous-substance-coated graphitic carbonaceous substance" was used as a negative-electrode active material. To 98 parts by weight of this "amorphous-substance-coated graphitic carbonaceous substance" were added 100 parts by weight of an aqueous dispersion of sodium carboxymethyl cellulose (concentration of sodium carboxymethyl cellulose, 1% by mass) as a thickener and 2 parts by weight of an aqueous dispersion of a styrene/butadiene rubber (concentration of styrene/butadiene rubber, 50% by mass) as a binder. The ingredients were mixed together by means of a disperser to obtain a slurry. The slurry obtained was applied to each side of a copper foil having a thickness of 10 μm and dried. The coated foil was rolled with a pressing machine to a thickness of 75 μm. Pieces each having an active-material layer size with a width of 104 mm and a length of 104 mm and including an uncoated part having a width of 30 mm were cut out of the rolled foil. Thus, negative electrodes were obtained.

[Battery Fabrication]

Thirty-two positive electrodes and 33 negative electrodes were alternately disposed and superposed together with porous polyethylene sheet separators (thickness, 25 μm) sandwiched between the electrodes. In this operation, each positive electrode was disposed so that the positive-electrode active-material surface was within the range of the opposed negative-electrode active-material surface. The uncoated parts of the positive electrodes were welded together and those of the negative electrodes were welded together. Thus, current collector tabs were produced to obtain an electrode group. This electrode group was packed into a battery can (outer dimensions: 120×110×10 mm) equipped with a gas release valve. Thereafter, 20 mL of the nonaqueous electrolyte which will be described later was introduced into the battery can packed with the electrode group and sufficiently infiltrated into the electrodes. This can was sealed to fabricate a prismatic battery. The electric capacity of the battery elements held in one battery case of this secondary battery, i.e., the rated discharge capacity of this battery, was about 6 Ah. This battery had a direct-current resistance component as measured by the 10-kHz alternating-current method of about 5 milliohms.

<<Battery Evaluation>>

(Capacity Measurement)

The fresh battery which had undergone no charge/discharge cycling was subjected to 5 cycles of initial charge/discharge at 25° C. in a voltage range of 4.2-3.0 V at a current of 0.2 C (the value of current at which the rated capacity based on 1-hour-rate discharge capacity is discharged over 1 hour is taken as 1 C; the same applies hereinafter). The 0.2-C discharge capacity thereof as measured in the fifth cycle in this operation was taken as initial capacity.

(Output Measurement)

In a 25° C. environment, the battery was charged for 150 minutes at a constant current of 0.2 C and then discharged for 10 seconds at each of 0.1 C, 0.3 C, 1.0 C, 3.0 C, and 10.0 C. The voltage was measured at 10 seconds after the discharge initiation. The area of the triangle surrounded by the resultant current-voltage straight line and the final lower voltage (3 V) was taken as output (W).

Electrolytic Solution [4] Example 1

In a dry argon atmosphere, $LiPF_6$ and $LiBF_4$ were added to and dissolved in a mixture of ethylene carbonate (EC; flashpoint, 143° C.), γ-butyrolactone (GBL; flash point, 101° C.), and diethyl carbonate (DEC; flash point, 25° C.) (volume ratio, 2:7:1) in such amounts as to result in an $LiPF_6$ concentration of 0.3 mol/L and an $LiBF_4$ concentration of 0.7 mol/L. Vinylene carbonate and hexamethylcyclotrisiloxane were incorporated into the resultant solution in such amounts as to result in concentrations of 1% by mass and 0.3% by mass, respectively. Thus, a nonaqueous electrolyte was prepared. This nonaqueous electrolyte had a flash point of 61° C. This nonaqueous electrolyte was used to produce a prismatic battery by the method described above. This battery was examined for output. The results are shown in Electrolytic Solution [4] Table 1.

Electrolytic Solution [4] Example 2

A prismatic battery was produced in the same manner as in Electrolytic Solution [4] Example 1, except that phenyldimethylfluorosilane was used in place of the hexamethylcyclotrisiloxane in preparing a nonaqueous electrolyte. This battery was examined for output in the same manner. The results are shown in Electrolytic Solution [4] Table 1.

Electrolytic Solution [4] Example 3

A prismatic battery was produced in the same manner as in Electrolytic Solution [4] Example 1, except that methyl fluorosulfonate was used in place of the hexamethylcyclotrisiloxane in preparing a nonaqueous electrolyte. This battery was examined for output in the same manner. The results are shown in Electrolytic Solution [4] Table 1.

Electrolytic Solution [4] Example 4

A prismatic battery was produced in the same manner as in Electrolytic Solution [4] Example 1, except that lithium difluorophosphate produced by the method described in *Inorganic Nuclear Chemistry Letters* (1969), 5(7), pp. 581-582 was used in place of the hexamethylcyclotrisiloxane in preparing a nonaqueous electrolyte. This battery was examined for output in the same manner. The results are shown in Electrolytic Solution [4] Table 1.

Electrolytic Solution [4] Comparative Example 1

A prismatic battery was produced in the same manner as in Electrolytic Solution [4] Example 1, except that hexamethylcyclotrisiloxane was not incorporated in preparing a nonaqueous electrolyte. This battery was examined for output in the same manner. The results are shown in Electrolytic Solution [4] Table 1.

Electrolytic Solution [4]<Secondary-Battery Production 2 (Production of Cylindrical Battery)>

[Production of Positive Electrode]

Ninety percents by mass lithium cobalt oxide ($LiCoO_2$) as a positive-electrode active material was mixed with 5% by mass acetylene black as a conductive material and 5% by mass poly(vinylidene fluoride) (PVdF) as a binder in N-methylpyrrolidone solvent to prepare a slurry. The slurry obtained was applied to each side of an aluminum foil having a thickness of 20 μm and dried. The coated foil was rolled with a pressing machine to a thickness of 80 μm. A strip having a width of 52 mm and a length of 830 mm was cut out of the rolled foil to obtain a positive electrode. This positive electrode had a 50-mm uncoated part extending in the lengthwise direction on each of the front and back sides, and the active-material layer had a length of 780 mm.

[Production of Negative Electrode]

Two kilograms of artificial graphite powder KS-44 (trade name; manufactured by Timcal) was mixed with 1 kg of petroleum pitch. Using a batch heating oven, the slurry mixture obtained was heated to 1,100° C. over 2 hours and held at that temperature for 2 hours in an inert atmosphere.

The mixture heat-treated was pulverized and the particles were passed through vibrating sieves to regulate the particle diameters to 18-22 μm. Finally, an "amorphous-substance-coated graphitic carbonaceous substance" was obtained which comprised the graphite and 7% by mass amorphous carbon with which the surface of the graphite was coated. This "amorphous-substance-coated graphitic carbonaceous substance" was used as a negative-electrode active material. To 98 parts by weight of this "amorphous-substance-coated graphitic carbonaceous substance" were added 100 parts by weight of an aqueous dispersion of sodium carboxymethyl cellulose (concentration of sodium carboxymethyl cellulose, 1% by mass) as a thickener and 2 parts by weight of an aqueous dispersion of a styrene/butadiene rubber (concentration of styrene/butadiene rubber, 50% by mass) as a binder. The ingredients were mixed together by means of a disperser to obtain a slurry. The slurry obtained was evenly applied to each side of a copper foil having a thickness of 18 μm as a negative-electrode current collector and dried. The coated foil was rolled with a pressing machine to a thickness of 85 μm. A strip having a width of 56 mm and a length of 850 mm was cut out of the rolled foil to obtain a negative electrode. This negative electrode had a 30-mm uncoated part extending in the lengthwise direction on each of the front and back sides.

[Battery Fabrication] The positive electrode and the negative electrode were superposed and wound together with polyethylene separators so as to prevent the positive electrode and the negative electrode from coming into direct contact with each other to thereby obtain an electrode roll. This electrode roll was packed into a battery can so that the terminal of the positive electrode and that of the negative electrode protruded outward. Subsequently, 5 mL of the nonaqueous electrolyte which will be described later was introduced into the battery can, which was then caulked. Thus, a 18650 type cylindrical battery was produced. The electric capacity of the battery elements held in one battery case of this secondary battery, i.e., the rated discharge capacity of this battery, was about 0.7 ampere-hours (Ah). This battery had a direct-current resistance component as measured by the 10-kHz alternating-current method of about 35 milliohms (mΩ).

Electrolytic Solution [4] Example 5

A cylindrical battery was produced using the nonaqueous electrolyte used in Electrolytic Solution [4] Example 1. This battery was examined for output. The results are shown in Electrolytic Solution [4] Table 1.

Electrolytic Solution [4] Comparative Example 2

A cylindrical battery was produced in the same manner as in Electrolytic Solution [4] Example 5, except that the nonaqueous electrolyte used in Electrolytic Solution [4] Comparative Example 1 was used. This battery was examined for output in the same manner. The results are shown in Electrolytic Solution [4] Table 1.

Electrolytic Solution [4] Table 1

TABLE 57

| No. | Specific compound | Output (W) |
| --- | --- | --- |
| Example 1 | hexamethylcyclotrisiloxane | 500 |
| Example 2 | phenyldimethylfluorosilane | 510 |
| Example 3 | methyl fluorosulfonate | 510 |

TABLE 57-continued

| No. | Specific compound | Output (W) |
| --- | --- | --- |
| Example 4 | lithium difluorophosphate | 525 |
| Example 5 | hexamethylcyclotrisiloxane | 45 |
| Comparative Example 1 | — | 390 |
| Comparative Example 2 | — | 37 |

As apparent from Electrolytic Solution [4] Table 1, a comparison among the prismatic batteries (Electrolytic Solution [4] Examples 1 to 4 and Electrolytic Solution [4] Comparative Example 1) and a separate comparison between the cylindrical batteries (Electrolytic Solution [4] Example 5 and Electrolytic Solution [4] Comparative Example 2) show that the lithium secondary batteries of the Examples have been improved in output.

As described above, the prismatic batteries of the Examples and the Comparative Example each have a rated discharge capacity of 3 ampere-hours (Ah) or higher and a direct-current resistance component of 10 milliohms (mΩ) or lower. On the other hand, the cylindrical batteries of the Example and the Comparative Example each have a rated discharge capacity lower than 3 ampere-hours (Ah) and a direct-current resistance component higher than 10 milliohms (mΩ). Namely, the prismatic batteries of the Examples and the Comparative Example have a lower resistance and a higher electric capacity than the cylindrical batteries. Furthermore, the degree of improvement in output of Electrolytic Solution [4] Example 1 on Electrolytic Solution [4] Comparative Example 1 is higher than the degree of improvement in output of Electrolytic Solution [4] Example 5 on Electrolytic Solution [4] Comparative Example 2. It was thus found that the effect of this invention is higher in secondary batteries having a high electric capacity and secondary batteries having a low direct-current resistance.

Electrolytic Solution [5]<Secondary-Battery Production>
[Production of Positive Electrode]

Ninety percents by mass lithium cobalt oxide ($LiCoO_2$) as a positive-electrode active material was mixed with 5% by mass acetylene black as a conductive material and 5% by mass poly(vinylidene fluoride) (PVdF) as a binder in N-methylpyrrolidone solvent to prepare a slurry. The slurry obtained was applied to each side of an aluminum foil having a thickness of 15 μm and dried. The coated foil was rolled with a pressing machine to a thickness of 80 μm. Pieces each having an active-material layer size with a width of 100 mm and a length of 100 mm and including an uncoated part having a width of 30 mm were cut out of the rolled foil. Thus, positive electrodes were obtained.

[Production of Negative Electrode]

To 98 parts by weight of artificial graphite powder KS-44 (trade name; manufactured by Timcal) were added 100 parts by weight of an aqueous dispersion of sodium carboxymethyl cellulose (concentration of sodium carboxymethyl cellulose, 1% by mass) as a thickener and 2 parts by weight of an aqueous dispersion of a styrene/butadiene rubber (concentration of styrene/butadiene rubber, 50% by mass) as a binder. The ingredients were mixed together by means of a disperser to obtain a slurry. The slurry obtained was applied to each side of a copper foil having a thickness of 10 μm and dried. The coated foil was rolled with a pressing machine to a thickness of 75 μm. Pieces each having an active-material layer size with a width of 104 mm and a length of 104 mm and including an uncoated part having a width of 30 mm were cut out of the rolled foil. Thus, negative electrodes were obtained.

[Battery Fabrication]

Thirty-two positive electrodes and 33 negative electrodes were alternately disposed and superposed together with porous polyethylene sheet separators (thickness, 25 μm) sandwiched between the electrodes. In this operation, each positive electrode was disposed so that the positive-electrode active-material surface was within the range of the opposed negative-electrode active-material surface. The uncoated parts of the positive electrodes were welded together and those of the negative electrodes were welded together. Thus, current collector tabs were produced to obtain an electrode group. This electrode group was packed into a battery can (outer dimensions: 120×110×10 mm) equipped with a gas release valve. Thereafter, 20 mL of the nonaqueous electrolyte which will be described later was introduced into the battery can packed with the electrode group and sufficiently infiltrated into the electrodes. This can was sealed to fabricate a prismatic battery. The electric capacity of the battery elements held in one battery case of this secondary battery, i.e., the rated discharge capacity of this battery, was about 6 ampere-hours (Ah). This battery had a direct-current resistance component as measured by the 10-kHz alternating-current method of about 5 milliohms (mΩ).

[Battery Evaluation]

(Capacity Measurement)

The fresh battery which had undergone no charge/discharge cycling was subjected to 5 cycles of initial charge/discharge at 25° C. in a voltage range of 4.2-3.0 V at a current of 0.2 C (the value of current at which the rated capacity based on 1-hour-rate discharge capacity is discharged over 1 hour is taken as 1 C; the same applies hereinafter). The 0.2-C discharge capacity thereof as measured in the fifth cycle in this operation was taken as initial capacity.

(Output Measurement)

In a 25° C. environment, the battery was charged for 150 minutes at a constant current of 0.2 C and then discharged for 10 seconds at each of 0.1 C, 0.3 C, 1.0 C, 3.0 C, and 10.0 C. The voltage was measured at 10 seconds after the discharge initiation. The area of the triangle surrounded by the resultant current-voltage straight line and the final lower voltage (3 V) was taken as output (W).

(Cycle Test)

The battery was subjected to a cycle test in a high-temperature environment of 60° C., which is regarded as the upper-limit temperature for the actual use of lithium secondary batteries. The battery was charged by the constant-current constant-voltage method at 2 C to a final charge voltage of 4.2 V and then discharged at a constant current of 2 C to a final discharge voltage of 3.0 V. This charge/discharge operation as one cycle was repeated to conduct 500 cycles in total.

(Storage Test)

A storage test was conducted in a high-temperature environment of 60° C. The battery which had been charged beforehand to a final charge voltage of 4.2 V in a 25° C. environment by the constant-current constant-voltage method was stored at 60° C. for 1 month.

The battery which had undergone the capacity measurement, battery which had undergone the cycle test, and battery which had undergone the storage test were subjected to an output measurement to determine initial output, output after cycling, and output after storage, respectively.

Electrolytic Solution [5] Example 1

In a dry argon atmosphere, $LiPF_6$ and $LiN(CF_3SO_2)_2$ were added to and dissolved in a mixture of ethylene carbonate (EC), ethyl methyl carbonate (EMC), and dimethyl carbonate (DMC) (volume ratio, 2:5:3) in such amounts as to result in an $LiPF_6$ concentration of 1 mol/L and an $LiN(CF_3SO_2)_2$ concentration of 0.01 mol/L. Hexamethylcyclotrisiloxane was incorporated into the resultant solution in such an amount as to result in a concentration of 0.3% by mass. Thus, a nonaqueous electrolyte was prepared. This nonaqueous electrolyte was used to produce a battery by the method described above. This battery was examined for initial output, output after cycling, and output after storage. The results are shown in Electrolytic Solution [5] Table 1.

Electrolytic Solution [5] Example 2

A battery was produced in the same manner as in Electrolytic Solution [5] Example 1, except that phenyldimethylfluorosilane was used in place of the hexamethylcyclotrisiloxane in preparing a nonaqueous electrolyte. This battery was examined for initial output, output after cycling, and output after storage in the same manners. The results are shown in Electrolytic Solution [5] Table 1.

Electrolytic Solution [5] Example 3

A battery was produced in the same manner as in Electrolytic Solution [5] Example 1, except that methyl fluorosulfonate was used in place of the hexamethylcyclotrisiloxane in preparing a nonaqueous electrolyte. This battery was examined for initial output, output after cycling, and output after storage in the same manners. The results are shown in Electrolytic Solution [5] Table 1.

Electrolytic Solution [5] Example 4

A battery was produced in the same manner as in Electrolytic Solution [5] Example 1, except that lithium difluorophosphate produced by the method described in *Inorganic Nuclear Chemistry Letters* (1969), 5(7), pp. 581-582 was used in place of the hexamethylcyclotrisiloxane in preparing a nonaqueous electrolyte. This battery was examined for initial output, output after cycling, and output after storage in the same manners. The results are shown in Electrolytic Solution [5] Table 1.

Electrolytic Solution [5] Example 5

A battery was produced in the same manner as in Electrolytic Solution [5] Example 1, except that lithium bis (oxalato) borate (LiBOB) was used in place of the LiN $(CF_3SO_2)_2$ in preparing a nonaqueous electrolyte. This battery was examined for initial output, output after cycling, and output after storage in the same manners. The results are shown in Electrolytic Solution [5] Table 1.

Electrolytic Solution [5] Example 6

A battery was produced in the same manner as in Electrolytic Solution [5] Example 4, except that lithium bis (oxalato) borate (LiBOB) was used in place of the LiN $(CF_3SO_2)_2$ in preparing a nonaqueous electrolyte. This battery was examined for initial output, output after cycling, and output after storage in the same manners. The results are shown in Electrolytic Solution [5] Table 1.

Electrolytic Solution [5] Comparative Example 1

A battery was produced in the same manner as in Example 1, except that $LiN(CF_3SO_2)_2$ was not dissolved in preparing a nonaqueous electrolyte. This battery was examined for initial output, output after cycling, and output after storage in the same manners. The results are shown in Electrolytic Solution [5] Table 1.

Electrolytic Solution [5] Comparative Example 2

A battery was produced in the same manner as in Electrolytic Solution [5] Example 1, except that hexamethylcyclotrisiloxane was not incorporated in preparing a nonaqueous electrolyte. This battery was examined for initial output, output after cycling, and output after storage in the same manners. The results are shown in Electrolytic Solution [5] Table 1.

Electrolytic Solution [5] Comparative Example 3

A battery was produced in the same manner as in Electrolytic Solution [5] Example 1, except that neither LiN$(CF_3SO_2)_2$ nor hexamethylcyclotrisiloxane was incorporated in preparing a nonaqueous electrolyte. This battery was examined for initial output, output after cycling, and output after storage in the same manners. The results are shown in Electrolytic Solution [5] Table 1.

Electrolytic Solution [5] Example 7

<Secondary-Battery Production 2>
[Production of Positive Electrode]
Ninety percents by mass lithium cobalt oxide ($LiCoO_2$) as a positive-electrode active material was mixed with 5% by mass acetylene black as a conductive material and 5% by mass poly(vinylidene fluoride) (PVdF) as a binder in N-methylpyrrolidone solvent to prepare a slurry. The slurry obtained was applied to each side of an aluminum foil having a thickness of 20 μm and dried. The coated foil was rolled with a pressing machine to a thickness of 80 μm. A strip having a width of 52 mm and a length of 830 mm was cut out of the rolled foil to obtain a positive electrode. This positive electrode had a 50-mm uncoated part extending in the lengthwise direction on each of the front and back sides, and the active-material layer had a length of 780 mm.
[Production of Negative Electrode]
To 98 parts by weight of artificial graphite powder KS-44 (trade name; manufactured by Timcal) were added 100 parts by weight of an aqueous dispersion of sodium carboxymethyl cellulose (concentration of sodium carboxymethyl cellulose, 1% by mass) as a thickener and 2 parts by weight of an aqueous dispersion of a styrene/butadiene rubber (concentration of styrene/butadiene rubber, 50% by mass) as a binder. The ingredients were mixed together by means of a disperser to obtain a slurry. The slurry obtained was evenly applied to each side of a copper foil having a thickness of 18 μm as a negative-electrode current collector and dried. The coated foil was rolled with a pressing machine to a thickness of 85 μm. A strip having a width of 56 mm and a length of 850 mm was cut out of the rolled foil to obtain a negative electrode. This negative electrode had a 30-mm uncoated part extending in the lengthwise direction on each of the front and back sides.
[Battery Fabrication]
The positive electrode and the negative electrode were superposed and wound together with polyethylene separators so as to prevent the positive electrode and the negative electrode from coming into direct contact with each other to thereby obtain an electrode roll. This electrode roll was packed into a battery can so that the terminal of the positive electrode and that of the negative electrode protruded outward. Subsequently, 5 mL of the nonaqueous electrolyte which will be described later was introduced into the battery can, which was then caulked. Thus, a 18650 type cylindrical battery was produced. The electric capacity of the battery elements held in one battery case of this secondary battery, i.e., the rated discharge capacity of this battery, was about 0.7 ampere-hours (Ah). This battery had a direct-current resistance component as measured by the 10-kHz alternating-current method of about 35 milliohms (mΩ).

The nonaqueous electrolyte used in Electrolytic Solution [5] Example 1 was used to produce a cylindrical battery. This battery was examined for initial output, output after cycling, and output after storage. The results are shown in Electrolytic Solution [5] Table 1.

Electrolytic Solution [5] Example 8

A cylindrical battery was produced in the same manner as in Electrolytic Solution [5] Example 7, except that the nonaqueous electrolyte used in Electrolytic Solution [5] Example 2 was used. This battery was examined for initial output, output after cycling, and output after storage in the same manners. The results are shown in Electrolytic Solution [5] Table 1.

Electrolytic Solution [5] Example 9

A cylindrical battery was produced in the same manner as in Electrolytic Solution [5] Example 7, except that the nonaqueous electrolyte used in Electrolytic Solution [5] Example 3 was used. This battery was examined for initial output, output after cycling, and output after storage in the same manners. The results are shown in Electrolytic Solution [5] Table 1.

Electrolytic Solution [5] Example 10

A cylindrical battery was produced in the same manner as in Electrolytic Solution [5] Example 7, except that the nonaqueous electrolyte used in Electrolytic Solution [5] Example 4 was used. This battery was examined for initial output, output after cycling, and output after storage in the same manners. The results are shown in Electrolytic Solution [5] Table 1.

Electrolytic Solution [5] Example 11

A cylindrical battery was produced in the same manner as in Electrolytic Solution [5] Example 7, except that the nonaqueous electrolyte used in Electrolytic Solution [5] Example 5 was used. This battery was examined for initial output, output after cycling, and output after storage in the same manners. The results are shown in Electrolytic Solution [5] Table 1.

Electrolytic Solution [5] Example 12

A cylindrical battery was produced in the same manner as in Electrolytic Solution [5] Example 7, except that the nonaqueous electrolyte used in Electrolytic Solution [5] Example 6 was used. This battery was examined for initial output, output after cycling, and output after storage in the same manners. The results are shown in Electrolytic Solution [5] Table 1.

Electrolytic Solution [5] Comparative Example 4

A cylindrical battery was produced in the same manner as in Electrolytic Solution [5] Example 7, except that the nonaqueous electrolyte used in Electrolytic Solution [5] Comparative Example 1 was used. This battery was examined for initial output, output after cycling, and output after storage in the same manners. The results are shown in Electrolytic Solution [5] Table 1.

Electrolytic Solution [5] Comparative Example 5

A cylindrical battery was produced in the same manner as in Electrolytic Solution [5] Example 7, except that the nonaqueous electrolyte used in Electrolytic Solution [5] Comparative Example 2 was used. This battery was examined for initial output, output after cycling, and output after storage in the same manners. The results are shown in Electrolytic Solution [5] Table 1.

Electrolytic Solution [5] Comparative Example 6

A cylindrical battery was produced in the same manner as in Electrolytic Solution [5] Example 7, except that the nonaqueous electrolyte used in Electrolytic Solution [5] Comparative Example 3 was used. This battery was examined for initial output, output after cycling, and output after storage in the same manners. The results are shown in Electrolytic Solution [5] Table 1.
Electrolytic Solution [5] Table 1 lithium secondary batteries of the Electrolytic Solution [5] Comparative Examples, in each of which the nonaqueous electrolyte does not contain either of these.

As described above, the prismatic batteries of the Examples and the Comparative Examples each have a rated discharge capacity of 3 ampere-hours (Ah) or higher and a direct-current resistance component of 10 milliohms (mΩ) or lower. On the other hand, the cylindrical batteries of the Examples and the Comparative Examples each have a rated discharge capacity lower than 3 ampere-hours (Ah) and a direct-current resistance component higher than 10 milliohms (mΩ). Namely, the prismatic batteries of the Examples and the Comparative Examples have a lower resistance and a higher electric capacity than the cylindrical batteries. Furthermore, the degree of improvement in output of Electrolytic Solution [5] Example 1 on Electrolytic Solution [5] Comparative Example 1 is higher than the degree of improvement in output of Electrolytic Solution [5] Example 7 on Electrolytic Solution [5] Comparative Example 4. In particular, there is a large difference in the degree of improvement in output after cycling and in the degree of improvement in output after storage. It was thus found that the effect of this invention is higher in secondary batteries having a high electric capacity and secondary batteries having a low direct-current resistance.

TABLE 58

| No. | Specific lithium salt | Specific compound | Initial output (W) | Output after cycling (W) | Output after storage (W) |
| --- | --- | --- | --- | --- | --- |
| Example 1 | LiN(CF$_3$SO$_2$)$_2$ | hexamethyltrisiloxane | 535 | 350 | 410 |
| Example 2 | LiN(CF$_3$SO$_2$)$_2$ | phenyldimethylfluorosilane | 520 | 320 | 405 |
| Example 3 | LiN(CF$_3$SO$_2$)$_2$ | methyl fluorosulfonate | 515 | 330 | 400 |
| Example 4 | LiN(CF$_3$SO$_2$)$_2$ | lithium difluorophosphate | 545 | 360 | 435 |
| Example 5 | LiBOB | hexamethyltrisiloxane | 515 | 325 | 400 |
| Example 6 | LiBOB | lithium difluorophosphate | 520 | 355 | 420 |
| Comparative Example 1 | — | hexamethyltrisiloxane | 800 | 285 | 345 |
| Comparative Example 2 | LiN(CF$_3$SO$_2$)$_2$ | — | 450 | 240 | 340 |
| Comparative Example 3 | — | — | 440 | 225 | 330 |
| Example 7 | LiN(CF$_3$SO$_2$)$_2$ | hexamethyltrisiloxane | 48 | 29 | 35 |
| Example 8 | LiN(CF$_3$SO$_2$)$_2$ | phenyldimethylfluorosilane | 47 | 28 | 34 |
| Example 9 | LiN(CF$_3$SO$_2$)$_2$ | methyl fluorosulfonate | 47 | 28 | 34 |
| Example 10 | LiN(CF$_3$SO$_2$)$_2$ | lithium difluorophosphate | 49 | 31 | 36 |
| Example 11 | LiBOB | hexamethyltrisiloxane | 48 | 29 | 33 |
| Example 12 | LiBOB | lithium difluorophosphate | 48 | 31 | 34 |
| Comparative Example 4 | — | hexamethyltrisiloxane | 45 | 25 | 32 |
| Comparative Example 5 | LiN(CF$_3$SO$_2$)$_2$ | — | 41 | 23 | 30 |
| Comparative Example 6 | — | — | 40 | 21 | 29 |

As apparent from Electrolytic Solution [5] Table 1, a comparison among the prismatic batteries (Electrolytic Solution [5] Examples 1 to 6 and Electrolytic Solution [5] Comparative Examples 1 to 3) and a separate comparison among the cylindrical batteries (Electrolytic Solution [5] Examples 7 to 12 and Electrolytic Solution [5] Comparative Examples 4 to 6) show the following. The lithium secondary batteries of the Electrolytic Solution [5] Examples, in each of which the nonaqueous electrolyte contains LiN(C$_n$F$_{2n+1}$SO$_2$)$_2$ (wherein n is an integer of 1-4) and/or lithium bis(oxalato)borate and further contains the specific compound, have been improved in output as compared with the Electrolytic Solution [6]<Preparation of Nonaqueous Solvent>

Commercial ethylene carbonate (EC) was subjected to an adsorption treatment with molecular sieve 4A (50° C.; LHSV, 1/hr). On the other hand, dimethyl carbonate and ethyl methyl carbonate each were sufficiently subjected to precision distillation under the conditions of a reflux ratio of 1 and a theoretical-plate number of 30 and then subjected to an adsorption treatment with molecular sieve 4A (25° C.; LHSV, 1/hr). Thereafter, these solvents were mixed together in an EC:DMC:EMC ratio of 3:3:4 by volume. Furthermore, this mixture was subjected to an adsorption treatment with molecular sieve 4A (25° C.; LHSV, 1/hr) to prepare a mixed nonaqueous solvent. Neither water nor any alcohol was detected in this nonaqueous solvent.

Electrolytic Solution [6]<Secondary-Battery Production>

[Production of Positive Electrode]

Ninety percents by mass lithium cobalt oxide (LiCoO$_2$) as a positive-electrode active material was mixed with 5% by mass acetylene black as a conductive material and 5% by mass poly(vinylidene fluoride) (PVdF) as a binder in N-methylpyrrolidone solvent to prepare a slurry. The slurry obtained was applied to each side of an aluminum foil having a thickness of 15 μm and dried. The coated foil was rolled with a pressing machine to a thickness of 80 μm. Pieces each having an active-material layer size with a width of 100 mm and a length of 100 mm and including an uncoated part having a width of 30 mm were cut out of the rolled foil. Thus, positive electrodes were obtained.

[Production of Negative Electrode]

To 98 parts by weight of artificial graphite powder KS-44 (trade name; manufactured by Timcal) were added 100 parts by weight of an aqueous dispersion of sodium carboxymethyl cellulose (concentration of sodium carboxymethyl cellulose, 1% by mass) as a thickener and 2 parts by weight of an aqueous dispersion of a styrene/butadiene rubber (concentration of styrene/butadiene rubber, 50% by mass) as a binder. The ingredients were mixed together by means of a disperser to obtain a slurry. The slurry obtained was applied to each side of a copper foil having a thickness of 10 μm and dried. The coated foil was rolled with a pressing machine to a thickness of 75 μm. Pieces each having an active-material layer size with a width of 104 mm and a length of 104 mm and including an uncoated part having a width of 30 mm were cut out of the rolled foil. Thus, negative electrodes were obtained.

[Battery Fabrication]

Thirty-two positive electrodes and 33 negative electrodes were alternately disposed and superposed together with porous polyethylene sheet separators (thickness, 25 μm) sandwiched between the electrodes. In this operation, each positive electrode was disposed so that the positive-electrode active-material surface was within the range of the opposed negative-electrode active-material surface. The uncoated parts of the positive electrodes were welded together and those of the negative electrodes were welded together. Thus, current collector tabs were produced to obtain an electrode group. This electrode group was packed into a battery can (outer dimensions: 120×110×10 mm) equipped with a gas release valve. Thereafter, 20 mL of a nonaqueous electrolyte was introduced into the battery can packed with the electrode group and sufficiently infiltrated into the electrodes. This can was sealed to fabricate a prismatic battery. This battery has a rated discharge capacity as high as about 6 Ah, and has a direct-current resistance component as measured by the 10-kHz alternating-current method of about 5 milliohms (mΩ).

[Battery Evaluation]

(Capacity Measurement)

The fresh battery which had undergone no charge/discharge cycling was subjected to 5 cycles of initial charge/discharge at 25° C. in a voltage range of 4.2-3.0 V at a current of 0.2 C (the value of current at which the rated capacity based on 1-hour-rate discharge capacity is discharged over 1 hour is taken as 1 C; the same applies hereinafter). The 0.2-C discharge capacity thereof as measured in the fifth cycle in this operation was taken as initial capacity.

(Output Measurement)

In a 25° C. environment, the battery was charged for 150 minutes at a constant current of 0.2 C and then discharged for 10 seconds at each of 0.1 C, 0.3 C, 1.0 C, 3.0 C, and 10.0 C. The voltage was measured at 10 seconds after the discharge initiation. The area of the triangle surrounded by the resultant current-voltage straight line and the final lower voltage (3 V) was taken as output (W).

(Cycle Test)

The battery was subjected to a cycle test in a high-temperature environment of 60° C., which is regarded as the upper-limit temperature for the actual use of lithium secondary batteries. The battery was charged by the constant-current constant-voltage method at 2 C to a final charge voltage of 4.2 V and then discharged at a constant current of 2 C to a final discharge voltage of 3.0 V. This charge/discharge operation as one cycle was repeated to conduct 500 cycles in total. The battery which had undergone the cycle test was subjected to 3 cycles of charge/discharge in a 25° C. environment. The 0.2-C discharge capacity thereof as measured in the third cycle was taken as capacity after cycling. The proportion of this capacity after cycling to the initial capacity was taken as capacity retention.

Electrolytic Solution [6] Example 1

In a dry argon atmosphere, methanol was mixed with the mixed nonaqueous solvent described above in such an amount as to result in a concentration of 10 ppm. Lithium hexafluorophosphate (LiPF$_6$) was added thereto and dissolved therein in such an amount as to result in a concentration of 0.8 mol/L. After one day, the amount of hydrogen fluoride (HF) in the solution was 12 ppm. After 2 weeks, the amount thereof was measured again and was found to be 14 ppm. Hexamethylcyclotrisiloxane was mixed with this mixture solution (2 weeks after the mixing) in such an amount as to result in a concentration of 0.3% by mass. Thus, a nonaqueous electrolyte was prepared. This nonaqueous electrolyte was used to produce a battery by the method described above. This battery was examined for output and capacity retention. The results are shown in Electrolytic Solution [6] Table 1.

Electrolytic Solution [6] Example 2

A nonaqueous electrolyte was prepared in the same manner as in Electrolytic Solution [6] Example 1, except that the amount of the methanol to be mixed was changed to 20 ppm of the mixed nonaqueous solvent. This nonaqueous electrolyte was used to produce a battery in the same manner as in Electrolytic Solution [6] Example 1. This battery was examined for output and capacity retention. The results are shown in Electrolytic Solution [6] Table 1. Incidentally, at one day after the mixing of LiPF$_6$, the amount of hydrogen fluoride (HF) in the mixture solution was 16 ppm. After 2 weeks, the amount thereof was measured again and was found to be 19 ppm.

Electrolytic Solution [6] Example 3

A nonaqueous electrolyte was prepared in the same manner as in Electrolytic Solution [6] Example 1, except that the amount of the methanol to be mixed was changed to 35 ppm of the mixed nonaqueous solvent. This nonaqueous electrolyte was used to produce a battery in the same manner as in Electrolytic Solution [6] Example 1. This battery was examined for output and capacity retention. The results are shown in Electrolytic Solution [6] Table 1. Incidentally, at one day after the mixing of LiPF$_6$, the amount of hydrogen fluoride (HF) in the mixture solution was 22 ppm. After 2 weeks, the amount thereof was measured again and was found to be 27 ppm.

Electrolytic Solution [6] Example 4

A nonaqueous electrolyte was prepared in the same manner as in Electrolytic Solution [6] Example 1, except that ethylene glycol (EG) was mixed in place of the methanol in an amount of 15 ppm of the mixed nonaqueous solvent. This nonaqueous electrolyte was used to produce a battery in the same manner as in Electrolytic Solution [6] Example 1. This battery was examined for output and capacity retention. The results are shown in Electrolytic Solution [6] Table 1. Incidentally, at one day after the mixing of LiPF$_6$, the amount of hydrogen fluoride (HF) in the mixture solution was 14 ppm. After 2 weeks, the amount thereof was measured again and was found to be 16 ppm.

Electrolytic Solution [6] Example 5

A nonaqueous electrolyte was prepared in the same manner as in Electrolytic Solution [6] Example 1, except that ethylene glycol was mixed in place of the methanol in an amount of 35 ppm of the mixed nonaqueous solvent. This nonaqueous electrolyte was used to produce a battery in the same manner as in Electrolytic Solution [6] Example 1. This battery was examined for output and capacity retention. The results are shown in Electrolytic Solution [6] Table 1. Incidentally, at one day after the mixing of LiPF$_6$, the amount of hydrogen fluoride (HF) in the mixture solution was 23 ppm. After 2 weeks, the amount thereof was measured again and was found to be 27 ppm.

Electrolytic Solution [6] Example 6

A nonaqueous electrolyte was prepared in the same manner as in Electrolytic Solution [6] Example 1, except that methanol and ethylene glycol were mixed with the mixed nonaqueous solvent respectively in amounts of 25 ppm and 25 ppm of the mixed nonaqueous solvent. This nonaqueous electrolyte was used to produce a battery in the same manner as in Electrolytic Solution [6] Example 1. This battery was examined for output and capacity retention. The results are shown in Electrolytic Solution [6] Table 1. Incidentally, at one day after the mixing of LiPF$_6$, the amount of hydrogen fluoride (HF) in the mixture solution was 31 ppm. After 2 weeks, the amount thereof was measured again and was found to be 36 ppm.

Electrolytic Solution [6] Example 7

A nonaqueous electrolyte was prepared in the same manner as in Electrolytic Solution [6] Example 1, except that lithium difluorophosphate (produced by the method described in *Inorganic Nuclear Chemistry Letters* (1969), 5(7), pp. 581-582) was mixed, in place of the hexamethylcyclotrisiloxane, in an amount of 0.3% by mass based on the mixture solution. This nonaqueous electrolyte was used to produce a battery in the same manner as in Electrolytic Solution [6] Example 1. This battery was examined for output and capacity retention. The results are shown in Electrolytic Solution [6] Table 1.

Electrolytic Solution [6] Example 8

A nonaqueous electrolyte was prepared in the same manner as in Electrolytic Solution [6] Example 3, except that lithium difluorophosphate was mixed, in place of the hexamethylcyclotrisiloxane, in an amount of 0.3% by mass based on the mixture solution. This nonaqueous electrolyte was used to produce a battery in the same manner as in Electrolytic Solution [6] Example 3. This battery was examined for output and capacity retention. The results are shown in Electrolytic Solution [6] Table 1.

Electrolytic Solution [6] Example 9

A nonaqueous electrolyte was prepared in the same manner as in Electrolytic Solution [6] Example 4, except that lithium difluorophosphate was mixed, in place of the hexamethylcyclotrisiloxane, in an amount of 0.3% by mass based on the mixture solution. This nonaqueous electrolyte was used to produce a battery in the same manner as in Electrolytic Solution [6] Example 4. This battery was examined for output and capacity retention. The results are shown in Electrolytic Solution [6] Table 1.

Electrolytic Solution [6] Example 10

A nonaqueous electrolyte was prepared in the same manner as in Electrolytic Solution [6] Example 6, except that lithium difluorophosphate was mixed, in place of the hexamethylcyclotrisiloxane, in an amount of 0.3% by mass based on the mixture solution. This nonaqueous electrolyte was used to produce a battery in the same manner as in Electrolytic Solution [6] Example 6. This battery was examined for output and capacity retention. The results are shown in Electrolytic Solution [6] Table 1.

Electrolytic Solution [6] Example 11

A nonaqueous electrolyte was prepared in the same manner as in Electrolytic Solution [6] Example 6, except that trimethylsilyl methanesulfonate was mixed, in place of the hexamethylcyclotrisiloxane, in an amount of 0.3% by mass based on the mixture solution. This nonaqueous electrolyte was used to produce a battery in the same manner as in Electrolytic Solution [6] Example 6. This battery was examined for output and capacity retention. The results are shown in Electrolytic Solution [6] Table 1.

Electrolytic Solution [6] Example 12

<Secondary-Battery Production 2>
[Production of Positive Electrode]
Ninety percents by mass lithium cobalt oxide (LiCoO$_2$) as a positive-electrode active material was mixed with 5% by mass acetylene black as a conductive material and 5% by mass poly(vinylidene fluoride) (PVdF) as a binder in N-methylpyrrolidone solvent to prepare a slurry. The slurry obtained was applied to each side of an aluminum foil having a thickness of 20 μm and dried. The coated foil was rolled with a pressing machine to a thickness of 80 μm. A strip having a width of 52 mm and a length of 830 mm was cut out of the rolled foil to obtain a positive electrode. This positive electrode had a 50-mm uncoated part extending in the lengthwise direction on each of the front and back sides, and the active-material layer had a length of 780 mm.
[Production of Negative Electrode]
To 98 parts by weight of artificial graphite powder KS-44 (trade name; manufactured by Timcal) were added 100 parts by weight of an aqueous dispersion of sodium carboxymethyl cellulose (concentration of sodium carboxymethyl cellulose, 1% by mass) as a thickener and 2 parts by weight of an aqueous dispersion of a styrene/butadiene rubber (concentration of styrene/butadiene rubber, 50% by mass) as a binder. The ingredients were mixed together by means of a disperser to obtain a slurry. The slurry obtained was evenly applied to each side of a copper foil having a thickness of 18 μm as a negative-electrode current collector and dried. The coated foil was rolled with a pressing machine to a thickness of 85 μm. A strip having a width of 56 mm and a length of 850 mm was cut out of the rolled foil to obtain a negative electrode. This negative electrode had a 30-mm uncoated part extending in the lengthwise direction on each of the front and back sides.

[Production of Nonaqueous Electrolytic Solution]

The same nonaqueous electrolyte as in Electrolytic Solution [6] Example 6 was produced.

[Battery Fabrication]

The positive electrode and the negative electrode were superposed and wound together with polyethylene separators so as to prevent the positive electrode and the negative electrode from coming into direct contact with each other to thereby obtain an electrode roll. This electrode roll was packed into a battery can so that the terminal of the positive electrode and that of the negative electrode protruded outward. Subsequently, 5 mL of the nonaqueous electrolyte described later was introduced into the battery can, which was then caulked. Thus, a 18650 type cylindrical battery was produced. This battery had a rated discharge capacity of about 0.7 ampere-hours (Ah), and a direct-current resistance as measured by the 10-kHz alternating-current method of about 35 milliohms (mΩ). This battery was examined for output and capacity retention in the same manners as in Electrolytic Solution [6] Example 6. The results are shown in Electrolytic Solution [6] Table 1.

Electrolytic Solution [6] Comparative Example 1

In Electrolytic Solution [6] Example 3, a nonaqueous electrolyte was prepared without mixing hexamethylcyclotrisiloxane and this nonaqueous electrolyte was used to produce a battery. This battery was examined for output and capacity retention. The results are shown in Electrolytic Solution [6] Table 1.

Electrolytic Solution [6] Comparative Example 2

In Electrolytic Solution [6] Example 5, a nonaqueous electrolyte was prepared without mixing hexamethylcyclotrisiloxane and this nonaqueous electrolyte was used to produce a battery. This battery was examined for output and capacity retention. The results are shown in Electrolytic Solution [6] Table 1.

Electrolytic Solution [6] Comparative Example 3

In Electrolytic Solution [6] Example 6, a nonaqueous electrolyte was prepared without mixing hexamethylcyclotrisiloxane and this nonaqueous electrolyte was used to produce a battery. This battery was examined for output and capacity retention. The results are shown in Electrolytic Solution [6] Table 1.

Electrolytic Solution [6] Comparative Example 4

In Electrolytic Solution [6] Example 1, a nonaqueous electrolyte was prepared without mixing methanol with the mixed nonaqueous solvent and this nonaqueous electrolyte was used to produce a battery. This battery was examined for output and capacity retention. The results are shown in Electrolytic Solution [6] Table 1. Incidentally, at one day after the mixing of $LiPF_6$, the amount of hydrogen fluoride (HF) in the solution was 9 ppm. After 2 weeks, the amount thereof was measured again and was found to remain at 9 ppm.

Electrolytic Solution [6] Comparative Example 5

In Electrolytic Solution [6] Comparative Example 4, 0.3% by mass lithium difluorophosphate was mixed in place of the hexamethylcyclotrisiloxane to prepare a nonaqueous electrolyte and this nonaqueous electrolyte was used to produce a battery. This battery was examined for output and capacity retention. The results are shown in Electrolytic Solution [6] Table 1.

Electrolytic Solution [6] Comparative Example 6

In Electrolytic Solution [6] Comparative Example 4, 0.3% by mass trimethylsilyl methanesulfonate was mixed in place of the hexamethylcyclotrisiloxane to prepare a nonaqueous electrolyte and this nonaqueous electrolyte was used to produce a battery. This battery was examined for output and capacity retention. The results are shown in Electrolytic Solution [6] Table 1.

Electrolytic Solution [6] Comparative Example 7

A nonaqueous electrolyte was prepared in the same manner as in Electrolytic Solution [6] Example 1, except that the amount of the methanol to be mixed was changed to 700 ppm of the mixed nonaqueous solvent. This nonaqueous electrolyte was used to produce a battery in the same manner as in Electrolytic Solution [6] Example 1. This battery was examined for output and capacity retention. The results are shown in Electrolytic Solution [6] Table 1. Incidentally, at one day after the mixing of $LiPF_6$, the amount of hydrogen fluoride (HF) in the solution was 321 ppm. After 2 weeks, the amount thereof was measured again and was found to be 403 ppm.

Electrolytic Solution [6] Comparative Example 8

In Electrolytic Solution [6] Example 1, neither methanol nor hexamethylcyclotrisiloxane was mixed with the mixed nonaqueous solvent to prepare a nonaqueous electrolyte and this nonaqueous electrolyte was used to produce a battery. This battery was examined for output and capacity retention. The results are shown in Electrolytic Solution [6] Table 1.

Electrolytic Solution [6] Comparative Example 9

A nonaqueous electrolyte was prepared in the same manner as in Electrolytic Solution [6] Example 12, except that hexamethylcyclotrisiloxane was not mixed. This nonaqueous electrolyte was used to produce a battery in the same manner as in Electrolytic Solution [6] Example 12. This battery was examined for output and capacity retention. The results are shown in Electrolytic Solution [6] Table 1.

Electrolytic Solution [6] Table 1

TABLE 59

|  | Alcohol | Amount of HF (ppm) | Compound contained | Output (W) | Capacity retention (%) |
|---|---|---|---|---|---|
| Example 1 | methanol 10 ppm | 14 | hexamethylcyclotrisiloxane | 481 | 71.0 |
| Example 2 | methanol 20 ppm | 19 | hexamethylcyclotrisiloxane | 489 | 71.0 |
| Example 3 | methanol 35 ppm | 27 | hexamethylcyclotrisiloxane | 498 | 70.9 |
| Example 4 | EG 15 ppm | 16 | hexamethylcyclotrisiloxane | 483 | 71.0 |
| Example 5 | EG 35 ppm | 27 | hexamethylcyclotrisiloxane | 498 | 70.9 |
| Example 6 | methanol 25 ppm EG 25 ppm | 36 | hexamethylcyclotrisiloxane | 507 | 70.9 |
| Example 7 | methanol 10 ppm | 14 | lithium difluorophosphate | 492 | 71.3 |
| Example 8 | methanol 35 ppm | 27 | lithium difluorophosphate | 506 | 71.1 |
| Example 9 | EG 15 ppm | 16 | lithium difluorophosphate | 494 | 71.3 |
| Example 10 | methanol 25 ppm EG 25 ppm | 36 | lithium difluorophosphate | 519 | 71.0 |
| Example 11 | methanol 25 ppm EG 25 ppm | 36 | trimethylsilyl methanesulfonate | 509 | 70.9 |
| Example 12 | methanol 25 ppm EG 25 ppm | 36 | hexamethylcyclotrisiloxane | 45.7 | 70.4 |
| Comparative Example 1 | methanol 35 ppm | 27 | none | 395 | 69.5 |
| Comparative Example 2 | EG 35 ppm | 27 | none | 395 | 69.6 |
| Comparative Example 3 | methanol 25 ppm EG 25 ppm | 36 | none | 393 | 68.8 |
| Comparative Example 4 | none | 9 | hexamethylcyclotrisiloxane | 462 | 71.0 |
| Comparative Example 5 | none | 9 | lithium difluorophosphate | 472 | 71.3 |
| Comparative Example 6 | none | 9 | trimethylsilyl methanesulfonate | 467 | 71.0 |
| Comparative Example 7 | methanol 700 ppm | 403 | hexamethylcyclotrisiloxane | 458 | 59.6 |
| Comparative Example 8 | none | 9 | none | 401 | 70.7 |
| Comparative Example 9 | methanol 25 ppm EG 25 ppm | 36 | none | 38.4 | 68.5 |

Electrolytic Solution [6] Table 1 shows the following. The lithium secondary batteries of Electrolytic Solution [6] Comparative Examples 1 to 3, which employed an electrolyte containing a larger amount of hydrogen fluoride (HF), were inferior to the lithium secondary battery of Electrolytic Solution [6] Comparative Example 8 in both output characteristics and cycle characteristics. However, the lithium secondary batteries of Electrolytic Solution [6] Examples 1 to 11, which each employed the electrolyte further containing the specific compound, had been improved in both output characteristics and cycle characteristics. Furthermore, with respect to output, the lithium secondary batteries of Electrolytic Solution [6] Examples 1 to 11 had higher performance than the lithium secondary batteries of Electrolytic Solution [6] Comparative Examples 4 to 6, which had a low hydrogen fluoride (HF) content although containing the specific compound. Namely, the results obtained surprisingly showed that the output-improving effect of the specific compound is heightened by the presence of hydrogen fluoride (HF). It should, however, be noted that the lithium secondary battery of Electrolytic Solution [6] Comparative Example 7, which contained excess hydrogen fluoride (HF), was inferior especially in cycle characteristics.

With respect to the batteries employing a battery structure having a low capacity and a high direct-current resistance, the percentage improvement in output for Electrolytic Solution [6] Example 12 based on the battery of Electrolytic Solution [6] Comparative Example 9 was as low as about 19%. In contrast, percentage improvements in output in the batteries employing a battery structure having a high capacity and a low direct-current resistance are as follows. The percentage improvement in output for Electrolytic Solution [6] Example 6 based on the battery of Electrolytic Solution [6] Comparative Example 3 (the two batteries each contained 25 ppm methanol and 25 ppm ethylene glycol) was as high as about 29%. The percentage improvement in output for Electrolytic Solution [6] Example 5 based on the battery of Electrolytic Solution [6] Comparative Example 2 (the two batteries each contained 35 ppm ethylene glycol) was as high as about 26%. Furthermore, the percentage improvement in output for Electrolytic Solution [6] Example 3 based on the battery of Electrolytic Solution [6] Comparative Example 1 (the two batteries each contained 35 ppm methanol) was as high as about 26%. It was found from these results that the effect of this invention is high specifically in battery structures having a high capacity and a low direct-current resistance.

As described above, it has become possible to obtain high output characteristics without impairing cycle characteristics, by using the nonaqueous electrolyte according to this invention, i.e., a nonaqueous electrolyte for secondary battery which comprises a nonaqueous solvent and a fluorine-containing lithium salt mixed therewith and is characterized in that the nonaqueous electrolyte contains hydrogen fluoride (HF) in an amount of from 10 ppm to 300 ppm and further contains at least one compound selected from the group consisting of cyclic siloxane compounds represented by general formula (1), fluorosilane compounds represented by general formula (2), compounds represented by general formula (3), compounds having an S—F bond in the molecule, nitric acid salts, nitrous acid salts, monofluorophosphoric acid salts, difluorophosphoric acid salts, acetic acid salts, and propionic acid salts in an amount of 10 ppm or more of the whole nonaqueous electrolyte.

In the Examples given above, an alcohol is added to a purified nonaqueous solvent to thereby produce the effect. However, in the case of using a nonaqueous solvent originally containing water or an alcohol, the same effect can be obtained, without purposely adding an alcohol, by regulating conditions for the purification of this nonaqueous solvent. In general, the purification of nonaqueous solvents is troublesome and is industrially causative of a cost increase. In this invention, however, a high-performance nonaqueous electrolyte can be prepared without necessitating excessive purification and this is exceedingly valuable.

Electrolytic Solution [7]<Battery Production 1>
[Production of Positive Electrode]

Ninety percents by mass lithium cobalt oxide ($LiCoO_2$) as a positive-electrode active material was mixed with 5% by mass acetylene black as a conductive material and 5% by mass poly(vinylidene fluoride) (PVdF) as a binder in N-methylpyrrolidone solvent to prepare a slurry. The slurry obtained was applied to each side of an aluminum foil having a thickness of 20 µm and dried. The coated foil was rolled with a pressing machine to a thickness of 80 µm. A strip having a width of 52 mm and a length of 830 mm was cut out of the rolled foil to obtain a positive electrode. This positive electrode had a 50-mm uncoated part extending in the lengthwise direction on each of the front and back sides, and the active-material layer had a length of 780 mm.

[Production of Negative Electrode]

To 98 parts by weight of artificial graphite powder KS-44 (trade name; manufactured by Timcal) were added 100 parts by weight of an aqueous dispersion of sodium carboxymethyl cellulose (concentration of sodium carboxymethyl cellulose, 1% by mass) as a thickener and 2 parts by weight of an aqueous dispersion of a styrene/butadiene rubber (concentration of styrene/butadiene rubber, 50% by mass) as a binder. The ingredients were mixed together by means of a disperser to obtain a slurry. The slurry obtained was evenly applied to each side of a copper foil having a thickness of 18 µm as a negative-electrode current collector and dried. The coated foil was rolled with a pressing machine to a thickness of 85 µm. A strip having a width of 56 mm and a length of 850 mm was cut out of the rolled foil to obtain a negative electrode. This negative electrode had a 30-mm uncoated part extending in the lengthwise direction on each of the front and back sides.

[Production of Electrolytic Solution]

In a dry argon atmosphere, sufficient dried lithium hexafluorophosphate ($LiPF_6$) was dissolved in a concentration of 1 mol/L in a mixed solvent composed of purified ethylene carbonate (EC), dimethyl carbonate (DMC), and ethyl methyl carbonate (EMC) in a volume ratio of 3:3:4 to prepare a nonaqueous electrolyte (1). Furthermore, lithium difluorophosphate produced by the method described in *Inorganic Nuclear Chemistry Letters* (1969), 5(7), pp. 581-582 was incorporated into the nonaqueous electrolyte (1) in such an amount as to result in a concentration of 0.5% by mass. Thus, a nonaqueous electrolyte (2) was prepared.

[Battery Fabrication]

The positive electrode and the negative electrode were superposed and wound together with polyethylene separators so as to prevent the positive electrode and the negative electrode from coming into direct contact with each other to thereby obtain an electrode roll. This electrode roll was packed into a battery can so that the terminal of the positive electrode and that of the negative electrode protruded outward. Subsequently, 5 mL of the electrolyte described later was introduced into the battery can, which was then caulked. Thus, a 18650 type cylindrical battery was produced.

[Battery Evaluation]
(Initial Charge/Discharge)

At 25° C., the cylindrical battery produced was charged to 4.2 V by the constant-current constant-voltage charging method at 0.2 C and then discharged to 3.0 V at a constant current of 0.2 C. This operation as one cycle was repeated to conducted 5 cycles and thereby stabilize the battery. The discharge capacity thereof as measured in the fifth cycle was taken as initial capacity. Incidentally, the value of current at which the rated capacity based on 1-hour-rate discharge capacity is discharged over 1 hour is taken as 1 C.

(Cycle Test)

At 60° C., the battery which had undergone the initial charge/discharge was charged to 4.2 V by the constant-current constant-voltage method at 1 C and then discharged to 3.0 V at a constant current of 1 C. This charge/discharge operation as one cycle was repeated to conduct 500 cycles. The proportion of the discharge capacity of the battery as measured in the 500th cycle to the discharge capacity thereof as measured in the first cycle was taken as capacity retention through cycling.

(Low-Temperature Test)

The battery which had undergone the initial charge/discharge was charged at 25° C. to 4.2 V by the constant-current constant-voltage charging method at 0.2 C and then discharged at −30° C. at a constant current of 0.2 C. The discharge capacity thereof as measured in this discharge was taken as initial low-temperature capacity. The proportion of the initial low-temperature capacity to the initial capacity was taken as proportion of initial low-temperature discharge.

Furthermore, at 25° C., the battery which had undergone the cycle test was charged to 4.2 V by the constant-current constant-voltage charging method at 0.2 C and then discharged to 3.0 V at a constant current of 0.2 C. This operation as one cycle was repeated to conduct 3 cycles. The discharge capacity thereof as measured in the third cycle was taken as capacity after cycling. Thereafter, the same battery was charged at 25° C. to 4.2 V by the constant-current constant-voltage charging method at 0.2 C and then discharged at −30° C. at a constant current of 0.2 C. The discharge capacity thereof as measured in this discharge was taken as low-temperature capacity after cycling. The proportion of the low-temperature capacity after cycling to the capacity after cycling was taken as proportion of low-temperature discharge after cycling.

Electrolytic Solution [7] Example 1

Vinylene carbonate (hereinafter abbreviated to "VC") was mixed with the nonaqueous electrolyte (2) in an amount of 1% by mass based on the whole electrolyte to prepare a nonaqueous electrolyte (3). This nonaqueous electrolyte (3) was used to produce a 18650 type battery, which was examined for capacity retention through cycling and proportion of low-temperature discharge. The results are shown in Electrolytic Solution [7] Table 1. Incidentally, the electrolyte was recovered with a centrifugal separator from the battery which had undergone the initial charge/discharge, and examined for VC amount. As a result, the amount of VC was found to be 0.40% by mass.

Electrolytic Solution [7] Comparative Example 1

The nonaqueous electrolyte (1) was used to produce a 18650 type battery in the same manner as in Electrolytic Solution [7] Example 1. This battery was examined for capacity retention through cycling and proportion of low-temperature discharge. The results are shown in Electrolytic Solution [7] Table 1.

Electrolytic Solution [7] Comparative Example 2

VC was mixed with the nonaqueous electrolyte (1) in an amount of 1% by mass based on the whole electrolyte to prepare a nonaqueous electrolyte (4). This nonaqueous electrolyte (4) was used to produce a 18650 type battery in the same manner as in Electrolytic Solution [7] Example 1. This battery was examined for capacity retention through cycling and proportion of low-temperature discharge. The results are shown in Electrolytic Solution [7] Table 1. Incidentally, the electrolyte was recovered with a centrifugal separator from the battery which had undergone the initial charge/discharge, and examined for VC amount. As a result, the amount of VC was found to be 0.22% by mass.

Electrolytic Solution [7] Comparative Example 3

A 18650 type battery was produced in the same manner as in Electrolytic Solution [7] Example 1, except that the nonaqueous electrolyte (2) was used and VC was not mixed. This battery was examined for capacity retention through cycling and proportion of low-temperature discharge. The results are shown in Electrolytic Solution [7] Table 1.

Electrolytic Solution [7] Comparative Example 4

VC was mixed with the nonaqueous electrolyte (2) in an amount of 5% by mass based on the whole electrolyte to prepare a nonaqueous electrolyte (5). In Electrolytic Solution [7] Example 1, this nonaqueous electrolyte (5) was used to produce a 18650 type battery. This battery was examined for capacity retention through cycling and proportion of low-temperature discharge. The results are shown in Electrolytic Solution [7] Table 1.

Electrolytic Solution [7] Example 2

<Battery Production 2>
[Production of Positive Electrode]

Ninety percents by mass lithium cobalt oxide ($LiCoO_2$) as a positive-electrode active material was mixed with 5% by mass acetylene black as a conductive material and 5% by mass poly(vinylidene fluoride) (PVdF) as a binder in N-methylpyrrolidone solvent to prepare a slurry. The slurry obtained was applied to each side of an aluminum foil having a thickness of 15 µm and dried. The coated foil was rolled with a pressing machine to a thickness of 80 µm. Pieces each having an active-material layer size with a width of 100 mm and a length of 100 mm and including an uncoated part having a width of 30 mm were cut out of the rolled foil. Thus, positive electrodes were obtained.

[Production of Negative Electrode]

To 98 parts by weight of artificial graphite powder KS-44 (trade name; manufactured by Timcal) were added 100 parts by weight of an aqueous dispersion of sodium carboxymethyl cellulose (concentration of sodium carboxymethyl cellulose, 1% by mass) as a thickener and 2 parts by weight of an aqueous dispersion of a styrene/butadiene rubber (concentration of styrene/butadiene rubber, 50% by mass) as a binder. The ingredients were mixed together by means of a disperser to obtain a slurry. The slurry obtained was applied to each side of a copper foil having a thickness of 10 µm and dried. The coated foil was rolled with a pressing machine to a thickness of 75 µm. Pieces each having an active-material layer size with a width of 104 mm and a length of 104 mm and including an uncoated part having a width of 30 mm were cut out of the rolled foil. Thus, negative electrodes were obtained.

[Battery Fabrication]

Thirty-two positive electrodes and 33 negative electrodes were alternately disposed and superposed together with porous polyethylene sheet separators (thickness, 25 µm) sandwiched between the electrodes. In this operation, each positive electrode was disposed so that the positive-electrode active-material surface was within the range of the opposed negative-electrode active-material surface. The uncoated parts of the positive electrodes were welded together and those of the negative electrodes were welded together. Thus, current collector tabs were produced to obtain an electrode group. This electrode group was packed into a battery can (outer dimensions: 120×110×10 mm). Thereafter, 20 mL of the nonaqueous electrolyte (3) was introduced into the battery can packed with the electrode group and sufficiently infiltrated into the electrodes. This can was sealed to fabricate a prismatic battery.

The prismatic battery thus produced was subjected to the cycle test and the low-temperature test in the same manners as in Electrolytic Solution [7] Example 1 to determine the capacity retention through cycling and the proportion of low-temperature discharge thereof. The results are shown in Electrolytic Solution [7] Table 1.

Electrolytic Solution [7] Comparative Example 5

In Electrolytic Solution [7] Example 2, the nonaqueous electrolyte (1) was used in place of the nonaqueous electrolyte (3) to produce a prismatic battery. This battery was examined for capacity retention through cycling and proportion of low-temperature discharge. The results are shown in Electrolytic Solution [7] Table 1.

Electrolytic Solution [7] Comparative Example 6

In Electrolytic Solution [7] Example 2, the nonaqueous electrolyte (4) was used in place of the nonaqueous electrolyte (3) to produce a prismatic battery. This battery was examined for capacity retention through cycling and proportion of low-temperature discharge. The results are shown in Electrolytic Solution [7] Table 1.

Electrolytic Solution [7] Comparative Example 7

In Electrolytic Solution [7] Example 2, the nonaqueous electrolyte (2) was used in place of the nonaqueous electrolyte (3) to produce a prismatic battery. This battery was examined for capacity retention through cycling and proportion of low-temperature discharge. The results are shown in Electrolytic Solution [7] Table 1.

Electrolytic Solution [7] Table 1

TABLE 60

| No. | Battery | VC | LiPO$_2$F$_2$ | Initial capacity (mAh) | Direct-current resistance (mΩ) | Capacity retention through cycling (%) | Proportion of initial low-temperature discharge (%) | Proportion of low-temperature discharge after cycling (%) |
|---|---|---|---|---|---|---|---|---|
| Example 1 | cylindrical | 1% | present | 702 | 35 | 79 | 68 | 69 |
| Comparative Example 1 | cylindrical | Nil | absent | 700 | 35 | 64 | 61 | 54 |
| Comparative Example 2 | cylindrical | 1% | absent | 701 | 35 | 74 | 59 | 56 |
| Comparative Example 3 | cylindrical | Nil | present | 700 | 35 | 65 | 68 | 64 |
| Comparative Example 4 | cylindrical | 5% | present | 699 | 35 | 84 | 37 | 29 |
| Example 2 | prismatic | 1% | present | 6010 | 5 | 85 | 73 | 75 |
| Comparative Example 5 | prismatic | Nil | absent | 6005 | 5 | 70 | 63 | 57 |
| Comparative Example 6 | prismatic | 1% | absent | 6003 | 5 | 78 | 60 | 57 |
| Comparative Example 7 | prismatic | Nil | present | 6006 | 5 | 72 | 72 | 69 |

As apparent from Electrolytic Solution [7] Table 1, the lithium secondary battery of Electrolytic Solution [7] Example 1, in which the nonaqueous electrolyte contained vinylene carbonate and a difluorophosphoric acid salt, was found to have been improved in both capacity retention through cycling and the proportion of low-temperature discharge as compared with the lithium secondary battery of Electrolytic Solution [7] Comparative Example 1, which had the same constitution as the battery of the Example 1 except that the nonaqueous electrolyte contained neither of these.

It was also found that even when compared with the lithium secondary battery of Electrolytic Solution [7] Comparative Example 2, which had the same constitution except that the nonaqueous electrolyte contained VC only, the battery of the Example 1 had been improved in both capacity retention through cycling and the proportion of low-temperature discharge. Although the presence or absence of VC considerably influences capacity retention through cycling, the effect of VC is enhanced by the addition of a difluorophosphoric acid salt thereto. The amount of VC detected in the battery of the Example after the initial charge/discharge was about two times the amount thereof in the battery of the Comparative Example after the initial charge/discharge, and the VC thus remained is thought to have inhibited battery deterioration during the cycle test.

As apparent from. Electrolytic Solution [7] Example 1 and Electrolytic Solution [7] Comparative Example 3, the incorporation of a difluorophosphoric acid salt alone is not considered to bring about a sufficient improvement in capacity retention through cycling. Furthermore, as compared with the lithium secondary battery of Electrolytic Solution [7] Comparative Example 3, the lithium secondary battery of Electrolytic Solution [7] Example 1 not only has greatly improved capacity retention through cycling but has an improved proportion of low-temperature discharge after cycling, although equal in the proportion of initial low-temperature discharge. It has become clear that VC and the difluorophosphoric acid salt produce a synergistic effect to inhibit the internal battery resistance from increasing through the cycle test.

The same applies to a comparison between Electrolytic Solution [7] Example 2 and each of Electrolytic Solution [7] Comparative Examples 5 to 7.

From a comparison between the lithium secondary battery of Electrolytic Solution [7] Example land the lithium secondary battery of Electrolytic Solution [7] Comparative Example 4, which contains a large amount of VC, it was found that the lithium secondary battery of Electrolytic Solution [7] Comparative Example 4 has too poor low-temperature discharge characteristics to withstand use in low-temperature environments although highly satisfactory in capacity retention through cycling.

The table shows values of direct-current resistance measured by the 10-kHz alternating-current method. The prismatic batteries in this experiment have a lower resistance and a higher electric capacity than the cylindrical batteries. The degree of improvement in low-temperature characteristics of Electrolytic Solution [7] Example 2 on Electrolytic Solution [7] Comparative Example 5 is higher than the degree of improvement in low-temperature characteristics of Electrolytic Solution [7] Example 1 on Electrolytic Solution [7] Comparative Example 1. It was thus found that the nonaqueous electrolyte according to this invention is especially suitable for use in secondary batteries having a high electric capacity and secondary batteries having a low direct-current resistance.

Electrolytic Solution [8]<Secondary-Battery Production>
[Production of Positive Electrode]

Ninety percents by mass lithium cobalt oxide (LiCoO$_2$) as a positive-electrode active material was mixed with 5% by mass acetylene black as a conductive material and 5% by mass poly(vinylidene fluoride) (PVdF) as a binder in N-methylpyrrolidone solvent to prepare a slurry. The slurry obtained was applied to each side of an aluminum foil having a thickness of 15 μm and dried. The coated foil was rolled with a pressing machine to a thickness of 80 μm. Pieces each having an active-material layer size with a width of 100 mm and a length of 100 mm and including an uncoated part having a width of 30 mm were cut out of the rolled foil. Thus, positive electrodes were obtained.

[Production of Negative Electrode]

To 98 parts by weight of artificial graphite powder KS-44 (trade name; manufactured by Timcal) were added 100 parts by weight of an aqueous dispersion of sodium carboxymethyl cellulose (concentration of sodium carboxymethyl cellulose, 1% by mass) as a thickener and 2 parts by weight of an aqueous dispersion of a styrene/butadiene rubber (concentration of styrene/butadiene rubber, 50% by mass) as a binder. The ingredients were mixed together by means of a disperser to obtain a slurry. The slurry obtained was applied to each side of a copper foil having a thickness of 10 μm and dried. The coated foil was rolled with a pressing machine to a thickness of 75 μm. Pieces each having an active-material layer size with a width of 104 mm and a length of 104 mm and including an uncoated part having a width of 30 mm were cut out of the rolled foil. Thus, negative electrodes were obtained.

[Battery Fabrication]

Thirty-two positive electrodes and 33 negative electrodes were alternately disposed and superposed together with porous polyethylene sheet separators (thickness, 25 μm) sandwiched between the electrodes. In this operation, each positive electrode was disposed so that the positive-electrode active-material surface was within the range of the opposed negative-electrode active-material surface. The uncoated parts of the positive electrodes were welded together and those of the negative electrodes were welded together. Thus, current collector tabs were produced to obtain an electrode group. This electrode group was packed into a battery can (outer dimensions: 120×110×10 mm) equipped with a gas release valve. Thereafter, 20 mL of the nonaqueous electrolyte which will be described later was introduced into the battery can packed with the electrode group and sufficiently infiltrated into the electrodes. This can was sealed to fabricate a prismatic battery.

The electric capacity of the battery elements held in one battery case of this secondary battery, i.e., the rated discharge capacity of this battery, was about 6 ampere-hours (Ah). This battery had a direct-current resistance component as measured by the 10-kHz alternating-current method of about 5 milliohms (mΩ)).

Electrolytic Solution [8]<Battery Evaluation>

[Capacity Retention Through Cycling]

(Initial Charge/Discharge)

At 25° C., the battery was charged to 4.2 V by the constant-current constant-voltage charging method at 0.2 C and then discharged to 3.0 V at a constant current of 0.2 C. This operation as one cycle was repeated to conducted 5 cycles and thereby stabilize the battery. The discharge capacity thereof as measured in the fifth cycle was taken as initial capacity. Incidentally, the value of current at which the rated capacity is discharged over 1 hour is taken as 1 C.

(Cycle Test)

At 60° C., the battery which had undergone the initial charge/discharge was charged to 4.2 V by the constant-current constant-voltage method at 1 C and then discharged to 3.0 V at a constant current of 1 C. This charge/discharge operation as one cycle was repeated to conduct 500 cycles. The proportion of the discharge capacity of the battery as measured in the 500th cycle to the discharge capacity thereof as measured in the first cycle was taken as capacity retention through cycling.

[Proportion of Initial Low-Temperature Discharge]

(Low-Temperature Test)

The battery which had undergone the initial charge/discharge was charged at 25° C. to 4.2 V by the constant-current constant-voltage charging method at 0.2 C and then discharged at −30° C. at a constant current of 0.2 C. The discharge capacity thereof as measured in this discharge was taken as initial low-temperature capacity. The proportion of the initial low-temperature capacity to the initial capacity was taken as proportion of initial low-temperature discharge.

[Proportion of Low-Temperature Discharge after Cycling]

Furthermore, at 25° C., the battery which had undergone the cycle test was charged to 4.2 V by the constant-current constant-voltage charging method at 0.2 C and then discharged to 3.0 V at a constant current of 0.2 C. This operation as one cycle was repeated to conduct 3 cycles. The discharge capacity thereof as measured in the third cycle was taken as capacity after cycling. Thereafter, the same battery was charged at 25° C. to 4.2 V by the constant-current constant-voltage charging method at 0.2 C and then discharged at −30° C. at a constant current of 0.2 C. The discharge capacity thereof as measured in this discharge was taken as low-temperature capacity after cycling. The proportion of the low-temperature capacity after cycling to the capacity after cycling was taken as proportion of low-temperature discharge after cycling.

Electrolytic Solution [8] Example 1

In a dry argon atmosphere, $LiPF_6$ was added to and dissolved in a mixture of ethylene carbonate (EC), ethyl methyl carbonate (EMC), and dimethyl carbonate (DMC) (volume ratio, 2:5:3) in such an amount as to result in a concentration of 1 mol/L. Hexamethylcyclotrisiloxane and vinylethylene carbonate were incorporated into this solution in such amounts as to result in concentrations of 0.3% by mass and 1% by mass, respectively. Thus, a nonaqueous electrolyte was prepared. This nonaqueous electrolyte was used to produce a battery by the method described above. This battery was examined for capacity retention through cycling, proportion of initial low-temperature discharge, and proportion of low-temperature discharge after cycling. The results are shown in Electrolytic Solution [8] Table 1.

Electrolytic Solution [8] Example 2

A battery was produced in the same manner as in Electrolytic Solution [8] Example 1, except that phenyldimethylfluorosilane was used in place of the hexamethylcyclotrisiloxane in preparing a nonaqueous electrolyte. This battery was examined for capacity retention through cycling, proportion of initial low-temperature discharge, and proportion of low-temperature discharge after cycling. The results are shown in Electrolytic Solution [8] Table 1.

Electrolytic Solution [8] Example 3

A battery was produced in the same manner as in Electrolytic Solution [8] Example 1, except that methyl fluorosulfonate was used in place of the hexamethylcyclotrisiloxane in preparing a nonaqueous electrolyte. This battery was examined for capacity retention through cycling, proportion of initial low-temperature discharge, and proportion of low-temperature discharge after cycling. The results are shown in Electrolytic Solution [8] Table 1.

Electrolytic Solution [8] Example 4

A battery was produced in the same manner as in Electrolytic Solution [8] Example 1, except that lithium difluorophosphate produced by the method described in *Inorganic Nuclear Chemistry Letters* (1969), 5(7), pp. 581-582 was used in place of the hexamethylcyclotrisiloxane in preparing a nonaqueous electrolyte. This battery was examined for capacity retention through cycling, proportion of initial low-temperature discharge, and proportion of low-temperature discharge after cycling. The results are shown in Electrolytic Solution [8] Table 1.

Electrolytic Solution [8] Example 5

A battery was produced in the same manner as in Electrolytic Solution [8] Example 1, except that 1,3-propanesultone was used in place of the vinylethylene carbonate in preparing a nonaqueous electrolyte. This battery was examined for capacity retention through cycling, proportion of initial low-temperature discharge, and proportion of low-temperature discharge after cycling. The results are shown in Electrolytic Solution [8] Table 1.

Electrolytic Solution [8] Example 6

A battery was produced in the same manner as in Electrolytic Solution [8] Example 1, except that γ-butyrolactone was used in place of the vinylethylene carbonate in preparing a nonaqueous electrolyte. This battery was examined for capacity retention through cycling, proportion of initial low-temperature discharge, and proportion of low-temperature discharge after cycling. The results are shown in Electrolytic Solution [8] Table 1.

Electrolytic Solution [8] Example 7

A battery was produced in the same manner as in Electrolytic Solution [8] Example 1, except that fluoroethylene carbonate was used in place of the vinylethylene carbonate in preparing a nonaqueous electrolyte. This battery was examined for capacity retention through cycling, proportion of initial low-temperature discharge, and proportion of low-temperature discharge after cycling. The results are shown in Electrolytic Solution [8] Table 1.

Electrolytic Solution [8] Example 8

A battery was produced in the same manner as in Electrolytic Solution [8] Example 4, except that 1,3-propanesultone was used in place of the vinylethylene carbonate in preparing a nonaqueous electrolyte. This battery was examined for capacity retention through cycling, proportion of initial low-temperature discharge, and proportion of low-temperature discharge after cycling. The results are shown in Electrolytic Solution [8] Table 1.

Electrolytic Solution [8] Example 9

A battery was produced in the same manner as in Electrolytic Solution [8] Example 4, except that γ-butyrolactone was used in place of the vinylethylene carbonate in preparing a nonaqueous electrolyte. This battery was examined for capacity retention through cycling, proportion of initial low-temperature discharge, and proportion of low-temperature discharge after cycling. The results are shown in Electrolytic Solution [8] Table 1.

Electrolytic Solution [8] Example 10

A battery was produced in the same manner as in Electrolytic Solution [8] Example 4, except that fluoroethylene carbonate was used in place of the vinylethylene carbonate in preparing a nonaqueous electrolyte. This battery was examined for capacity retention through cycling, proportion of initial low-temperature discharge, and proportion of low-temperature discharge after cycling. The results are shown in Electrolytic Solution [8] Table 1.

Electrolytic Solution [8] Comparative Example 1

A battery was produced in the same manner as in Electrolytic Solution [8] Example 1, except that hexamethylcyclotrisiloxane was not incorporated in preparing a nonaqueous electrolyte. This battery was examined for capacity retention through cycling, proportion of initial low-temperature discharge, and proportion of low-temperature discharge after cycling. The results are shown in Electrolytic Solution [8] Table 1.

Electrolytic Solution [8] Comparative Example 2

A battery was produced in the same manner as in Electrolytic Solution [8] Example 1, except that vinylethylene carbonate was not incorporated in preparing a nonaqueous electrolyte. This battery was examined for capacity retention through cycling, proportion of initial low-temperature discharge, and proportion of low-temperature discharge after cycling. The results are shown in Electrolytic Solution [8] Table 1.

Electrolytic Solution [8] Comparative Example 3

A battery was produced in the same manner as in Electrolytic Solution [8] Example 1, except that neither hexamethylcyclotrisiloxane nor vinylethylene carbonate was incorporated in preparing a nonaqueous electrolyte. This battery was examined for capacity retention through cycling, proportion of initial low-temperature discharge, and proportion of low-temperature discharge after cycling. The results are shown in Electrolytic Solution [8] Table 1.

Electrolytic Solution [8] Example 11

<Secondary-Battery Production 2>
[Production of Positive Electrode]

Ninety percents by mass lithium cobalt oxide ($LiCoO_2$) as a positive-electrode active material was mixed with 5% by mass acetylene black as a conductive material and 5% by mass poly(vinylidene fluoride) (PVdF) as a binder in N-methylpyrrolidone solvent to prepare a slurry. The slurry obtained was applied to each side of an aluminum foil having a thickness of 20 μm and dried. The coated foil was rolled with a pressing machine to a thickness of 80 μm. A strip having a width of 52 mm and a length of 830 mm was cut out of the rolled foil to obtain a positive electrode. This positive electrode had a 50-mm uncoated part extending in the lengthwise direction on each of the front and back sides, and the active-material layer had a length of 780 mm.

[Production of Negative Electrode]

To 98 parts by weight of artificial graphite powder KS-44 (trade name; manufactured by Timcal) were added 100 parts by weight of an aqueous dispersion of sodium carboxymethyl cellulose (concentration of sodium carboxymethyl cellulose, 1% by mass) as a thickener and 2 parts by weight of an aqueous dispersion of a styrene/butadiene rubber (concentration of styrene/butadiene rubber, 50% by mass) as a binder. The ingredients were mixed together by means of a disperser to obtain a slurry. The slurry obtained was evenly applied to each side of a copper foil having a thickness of 18 μm as a negative-electrode current collector and dried. The coated foil was rolled with a pressing machine to a thickness of 85 μm. A strip having a width of 56 mm and a length of 850 mm was cut out of the rolled foil to obtain a negative electrode. This negative electrode had a 30-mm uncoated part extending in the lengthwise direction on each of the front and back sides.

[Battery Fabrication]

The positive electrode and the negative electrode were superposed and wound together with polyethylene separators so as to prevent the positive electrode and the negative electrode from coming into direct contact with each other to thereby obtain an electrode roll. This electrode roll was packed into a battery can so that the terminal of the positive electrode and that of the negative electrode protruded outward. Subsequently, 5 mL of the electrolyte which will be described later was introduced into the battery can, which was then caulked. Thus, a 18650 type cylindrical battery was produced. The electric capacity of the battery elements held in one battery case of this secondary battery, i.e., the rated discharge capacity of this battery, was about 0.7 ampere-hours (Ah). This battery had a direct-current resistance component as measured by the 10-kHz alternating-current method of about 35 milliohms (mΩ).

The nonaqueous electrolyte used in Electrolytic Solution [8] Example 1 was used to produce a cylindrical battery. This battery was examined for capacity retention through cycling, proportion of initial low-temperature discharge, and proportion of low-temperature discharge after cycling. The results are shown in Electrolytic Solution [8] Table 1.

Electrolytic Solution [8] Example 12

A cylindrical battery was produced in the same manner as in Electrolytic Solution [8] Example 11, except that the nonaqueous electrolyte used in Electrolytic Solution [8] Example 4 was used. This battery was examined for capacity retention through cycling, proportion of initial low-temperature discharge, and proportion of low-temperature discharge after cycling. The results are shown in Electrolytic Solution [8] Table 1.

Electrolytic Solution [8] Comparative Example 4

A cylindrical battery was produced in the same manner as in Electrolytic Solution [8] Example 11, except that the nonaqueous electrolyte used in Electrolytic Solution [8] Comparative Example 1 was used. This battery was examined for capacity retention through cycling, proportion of initial low-temperature discharge, and proportion of low-temperature discharge after cycling. The results are shown in Electrolytic Solution [8] Table 1.

Electrolytic Solution [8] Comparative Example 5

A cylindrical battery was produced in the same manner as in Electrolytic Solution [8] Example 11, except that the nonaqueous electrolyte used in Electrolytic Solution [8] Comparative Example 2 was used. This battery was examined for capacity retention through cycling, proportion of initial low-temperature discharge, and proportion of low-temperature discharge after cycling. The results are shown in Electrolytic Solution [8] Table 1.

Electrolytic Solution [8] Comparative Example 6

A cylindrical battery was produced in the same manner as in Electrolytic Solution [8] Example 11, except that the nonaqueous electrolyte used in Electrolytic Solution [8] Comparative Example 3 was used. This battery was examined for capacity retention through cycling, proportion of initial low-temperature discharge, and proportion of low-temperature discharge after cycling. The results are shown in Electrolytic Solution [8] Table 1.

Electrolytic Solution [8] Table 1

TABLE 61

| No. | Specific compound A | Specific compound B | Capacity retention through cycling (%) | Proportion of initial low-temperature discharge (%) | Proportion of low-temperature discharge after cycling (%) |
|---|---|---|---|---|---|
| Example 1 | hexamethylcyclotrisiloxane | vinylethylene carbonate | 83 | 74 | 73 |
| Example 2 | phenyldilmethylfluorosilane | vinylethylene carbonate | 81 | 71 | 69 |
| Example 3 | methylfluorosulfonate | vinylethylene carbonate | 80 | 70 | 69 |
| Example 4 | lithium difluorophosphate | vinylethylene carbonate | 84 | 76 | 75 |
| Example 5 | hexamethylcyclotrisiloxane | 1,3-propanesultone | 82 | 72 | 69 |
| Example 6 | hexamethylcyclotrisiloxane | γ-butyrolactone | 79 | 73 | 66 |
| Example 7 | hexamethylcyclotrisiloxane | fluoroethylene carbonate | 83 | 73 | 70 |
| Example 8 | lithium difluorophosphate | 1,3-propanesultone | 83 | 73 | 72 |
| Example 9 | lithium difluorophosphate | γ-butyrolactone | 80 | 73 | 69 |
| Example 10 | lithium difluorophosphate | fluoroethylene carbonate | 84 | 74 | 73 |
| Comparative Example 1 | — | vinylethylene carbonate | 76 | 58 | 51 |
| Comparative Example 2 | hexamethylcyclotrisiloxane | — | 72 | 73 | 66 |
| Comparative Example 3 | — | — | 68 | 65 | 54 |

TABLE 61-continued

| No. | Specific compound A | Specific compound B | Capacity retention through cycling (%) | Proportion of initial low-temperature discharge (%) | Proportion of low-temperature discharge after cycling (%) |
|---|---|---|---|---|---|
| Example 11 | hexamethylcyclo trisiloxane | vinylethylene carbonate | 69 | 67 | 65 |
| Example 12 | lithium di fluorophosphate | vinylethylene carbonate | 70 | 69 | 67 |
| Comparative Example 4 | — | vinylethylene carbonate | 65 | 54 | 49 |
| Comparative Example 5 | hexamethylcyclo trisiloxane | — | 60 | 66 | 60 |
| Comparative Example 6 | — | — | 58 | 60 | 52 |

As apparent from Electrolytic Solution [8] Table 1, a comparison among the prismatic batteries (used in Electrolytic Solution [8] Examples 1 to 10 and Electrolytic Solution [8] Comparative Examples 1 to 3) and a separate comparison among the cylindrical batteries (used in Electrolytic Solution [8] Examples 11 and 12 and Electrolytic solution [8] Comparative Examples 4 to 6) show the following. The lithium secondary batteries of the Electrolytic Solution [8] Examples, in each of which the nonaqueous electrolyte contains both at least one specific compound A and at least one specific compound B, have been improved in capacity retention through cycling, proportion of initial low-temperature discharge, and proportion of low-temperature discharge after cycling as compared with the lithium secondary batteries of the Electrolytic Solution [8] Comparative Examples, in each of which the nonaqueous electrolyte does not contain either of these.

As described above, the prismatic batteries of the Examples and the Comparative Examples each have a rated discharge capacity of 3 ampere-hours (Ah) or higher and a direct-current resistance component of 10 milliohms (mΩ) or lower. On the other hand, the cylindrical batteries of the Examples and the Comparative Examples each have a rated discharge capacity lower than 3 ampere-hours (Ah) and a direct-current resistance component higher than 10 milliohms (mΩ). Namely, the prismatic batteries of the Examples and the Comparative Examples have a lower resistance and a higher electric capacity than the cylindrical batteries. Furthermore, the degree of improvement in output of Electrolytic Solution [8] Example 1 on Electrolytic Solution [8] Comparative Example 1 is higher than the degree of improvement in output of Electrolytic Solution [8] Example 11 on Electrolytic Solution [8] Comparative Example 4. It was thus found that the effect of this invention is higher in secondary batteries having a high electric capacity and secondary batteries having a low direct-current resistance.

Electrolytic Solution [9]<Secondary-Battery Production>

[Production of Positive Electrode]

Ninety percents by mass lithium cobalt oxide (LiCoO$_2$) as a positive-electrode active material was mixed with 5% by mass acetylene black as a conductive material and 5% by mass poly(vinylidene fluoride) (PVdF) as a binder in N-methylpyrrolidone solvent to prepare a slurry. The slurry obtained was applied to each side of an aluminum foil having a thickness of 15 μm and dried. The coated foil was rolled with a pressing machine to a thickness of 80 μm. Pieces each having an active-material layer size with a width of 100 mm and a length of 100 mm and including an uncoated part having a width of 30 mm were cut out of the rolled foil. Thus, positive electrodes were obtained.

[Production of Negative Electrode]

To 98 parts by mass of artificial graphite powder KS-44 (trade name; manufactured by Timcal) were added 100 parts by mass of an aqueous dispersion of sodium carboxymethyl cellulose (concentration of sodium carboxymethyl cellulose, 1% by mass) as a thickener and 2 parts by mass of an aqueous dispersion of a styrene/butadiene rubber (concentration of styrene/butadiene rubber, 50% by mass) as a binder. The ingredients were mixed together by means of a disperser to obtain a slurry. The slurry obtained was applied to each side of a copper foil having a thickness of 10 μm and dried. The coated foil was rolled with a pressing machine to a thickness of 75 μm. Pieces each having an active-material layer size with a width of 104 mm and a length of 104 mm and including an uncoated part having a width of 30 mm were cut out of the rolled foil. Thus, negative electrodes were obtained.

[Battery Fabrication]

Thirty-two positive electrodes and 33 negative electrodes were alternately disposed and superposed together with porous polyethylene sheet separators (25 μm) sandwiched between the electrodes. In this operation, each positive electrode was disposed so that the positive-electrode active-material surface was within the range of the opposed negative-electrode active-material surface. The uncoated parts of the positive electrodes were welded together and those of the negative electrodes were welded together. Thus, current collector tabs were produced to obtain an electrode group. This electrode group was packed into a battery can (outer dimensions: 120×110×10 mm) equipped with a gas release valve. Thereafter, 20 mL of a nonaqueous electrolyte was introduced into the battery can packed with the electrode group and sufficiently infiltrated into the electrodes. This can was sealed to fabricate a prismatic battery.

[Electric Capacity and Direct-Current Resistance Component]

The rated discharge capacity of this battery (electric capacity of the battery elements held in one battery case) was as high as about 6 Ah, and the direct-current resistance component thereof as measured by the 10-kHz alternating-current method was about 5 milliohms.

[Battery Evaluation]

(Method of Capacity Measurement)

The fresh battery which had undergone no charge/discharge cycling was subjected to 5 cycles of initial charge/discharge at 25° C. in a voltage range of 4.2-3.0 V at a current of 0.2 C (the value of current at which the rated capacity based on 1-hour-rate discharge capacity is discharged over 1 hour is taken as 1 C; the same applies hereinafter). The 0.2-C discharge capacity thereof as measured in the fifth cycle in this operation was taken as capacity.

(5-C Discharge Capacity after Storage)

A storage test was conducted in a high-temperature environment of 60° C. The battery which had been charged beforehand to a final charge voltage of 4.2 V in a 25° C. environment by the constant-current constant-voltage method was stored at 60° C. for 1 month. This battery after the storage was subjected to a rate test in a 25° C. environment. Namely, the battery which had been charged beforehand to a final charge voltage of 4.2 V in a 25° C. environment by the constant-current constant-voltage method was discharged at a constant current corresponding to 5 C, and the capacity as measured in this discharge was taken as 5-C discharge capacity after storage.

(Overcharge Test)

An overcharge test was conducted in a 25° C. environment. The battery in a discharged state (3 V) was charged at a constant current of 3 C and the behavior thereof was examined. The term "valve working" represents the phenomenon in which the gas release valve works to release electrolyte ingredients, while "rupture" represents the phenomenon in which the battery can breaks violently and the contents are forcedly released.

Electrolytic Solution [9] Example 1

In a dry argon atmosphere, lithium hexafluorophosphate ($LiPF_6$) was added to and dissolved in a mixture of ethylene carbonate (EC), dimethyl carbonate (DMC), and ethyl methyl carbonate (EMC) (volume ratio, 3:3:4) in such an amount as to result in a concentration of 1 mol/L. Cyclohexylbenzene (CHB) and hexamethylcyclotrisiloxane were mixed with the solution in such amounts as to result in concentrations of 1% by mass and 0.3% by mass, respectively, to prepare a nonaqueous electrolyte. This nonaqueous electrolyte was used to produce a battery by the method described above. This battery was examined for 5-C discharge capacity after storage. The results are shown in Electrolytic Solution [9] Table 1.

Electrolytic Solution [9] Example 2

In Electrolytic Solution [9] Example 1, phenyldimethylfluorosilane was mixed in place of the hexamethylcyclotrisiloxane to prepare a nonaqueous electrolyte and this nonaqueous electrolyte was used to produce a battery. This battery was examined for 5-C discharge capacity after storage. The results are shown in Electrolytic Solution [9] Table 1.

Electrolytic Solution [9] Example 3

In Electrolytic Solution [9] Example 1, trimethylsilyl methanesulfonate was mixed in place of the hexamethylcyclotrisiloxane to prepare a nonaqueous electrolyte and this nonaqueous electrolyte was used to produce a battery. This battery was examined for 5-C discharge capacity after storage. The results are shown in Electrolytic Solution [9] Table 1.

Electrolytic Solution [9] Example 4

In Electrolytic Solution [9] Example 1, lithium difluorophosphate produced by the method described in *Inorganic Nuclear Chemistry Letters* (1969), 5(7), pp. 581-582 was mixed in place of the hexamethylcyclotrisiloxane to prepare a nonaqueous electrolyte and this nonaqueous electrolyte was used to produce a battery. This battery was examined for 5-C discharge capacity after storage. The results are shown in Electrolytic Solution [9] Table 1.

Electrolytic Solution [9] Example 5

In Electrolytic Solution [9] Example 1, biphenyl was mixed in place of the cyclohexylbenzene to prepare a nonaqueous electrolyte and this nonaqueous electrolyte was used to produce a battery. This battery was examined for 5-C discharge capacity after storage. The results are shown in Electrolytic Solution [9] Table 1.

Electrolytic Solution [9] Example 6

In Electrolytic Solution [9] Example 5, phenyldimethylfluorosilane was mixed in place of the hexamethylcyclotrisiloxane to prepare a nonaqueous electrolyte and this nonaqueous electrolyte was used to produce a battery. This battery was examined for 5-C discharge capacity after storage. The results are shown in Electrolytic Solution [9] Table 1.

Electrolytic Solution [9] Example 7

In Electrolytic Solution [9] Example 5, trimethylsilyl methanesulfonate was mixed in place of the hexamethylcyclotrisiloxane to prepare a nonaqueous electrolyte and this nonaqueous electrolyte was used to produce a battery. This battery was examined for 5-C discharge capacity after storage. The results are shown in Electrolytic Solution [9] Table 1.

Electrolytic Solution [9] Example 8

In Electrolytic Solution [9] Example 5, lithium difluorophosphate produced by the method described in *Inorganic Nuclear Chemistry Letters* (1969), 5(7), pp. 581-582 was mixed in place of the hexamethylcyclotrisiloxane to prepare a nonaqueous electrolyte and this nonaqueous electrolyte was used to produce a battery. This battery was examined for 5-C discharge capacity after storage. The results are shown in Electrolytic Solution [9] Table 1.

Electrolytic Solution [9] Example 9

In Electrolytic Solution [9] Example 1, t-amylbenzene was mixed in place of the cyclohexylbenzene to prepare a nonaqueous electrolyte and this nonaqueous electrolyte was used to produce a battery. This battery was examined for 5-C discharge capacity after storage. The results are shown in Electrolytic Solution [9] Table 1.

Electrolytic Solution [9] Example 10

In Electrolytic Solution [9] Example 1, "a product of the partial hydrogenation of m-terphenyl" having an m-terphenyl content of 3.7% by mass and a degree of partial hydrogenation of 42% was mixed in place of the cyclohexylbenzene to prepare a nonaqueous electrolyte and this nonaqueous electrolyte was used to produce a battery. This battery was examined for 5-C discharge capacity after storage. The results are shown in Electrolytic Solution [9] Table 1. The product of partial m-terphenyl hydrogenation used in this Electrolytic Solution [9] Example was one obtained by reacting m-terphenyl as a raw material with hydrogen gas under high-temperature high-pressure conditions in the presence of a platinum, palladium, or nickel catalyst. The degree of partial hydrogenation was determined as an average value from that proportion of components of the product of partial m-terphenyl hydrogenation which was determined by analysis by gas chromatography. The content of m-terphenyl also was determined from the results of the analysis by gas chromatography.

Electrolytic Solution [9] Comparative Example 1

In Electrolytic Solution [9] Example 1, a nonaqueous electrolyte was prepared without mixing hexamethylcyclotrisiloxane and this nonaqueous electrolyte was used to produce a battery. This battery was examined for 5-C discharge capacity. The results are shown in Electrolytic Solution [9] Table 1.

Electrolytic Solution [9] Comparative Example 2

In Electrolytic Solution [9] Example 5, a nonaqueous electrolyte was prepared without mixing hexamethylcyclotrisiloxane and this nonaqueous electrolyte was used to produce a battery. This battery was examined for 5-C discharge capacity. The results are shown in Electrolytic Solution [9] Table 1.

Electrolytic Solution [9] Comparative Example 3

In Electrolytic Solution [9] Example 9, a nonaqueous electrolyte was prepared without mixing hexamethylcyclotrisiloxane and this nonaqueous electrolyte was used to produce a battery. This battery was examined for 5-C discharge capacity. The results are shown in Electrolytic Solution [9] Table 1.

Electrolytic Solution [9] Comparative Example 4

In Electrolytic Solution [9] Example 10, a nonaqueous electrolyte was prepared without mixing hexamethylcyclotrisiloxane and this nonaqueous electrolyte was used to produce a battery. This battery was examined for 5-C discharge capacity. The results are shown in Electrolytic Solution [9] Table 1.

Electrolytic Solution [9] Comparative Example 5

In Electrolytic Solution [9] Example 1, neither hexamethylcyclotrisiloxane nor CHB was mixed in preparing a nonaqueous electrolyte and this nonaqueous electrolyte was used to produce a battery. This battery was examined for 5-C discharge capacity. The results are shown in Electrolytic Solution [9] Table 1.

Electrolytic Solution [9] Table 1

TABLE 62

| No. | Overcharge inhibitor | Specific compound | 5-C discharge capacity after storage (mAh) | Over-charge test |
|---|---|---|---|---|
| Example 1 | cyclohexylbenzene | hexamethylcyclotri-siloxane | 4016 | valve working |
| Example 2 | cyclohexylbenzene | phenyldimethylfluoro-silane | 3967 | valve working |
| Example 3 | cyclohexylbenzene | trimethylsilylmethanesulfonate | 4023 | valve working |
| Example 4 | cyclohexylbenzene | lithiumdifluorophosphate | 4062 | valve working |
| Example 5 | biphenyl | hexamethylcyclotri-siloxane | 3810 | valve working |
| Example 6 | biphenyl | phenyldimethylfluoro-silane | 3772 | valve working |
| Example 7 | biphenyl | trimethylsilylmethanesulfonate | 3806 | valve working |
| Example 8 | biphenyl | lithiumdifluorophosphate | 3855 | valve working |
| Example 9 | t-amylbenzene | hexamethylcyclotri-siloxane | 4004 | valve working |
| Example 10 | product of partial hydrogenation of m-terphenyl | hexamethylcyclotri-siloxane | 3959 | valve working |
| Comparative Example 1 | cyclohexylbenzene | none | 3522 | valve working |
| Comparative Example 2 | biphenyl | none | 3217 | valve working |
| Comparative Example 3 | t-amylbenzene | none | 3511 | valve working |
| Comparative Example 4 | product of partial hydrogenation of m-terphenyl | none | 3403 | valve working |
| Comparative Example 5 | none | none | 4091 | rupture |

Electrolytic Solution [9] Table 1 shows the following. The lithium secondary batteries of Electrolytic Solution [9] Examples 1 to 10, in each of the nonaqueous electrolyte contained an overcharge inhibitor and the specific compound, not only were prevented from rupturing in the overcharge test but also showed better characteristics in the high-current (5-C) discharge test after storage than the lithium secondary batteries of Electrolytic Solution [9] Comparative Examples 1 to 4. The characteristics thereof were almost comparable to those of the lithium secondary battery of Electrolytic Solution [9] Comparative Example 5, which contained no overcharge inhibitor. It was thus found that the batteries of the Examples have improved overcharge safety and an exceedingly high practical value.

As described above, it has become possible to provide a lithium secondary battery which simultaneously satisfies high high-current discharge characteristics and overcharge safety, by using a nonaqueous electrolyte for lithium secondary batteries which comprises a nonaqueous solvent and one or more lithium salts mixed therewith and is characterized by containing an overcharge inhibitor and further containing at least one compound selected from the group consisting of cyclic siloxane compounds represented by general formula (1), fluorosilane compounds represented by general formula (2), compounds represented by general formula (3), compounds having an S—F bond in the molecule, nitric acid salts, nitrous acid salts, monofluorophosphoric acid salts, difluorophosphoric acid salts, acetic acid salts, and propionic acid salts in an amount of 10 ppm or more of the whole nonaqueous electrolyte. In particular, it has become possible to impart high suitability for practical use to batteries which have been difficult to simultaneously satisfy those two requirements, such as batteries in which the electric capacity of the battery elements held in one battery case is 3 ampere-hours (Ah) or higher.

Structures [1] to [5] Example 1

<<Production of Nonaqueous Electrolytic Solution>>

In a dry argon atmosphere, sufficiently dried lithium hexafluorophosphate ($LiPF_6$) was dissolved in a concentration of 1 mol/L in a mixed solvent composed of purified ethylene carbonate (EC), dimethyl carbonate (DMC), and ethyl methyl carbonate (EMC) in a volume ratio of 3:3:4. Furthermore, hexamethylcyclotrisiloxane was added thereto so as to result in a concentration of 0.3% by mass.

<<Production of Positive Electrode>>

As a positive-electrode active material was used a lithium-transition metal composite oxide synthesized by the method shown below and represented by the composition formula $LiMn_{0.33}Ni_{0.33}Co_{0.33}O_2$. $Mn_3O_4$, NiO, and $Co(OH)_2$ were weighed out as a manganese source, nickel source, and cobalt source, respectively, in such amounts as to result in an Mn:Ni:Co molar ratio of 1:1:1. Pure water was added thereto to prepare a slurry. Using a circulating medium-stirring type wet bead mill, the solid matters in the slurry were wet-pulverized with stirring so as to result in a median diameter of 0.2 µm.

The slurry was spray-dried with a spray dryer to obtain nearly spherical granulated particles having a particle diameter of about 5 µm consisting only of the manganese source, nickel source, and cobalt source. An LiOH powder having a median diameter of 3 µm was added to the resultant granulated particles in such an amount that the ratio of the number of moles of the Li to the total number of moles of the Mn, Ni, and Co became 1.05. The ingredients were mixed together by means of a high-speed mixer to obtain a powder mixture of the lithium source and the granulated particles of the nickel source, cobalt source, and manganese source. This powder mixture was heat-treated at 950° C. for 12 hours (heating/cooling rate, 5° C./min) in an air stream, subsequently disaggregated, and passed through a sieve having an opening size of 45 µm to obtain a positive-electrode active material. This positive-electrode active material had a BET specific surface area of 1.2 $m^2/g$, average primary-particle diameter of 0.8 µm, median diameter $d_{50}$ of 4.4 µm, and tap density of 1.6 $g/cm^3$.

Ninety percents by mass the positive-electrode active material described above was mixed with 5% by mass acetylene black as a conductive material and 5% by mass poly(vinylidene fluoride) (PVdF) as a binder in N-methylpyrrolidone solvent to prepare a slurry. The slurry obtained was applied to each side of an aluminum foil having a thickness of 15 µm and dried. The coated foil was rolled with a pressing machine to a thickness of 81 µm. Pieces each having a positive-electrode active-material layer size with a width of 100 mm and a length of 100 mm and including an uncoated part having a width of 30 mm were cut out of the rolled foil. Thus, positive electrodes were obtained. The positive-electrode active-material layers had a density of 2.35 $g/cm^3$. The value of (thickness of the positive-electrode active-material layer on one side)/(thickness of the current collector) was 2.2, and $L/2 \times S_2$) was 0.2.

<<Production of Negative Electrode>>

A commercial natural-graphite powder as a particulate carbonaceous substance was repeatedly passed through an ASTM 400-mesh sieve five times in order to prevent inclusion of coarse particles. The negative-electrode material thus obtained is referred to as carbonaceous substance (A).

Carbonaceous substance (A) was mixed with a petroleum-derived heavy oil obtained in thermal naphtha cracking, and this mixture was carbonized at 1,300° C. in an inert gas. Thereafter, the resultant sinter was classified to thereby obtain as a negative-electrode active material a composite carbonaceous material comprising particles of the carbonaceous substance (A) and a carbonaceous substance having different crystallinity adherent to the surface of the particles. In the classification, the sinter was passed through an ASTM 400-mesh sieve five times in order to prevent inclusion of coarse particles. It was ascertained from actual carbon ratio that the negative-electrode active-material powder obtained comprised 95 parts by weight of a graphite and 5 parts by weight of a lowly crystalline carbonaceous substance with which the graphite was covered. This negative-electrode active material had the properties shown in Structures [1] to [5] Table 1.

Structures [1] to [5] Table 1

TABLE 63

| | Particle diameter μm | Roundness — | Specific surface area m²/g | Raman R value — | Raman half-value width cm⁻¹ | $d_{002}$ nm | Ash content mass % | Micro-pore distribution mL/g | Total pore distribution mL/g | True density g/cm³ | Roundness — | Aspect ratio — |
|---|---|---|---|---|---|---|---|---|---|---|---|---|
| Negative-electrode active material | 15.2 | 0.93 | 3.0 | 0.35 | 37 | 0.336 | 0.07 | 0.101 | 0.692 | 2.25 | 0.93 | 1.4 |

To 98 parts by weight of the negative-electrode active material described above were added 100 parts by weight of an aqueous dispersion of sodium carboxymethyl cellulose (concentration of sodium carboxymethyl cellulose, 1% by mass) as a thickener and 2 parts by weight of an aqueous dispersion of a styrene/butadiene rubber (concentration of styrene/butadiene rubber, 50% by mass) as a binder. The ingredients were mixed together by means of a disperser to obtain a slurry. The slurry obtained was applied to each side of a rolled copper foil having a thickness of 10 μm and dried. The coated foil was rolled with a pressing machine to a thickness of 75 μm. Pieces each having an active-material layer size with a width of 104 mm and a length of 104 mm and including an uncoated part having a width of 30 mm were cut out of the rolled foil. Thus, negative electrodes were obtained. The negative electrodes thus obtained had an active-material density of 1.35 g/cm³, and $L/(2 \times S_2)$ was 0.19.

<<Production of Battery>>

Thirty-two positive electrodes and 33 negative electrodes were alternately disposed and superposed together with microporous film separators comprising a porous polyethylene sheet (thickness, 25 μm) sandwiched between the electrodes. In this operation, each positive electrode was disposed so that the positive-electrode active-material surface was within the range of the opposed negative-electrode active-material surface. The uncoated parts of the positive electrodes were bunched and welded together by spot welding and those of the negative electrodes were bunched and welded together by spot welding. Thus, current collector tabs were produced to obtain an electrode group. This electrode group was packed into a battery can made of aluminum (outer dimensions: 120×110×10 mm). The battery can used was one in which the lid part was equipped with current collector terminals for the positive and negative electrodes, a pressure release valve, and a nonaqueous-electrolyte introduction opening. Each current collector tab was connected to the corresponding current collector terminal by spot welding. Thereafter, 20 mL of the nonaqueous electrolyte was introduced into the battery can packed with the electrode group and sufficiently infiltrated into the electrodes. The introduction opening was closed to produce a battery. The ratio of the total electrode area of the positive electrodes to the overall surface area of the battery case was 20.5. The value of $2 \times S_1/T$ was 264, and the electrode group proportion was 0.54.

<<Battery Evaluation>>

(Method of Measuring Battery Capacity)

The fresh battery which had undergone no charge/discharge cycling was subjected to 5 cycles of initial charge/discharge at 25° C. in a voltage range of 4.1-3.0 V at a current of 0.2 C (the value of current at which the rated capacity based on 1-hour-rate discharge capacity is discharged over 1 hour is taken as 1 C; the same applies hereinafter). The 0.2-C discharge capacity thereof as measured in the fifth cycle in this operation was taken as initial capacity. The results of battery evaluation are shown in Structures [1] to [5] Table 2.

(Method of Measuring Initial Output)

In a 25° C. environment, the battery was charged for 150 minutes at a constant current of 0.2 C and then discharged for 10 seconds at each of 0.1 C, 0.3 C, 1.0 C, 3.0 C, and 10.0 C. The voltage was measured at 10 seconds after the discharge initiation. The area of the triangle surrounded by the resultant current-voltage straight line and the final lower voltage (3 V) was taken as output (W). The results of battery evaluation are shown in Structures [1] to [5] Table 2.

(Method of Measuring Initial Series Resistance)

In a 25° C. environment, the battery was charged at a constant current of 0.2 C for 150 minutes and a 10-kHz alternating current was applied thereto to measure the impedance, which was taken as series resistance. The results of battery evaluation are shown in Structures [1] to [5] Table 2.

(Cycle Test (Method of Measuring Battery Capacity after Durability Test and Output after Durability Test))

The battery was subjected to a cycle test in a high-temperature environment of 60° C., which is regarded as the upper-limit temperature for the actual use of lithium secondary batteries. The battery was charged by the constant-current constant-voltage method at 2 C to a final charge voltage of 4.1 V and then discharged at a constant current of 2 C to a final discharge voltage of 3.0 V. This charge/discharge operation as one cycle was repeated to conduct 500 cycles in total. The battery which had undergone the cycle test was subjected to 3 cycles of charge/discharge in a 25° C. environment at a current of 0.2 C. The 0.2-C discharge capacity thereof as measured in the third cycle was taken as battery capacity after durability test. Furthermore, the battery which had undergone the cycle test was examined for output, which was taken as output after durability test, and further examined for series resistance, which was taken as series resistance after durability test. The results of battery evaluation are shown in Structures [1] to [5] Table 2.

(Overcharge Test)

An overcharge test was conducted in a 25° C. environment.

The battery in a discharged state (3 V) was charged at a constant current of 3 C and the behavior thereof was examined. The term "valve working" represents the phenomenon in which the gas release valve works to release electrolyte ingredients, while "rupture" represents the phenomenon in which the battery can breaks violently and the contents are forcedly released. The results of battery evaluation are shown in Structures [1] to [5] Table 2.

Structures [1] to [5] Example 2

A battery was produced in the same manner as in Structures [1] to [5] Example 1, except that 0.3% by mass trimethylsilyl methanesulfonate was incorporated in place of the hexamethylcyclotrisiloxane into the nonaqueous electrolyte. This battery was evaluated in the same manners. The results also are shown in Structures [1] to [5] Table 2.

Structures [1] to [5] Example 3

A battery was produced in the same manner as in Structures [1] to [5] Example 1, except that 0.3% by mass phenyldimethylfluorosilane was incorporated in place of the hexamethylcyclotrisiloxane into the nonaqueous electrolyte. This battery was evaluated in the same manners. The results also are shown in Structures [1] to [5] Table 2.

Structures [1] to [5] Example 4

A battery was produced in the same manner as in Structures [1] to [5] Example 1, except that 0.3% by mass lithium difluorophosphate was incorporated in place of the hexamethylcyclotrisiloxane into the nonaqueous electrolyte. This battery was evaluated in the same manners. The results also are shown in Structures [1] to [5] Table 2.

Structures [1] to [5] Comparative Example 1

A battery was produced in the same manner as in Structures [1] to [5] Example 1, except that hexamethylcyclotrisiloxane was not incorporated into the nonaqueous electrolyte. This battery was evaluated in the same manners. The results also are shown in Structures [1] to [5] Table 2.

Structures [1] to [5] Table 2 current collector) was 2.2. The proportion of the width-direction dimension to the length-direction dimension in the positive electrode was 32.

<<Production of Negative Electrode>>

The same negative-electrode active material as in Structures [1] to [5] Example 1 was used to prepare a slurry in the same manner as in Structures [1] to [5] Example 1. The slurry obtained was applied to each side of a rolled copper foil having a thickness of 10 μm and dried. The coated foil was rolled with a pressing machine to a thickness of 75 μm. A strip having an active-material layer size with a width of 104 mm and a length of 3,300 mm and including uncoated parts having a width of 6 mm located at intervals of 20 mm in the length direction was cut out of the rolled foil. Thus, a negative electrode was obtained. This negative electrode had an active-material density of 1.35 g/cm$^3$.

<<Production of Battery>>

The positive electrode and the negative electrode were superposed and spirally wound together with microporous film separators comprising a porous polyethylene sheet (thickness, 25 μm) sandwiched between the electrodes so as to prevent the positive electrode and the negative electrode from coming into direct contact with each other and so that the uncoated parts of one electrode were disposed on the side opposite to the uncoated parts of the other electrode. Thus, an electrode roll was obtained. With respect to each of the positive electrode and the negative electrode, the uncoated parts were bunched and spot-welded together at the center of the roll to produce a current collector tab and thereby obtain an electrode group. This electrode group was disposed in a battery can made of aluminum (outer dimensions: 36 mm$\phi$× 120 mm) so that the negative-electrode current collector tab

TABLE 64

|  | Specific compound | Battery capacity Ah | Direct-current resistance mΩ | Initial output W | Battery capacity after durability test Ah | Direct-current resistance after durability test mΩ | Output after durability test W | Over-charge test |
|---|---|---|---|---|---|---|---|---|
| Example 1 | hexamethylcyclotrisiloxane | 6.1 | 4.8 | 577 | 5.4 | 5.0 | 395 | valve opening |
| Example 2 | trimethylsilyl methanesulfonate | 6.1 | 4.9 | 579 | 5.4 | 5.1 | 403 | valve opening |
| Example 3 | phenyldimethylfluorosilane | 6.1 | 4.9 | 572 | 5.4 | 5.1 | 393 | valve opening |
| Example 4 | lithium difluorophosphate | 6.1 | 4.8 | 588 | 5.5 | 5.0 | 410 | valve opening |
| Comparative Example 1 | None | 6.1 | 5.0 | 500 | 5.1 | 5.5 | 321 | rupture |

Structures [1] to [5] Example 5

<<Production of Positive Electrode>>

The same positive-electrode active material as in Structures [1] to [5] Example 1 was used to prepare a slurry in the same manner as in Structures [1] to [5] Example 1. The slurry obtained was applied to each side of an aluminum foil having a thickness of 15 μm and dried. The coated foil was rolled with a pressing machine to a thickness of 81 μm. A strip having a positive-electrode active-material layer size with a width of 100 mm and a length of 3,200 mm and including uncoated parts having a width of 6 mm located at intervals of 20 mm in the length direction was cut out of the rolled foil. Thus, a positive electrode was obtained. The positive-electrode active-material layers had a density of 2.35 g/cm$^3$, and the value of (thickness of the positive-electrode active-material layer on one side)/(thickness of the was on the bottom. The negative-electrode current collector tab was spot-welded to the can bottom to constitute a structure in which the battery can served as a negative-electrode current collector terminal. A battery can lid equipped with a positive-electrode current collector terminal and a pressure release valve was prepared, and the positive-electrode current collector tab was connected to the positive-electrode current collector terminal by spot welding. Thereafter, 20 mL of a nonaqueous electrolyte was introduced into the battery can packed with the electrode group and sufficiently infiltrated into the electrodes. The battery can lid was caulked to seal the can. Thus, a cylindrical battery was produced. The ratio of the total electrode area of the positive electrode to the overall surface area of the battery case was 41.0, and the electrode group proportion was 0.58.

<<Battery Evaluation>>

Battery evaluation was conducted in the same manners as in Structures [1] to [5] Example 1, except that the cylindrical battery described above was used. The results of battery evaluation are shown in Structures [1] to [5] Table 3.

Structures [1] to [5] Example 6

A battery was produced in the same manner as in Structures [1] to [5] Example 5, except that 0.3% by mass trimethylsilyl methanesulfonate was incorporated in place of the hexamethylcyclotrisiloxane into the nonaqueous electrolyte. This battery was evaluated in the same manners. The results also are shown in Structures [1] to [5] Table 3.

Structures [1] to [5] Example 7

A battery was produced in the same manner as in Structures [1] to [5] Example 5, except that 0.3% by mass phenyldimethylfluorosilane was incorporated in place of the hexamethylcyclotrisiloxane into the nonaqueous electrolyte. This battery was evaluated in the same manners. The results also are shown in Structures [1] to [5] Table 3.

Structures [1] to [5] Example 8

A battery was produced in the same manner as in Structures [1] to [5] Example 5, except that 0.3% by mass lithium difluorophosphate was incorporated in place of the hexamethylcyclotrisiloxane into the nonaqueous electrolyte. This battery was evaluated in the same manners. The results also are shown in Structures [1] to [5] Table 3.

Structures [1] to [5] Comparative Example 2

A battery was produced in the same manner as in Structures [1] to [5] Example 5, except that hexamethylcyclotrisiloxane was not incorporated into the nonaqueous electrolyte. This battery was evaluated in the same manners. The results also are shown in Structures [1] to [5] Table 3.

Furthermore, hexamethylcyclotrisiloxane was added thereto so as to result in a concentration of 0.3% by mass.

<<Production of Positive Electrode>>

As a positive-electrode active material was used a lithium-transition metal composite oxide synthesized by the method shown below and represented by the composition formula $LiMn_{0.33}Ni_{0.33}Co_{0.33}O_2$. $Mn_3O_4$, NiO, and $Co(OH)_2$ were weighed out as a manganese source, nickel source, and cobalt source, respectively, in such amounts as to result in an Mn:Ni:Co molar ratio of 1:1:1. Pure water was added thereto to prepare a slurry. Using a circulating medium-stirring type wet bead mill, the solid matters in the slurry were wet-pulverized with stirring so as to result in a median diameter of 0.2 μm.

The slurry was spray-dried with a spray dryer to obtain nearly spherical granulated particles having a particle diameter of about 5 μm consisting only of the manganese source, nickel source, and cobalt source. An LiOH powder having a median diameter of 3 μm was added to the resultant granulated particles in such an amount that the ratio of the number of moles of the Li to the total number of moles of the Mn, Ni, and Co became 1.05. The ingredients were mixed together by means of a high-speed mixer to obtain a powder mixture of the lithium source and the granulated particles of the nickel source, cobalt source, and manganese source. This powder mixture was heat-treated at 950° C. for 12 hours (heating/cooling rate, 5° C./min) in an air stream, subsequently disaggregated, and passed through a sieve having an opening size of 45 μm to obtain a positive-electrode active material. This positive-electrode active material had a BET specific surface area of 1.2 m²/g, average primary-particle diameter of 0.8 μm, median diameter $d_{50}$ of 4.4 μm, and tap density of 1.6 g/cm³.

Ninety percents by mass the positive-electrode active material described above was mixed with 5% by mass acetylene black as a conductive material and 5% by mass

Structures [1] to [5] Table 3

TABLE 65

|  | Specific compound | Battery capacity Ah | Direct-current resistance mΩ | Initial output W | Battery capacity after durability test Ah | Direct-current resistance after durability test mΩ | Output after durability test W | Over-charge test |
|---|---|---|---|---|---|---|---|---|
| Example 5 | hexamethylcyclotrisiloxane | 6.1 | 5.7 | 569 | 5.3 | 5.9 | 386 | valve opening |
| Example 6 | trimethylsilyl methanesulfonate | 6.1 | 5.6 | 572 | 5.3 | 5.8 | 389 | valve opening |
| Example 7 | phenyldimethylfluorosilane | 6.1 | 5.7 | 564 | 5.3 | 5.9 | 379 | valve opening |
| Example 8 | lithium difluorophosphate | 6.1 | 5.6 | 582 | 5.3 | 5.8 | 399 | valve opening |
| Comparative Example 2 | None | 6.1 | 5.9 | 493 | 5.0 | 6.3 | 303 | rupture |

The following was found from the results given in Structures [1] to [5] Table 2 and Structures [1] to [5] Table 3. Due to the nonaqueous electrolyte containing the specific compound, each battery has been improved in output, capacity retention, and safety and, even after the cycle test, has a small increase in direct-current resistance component to sufficiently retain the battery capacity and output.

Structure [6] Example 1

<<Production of Nonaqueous Electrolytic Solution>>

In a dry argon atmosphere, sufficiently dried lithium hexafluorophosphate ($LiPF_6$) was dissolved in a concentration of 1 mol/L in a mixed solvent composed of purified ethylene carbonate (EC), dimethyl carbonate (DMC), and ethyl methyl carbonate (EMC) in a volume ratio of 3:3:4.

poly(vinylidene fluoride) (PVdF) as a binder in N-methylpyrrolidone solvent to prepare a slurry. The slurry obtained was applied to each side of an aluminum foil having a thickness of 15 μm and dried. The coated foil was rolled with a pressing machine to a thickness of 81 μm. Pieces each having a positive-electrode active-material layer size with a width of 100 mm and a length of 100 mm and including an uncoated part having a width of 30 mm were cut out of the rolled foil. Thus, positive electrodes were obtained. The positive-electrode active-material layers had a density of 2.35 g/cm³. The value of (thickness of the positive-electrode active-material layer on one side)/(thickness of the current collector) was 2.2, and $L/(2 \times S_2)$ was 0.2.

<<Production of Negative Electrode>>

A commercial natural-graphite powder as a particulate carbonaceous substance was repeatedly passed through an ASTM 400-mesh sieve five times in order to prevent inclusion of coarse particles. The negative-electrode material thus obtained is referred to as carbonaceous substance (A).

Carbonaceous substance (A) was mixed with a petroleum-derived heavy oil obtained in thermal naphtha cracking, and this mixture was carbonized at 1,300° C. in an inert gas. Thereafter, the resultant sinter was classified to thereby obtain as a negative-electrode active material a composite carbonaceous material comprising particles of the carbonaceous substance (A) and a carbonaceous substance having different crystallinity adherent to the surface of the particles. In the classification, the sinter was passed through an ASTM 400-mesh sieve five times in order to prevent inclusion of coarse particles. It was ascertained from actual carbon ratio that the negative-electrode active-material powder obtained comprised 95 parts by weight of a graphite and 5 parts by weight of a lowly crystalline carbonaceous substance with which the graphite was covered. This negative-electrode active material had the properties shown in Structure [6] Table 1.

Structure [6] Table 1

TABLE 66

| | Particle diameter μm | Roundness | Specific surface area M²/g | Raman R value | Raman half-value width cm⁻¹ | $d_{002}$ nm | Ash content mass % | Micro-pore distribution mL/g | Total pore distribution mL/g | True density g/cm³ | Roundness | Aspect ratio |
|---|---|---|---|---|---|---|---|---|---|---|---|---|
| Negative-electrode active material | 15.2 | 0.93 | 3.0 | 0.35 | 37 | 0.336 | 0.07 | 0.101 | 0.692 | 2.25 | 0.93 | 1.4 |

To 98 parts by weight of the negative-electrode active material described above were added 100 parts by weight of an aqueous dispersion of sodium carboxymethyl cellulose (concentration of sodium carboxymethyl cellulose, 1% by mass) as a thickener and 2 parts by weight of an aqueous dispersion of a styrene/butadiene rubber (concentration of styrene/butadiene rubber, 50% by mass) as a binder. The ingredients were mixed together by means of a disperser to obtain a slurry. The slurry obtained was applied to each side of a rolled copper foil having a thickness of 10 μm and dried. The coated foil was rolled with a pressing machine to a thickness of 75 μm. Pieces each having an active-material layer size with a width of 104 mm and a length of 104 mm and including an uncoated part having a width of 30 mm were cut out of the rolled foil. Thus, negative electrodes were obtained. The negative electrodes thus obtained had an active-material density of 1.35 g/cm³, and $L/(2 \times S_2)$ was 0.19.

<<Production of Battery>>

Thirty-two positive electrodes and 33 negative electrodes were alternately disposed and superposed together with microporous film separators comprising a porous polyethylene sheet (thickness, 25 μm) sandwiched between the electrodes. In this operation, each positive electrode was disposed so that the positive-electrode active-material surface was within the range of the opposed negative-electrode active-material surface. With respect to each of the positive electrodes and the negative electrodes, the uncoated parts were bunched and connected to each other by spot welding together with a metal piece serving as a current collector terminal. Thus, current collector tabs were produced to obtain an electrode group. The porous polyethylene sheet was one having the property of closing the pores at a temperature of 135° C. or higher.

As a battery casing material, use was made of a laminated sheet comprising a polypropylene film, an aluminum foil having a thickness of 0.04 mm, and a nylon film in this order (total thickness, 0.1 mm). This casing material was formed into a rectangular cup so that the polypropylene film faced inward to thereby obtain a case. This polypropylene film had a melting point of 165° C. The electrode group described above was packed into the case so that the current collector terminals protruded outward from the unsealed part in the cup top. Twenty milliliters of the nonaqueous electrolyte was introduced into the case and sufficiently infiltrated into the electrodes. This case was sealed by heat-sealing the cup top under reduced pressure to produce a battery. This battery was nearly prismatic. The ratio of the total electrode area of the positive electrodes to the overall surface area of the battery case (surface area of the casing material excluding the heat-sealed part) was 22.6, and $(2 \times S_1/T)$ was 411.

<<Battery Evaluation>>

(Method of Measuring Battery Capacity)

The fresh battery which had undergone no charge/discharge cycling was subjected to 5 cycles of initial charge/discharge at 25° C. in a voltage range of 4.1-3.0 V at a current of 0.2 C (the value of current at which the rated capacity based on 1-hour-rate discharge capacity is discharged over 1 hour is taken as 1 C; the same applies hereinafter). The 0.2-C discharge capacity thereof as measured in the fifth cycle in this operation was taken as "battery capacity" (Ah). The results of battery evaluation are shown in Structure [6] Table 3.

(Method of Measuring Direct-Current Resistance Component)

In a 25° C. environment, the battery was charged at a constant current of 0.2 C for 150 minutes and a 10-kHz alternating current was applied thereto to measure the impedance, which was taken as "direct-current resistance component" (mΩ). The results of battery evaluation are shown in Structure [6] Table 3.

(Method of Measuring Initial Output)

In a 25° C. environment, the battery was charged for 150 minutes at a constant current of 0.2 C and then discharged for 10 seconds at each of 0.1 C, 0.3 C, 1.0 C, 3.0 C, and 10.0 C. The voltage was measured at 10 seconds after the discharge initiation. The area of the triangle surrounded by the resultant current-voltage straight line and the final lower voltage (3 V) was taken as "initial output" (W). The results of battery evaluation are shown in Structure [6] Table 3.

(Cycle Test)

(Method of Measuring Battery Capacity after Durability Test, Direct-Current Resistance Component after Durability Test, and Output after Durability Test)

The battery was subjected to a cycle test in a high-temperature environment of 60° C., which is regarded as the upper-limit temperature for the actual use of lithium secondary batteries. The battery was charged by the constant-current constant-voltage method at 2 C to a final charge voltage of 4.1 V and then discharged at a constant current of 2 C to a final discharge voltage of 3.0 V. This charge/discharge operation as one cycle was repeated to conduct 500 cycles in total. The battery which had undergone the cycle test was subjected to 3 cycles of charge/discharge in a 25° C. environment at a current of 0.2 C. The 0.2-C discharge capacity thereof as measured in the third cycle was taken as "battery capacity after durability test". Furthermore, the battery which had undergone the cycle test was examined for direct-current resistance component, which was taken as "direct-current resistance component after durability test", and further examined for output, which was taken as "output after durability test". The results of battery evaluation are shown in Structure [6] Table 3.

(Overcharge Test)

An overcharge test was conducted in a 25° C. environment. The battery in a discharged state (3 V) was charged at a constant current of 3 C and the behavior thereof was examined. The term "valve working" represents the phenomenon in which the gas release valve works to release nonaqueous-electrolyte ingredients, while "rupture" represents the phenomenon in which the battery can breaks violently and the contents are forcedly released. The results of battery evaluation are shown in Structure [6] Table 3.

(Method of Measuring Volume Change)

In a 25° C. environment, the volume of the battery in a discharged state (3 V) was measured. The volume thereof was determined by placing ethanol in a graduated vessel and immersing the battery in the ethanol. The proportion of the volume as measured after the cycle test to the volume as measured before the cycle test was taken as "volume change". The results of evaluation are shown in Structure [6] Table 3.

Structure [6] Example 2

A battery was produced in the same manner as in Structure [6] Example 1, except that 0.3% by mass trimethylsilyl methanesulfonate was incorporated in place of the hexamethylcyclotrisiloxane into the nonaqueous electrolyte. This battery was evaluated in the same manners. The results also are shown in Structure [6] Table 3.

Structure [6] Example 3

A battery was produced in the same manner as in Structure [6] Example 1, except that 0.3% by mass phenyldimethylfluorosilane was incorporated in place of the hexamethylcyclotrisiloxane into the nonaqueous electrolyte. This battery was evaluated in the same manners. The results also are shown in Structure [6] Table 3.

Structure [6] Example 4

A battery was produced in the same manner as in Structure [6] Example 1, except that 0.3% by mass lithium difluorophosphate was incorporated in place of the hexamethylcyclotrisiloxane into the nonaqueous electrolyte. This battery was evaluated in the same manners. The results also are shown in Structure [6] Table 3.

Structure [6] Comparative Example 1

A battery was produced in the same manner as in Structure [6] Example 1, except that hexamethylcyclotrisiloxane was not incorporated into the nonaqueous electrolyte. This battery was evaluated in the same manners. The results also are shown in Structure [6] Table 3.

Structure [6] Table 2

TABLE 67

| No. | Specific compound in nonaqueous electrolyte |
| --- | --- |
| Example 1 | hexamethylcyclotrisiloxane |
| Example 2 | trimethylsilyl methanesulfonate |
| Example 3 | phenyldimethylfluorosilane |
| Example 4 | lithium difluorophosphate |
| Comparative Example 1 | none |

Structure [6] Table 3

TABLE 68

| No. | Battery capacity Ah | Direct-current resistance component mΩ | Initial output W | Battery capacity after durability test W | Direct-current resistance component after durability test mΩ | Output after durability test W | Over-charge test | Volume change |
| --- | --- | --- | --- | --- | --- | --- | --- | --- |
| Example 1 | 6.1 | 4.3 | 583 | 5.3 | 4.2 | 394 | valveworking | 1.01 |
| Example 2 | 6.1 | 4.2 | 585 | 5.3 | 4.4 | 398 | valveworking | 1.01 |
| Example 3 | 6.1 | 4.3 | 579 | 5.3 | 4.5 | 388 | valveworking | 1.01 |
| Example 4 | 6.1 | 4.3 | 595 | 5.3 | 4.5 | 407 | valveworking | 1.01 |
| Comparative Example 1 | 6.1 | 4.5 | 508 | 5.0 | 4.9 | 318 | rupture | 1.03 |

The following was found from the results given in Structure [6] Table 3. Due to the nonaqueous electrolytes each containing the specific compound, the batteries of the Examples have been improved in initial output, capacity retention, and safety and, even after the cycle test, retain a sufficient battery capacity and a sufficient output and have a small volume change.

INDUSTRIAL APPLICABILITY

Applications of the lithium secondary batteries of the invention are not particularly limited, and the batteries can be used in various known applications. Examples thereof include notebook personal computers, pen-input personal computers, mobile personal computers, electronic-book players, portable telephones, portable facsimile telegraphs, portable copiers, portable printers, headphone stereos, video movie cameras, liquid-crystal TVs, handy cleaners, portable CD players, mini-disk players, transceivers, electronic pocketbooks, electronic calculators, memory cards, portable tape recorders, radios, backup power sources, motors, motor vehicles, motorbikes, bicycles fitted with a motor, bicycles, illuminators, toys, game machines, clocks and watches, power tools, stroboscopes, and cameras. The lithium secondary batteries of the invention have a high capacity, satisfactory life, and high output, are reduced in gas evolution, and are highly safe even when overcharged. The batteries can hence be extensively and advantageously used especially in fields where a high capacity is required.

While the invention has been described in detail and with reference to specific embodiments thereof, it will be apparent to one skilled in the art that various changes and modifications can be made therein without departing from the spirit and scope thereof. This application is based on the following Japanese patent applications, the entire contents thereof being herein incorporated by reference.

Application No. 2005-331255 (filing date: Nov. 16, 2005)
Application No. 2005-331362 (filing date: Nov. 16, 2005)
Application No. 2005-331391 (filing date: Nov. 16, 2005)
Application No. 2005-331477 (filing date: Nov. 16, 2005)
Application No. 2005-331513 (filing date: Nov. 16, 2005)
Application No. 2005-339794 (filing date: Nov. 25, 2005)
Application No. 2006-019863 (filing date: Jan. 27, 2006)
Application No. 2006-005622 (filing date: Jan. 13, 2005)
Application No. 2005-367747 (filing date: Dec. 21, 2005)
Application No. 2005-377366 (filing date: Dec. 28, 2005)
Application No. 2005-349052 (filing date: Dec. 2, 2005)
Application No. 2005-359061 (filing date: Dec. 13, 2005)
Application No. 2006-019879 (filing date: Jan. 27, 2006)
Application No. 2006-013664 (filing date: Jan. 23, 2005)
Application No. 2005-314043 (filing date: Oct. 28, 2005)
Application No. 2005-331585 (filing date: Nov. 16, 2005)
Application No. 2005-305368 (filing date: Oct. 20, 2005)
Application No. 2005-344732 (filing date: Nov. 29, 2005)
Application No. 2005-343629 (filing date: Nov. 29, 2005)
Application No. 2005-332173 (filing date: Nov. 16, 2005)
Application No. 2005-305300 (filing date: Oct. 20, 2005)
Application No. 2005-353005 (filing date: Dec. 7, 2005)
Application No. 2005-314260 (filing date: Oct. 28, 2005)
Application No. 2005-369824 (filing date: Dec. 22, 2005)
Application No. 2005-370024 (filing date: Dec. 22, 2005)

BRIEF DESCRIPTION OF THE DRAWINGS

[FIG. 1] (a) is a scanning electron microscope (SEM) photograph of a section of the thin-film negative electrode (1) used in the Examples 1 to 3 and Comparative Example 1 for negative electrode [7]. [FIG. 1] (b) is a photograph taken with an electron probe microanalyzer (EPMA), the photograph showing a mass concentration distribution of the element Si in the film thickness direction in the thin-film negative electrode (1) in negative electrode [7]. [FIG. 1] (c) is a photograph taken with an electron probe microanalyzer (EPMA), the photograph showing a mass concentration distribution of the element C in the film thickness direction in the thin-film negative electrode (1) in negative electrode [7].

The invention claimed is:
1. A nonaqueous electrolyte for secondary battery comprising:
10 ppm to 5 mass percent of at least one specific compound from the group consisting of cyclic siloxane compounds represented by

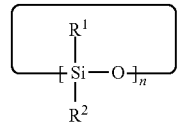

wherein $R^1$ and $R^2$ may be the same or different and represent an organic group which has 1 to 12 carbon atoms and n represents an integer of 3 to 10; a fluorosilane having the formula

wherein $R^3$ to $R^5$ may be the same or different and represent an organic group which has 1-12 carbon atoms; x represents an integer of 1-3; and p, q, and r each represents an integer of 0-3, provided that $1 \leq p+q+r \leq 3$; and compounds having the formula (3):

wherein $R^6$ to $R^8$ may be the same or different and represent an organic group which has 1-12 carbon atoms and A represents at least one member selected from the group consisting of H, C, N, O, F, S, Si, and P; and
a non-aqueous solvent comprising from about 1 to 25 volume percent of ethylene carbonate based the total electrolyte volume.

2. The nonaqueous electrolyte for secondary battery of claim 1 comprising from about 1 to 20 volume percent of ethylene carbonate based on the total electrolyte volume.

3. The electrolyte of claim 2 wherein the non-aqueous solvent comprises from about 1 to 15 volume percent of ethylene carbonate based on the total electrolyte volume.

4. The electrolyte of claim 2 wherein the non-aqueous solvent comprises at least one chain carbonate.

5. The electrolyte of claim 4 wherein the chain carbonate is a dialkyl carbonate having 1— 5 carbons.

6. The electrolyte of claim 4 wherein the chain carbonate is at least one selected from the group consisting of dimethyl carbonate, diethyl carbonate, di-n-propyl carbonate, ethyl methyl carbonate, methyl n-propyl carbonate, and ethyl n-propyl carbonate.

7. The electrolyte of claim 6 wherein the chain carbonate is at least one selected from the group consisting of dimethyl carbonate, diethyl carbonate, and ethyl methyl carbonate.

8. The electrolyte of claim 2 wherein the specific compound is at least one cyclic siloxane selected from the group consisting of:

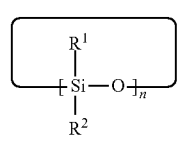

wherein R¹ and R² may be the same or different and represent an organic group which has 1 to 12 carbon atoms and n represents an integer of 3 to 10.

9. The electrolyte of claim 2 wherein the specific compound is at least one fluorosilane selected from the group consisting of $$SiF_xR^3_pR^4_qR^5_r \quad (2)$$

wherein R³ to R⁵ may be the same or different and represent an organic group which has 1-12 carbon atoms; x represents an integer of 1-3; and p, q, and r each represents an integer of 0-3, provided that 1≤p+q+r≤3; and compounds having the formula (3)

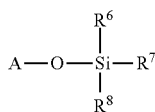
(3)

10. The electrolyte of claim 1 wherein the specific compound is at least one compound selected from the group consisting of

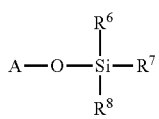
(3)

wherein R⁶ to R⁸ may be the same or different and represent an organic group which has 1-12 carbon atoms and A represents at least one member selected from the group consisting of H, C, N, O, F, S, Si, and P.

11. The electrolyte of claim 2 wherein the specific compound comprises from 0.01 mass percent to 5 mass percent of the non-aqueous electrolyte.

12. The electrolyte of claim 2 wherein the specific compound comprises from 0.01 mass percent to 4 mass percent of the non-aqueous electrolyte.

13. The electrolyte of claim 2 wherein the specific compound comprises from 0.01 mass percent to 3 mass percent of the non-aqueous electrolyte.

14. The electrolyte of claim 1 wherein the specific compound comprises from 0.05 mass percent to 5 mass percent of the non-aqueous electrolyte.

15. The electrolyte of claim 4 wherein the specific compound comprises from 0.05 mass percent to 4 mass percent of the non-aqueous electrolyte.

16. The electrolyte of claim 5 wherein the specific compound comprises from 0.05 mass percent to 3 mass percent of the non-aqueous electrolyte.

17. The electrolyte of claim 1 wherein the specific compound comprises from 0.1 mass percent to 5 mass percent of the non-aqueous electrolyte.

18. The electrolyte of claim 1 wherein the specific compound comprises from 0.1 mass percent to 4 mass percent of the non-aqueous electrolyte.

19. The electrolyte of claim 1 wherein the specific compound comprises from 0.1 mass percent to 3 mass percent of the non-aqueous electrolyte.

20. The electrolyte of claim 8 wherein the specific compound is at least compound selected from the group consisting of hexaphenylcyclotrisiloxane, 1,3,5-trimethyl-1,3,5-trivinylcyclotrisiloxane, octamethylcyclotetrasiloxane, decamethylcyclopentasiloxane, and hexamethylcyclotrisiloxane.

21. The electrolyte of claim 9 wherein the specific compound is at least compound selected from the group consisting of tripropylfluorosilane, phenyldimethylfluorosilane, triphenylfluorosilane, vinyldimethylfluorosilane, vinyldiethylfluorosilane, vinyldiphenylfluorosilane, trimethoxyfluorosilane, triethoxyfluorosilane, dimethyldifluorosialne, diethyldifluorosilane, divinyldifluorosilane, and ethylvinyldifluorosilane, methyltrifluorosilane and ethyltrifluorosilane.

22. The electrolyte of claim 9 wherein the specific compound is at least compound selected from the group consisting of hexaethyldisiloxane, octamethyltrisiloxane,
methoxytrimethylsilane, ethoxytrimethylsilane, bis(trimethylsilyl) peroxide, trimethylsilyl acetate, triethylsilyl acetate, trimethylsilyl propionate, trimethylsilyl methacrylate, trimethylsilyl trifluoroacetate, trimethylsilyl methanesulfonate, trimethylsilyl ethanesulfonate, triethylsilyl methanesulfonate, and trimethylsilyl fluoromethanesulfonate, bis(trimethylsilyl) sulfate, tris(trimethylsiloxy)boron, tris(trimethylsilyl) phosphate, and tris(trimethylsilyl) phosphite.

23. A lithium secondary battery comprising:
a positive electrode, a negative electrode each capable of occluding and releasing lithium ions;
a microporous film separator interposed between the electrodes; and
the non-aqueous electrolyte of claim 1.

* * * * *